(12) United States Patent
Kim et al.

(10) Patent No.: US 12,459,899 B2
(45) Date of Patent: Nov. 4, 2025

(54) ISOQUINOLINONE DERIVATIVES, METHOD FOR PREPARING THE SAME, AND PHARMACEUTICAL COMPOSITION FOR PREVENTING OR TREATING POLY(ADP-RIBOSE) POLYMERASE-1-RELATED DISEASES, COMPRISING THE SAME AS ACTIVE INGREDIENT

(71) Applicant: DIGMBIO. INC., Gyeonggi-do (KR)

(72) Inventors: Eunhee Kim, Daejeon (KR); Changmin Park, Gyeonggi-do (KR); Sehwan Oh, Gyeonggi-do (KR); Younghoon Kim, Gyeonggi-do (KR); Juhee Lee, Gyeonggi-do (KR); Jaehee Seol, Gyeonggi-do (KR); Ahram Shim, Gyeonggi-do (KR); Younggwan Kim, Gyeonggi-do (KR); Tae-Sung Koo, Gyeonggi-do (KR); Ki-Hong Jang, Daejeon (KR)

(73) Assignee: DIGMBIO, INC., Gyeonggi-do (KR)

(*) Notice: Subject to any disclaimer, the term of this patent is extended or adjusted under 35 U.S.C. 154(b) by 864 days.

(21) Appl. No.: 17/771,773

(22) PCT Filed: Oct. 29, 2020

(86) PCT No.: PCT/KR2020/014947
§ 371 (c)(1),
(2) Date: Apr. 25, 2022

(87) PCT Pub. No.: WO2021/086077
PCT Pub. Date: May 6, 2021

(65) Prior Publication Data
US 2023/0027362 A1   Jan. 26, 2023

(30) Foreign Application Priority Data
Oct. 30, 2019   (KR) .................. 10-2019-0136798

(51) Int. Cl.
*C07D 217/24*   (2006.01)
*A23L 33/00*   (2016.01)
(Continued)

(52) U.S. Cl.
CPC ............ *C07D 217/24* (2013.01); *A23L 33/10* (2016.08); *A23L 33/40* (2016.08); *A61P 27/02* (2018.01);
(Continued)

(58) Field of Classification Search
CPC .. C07D 217/24; C07D 401/06; C07D 401/12; C07D 401/14; C07D 405/12;
(Continued)

(56) References Cited

U.S. PATENT DOCUMENTS

2004/0176361 A1   9/2004   Fujio et al.
2004/0248931 A1   12/2004   Fujio et al.
(Continued)

FOREIGN PATENT DOCUMENTS

| JP | 2002-284699 | 10/2002 |
|---|---|---|
| JP | 2009-196973 | 9/2009 |

(Continued)

OTHER PUBLICATIONS

CAS Registry No. 69454-44-0, entered on Nov. 16, 1984. (Year: 1984).*
(Continued)

*Primary Examiner* — Joseph K McKane
*Assistant Examiner* — Ashli Ariana Chicks
(74) *Attorney, Agent, or Firm* — HOVEY WILLIAMS LLP

(57) ABSTRACT

The present invention relates to isoquinolinone derivatives, a method for preparing the same, and a pharmaceutical composition for preventing or treating poly(ADP-ribose) polymerase-1 (PARP-1)-related diseases containing the
(Continued)

same as an active ingredient. The isoquinolinone derivatives exhibit an excellent PARP-1 inhibitory effect at a concentration of nanomolar units, and further exhibit an excellent cytoprotective effect (apoptosis inhibitory effect) on ophthalmic diseases or disorders, specifically retinal disorders, and thus can be effectively used as a pharmaceutical composition for preventing or treating PARP-1-related diseases, for example, ophthalmic diseases or disorders, which contains the same as an active ingredient.

15 Claims, 1 Drawing Sheet

(51) Int. Cl.
| | | |
|---|---|---|
| *A23L 33/10* | (2016.01) | |
| *A61P 27/02* | (2006.01) | |
| *C07D 401/06* | (2006.01) | |
| *C07D 401/12* | (2006.01) | |
| *C07D 401/14* | (2006.01) | |
| *C07D 405/12* | (2006.01) | |
| *C07D 417/12* | (2006.01) | |
| *C07D 451/02* | (2006.01) | |

(52) U.S. Cl.
CPC ......... *C07D 401/06* (2013.01); *C07D 401/12* (2013.01); *C07D 401/14* (2013.01); *C07D 405/12* (2013.01); *C07D 417/12* (2013.01); *C07D 451/02* (2013.01); *A23V 2002/00* (2013.01)

(58) Field of Classification Search
CPC ........................... C07D 417/12; C07D 451/02; A61K 31/4709; A61K 31/497; A61K 31/506; A61K 31/55; A23L 33/10; A23L 33/40; A61P 27/02

See application file for complete search history.

(56) References Cited

U.S. PATENT DOCUMENTS

| | | |
|---|---|---|
| 2019/0092751 A1 | 3/2019 | Buchstaller et al. |
| 2020/0071299 A1 | 3/2020 | Takahashi et al. |

FOREIGN PATENT DOCUMENTS

| | | |
|---|---|---|
| KR | 10-2005-0070024 | 7/2005 |
| KR | 10-2018-0056603 | 5/2018 |
| KR | 10-2018-0073681 | 7/2018 |
| KR | 10-2019-0098760 | 8/2019 |
| KR | 10-2030016 | 10/2019 |
| WO | 2017/013593 | 1/2017 |

OTHER PUBLICATIONS

Office Action dated Oct. 3, 2023 in corresponding Japanese Patent Application No. 2022-524597, 6 pages.
Machine Translation of JP2002-284699, 30 pages.
Machine Translation of KR10-2030016, 125 pages.
Machine Translation of KR10-2018-0056603, 118 pages.
Extended Search Report dated Nov. 3, 2023 in corresponding European Patent Application No. 20883470.5, 7 pages.
Machine Translation of JP2009-196973, 27 pages.
International Search Report (English Translation) mailed Feb. 17, 2021 in corresponding PCT/KR2020/014947, 4 pages.

\* cited by examiner

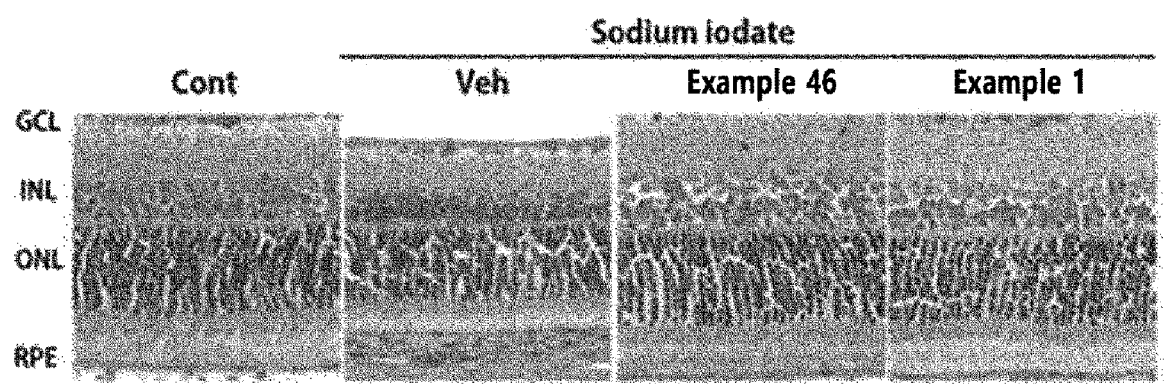

ISOQUINOLINONE DERIVATIVES, METHOD FOR PREPARING THE SAME, AND PHARMACEUTICAL COMPOSITION FOR PREVENTING OR TREATING POLY(ADP-RIBOSE) POLYMERASE-1-RELATED DISEASES, COMPRISING THE SAME AS ACTIVE INGREDIENT

RELATED APPLICATIONS

This application claims priority to PCT International Patent Application No. PCT/KR2020/014947, filed Oct. 29, 2020, which claims the priority benefit of Korean Patent Application No. 10-2019-0136798, filed Oct. 30, 2019. Each of these applications is hereby incorporated by reference in their entireties.

TECHNICAL FIELD

The present invention relates to a pharmaceutical composition for preventing or treating poly(ADP-ribose) polymerase (PARP-1)-related diseases.

BACKGROUND ART

It is estimated that 42,000,000 people are suffering from blindness world-wide, and more people are suffering from severe retinal disorders.

In the Western world, retinal diseases such as diabetic retinopathy, retinitis pigmentosa (RP), wet and dry age-related macular degeneration (ARMD), inflammatory diseases including macular edema, central vein occlusion, uveitis affecting the retina, and proliferative vitreoretinopathy are leading causes of blindness.

Particularly in developed countries, the most prevalent retinal disease that causes blindness in adults over the age of 60 is age-related macular degeneration (AMD), and since the number of patients is gradually increasing, it is expected that the number of cases of AMD will increase at the same rate if effective therapeutic agents are not developed. AMD progressively weakens the function of certain nerves and epithelial layers of the macula. Clinical presentations of these diseases include accumulation of drusen, hyperplasia of the retinal pigment epithelium (RPE) or degeneration due to oxidative electrostimulation, geographic atrophy, and choroidal neovascularization. Atrophic AMD is characterized by atrophy of the outer retina and RPE, and degeneration of subadjacent choriocapillaris, accounting for approximately 25% of the cases with severe central visual loss. Exudative (or "wet") AMD is characterized by CNV growth underneath the RPE and retina, and subsequent hemorrhage, exudative retinal detachment, disciform scarring, and retinal atrophy. Depigmentation of the pigment epithelium can also occur. Exudative AMD accounts for approximately 75% of AMD cases with severe central vision loss.

Currently, most of the treatments are the most useful treatments for patients suffering from relatively advanced symptoms, and these treatments include laser photocoagulation, photodynamic therapy, and surgery. However, since there is currently no effective treatment in the early stages of the diseases, the development of a therapeutic agent is urgently required.

Meanwhile, the PARP-1 enzyme is an enzyme that is associated with signal transduction of DNA damage through its ability to recognize single- or double-stranded DNA breaks and quickly bind thereto. There are about 18 kinds of proteins in the poly(ADP-ribose) polymerase family, and they show a certain level of homology but differ in function. Among these, the catalytic activities of PARP-1 and PARP-2 are known as the only enzymes that are promoted by the occurrence of DNA strand breakage, and it is known that the intracellular activation rate is about 90% for PARP-1 and about 10% for PARP-2.

Specifically, PARP-1 is known to be involved in various DNA-related functions, including gene amplification, cell division, differentiation, apoptosis, DNA base excision repair, and effects on telomere length and chromosomal stability. Activated PARP-1 bound to DNA uses $NAD^+$ to synthesize poly(ADP-ribose) on target proteins in various nuclei, including topoisomerase, histone, and PARP itself.

Severe single- or double-stranded DNA damage induced by various stimuli induces hyperactivity of PARP-1. Excessively activated PARP-1 synthesizes intracellular poly (ADP-ribose) in large quantities, and as a result, $NAD^+$, which is used for poly(ADP-ribose) synthesis, is depleted in the cell. As a result, the depletion of $NAD^+$ used in the production of ATP induces the depletion of ATP in the cell, resulting in necrosis or death of the cell. In addition, over-synthesized poly(ADP-ribose) can bind to mitochondrial AIF (Apoptosis Inducing Factor) and HK1 (Hexokinase 1), and AIF bound to poly(ADP-ribose) moves to the nucleus and fragments DNA in the nucleus, thereby inducing cell necrosis. Further, HK1, whose function is deteriorated due to the binding of poly(ADP-ribose), induces a decrease in mitochondrial function, resulting in cell necrosis.

Accordingly, it was confirmed that the inhibition of PARP caused a remarkable increase in DNA strand breakage and apoptosis from a number of low-molecular-weight PARP inhibitors. In this regard, there have been attempts to use PARP inhibitors on radiation sensitization of hypoxic tumor cells, specific vascular diseases, septic shock, ischemic injury and neurotoxicity, and their effectiveness has been proven.

In recent years, attempts have been made to use PARP inhibitors for hemorrhagic shock, macular degeneration (AMD), damage caused by retinal pigment degeneration, and for rejection of transplants of organs such as lungs, heart, and kidneys, and treatments with PARP inhibitors have been shown to alleviate acute diseases, such as pancreatitis, and liver and lung damage caused by the mechanism by which PARP acts.

As described above, there have been attempts to use PARP inhibitors for the treatment of various diseases, but it remains at the level of confirming the effects in diseases except carcinoma, and in particular, there has not been significant development of therapeutic agents to date for ophthalmic diseases.

Accordingly, the present inventors developed a novel PARP inhibitor, preferably a PARP-1 inhibitor, and while trying to develop a compound useful at the therapeutic level of a specific disease, for example, an ophthalmic disease, an excellent inhibitory effect of PARP-1 due to the novel compound according to the present invention was confirmed. Further, it was confirmed that it has an excellent cytoprotective effect (apoptosis inhibitory effect) at a significant level as a therapeutic agent for ophthalmic diseases or disorders, for example, retinal diseases, etc. Therefore, it was confirmed that it can be effectively used as a pharmaceutical composition for preventing or treating PARP-1 related diseases, preferably ophthalmic diseases or disorders, which comprises the novel compound according to the present invention as an active ingredient, thereby completing the present invention.

DISCLOSURE

Technical Problem

It is an object of the present invention to provide isoquinolinone derivatives, isomers, or pharmaceutically acceptable salts thereof.

It is another object of the present invention to provide a method for preparing isoquinolinone derivatives.

It is still another object of the present invention to provide a pharmaceutical composition for preventing or treating a poly(ADP-ribose) polymerase-1 (PARP-1)-related disease, comprising the isoquinolinone derivatives, isomers, or pharmaceutically acceptable salts thereof as an active ingredient.

It is yet another object of the present invention to provide a pharmaceutical composition for preventing or treating an ophthalmic disease or disorder, comprising the isoquinolinone derivatives, isomers, or pharmaceutically acceptable salts thereof as an active ingredient.

It is even another object of the present invention to provide a health functional food for preventing or improving an ophthalmic disease or disorder, comprising the isoquinolinone derivatives, isomers, or pharmaceutically acceptable salts thereof as an active ingredient.

Technical Solution

In order to achieve the above objects, according to an aspect of the present invention, there is provided a compound represented by Chemical Formula 1 below, a stereoisomer, or a pharmaceutically acceptable salt thereof:

[Chemical Formula 1]

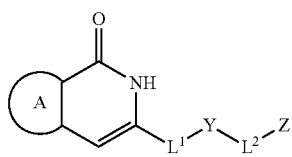

In Chemical Formula 1 above,

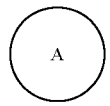

is phenyl, or 5- to 6-membered heteroaryl containing one or more heteroatom selected from the group consisting of N, O, and S, wherein the phenyl or heteroaryl may be unsubstituted or substituted with halogen or straight or branched $C_{1-6}$ alkyl;

$L^1$ is $C_{1-3}$ alkylene unsubstituted or substituted with oxo;

Y is a 4- to 8-membered monocyclic or polycyclic heterocycloalkylene or heterocycloalkenylene containing one or more heteroatom selected from the group consisting of N, O, and S;

$L^2$ is a single bond, —NHCO—, —NR$^2$—, —O—, or straight or branched $C_{1-10}$ alkylene substituted with one or more substituents selected from the group consisting of oxo and amino, $R^2$ is hydrogen or $C_{1-6}$ alkyl; and Z is —H, $C_{3-8}$ cycloalkyl, 5- to 8-membered heterocycloalkyl containing one or more heteroatom selected from the group consisting of N, O, and S, phenyl, or 5- to 8-membered heteroaryl containing one or more heteroatom selected from the group consisting of N, O, and S, wherein the cycloalkyl, heterocycloalkyl, phenyl, and heteroaryl may be each independently unsubstituted or substituted with one or more substituents selected from the group consisting of halogen, cyano, nitro, straight or branched $C_{1-6}$ alkyl unsubstituted or substituted with one or more halogen, straight or branched $C_{1-6}$ alkoxy unsubstituted or substituted with one or more halogen, $CO_2H$, $C_{1-6}$ alkoxycarbonyl, and $C_{1-6}$ alkylcarbonylamino.

According to another aspect of the present invention, as shown in Reaction Scheme 1 below, there is provided a method for preparing a compound represented by the Chemical Formula 1 above, including: reacting a compound represented by Chemical Formula 2 with a compound represented by Chemical Formula 3 to prepare a compound represented by Chemical Formula 1:

[Reaction Scheme 1]

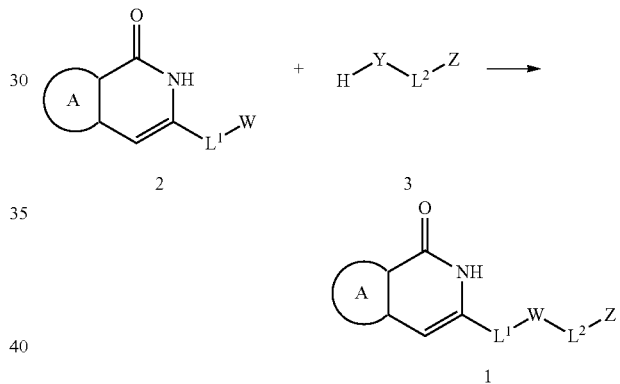

In the Reaction Scheme above,

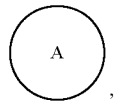

$L^1$, Y, $L^2$, and Z are as defined above, and W is a leaving group.

According to still another aspect of the present invention, there is provided a pharmaceutical composition for preventing or treating a poly(ADP-ribose) polymerase-1 (PARP-1)-related disease, comprising the compound represented by Chemical Formula 1 above, an isomer, or a pharmaceutically acceptable salt thereof as an active ingredient.

According to yet another aspect of the present invention, there is provided a pharmaceutical composition for preventing or treating an ophthalmic disease or disorder, comprising the compound represented by Chemical Formula 1 above, an isomer, or a pharmaceutically acceptable salt thereof as an active ingredient.

According to even another aspect of the present invention, there is provided a health functional food for preventing or improving an ophthalmic disease or disorder, comprising the compound represented by Chemical Formula 1 above, an isomer, or a pharmaceutically acceptable salt thereof as an active ingredient.

According to further another aspect of the present invention, there is provided a method for preventing or treating a poly(ADP-ribose) polymerase-1 (PARP-1)-related disease, preferably an ophthalmic disease or disorder, comprising: administering a pharmaceutical composition or a health functional food composition comprising the compound represented by Chemical Formula 1 above or a pharmaceutically acceptable salt thereof, as an active ingredient, to a subject in need.

According to still further another aspect of the present invention, there is provided the use of a pharmaceutical composition or a health functional food composition comprising the compound represented by Chemical Formula 1 above or a pharmaceutically acceptable salt thereof, in the prevention or treatment of a poly(ADP-ribose) polymerase-1 (PARP-1)-related disease, preferably an ophthalmic disease or disorder.

Advantageous Effects

The isoquinolinone derivatives according to the present invention exhibit an excellent PARP-1 inhibitory effect at a concentration of nanomolar units, and further, exhibit an excellent cytoprotective effect (apoptosis inhibitory effect) on ophthalmic diseases or disorders, specifically retinal disorders, and thus can be effectively used as a pharmaceutical composition for preventing or treating PARP-1 related diseases, for example, ophthalmic diseases or disorders, which comprises the same as an active ingredient.

BRIEF DESCRIPTION OF DRAWING

FIG. 1 is an image showing the change in the thickness of the retinal layer of rats obtained by using "1500", after treatment of Example 46 or Example 1 (each with single intraperitoneal injection of 15 mg/kg) in 8-week-old rats.

DETAILED DESCRIPTION OF PREFERRED EMBODIMENTS

Hereinafter, the present invention will be described in detail.

The present invention provides a compound represented by Chemical Formula 1 below, a stereoisomer, or a pharmaceutically acceptable salt thereof:

[Chemical Formula 1]

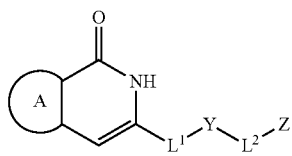

In Chemical Formula 1 above,

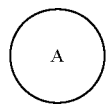

may be phenyl, or 5- to 6-membered heteroaryl containing one or more heteroatom selected from the group consisting of N, O, and S, wherein the phenyl or heteroaryl may be unsubstituted or substituted with halogen or straight or branched $C_{1-6}$ alkyl;

$L^1$ may be $C_{1-3}$ alkylene unsubstituted or substituted with oxo;

Y may be a 4- to 8-membered monocyclic or polycyclic heterocycloalkylene or heterocycloalkenylene containing one or more heteroatom selected from the group consisting of N, O, and S;

$L^2$ may be a single bond, —NHCO—, —NR²—, —O—, or straight or branched $C_{1-10}$ alkylene substituted with one or more substituents selected from the group consisting of oxo and amino, $R^2$ is hydrogen or $C_{1-6}$ alkyl; and Z may be —H, $C_{3-8}$ cycloalkyl, 5- to 8-membered heterocycloalkyl containing one or more heteroatom selected from the group consisting of N, O, and S, phenyl, or 5- to 8-membered heteroaryl containing one or more heteroatom selected from the group consisting of N, O, and S, wherein the cycloalkyl, heterocycloalkyl, phenyl, and heteroaryl may be each independently unsubstituted or substituted with one or more substituents selected from the group consisting of halogen, cyano, nitro, straight or branched $C_{1-6}$ alkyl unsubstituted or substituted with one or more halogen, straight or branched $C_{1-6}$ alkoxy unsubstituted or substituted with one or more halogen, $CO_2H$, $C_{1-6}$ alkoxycarbonyl, and $C_{1-6}$ alkylcarbonylamino.

In Chemical Formula 1 above,

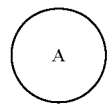

may be phenyl or pyridine, wherein the phenyl or pyridine may be unsubstituted or substituted with one or more halogen, and straight or branched $C_{1-6}$ alkyl.

In Chemical Formula 1 above,

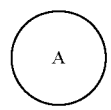

may be

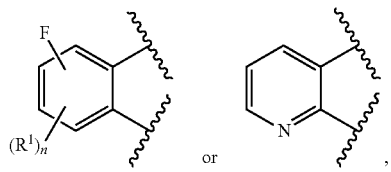

$R^1$ may be methyl, and n may be 0 or 1.

In Chemical Formula 1 above,

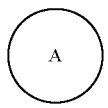

may be

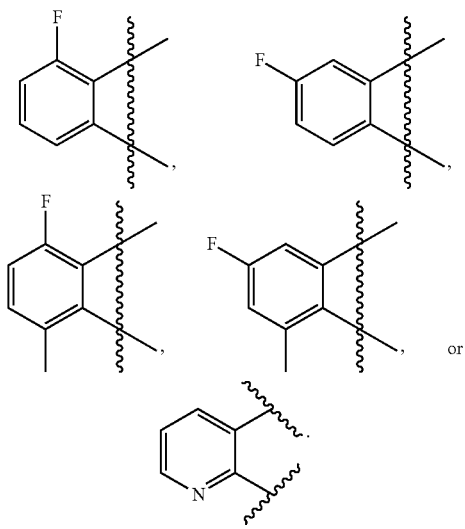

In Chemical Formula 1 above,

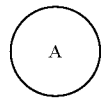

may be

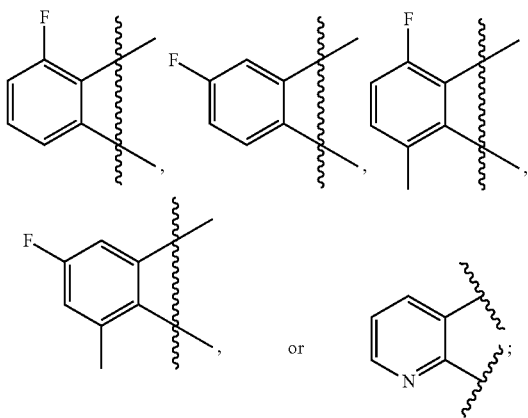

$L^1$ may be $C_3$ alkylene unsubstituted or substituted with one or more oxo;

Y may be a 4- to 8-membered monocyclic or bicyclic heterocycloalkylene containing one or two nitrogen atoms, or 6-membered monocyclic heterocycloalkenylene containing one nitrogen;

$L^2$ may be a single bond, —NHCO—, —NR²—, —O—, or straight or branched $C_{1-6}$ alkylene substituted with one or more substituents selected from the group consisting of oxo and amino, $R^2$ is hydrogen or methyl; and Z may be —H, $C_{3-6}$ cycloalkyl, 5- to 8-membered heterocycloalkyl containing one or more heteroatom selected from the group consisting of N and O, phenyl, or 5- to 8-membered heteroaryl containing one or more heteroatom selected from the group consisting of N and S, wherein the cycloalkyl, heterocycloalkyl, phenyl, and heteroaryl may be each independently unsubstituted or substituted with one or more substituents selected from the group consisting of —F, —Cl, cyano, nitro, straight or branched $C_{1-3}$ alkyl unsubstituted or substituted with one or more fluorine, straight or branched $C_{1-3}$ alkoxy unsubstituted or substituted with one or more fluorine, —CO₂H, $C_{1-3}$ alkoxycarbonyl, and $C_{1-3}$ alkylcarbonylamino.

In Chemical Formula 1 above,

may be

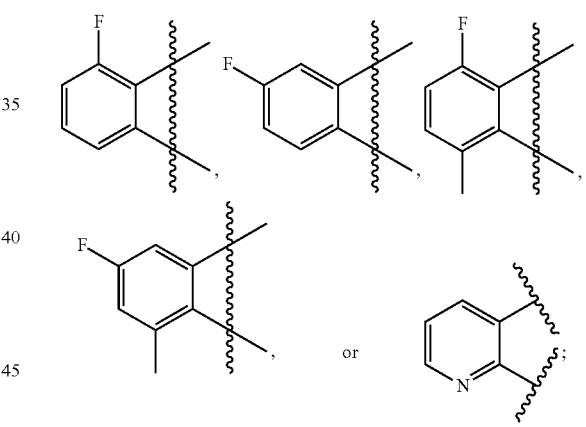

$L^1$ may be $C_3$ alkylene unsubstituted or substituted with one or more oxo;

Y may be a 4- to 6-membered monocyclic or 8-membered bicyclic heterocycloalkylene containing one or two nitrogen atoms, or 6-membered monocyclic heterocycloalkenylene containing one nitrogen;

$L^2$ may be a single bond, —NHCO—, —NR²—, —O—, or straight or branched $C_{1-4}$ alkylene substituted with one or more substituents selected from the group consisting of oxo and amino, $R^2$ is hydrogen or methyl; and Z may be H, $C_{3-6}$ cycloalkyl, heterocycloalkyl, which is tetrahydrofuranyl or pyrrolidinyl, phenyl, or heteroaryl selected from pyridyl, pyrimidyl, and thiazole; wherein the cycloalkyl, heterocycloalkyl, phenyl, and heteroaryl may be each independently unsubstituted or substituted with one or more substituents selected from the group consisting of —F, —Cl, cyano, nitro, methyl unsubstituted or substituted with one or more fluorine, methoxy substituted with one or more fluorine, carboxy (—CO$_2$H), methoxycarbonyl, and methylcarbonylamino.
In Chemical Formula 1 above,
may be
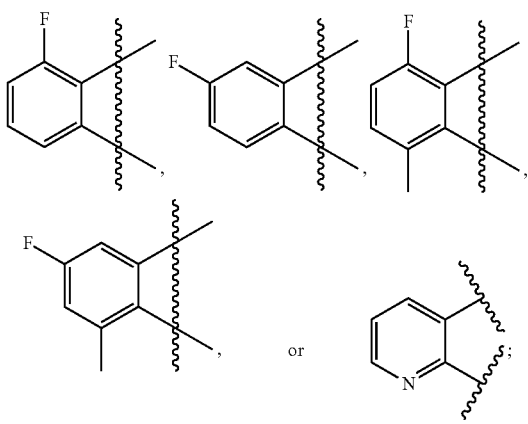
L$^1$ may be
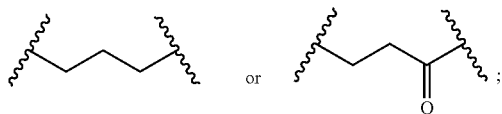 [SMILES: *CCC* ; *CCC(*)=O]
Y may be
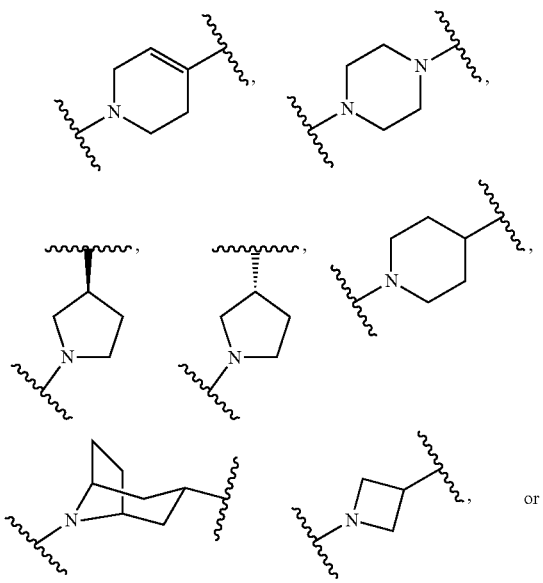
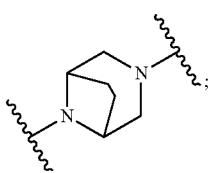
-continued
L$^2$ may be a single bond,
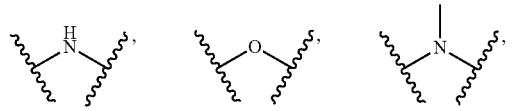
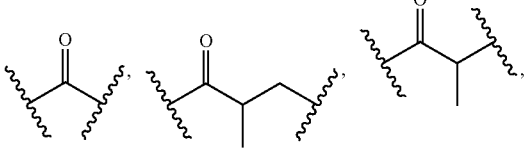
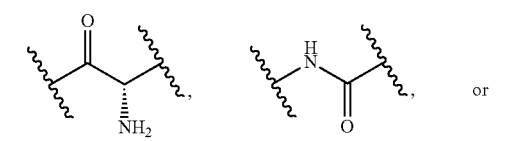
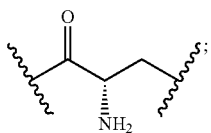
and
Z may be —H,
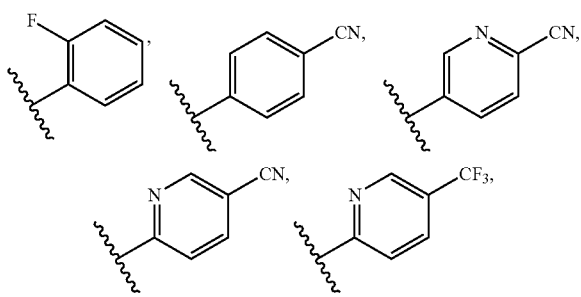
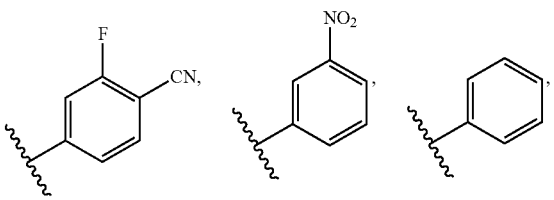
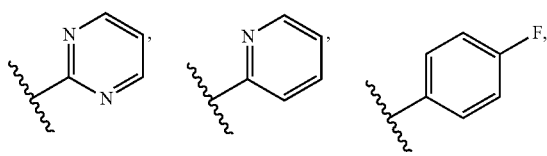

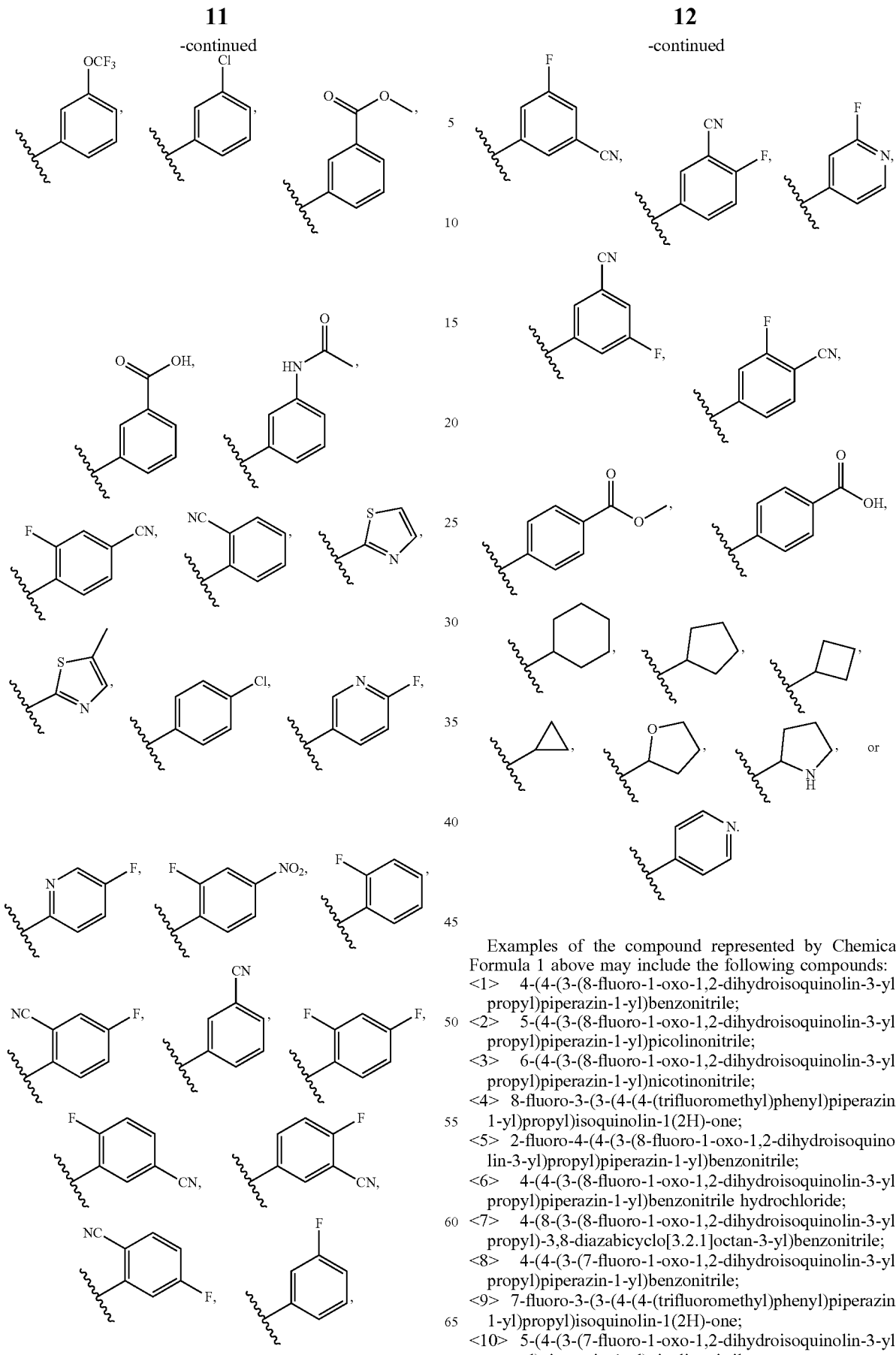

Examples of the compound represented by Chemical Formula 1 above may include the following compounds:
<1> 4-(4-(3-(8-fluoro-1-oxo-1,2-dihydroisoquinolin-3-yl)propyl)piperazin-1-yl)benzonitrile;
<2> 5-(4-(3-(8-fluoro-1-oxo-1,2-dihydroisoquinolin-3-yl)propyl)piperazin-1-yl)picolinonitrile;
<3> 6-(4-(3-(8-fluoro-1-oxo-1,2-dihydroisoquinolin-3-yl)propyl)piperazin-1-yl)nicotinonitrile;
<4> 8-fluoro-3-(3-(4-(4-(trifluoromethyl)phenyl)piperazin-1-yl)propyl)isoquinolin-1(2H)-one;
<5> 2-fluoro-4-(4-(3-(8-fluoro-1-oxo-1,2-dihydroisoquinolin-3-yl)propyl)piperazin-1-yl)benzonitrile;
<6> 4-(4-(3-(8-fluoro-1-oxo-1,2-dihydroisoquinolin-3-yl)propyl)piperazin-1-yl)benzonitrile hydrochloride;
<7> 4-(8-(3-(8-fluoro-1-oxo-1,2-dihydroisoquinolin-3-yl)propyl)-3,8-diazabicyclo[3.2.1]octan-3-yl)benzonitrile;
<8> 4-(4-(3-(7-fluoro-1-oxo-1,2-dihydroisoquinolin-3-yl)propyl)piperazin-1-yl)benzonitrile;
<9> 7-fluoro-3-(3-(4-(4-(trifluoromethyl)phenyl)piperazin-1-yl)propyl)isoquinolin-1(2H)-one;
<10> 5-(4-(3-(7-fluoro-1-oxo-1,2-dihydroisoquinolin-3-yl)propyl)piperazin-1-yl)picolinonitrile;

<11> 7-fluoro-3-(3-(4-(3-nitrophenyl)piperazin-1-yl)propyl)isoquinolin-1(2H)-one;
<12> 7-fluoro-3-(3-(4-phenylpiperazin-1-yl)propyl)isoquinolin-1(2H)-one;
<13> 7-fluoro-3-(3-(4-(pyrimidin-2-yl)piperazin-1-yl)propyl)isoquinolin-1(2H)-one;
<14> 7-fluoro-3-(3-(4-(pyridin-2-yl)piperazin-1-yl)propyl)isoquinolin-1(2H)-one;
<15> 7-fluoro-3-(3-(4-(4-fluorophenyl)piperazin-1-yl)propyl)isoquinolin-1(2H)-one;
<16> 7-fluoro-3-(3-(4-(3-(trifluoromethoxy)phenyl)piperazin-1-yl)propyl)isoquinolin-1 (2H)-one;
<17> 3-(3-(4-(3-chlorophenyl)piperazin-1-yl)propyl)-7-fluoroisoquinolin-1(2H)-one;
<18> methyl 3-(4-(3-(7-fluoro-1-oxo-1,2-dihydroisoquinolin-3-yl)propyl)piperazin-1-yl)benzoate;
<19> 3-(4-(3-(7-fluoro-1-oxo-1,2-dihydroisoquinolin-3-yl)propyl)piperazin-1-yl)benzoic acid;
<20> N-(3-(4-(3-(7-fluoro-1-oxo-1,2-dihydroisoquinolin-3-yl)propyl)piperazin-1-yl)phenyl)acetamide;
<21> 5-(4-(3-(8-fluoro-5-methyl-1-oxo-1,2-dihydroisoquinolin-3-yl)propyl)piperazin-1-yl)picolinonitrile;
<22> 6-(4-(3-(8-fluoro-5-methyl-1-oxo-1,2-dihydroisoquinolin-3-yl)propyl)piperazin-1-yl)nicotinonitrile;
<23> 4-(4-(3-(8-fluoro-5-methyl-1-oxo-1,2-dihydroisoquinolin-3-yl)propyl)piperazin-1-yl)benzonitrile;
<24> 8-fluoro-5-methyl-3-(3-(4-(pyridin-2-yl)piperazin-1-yl)propyl)isoquinolin-1(2H)-one;
<25> 8-fluoro-5-methyl-3-(3-(4-(pyrimidin-2-yl)piperazin-1-yl)propyl)isoquinolin-1(2H)-one;
<26> 3-fluoro-4-(4-(3-(8-fluoro-5-methyl-1-oxo-1,2-dihydroisoquinolin-3-yl)propyl)piperazin-1-yl)benzonitrile;
<27> 8-fluoro-5-methyl-3-(3-(4-(4-(trifluoromethyl)phenyl)piperazin-1-yl)propyl)isoquinolin-1(2H)-one;
<28> 2-(4-(3-(8-fluoro-5-methyl-1-oxo-1,2-dihydroisoquinolin-3-yl)propyl)piperazin-1-yl)benzonitrile;
<29> 8-fluoro-5-methyl-3-(3-(4-(thiazole-2-yl)piperazin-1-yl)propyl)isoquinolin-1(2H)-one;
<30> 8-fluoro-5-methyl-3-(3-(4-(5-methylthiazole-2-yl)piperazin-1-yl)propyl)isoquinolin-1(2H)-one;
<31> (R)-8-fluoro-3-(3-(3-(4-fluorophenyl)pyrrolidin-1-yl)propyl)-5-methylisoquinolin-1(2H)-one;
<32> (S)-8-fluoro-3-(3-(3-(4-fluorophenyl)pyrrolidin-1-yl)propyl)-5-methylisoquinolin-1(2H)-one;
<33> 3-(3-(4-(4-chlorophenyl)piperazin-1-yl)propyl)-8-fluoro-5-methylisoquinolin-1(2H)-one;
<34> 4-(4-(3-(7-fluoro-5-methyl-1-oxo-1,2-dihydroisoquinolin-3-yl)propyl)piperazin-1-yl)benzonitrile;
<35> 5-(4-(3-(7-fluoro-5-methyl-1-oxo-1,2-dihydroisoquinolin-3-yl)propyl)piperazin-1-yl)picolinonitrile;
<36> 6-(4-(3-(7-fluoro-5-methyl-1-oxo-1,2-dihydroisoquinolin-3-yl)propyl)piperazin-1-yl)nicotinonitrile;
<37> 3-fluoro-4-(4-(3-(7-fluoro-5-methyl-1-oxo-1,2-dihydroisoquinolin-3-yl)propyl)piperazin-1-yl)benzonitrile;
<38> 2-fluoro-4-(4-(3-(7-fluoro-5-methyl-1-oxo-1,2-dihydroisoquinolin-3-yl)propyl)piperazin-1-yl)benzonitrile;
<39> 7-fluoro-5-methyl-3-(3-(4-(4-(trifluoromethyl)phenyl)piperazin-1-yl)propyl)isoquinolin-1(2H)-one;
<40> 7-fluoro-3-(3-(4-(4-fluorophenyl)piperazin-1-yl)propyl)-5-methylisoquinolin-1(2H)-one;
<41> 4-(1-(3-(8-fluoro-1-oxo-1,2-dihydroisoquinolin-3-yl)propyl)-1,2,3,6-tetrahydropyridin-4-yl)benzonitrile;
<42> 8-fluoro-3-(3-(4-(4-fluorophenyl)-3,6-dihydropyridin-1(2H)-yl)propyl)isoquinolin-1(2H)-one;
<43> 8-fluoro-3-(3-(6-fluoro-3',6'-dihydro-[3,4'-bipyridine]-1'(2'H)-yl)propyl)isoquinolin-1(2H)-one;
<44> 8-fluoro-3-(3-(5-fluoro-3',6'-dihydro-[2,4'-bipyridine]-1'(2'H)-yl)propyl)isoquinolin-1(2H)-one;
<45> 8-fluoro-3-(3-(4-(4-(trifluoromethyl)phenyl)-3,6-dihydropyridin-1(2H)-yl)propyl)isoquinolin-1(2H)-one;
<46> 1'-(3-(8-fluoro-1-oxo-1,2-dihydroisoquinolin-3-yl)propyl)-1',2',3',6'-tetrahydro-[2,4'-bipyridine]-5-carbonitrile;
<47> 4-(1-(3-(7-fluoro-1-oxo-1,2-dihydroisoquinolin-3-yl)propyl)-1,2,3,6-tetrahydropyridin-4-yl)benzonitrile;
<48> 7-fluoro-3-(3-(4-(4-fluorophenyl)-3,6-dihydropyridin-1(2H)-yl)propyl)isoquinolin-1(2H)-one;
<49> 3-(3-(4-(4-chlorophenyl)-3,6-dihydropyridin-1(2H)-yl)propyl)-7-fluoroisoquinolin-1(2H)-one;
<50> 1'-(3-(7-fluoro-1-oxo-1,2-dihydroisoquinolin-3-yl)propyl)-1',2',3',6'-tetrahydro-[2,4'-bipyridine]-5-carbonitrile;
<51> 7-fluoro-3-(3-(4-(2-fluoro-4-nitrophenyl)-3,6-dihydropyridin-1(2H)-yl)propyl)isoquinolin-1(2H)-one;
<52> 2-fluoro-4-(1-(3-(7-fluoro-1-oxo-1,2-dihydroisoquinolin-3-yl)propyl)-1,2,3,6-tetrahydropyridin-4-yl)benzonitrile;
<53> 8-fluoro-3-(3-(4-(4-fluorophenyl)-3,6-dihydropyridin-1(2H)-yl)propyl)-5-methylisoquinolin-1(2H)-one;
<54> 4-(1-(3-(8-fluoro-5-methyl-1-oxo-1,2-dihydroisoquinolin-3-yl)propyl)-1,2,3,6-tetrahydropyridin-4-yl)benzonitrile;
<55> 2-fluoro-4-(1-(3-(8-fluoro-5-methyl-1-oxo-1,2-dihydroisoquinolin-3-yl)propyl)-1,2,3,6-tetrahydropyridin-4-yl)benzonitrile;
<56> 8-fluoro-3-(3-(4-(2-fluoro-4-nitrophenyl)-3,6-dihydropyridin-1(2H)-yl)propyl)-5-methylisoquinolin-1(2H)-one;
<57> 1'-(3-(8-fluoro-5-methyl-1-oxo-1,2-dihydroisoquinolin-3-yl)propyl)-1',2',3',6'-tetrahydro-[2,4'-bipyridine]-5-carbonitrile;
<58> 4-(1-(3-(7-fluoro-5-methyl-1-oxo-1,2-dihydroisoquinolin-3-yl)propyl)-1,2,3,6-tetrahydropyridin-4-yl)benzonitrile;
<59> 7-fluoro-3-(3-(4-(4-fluorophenyl)-3,6-dihydropyridin-1(2H)-yl)propyl)-5-methylisoquinolin-1(2H)-one;
<60> 1'-(3-(7-fluoro-5-methyl-1-oxo-1,2-dihydroisoquinolin-3-yl)propyl)-1',2',3',6'-tetrahydro-[2,4'-bipyridine]-5-carbonitrile;
<61> 1'-(3-(7-fluoro-5-methyl-1-oxo-1,2-dihydroisoquinolin-3-yl)propyl)-1',2',3',6'-tetrahydro-[3,4'-bipyridine]-6-carbonitrile;
<62> 7-fluoro-3-(3-(5-fluoro-3',6'-dihydro-[2,4'-bipyridine]-1'(2'H)-yl)propyl)-5-methylisoquinolin-1(2H)-one;
<63> 7-fluoro-3-(3-(6-fluoro-3',6'-dihydro-[3,4'-bipyridine]-1'(2'H)-yl)propyl)-5-methylisoquinolin-1(2H)-one;
<64> 7-fluoro-5-methyl-3-(3-(4-(4-(trifluoromethyl)phenyl)-3,6-dihydropyridin-1(2H)-yl)propyl)isoquinolin-1(2H)-one;
<65> 8-fluoro-3-(3-(4-(3-fluorobenzoyl)piperazin-1-yl)propyl)-5-methylisoquinolin-1(2H)-one;
<66> 3-(3-(4-benzoylpiperazin-1-yl)propyl)-8-fluoro-5-methylisoquinolin-1(2H)-one;
<67> 8-fluoro-3-(3-(4-(4-fluorobenzoyl)piperazin-1-yl)propyl)-5-methylisoquinolin-1(2H)-one;
<68> 4-(4-(3-(8-fluoro-1-oxo-1,2-dihydroisoquinolin-3-yl)propanoyl)piperazin-1-yl)benzonitrile;
<69> 4-(1-(3-(8-fluoro-1-oxo-1,2-dihydroisoquinolin-3-yl)propanoyl)-1,2,3,6-tetrahydropyridin-4-yl)benzonitrile;
<70> 5-(4-(3-(8-fluoro-1-oxo-1,2-dihydroisoquinolin-3-yl)propanoyl)piperazin-1-yl)picolinonitrile;
<71> 6-(4-(3-(8-fluoro-1-oxo-1,2-dihydroisoquinolin-3-yl)propanoyl)piperazin-1-yl)nicotinonitrile;

<72> 2-fluoro-4-(4-(3-(8-fluoro-1-oxo-1,2-dihydroisoquinolin-3-yl)propanoyl)piperazin-1-yl)benzonitrile;
<73> 3-fluoro-4-(4-(3-(8-fluoro-1-oxo-1,2-dihydroisoquinolin-3-yl)propanoyl)piperazin-1-yl)benzonitrile;
<74> 2-(4-(3-(8-fluoro-1-oxo-1,2-dihydroisoquinolin-3-yl)propanoyl)piperazin-1-yl)benzonitrile;
<75> 8-fluoro-3-(3-(4-(2-fluorophenyl)piperazin-1-yl)-3-oxopropyl)isoquinolin-1(2H)-one;
<76> 5-fluoro-2-(4-(3-(8-fluoro-1-oxo-1,2-dihydroisoquinolin-3-yl)propanoyl)piperazin-1-yl)benzonitrile;
<77> 3-(4-(3-(8-fluoro-1-oxo-1,2-dihydroisoquinolin-3-yl)propanoyl)piperazin-1-yl)benzonitrile;
<78> 3-(3-(4-(2,4-difluorophenyl)piperazin-1-yl)-3-oxopropyl)-8-fluoroisoquinolin-1(2H)-one;
<79> 4-fluoro-3-(4-(3-(8-fluoro-1-oxo-1,2-dihydroisoquinolin-3-yl)propanoyl)piperazin-1-yl)benzonitrile;
<80> 2-fluoro-5-(4-(3-(8-fluoro-1-oxo-1,2-dihydroisoquinolin-3-yl)propanoyl)piperazin-1-yl)benzonitrile;
<81> 4-fluoro-2-(4-(3-(8-fluoro-1-oxo-1,2-dihydroisoquinolin-3-yl)propanoyl)piperazin-1-yl)benzonitrile;
<82> 8-fluoro-3-(3-(4-(2-fluorophenyl)-3,6-dihydropyridin-1(2H)-yl)-3-oxopropyl)isoquinolin-1(2H)-one;
<83> 8-fluoro-3-(3-(4-(3-fluorophenyl)-3,6-dihydropyridin-1(2H)-yl)-3-oxopropyl)isoquinolin-1(2H)-one;
<84> 3-fluoro-5-(1-(3-(8-fluoro-1-oxo-1,2-dihydroisoquinolin-3-yl)propanoyl)-1,2,3,6-tetrahydropyridin-4-yl)benzonitrile;
<85> 8-fluoro-3-(3-(6-fluoro-3',6'-dihydro-[3,4'-bipyridine]-1'(2'H)-yl)-3-oxopropyl)isoquinolin-1(2H)-one;
<86> 8-fluoro-3-(3-(5-fluoro-3',6'-dihydro-[2,4'-bipyridine]-1'(2'H)-yl)-3-oxopropyl)isoquinolin-1(2H)-one;
<87> 2-fluoro-5-(1-(3-(8-fluoro-1-oxo-1,2-dihydroisoquinolin-3-yl)propanoyl)-1,2,3,6-tetrahydropyridin-4-yl)benzonitrile;
<88> 1'-(3-(8-fluoro-1-oxo-1,2-dihydroisoquinolin-3-yl)propanoyl)-1',2',3',6'-tetrahydro-[2,4'-bipyridine]-5-carbonitrile;
<89> 8-fluoro-3-(3-(4-(3-fluorophenyl)piperazin-1-yl)-3-oxopropyl)isoquinolin-1(2H)-one;
<90> 2-fluoro-5-(4-(3-(8-fluoro-1-oxo-1,2-dihydroisoquinolin-3-yl)propanoyl)piperazin-1-yl)benzonitrile;
<91> 4-(4-(3-(8-fluoro-1-oxo-1,2-dihydroisoquinolin-3-yl)propanoyl)piperazin-1-yl)benzonitrile hydrochloride;
<92> 8-fluoro-3-(3-(2'-fluoro-3,6-dihydro-[4,4'-bipyridine]-1(2H)-yl)-3-oxopropyl)isoquinolin-1(2H)-one;
<93> 1'-(3-(8-fluoro-1-oxo-1,2-dihydroisoquinolin-3-yl)propanoyl)-1',2',3',6'-tetrahydro-[3,4'-bipyridine]-6-carbonitrile;
<94> 4-(4-(3-(7-fluoro-1-oxo-1,2-dihydroisoquinolin-3-yl)propanoyl)piperazin-1-yl)benzonitrile;
<95> 4-(1-(3-(7-fluoro-1-oxo-1,2-dihydroisoquinolin-3-yl)propanoyl)-1,2,3,6-tetrahydropyridin-4-yl)benzonitrile;
<96> 1'-(3-(7-fluoro-1-oxo-1,2-dihydroisoquinolin-3-yl)propanoyl)-1',2',3',6'-tetrahydro-[2,4'-bipyridine]-5-carbonitrile;
<97> 5-(4-(3-(7-fluoro-1-oxo-1,2-dihydroisoquinolin-3-yl)propanoyl)piperazin-1-yl)picolinonitrile;
<98> 2-(4-(3-(7-fluoro-1-oxo-1,2-dihydroisoquinolin-3-yl)propanoyl)piperazin-1-yl)benzonitrile;
<99> 6-(4-(3-(7-fluoro-1-oxo-1,2-dihydroisoquinolin-3-yl)propanoyl)piperazin-1-yl)nicotinonitrile;
<100> 3-fluoro-4-(4-(3-(7-fluoro-1-oxo-1,2-dihydroisoquinolin-3-yl)propanoyl)piperazin-1-yl)benzonitrile;
<101> 2-fluoro-4-(4-(3-(7-fluoro-1-oxo-1,2-dihydroisoquinolin-3-yl)propanoyl)piperazin-1-yl)benzonitrile;
<102> 7-fluoro-3-(3-(6-fluoro-3',6'-dihydro-[3,4'-bipyridine]-1'(2'H)-yl)-3-oxopropyl)isoquinolin-1(2H)-one;
<103> 7-fluoro-3-(3-(5-fluoro-3',6'-dihydro-[2,4'-bipyridine]-1'(2'H)-yl)-3-oxopropyl)isoquinolin-1(2H)-one;
<104> 7-fluoro-3-(3-(4-(4-fluorophenyl)-3,6-dihydropyridin-1(2H)-yl)-3-oxopropyl)isoquinolin-1(2H)-one;
<105> 3-(3-(4-(4-chlorophenyl)piperazin-1-yl)-3-oxopropyl)-7-fluoroisoquinolin-1(2H)-one;
<106> 3-(3-(4-(2,4-difluorophenyl)piperazin-1-yl)-3-oxopropyl)-7-fluoroisoquinolin-1(2H)-one;
<107> 4-fluoro-3-(4-(3-(7-fluoro-1-oxo-1,2-dihydroisoquinolin-3-yl)propanoyl)piperazin-1-yl)benzonitrile;
<108> 4-fluoro-2-(4-(3-(7-fluoro-1-oxo-1,2-dihydroisoquinolin-3-yl)propanoyl)piperazin-1-yl)benzonitrile;
<109> 2-fluoro-5-(4-(3-(7-fluoro-1-oxo-1,2-dihydroisoquinolin-3-yl)propanoyl)piperazin-1-yl)benzonitrile;
<110> 5-fluoro-2-(4-(3-(7-fluoro-1-oxo-1,2-dihydroisoquinolin-3-yl)propanoyl)piperazin-1-yl)benzonitrile;
<111> 4-fluoro-3-(1-(3-(7-fluoro-1-oxo-1,2-dihydroisoquinolin-3-yl)propanoyl)-1,2,3,6-tetrahydropyridin-4-yl)benzonitrile;
<112> 5-fluoro-2-(1-(3-(7-fluoro-1-oxo-1,2-dihydroisoquinolin-3-yl)propanoyl)-1,2,3,6-tetrahydropyridin-4-yl)benzonitrile;
<113> 3-(3-(4-(2,4-difluorophenyl)-3,6-dihydropyridin-1(2H)-yl)-3-oxopropyl)-7-fluoroisoquinolin-1(2H)-one;
<114> 3-fluoro-5-(1-(3-(7-fluoro-1-oxo-1,2-dihydroisoquinolin-3-yl)propanoyl)-1,2,3,6-tetrahydropyridin-4-yl)benzonitrile;
<115> 7-fluoro-3-(3-(4-(3-fluorophenyl)-3,6-dihydropyridin-1(2H)-yl)-3-oxopropyl)isoquinolin-1(2H)-one;
<116> (R)-7-fluoro-3-(3-(3-(4-fluorophenyl)pyrrolidin-1-yl)-3-oxopropyl)isoquinolin-1(2H)-one;
<117> (S)-7-fluoro-3-(3-(3-(4-fluorophenyl)pyrrolidin-1-yl)-3-oxopropyl)isoquinolin-1(2H)-one;
<118> 7-fluoro-3-(3-oxo-3-(4-(4-(trifluoromethyl)phenyl)piperazin-1-yl)propyl)isoquinolin-1(2H)-one;
<119> 3-fluoro-5-(4-(3-(7-fluoro-1-oxo-1,2-dihydroisoquinolin-3-yl)propanoyl)piperazin-1-yl)benzonitrile;
<120> 7-fluoro-3-(3-(4-(3-fluorophenyl)piperazin-1-yl)-3-oxopropyl)isoquinolin-1(2H)-one;
<121> 7-fluoro-3-(3-(2'-fluoro-3,6-dihydro-[4,4'-bipyridine]-1(2H)-yl)-3-oxopropyl)isoquinolin-1(2H)-one;
<122> 4-(4-(3-(8-fluoro-5-methyl-1-oxo-1,2-dihydroisoquinolin-3-yl)propanoyl)piperazin-1-yl)benzonitrile;
<123> 6-(4-(3-(8-fluoro-5-methyl-1-oxo-1,2-dihydroisoquinolin-3-yl)propanoyl)piperazin-1-yl)nicotinonitrile;
<124> 5-(4-(3-(8-fluoro-5-methyl-1-oxo-1,2-dihydroisoquinolin-3-yl)propanoyl)piperazin-1-yl)picolinonitrile;
<125> 8-fluoro-3-(3-(4-(4-fluorophenyl)-3,6-dihydropyridin-1(2H)-yl)-3-oxopropyl)-5-methylisoquinolin-1(2H)-one;
<126> 2-fluoro-4-(4-(3-(8-fluoro-5-methyl-1-oxo-1,2-dihydroisoquinolin-3-yl)propanoyl)piperazin-1-yl)benzonitrile;
<127> 2-(4-(3-(8-fluoro-5-methyl-1-oxo-1,2-dihydroisoquinolin-3-yl)propanoyl)piperazin-1-yl)benzonitrile;
<128> 3-fluoro-4-(4-(3-(8-fluoro-5-methyl-1-oxo-1,2-dihydroisoquinolin-3-yl)propanoyl)piperazin-1-yl)benzonitrile;
<129> 8-fluoro-3-(3-(6-fluoro-3',6'-dihydro-[3,4'-bipyridine]-1'(2'H)-yl)-3-oxopropyl)-5-methylisoquinolin-1(2H)-one;
<130> 8-fluoro-3-(3-(5-fluoro-3',6'-dihydro-[2,4'-bipyridine]-1'(2'H)-yl)-3-oxopropyl)-5-methylisoquinolin-1(2H)-one;
<131> 3-(3-(4-(4-chlorophenyl)piperazin-1-yl)-3-oxopropyl)-8-fluoro-5-methylisoquinolin-1(2H)-one;

<132> 3-(3-(4-(2,4-difluorophenyl)piperazin-1-yl)-3-oxopropyl)-8-fluoro-5-methylisoquinolin-1(2H)-one;
<133> 4-fluoro-3-(4-(3-(8-fluoro-5-methyl-1-oxo-1,2-dihydroisoquinolin-3-yl)propanoyl)piperazin-1-yl)benzonitrile;
<134> 4-fluoro-2-(4-(3-(8-fluoro-5-methyl-1-oxo-1,2-dihydroisoquinolin-3-yl)propanoyl)piperazin-1-yl)benzonitrile;
<135> 2-fluoro-5-(4-(3-(8-fluoro-5-methyl-1-oxo-1,2-dihydroisoquinolin-3-yl)propanoyl)piperazin-1-yl)benzonitrile;
<136> 5-fluoro-2-(4-(3-(8-fluoro-5-methyl-1-oxo-1,2-dihydroisoquinolin-3-yl)propanoyl)piperazin-1-yl)benzonitrile;
<137> 4-fluoro-3-(1-(3-(8-fluoro-5-methyl-1-oxo-1,2-dihydroisoquinolin-3-yl)propanoyl)-1,2,3,6-tetrahydropyridin-4-yl)benzonitrile;
<138> 8-fluoro-3-(3-(4-(2-fluorophenyl)-3,6-dihydropyridin-1(2H)-yl)-3-oxopropyl)-5-methylisoquinolin-1(2H)-one;
<139> 2-fluoro-5-(1-(3-(8-fluoro-5-methyl-1-oxo-1,2-dihydroisoquinolin-3-yl)propanoyl)-1,2,3,6-tetrahydropyridin-4-yl)benzonitrile;
<140> 1'-(3-(8-fluoro-5-methyl-1-oxo-1,2-dihydroisoquinolin-3-yl)propanoyl)-1',2',3',6'-tetrahydro-[2,4'-bipyridine]-5-carbonitrile;
<141> 2-fluoro-4-(1-(3-(8-fluoro-5-methyl-1-oxo-1,2-dihydroisoquinolin-3-yl)propanoyl)-1,2,3,6-tetrahydropyridin-4-yl)benzonitrile;
<142> 8-fluoro-3-(3-(4-(3-fluorophenyl)piperazin-1-yl)-3-oxopropyl)-5-methylisoquinolin-1(2H)-one;
<143> 2-fluoro-5-(4-(3-(8-fluoro-5-methyl-1-oxo-1,2-dihydroisoquinolin-3-yl)propanoyl)piperazin-1-yl)benzonitrile;
<144> 8-fluoro-3-(3-(2'-fluoro-3,6-dihydro-[4,4'-bipyridine]-1(2H)-yl)-3-oxopropyl)-5-methylisoquinolin-1(2H)-one;
<145> 1'-(3-(8-fluoro-5-methyl-1-oxo-1,2-dihydroisoquinolin-3-yl)propanoyl)-1',2',3',6'-tetrahydro-[3,4'-bipyridine]-6-carbonitrile;
<146> methyl 4-(4-(3-(8-fluoro-5-methyl-1-oxo-1,2-dihydroisoquinolin-3-yl)propanoyl)piperazin-1-yl)benzoate;
<147> 4-(4-(3-(8-fluoro-5-methyl-1-oxo-1,2-dihydroisoquinolin-3-yl)propanoyl)piperazin-1-yl)benzoic acid;
<148> 4-(8-(3-(8-fluoro-5-methyl-1-oxo-1,2-dihydroisoquinolin-3-yl)propanoyl)-3,8-diazabicyclo[3.2.1]octan-3-yl)benzonitrile;
<149> 4-(4-(3-(7-fluoro-5-methyl-1-oxo-1,2-dihydroisoquinolin-3-yl)propanoyl)piperazin-1-yl)benzonitrile;
<150> 7-fluoro-3-(3-(4-(4-fluorophenyl)-3,6-dihydropyridin-1(2H)-yl)-3-oxopropyl)-5-methylisoquinolin-1(2H)-one;
<151> 5-(4-(3-(7-fluoro-5-methyl-1-oxo-1,2-dihydroisoquinolin-3-yl)propanoyl)piperazin-1-yl)picolinonitrile;
<152> 6-(4-(3-(7-fluoro-5-methyl-1-oxo-1,2-dihydroisoquinolin-3-yl)propanoyl)piperazin-1-yl)nicotinonitrile;
<153> 2-fluoro-4-(4-(3-(7-fluoro-5-methyl-1-oxo-1,2-dihydroisoquinolin-3-yl)propanoyl)piperazin-1-yl)benzonitrile;
<154> 3-fluoro-4-(4-(3-(7-fluoro-5-methyl-1-oxo-1,2-dihydroisoquinolin-3-yl)propanoyl)piperazin-1-yl)benzonitrile;
<155> 3-(3-(4-(4-chlorophenyl)piperazin-1-yl)-3-oxopropyl)-7-fluoro-5-methylisoquinolin-1(2H)-one;
<156> 4-fluoro-3-(4-(3-(7-fluoro-5-methyl-1-oxo-1,2-dihydroisoquinolin-3-yl)propanoyl)piperazin-1-yl)benzonitrile;
<157> 4-fluoro-2-(4-(3-(7-fluoro-5-methyl-1-oxo-1,2-dihydroisoquinolin-3-yl)propanoyl)piperazin-1-yl)benzonitrile;
<158> 2-fluoro-5-(4-(3-(7-fluoro-5-methyl-1-oxo-1,2-dihydroisoquinolin-3-yl)propanoyl)piperazin-1-yl)benzonitrile;
<159> 5-fluoro-2-(4-(3-(7-fluoro-5-methyl-1-oxo-1,2-dihydroisoquinolin-3-yl)propanoyl)piperazin-1-yl)benzonitrile;
<160> 4-fluoro-3-(1-(3-(7-fluoro-5-methyl-1-oxo-1,2-dihydroisoquinolin-3-yl)propanoyl)-1,2,3,6-tetrahydropyridin-4-yl)benzonitrile;
<161> 5-fluoro-2-(1-(3-(7-fluoro-5-methyl-1-oxo-1,2-dihydroisoquinolin-3-yl)propanoyl)-1,2,3,6-tetrahydropyridin-4-yl)benzonitrile;
<162> 3-(3-(4-(2,4-difluorophenyl)-3,6-dihydropyridin-1(2H)-yl)-3-oxopropyl)-7-fluoro-5-methylisoquinolin-1(2H)-one;
<163> 3-fluoro-5-(1-(3-(7-fluoro-5-methyl-1-oxo-1,2-dihydroisoquinolin-3-yl)propanoyl)-1,2,3,6-tetrahydropyridin-4-yl)benzonitrile;
<164> 7-fluoro-3-(3-(4-(3-fluorophenyl)-3,6-dihydropyridin-1(2H)-yl)-3-oxopropyl)-5-methylisoquinolin-1(2H)-one;
<165> 1'-(3-(7-fluoro-5-methyl-1-oxo-1,2-dihydroisoquinolin-3-yl)propanoyl)-1',2',3',6'-tetrahydro-[2,4'-bipyridine]-5-carbonitrile;
<166> 3-fluoro-5-(4-(3-(7-fluoro-5-methyl-1-oxo-1,2-dihydroisoquinolin-3-yl)propanoyl)piperazin-1-yl)benzonitrile;
<167> 7-fluoro-3-(3-(4-(3-fluorophenyl)piperazin-1-yl)-3-oxopropyl)-5-methylisoquinolin-1(2H)-one;
<168> 7-fluoro-3-(3-(2'-fluoro-3,6-dihydro-[4,4'-bipyridine]-1(2H)-yl)-3-oxopropyl)-5-methylisoquinolin-1(2H)-one;
<169> 5-(4-(3-(7-fluoro-5-methyl-1-oxo-1,2-dihydroisoquinolin-3-yl)propanoyl)piperazin-1-yl)picolinonitrile dihydrochloride;
<170> 3-(3-(4-(cyclohexanecarbonyl)piperazin-1-yl)-3-oxopropyl)-8-fluoroisoquinolin-1(2H)-one;
<171> 3-(3-(4-(cyclohexanecarbonyl)piperazin-1-yl)-3-oxopropyl)-8-fluoro-5-methylisoquinolin-1(2H)-one;
<172> 3-(3-(4-(cyclohexanecarbonyl)piperazin-1-yl)-3-oxopropyl)-7-fluoroisoquinolin-1(2H)-one;
<173> 3-(3-(4-(cyclohexanecarbonyl)piperazin-1-yl)-3-oxopropyl)-7-fluoro-5-methylisoquinolin-1(2H)-one;
<174> 3-(3-(4-(cyclopentanecarbonyl)piperazin-1-yl)-3-oxopropyl)-8-fluoroisoquinolin-1(2H)-one;
<175> 3-(3-(4-(cyclopentanecarbonyl)piperazin-1-yl)-3-oxopropyl)-8-fluoro-5-methylisoquinolin-1(2H)-one;
<176> 3-(3-(4-(cyclopentanecarbonyl)piperazin-1-yl)-3-oxopropyl)-7-fluoroisoquinolin-1(2H)-one;
<177> 3-(3-(4-(cyclopentanecarbonyl)piperazin-1-yl)-3-oxopropyl)-7-fluoro-5-methylisoquinolin-1(2H)-one;
<178> 3-(3-(4-(cyclobutanecarbonyl)piperazin-1-yl)-3-oxopropyl)-8-fluoroisoquinolin-1(2H)-one;
<179> 3-(3-(4-(cyclobutanecarbonyl)piperazin-1-yl)-3-oxopropyl)-8-fluoro-5-methylisoquinolin-1(2H)-one;
<180> 3-(3-(4-(cyclobutanecarbonyl)piperazin-1-yl)-3-oxopropyl)-7-fluoroisoquinolin-1(2H)-one;
<181> 3-(3-(4-(cyclobutanecarbonyl)piperazin-1-yl)-3-oxopropyl)-7-fluoro-5-methylisoquinolin-1(2H)-one;
<182> 3-(3-(4-(cyclopropanecarbonyl)piperazin-1-yl)-3-oxopropyl)-8-fluoroisoquinolin-1(2H)-one;
<183> 3-(3-(4-(cyclopropanecarbonyl)piperazin-1-yl)-3-oxopropyl)-8-fluoro-5-methylisoquinolin-1(2H)-one;

<184> 3-(3-(4-(cyclopropanecarbonyl)piperazin-1-yl)-3-oxopropyl)-7-fluoroisoquinolin-1(2H)-one;
<185> 3-(3-(4-(cyclopropanecarbonyl)piperazin-1-yl)-3-oxopropyl)-7-fluoro-5-methylisoquinolin-1(2H)-one;
<186> 8-fluoro-3-(3-(4-isobutyrylpiperazin-1-yl)-3-oxopropyl)isoquinolin-1(2H)-one;
<187> 8-fluoro-3-(3-(4-isobutyrylpiperazin-1-yl)-3-oxopropyl)-5-methylisoquinolin-1(2H)-one;
<188> 7-fluoro-3-(3-(4-isobutyrylpiperazin-1-yl)-3-oxopropyl)isoquinolin-1(2H)-one;
<189> 7-fluoro-3-(3-(4-isobutyrylpiperazin-1-yl)-3-oxopropyl)-5-methylisoquinolin-1(2H)-one;
<190> 8-fluoro-3-(3-oxo-3-(4-(tetrahydrofuran-2-carbonyl)piperazin-1-yl)propyl)isoquinolin-1(2H)-one;
<191> 8-fluoro-5-methyl-3-(3-oxo-3-(4-(tetrahydrofuran-2-carbonyl)piperazin-1-yl)propyl)isoquinolin-1(2H)-one;
<192> 7-fluoro-3-(3-oxo-3-(4-(tetrahydrofuran-2-carbonyl)piperazin-1-yl)propyl)isoquinolin-1(2H)-one;
<193> 7-fluoro-5-methyl-3-(3-oxo-3-(4-(tetrahydrofuran-2-carbonyl)piperazin-1-yl)propyl)isoquinolin-1(2H)-one;
<194> 3-(3-(4-(L-alanyl)piperazin-1-yl)-3-oxopropyl)-8-fluoro-5-methylisoquinolin-1(2H)-one hydrochloride;
<195> 3-(3-(4-L-phenylalanyl)piperazin-1-yl)-3-oxopropyl)-8-fluoro-5-methylisoquinolin-1(2H)-one hydrochloride;
<196> 8-fluoro-5-methyl-3-(3-oxo-3-(4-propylpiperazin-1-yl)propyl)isoquinolin-1(2H)-one hydrochloride;
<197> 4-(8-(3-(8-fluoro-5-methyl-1-oxo-1,2-dihydroisoquinolin-3-yl)propyl-3,8-diazabicyclo[3.2.1]octan-3-yl)benzonitrile;
<198> 8-fluoro-3-(3-(3-(4-fluorophenyl)-3,8-diazabicyclo[3.2.1]octan-8-yl)propyl)-5-methylisoquinolin-1(2H)-one;
<199> 6-(8-(3-(8-fluoro-5-methyl-1-oxo-1,2-dihydroisoquinolin-3-yl)propyl-3,8-diazabicyclo[3.2.1]octan-3-yl)nicotinonitrile;
<200> 5-(8-(3-(8-fluoro-5-methyl-1-oxo-1,2-dihydroisoquinolin-3-yl)propyl)-3,8-diazabicyclo[3.2.1]octan-3-yl)picolinonitrile;
<201> 3-(3-(3-(4-chlorophenyl)-3,8-diazabicyclo[3.2.1]octan-8-yl)propyl)-8-fluoro-5-methylisoquinolin-1(2H)-one;
<202> 8-fluoro-3-(3-(3-(6-fluoropyridin-3-yl)-3,8-diazabicyclo[3.2.1]octan-8-yl)propyl)-5-methylisoquinolin-1(2H)-one;
<203> 6-(8-(3-(8-fluoro-1-oxo-1,2-dihydroisoquinolin-3-yl)propyl)-3,8-diazabicyclo[3.2.1]octan-3-yl)nicotinonitrile;
<204> 6-(8-(3-(7-fluoro-1-oxo-1,2-dihydroisoquinolin-3-yl)propyl)-3,8-diazabicyclo[3.2.1]octan-3-yl)nicotinonitrile;
<205> 6-(8-(3-(7-fluoro-5-methyl-1-oxo-1,2-dihydroisoquinolin-3-yl)propyl)-3,8-diazabicyclo[3.2.1]octan-3-yl)nicotinonitrile;
<206> 6-(8-(3-(8-fluoro-1-oxo-1,2-dihydroisoquinolin-3-yl)propanoyl)-3,8-diazabicyclo[3.2.1]octan-3-yl)nicotinonitrile;
<207> 6-(8-(3-(8-fluoro-5-methyl-1-oxo-1,2-dihydroisoquinolin-3-yl)propanoyl)-3,8-diazabicyclo[3.2.1]octan-3-yl)nicotinonitrile;
<208> 8-fluoro-3-(3-(3-(4-fluorophenyl)-3,8-diazabicyclo[3.2.1]octan-8-yl)-3-oxopropyl)-5-methylisoquinolin-1(2H)-one;
<209> 4-(8-(3-(8-fluoro-5-methyl-1-oxo-1,2-dihydroisoquinolin-3-yl)propanoyl)-3,8-diazabicyclo[3.2.1]octan-3-yl)benzonitrile;
<210> 3-(3-(3-(4-chlorophenyl)-3,8-diazabicyclo[3.2.1]octan-8-yl)-3-oxopropyl)-8-fluoro-5-methylisoquinolin-1(2H)-one;
<211> 8-fluoro-3-(3-(3-(6-fluoropyridin-3-yl)-3,8-diazabicyclo[3.2.1]octan-8-yl)-3-oxopropyl)-5-methylisoquinolin-1(2H)-one;
<212> 8-fluoro-3-(3-(3-(5-fluoropyridin-2-yl)-3,8-diazabicyclo[3.2.1]octan-8-yl)-3-oxopropyl)-5-methylisoquinolin-1(2H)-one;
<213> 4-(8-(3-(7-fluoro-5-methyl-1-oxo-1,2-dihydroisoquinolin-3-yl)propanoyl)-3,8-diazabicyclo[3.2.1]octan-3-yl)benzonitrile;
<214> 6-(8-(3-(7-fluoro-5-methyl-1-oxo-1,2-dihydroisoquinolin-3-yl)propanoyl)-3,8-diazabicyclo[3.2.1]octan-3-yl)nicotinonitrile;
<215> 7-fluoro-3-(3-(3-(4-fluorophenyl)-3,8-diazabicyclo[3.2.1]octan-8-yl)-3-oxopropyl)-5-methylisoquinolin-1(2H)-one;
<216> 3-(3-(3-(4-chlorophenyl)-3,8-diazabicyclo[3.2.1]octan-8-yl)-3-oxopropyl)-7-fluoro-5-methylisoquinolin-1(2H)-one;
<217> 7-fluoro-3-(3-(3-(6-fluoropyridin-3-yl)-3,8-diazabicyclo[3.2.1]octan-8-yl)-3-oxopropyl)-5-methylisoquinolin-1(2H)-one;
<218> 6-(8-(3-(7-fluoro-5-methyl-1-oxo-1,2-dihydroisoquinolin-3-yl)propanoyl)-3,8-diazabicyclo[3.2.1]octan-3-yl)nicotinonitrile;
<219> 7-fluoro-3-(3-(3-(5-fluoropyridin-2-yl)-3,8-diazabicyclo[3.2.1]octan-8-yl)-3-oxopropyl)-5-methylisoquinolin-1(2H)-one;
<220> 6-(8-(3-(7-fluoro-1-oxo-1,2-dihydroisoquinolin-3-yl)propanoyl)-3,8-diazabicyclo[3.2.1]octan-3-yl)nicotinonitrile;
<221> 4-(4-(3-(5-oxo-5,6-dihydro-1,6-naphthyridin-7-yl)propyl)piperazin-1-yl)benzonitrile;
<222> 6-(4-(3-(5-oxo-5,6-dihydro-1,6-naphthyridin-7-yl)propyl)piperazin-1-yl)nicotinonitrile;
<223> 7-(3-(4-(4-fluorophenyl)piperazin-1-yl)propyl)-1,6-naphthyridin-5(6H)-one;
<224> 7-(3-(4-(3-fluorophenyl)piperazin-1-yl)propyl)-1,6-naphthyridin-5(6H)-one;
<225> 4-(8-(3-(5-oxo-5,6-dihydro-1,6-naphthyridin-7-yl)propyl)-3,8-diazabicyclo[3.2.1]octan-3-yl)benzonitrile;
<226> 5-(4-(3-(5-oxo-5,6-dihydro-1,6-naphthyridin-7-yl)propyl)piperazin-1-yl)picolinonitrile;
<227> 7-(3-(4-(2-fluoropyridin-4-yl)piperazin-1-yl)propyl)-1,6-naphthyridin-5(6H)-one;
<228> 7-(3-(3-(4-chlorophenyl)-3,8-diazabicyclo[3.2.1]octan-8-yl)propyl)-1,6-naphthyridin-5(6H)-one;
<229> 5-(8-(3-(5-oxo-5,6-dihydro-1,6-naphthyridin-7-yl)propyl)-3,8-diazabicyclo[3.2.1]octan-3-yl)picolinonitrile;
<230> 7-(3-(3-(4-fluorophenyl)-3,8-diazabicyclo[3.2.1]octan-8-yl)propyl-1,6-naphthyridin-5(6H)-one;
<231> 7-(3-(3-(5-fluoropyridin-2-yl)-3,8-diazabicyclo[3.2.1]octan-8-yl)propyl)-1,6-naphthyridin-5(6H)-one;
<232> 6-(8-(3-(5-oxo-5,6-dihydro-1,6-naphthyridin-7-yl)propyl)-3,8-diazabicyclo[3.2.1]octan-3-yl)nicotinonitrile;
<233> 7-(3-(3-(6-fluoropyridin-3-yl)-3,8-diazabicyclo[3.2.1]octan-8-yl)propyl)-1,6-naphthyridin-5(6H)-one;
<234> 1'-(3-(5-oxo-5,6-dihydro-1,6-naphthyridin-7-yl)propyl)-1',2',3',6'-tetrahydro-[3,4'-bipyridine]-6-carbonitrile;
<235> 1'-(3-(5-oxo-5,6-dihydro-1,6-naphthyridin-7-yl)propyl)-1',2',3',6'-tetrahydro-[2,4'-bipyridine]-5-carbonitrile;
<236> 7-(3-(4-(4-fluorophenyl)-3,6-dihydropyridin-1(2H)-yl)propyl)-1,6-naphthyridin-5(6H)-one;
<237> 7-(3-(2'-fluoro-3,6-dihydro-[4,4'-bipyridine]-1(2H)-yl)propyl)-1,6-naphthyridin-5(6H)-one;

<238> 7-(3-(4-(3-fluorophenyl)-3,6-dihydropyridin-1(2H)-yl)propyl)-1,6-naphthyridin-5(6H)-one;
<239> 4-(1-(3-(5-oxo-5,6-dihydro-1,6-naphthyridin-7-yl)propyl)-1,2,3,6-tetrahydropyridin-4-yl)benzonitrile;
<240> 7-(3-(3,6-dihydro-[4,4'-bipyridine]-1(2H)-yl)propyl)-1,6-naphthyridin-5(6H)-one;
<241> 4-(4-(3-(5-oxo-5,6-dihydro-1,6-naphthyridin-7-yl)propanoyl)piperazin-1-yl)benzonitrile;
<242> 6-(4-(3-(5-oxo-5,6-dihydro-1,6-naphthyridin-7-yl)propanoyl)piperazin-1-yl)nicotinonitrile;
<243> 5-(4-(3-(5-oxo-5,6-dihydro-1,6-naphthyridin-7-yl)propanoyl)piperazin-1-yl)picolinonitrile;
<244> 7-(3-(4-(4-fluorophenyl)-3,6-dihydropyridin-1(2H)-yl)-3-oxopropyl)-1,6-naphthyridin-5(6H)-one;
<245> 4-(1-(3-(5-oxo-5,6-dihydro-1,6-naphthyridin-7-yl)propanoyl)-1,2,3,6-tetrahydropyridin-4-yl)benzonitrile;
<246> 4-(8-(3-(5-oxo-5,6-dihydro-1,6-naphthyridin-7-yl)propanoyl)-3,8-diazabicyclo[3.2.1]octan-3-yl)benzonitrile;
<247> 4-((1-(3-(8-fluoro-1-oxo-1,2-dihydroisoquinolin-3-yl)propyl)piperidin-4-yl)amino)benzonitrile;
<248> 5-((1-(3-(8-fluoro-1-oxo-1,2-dihydroisoquinolin-3-yl)propyl)piperidin-4-yl)amino)picolinonitrile;
<249> 4-((1-(3-(7-fluoro-1-oxo-1,2-dihydroisoquinolin-3-yl)propyl)piperidin-4-yl)amino)benzonitrile;
<250> 4-((1-(3-(5-oxo-5,6-dihydro-1,6-naphthyridin-7-yl)propyl)piperidin-4-yl)amino)benzonitrile;
<251> 5-((1-(3-(5-oxo-5,6-dihydro-1,6-naphthyridin-7-yl)propyl)piperidin-4-yl)amino)picolinonitrile;
<252> methyl 4-((1-(3-(5-oxo-5,6-dihydro-1,6-naphthyridin-7-yl)propyl)piperidin-4-yl)amino)benzoate;
<253> 7-(3-(4-((4-(trifluoromethyl)phenyl)amino)piperidin-1-yl)propyl)-1,6-naphthyridin-5(6H)-one;
<254> 4-((1-(3-(8-fluoro-1-oxo-1,2-dihydroisoquinolin-3-yl)propyl)piperidin-4-yl)oxy)benzonitrile;
<255> 4-((1-(3-(8-fluoro-1-oxo-1,2-dihydroisoquinolin-3-yl)propanoyl)piperidin-4-yl)oxy)benzonitrile;
<256> 4-((1-(3-(8-fluoro-1-oxo-1,2-dihydroisoquinolin-3-yl)propanoyl)piperidin-4-yl)amino)benzonitrile;
<257> 4-((1-(3-(8-fluoro-1-oxo-1,2-dihydroisoquinolin-3-yl)propanoyl)piperidin-4-yl)(methyl)amino)benzonitrile;
<258> 5-((1-(3-(8-fluoro-1-oxo-1,2-dihydroisoquinolin-3-yl)propanoyl)piperidin-4-yl)amino)picolinonitrile;
<259> 4-((1-(3-(8-fluoro-5-methyl-1-oxo-1,2-dihydroisoquinolin-3-yl)propanoyl)piperidin-4-yl)amino)benzonitrile;
<260> 4-((1-(3-(7-fluoro-5-methyl-1-oxo-1,2-dihydroisoquinolin-3-yl)propanoyl)piperidin-4-yl)amino)benzonitrile;
<261> 4-((1-(3-(8-fluoro-5-methyl-1-oxo-1,2-dihydroisoquinolin-3-yl)propanoyl)piperidin-4-yl)oxy)benzonitrile;
<262> 4-((1-(3-(7-fluoro-5-methyl-1-oxo-1,2-dihydroisoquinolin-3-yl)propanoyl)piperidin-4-yl)oxy)benzonitrile;
<263> 3-(3-(4-((4-chlorophenyl)amino)piperidin-1-yl)-3-oxopropyl)-7-fluoro-5-methylisoquinolin-1(2H)-one;
<264> 3-(3-(4-((4-chlorophenyl)amino)piperidin-1-yl)-3-oxopropyl)-8-fluoro-5-methylisoquinolin-1(2H)-one;
<265> 7-fluoro-5-methyl-3-(3-oxo-3-(4-((4-(trifluoromethyl)phenyl)amino)piperidin-1-yl)propyl)isoquinolin-1(2H)-one;
<266> 8-fluoro-5-methyl-3-(3-oxo-3-(4-((4-(trifluoromethyl)phenyl)amino)piperidin-1-yl)propyl)isoquinolin-1(2H)-one;
<267> methyl 4-((1-(3-(7-fluoro-5-methyl-1-oxo-1,2-dihydroisoquinolin-3-yl)propanoyl)piperidin-4-yl)amino)benzoate;
<268> methyl 4-((1-(3-(8-fluoro-5-methyl-1-oxo-1,2-dihydroisoquinolin-3-yl)propanoyl)piperidin-4-yl)amino)benzoate;
<269> 8-fluoro-3-(3-(3-hydroxy-8-azabicyclo[3.2.1]octan-8-yl)-3-oxopropyl)-5-methylisoquinolin-1(2H)-one;
<270> 8-fluoro-3-(3-(4-hydroxypiperidin-1-yl)-3-oxopropyl)-5-methylisoquinolin-1(2H)-one;
<271> 7-(3-(3-hydroxy-8-azabicyclo[3.2.1]octan-8-yl)propyl)-1,6-naphthyridin-5(6H)-one;
<272> 8-fluoro-3-(3-(3-hydroxy-8-azabicyclo[3.2.1]octan-8-yl)propyl)isoquinolin-1(2H)-one;
<273> 4-((8-(3-(8-fluoro-1-oxo-1,2-dihydroisoquinolin-3-yl)propyl)-8-azabicyclo[3.2.1]octan-3-yl)oxy)benzonitrile;
<274> 4-((8-(3-(8-fluoro-1-oxo-1,2-dihydroisoquinolin-3-yl)propanoyl)-8-azabicyclo[3.2.1]octan-3-yl)oxy)benzonitrile;
<275> N-(1-(3-(8-fluoro-5-methyl-1-oxo-1,2-dihydroisoquinolin-3-yl)propanoyl)azetidin-3-yl)cyclopropanecarboxamide; and
<276> N-(1-(3-(8-fluoro-5-methyl-1-oxo-1,2-dihydroisoquinolin-3-yl)propanoyl)piperidin-4-yl)cyclopropanecarboxamide.

The compound represented by Chemical Formula 1 of the present invention can be used in the form of a pharmaceutically acceptable salt, and an acid addition salt formed by a pharmaceutically acceptable free acid is useful. Acid addition salts may be obtained from inorganic acids such as hydrochloric acid, nitric acid, phosphoric acid, sulfuric acid, hydrobromic acid, hydroiodic acid, nitrous acid, phosphorous acid, etc.; non-toxic organic acids such as aliphatic mono and dicarboxylates, phenyl-substituted alkanoates, hydroxy alkanoates and alkane dioates, aromatic acids, aliphatic and aromatic sulfonic acids, etc.; or organic acids such as acetate, benzoic acid, citric acid, lactic acid, maleic acid, gluconic acid, methanesulfonic acid, 4-toluenesulfonic acid, tartaric acid, fumaric acid, etc. Examples of such pharmaceutically non-toxic salts include sulfate, pyrosulfate, bisulfate, sulfite, bisulfite, nitrate, phosphate, monohydrogen phosphate, dihydrogen phosphate, metaphosphate, pyrophosphate chloride, bromide, iodide, fluoride, acetate, propionate, decanoate, caprylate, acrylate, formate, isobutyrate, caprate, heptanoate, propiolate, oxalate, malonate, succinate, suberate, cabacate, fumarate, maliate, butyne-1, 4-dioate, hexane-1,6-dioate, benzoate, chlorobenzoate, methyl benzoate, di nitrobenzoate, hydroxybenzoate, methoxybenzoate, phthalate, terephthalate, benzenesulfonate, toluenesulfonate, chlorobenzenesulfonate, xylenesulfonate, phenylacetate, phenylpropionate, phenylbutyrate, citrate, lactate, β-hydroxybutyrate, glycolate, malate, tartrate, methanesulfonate, propanesulfonate, naphthalene-1-sulfonate, naphthalene-2-sulfonate, or mandelate, etc.

The acid addition salt according to the present invention may be prepared by way of a conventional method. For example, the acid addition salt may be prepared by dissolving the derivatives of Chemical Formula 1 in an organic solvent, such as methanol, ethanol, acetone, methylene chloride, acetonitrile, etc., adding an organic acid or inorganic acid thereto to generate a precipitate, and then filtering and drying the generated precipitate, or may be prepared by distilling a solvent and an excess acid under reduced pressure, followed by drying or crystallization in an organic solvent.

Additionally, a pharmaceutically acceptable metal salt may be prepared by using a base. For example, an alkali metal or alkaline earth metal salt is obtained, for example, by dissolving the compound in an excessive alkali metal hydroxide or alkaline earth metal hydroxide solution, filtering a non-soluble compound salt, and then evaporating and drying the filtrate. Here, as the metal salt, a sodium, potassium, or calcium salt is appropriately prepared from a pharmaceutical aspect. In addition, the corresponding salt is obtained by reacting an alkali metal or alkaline earth metal salt with a suitable silver salt (e.g., silver nitrate).

Further, the present invention includes not only the compound represented by Chemical Formula 1 above and a pharmaceutically acceptable salt thereof, but also a solvate, an isomer, a hydrate, etc. which may be prepared therefrom.

As used herein, the term "solvate" refers to the compound of the present invention or a salt thereof containing a stoichiometric or non-stoichiometric amount of a solvent bound by non-covalent intermolecular forces. Preferred solvents therefor include volatile, non-toxic, and/or suitable solvents for administration to humans. Here, when the solvent is water, it is referred to as "hydrate".

As used herein, the term "isomer" refers to the compound of the present invention or a salt thereof having the same chemical formula or molecular formula, but structurally or sterically different. Such isomers include structural isomers such as tautomers, R or S isomers having an asymmetric carbon center, stereoisomers such as geometric isomers (trans, cis), and optical isomers (enantiomers). All of these isomers and mixtures thereof are also included within the scope of the present invention.

In addition, as shown in the Reaction Scheme below,

The present invention provides a method for preparing a compound represented by Chemical Formula 1 above, including: reacting a compound represented by Chemical Formula 2 with a compound represented by Chemical Formula 3 to prepare a compound represented by Chemical Formula 1:

[Reaction Scheme 1]

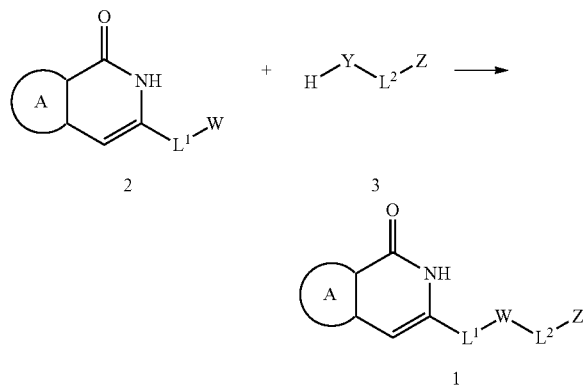

In Reaction Scheme 1 above,

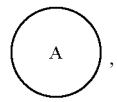

$L^1$, Y, $L^2$, and Z are the same as defined above, and W is a leaving group.

Hereinafter, the preparation method represented by Reaction Scheme 1 above will be described in detail.

In the method for preparing a compound represented by Chemical Formula 1 according to the present invention, the step of Reaction Scheme 1 is a step of preparing a compound represented by Chemical Formula 1 by reacting a compound represented by Chemical Formula 2 with a compound represented by Chemical Formula 3. Specifically, this is a step in which the compound represented by Chemical Formula 1 is formed by reacting a mesylate or carboxyl of the compound represented by Chemical Formula 2 with a secondary amine of the compound represented by Chemical Formula 3.

Here, the above step is not particularly limited as long as it is a method of preparing an isoquinolinone derivative represented by Chemical Formula 1, and is included in the scope of the present invention. However, the compound represented by Chemical Formula 2 may be understood as a compound having a leaving group that is easy to react with a nucleophile, such as mesylate, tosylate, etc., or a compound having a carboxyl capable of forming an amide by reacting with an amine. Additionally, the compound represented by Chemical Formula 3 may be understood as a cyclic secondary amine capable of a nucleophilic substitution reaction or an amide formation reaction, but these are only examples and are not limited thereto. Accordingly, the isoquinolinone derivative, which is the final product of the present invention, is prepared by way of a nucleophilic substitution reaction of the compound having a leaving group and a cyclic secondary amine having sufficient nucleophilicity to react therewith, or by way of an amide formation reaction of a carboxyl and a cyclic secondary amine.

More specifically, it can be understood with reference to the preparation method of the compounds of Examples of the present invention, but each reaction condition (reaction conditions that can be conceived by a person skilled in the art in the field of organic synthesis, such as reaction temperature, time, atmospheric conditions, pressure conditions, etc.) can be modified, and it can be understood that the invention is not limited thereto. Further, it can be understood that the compounds and derivatives thereof used in each step may include derivatives that can be modified therefrom other than those disclosed, i.e., derivatives modified by simply modifying, changing or removing substituents, and these are also included in the present invention.

Meanwhile, some of the hydrochloride compounds among the following Examples 1 to 276 imply that all of the compounds of the present invention can be easily prepared as addition salts such as hydrochloride, etc. and pharmaceutically acceptable salts, and these are included in the scope of the present invention.

As a preferred embodiment of the preparation method, the preparation methods disclosed in Examples 1 to 276 below may be mentioned, but the present invention is not limited thereto.

Further, the present invention provides a pharmaceutical composition for preventing or treating a poly(ADP-ribose) polymerase-1 (PARP-1)-related disease, comprising the compound represented by Chemical Formula 1 above, an isomer, or a pharmaceutically acceptable salt thereof as an active ingredient.

The compound represented by Chemical Formula 1 according to the present invention, an isomer, or a pharmaceutically acceptable salt thereof is characterized by inhibiting the PARP enzyme, preferably the poly(ADP-ribose) polymerase-1 (PARP-1) enzyme (see Experimental Example 1).

Accordingly, it can be effectively used as a pharmaceutical composition for preventing or treating a poly(ADP-ribose) polymerase-1 (PARP-1)-related disease, comprising the compound represented by Chemical Formula 1 according to the present invention, an isomer, or a pharmaceutically acceptable salt thereof as an active ingredient, or a health functional food for preventing or improving a poly (ADP-ribose) polymerase-1 (PARP-1)-related disease.

Here, the compound represented by Chemical Formula 1 above, an isomer, or a pharmaceutically acceptable salt thereof exhibits a cytoprotective effect by inhibiting the activity of poly(ADP-ribose) polymerase-1 (PARP-1), and is used in the treatment of diseases by inhibiting the synthesis of poly(ADP-ribose) for intracellular energy depletion, decrease in mitochondrial function, DNA fragmentation due to nuclear migration of AIF, amplification of apoptosis gene, apoptosis, and DNA base excision repair caused by increased poly(ADP-ribose) associated with the poly(ADP-ribose) polymerase-1 (PARP-1) activity. More specifically, the poly(ADP-ribose) polymerase-1 (PARP-1) is an enzyme present in the cell nucleus of various organs including the heart, and is an enzyme which is activated by recognition of damaged DNA and subsequently repairs damaged DNA through poly ADP-ribosylation of several proteins. Among the known poly ADP-ribosylation substrates (acceptor or target protein), the most important factor is PARP-1 itself, and in addition, many nuclear proteins such as histones, DNA topoisomerase, DNA ligase, caspase, p53 and transcription-related factors, such as NF-κ, etc. are known. PARP catalyzes the transfer of ADP-ribose from NAD, and nicotinamide is released from NAD at this time. Nicotinamide is converted back to NAD by consuming the energy carrier ATP by another enzyme. Therefore, overactivation of PARP consumes a large amount of ATP and promotes a decrease in cellular mitochondrial function, resulting in cell damage and cell death. As described above and in the background art of the present invention, it can be used for the treatment of diseases such as cancer, tumor, stroke and age-related disease, etc. by inhibiting poly(ADP-ribose) polymerase-1 (PARP-1), which is more active than normal cells in cancer, tumor, etc., and can also be applied to other diseases by the same mechanism as above (see the background art of the present invention).

Accordingly, it can be used as a pharmaceutical composition for preventing or treating a poly(ADP-ribose) polymerase-1 (PARP-1)-related disease, comprising the compound represented by Chemical Formula 1 above, an isomer, or a pharmaceutically acceptable salt thereof as an active ingredient.

Here, the poly(ADP-ribose) polymerase-1 (PARP-1)-related disease may include one or more selected from the group consisting of neurogenic disorder, neurodegenerative disease, vascular stroke, cardiovascular disorder, macular degeneration, AIDS, arthritis, atherosclerosis, cancer, diabetes mellitus, brain tumor, inflammatory bowel disorder, muscular dystrophy, osteoarthritis, osteoporosis, chronic pain, acute pain, neuropathic pain, nerve attack, peripheral nerve damage, kidney disease, retinal ischemia, septic shock and skin aging, but is not limited thereto, and any disease caused by the induction of intracellular ATP depletion and decrease in mitochondrial function induced from hyperactivity of poly(ADP-ribose) polymerase-1 (PARP-1), and cell damage or cell death promoted thereby, or independent cell death may be included in the present invention.

Meanwhile, the present invention is characterized in that it can be used for the treatment of ophthalmic diseases or disorders, which is based on the evidence demonstrated in Experimental Example 2 of the present invention.

Here, the ophthalmic disease or disorder is a disease that occurs by caused by cell damage or apoptosis induced by hyperactivity of poly(ADP-ribose) polymerase-1 (PARP-1), and for example, the ophthalmic disease or disorder may include one or more selected from age-related macular degeneration, Stargardt's macular dystrophy, retinal detachment, hemorrhagic retinopathy, retinitis pigmentosa, cone-rod dystrophy, Sorsby's fundus dystrophy, optic neuropathy, inflammatory retinal disease, diabetic retinopathy, diabetic maculopathy, retinal vascular occlusion, retinopathy of prematurity, or retinal damage associated with ischemia reperfusion, proliferative vitreoretinopathy, retinal dystrophy, congenital optic neuropathy, uveitis, retinal damage, retinal disorder associated with Alzheimer's disease, retinal disorder associated with multiple sclerosis, retinal disorder associated with Parkinson's disease, retinal disorder associated with viral infections, retinal disorder associated with light overexposure, myopia, or AIDS-related retinal disorder.

In addition, the present invention provides a method for preventing or treating a poly(ADP-ribose) polymerase-1 (PARP-1)-related disease by administering the compound according to the present invention, an isomer, or a pharmaceutically acceptable salt thereof.

Further, the present invention provides the use of the preparation of a medicament for preventing or treating a poly(ADP-ribose) polymerase-1 (PARP-1)-related disease by administering the compound according to the present invention, an isomer, or a pharmaceutically acceptable salt thereof.

Furthermore, the present invention provides a health functional food for preventing or improving a poly(ADP-ribose) polymerase-1 (PARP-1)-related disease, comprising the compound represented by Chemical Formula 1 above, an isomer, or a pharmaceutically acceptable salt thereof as an active ingredient.

Furthermore, the present invention provides a health functional food for preventing or improving an ophthalmic disease or disorder, comprising the compound represented by Chemical Formula 1 above, an isomer, or a pharmaceutically acceptable salt thereof as an active ingredient.

Here, the health functional food may be prepared and used as a general health functional food, by including the compound represented by Chemical Formula 1 of the present invention, an isomer, or a pharmaceutically acceptable salt thereof as an active ingredient, and is included within the scope of the present invention as long as it is a formulation, food form, or administration form known to those skilled in the art. Further, it is included in the health functional food of the present invention as long as it is within a range that can be recognized as a health functional food therefrom.

As used herein, the term "prevention" may mean any action of inhibiting or delaying the onset of neurological diseases by administering the pharmaceutical composition according to the present invention to an individual.

As used herein, the term "treatment" may mean any action of improving or beneficially changing the symptoms of neurological diseases by administering the pharmaceutical composition according to the present invention to an individual.

The pharmaceutical composition of the present invention may further include a pharmaceutically acceptable carrier, excipient, or diluent.

In a case where the composition of the present invention is used as a pharmaceutical drug, the pharmaceutical composition containing the compound represented by Chemical Formula 1 above, an isomer, or a pharmaceutically acceptable salt thereof may be prepared into various oral or parenteral dosage forms as shown below and administered, upon clinical administration, but the present invention is not limited thereto.

Examples of formulations for oral administration include tablets, pills, hard/soft capsules, liquids, suspensions, emulsifiers, syrups, granules, elixirs, troche, etc. These formulations contain, in addition to an active ingredient, a diluent (for example, lactose, dextrose, sucrose, mannitol, sorbitol, cellulose, and/or glycine), and a lubricant (for example, silica, talc, stearic acid and a magnesium or calcium salt thereof, and/or polyethylene glycol). Tablets may also contain a binder such as magnesium aluminum silicate, starch paste, gelatin, methylcellulose, sodium carboxymethylcellulose, and/or polyvinylpyrrolidone, and in some cases, may contain a disintegrant such as starch, agar, alginic acid or a sodium salt thereof, or a boiling mixture, and/or an absorbent, a colorant, a flavoring agent, and a sweetener.

The pharmaceutical composition containing the compound represented by Chemical Formula 1 above as an active ingredient may be parenterally administered, and the parenteral administration is carried out by an injection, eye drop, or eye ointment.

Here, in order to prepare a formulation for parenteral administration, the compound represented by Chemical Formula 1 above, a stereoisomer, or a pharmaceutically acceptable salt thereof is mixed with a stabilizer or buffer in water, to prepare a solution or suspension, and the solution or suspension may be prepared as an ampoule or vial unit dosage form. The composition may be sterilized, and/or contain adjuvants such as a preservative, a stabilizer, a hydration agent or emulsifier, a salt for regulating osmosis, and/or a buffer, and other therapeutically useful substances, and the composition may be prepared by way of a conventional method such as dispersion, gelation, etc.

In addition, a dosage of the pharmaceutical compound containing the compound represented by Chemical Formula 1 above as an active ingredient to the human body may vary depending on the patient's age, body weight and sex, the dosage form, the health condition, and the severity of a disease. The dosage may be preferably administered in an amount of 0.001 to 1,000 mg/kg/day several times a day, preferably once a day or three times a day in divided doses, at regular time intervals according to the determination of a doctor or pharmacist via oral or parenteral routes.

The pharmaceutical composition of the present invention can be used as a single formulation. In addition, it can be prepared and used as a complex formulation by further including one or more other therapeutic agents.

In another aspect, the present invention provides a method for preventing or treating a poly(ADP-ribose) polymerase-1 (PARP-1)-related disease, including: administering the pharmaceutical composition to an individual in need in an effective amount. The pharmaceutical composition means a pharmaceutical composition for preventing or treating a poly(ADP-ribose) polymerase-1 (PARP-1)-related disease, containing the compound represented by Chemical Formula 1 described above, an isomer, or a pharmaceutically acceptable salt thereof as an active ingredient.

As used herein, the term "administration" means introducing the pharmaceutical composition of the present invention to an individual by an appropriate method, and the pharmaceutical composition of the present invention may be administered by any general route as long as it can reach the target tissue via intraperitoneal administration, intraocular administration, intravenous administration, intramuscular administration, subcutaneous administration, intradermal administration, oral administration, topical administration, intranasal administration, intrapulmonary administration, rectal administration, intrauterine dural, or intracerebroventricular injection, but is not limited thereto.

As used herein, the term "individual" refers to any animal, including human, who has or may develop a poly(ADP-ribose)polymerase-1 (PARP-1)-related disease, for example, an ophthalmic disease or disorder, and any of the aforementioned diseases. The poly(ADP-ribose)polymerase-1 (PARP-1)-related disease may be effectively prevented or treated by administering the pharmaceutical composition to an individual.

As described above, the isoquinolinone derivatives of the present invention, preparation method thereof, and pharmaceutical use thereof can be understood, and the effects demonstrated in the present invention will be described below.

First, the inhibitory activity of PARP-1 (poly[ADP-ribose] polymerase-1) enzyme was evaluated by including the isoquinolinone derivatives according to the present invention in various concentrations.

Specifically, the PARP-1 (poly[ADP-ribose] polymerase 1) activity assay kit was used to treat the isoquinolinone derivatives of the present invention at various concentrations, and as a result of measuring absorbance, the inhibitory activity of the PARP-1 (poly[ADP-ribose] polymerase 1) enzyme was observed in nanomolar units.

From the above results, it can be found that the isoquinolinone derivatives of the present invention have an excellent protection ability against retinal degeneration, and thus can be effectively used as a pharmaceutical composition for treating retinal diseases.

MODE FOR CARRYING OUT THE INVENTION

Hereinafter, the present invention will be described in detail by way of Examples and Experimental Examples. However, these Examples and Experimental Examples are given for illustrative purposes only, and the scope of the invention is not intended to be limited to or by these Examples and Experimental Examples.

<Example 1> Preparation of 4-(4-(3-(8-fluoro-1-oxo-1,2-dihydroisoquinolin-3-yl)propyl)piperazin-1-yl)benzonitrile

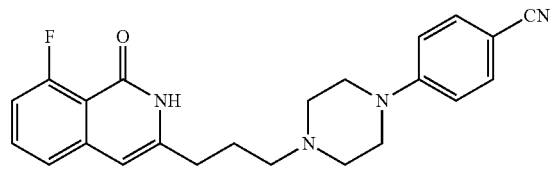

Step 1: Preparation of tert-butyl 4-(4-cyanophenyl)piperazin-1-carboxylate

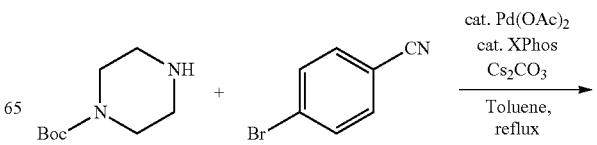

-continued

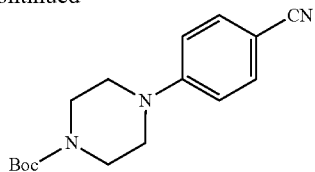

After dissolving 1-Boc-piperazine (70.0 g, 0.38 mol) and 4-bromobenzonitrile (82 g, 0.45 mol) in toluene (1.5 L), Pd(OAc)$_2$ (8.4 g, 0.04 mol), XPhos (9.0 g, 0.02 mol), and Cs$_2$CO$_3$ (147 g, 0.45 mol) were added dropwise. The mixture was stirred at 100° C. for 15 hours and cooled to room temperature. The reaction solution was diluted with EtOAc and washed with water. The organic solvent was dried over MgSO$_4$, filtered, and then concentrated by evaporation under reduced pressure, and the resulting residue was purified using silica gel chromatography to obtain the target compound, tert-butyl 4-(4-cyanophenyl)piperazin-1-carboxylate (90 g, 83%).

$^1$H NMR (300 MHz, CDCl$_3$) δ 7.53-7.50 (m, 2H), 6.87-6.85 (m, 2H), 3.60-3.57 (m, 4H), 3.33-3.29 (m, 4H), 1.49 (s, 9H).

Step 2: Preparation of 4-(piperazin-1-yl)benzonitrile 2HCl

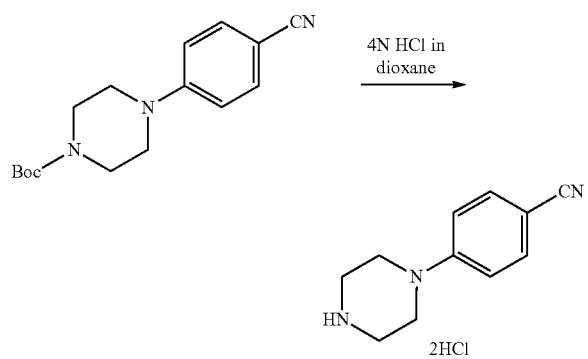

4 N HCl/dioxane (1400 mL) was added to tert-butyl 4-(4-cyanophenyl)piperazin-1-carboxylate (80 g, 0.28 mol), and the mixture was stirred for 15 hours. The solid produced during the reaction was filtered and washed with EtOAc to obtain the target compound, 4-(piperazin-1-yl)benzonitrile 2HCl (72 g, 100%).

$^1$H NMR (300 MHz, DMSO-d$_6$) δ 9.46 (br, 1H), 7.67-7.64 (m, 2H), 7.11-7.08 (m, 2H), 3.61-3.59 (m, 4H), 3.19 (m, 4H).

Step 3: Preparation of methyl 2-bromo-6-fluorobenzoate

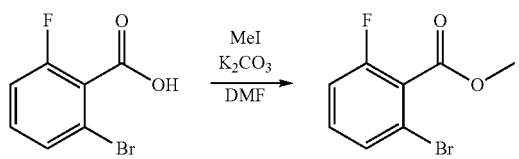

After dissolving 2-bromo-6-fluorobenzoic acid (100 g, 456.6 mmol) in DMF (1 L), K$_2$CO$_3$ was added at 0° C. and stirred for 30 minutes. MeI (194 g, 1369.8 mmol) was slowly added dropwise to the reaction solution at 0° C., followed by stirring at room temperature for 15 hours. The reaction solution was diluted with EtOAc and washed with a Na$_2$S$_2$O$_3$ aqueous solution and an NH$_4$C aqueous solution. The organic solvent was dried over MgSO$_4$, filtered, and then concentrated by evaporation under reduced pressure, and the resulting residue was purified using silica gel chromatography to obtain the target compound, methyl 2-bromo-6-fluorobenzoate (107 g, 95%).

$^1$H NMR (300 MHz, CDCl$_3$) δ 7.40 (d, 1H, J=8.1 Hz), 7.31-7.24 (m, 1H), 7.09 (t, 1H, J=8.6 Hz), 3.98 (s, 3H).

Step 4: Preparation of methyl 2-fluoro-6-(5-hydroxypent-1-yn-1-yl)benzoate

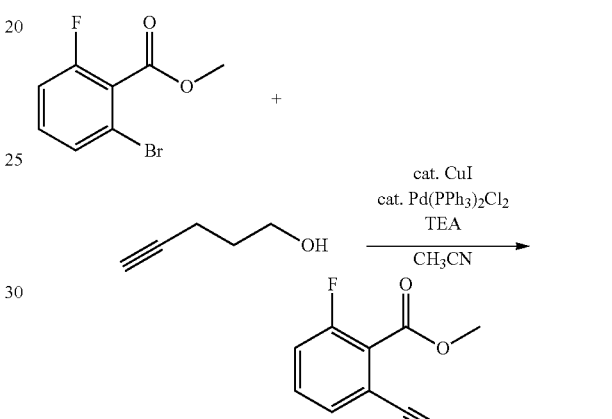

After dissolving methyl 2-bromo-6-fluorobenzoate (107 g, 433 mmol) in acetonitrile (1 L), pent-4-yn-1-ol (51 g, 519.6 mmol), Pd(PPh$_3$)$_2$Cl$_2$ (15.2 g, 21.65 mmol), and CuI (4.12 g, 21.65 mmol) were added dropwise. TEA (131.4 g, 1299 mmol) was added dropwise, and the mixture was stirred at 80° C. for 15 hours and then cooled to room temperature. The reaction solution was diluted with EtOAc and washed with an NH$_4$Cl aqueous solution. The organic solvent was dried over MgSO$_4$, filtered, and then concentrated by evaporation under reduced pressure, and the resulting residue was purified using silica gel chromatography to obtain the target compound, methyl 2-fluoro-6-(5-hydroxypent-1-yn-1-yl) benzoate (75.1 g, 70%).

$^1$H NMR (300 MHz, CDCl$_3$) δ 7.37-7.30 (m, 1H), 7.25-7.23 (m, 1H), 7.05 (t, 1H, J=8.9 Hz), 3.95 (s, 3H), 3.88-3.76 (m, 2H), 2.56 (t, 2H, J=6.8 Hz), 1.85 (m, 2H).

Step 5: Preparation of 8-fluoro-3-(3-hydroxypropyl)-1H-isochromen-1-one

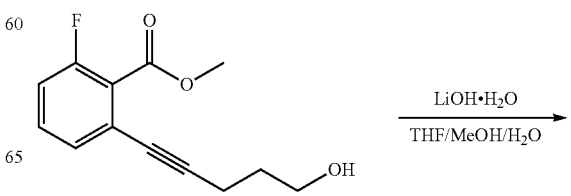

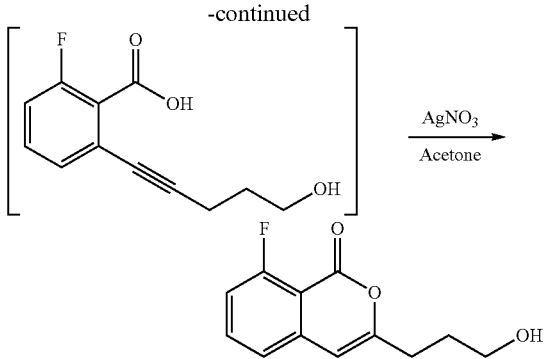

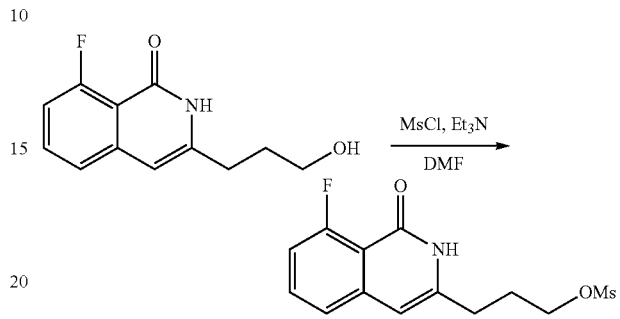

¹H NMR (300 MHz, DMSO-d₆) δ 11.26 (br, 1H), 7.65-7.58 (m, 1H), 7.35 (d, 1H, J=7.8 Hz), 7.13-7.06 (m, 1H), 6.35 (s, 3H), 4.58 (br, 1H), 3.47-3.41 (m, 2H), 2.53-2.48 (m, 2H), 1.77 (m, 2H).

Step 7: Preparation of 3-(8-fluoro-1-oxo-1,2-dihydroisoquinolin-3-yl)propyl methanesulfonate After dissolving methyl 2-fluoro-6-(5-hydroxypent-1-yn-1-yl)benzoate (75 g, 299.68 mmol) in THF/MeOH/H₂O (600 mL/200 mL/200 mL), LiOH·H₂O (37.7 g, 899.03 mmol) was added dropwise, followed by stirring at room temperature for 15 hours. The reaction solution was concentrated by distillation under reduced pressure and then diluted with EtOAc, and 6 N HCl was slowly added dropwise to adjust the pH to 1 to 2. The organic solvent was dried over MgSO₄, filtered, and then concentrated by evaporation under reduced pressure. After dissolving the concentrated reaction solution in acetone (1.5 L), AgNO₃ (9.34 g, 29.97 mmol) was added dropwise. The reaction solution was stirred at room temperature for 15 hours, and then distilled under reduced pressure to remove the solvent. The reaction solution was diluted with EtOAc and washed with water. The organic solvent was dried over MgSO₄, filtered, and then concentrated by evaporation under reduced pressure, and the resulting residue was purified using silica gel chromatography to obtain the target compound, 8-fluoro-3-(3-hydroxypropyl)-1H-isochromen-1-one (25 g, 35%).

¹H NMR (300 MHz, DMSO-d₆) δ 7.83-7.76 (m, 1H), 7.37 (d, 1H, J=7.8 Hz), 7.30 (t, 1H, J=9.8 Hz), 6.61 (s, 1H), 4.58 (br, 1H), 3.49-3.44 (m, 2H), 2.57-2.50 (m, 2H), 1.76 (m, 2H).

Step 6: Preparation of 8-fluoro-3-(3-hydroxypropyl)isoquinolin-1(2H)-one

After dissolving 8-fluoro-3-(3-hydroxypropyl)isoquinolin-1(2H)-one (19.5 g, 88.14 mmol) in DMF (44.0 mL), the mixture was cooled to 0° C. MsCl (15.7 mL, 202.72 mmol) and TEA (49.0 mL, 352.56 mmol) were slowly added dropwise at 0° C., followed by stirring at 25° C. for 15 hours. The reaction solution was diluted with EtOAc and washed with an NH₄Cl aqueous solution. The organic solvent was dried over MgSO₄, filtered, and then concentrated by evaporation under reduced pressure, and the resulting residue was recrystallized with MeOH to obtain the target compound, 3-(8-fluoro-1-oxo-1,2-dihydroisoquinolin-3-yl)propyl methanesulfonate (13 g, 49%).

¹H NMR (300 MHz, CDCl₃) δ 11.58 (br, 1H), 7.60-7.53 (m, 1H), 7.28-7.25 (m, 1H), 7.09-7.02 (m, 1H), 6.36 (s, 1H), 4.37 (t, 2H, J=6.2 Hz), 3.05 (s, 3H), 2.79 (t, 2H, J=7.7 Hz), 2.26 (m, 2H).

Step 8: Preparation of 4-(4-(3-(8-fluoro-1-oxo-1,2-dihydroisoquinolin-3-yl)propyl)piperazin-1-yl)benzonitrile

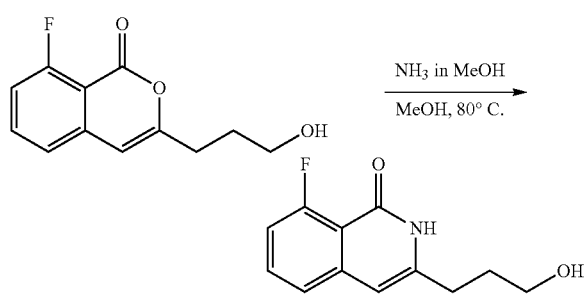

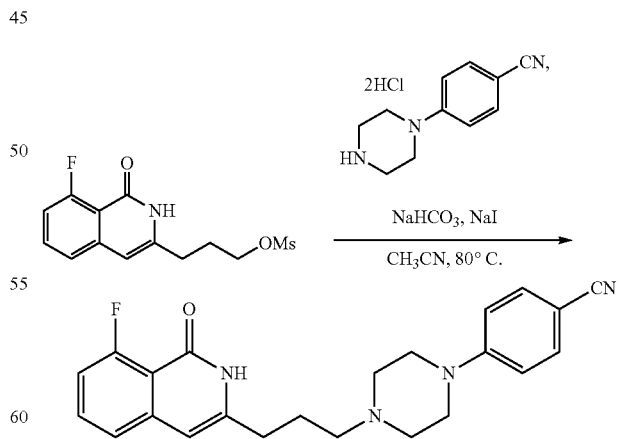

After dissolving 8-fluoro-3-(3-hydroxypropyl)-1H-isochromen-1-one (18.0 g, 81.00 mmol) in 7 N NH₃/MeOH (200 mL, 1.38 mol), the mixture was stirred 80° C. for 15 hours. The reaction solution was cooled to room temperature, and then the thus-obtained product was concentrated by evaporation under reduced pressure. The resulting solid was recrystallized with MeOH to obtain the target compound, 8-fluoro-3-(3-hydroxypropyl)isoquinolin-1(2H)-one (14.8 g, 83%).

After dissolving 3-(8-fluoro-1-oxo-1,2-dihydroisoquinolin-3-yl)propyl methanesulfonate (2.4 g, 8.02 mmol) in acetonitrile (160.0 mL), 4-(piperazin-1-yl)benzonitrile 2HCl (3.1 g, 12.03 mmol) was added dropwise at 25° C. NaHCO₃ (3.37 g, 40.10 mmol) and NaI (3.13 g, 16.04 mmol) were added dropwise, and the mixture was heated to 80° C. and stirred for 17 hours. The reaction solution was diluted with EtOAc and washed with a NaS₂O₃ aqueous solution and an NH₄C aqueous solution. The organic solvent was dried over MgSO₄, filtered, and then concentrated by evaporation under reduced pressure, and the resulting residue was recrystallized with MeOH to obtain the target compound, 4-(4-(3-(8-fluoro-1-oxo-1,2-dihydroisoquinolin-3-yl)propyl)piperazin-1-yl)benzonitrile (2.4 g, 77%).

¹H NMR (300 MHz, CDCl₃) δ 11.63 (br, 1H), 7.55-7.48 (m, 3H), 7.20 (d, 1H, J=7.8 Hz), 7.05-6.98 (m, 1H), 6.89-6.86 (m, 2H), 6.23 (s, 1H), 3.58-3.56 (m, 4H), 2.72-2.70 (m, 6H), 2.54 (t, 2H, J=6.0 Hz), 1.94-1.90 (m, 2H).

<Example 2> Preparation of 5-(4-(3-(8-fluoro-1-oxo-1,2-dihydroisoquinolin-3-yl)propyl)piperazin-1-yl)picolinonitrile

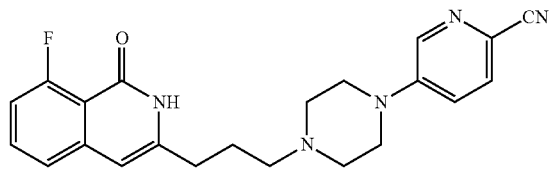 [SMILES: N#Cc1ccc(N2CCN(CCCc3cc4cccc(F)c4c(=O)[nH]3)CC2)cn1]

The target compound was obtained according to Example 1, except that 5-bromo-2-cyanopyridine was used in place of 4-bromobenzonitrile used in Step 1 of Example 1.

¹H NMR (300 MHz, CDCl₃) δ 8.32 (s, 1H), 7.51-7.49 (m, 2H), 7.22-7.20 (m, 1H), 7.12-7.10 (m, 1H), 7.08-7.05 (m, 1H), 6.22 (s, 1H), 3.66-3.64 (m, 4H), 2.72-2.70 (m, 6H), 2.57-2.55 (m, 2H), 1.93-1.91 (m, 2H).

<Example 3> Preparation of 6-(4-(3-(8-fluoro-1-oxo-1,2-dihydroisoquinolin-3-yl)propyl)piperazin-1-yl)nicotinonitrile

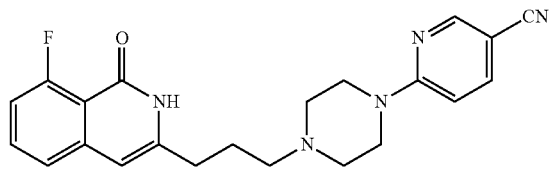

The target compound was obtained according to Example 1, except that 2-bromo-5-cyanopyridine was used in place of 4-bromobenzonitrile used in Step 1 of Example 1.

¹H NMR (300 MHz, CDCl₃) δ 8.40-8.39 (m, 1H), 7.62-7.59 (m, 1H), 7.52-7.49 (m, 1H), 7.21-7.19 (m, 1H), 7.05-6.98 (m, 1H), 6.62-6.59 (m, 1H), 6.22 (s, 1H), 3.99-3.96 (m, 4H), 2.74-2.65 (m, 6H), 2.56-2.52 (m, 2H), 1.92-1.90 (m, 2H).

<Example 4> Preparation of 8-fluoro-3-(3-(4-(4-(trifluoromethyl)phenyl)piperazin-1-yl)propyl)isoquinolin-1(2H)-one

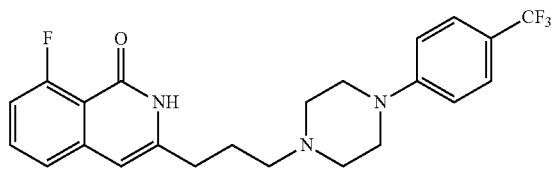 [SMILES: O=c1[nH]c(CCCN2CCN(c3ccc(C(F)(F)F)cc3)CC2)cc2cccc(F)c12]

The target compound was obtained according to Example 1, except that 4-bromobenzotrifluoride was used in place of 4-bromobenzonitrile used in Step 1 of Example 1.

¹H NMR (300 MHz, CDCl₃) δ 11.47 (br, 1H), 7.54-7.48 (m, 3H), 7.21-7.18 (m, 1H), 7.04-7.01 (m, 1H), 7.00-6.96 (m, 2H), 6.22 (s, 1H), 3.54-3.51 (m, 4H), 2.73-2.66 (m, 6H), 2.55-2.51 (m, 2H), 1.96-1.90 (m, 2H).

<Example 5> Preparation of 2-fluoro-4-(4-(3-(8-fluoro-1-oxo-1,2-dihydroisoquinolin-3-yl)propyl)piperazin-1-yl)benzonitrile

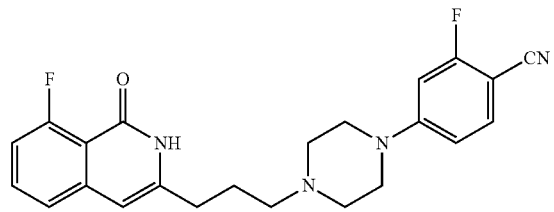 [SMILES: N#Cc1ccc(N2CCN(CCCc3cc4cccc(F)c4c(=O)[nH]3)CC2)cc1F]

The target compound was obtained according to Example 1, except that 4-bromo-2-fluorobenzonitrile was used in place of 4-bromobenzonitrile used in Step 1 of Example 1.

¹H NMR (300 MHz, CDCl₃) δ 7.51-7.50 (m, 1H), 7.39-7.38 (m, 1H), 7.21-7.18 (m, 1H), 7.11-7.01 (m, 1H), 6.62-6.54 (m, 2H), 6.22 (s, 1H), 3.62-3.61 (m, 4H), 2.70-2.68 (m, 6H), 2.55-2.54 (m, 2H), 1.92-1.91 (m, 2H).

<Example 6> Preparation of 4-(4-(3-(8-fluoro-1-oxo-1,2-dihydroisoquinolin-3-yl)propyl)piperazin-1-yl)benzonitrile hydrochloride

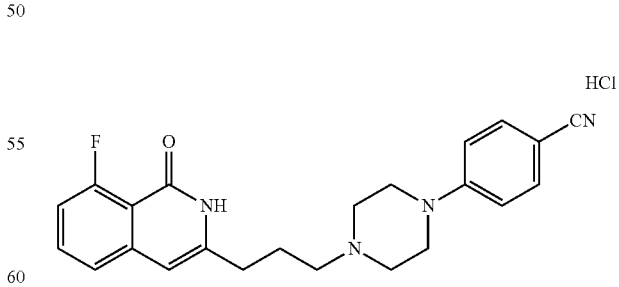

After dissolving 4-(4-(3-(8-fluoro-1-oxo-1,2-dihydroisoquinolin-3-yl)propyl)piperazin-1-yl)benzonitrile (1.0 g, 2.56 mmol) in 4 N HCl/dioxane (26.0 mL, 76.83 mmol), the mixture was stirred at room temperature for 15 hours. The resulting product was concentrated by evaporation under reduced pressure and filtered to obtain the target compound, 4-(4-(3-(8-fluoro-1-oxo-1,2-dihydroisoquinolin-3-yl)propyl)piperazin-1-yl)benzonitrile hydrochloride (940.0 mg, 90%).

$^1$H NMR (300 MHz, DMSO-d$_6$) δ 11.35 (br, 1H), 11.22 (s, 1H), 7.68-7.61 (m, 3H), 7.37 (d, 1H, J=7.8 Hz), 7.16-7.11 (m, 3H), 6.44 (s, 1H), 4.10-4.05 (m, 2H), 3.61-3.57 (m, 2H), 3.55 (t, 2H, J=12.9 Hz), 3.11-3.07 (m, 4H), 2.57 (m, 2H), 2.12 (m, 2H).

<Example 7> Preparation of 4-(8-(3-(8-fluoro-1-oxo-1,2-dihydroisoquinolin-3-yl)propyl)-3,8-diazabicyclo[3.2.1]octan-3-yl)benzonitrile

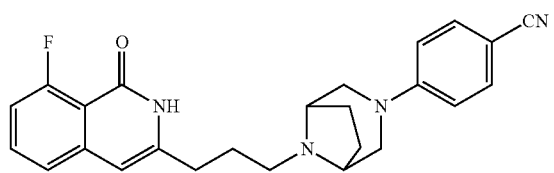 [SMILES: N#Cc1ccc(N2CC3CCC(C2)N3CCCc2cc3cccc(F)c3c(=O)[nH]2)cc1]

The target compound was obtained according to Example 1, except that tert-butyl 3,8-diazabicyclo[3.2.1]octane-8-carboxylate was used in place of 1-Boc-piperazine used in Step 1 of Example 1.

$^1$H NMR (300 MHz, CDCl$_3$) δ 11.44 (br, 1H), 7.54-7.46 (m, 3H), 7.20 (d, 1H, J=7.8 Hz), 7.03-6.97 (m, 1H), 6.80-6.77 (m, 2H), 6.22 (s, 1H), 3.51-3.40 (m, 6H), 2.73 (t, 2H, J=6.3 Hz), 2.57 (t, 2H, J=6.0 Hz), 2.10-2.07 (m, 2H), 1.92-1.88 (m, 2H), 1.79-1.76 (m, 2H).

<Example 8> Preparation of 4-(4-(3-(7-fluoro-1-oxo-1,2-dihydroisoquinolin-3-yl)propyl)piperazin-1-yl)benzonitrile

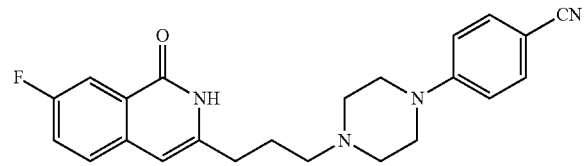

The target compound was obtained according to Example 1, except that 2-bromo-5-fluorobenzoic acid was used in place of 2-bromo-6-fluorobenzoic acid used in Step 3 of Example 1.

$^1$H NMR (300 MHz, CDCl$_3$) δ 7.97-7.95 (m, 1H), 7.51-7.48 (m, 3H), 7.34-7.32 (m, 1H), 6.90-6.87 (m, 2H), 6.27 (m, 1H), 3.57-3.55 (m, 4H), 2.72-2.70 (m, 6H), 2.55-2.53 (m, 2H), 1.94-1.92 (m, 2H).

<Example 9> Preparation of 7-fluoro-3-(3-(4-(4-(trifluoromethyl)phenyl)piperazin-1-yl)propyl)isoquinolin-1(2H)-one

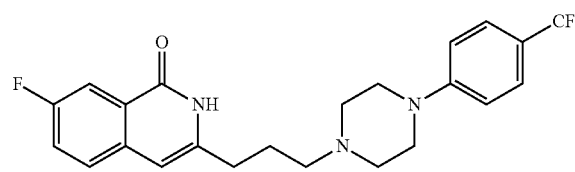

The target compound was obtained according to Example 1, except that 4-bromobenzotrifluoride was used in place of 4-bromobenzonitrile used in Step 1 of Example 1, and 2-bromo-5-fluorobenzoic acid was used in placed of 2-bromo-6-fluorobenzoic acid used in Step 3 of Example 1.

$^1$H NMR (300 MHz, CDCl$_3$) δ 11.54 (br, 1H), 7.97-7.94 (m, 1H), 7.49-7.42 (m, 3H), 7.37-7.30 (m, 1H), 6.97-6.94 (m, 2H), 6.26 (s, 1H), 3.53-3.50 (m, 4H), 2.72-2.71 (m, 6H), 2.55-2.52 (m, 2H), 1.95-1.90 (m, 2H).

<Example 10> Preparation of 5-(4-(3-(7-fluoro-1-oxo-1,2-dihydroisoquinolin-3-yl)propyl)piperazin-1-yl)picolinonitrile

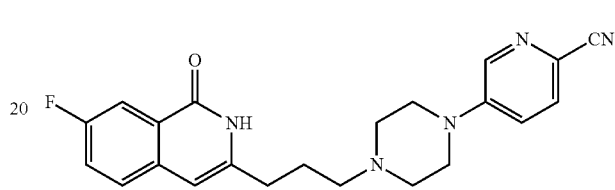

The target compound was obtained according to Example 1, except that 5-bromo-2-cyanopyridine in place of 4-bromobenzonitrile used in Step 1 of Example 1, and 2-bromo-5-fluorobenzoic acid was used in place of 2-bromo-6-fluorobenzoic acid used in Step 3 of Example 1.

$^1$H NMR (300 MHz, CDCl$_3$) δ 11.70 (br, 1H), 8.34 (s, 1H), 7.96-7.95 (m, 1H), 7.53-7.34 (m, 3H), 7.14-7.13 (m, 1H), 6.27 (s, 1H), 3.63-3.62 (m, 4H), 2.74-2.73 (m, 6H), 2.56-2.55 (m, 2H), 1.94-1.93 (m, 2H).

<Example 11> Preparation of 7-fluoro-3-(3-(4-(3-nitrophenyl)piperazin-1-yl)propyl)isoquinolin-1(2H)-one

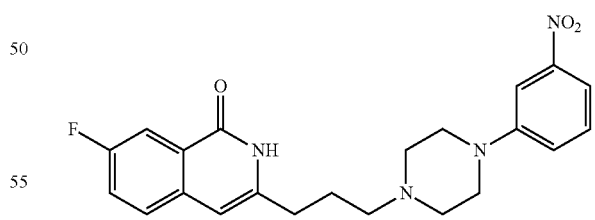

The target compound was obtained according to Example 1, except that 1-bromo-3-nitrobenzene was used in place of 4-bromobenzonitrile used in Step 1 of Example 1, and 2-bromo-5-fluorobenzoic acid was used in place of 2-bromo-6-fluorobenzoic acid used in Step 3 of Example 1.

$^1$H NMR (300 MHz, CDCl$_3$) δ 11.53 (br, 1H), 7.95 (d, 1H, J=9.9 Hz), 7.77 (m, 1H), 7.67 (d, 1H, J=7.8 Hz), 7.47-7.41 (m, 1H), 7.39-7.18 (m, 3H), 6.26 (s, 1H), 3.56-3.53 (m, 4H), 2.77-2.70 (m, 6H), 2.56 (t, 2H, J=5.9 Hz), 1.93 (m, 2H).

<Example 12> Preparation of 7-fluoro-3-(3-(4-phenylpiperazin-1-yl)propyl)isoquinolin-1(2H)-one

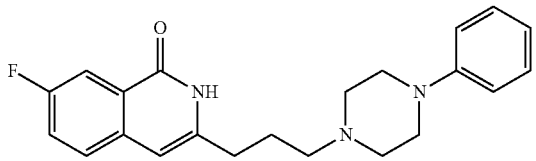 [SMILES: O=c1[nH]c(CCCN2CCN(c3ccccc3)CC2)cc2ccc(F)cc12]

The target compound was obtained according to Example 1, except that 2-bromo-5-fluorobenzoic acid was used in place of 2-bromo-6-fluorobenzoic acid used in Step 3 of Example 1, and 1-phenylpiperazine was used in place of 4-(piperazin-1-yl)benzonitrile 2HCl used in Step 8 of Example 1.

$^1$H NMR (300 MHz, CDCl$_3$) δ 11.38 (br, 1H), 7.98-7.95 (m, 1H), 7.47-7.42 (m, 1H), 7.36-7.30 (m, 3H), 6.99-6.97 (m, 2H), 6.89-6.85 (m, 1H), 6.26 (s, 1H), 3.44-3.41 (m, 4H), 2.73-2.67 (m, 6H), 2.54-2.50 (m, 2H), 1.94-1.90 (m, 2H).

<Example 13> Preparation of 7-fluoro-3-(3-(4-(pyrimidin-2-yl)piperazin-1-yl)propyl)isoquinolin-1(2H)-one

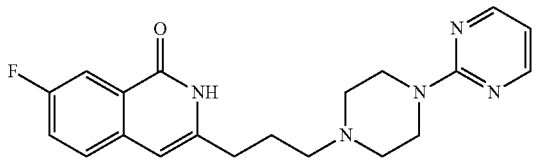 [SMILES: O=c1[nH]c(CCCN2CCN(c3ncccn3)CC2)cc2ccc(F)cc12]

The target compound was obtained according to Example 1, except that 2-bromo-5-fluorobenzoic acid was used in place of 2-bromo-6-fluorobenzoic acid used in Step 3 of Example 1, and 1-(2-pyrimidyl)piperazine was used in place of 4-(piperazin-1-yl)benzonitrile 2HCl used in Step 8 of Example 1.

$^1$H NMR (300 MHz, CDCl$_3$) δ 8.32-8.30 (m, 2H), 7.98-7.95 (m, 1H), 7.44-7.42 (m, 1H), 7.34-7.31 (m, 1H), 6.50-6.52 (m, 1H), 6.26 (s, 1H), 4.08-4.02 (m, 4H), 2.73-2.71 (m, 2H), 2.65-2.62 (m, 4H), 2.52-2.50 (m, 2H), 1.93-1.90 (m, 2H).

<Example 14> Preparation of 7-fluoro-3-(3-(4-(pyridin-2-yl)piperazin-1-yl)propyl)isoquinolin-1(2H)-one

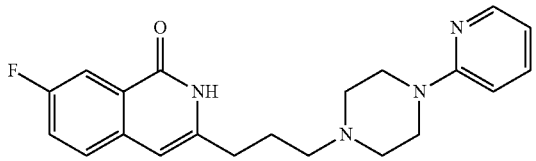 [SMILES: O=c1[nH]c(CCCN2CCN(c3ccccn3)CC2)cc2ccc(F)cc12]

The target compound was obtained according to Example 1, except that 2-bromopyridine was used in place of 4-bromobenzonitrile used in Step 1 of Example 1, and 2-bromo-5-fluorobenzoic acid was used in place of 2-bromo-6-fluorobenzoic acid used in Step 3 of Example 1.

$^1$H NMR (300 MHz, CDCl$_3$) δ 8.20-8.19 (m, 1H), 7.98-7.95 (m, 1H), 7.49-7.42 (m, 2H), 7.34-7.32 (m, 1H), 6.69-6.66 (m, 1H), 6.63-6.61 (m, 1H), 6.26 (s, 1H), 3.79-3.76 (m, 4H), 2.69-2.66 (m, 6H), 2.54-2.50 (m, 2H), 1.93-1.91 (m, 2H).

<Example 15> Preparation of 7-fluoro-3-(3-(4-(4-fluorophenyl)piperazin-1-yl)propyl)isoquinolin-1(2H)-one

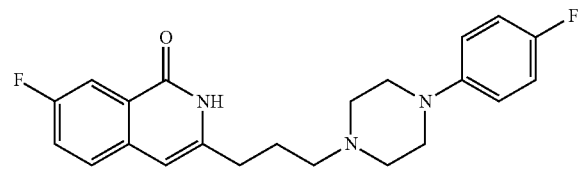 [SMILES: O=c1[nH]c(CCCN2CCN(c3ccc(F)cc3)CC2)cc2ccc(F)cc12]

The target compound was obtained according to Example 1, except that 4-bromofluorobenzene was used in place of 4-bromobenzonitrile used in Step 1 of Example 1, and 2-bromo-5-fluorobenzoic acid was used in place of 2-bromo-6-fluorobenzoic acid used in Step 3 of Example 1.

$^1$H NMR (300 MHz, CDCl$_3$) δ 11.53 (br, 1H), 7.99-7.96 (m, 1H), 7.47-7.42 (m, 1H), 7.36-7.33 (m, 1H), 6.97-6.94 (m, 4H), 3.36-3.32 (m, 4H), 2.75-2.67 (m, 6H), 2.55-2.51 (m, 2H), 1.92-1.90 (m, 2H).

<Example 16> Preparation of 7-fluoro-3-(3-(4-(3-(trifluoromethoxy)phenyl)piperazin-1-yl)propyl)isoquinolin-1(2H)-one

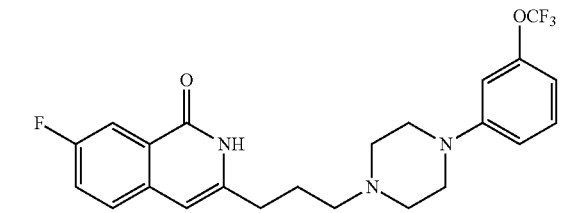 [SMILES: O=c1[nH]c(CCCN2CCN(c3cccc(OC(F)(F)F)c3)CC2)cc2ccc(F)cc12]

The target compound was obtained according to Example 1, except that 1-bromo-3-(trifluoromethoxy)benzene was used in place of 4-bromobenzonitrile used in Step 1 of Example 1, and 2-bromo-5-fluorobenzoic acid was used in place of 2-bromo-6-fluorobenzoic acid used in Step 3 of Example 1.

$^1$H NMR (300 MHz, CDCl$_3$) δ 11.46 (br, 1H), 7.97 (dd, 1H, J=9.3 Hz, 2.7 Hz), 7.47-7.43 (m, 1H), 7.37-7.22 (m, 2H), 6.86 (dd, 1H, J=8.3 Hz, 2.0 Hz), 6.76 (s, 1H), 6.70 (d, 1H, J=7.8 Hz), 6.26 (s, 1H), 3.46-3.43 (m, 4H), 2.74-2.69 (m, 6H), 2.54 (t, 2H, J=6.2 Hz), 1.93 (m, 2H).

<Example 17> Preparation of 3-(3-(4-(3-chlorophenyl)piperazin-1-yl)propyl)-7-fluoroisoquinolin-1(2H)-one

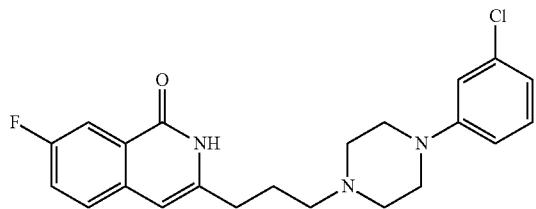 [SMILES: O=c1[nH]c(CCCN2CCN(c3cccc(Cl)c3)CC2)cc2ccc(F)cc12]

The target compound was obtained according to Example 1, except that 1-bromo-3-chlorobenzene was used in place of 4-bromobenzonitrile used in Step 1 of Example 1, and 2-bromo-5-fluorobenzoic acid was used in place of 2-bromo-6-fluorobenzoic acid used in Step 3 of Example 1.

$^1$H NMR (300 MHz, CDCl$_3$) δ 11.41 (br, 1H), 7.97 (dd, 1H, J=9.3 Hz, 2.7 Hz), 7.47-7.42 (m, 1H), 7.37-7.30 (m, 1H), 7.17 (t, 1H, J=8.1 Hz), 6.92 (s, 1H), 6.84-6.81 (m, 2H), 6.26 (s, 1H), 3.44-3.41 (m, 4H), 2.71-2.68 (m, 6H), 2.52 (t, 2H, J=6.0 Hz), 1.96-1.88 (m, 2H).

<Example 18> Preparation of methyl 3-(4-(3-(7-fluoro-1-oxo-1,2-dihydroisoquinolin-3-yl)propyl)piperazin-1-yl)benzoate

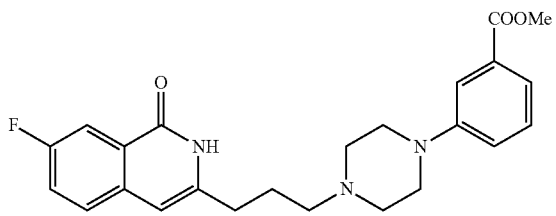 [SMILES: COC(=O)c1cccc(N2CCN(CCCc3cc4ccc(F)cc4c(=O)[nH]3)CC2)c1]

The target compound was obtained according to Example 1, except that methyl 3-bromobenzoate was used in place of the 4-bromobenzonitrile used in Step 1 of Example 1, and 2-bromo-5-fluorobenzoic acid was used in place of 2-bromo-6-fluorobenzoic acid used in Step 3 of Example 1.

$^1$H NMR (300 MHz, CDCl$_3$) δ 11.41 (br, 1H), 7.97 (dd, 1H, J=9.3 Hz, 2.4 Hz), 7.64 (s, 1H), 7.54-7.51 (m, 1H), 7.47-7.42 (m, 1H), 7.37-7.30 (m, 2H), 7.15 (dd, 1H, J=8.4 Hz, 1.8 Hz), 6.26 (s, 1H), 3.91 (s, 3H), 3.49-3.46 (m, 4H), 2.75-2.68 (m, 6H), 2.53 (t, 2H, J=6.0 Hz), 1.95-1.90 (m, 2H).

<Example 19> Preparation of 3-(4-(3-(7-fluoro-1-oxo-1,2-dihydroisoquinolin-3-yl)propyl)piperazin-1-yl)benzoic acid

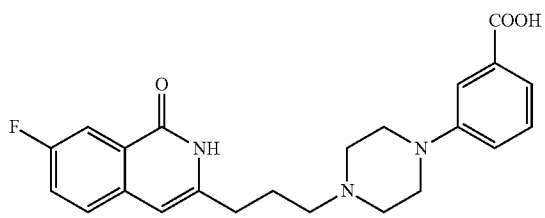 [SMILES: O=C(O)c1cccc(N2CCN(CCCc3cc4ccc(F)cc4c(=O)[nH]3)CC2)c1]

After dissolving methyl 3-(4-(3-(7-fluoro-1-oxo-1,2-dihydroisoquinolin-3-yl)propyl)piperazin-1-yl)benzoate (300 mg, 0.708 mmol) in THF (3 mL), MeOH (1 mL), and H$_2$O (1 mL), LiOH (74 mg, 1.76 mmol) was added and stirred at room temperature for 12 hours. The reaction solution was concentrated by evaporation under reduced pressure, diluted with EtOAc, and then 2 N HCl was slowly added dropwise to adjust the pH to 6. The organic solvent was dried over anhydrous MgSO$_4$, filtered, and then concentrated by evaporation under reduced pressure, and the resulting solid was filtered to obtain 3-(4-(3-(7-fluoro-1-oxo-1,2-dihydroisoquinolin-3-yl)propyl)piperazin-1-yl)benzoic acid (64 mg, 22%).

$^1$H NMR (300 MHz, DMSO-d$_6$) δ 11.52 (br, 1H), 7.80-7.76 (m, 1H), 7.67-7.66 (m, 1H), 7.59-7.56 (m, 1H), 7.45 (s, 1H), 7.35 (m, 2H), 7.21 (m, 1H), 6.44 (s, 1H), 3.20 (m, 4H), 2.51 (m, 6H), 2.39 (m, 2H), 1.84 (m, 2H).

<Example 20> Preparation of N-(3-(4-(3-(7-fluoro-1-oxo-1,2-dihydroisoquinolin-3-yl)propyl)piperazin-1-yl)phenyl)acetamide

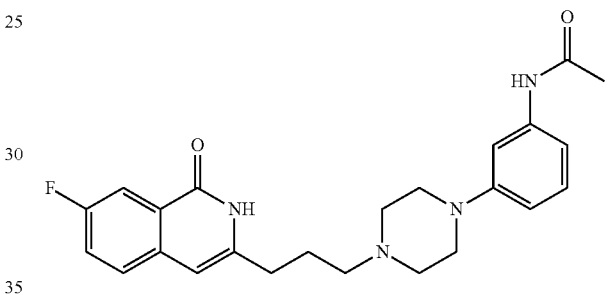

Step 1: Preparation of 7-fluoro-3-(3-(4-(3-nitrophenyl)piperazin-1-yl)propyl)isoquinolin-1(2H)-one

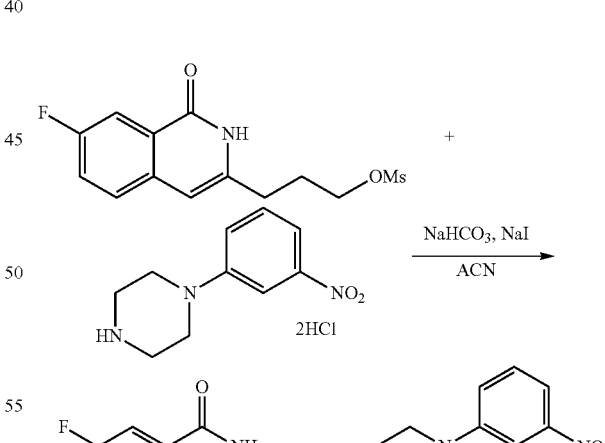

After dissolving 3-(7-fluoro-1-oxo-1,2-dihydroisoquinolin-3-yl)propyl methanesulfonate (1.5 g, 5.01 mmol) and 1-(3-nitrophenyl)piperazine HCl (2.1 g, 7.52 mmol) in CH$_3$CN (100 mL), NaI (1.5 g, 10.02 mmol) was added dropwise at room temperature. NaHCO$_3$ (2.1 g, 25.05 mmol) was slowly added dropwise to the reaction solution, followed by stirring at 80° C. for 17 hours. The reaction solution was diluted with EtOAc and washed with water, and the organic solvent was dried over anhydrous MgSO$_4$, filtered, and then concentrated by evaporation under reduced pressure. The resulting residue was separated and purified using silica gel chromatography to obtain the target compound, 7-fluoro-3-(3-(4-(3-nitrophenyl)piperazin-1-yl)propyl)isoquinolin-1(2H)-one (1.24 g, 60%).

$^1$H NMR (300 MHz, CDCl$_3$) δ 11.53 (br, 1H), 7.95 (d, 1H, J=9.9 Hz), 7.77 (m, 1H), 7.67 (d, 1H, J=7.8 Hz), 7.47-7.41 (m, 1H), 7.39-7.18 (m, 3H), 6.26 (s, 1H), 3.56-3.53 (m, 4H), 2.77-2.70 (m, 6H), 2.56 (t, 2H, J=5.9 Hz), 1.93 (m, 2H).

Step 2: Preparation of 3-(3-(4-(3-aminophenyl)piperazin-1-yl)propyl)-7-fluoroisoquinolin-1(2H)-one

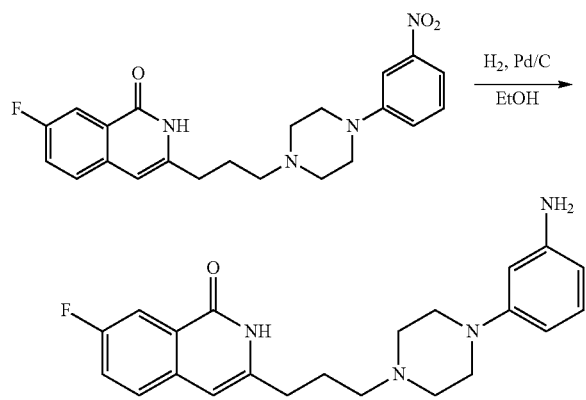

After dissolving 7-fluoro-3-(3-(4-(3-nitrophenyl)piperazin-1-yl)propyl)isoquinolin-1(2H)-one (400 mg, 0.97 mmol) in EtOH (5 mL) at room temperature, Pd/C (40 mg) was slowly added dropwise, followed by stirring under H$_2$ for 7 hours. The reaction solution was filtered and then concentrated by evaporation under reduced pressure to obtain the target compound, 3-(3-(4-(3-aminophenyl)piperazin-1-yl)propyl)-7-fluoroisoquinolin-1(2H)-one (216 mg, 58%).

$^1$H NMR (300 MHz, CDCl$_3$) δ 11.31 (br, 1H), 7.98 (d, 1H, J=8.7 Hz), 7.46-7.42 (m, 1H), 7.36-7.31 (m, 1H), 7.05 (t, 1H, J=7.8 Hz), 6.40 (d, 1H, J=8.4 Hz), 6.30 (m, 1H), 6.25-6.22 (m, 2H), 3.60-3.54 (br, 2H), 3.37 (m, 4H), 2.69 (m, 6H), 2.50 (t, 2H, J=5.9 Hz), 1.93-1.97 (m, 2H).

Step 3: Preparation of N-(3-(4-(3-(7-fluoro-1-oxo-1,2-dihydroisoquinolin-3-yl)propyl)piperazin-1-yl)phenyl)acetamide

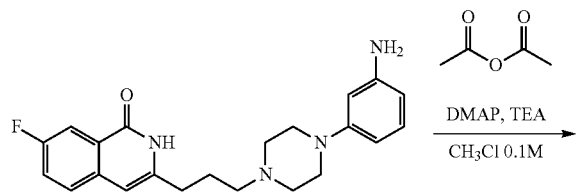

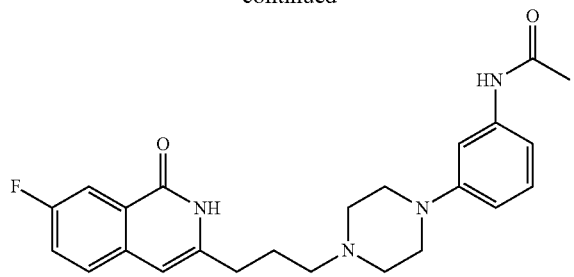

After dissolving 3-(3-(4-(3-aminophenyl)piperazin-1-yl)propyl)-7-fluoroisoquinolin-1(2H)-one (320 mg, 0.84 mmol), DMAP (103 mg, 0.84 mmol), and acetic anhydride (0.24 mL, 2.52 mmol) in CH$_3$Cl (8.4 mL) at room temperature, TEA (0.35 mL, 2.52 mmol) was slowly added dropwise to the reaction solution, followed by stirring at 60° C. for 7 hours. The reaction solution was diluted with EtOAc and washed with water, and the organic solvent was dried over anhydrous MgSO$_4$, filtered, and then concentrated by evaporation under reduced pressure. The resulting residue was separated and purified using silica gel chromatography to obtain the target compound, N-(3-(4-(3-(7-fluoro-1-oxo-1,2-dihydroisoquinolin-3-yl)propyl)piperazin-1-yl)phenyl)acetamide (33 mg, 10%).

$^1$H NMR (300 MHz, DMSO-d$_6$) δ 11.51 (br, 1H), 9.79 (br, 1H), 7.78 (d, 1H, J=7.8 Hz), 7.69-7.64 (m, 1H), 7.59-7.53 (m, 1H), 7.23 (m, 1H), 7.13-7.08 (m, 1H), 6.99 (d, 1H, J=7.8 Hz), 6.62 (d, 1H, J=7.8 Hz), 6.43 (s, 1H), 3.11 (m, 4H), 2.57-2.50 (m, 6H), 2.41 (m, 2H), 2.01 (s, 3H), 1.86 (m, 2H).

<Example 21> Preparation of 5-(4-(3-(8-fluoro-5-methyl-1-oxo-1,2-dihydroisoquinolin-3-yl)propyl)piperazin-1-yl)picolinonitrile

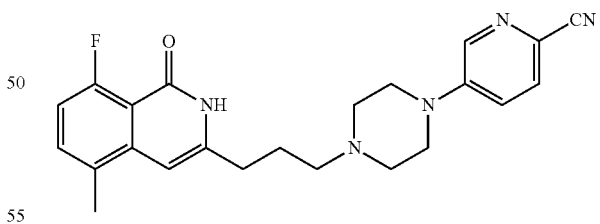

The target compound was obtained according to Example 1, except that 5-bromo-2-cyanopyridine was used in place of 4-bromobenzonitrile used in Step 1 of Example 1, and 2-bromo-3-methyl-6-fluorobenzoic acid was used in place of 2-bromo-6-fluorobenzoic acid used in Step 3 of Example 1.

$^1$H NMR (300 MHz, CDCl$_3$) δ 8.32 (s, 1H), 7.50-7.49 (m, 1H), 1.46-7.38 (m, 1H), 7.11-7.10 (m, 1H), 6.93-6.91 (m, 1H), 6.28 (s, 1H), 3.66-3.64 (m, 4H), 2.74-2.73 (m, 6H), 2.56-2.55 (m, 2H), 2.42 (s, 3H), 1.93-1.91 (m, 2H).

\<Example 22\> Preparation of 6-(4-(3-(8-fluoro-5-methyl-1-oxo-1,2-dihydroisoquinolin-3-yl)propyl)piperazin-1-yl)nicotinonitrile

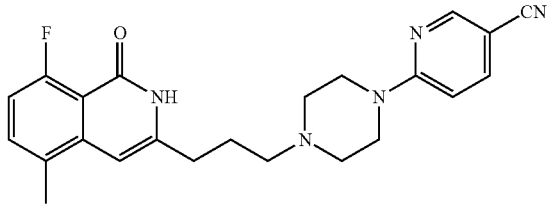 [SMILES: Cc1ccc(F)c2c(=O)[nH]c(CCCN3CCN(c4ccc(C#N)cn4)CC3)cc12]

The target compound was obtained according to Example 1, except that 2-bromo-5-cyanopyridine was used in placed of 4-bromobenzonitrile used in Step 1 of Example 1, and 2-bromo-3-methyl-6-fluorobenzoic acid was used in place of 2-bromo-6-fluorobenzoic acid used in Step 3 of Example 1.

$^1$H NMR (300 MHz, CDCl$_3$) δ 8.32 (s, 1H), 7.50-7.49 (m, 1H), 1.46-7.38 (m, 1H), 7.11-7.10 (m, 1H), 6.93-6.91 (m, 1H), 6.28 (s, 1H), 3.66-3.64 (m, 4H), 2.74-2.73 (m, 6H), 2.56-2.55 (m, 2H), 2.42 (s, 3H), 1.93-1.91 (m, 2H).

\<Example 23\> Preparation of 4-(4-(3-(8-fluoro-5-methyl-1-oxo-1,2-dihydroisoquinolin-3-yl)propyl)piperazin-1-yl)benzonitrile

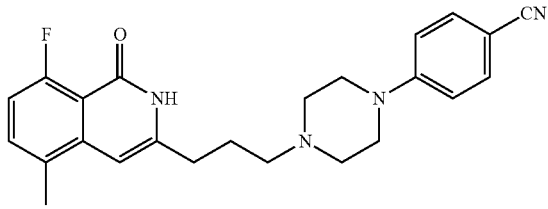 [SMILES: Cc1ccc(F)c2c(=O)[nH]c(CCCN3CCN(c4ccc(C#N)cc4)CC3)cc12]

The target compound was obtained according to Example 1, except that 2-bromo-3-methyl-6-fluorobenzoic acid was used in place of 2-bromo-6-fluorobenzoic acid used in Step 3 of Example 1.

$^1$H NMR (300 MHz, CDCl$_3$) δ 7.50-7.47 (m, 2H), 7.35-7.33 (m, 1H), 6.95-6.86 (m, 3H), 6.27 (s, 1H), 3.61-3.60 (m, 4H), 2.72-2.71 (m, 6H), 2.55-2.54 (m, 2H), 2.43 (s, 3H), 1.93-1.92 (m, 2H).

\<Example 24\> Preparation of 8-fluoro-5-methyl-3-(3-(4-(pyridin-2-yl)piperazin-1-yl)propyl)isoquinolin-1(2H)-one

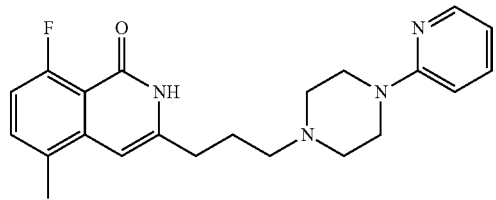 [SMILES: Cc1ccc(F)c2c(=O)[nH]c(CCCN3CCN(c4ccccn4)CC3)cc12]

The target compound was obtained according to Example 1, except that 2-bromopyridine was used in place of 4-bromobenzonitrile used in Step 1 of Example 1, and 2-bromo-3-methyl-6-fluorobenzoic acid was used in place of 2-bromo-6-fluorobenzoic acid used in Step 3 of Example 1.

$^1$H NMR (300 MHz, CDCl$_3$) δ 8.18-8.17 (m, 1H), 7.47-7.46 (m, 1H), 7.34-7.33 (m, 1H), 6.91-6.90 (m, 1H), 6.76-6.64 (m, 2H), 6.26 (s, 1H), 3.79-3.78 (m, 4H), 2.68-2.67 (m, 6H), 2.52-2.51 (m, 2H), 2.42 (s, 3H), 1.93-1.92 (m, 2H).

\<Example 25\> Preparation of 8-fluoro-5-methyl-3-(3-(4-(pyrimidin-2-yl)piperazin-1-yl)propyl)isoquinolin-1(2H)-one

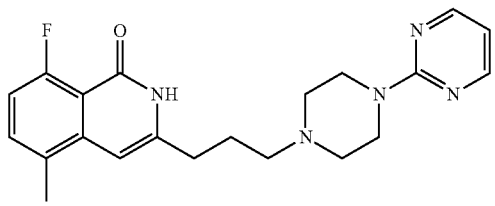 [SMILES: Cc1ccc(F)c2c(=O)[nH]c(CCCN3CCN(c4ncccn4)CC3)cc12]

The target compound was obtained according to Example 1, except that 2-bromo-3-methyl-6-fluorobenzoic acid was used in place of 2-bromo-6-fluorobenzoic acid used in Step 3 of Example 1, and 1-(2-pyrimidyl)piperazine was used in place of 4-(piperazin-1-yl)benzonitrile 2HCl used in Step 8 of Example 1.

$^1$H NMR (300 MHz, CDCl$_3$) δ 8.30-8.29 (m, 2H), 7.34-7.33 (m, 1H), 6.91-6.90 (m, 1H), 6.48-6.47 (m, 1H), 6.26 (s, 1H), 4.08-4.07 (m, 4H), 2.74-2.73 (m, 2H), 2.63-2.62 (m, 4H), 2.52-2.51 (m, 2H), 2.42 (s, 3H), 1.92-1.91 (m, 2H).

\<Example 26\> Preparation of 3-fluoro-4-(4-(3-(8-fluoro-5-methyl-1-oxo-1,2-dihydroisoquinolin-3-yl)propyl)piperazin-1-yl)benzonitrile

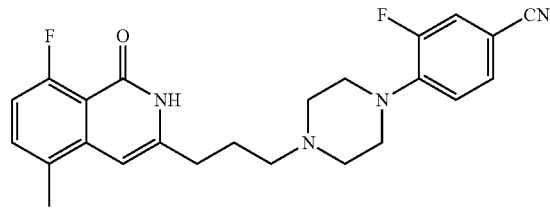 [SMILES: Cc1ccc(F)c2c(=O)[nH]c(CCCN3CCN(c4ccc(C#N)cc4F)CC3)cc12]

The target compound was obtained according to Example 1, except that 4-bromo-3-fluorobenzonitrile was used in place of 4-bromobenzonitrile used in Step 1 of Example 1, and 2-bromo-3-methyl-6-fluorobenzoic acid was used in place of 2-bromo-6-fluorobenzoic acid used in Step 3 of Example 1.

$^1$H NMR (300 MHz, CDCl$_3$) δ 11.79 (br, 1H), 7.35-7.334 (m, 2H), 7.27-7.25 (m, 1H), 7.03-7.01 (m, 1H), 6.95-6.92 (m, 1H), 6.27 (s, 1H), 3.50-3.48 (m, 4H), 2.78-2.76 (m, 6H), 2.57-2.55 (m, 2H), 2.42 (s, 3H), 1.93-1.91 (m, 2H).

<Example 27> Preparation of 8-fluoro-5-methyl-3-(3-(4-(4-(trifluoromethyl)phenyl)piperazin-1-yl)propyl)isoquinolin-1(2H)-one

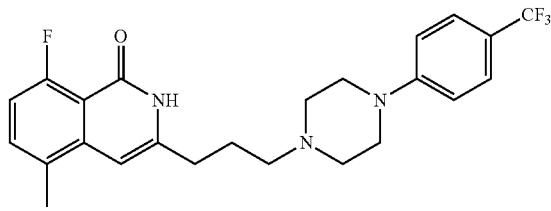 [SMILES: Cc1ccc(F)c2c(=O)[nH]c(CCCN3CCN(c4ccc(C(F)(F)F)cc4)CC3)cc12]

The target compound was obtained according to Example 1, except that 4-bromobenzotrifluoride was used in place of 4-bromobenzonitrile used in Step 1 of Example 1, and 2-bromo-3-methyl-6-fluorobenzoic acid was used in place of 2-bromo-6-fluorobenzoic acid used in Step 3 of Example 1.

$^1$H NMR (300 MHz, CDCl$_3$) δ 11.51 (br, 1H), 7.48-7.45 (m, 2H), 7.37-7.35 (m, 1H), 6.96-6.88 (m, 3H), 6.28 (s, 1H), 3.54-3.51 (m, 4H), 2.72-2.70 (m, 6H), 2.55-2.51 (m, 2H), 2.42 (m, 3H), 1.95-1.91 (m, 2H).

<Example 28> Preparation of 2-(4-(3-(8-fluoro-5-methyl-1-oxo-1,2-dihydroisoquinolin-3-yl)propyl)piperazin-1-yl)benzonitrile

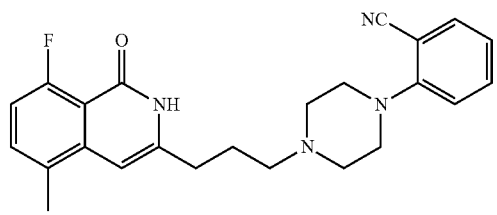 [SMILES: Cc1ccc(F)c2c(=O)[nH]c(CCCN3CCN(c4ccccc4C#N)CC3)cc12]

The target compound was obtained according to Example 1, except that 2-bromobenzonitrile was used in place of the 4-bromobenzonitrile used in Step 1 of Example 1, and 2-bromo-3-methyl-6-fluorobenzoic acid was used in place of 2-bromo-6-fluorobenzoic acid used in Step 3 of Example 1.

$^1$H NMR (300 MHz, CDCl$_3$) δ 11.91 (br, 1H), 7.59-7.48 (m, 2H), 7.35 (dd, 1H, J=8.0 Hz, 5.0 Hz), 7.16 (d, 1H, J=8.1 Hz), 7.02 (t, 1H, J=7.7 Hz), 6.92 (dd, 1H, J=11.9 Hz, 8.3 Hz), 6.28 (s, 1H), 3.52-3.49 (m, 4H), 2.82 (m, 4H), 2.74 (t, 2H, J=6.2 Hz), 2.58 (t, 2H, J=5.6 Hz), 2.43 (s, 3H), 1.92 (m, 2H).

<Example 29> Preparation of 8-fluoro-5-methyl-3-(3-(4-(thiazole-2-yl)piperazin-1-yl)propyl)isoquinolin-1(2H)-one

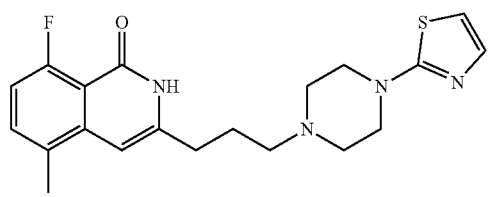 [SMILES: Cc1ccc(F)c2c(=O)[nH]c(CCCN3CCN(c4nccs4)CC3)cc12]

The target compound was obtained according to Example 1, except that 2-bromothiazole was used in place of 4-bromobenzonitrile used in Step 1 of Example 1, and 2-bromo-3-methyl-6-fluorobenzoic acid was used in place of 2-bromo-6-fluorobenzoic acid used in Step 3 of Example 1.

$^1$H NMR (300 MHz, CDCl$_3$) δ 11.48 (br, 1H), 7.35 (dd, 1H, J=7.8 Hz, 4.8 Hz), 7.20 (d, 1H, J=3.3 Hz), 6.93 (dd, 1H, J=11.3 Hz, 8.3 Hz), 6.57 (d, 1H, J=3.6 Hz), 6.28 (s, 1H), 3.75 (m, 4H), 2.74-2.67 (m, 6H), 2.53 (t, 2H, J=6.2 Hz), 2.43 (s, 3H), 1.97-1.89 (m, 2H).

<Example 30> Preparation of 8-fluoro-5-methyl-3-(3-(4-(5-methylthiazole-2-yl)piperazin-1-yl)propyl)isoquinolin-1(2H)-one

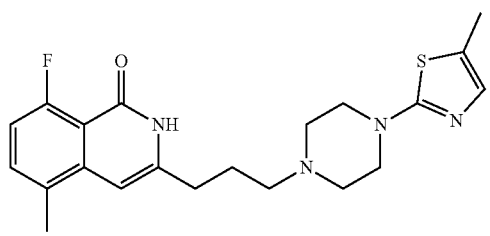 [SMILES: Cc1cnc(N2CCN(CCCc3cc4c(C)ccc(F)c4c(=O)[nH]3)CC2)s1]

The target compound was obtained according to Example 1, except that 2-bromo-5-methylthiazole was used in place of 4-bromobenzonitrile used in Step 1 of Example 1, and 2-bromo-3-methyl-6-fluorobenzoic acid was used in place of 2-bromo-6-fluorobenzoic acid used in Step 3 of Example 1.

$^1$H NMR (300 MHz, CDCl$_3$) δ 11.46 (br, 1H), 7.37-7.33 (m, 1H), 6.96-6.89 (m, 1H), 6.81 (s, 1H), 6.28 (s, 1H), 3.68-3.65 (m, 4H), 2.73-2.64 (m, 6H), 2.51 (t, 2H, J=5.9 Hz), 2.43 (s, 3H), 2.30 (s, 3H), 1.92 (m, 2H).

<Example 31> Preparation of (R)-8-fluoro-3-(3-(3-(4-fluorophenyl)pyrrolidin-1-yl)propyl)-5-methylisoquinolin-1(2H)-one

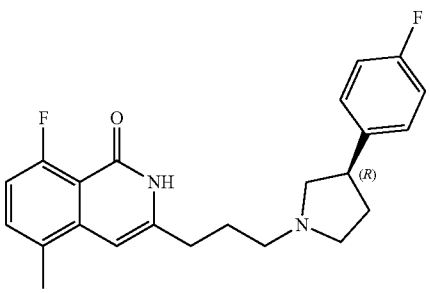

The target compound was obtained according to Example 1, except that 2-bromo-3-methyl-6-fluorobenzoic acid was used in place of 2-bromo-6-fluorobenzoic acid used in Step 3 of Example 1, and (R)-3-(4-fluorophenyl)pyrrolidine was used in place of 4-(piperazin-1-yl)benzonitrile 2HCl used in Step 8 of Example 1.

$^1$H NMR (300 MHz, CDCl$_3$) δ 12.13 (br, 1H), 7.37-7.30 (m, 3H), 7.01-6.89 (m, 3H), 6.28 (s, 1H), 3.69-3.60 (m, 1H), 3.31-3.26 (m, 1H), 3.13-3.05 (m, 1H), 2.78-2.46 (m, 4H), 2.42 (s, 3H), 2.14-1.97 (m, 4H), 1.90 (m, 2H).

<Example 32> Preparation of (S)-8-fluoro-3-(3-(3-(4-fluorophenyl)pyrrolidin-1-yl)propyl)-5-methylisoquinolin-1(2H)-one

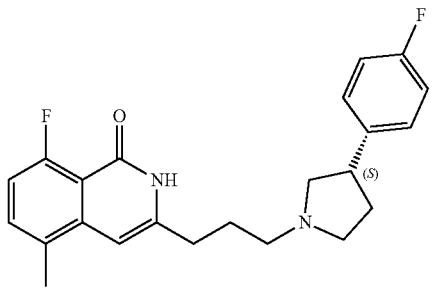

The target compound was obtained according to Example 1, except that 2-bromo-3-methyl-6-fluorobenzoic acid was used in place of 2-bromo-6-fluorobenzoic acid used in Step 3 of Example 1, and (S)-3-(4-fluorophenyl)pyrrolidine was used in place of 4-(piperazin-1-yl)benzonitrile 2HCl used in Step 8 of Example 1.

$^1$H NMR (300 MHz, CDCl$_3$) δ 12.16 (br, 1H), 7.37-7.25 (m, 3H), 7.01-6.89 (m, 3H), 6.27 (s, 1H), 3.72-3.60 (m, 1H), 3.31-3.25 (m, 1H), 3.12-3.05 (m, 1H), 2.77-2.46 (m, 4H), 2.42 (s, 3H), 2.07-1.87 (m, 6H).

<Example 33> Preparation of 3-(3-(4-(4-chlorophenyl)piperazin-1-yl)propyl)-8-fluoro-5-methylisoquinolin-1(2H)-one

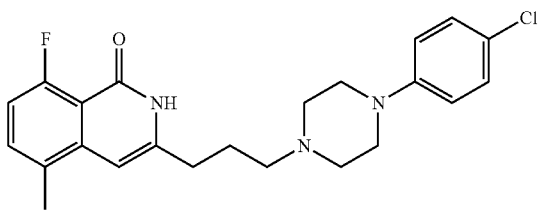 [SMILES: Cc1ccc(F)c2c(=O)[nH]c(CCCN3CCN(c4ccc(Cl)cc4)CC3)cc12]

The target compound was obtained according to Example 1, except that 1-bromo-4-chlorobenzene was used in place of 4-bromobenzonitrile used in Step 1 of Example 1, and 2-bromo-3-methyl-6-fluorobenzoic acid was used in place of 2-bromo-6-fluorobenzoic acid used in Step 3 of Example 1.

$^1$H NMR (300 MHz, CDCl$_3$) δ 11.41 (br, 1H), 7.36-7.33 (m, 1H), 7.20-7.17 (m, 2H), 6.94-6.85 (m, 3H), 6.27 (s, 1H), 3.34-3.32 (m, 4H), 2.70-2.69 (m, 4H), 2.53-2.48 (m, 2H), 2.42 (s, 3H), 2.38-2.37 (m, 2H), 1.94-1.90 (m, 2H).

<Example 34> Preparation of 4-(4-(3-(7-fluoro-5-methyl-1-oxo-1,2-dihydroisoquinolin-3-yl)propyl)piperazin-1-yl)benzonitrile

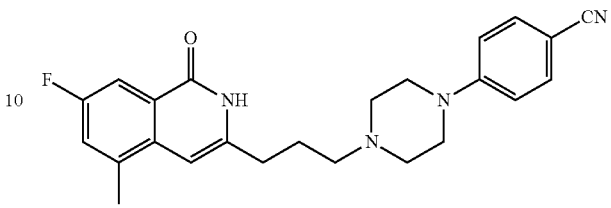

Step 1: Preparation of methyl 5-fluoro-2-hydroxy-3-methylbenzoate

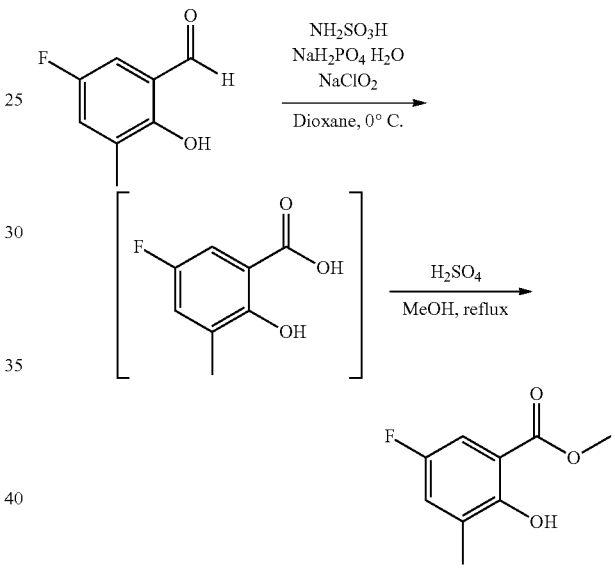

After dissolving 5-fluoro-2-hydroxy-3-methylbenzaldehyde (24 g, 155.7 mmol) and sulfamic acid (22.7 g, 622.8 mmol) in dioxane (1944 mL), an aqueous solution of sodium dihydrogen phosphate monohydrate (0.25 M, 630 mL) was slowly added dropwise, and a sodium chlorite aqueous solution (2 M, 80 mL) was added dropwise at 0° C. The mixture was stirred at 0° C. for 30 minutes, and then Na$_2$SO$_3$ was added dropwise and stirred for 10 minutes. The reaction solution was diluted with EtOAc and washed with 1 N HCl and water, and the organic solvent was dried over anhydrous MgSO$_4$, filtered, and then concentrated by evaporation under reduced pressure to obtain a mixed solution of 5-fluoro-2-hydroxy-3-methylbenzoic acid (26 g, 100%). The mixture solution was diluted with methanol (1 L), and sulfuric acid (60 mL) was slowly added dropwise and refluxed for 15 hours. The reaction solution was cooled to room temperature, diluted with EtOAc, and then washed with water. The organic solvent was dried over anhydrous MgSO$_4$, filtered, and then concentrated by evaporation under reduced pressure to obtain the target compound, 5-fluoro-2-hydroxy-3-methyl benzoate (31.28 g, 58%).

$^1$H NMR (300 MHz, CDCl$_3$) δ 10.78 (s, 1H), 7.35-7.33 (m, 1H), 7.09-7.06 (m, 1H), 3.94 (s, 3H), 2.26 (s, 3H).

Step 2: Preparation of methyl 5-fluoro-3-methyl-2-(((trifluoromethyl)sulfonyl)oxy)benzoate

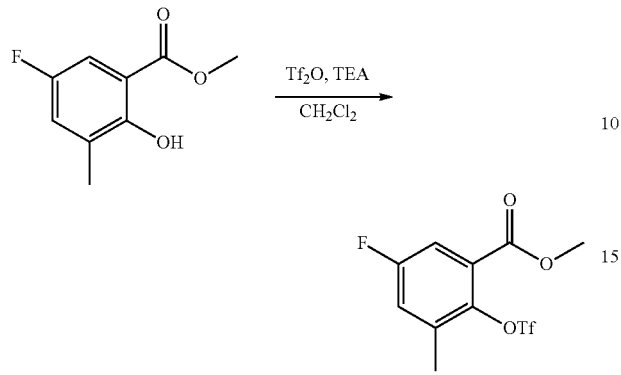

Methyl 5-fluoro-2-hydroxy-3-methyl benzoate (1.0 g, 5.43 mmol) was added to CH$_2$Cl$_2$ (1 L), and triflic anhydride (2.3 g, 8.15 mmol) was added dropwise. The mixture was stirred for 10 minutes, and TEA (1.1 g, 10.86 mmol) was added dropwise, followed by stirring at room temperature for 15 hours. The reaction solution was diluted with EtOAc and washed with water. The organic solvent was dried over anhydrous MgSO$_4$, filtered, and then concentrated by evaporation under reduced pressure, and the resulting residue was separated and purified using silica gel chromatography to obtain the target compound, methyl 5-fluoro-3-methyl-2-(((trifluoromethyl)sulfonyl)oxy)benzoate (1.5 g, 87%).

$^1$H NMR (300 MHz, CDCl$_3$) δ 7.53-7.52 (m, 1H), 7.20-7.17 (m, 1H), 3.94 (s, 3H), 2.43 (s, 3H).

Step 3: Preparation of methyl 5-fluoro-2-(5-hydroxypent-1-yn-yl)-3-methyl benzoate

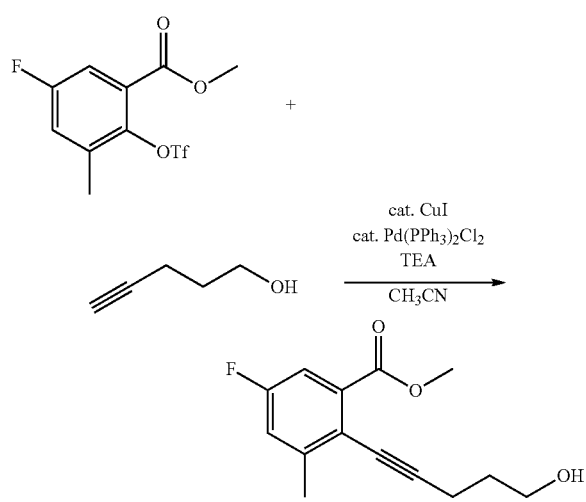

After dissolving methyl 5-fluoro-3-methyl-2-(((trifluoromethyl)sulfonyl)oxy)benzoate (52 g, 164.4 mmol) in acetonitrile (822 mL), pent-4-yn-1-ol (16.6 g, 197.28 mmol), Pd(PPh$_3$)$_2$Cl$_2$ (5.77 g, 8.22 mmol), and CuI (1.57 g, 8.22 mmol) were added dropwise. Then, TEA (50.0 g, 493.2 mmol) was added dropwise, and the mixture was stirred at 80° C. for 15 hours and then cooled to room temperature. The reaction solution was diluted with EtOAc and washed with an NH$_4$Cl aqueous solution. The organic solvent was dried over MgSO$_4$, filtered, and then concentrated by evaporation under reduced pressure, and the resulting residue was purified using silica gel chromatography to obtain the target compound, methyl 5-fluoro-2-(5-hydroxypent-1-yn-yl)-3-methyl benzoate (24.35 g, 59%).

$^1$H NMR (300 MHz, CDCl$_3$) δ 7.41 (d, J=9.0 Hz, 1H), 7.10 (d, J=8.7 Hz, 1H), 3.91 (s, 3H), 3.88-3.86 (m, 2H), 2.66 (t, J=6.9 Hz, 2H), 2.46 (s, 3H), 2.08 (m, 1H), 1.90 (t, J=6.0 Hz, 2H).

Step 4: Preparation of 7-fluoro-3-(3-hydroxypropyl)-5-methyl-1H-isochromen-1-one

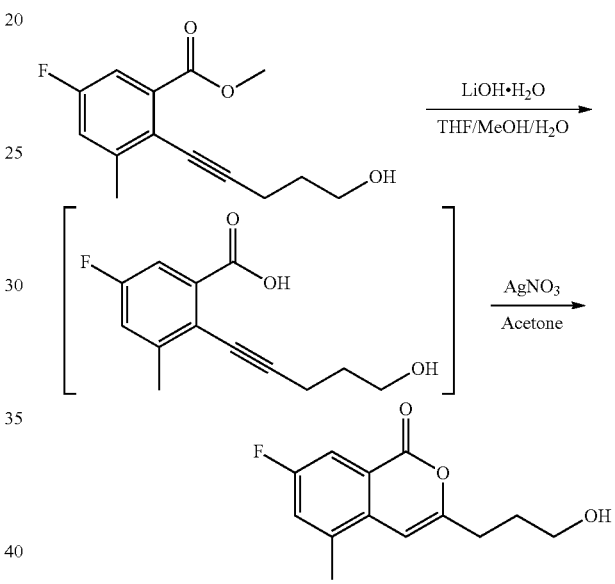

After dissolving methyl 5-fluoro-2-(5-hydroxypent-1-yn-yl)-3-methyl benzoate (24.35 g, 97.3 mmol) in THF/MeOH/H$_2$O (320 mL/80 mL/80 mL), LiOH·H$_2$O (20.4 g, 486.5 mmol) was added dropwise, and the mixture was stirred at room temperature for 15 hours. The reaction solution was concentrated by distillation under reduced pressure and then diluted with EtOAc, and 6 N HCl was slowly added dropwise to adjust the pH to 1 to 2. The organic solvent was dried over MgSO$_4$, filtered, and then concentrated by evaporation under reduced pressure. After dissolving the concentrated reaction solution in acetone (486 mL), AgNO$_3$ (6.1 g, 19.46 mmol) was added dropwise. The reaction solution was stirred at room temperature for 15 hours, and then distilled under reduced pressure to remove the solvent. The reaction solution was diluted with EtOAc and washed with water. The organic solvent was dried over MgSO$_4$, filtered, and then concentrated by evaporation under reduced pressure, and the resulting residue was purified using silica gel chromatography to obtain the target compound, 7-fluoro-3-(3-hydroxypropyl)-5-methyl-1H-isochromen-1-one (8.3 g, 36%).

$^1$H NMR (300 MHz, CDCl$_3$) δ 7.76 (d, J=8.4 Hz, 1H), 7.28-7.24 (m, 1H), 6.38 (s, 1H), 3.75 (t, J=6.0 Hz, 2H), 2.68 (t, J=7.5 Hz, 2H), 2.47 (s, 3H), 2.01-1.94 (m, 2H).

Step 5: Preparation of 7-fluoro-3-(3-hydroxypropyl)-5-methylisoquinolin-1(2H)-one

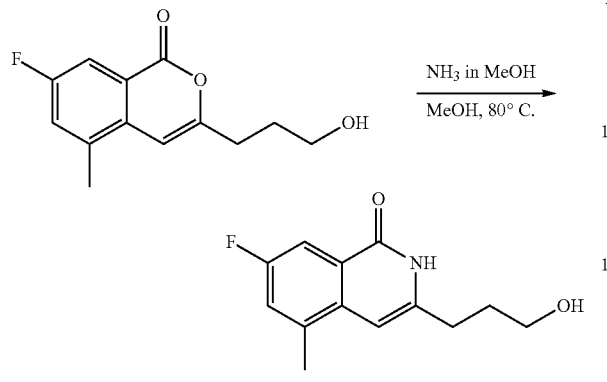

After dissolving 7-fluoro-3-(3-hydroxypropyl)-5-methyl-1H-isochromen-1-one (5.5 g, 23.28 mmol) in 7 N NH₃/MeOH (33 mL), the mixture was stirred at 80° C. for 15 hours. The reaction solution was cooled to room temperature, and then the thus-obtained product was concentrated by evaporation under reduced pressure. The resulting solid was recrystallized with MeOH to obtain the target compound, 7-fluoro-3-(3-hydroxypropyl)-5-methylisoquinolin-1(2H)-one (3.9 g, 71%).

$^1$H NMR (300 MHz, DMSO-d$_6$) δ 7.53 (d, J=9.3 Hz, 1H), 7.32 (d, J=9.3 Hz, 1H), 6.27 (s, 1H), 4.50 (br, 1H), 4.05-4.03 (m, 1H), 3.06-3.05 (m, 2H), 2.46-2.36 (m, 5H), 1.71-1.64 (m, 2H).

Step 6: Preparation of 3-(7-fluoro-5-methyl-1-oxo-1,2-dihydroisoquinolin-3-yl)propyl methanesulfonate

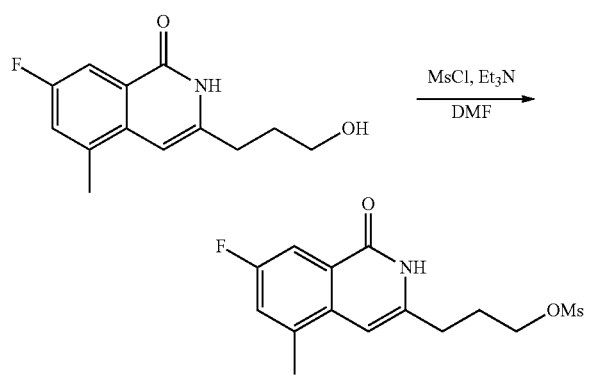

After dissolving 7-fluoro-3-(3-hydroxypropyl)-5-methyl-isoquinolin-1(2H)-one (3.9 g, 16.58 mmol) in DMF (83 mL), the mixture was cooled to 0° C. MsCl (1.7 mL, 21.55 mmol) and TEA (3.5 mL, 24.87 mmol) were slowly added dropwise at 0° C., followed by stirring at 25° C. for 15 hours. The reaction solution was diluted with EtOAc and washed with an NH₄Cl aqueous solution. The organic solvent was dried over MgSO₄, filtered, and then concentrated by evaporation under reduced pressure, and the resulting residue was recrystallized with MeOH to obtain the target compound, 3-(7-fluoro-5-methyl-1-oxo-1,2-dihydroisoquinolin-3-yl) propyl methanesulfonate (4.42 g, 85%).

$^1$H NMR (300 MHz, CDCl$_3$) δ 11.63 (br, 1H), 7.86 (d, J=9.0 Hz, 1H), 7.25 (d, J=9.0 Hz, 1H), 6.49 (s, 1H), 4.35 (t, J=5.7 Hz, 2H), 3.05 (s, 3H), 2.84 (t, J=5.7 Hz, 2H), 2.54 (s, 3H), 2.27 (m, 2H).

Step 7: Preparation of 4-(4-(3-(7-fluoro-5-methyl-1-oxo-1,2-dihydroisoquinolin-3-yl)propyl)piperazin-1-yl)benzonitrile

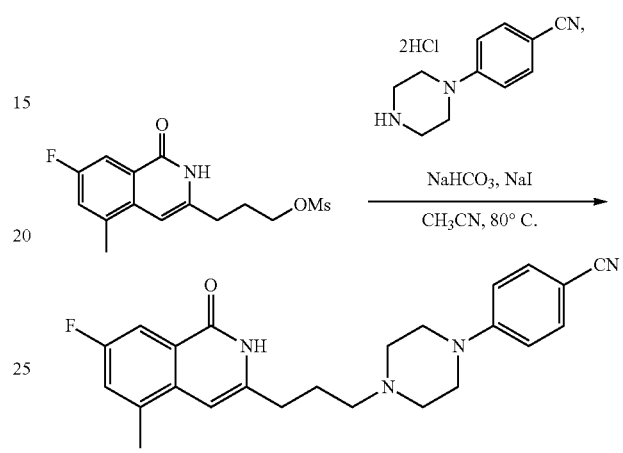

After dissolving 3-(7-fluoro-5-methyl-1-oxo-1,2-dihydroisoquinolin-3-yl)propyl methanesulfonate (200 mg, 0.64 mmol) in acetonitrile (2 mL), 4-(piperazin-1-yl)benzonitrile 2HCl (249 mg, 0.96 mmol) was added dropwise at 25° C. DIPEA (0.56 mL, 3.2 mmol) was added dropwise, and the mixture was heated to 80° C. and stirred for 17 hours. The reaction solution was diluted with EtOAc and washed with a NaS₂O₃ aqueous solution and an NH₄C aqueous solution. The organic solvent was dried over MgSO₄, filtered, and then concentrated by evaporation under reduced pressure, and the resulting residue was recrystallized with MeOH to obtain the target compound, 4-(4-(3-(7-fluoro-5-methyl-1-oxo-1,2-dihydroisoquinolin-3-yl)propyl)piperazin-1-yl) benzonitrile (46 mg, 17%).

$^1$H NMR (300 MHz, CDCl$_3$) δ 11.65 (br, 1H), 7.81-7.80 (m, 1H), 7.51-7.42 (m, 2H), 7.25-7.24 (m, 1H), 6.90-6.87 (m, 2H), 6.34 (s, 1H), 3.56-3.55 (m, 4H), 2.71-2.70 (m, 6H), 2.51-2.50 (m, 2H), 1.93-1.92 (m, 2H).

<Example 35> Preparation of 5-(4-(3-(7-fluoro-5-methyl-1-oxo-1,2-dihydroisoquinolin-3-yl)propyl)piperazin-1-yl)picolinonitrile

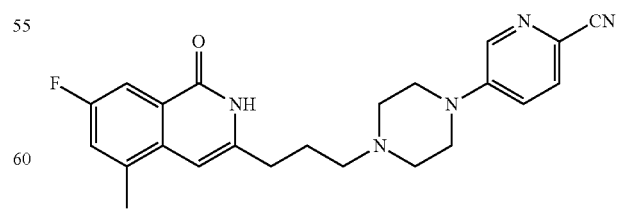

The target compound was obtained according to Example 34, except that 5-(piperazin-1-yl)picolinonitrile 2HCl was used in place of 4-(piperazin-1-yl)benzonitrile 2HCl used in Step 7 of Example 34.

¹H NMR (300 MHz, CDCl₃) δ 12.62 (br, 1H), 8.33 (s, 1H), 7.80-7.78 (m, 1H), 7.53-7.50 (m, 1H), 7.26-7.25 (m, 1H), 7.13-7.12 (m, 1H), 6.34 (s, 1H), 3.64-3.63 (m, 4H), 2.74-2.71 (m, 6H), 2.56-2.55 (m, 2H), 2.50 (s, 3H), 1.94-1.93 (m, 2H).

<Example 36> Preparation of 6-(4-(3-(7-fluoro-5-methyl-1-oxo-1,2-dihydroisoquinolin-3-yl)propyl)piperazin-1-yl)nicotinonitrile

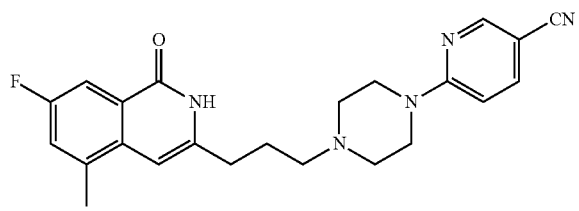

The target compound was obtained according to Example 34, except that 6-(piperazin-1-yl)nicotinonitrile 2HCl was used in place of 4-(piperazin-1-yl)benzonitrile 2HCl used in Step 7 of Example 34.

¹H NMR (300 MHz, CDCl₃) δ 8.40 (s, 1H), 7.84-7.83 (m, 1H), 7.62-7.59 (m, 1H), 7.27-7.26 (m, 1H), 6.63-6.60 (m, 1H), 6.34 (s, 3H), 3.95-3.94 (m, 4H), 2.76-2.75 (m, 2H), 2.66-2.65 (m, 4H), 2.54-2.52 (m, 2H), 2.50 (s, 3H), 1.93-1.92 (m, 2H).

<Example 37> Preparation of 3-fluoro-4-(4-(3-(7-fluoro-5-methyl-1-oxo-1,2-dihydroisoquinolin-3-yl)propyl)piperazin-1-yl)benzonitrile

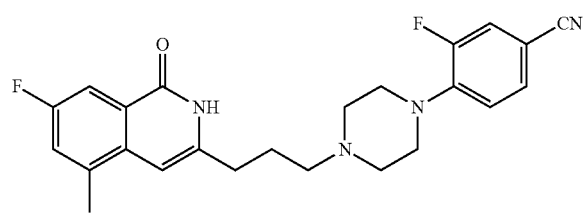 [SMILES: Cc1cc(F)cc2c(=O)[nH]c(CCCN3CCN(c4ccc(C#N)cc4F)CC3)cc12]

The target compound was obtained according to Example 34, except that 3-fluoro-4-(piperazin-1-yl)benzonitrile 2HCl was used in place of 4-(piperazin-1-yl)benzonitrile 2HCl used in Step 7 of Example 34.

¹H NMR (300 MHz, CDCl₃) δ 11.81 (br, 1H), 7.84-7.81 (m, 1H), 7.39-7.36 (m, 1H), 7.29-7.21 (m, 2H), 7.18-7.05 (m, 1H), 7.02-6.99 (m, 1H), 6.33 (s, 1H), 3.49-3.47 (m, 4H), 2.76-2.75 (m, 6H), 2.57-2.55 (m, 2H), 2.50 (s, 3H), 1.93-1.91 (m, 2H).

<Example 38> Preparation of 2-fluoro-4-(4-(3-(7-fluoro-5-methyl-1-oxo-1,2-dihydroisoquinolin-3-yl)propyl)piperazin-1-yl)benzonitrile

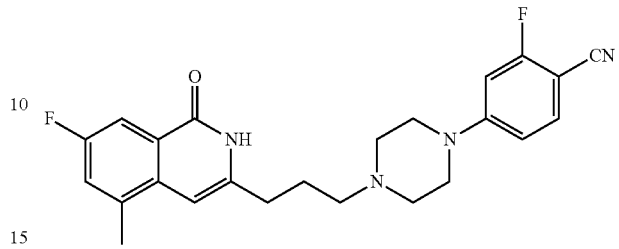

The target compound was obtained according to Example 34, except that 2-fluoro-4-(piperazin-1-yl)benzonitrile 2HCl was used in place of 4-(piperazin-1-yl)benzonitrile 2HCl used in Step 7 of Example 34.

¹H NMR (300 MHz, CDCl₃) δ 7.84-7.83 (m, 1H), 7.40-7.37 (m, 1H), 7.20-7.19 (m, 1H), 6.66-6.63 (m, 1H), 6.56-6.55 (m, 1H), 6.34 (s, 1H), 3.59-3.58 (m, 4H), 2.70-2.69 (m, 6H), 2.55-2.53 (m, 2H), 2.50 (s, 3H), 1.94-1.93 (m, 2H).

<Example 39> Preparation of 7-fluoro-5-methyl-3-(3-(4-(4-(trifluoromethyl)phenyl)piperazin-1-yl)propyl)isoquinolin-1(2H)-one

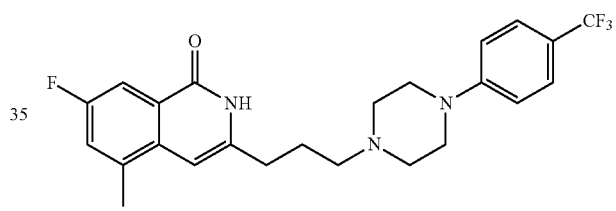

The target compound was obtained according to Example 34, except that 1-(4-(trifluoromethyl)phenyl)piperazine 2HCl in place of 4-(piperazin-1-yl)benzonitrile 2HCl used in Step 7 of Example 34.

¹H NMR (300 MHz, CDCl₃) δ 7.84-7.83 (m, 1H), 7.40-7.37 (m, 1H), 7.20-7.19 (m, 1H), 6.66-6.63 (m, 1H), 6.56-6.55 (m, 1H), 6.34 (s, 1H), 3.59-3.58 (m, 4H), 2.70-2.69 (m, 6H), 2.55-2.53 (m, 2H), 2.50 (s, 3H), 1.94-1.93 (m, 2H).

<Example 40> Preparation of 7-fluoro-3-(3-(4-(4-fluorophenyl)piperazin-1-yl)propyl)-5-methylisoquinolin-1(2H)-one

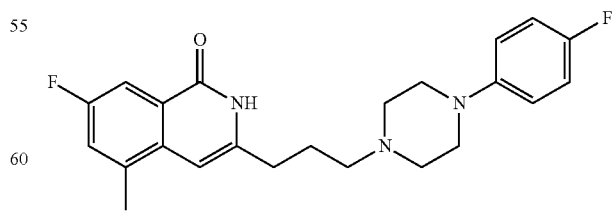

The target compound was obtained according to Example 34, except that 1-(4-fluorophenyl)piperazine 2HCl was used in place of 4-(piperazin-1-yl)benzonitrile 2HCl used in Step 7 of Example 34.

¹H NMR (300 MHz, CDCl₃) δ 7.85-7.82 (m, 1H), 7.20-7.18 (m, 1H), 6.97-6.94 (m, 4H), 6.32 (s, 1H), 3.35-3.34 (m, 4H), 2.72-2.71 (m, 6H), 2.53-2.52 (m, 2H), 2.50 (s, 3H), 1.93-1.91 (m, 2H).

<Example 41> Preparation of 4-(1-(3-(8-fluoro-1-oxo-1,2-dihydroisoquinolin-3-yl)propyl)-1,2,3,6-tetrahydropyridin-4-yl)benzonitrile

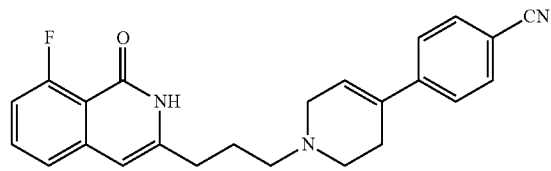

Step 1: Preparation of tert-butyl 4-(4-cyanophenyl)-3,6-dihydropyridin-1(2H)-carboxylate

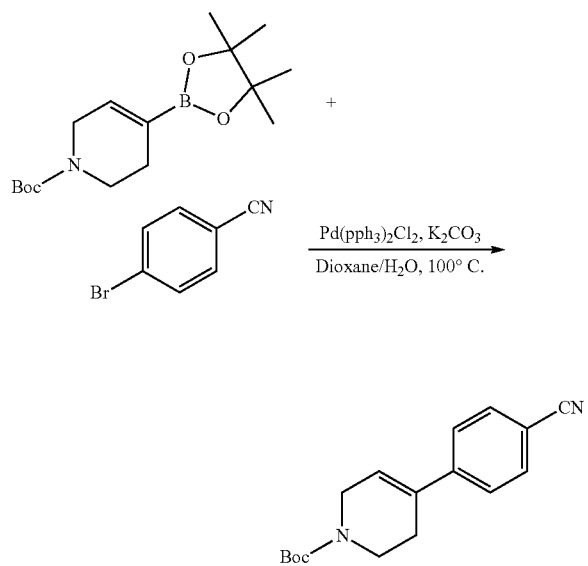

After dissolving tert-butyl 4-(4,4,5,5-tetramethyl-1,3,2-dioxaborolan-2-yl)-3,6-dihydropyridin-1(2H)-carboxylate (1.5 g, 4.85 mmol) and 4-bromobenzonitrile (971.63 mg, 5.43 mmol) in dioxane (48 mL) and H₂O (16 mL), Pd(PPh₃)₂Cl₂ (170.25 mg, 0.242 mmol) and K₂CO₃ (2.01 g, 14.55 mol) were added dropwise. The mixture was stirred at 100° C. for 15 and cooled to room temperature. The reaction solution was diluted with EtOAc and washed with water. The organic solvent was dried over MgSO₄, filtered, and then concentrated by evaporation under reduced pressure, and the resulting residue was purified using silica gel chromatography to obtain the target compound, tert-butyl 4-(4-cyanophenyl)-3,6-dihydropyridine-1(2H)-carboxylate (1.2 g, 87%).

¹H NMR (300 MHz, CDCl₃) δ 7.62 (d, J=8.1 Hz, 2H), 7.46 (d, J=8.1 Hz, 2H), 6.18 (br, 1H), 4.12 (m, 2H), 3.66-3.63 (m, 2H), 2.52 (m, 2H), 1.49 (s, 9H).

Step 2: Preparation of 4-(1,2,3,6-tetrahydropyridin-4-yl)benzonitrile HCl

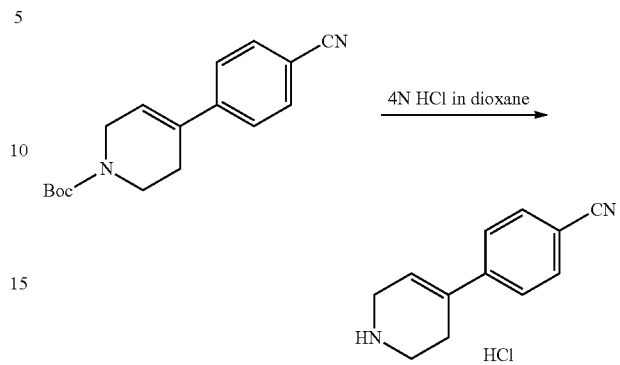

4 N HCl/dioxane (15 mL) was added to tert-butyl 4-(4-cyanophenyl)-3,6-dihydropyridin-1(2H)-carboxylate (1.2 g, 2.22 mol), and the mixture was stirred for 15 hours. The solid produced during the reaction was filtered and washed with EtOAc to obtain the target compound, 4-(1,2,3,6-tetrahydropyridin-4-yl)benzonitrile HCl (837 mg, 90%).

¹H NMR (300 MHz, DMSO-d₆) δ 9.50 (br, 1H), 7.72 (d, J=9.0 Hz, 2H), 7.55 (d, J=9.0 Hz, 2H), 6.57 (br, 1H), 3.79 (m, 2H), 3.31 (m, 2H), 2.74 (m, 2H).

Step 3: Preparation of 4-(1-(3-(8-fluoro-1-oxo-1,2-dihydroisoquinolin-3-yl)propyl)-1,2,3,6-tetrahydropyridin-4-yl) benzonitrile

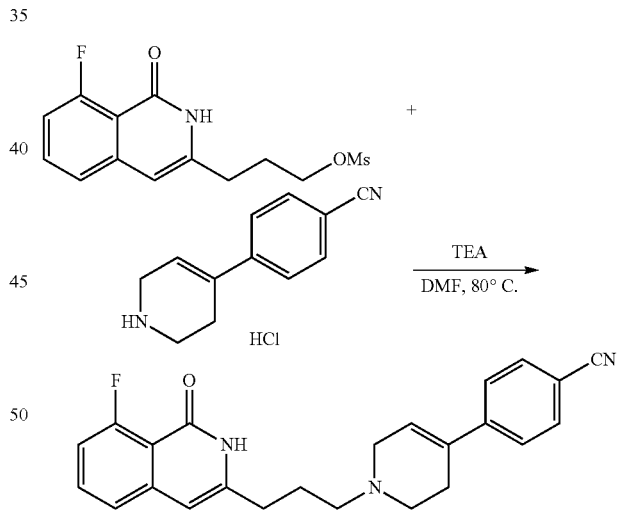

After dissolving 3-(8-fluoro-1-oxo-1,2-dihydroisoquinolin-3-yl)propyl methanesulfonate (150 mg, 0.52 mmol) in DMF (2 mL), 4-(1,2,3,6-tetrahydropyridin-4-yl)benzonitrile HCl (221 mg, 0.79 mmol) was added dropwise at 25° C. TEA (340 mg, 2.62 mmol) was added dropwise, and the mixture was heated to 80° C. and stirred for 17 hours. The reaction solution was diluted with EtOAc and washed with a Na₂S₂O₃ aqueous solution and an NH₄C aqueous solution. The organic solvent was dried over MgSO₄, filtered, and then concentrated by evaporation under reduced pressure, and the resulting residue was recrystallized with MeOH to obtain the target compound, 4-(1-(3-(8-fluoro-1-oxo-1,2- dihydroisoquinolin-3-yl)propyl)-1,2,3,6-tetrahydropyridin-4-yl)benzonitrile (60 mg, 29%).

¹H NMR (300 MHz, CDCl₃) δ 7.63-7.60 (m, 2H), 7.55-7.47 (m, 3H), 7.21-7.18 (m, 1H), 7.02-6.98 (m, 1H), 6.24 (s, 1H), 6.22 (s, 1H), 3.30-3.28 (m, 2H), 2.84-2.82 (m, 4H), 2.68-2.64 (m, 2H), 2.60-2.56 (m, 2H), 1.96-1.92 (m, 2H).

<Example 42> Preparation of 8-fluoro-3-(3-(4-(4-fluorophenyl)-3,6-dihydropyridin-1(2H)-yl)propyl)isoquinolin-1(2H)-one

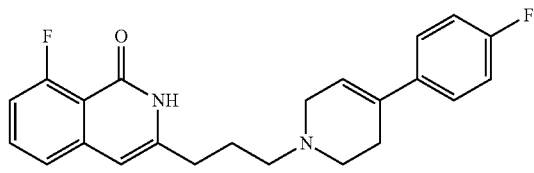 [SMILES: O=c1[nH]c(CCCN2CC=C(c3ccc(F)cc3)CC2)cc2cccc(F)c12]

The target compound was obtained according to Example 41, except that 4-bromofluorobenzene was used in place of 4-bromobenzonitrile used in Step 1 of Example 41.

¹H NMR (300 MHz, CDCl₃) δ 11.00 (br, 1H), 7.54-7.46 (m, 1H), 7.42-7.38 (m, 2H), 7.21-7.18 (m, 1H), 7.04-6.98 (m, 3H), 6.22 (s, 1H), 6.047 (s, 1H), 3.23-3.21 (m, 2H), 2.81-2.75 (m, 4H), 2.68-2.64 (m, 2H), 2.58-2.54 (m, 2H), 1.96-1.92 (m, 2H).

<Example 43> Preparation of 8-fluoro-3-(3-(6-fluoro-3',6'-dihydro-[3,4'-bipyridine]-1'(2'H)-yl)propyl)isoquinolin-1(2H)-one

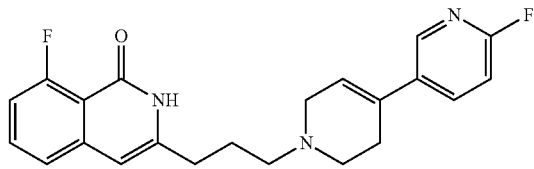 [SMILES: O=c1[nH]c(CCCN2CC=C(c3ccc(F)nc3)CC2)cc2cccc(F)c12]

The target compound was obtained according to Example 41, except that 5-bromo-2-fluoropyridine was used in place of 4-bromobenzonitrile used in Step 1 of Example 41.

¹H NMR (300 MHz, CDCl₃) δ 11.05 (br, 1H), 8.26 (s, 1H), 7.87-7.82 (M, 1H), 7.54-7.48 (m, 1H), 7.21-7.18 (m, 1H), 7.04-6.98 (m, 1H), 6.91-6.88 (m, 1H), 6.23 (s, 1H), 6.10 (s, 1H), 3.25-3.23 (m, 2H), 2.83-2.81 (m, 2H), 2.76-2.75 (m, 2H), 2.69-2.64 (m, 2H), 2.60-2.55 (m, 2H), 1.96-1.92 (m, 2H).

<Example 44> Preparation of 8-fluoro-3-(3-(5-fluoro-3',6'-dihydro-[2,4'-bipyridine]-1'(2'H)-yl)propyl)isoquinolin-1(2H)-one

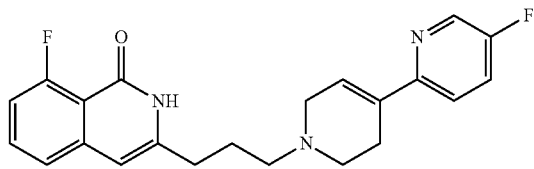

The target compound was obtained according to Example 41, except that 2-bromo-5-fluoropyridine was used in place of 4-bromobenzonitrile used in Step 1 of Example 41.

¹H NMR (300 MHz, CDCl₃) δ 11.00 (br, 1H), 8.41-8.40 (m, 1H), 7.54-7.36 (m, 3H), 7.21-7.18 (m, 1H), 7.03-6.97 (m, 1H), 6.62 (s, 1H), 6.22 (s, 1H), 3.31-3.29 (m, 2H), 2.86-2.84 (m, 4H), 2.68-2.63 (m, 2H), 2.61-2.59 (m, 2H), 1.97-1.93 (m, 2H).

<Example 45> Preparation of 8-fluoro-3-(3-(4-(4-(trifluoromethyl)phenyl)-3,6-dihydropyridin-1(2H)-yl)propyl)isoquinolin-1(2H)-one

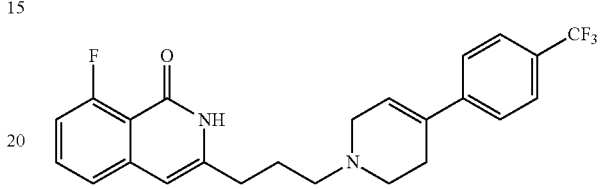

The target compound was obtained according to Example 41, except that 4-bromobenzotrifluoride was used in place of 4-bromobenzonitrile used in Step 1 of Example 41.

¹H NMR (300 MHz, CDCl₃) δ 10.93 (br, 1H), 7.59-7.46 (m, 5H), 7.21-7.18 (m, 1H), 7.04-6.98 (m, 1H), 6.22 (s, 1H), 6.19 (s, 1H), 3.26-3.25 (m, 2H), 2.83-2.82 (m, 4H), 2.69-2.64 (m, 2H), 2.59-2.55 (m, 2H), 1.96-1.92 (m, 2H).

<Example 46> Preparation of 1'-(3-(8-fluoro-1-oxo-1,2-dihydroisoquinolin-3-yl)propyl)-1',2',3',6'-tetrahydro-[2,4'-bipyridine]-5-carbonitrile

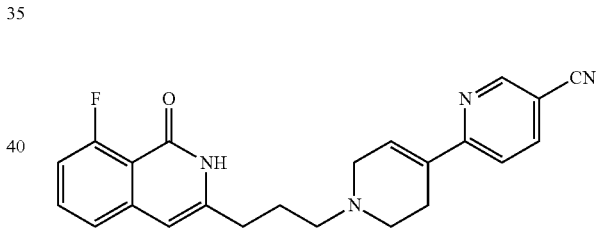

The target compound was obtained according to Example 41, except that 2-bromo-5-cyanopyridine was used in place of 4-bromobenzonitrile used in Step 1 of Example 41.

¹H NMR (300 MHz, CDCl₃) δ 11.02 (br, 1H), 8.80 (s, 1H), 7.93-7.89 (m, 1H), 7.54-7.46 (m, 2H), 7.21-7.18 (m, 1H), 7.01-6.97 (m, 1H), 6.92 (s, 1H), 6.22 (s, 1H), 3.34-3.33 (m, 2H), 2.86-2.85 (m, 4H), 2.68-2.64 (m, 2H), 2.62-2.57 (m, 2H), 1.97-1.93 (m, 2H).

<Example 47> Preparation of 4-(1-(3-(7-fluoro-1-oxo-1,2-dihydroisoquinolin-3-yl)propyl)-1,2,3,6-tetrahydropyridin-4-yl)benzonitrile

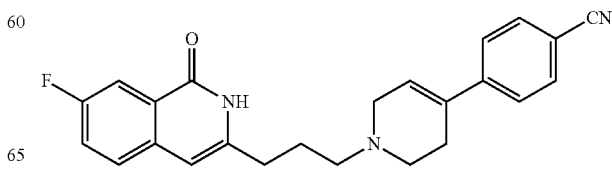

The target compound was obtained according to Example 41, except that 3-(7-fluoro-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, CDCl$_3$) δ 11.22 (br, 1H), 7.98-7.94 (m, 1H), 7.64-7.61 (m, 2H), 7.55-7.52 (m, 2H), 7.47-7.42 (m, 1H), 7.36-7.30 (m, 1H), 6.28-6.25 (m, 2H), 3.29-3.27 (m, 2H), 2.84-2.80 (m, 4H), 2.72-2.67 (m, 2H), 2.61-2.57 (m, 2H), 1.96-1.94 (m, 2H).

<Example 48> Preparation of 7-fluoro-3-(3-(4-(4-fluorophenyl)-3,6-dihydropyridin-1(2H)-yl)propyl)isoquinolin-1(2H)-one

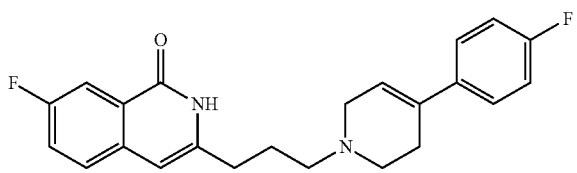 [SMILES: O=c1[nH]c(CCCN2CC=C(c3ccc(F)cc3)CC2)cc2ccc(F)cc12]

The target compound was obtained according to Example 41, except that 4-bromofluorobenzene was used in place of 4-bromobenzonitrile used in Step 1 of Example 41, and 3-(7-fluoro-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, DMSO-d$_6$) δ 11.46 (br, 1H), 7.79-7.75 (m, 1H), 7.69-7.64 (m, 1H), 7.58-7.52 (m, 1H), 7.48-7.44 (m, 2H), 7.18-7.12 (m, 2H), 6.42 (s, 1H), 6.12 (s, 1H), 3.07-3.06 (m, 2H), 2.62-2.61 (m, 2H), 2.56-2.50 (m, 6H), 1.84-1.82 (m, 2H).

<Example 49> Preparation of 3-(3-(4-(4-chlorophenyl)-3,6-dihydropyridin-1(2H)-yl)propyl)-7-fluoroisoquinolin-1(2H)-one

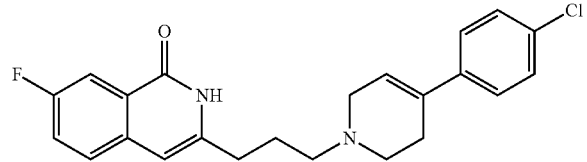

The target compound was obtained according to Example 41, except that 1-bromo-4-chlorobenzene was used in place of 4-bromobenzonitrile used in Step 1 of Example 41, and 3-(7-fluoro-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, CDCl$_3$) δ 11.13 (br, 1H), 7.96-7.94 (m, 1H), 7.47-7.27 (m, 6H), 6.26 (s, 1H), 6.10 (s, 1H), 3.26-3.24 (m, 2H), 2.82-2.67 (m, 6H), 2.57-2.55 (m, 2H), 1.96-1.94 (m, 2H).

<Example 50> Preparation of 1'-(3-(7-fluoro-1-oxo-1,2-dihydroisoquinolin-3-yl)propyl)-1',2',3',6'-tetrahydro-[2,4'-bipyridine]-5-carbonitrile

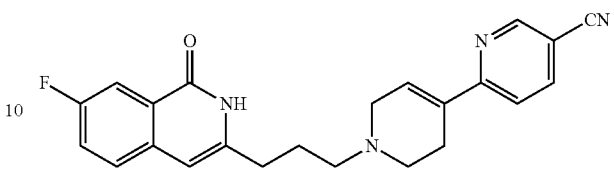

The target compound was obtained according to Example 41, except that 2-bromo-5-cyanopyridine was used in place of 4-bromobenzonitrile used in Step 1 of Example 41, and 3-(7-fluoro-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, CDCl$_3$) δ 11.20 (m, 1H), 8.81 (s, 1H), 7.96-7.91 (m, 2H), 7.55-7.52 (m, 1H), 7.47-7.44 (m, 1H), 7.36-7.31 (m, 1H), 6.92 (s, 1H), 6.27 (s, 1H), 3.56-3.54 (m, 2H), 2.87-2.85 (m, 4H), 2.72-2.68 (m, 2H), 2.63-2.59 (m, 2H), 1.98-1.94 (m, 2H).

<Example 51> Preparation of 7-fluoro-3-(3-(4-(2-fluoro-4-nitrophenyl)-3,6-dihydropyridin-1(2H)-yl)propyl)isoquinolin-1(2H)-one

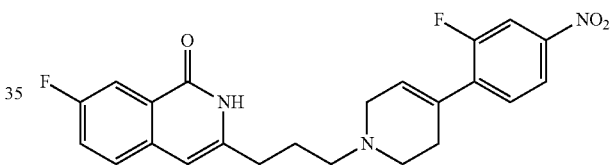

The target compound was obtained according to Example 41, except that 4-bromo-3-fluoro-1-nitrobenzene was used in place of 4-bromobenzonitrile used in Step 1 of Example 41, and 3-(7-fluoro-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, CDCl$_3$) δ 11.27 (br, 1H), 8.04-7.92 (m, 3H), 7.62-7.57 (m, 1H), 7.47-7.43 (m, 1H), 7.37-7.31 (m, 1H), 6.27 (s, 1H), 6.22 (s, 1H), 3.31-3.29 (m, 2H), 2.85-2.80 (m, 4H), 2.73-2.71 (m, 2H), 2.69-2.58 (m, 2H), 2.05-1.61 (m, 2H).

<Example 52> Preparation of 2-fluoro-4-(1-(3-(7-fluoro-1-oxo-1,2-dihydroisoquinolin-3-yl)propyl)-1,2,3,6-tetrahydropyridin-4-yl)benzonitrile

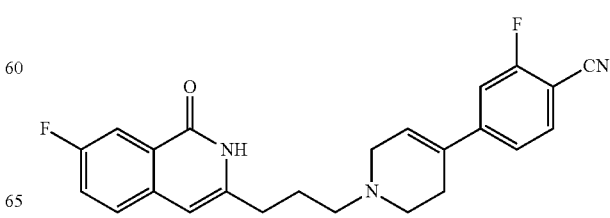

The target compound was obtained according to Example 41, except that 4-bromo-2-fluorobenzonitrile was used in place of 4-bromobenzonitrile used in Step 1 of Example 41, and 3-(7-fluoro-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, CDCl$_3$) δ 11.16 (br, 1H), 7.98-7.95 (m, 1H), 7.61-7.56 (m, 1H), 7.47-7.44 (m, 1H), 7.36-7.26 (m, 3H), 6.29 (s, 1H), 6.26 (s, 1H), 3.30-3.29 (m, 2H), 2.84-2.82 (m, 2H), 2.78-2.76 (m, 2H), 2.72-2.67 (m, 2H), 2.61-2.57 (m, 2H), 1.96-1.92 (m, 2H).

<Example 53> Preparation of 8-fluoro-3-(3-(4-(4-fluorophenyl)-3,6-dihydropyridin-1(2H)-yl)propyl)-5-methylisoquinolin-1(2H)-one

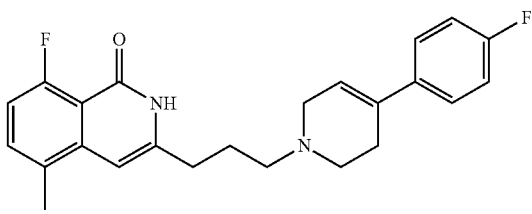 [SMILES: Cc1ccc(F)c2c(=O)[nH]c(CCCN3CC=C(c4ccc(F)cc4)CC3)cc12]

The target compound was obtained according to Example 41, except that 4-bromo-1-fluorobenzene was used in place of 4-bromobenzonitrile used in Step 1 of Example 41, and 3-(8-fluoro-5-methyl-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, CDCl$_3$) δ 11.07 (br, 1H), 7.42-7.32 (m, 3H), 7.03-6.88 (m, 3H), 6.27 (s, 1H), 6.04 (s, 1H), 3.23-3.22 (m, 2H), 2.81-2.67 (m, 6H), 2.58-2.54 (m, 2H), 2.42 (s, 3H), 1.97-1.93 (m, 2H).

<Example 54> Preparation of 4-(1-(3-(8-fluoro-5-methyl-1-oxo-1,2-dihydroisoquinolin-3-yl)propyl)-1,2,3,6-tetrahydropyridin-4-yl)benzonitrile

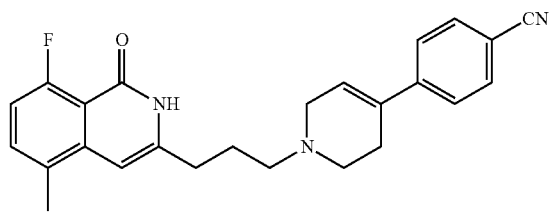 [SMILES: Cc1ccc(F)c2c(=O)[nH]c(CCCN3CC=C(c4ccc(C#N)cc4)CC3)cc12]

The target compound was obtained according to Example 41, except that 3-(8-fluoro-5-methyl-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, CDCl$_3$) δ 11.03 (br, 1H), 7.63-7.60 (m, 2H), 7.54-7.51 (m, 1H), 7.36-7.32 (m, 1H), 6.28 (s, 1H), 6.24 (s, 1H), 3.28-3.27 (m, 2H), 2.82-2.81 (m, 4H), 2.72-2.67 (m, 2H), 2.60-2.56 (m, 2H), 2.58-2.56 (m, 2H), 2.42 (s, 3H), 1.97-1.93 (m, 2H).

<Example 55> Preparation of 2-fluoro-4-(1-(3-(8-fluoro-5-methyl-1-oxo-1,2-dihydroisoquinolin-3-yl)propyl)-1,2,3,6-tetrahydropyridin-4-yl)benzonitrile

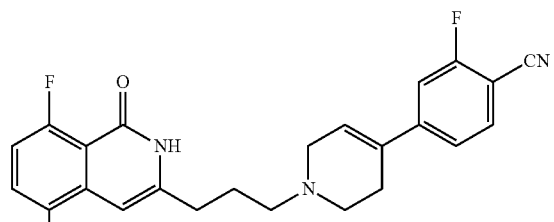

The target compound was obtained according to Example 41, except that 4-bromo-2-fluorobenzonitrile was used in place of 4-bromobenzonitrile used in Step 1 of Example 41, and 3-(8-fluoro-5-methyl-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, CDCl$_3$) δ 10.99 (br, 1H), 7.59-7.55 (m, 1H), 7.37-7.32 (m, 2H), 7.28-7.26 (m, 1H), 6.95-6.89 (m, 1H), 6.28-6.27 (m, 2H), 3.28-3.27 (m, 2H), 2.83-2.78 (m, 4H), 2.72-2.67 (m, 2H), 2.60-2.56 (m, 2H), 2.42 (s, 3H), 1.97-1.93 (m, 2H).

<Example 56> Preparation of 8-fluoro-3-(3-(4-(2-fluoro-4-nitrophenyl)-3,6-dihydropyridin-1(2H)-yl)propyl)-5-methylisoquinolin-1(2H)-one

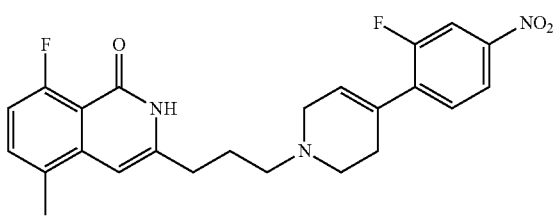 [SMILES: Cc1ccc(F)c2c(=O)[nH]c(CCCN3CC=C(c4ccc([N+](=O)[O-])cc4F)CC3)cc12]

The target compound was obtained according to Example 41, except that 4-bromo-3-fluoro-1-nitrobenzene was used in place of 4-bromobenzonitrile used in Step 1 of Example 41, and 3-(8-fluoro-5-methyl-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, DMSO-d$_6$) 11.22 (br, 1H), 8.03-8.02 (m, 1H), 8.00-7.89 (m, 1H), 7.59-7.54 (m, 1H), 7.37-7.33 (m, 1H), 6.95-6.89 (m, 1H), 6.29 (s, 1H), 6.21 (s, 1H), 3.29-3.28 (m, 2H), 2.83-2.69 (m, 6H), 2.62-2.57 (m, 2H), 2.43 (s, 3H), 2.04-1.95 (m, 2H).

<Example 57> Preparation of 1'-(3-(8-fluoro-5-methyl-1-oxo-1,2-dihydroisoquinolin-3-yl)propyl)-1',2',3',6'-tetrahydro-[2,4'-bipyridine]-5-carbonitrile

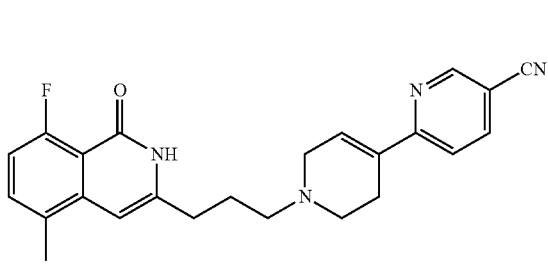 [SMILES: Cc1ccc(F)c2c(=O)[nH]c(CCCN3CC=C(c4ccc(C#N)cn4)CC3)cc12]

The target compound was obtained according to Example 41, except that 2-bromo-5-cyanopyridine was used in place of 4-bromobenzonitrile used in Step 1 of Example 41, and 3-(8-fluoro-5-methyl-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, CDCl$_3$) δ 11.03 (br, 1H), 8.81 (s, 1H), 7.93-7.90 (m, 1H), 7.54-7.51 (m, 1H), 7.36-7.32 (m, 1H), 6.94-6.92 (m, 2H), 6.28 (s, 1H), 3.36-3.35 (m, 2H), 2.87-2.86 (m, 4H), 2.72-2.68 (m, 2H), 2.62-2.58 (m, 2H), 2.42 (s, 3H), 1.98-1.94 (m, 2H).

<Example 58> Preparation of 4-(1-(3-(7-fluoro-5-methyl-1-oxo-1,2-dihydroisoquinolin-3-yl)propyl)-1,2,3,6-tetrahydropyridin-4-yl)benzonitrile

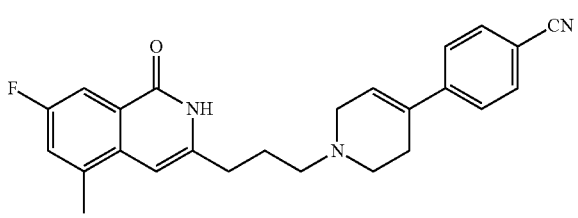 [SMILES: Cc1cc(F)cc2c(=O)[nH]c(CCCN3CC=C(c4ccc(C#N)cc4)CC3)cc12]

The target compound was obtained according to Example 41, except that 3-(7-fluoro-5-methyl-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, CDCl$_3$) δ 11.27 (br, 1H), 7.85-7.82 (m, 1H), 7.63-7.60 (m, 2H), 7.51-7.52 (m, 2H), 7.20-7.18 (m, 1H), 6.34 (s, 1H), 6.24 (s, 1H), 3.28-3.27 (m, 2H), 2.83-2.70 (m, 6H), 2.61-2.57 (m, 2H), 2.50 (s, 3H), 1.98-1.94 (m, 2H).

<Example 59> Preparation of 7-fluoro-3-(3-(4-(4-fluorophenyl)-3,6-dihydropyridin-1(2H)-yl)propyl)-5-methylisoquinolin-1(2H)-one

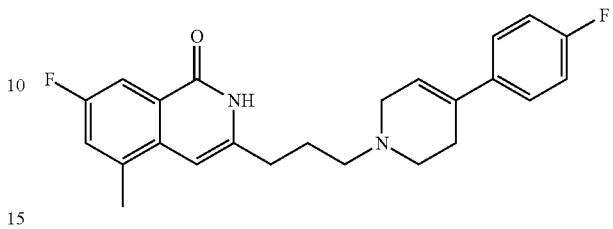

The target compound was obtained according to Example 41, except that 4-bromo-1-fluorobenzene was used in place of 4-bromobenzonitrile used in Step 1 of Example 41, and 3-(7-fluoro-5-methyl-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, DMSO-d$_6$) 11.14 (br, 1H), 7.87-7.85 (m, 1H), 7.44-7.39 (m, 2H), 7.21-7.18 (m, 1H), 7.04-7.02 (m, 2H), 6.33 (s, 1H), 6.05 (s, 1H), 3.25-3.24 (m, 2H), 2.82-2.69 (m, 6H), 2.59-2.55 (m, 2H), 2.51 (s, 3H), 1.97-1.93 (m, 2H).

<Example 60> Preparation of 1'-(3-(7-fluoro-5-methyl-1-oxo-1,2-dihydroisoquinolin-3-yl)propyl)-1',2',3',6'-tetrahydro-[2,4'-bipyridine]-5-carbonitrile

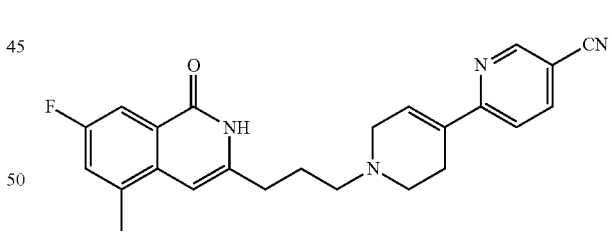

The target compound was obtained according to Example 41, except that 2-bromo-5-cyanopyridine was used in place of 4-bromobenzonitrile used in Step 1 of Example 41, and 3-(7-fluoro-5-methyl-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, CDCl$_3$) δ 11.06 (br, 1H), 8.82 (s, 1H), 7.94-7.91 (m, 1H), 7.85-7.81 (m, 1H), 7.56-7.53 (m, 1H), 7.21-7.18 (m, 1H), 6.93 (s, 1H), 6.33 (s, 1H), 3.37-3.36 (m, 2H), 2.87-2.86 (m, 4H), 2.74-2.70 (m, 2H), 2.62-2.60 (m, 2H), 2.51 (s, 3H), 2.17-1.96 (m, 2H).

<Example 61> Preparation of 1'-(3-(7-fluoro-5-methyl-1-oxo-1,2-dihydroisoquinolin-3-yl)propyl)-1',2',3',6'-tetrahydro-[3,4'-bipyridine]-6-carbonitrile

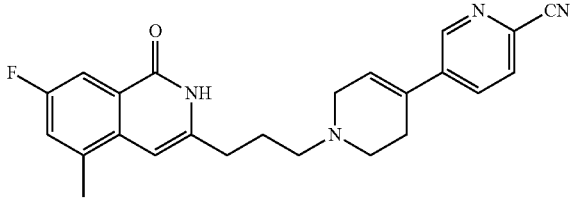

The target compound was obtained according to Example 41, except that 5-bromo-2-cyanopyridine was used in place of 4-bromobenzonitrile used in Step 1 of Example 41, and 3-(7-fluoro-5-methyl-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, CDCl$_3$) δ 11.25 (br, 1H), 8.23 (s, 1H), 7.89-7.83 (m, 2H), 7.70-7.67 (m, 1H), 7.22-7.19 (m, 1H), 6.35-6.34 (m, 2H), 3.33-3.32 (m, 2H), 2.87-2.83 (m, 4H), 2.76-2.72 (m, 2H), 2.51 (s, 3H), 1.99-1.97 (m, 2H).

<Example 62> Preparation of 7-fluoro-3-(3-(5-fluoro-3',6'-dihydro-[2,4'-bipyridine]-1'(2'H)-yl)propyl)-5-methylisoquinolin-1(2H)-one

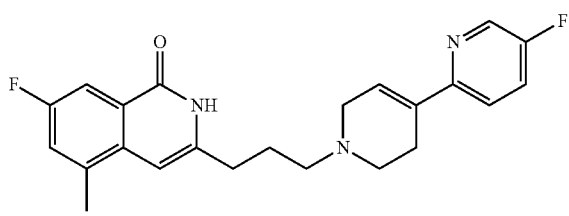 [SMILES: Cc1cc(F)cc2c(=O)[nH]c(CCCN3CC=C(c4ccc(F)cn4)CC3)cc12]

The target compound was obtained according to Example 41, except that 2-bromo-5-fluoropyridine was used in place of 4-bromobenzonitrile used in Step 1 of Example 41, and 3-(7-fluoro-5-methyl-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, CDCl$_3$) δ 11.14 (br, 1H), 8.41 (s, 1H), 7.86-7.82 (m, 1H), 7.47-7.34 (m, 2H), 7.20-7.17 (m, 1H), 6.26 (s, 1H), 6.33 (s, 1H), 3.30-3.28 (m, 2H), 2.85-2.84 (m, 4H), 2.73-2.69 (m, 2H), 2.60-2.56 (m, 2H), 2.50 (s, 3H), 1.99-1.91 (m, 2H).

<Example 63> Preparation of 7-fluoro-3-(3-(6-fluoro-3',6'-dihydro-[3,4'-bipyridine]-1'(2'H)-yl)propyl)-5-methylisoquinolin-1(2H)-one

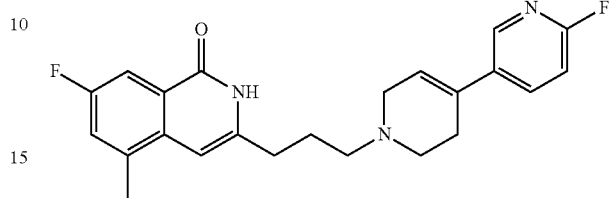

The target compound was obtained according to Example 41, except that 5-bromo-2-fluoropyridine was used in place of 4-bromobenzonitrile used in Step 1 of Example 41, and 3-(7-fluoro-5-methyl-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, CDCl$_3$) δ 11.28 (br, 1H), 8.28 (s, 1H), 7.89-7.83 (m, 2H), 7.20-7.18 (m, 1H), 6.91-6.88 (m, 1H), 6.34 (s, 1H), 6.10 (s, 1H), 3.27-3.26 (m, 2H), 2.85-2.81 (m, 2H), 2.75-2.70 (m, 4H), 2.61-2.56 (m, 2H), 2.50 (s, 3H), 2.04-1.94 (m, 2H).

<Example 64> Preparation of 7-fluoro-5-methyl-3-(3-(4-(4-(trifluoromethyl)phenyl)-3,6-dihydropyridin-1(2H)-yl)propyl)isoquinolin-1(2H)-one

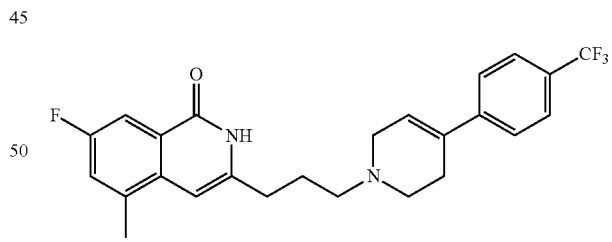

The target compound was obtained according to Example 41, except that 4-bromobenzotrifluoride was used in place of 4-bromobenzonitrile used in Step 1 of Example 41, and 3-(7-fluoro-5-methyl-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 41.

$^1$H NMR (300 MHz, CDCl$_3$) δ 11.17 (br, 1H), 7.87-7.83 (m, 2H), 7.60-7.52 (m, 4H), 7.21-7.18 (m, 1H), 6.34 (s, 1H), 6.20 (s, 1H), 3.28-3.27 (m, 2H), 2.83-2.80 (m, 4H), 2.74-2.70 (m, 2H), 2.60-2.56 (m, 2H), 2.50 (s, 3H), 1.98-1.94 (m, 2H).

<Example 65> Preparation of 8-fluoro-3-(3-(4-(3-fluorobenzoyl)piperazin-1-yl)propyl)-5-methylisoquinolin-1(2H)-one

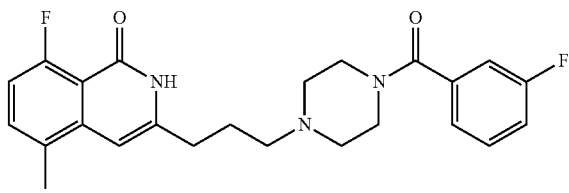 [SMILES: Cc1ccc(F)c2c(=O)[nH]c(CCCN3CCN(C(=O)c4cccc(F)c4)CC3)cc12]

Step 1: Preparation of tert-butyl 4-(3-fluorobenzoyl)piperazine-1-carboxylate

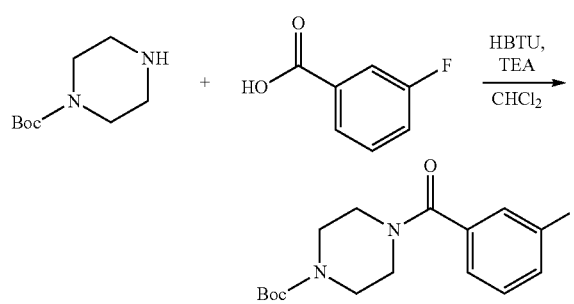

After dissolving 1-Boc-piperazine (1.0 g, 5.37 mmol) in CH$_2$Cl$_2$ (54 mL), 3-fluorobenzoic acid (902 mg, 6.443 mmol), HBTU (2.44 g, 6.44 mmol), and Et$_3$N (2.24 mL, 16.10 mmol) were slowly added dropwise and stirred at room temperature for 15 hours. The reaction solution was diluted with EtOAc and washed with water. The organic solvent was dried over MgSO$_4$, filtered, and then concentrated by evaporation under reduced pressure, and the resulting residue was purified using silica gel chromatography to obtain the target compound, tert-butyl 4-(3-fluorobenzoyl)piperazine-1-carboxylate (1.6 g, 99%).

$^1$H NMR (300 MHz, CDCl$_3$) δ 7.41-7.36 (m, 1H), 7.18-7.10 (m, 3H), 3.72-3.41 (m, 8H), 1.47 (s, 9H).

Step 2: Preparation of (3-fluorophenyl)(piperazin-1-yl)methanone HCl

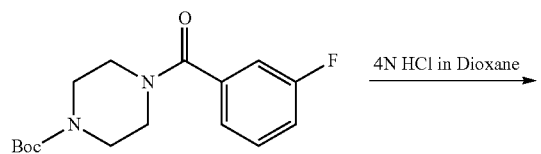

4 N HCl (50 mL) was added to tert-butyl 4-(3-fluorobenzoyl)piperazine-1-carboxylate (1.6 g, 5.19 mmol), and the mixture was stirred for 15 hours. The solid produced during the reaction was filtered and washed with EtOAc to obtain the target compound, (3-fluorophenyl)(piperazin-1-yl)methanone HCl (1.28 g, 100%).

$^1$H NMR (300 MHz, DMSO-d$_6$) δ 7.56-7.53 (m, 1H), 7.33-7.27 (m, 3H), 3.67 (br, 4H), 3.14 (br, 4H).

Step 3: Preparation of 8-fluoro-3-(3-(4-(3-fluorobenzoyl)piperazin-1-yl)propyl)-5-methylisoquinolin-1(2H)-one

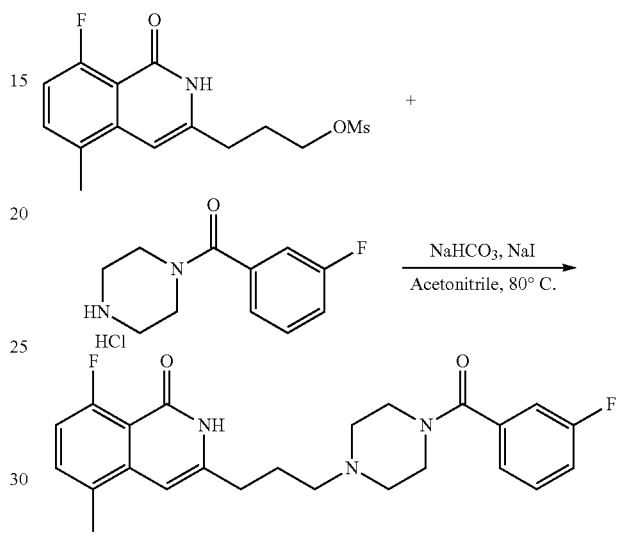

After dissolving 3-(8-fluoro-5-methyl-1-oxo-1,2-dihydroisoquinolin-3-yl)propyl methanesulfonate (200 mg, 0.64 mmol) in acetonitrile (3 mL), (3-fluorophenyl)(piperazin-1-yl)methanone HCl (234 mg, 0.96 mmol) was added dropwise at 25° C. NaHCO$_3$ (268 mg, 3.19 mmol) and NaI (191 mg, 1.27 mmol) were added dropwise, and the mixture was heated to 80° C. and stirred for 17 hours. The reaction solution was diluted with EtOAc and washed with a NaS$_2$O$_3$ aqueous solution and an NH$_4$C aqueous solution. The organic solvent was dried over MgSO$_4$, filtered, and then concentrated by evaporation under reduced pressure, and the resulting residue was recrystallized with MeOH to obtain the target compound, 8-fluoro-3-(3-(4-(3-fluorobenzoyl)piperazin-1-yl)propyl)-5-methylisoquinolin-1(2H)-one (2.4 g, 77%).

$^1$H NMR (300 MHz, CDCl$_3$) δ 7.41-7.33 (m, 2H), 7.21-7.19 (m, 1H), 7.15-7.11 (m, 2H), 6.95-6.88 (m, 1H), 6.28 (s, 1H), 4.10-4.04 (m, 2H), 3.74-3.72 (m, 2H), 2.76-2.68 (m, 4H), 2.56-2.52 (m, 4H), 2.42 (s, 3H), 1.91-1.90 (m, 2H).

<Example 66> Preparation of 3-(3-(4-benzoylpiperazin-1-yl)propyl)-8-fluoro-5-methylisoquinolin-1(2H)-one

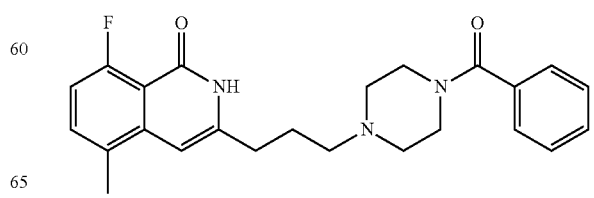

The target compound was obtained according to Example 65, except that benzoic acid was used in place of 3-fluorobenzoic acid used in Step 1 of Example 65.

$^1$H NMR (300 MHz, CDCl$_3$) δ 7.41-7.32 (m, 6H), 6.93-6.89 (m, 1H), 6.27 (s, 1H), 4.06-4.05 (m, 2H), 3.77-3.76 (m, 2H), 2.75-2.71 (m, 4H), 2.55-2.54 (m, 4H), 2.42 (s, 3H), 1.91-1.90 (m, 2H).

<Example 67> Preparation of 8-fluoro-3-(3-(4-(4-fluorobenzoyl)piperazin-1-yl)propyl)-5-methylisoquinolin-1(2H)-one

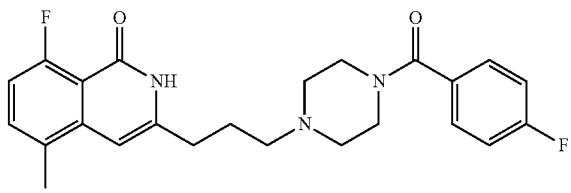 [SMILES: Cc1ccc(F)c2c(=O)[nH]c(CCCN3CCN(C(=O)c4ccc(F)cc4)CC3)cc12]

The target compound was obtained according to Example 65, except that 4-fluorobenzoic acid was used in place of 3-fluorobenzoic acid used in Step 1 of Example 65.

$^1$H NMR (300 MHz, CDCl$_3$) δ 7.47-7.42 (m, 2H), 7.37-7.32 (m, 1H), 7.11-7.06 (m, 2H), 6.95-6.89 (m, 1H), 6.27 (s, 1H), 4.05-4.03 (m, 2H), 3.78-3.77 (m, 2H), 2.75-2.72 (m, 2H), 2.67-2.65 (m, 2H), 2.55-2.52 (m, 4H), 2.42 (s, 3H), 1.91-1.90 (m, 2H).

<Example 68> Preparation of 4-(4-(3-(8-fluoro-1-oxo-1,2-dihydroisoquinolin-3-yl)propanoyl)piperazin-1-yl)benzonitrile

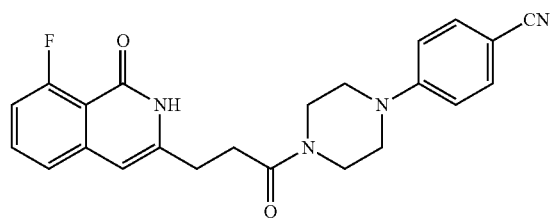 [SMILES: N#Cc1ccc(N2CCN(C(=O)CCc3cc4cccc(F)c4c(=O)[nH]3)CC2)cc1]

Step 1: Preparation of 3-(8-fluoro-1-oxo-1H-isochromen-3-yl)propanoic acid

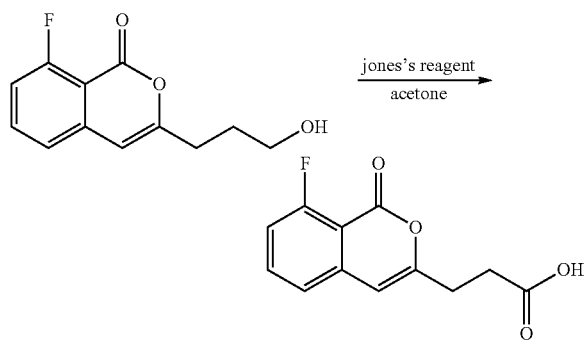

After dissolving 8-fluoro-3-(3-hydroxypropyl)-1H-isochromen-1-one (10.0 g, 42.33 mmol) in acetone (420 mL), 2.5 M Jones reagent (68 mL) was slowly added dropwise at 0° C. The reaction solution was stirred at room temperature for 15 hours. The reaction solution was concentrated by evaporation under reduced pressure, diluted with EtOAc, and washed with water. The organic solvent was dried over MgSO$_4$, filtered, and then concentrated by evaporation under reduced pressure, and the resulting residue was recrystallized with MeOH to obtain the target compound, 3-(8-fluoro-1-oxo-1H-isochromen-3-yl)propanoic acid (6.4 g, 61%).

$^1$H NMR (300 MHz, CDCl$_3$) δ 7.84-7.72 (m, 2H), 7.60-7.55 (m, 1H), 7.39-7.29 (m, 1H), 6.63 (s, 1H), 2.77-2.73 (m, 2H), 2.63-2.61 (m, 2H).

Step 2: Preparation of 3-(8-fluoro-1-oxo-1,2-dihydroisoquinolin-3-yl)propanoic acid

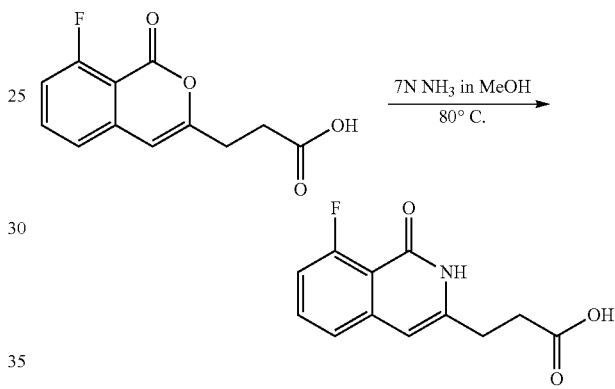

After dissolving 3-(8-fluoro-1-oxo-1H-isochromen-3-yl)propanoic acid (1.0 g, 4.23 mmol) in 7 N NH$_3$/MeOH (20 mL), the mixture was stirred at 80° C. for 15 hours. The reaction solution was cooled to room temperature, and then the thus-obtained product was concentrated by evaporation under reduced pressure. The resulting solid was recrystallized with MeOH to obtain the target compound, 3-(8-fluoro-1-oxo-1,2-dihydroisoquinolin-3-yl)propanoic acid (840 g, 84%).

$^1$H NMR (300 MHz, CDCl$_3$) δ 7.61-7.54 (m, 1H), 7.32-7.30 (m, 1H), 7.09-7.03 (m, 1H), 6.30 (s, 1H), 2.65-2.61 (m, 2H), 2.40-2.35 (m, 2H).

Step 3: Preparation of 4-(4-(3-(8-fluoro-1-oxo-1,2-dihydroisoquinolin-3-yl)propanoyl)piperazin-1-yl)benzonitrile

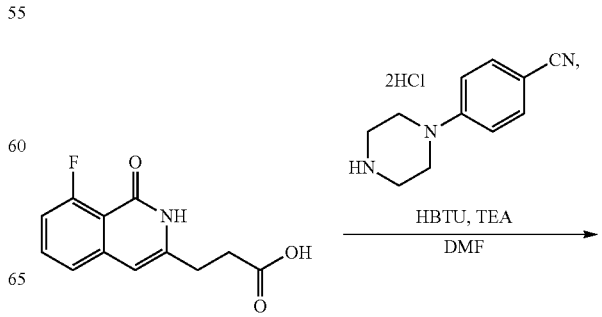

-continued

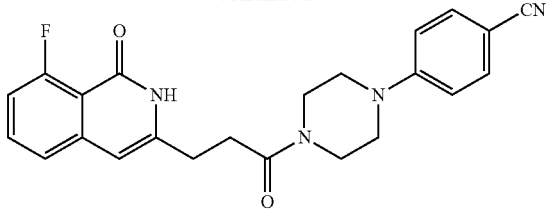

After dissolving 3-(8-fluoro-1-oxo-1,2-dihydroisoquinolin-3-yl)propanoic acid (80 mg, 0.34 mmol), 4-(piperazin-1-yl)benzonitrile 2HCl (106 mg, 0.41 mmol) in DMF (25 mL), HBTU (193 mg, 0.51 mmol) was added dropwise. TEA (172 mg, 1.7 mmol) was added dropwise, and the mixture was stirred at room temperature for 15 hours. The reaction solution was diluted with $CH_2Cl_2$ and washed with water. The organic solvent was dried over $MgSO_4$, filtered, and then concentrated by evaporation under reduced pressure, and the resulting residue was purified using silica gel chromatography to obtain the target compound, 4-(4-(3-(8-fluoro-1-oxo-1,2-dihydroisoquinolin-3-yl)propanoyl)piperazin-1-yl)benzonitrile (24 mg, 18%).

$^1$H NMR (300 MHz, $CDCl_3$) δ 10.36 (br, 1H), 7.53-7.50 (m, 3H), 7.22-7.19 (m, 1H), 7.03-6.97 (m, 1H), 6.85-6.82 (m, 1H), 6.26 (s, 1H), 3.84-3.83 (m, 2H), 3.64-3.63 (m, 2H), 3.34-3.33 (m, 4H), 2.93-2.92 (m, 2H), 2.83-2.80 (m, 2H).

<Example 69> Preparation of 4-(1-(3-(8-fluoro-1-oxo-1,2-dihydroisoquinolin-3-yl)propanoyl)-1,2,3,6-tetrahydropyridin-4-yl)benzonitrile

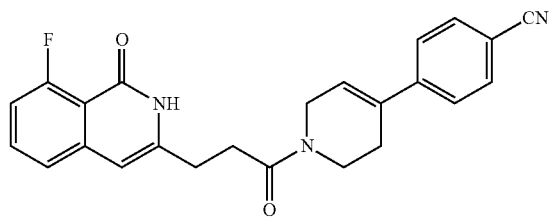 [SMILES: N#Cc1ccc(C2=CCN(C(=O)CCc3cc4cccc(F)c4c(=O)[nH]3)CC2)cc1]

The target compound was obtained using 4-(1,2,3,6-tetrahydropyridin-4-yl)benzonitrile hydrochloride in place of 4-(piperazin-1-yl)benzonitrile 2HCl used in Step 3 of Example 68.

$^1$H NMR (300 MHz, $CDCl_3$) δ 10.22 (br, 1H), 7.64-7.61 (m, 2H), 7.49-7.41 (m, 3H), 7.20-7.18 (m, 1H), 7.03-7.00 (m, 1H), 6.24-6.09 (m, 2H), 4.35 (m, 1H), 4.15 (m, 1H), 3.90 (m, 1H), 3.68 (m, 1H), 2.94 (m, 2H), 2.83-2.80 (m, 2H), 2.55 (m, 2H).

<Example 70> Preparation of 5-(4-(3-(8-fluoro-1-oxo-1,2-dihydroisoquinolin-3-yl)propanoyl)piperazin-1-yl)picolinonitrile

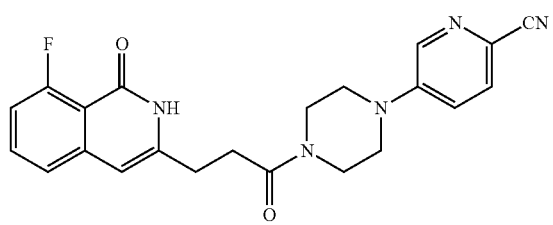 [SMILES: N#Cc1ccc(N2CCN(C(=O)CCc3cc4cccc(F)c4c(=O)[nH]3)CC2)cn1]

The target compound was obtained using 5-(piperazin-1-yl)picolinonitrile hydrochloride in place of 4-(piperazin-1-yl)benzonitrile 2HCl used in Step 3 of Example 68.

$^1$H NMR (300 MHz, $CDCl_3$) δ 10.57 (br, 1H), 8.30 (s, 1H), 7.56-7.53 (m, 2H), 7.22 (m, 1H), 7.11-6.97 (m, 2H), 6.30 (s, 1H), 3.88 (m, 2H), 3.71 (m, 2H), 3.50-3.41 (m, 4H), 2.97 (m, 2H), 2.86 (m, 2H).

<Example 71> Preparation of 6-(4-(3-(8-fluoro-1-oxo-1,2-dihydroisoquinolin-3-yl)propanoyl)piperazin-1-yl)nicotinonitrile

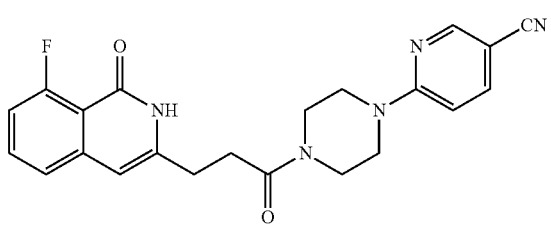

The target compound was obtained using 6-(piperazin-1-yl)nicotinonitrile hydrochloride in place of 4-(piperazin-1-yl)benzonitrile 2HCl used in Step 3 of Example 68.

$^1$H NMR (300 MHz, $CDCl_3$) δ 10.44 (br, 1H), 8.42 (s, 1H), 7.66 (d, 1H, J=8.7 Hz), 7.56-7.49 (m, 1H), 7.22 (d, 1H, J=7.8 Hz), 7.04-6.98 (m, 1H), 6.60 (d, 1H, J=9.3 Hz), 6.28 (s, 1H), 3.81-3.78 (m, 4H), 3.68-3.61 (m, 4H), 2.97-2.93 (m, 2H), 2.85-2.83 (m, 2H).

<Example 72> Preparation of 2-fluoro-4-(4-(3-(8-fluoro-1-oxo-1,2-dihydroisoquinolin-3-yl)propanoyl)piperazin-1-yl)benzonitrile

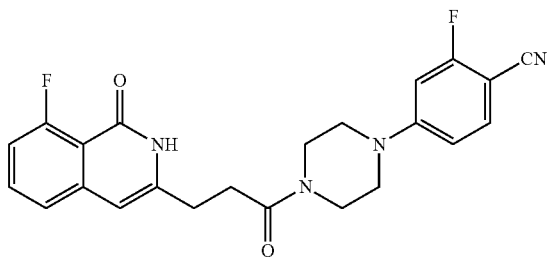 [SMILES: N#Cc1ccc(N2CCN(C(=O)CCc3cc4cccc(F)c4c(=O)[nH]3)CC2)cc1F]

The target compound was obtained using 2-fluoro-4-(piperazin-1-yl)benzonitrile hydrochloride in place of 4-(piperazin-1-yl)benzonitrile 2HCl used in Step 3 of Example 68.

$^1$H NMR (300 MHz, $CDCl_3$) δ 10.43 (br, 1H), 7.56-7.49 (m, 1H), 7.46-7.41 (m, 1H), 7.23-7.20 (m, 1H), 7.04-6.98 (m, 1H), 6.61 (d, 1H, J=8.7 Hz), 6.53 (d, 1H, J=12.6 Hz), 6.28 (s, 1H), 3.85 (t, 2H, J=5.3 Hz), 3.67 (t, 2H, J=4.9 Hz), 3.39 (m, 4H), 2.95 (t, 2H, J=5.7 Hz), 2.82 (t, 2H, J=5.7 Hz).

<Example 73> Preparation of 3-fluoro-4-(4-(3-(8-fluoro-1-oxo-1,2-dihydroisoquinolin-3-yl)propanoyl)piperazin-1-yl)benzonitrile

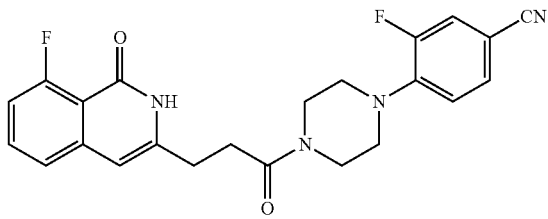 [SMILES: N#Cc1ccc(N2CCN(C(=O)CCc3cc4cccc(F)c4c(=O)[nH]3)CC2)c(F)c1]

The target compound was obtained using 3-fluoro-4-(piperazin-1-yl)benzonitrile hydrochloride in place of 4-(piperazin-1-yl)benzonitrile 2HCl used in Step 3 of Example 68.

$^1$H NMR (300 MHz, CDCl$_3$) δ 10.54 (br, 1H), 7.56-7.49 (m, 1H), 7.38 (d, 1H, J=8.1 Hz), 7.33-7.29 (m, 1H), 7.22 (d, 1H, J=8.4 Hz), 7.05-6.98 (m, 1H), 6.89 (t, 1H, J=8.6 Hz), 6.29 (s, 1H), 3.86 (t, 2H, J=4.8 Hz), 3.66 (t, 2H, J=4.8 Hz), 3.20-3.17 (m, 4H), 2.95 (t, 2H, J=5.6 Hz), 2.83 (t, 2H, J=5.9 Hz).

<Example 74> Preparation of 2-(4-(3-(8-fluoro-1-oxo-1,2-dihydroisoquinolin-3-yl)propanoyl)piperazin-1-yl)benzonitrile

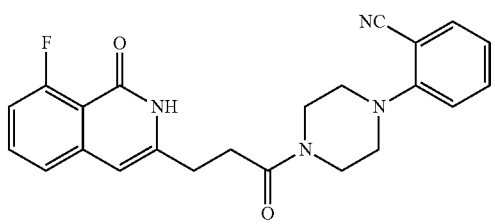 [SMILES: N#Cc1ccccc1N1CCN(C(=O)CCc2cc3cccc(F)c3c(=O)[nH]2)CC1]

The target compound was obtained using 2-(piperazin-1-yl)benzonitrile hydrochloride in place of 4-(piperazin-1-yl)benzonitrile 2HCl used in Step 3 of Example 68.

$^1$H NMR (300 MHz, CDCl$_3$) δ 10.32 (br, 1H), 7.60 (d, 1H, J=7.8 Hz), 7.52-7.49 (m, 2H), 7.21 (d, 1H, J=7.8 Hz), 7.11-6.97 (m, 3H), 6.26 (s, 1H), 3.90 (m, 2H), 3.69 (m, 2H), 3.19 (m, 4H), 2.94-2.93 (m, 2H), 2.82-2.80 (m, 2H).

<Example 75> Preparation of 8-fluoro-3-(3-(4-(2-fluorophenyl)piperazin-1-yl)-3-oxopropyl)isoquinolin-1(2H)-one

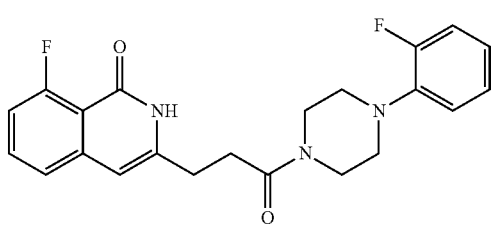 [SMILES: O=C(CCc1cc2cccc(F)c2c(=O)[nH]1)N1CCN(c2ccccc2F)CC1]

The target compound was obtained using 1-(2-fluorophenyl)piperazine hydrochloride in place of 4-(piperazin-1-yl)benzonitrile 2HCl used in Step 3 of Example 68.

$^1$H NMR (300 MHz, CDCl$_3$) δ 10.42 (br, 1H), 7.52-7.48 (m, 1H), 7.21 (d, 1H, J=7.8 Hz), 7.07-6.98 (m, 4H), 6.90 (t, 1H, J=8.3 Hz), 6.26 (s, 1H), 3.86 (t, 2H, J=4.7 Hz), 3.64 (t, 2H, J=4.7 Hz), 3.07-3.05 (m, 4H), 2.94 (t, 2H, J=5.7 Hz), 2.81 (t, 2H, J=5.9 Hz).

<Example 76> Preparation of 5-fluoro-2-(4-(3-(8-fluoro-1-oxo-1,2-dihydroisoquinolin-3-yl)propanoyl)piperazin-1-yl)benzonitrile

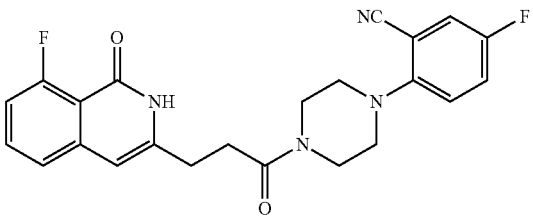 [SMILES: N#Cc1cc(F)ccc1N1CCN(C(=O)CCc2cc3cccc(F)c3c(=O)[nH]2)CC1]

The target compound was obtained using 5-fluoro-2-(piperazin-1-yl)benzonitrile hydrochloride in place of 4-(piperazin-1-yl)benzonitrile 2HCl used in Step 3 of Example 68.

$^1$H NMR (300 MHz, CDCl$_3$) δ 10.38 (br, 1H), 7.55-7.48 (m, 1H), 7.32-7.20 (m, 3H), 7.06-6.95 (m, 2H), 6.27 (s, 1H), 3.89 (t, 2H, J=4.2 Hz), 3.69 (t, 2H, J=4.5 Hz), 3.10 (m, 4H), 2.94 (t, 2H, J=5.7 Hz), 2.81 (t, 2H, J=5.6 Hz).

<Example 77> Preparation of 3-(4-(3-(8-fluoro-1-oxo-1,2-dihydroisoquinolin-3-yl)propanoyl)piperazin-1-yl)benzonitrile

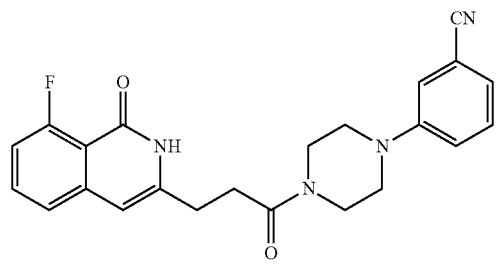 [SMILES: N#Cc1cccc(N2CCN(C(=O)CCc3cc4cccc(F)c4c(=O)[nH]3)CC2)c1]

The target compound was obtained using 3-(piperazin-1-yl)benzonitrile hydrochloride in place of 4-(piperazin-1-yl)benzonitrile 2HCl used in Step 3 of Example 68.

$^1$H NMR (300 MHz, CDCl$_3$) δ 10.45 (br, 1H), 7.56-7.49 (m, 1H), 7.38-7.31 (m, 1H), 7.23-7.21 (m, 1H), 7.17-7.08 (m, 3H), 7.05-6.98 (m, 1H), 6.28 (s, 1H), 3.85 (t, 2H, J=5.1 Hz), 3.65 (t, 2H, J=5.0 Hz), 3.24-3.21 (m, 4H), 2.95 (t, 2H, J=5.9 Hz), 2.83 (t, 2H, J=6.0 Hz).

<Example 78> Preparation of 3-(3-(4-(2,4-difluorophenyl)piperazin-1-yl)-3-oxopropyl)-8-fluoroisoquinolin-1(2H)-one

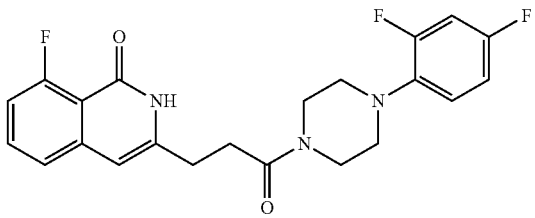 [SMILES: O=C(CCc1cc2cccc(F)c2c(=O)[nH]1)N1CCN(c2ccc(F)cc2F)CC1]

The target compound was obtained using 1-(2,4-difluorophenyl)piperazine hydrochloride in place of 4-(piperazin-1-yl)benzonitrile 2HCl used in Step 3 of Example 68.

$^1$H NMR (300 MHz, CDCl$_3$) δ 10.08 (br, 1H), 7.52-7.48 (m, 1H), 7.20 (d, 1H, J=8.4 Hz), 7.05-6.99 (m, 1H), 6.91-6.80 (m, 3H), 6.23 (s, 1H), 3.85 (t, 2H, J=4.7 Hz), 3.61 (t, 2H, J=4.8 Hz), 3.00-2.99 (m, 4H), 2.92 (t, 2H, J=5.7 Hz), 2.76 (t, 2H, J=5.9 Hz).

<Example 79> Preparation of 4-fluoro-3-(4-(3-(8-fluoro-1-oxo-1,2-dihydroisoquinolin-3-yl)propanoyl)piperazin-1-yl)benzonitrile

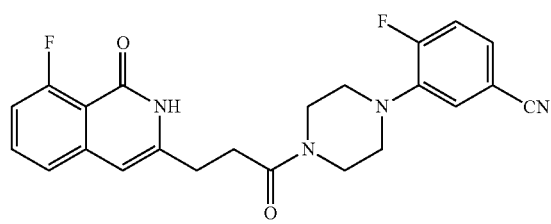 [SMILES: N#Cc1ccc(F)c(N2CCN(C(=O)CCc3cc4cccc(F)c4c(=O)[nH]3)CC2)c1]

The target compound was obtained using 4-fluoro-3-(piperazin-1-yl)benzonitrile hydrochloride in place of 4-(piperazin-1-yl)benzonitrile 2HCl used in Step 3 of Example 68.

$^1$H NMR (300 MHz, CDCl$_3$) δ 10.46 (br, 1H), 7.54-7.52 (m, 1H), 7.27-7.21 (m, 2H), 7.16-7.00 (m, 3H), 6.29 (s, 1H), 3.86 (m, 2H), 3.66 (m, 2H), 3.08-3.05 (m, 4H), 2.96 (t, 2H, J=5.4 Hz), 2.83 (t, 2H, J=5.4 Hz).

<Example 80> Preparation of 2-fluoro-5-(4-(3-(8-fluoro-1-oxo-1,2-dihydroisoquinolin-3-yl)propanoyl)piperazin-1-yl)benzonitrile

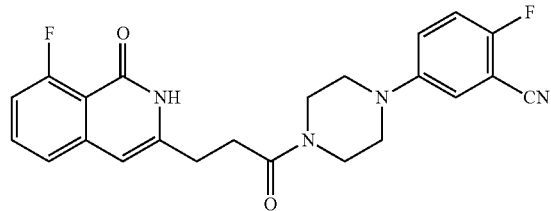 [SMILES: N#Cc1cc(N2CCN(C(=O)CCc3cc4cccc(F)c4c(=O)[nH]3)CC2)ccc1F]

The target compound was obtained using 2-fluoro-5-(piperazin-1-yl)benzonitrile hydrochloride in place of 4-(piperazin-1-yl)benzonitrile 2HCl used in Step 3 of Example 68.

$^1$H NMR (300 MHz, CDCl$_3$) δ 10.17 (br, 1H), 7.55-7.48 (m, 1H), 7.21 (d, 1H, J=7.8 Hz), 7.13-7.10 (m, 2H), 7.05-6.99 (m, 2H), 6.25 (s, 1H), 3.85 (t, 2H, J=5.3 Hz), 3.63 (t, 2H, J=4.8 Hz), 3.15-3.12 (m, 4H), 2.94 (t, 2H, J=5.9 Hz), 2.79 (t, 2H, J=5.9 Hz).

<Example 81> Preparation of 4-fluoro-2-(4-(3-(8-fluoro-1-oxo-1,2-dihydroisoquinolin-3-yl)propanoyl)piperazin-1-yl)benzonitrile

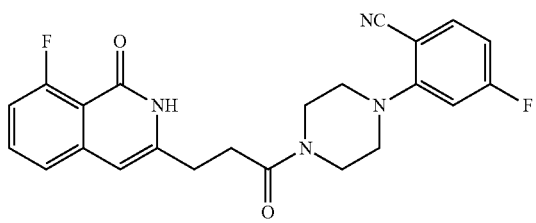

The target compound was obtained using 4-fluoro-2-(piperazin-1-yl)benzonitrile hydrochloride in place of 4-(piperazin-1-yl)benzonitrile 2HCl used in Step 3 of Example 68.

$^1$H NMR (300 MHz, CDCl$_3$) δ 10.45 (br, 1H), 7.60-7.49 (m, 2H), 7.21 (d, 1H, J=7.8 Hz), 7.06-6.99 (m, 1H), 6.76 (m, 1H), 6.64 (dd, 1H, J=10.8 Hz, 2.4 Hz), 6.28 (s, 1H), 3.89 (t, 2H, J=4.7 Hz), 3.70 (t, 2H, J=4.7 Hz), 3.23-3.17 (m, 4H), 2.95 (t, 2H, J=5.9 Hz), 2.82 (t, 2H, J=5.9 Hz).

<Example 82> Preparation of 8-fluoro-3-(3-(4-(2-fluorophenyl)-3,6-dihydropyridin-1(2H)-yl)-3-oxopropyl)isoquinolin-1(2H)-one

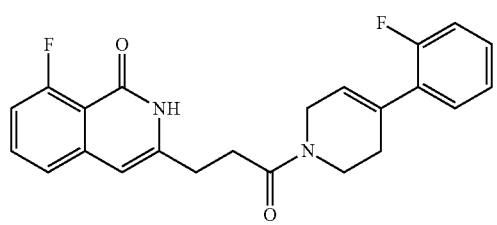 [SMILES: O=C(CCc1cc2cccc(F)c2c(=O)[nH]1)N1CC=C(c2ccccc2F)CC1]

The target compound was obtained using 4-(2-fluorophenyl)-1,2,3,6-tetrahydropyridine hydrochloride in place of 4-(piperazin-1-yl)benzonitrile 2HCl used in Step 3 of Example 68.

$^1$H NMR (300 MHz, CDCl$_3$) δ 10.22 (br, 1H), 7.54-7.47 (m, 1H), 7.23-6.98 (m, 6H), 6.24 (s, 1H), 5.97-5.90 (m, 1H), 4.31-4.30 (m, 1H), 4.11 (m, 1H), 3.88 (t, 1H, J=5.6 Hz), 3.64 (t, 1H, J=5.7 Hz), 2.94-2.92 (m, 2H), 2.83-2.78 (m, 2H), 2.56 (m, 2H).

<Example 83> Preparation of 8-fluoro-3-(3-(4-(3-fluorophenyl)-3,6-dihydropyridin-1(2H)-yl)-3-oxopropyl)isoquinolin-1(2H)-one

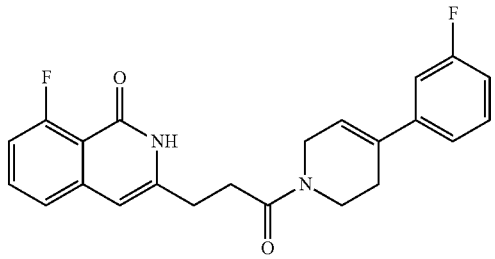 [SMILES: O=C(CCc1cc2cccc(F)c2c(=O)[nH]1)N1CC=C(c2cccc(F)c2)CC1]

The target compound was obtained using 4-(3-fluorophenyl)-1,2,3,6-tetrahydropyridine hydrochloride in place of 4-(piperazin-1-yl)benzonitrile 2HCl used in Step 3 of Example 68.

$^1$H NMR (300 MHz, DMSO-$d_6$) δ 11.25 (br, 1H), 7.61-7.57 (m, 1H), 7.40-7.23 (m, 4H), 7.12-7.06 (m, 2H), 6.41-6.37 (m, 1H), 6.28-6.24 (m, 1H), 4.19-4.13 (m, 2H), 3.68 (t, 2H, J=5.3 Hz), 2.82-2.74 (m, 4H), 2.50-2.43 (m, 2H).

<Example 84> Preparation of 3-fluoro-5-(1-(3-(8-fluoro-1-oxo-1,2-dihydroisoquinolin-3-yl)propanoyl)-1,2,3,6-tetrahydropyridin-4-yl)benzonitrile

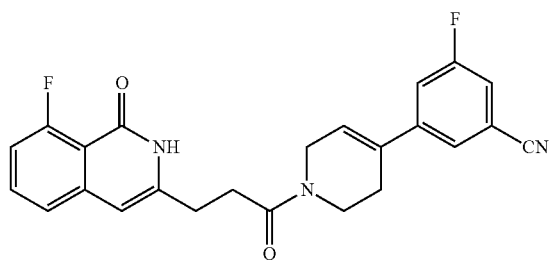 [SMILES: N#Cc1cc(F)cc(C2=CCN(C(=O)CCc3cc4cccc(F)c4c(=O)[nH]3)CC2)c1]

The target compound was obtained using 3-fluoro-5-(1,2,3,6-tetrahydropyridin-4-yl) benzonitrile hydrochloride in place of 4-(piperazin-1-yl)benzonitrile 2HCl used in Step 3 of Example 68.

$^1$H NMR (300 MHz, CDCl$_3$) δ 10.31 (br, 1H), 7.53-7.49 (m, 1H), 7.41 (d, 1H, J=7.8 Hz), 7.21 (m, 3H), 7.05-6.97 (m, 1H), 6.26-6.08 (m, 2H), 4.35 (m, 1H), 4.16 (m, 1H), 3.90 (t, 1H, J=5.6 Hz), 3.69 (t, 1H, J=5.6 Hz), 2.95-2.93 (m, 2H), 2.86-2.78 (m, 2H), 2.52 (m, 2H).

<Example 85> Preparation of 8-fluoro-3-(3-(6-fluoro-3',6'-dihydro-[3,4'-bipyridine]-1'(2'H)-yl)-3-oxopropyl)isoquinolin-1(2H)-one

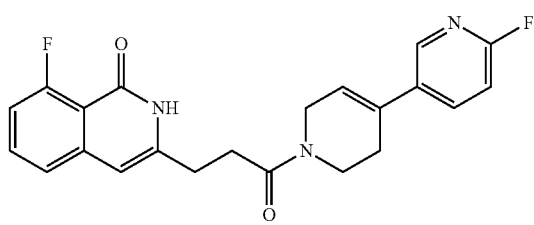 [SMILES: O=C(CCc1cc2cccc(F)c2c(=O)[nH]1)N1CC=C(c2ccc(F)nc2)CC1]

The target compound was obtained using 6-fluoro-1',2',3',6'-tetrahydro-3,4'-bipyridine hydrochloride in place of 4-(piperazin-1-yl)benzonitrile 2HCl used in Step 3 of Example 68.

$^1$H NMR (300 MHz, DMSO-$d_6$) δ 11.25 (br, 1H), 8.28-8.27 (m, 1H), 8.07-8.03 (m, 1H), 7.61-7.55 (m, 1H), 7.32 (t, 1H, J=7.8 Hz), 7.20-7.16 (m, 1H), 7.13-7.02 (m, 1H), 6.41-6.37 (m, 1H), 6.29-6.24 (m, 1H), 4.19-4.14 (m, 2H), 3.69 (m, 2H), 2.82-2.75 (m, 4H), 2.56-2.43 (m, 2H).

<Example 86> Preparation of 8-fluoro-3-(3-(5-fluoro-3',6'-dihydro-[2,4'-bipyridine]-1'12'H)-yl)-3-oxopropyl)isoquinolin-1(2H)-one

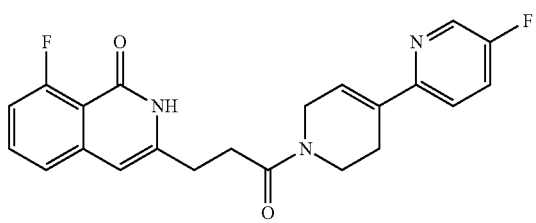 [SMILES: O=C(CCc1cc2cccc(F)c2c(=O)[nH]1)N1CC=C(c2ccc(F)cn2)CC1]

The target compound was obtained using 5-fluoro-1',2',3',6'-tetrahydro-2,4'-bipyridine hydrochloride in place of 4-(piperazin-1-yl)benzonitrile 2HCl used in Step 3 of Example 68.

$^1$H NMR (300 MHz, CDCl$_3$) δ 10.27 (br, 1H), 8.42-8.39 (m, 1H), 7.54-7.46 (m, 1H), 7.40-7.32 (m, 2H), 7.20 (d, 1H, J=7.8 Hz), 7.03-6.96 (m, 1H), 6.53-6.49 (m, 1H), 6.24 (s, 1H), 4.35 (m, 1H), 4.16 (m, 1H), 3.90 (t, 1H, J=5.6 Hz), 3.67 (t, 1H, J=5.6 Hz), 2.94 (t, 2H, J=6.6 Hz), 2.85-2.76 (m, 2H), 2.70-2.65 (m, 2H).

<Example 87> Preparation of 2-fluoro-5-(1-(3-(8-fluoro-1-oxo-1,2-dihydroisoquinolin-3-yl)propanoyl)-1,2,3,6-tetrahydropyridin-4-yl)benzonitrile

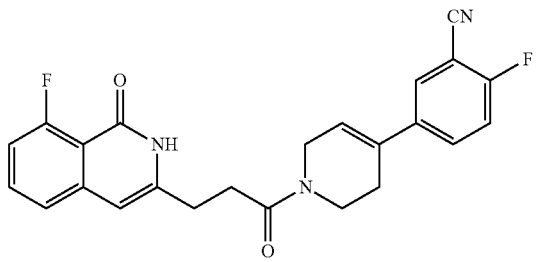 [SMILES: N#Cc1cc(C2=CCN(C(=O)CCc3cc4cccc(F)c4c(=O)[nH]3)CC2)ccc1F]

The target compound was obtained using 2-fluoro-5-(1,2,3,6-tetrahydropyridin-4-yl)benzonitrile hydrochloride in place of 4-(piperazin-1-yl)benzonitrile 2HCl used in Step 3 of Example 68.

$^1$H NMR (300 MHz, CDCl$_3$) δ 10.41 (br, 1H), 7.57-7.50 (m, 3H), 7.21-7.16 (m, 2H), 7.04-6.96 (m, 1H), 6.27 (s, 1H), 6.11-5.97 (m, 1H), 4.32 (m, 1H), 4.14 (m, 1H), 3.89 (t, 1H, J=5.7 Hz), 3.69 (t, 1H, J=5.7 Hz), 2.95-2.94 (m, 2H), 2.87-2.80 (m, 2H), 2.50 (m, 2H).

<Example 88> Preparation of 1'-(3-(8-fluoro-1-oxo-1,2-dihydroisoquinolin-3-yl)propanoyl)-1',2',3',6'-tetrahydro-[2,4'-bipyridine]-5-carbonitrile

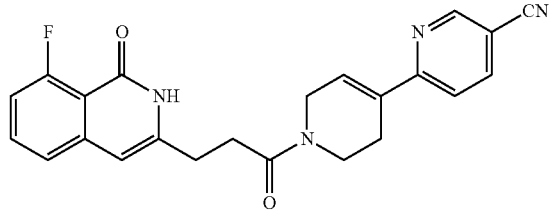 [SMILES: N#Cc1ccc(C2=CCN(C(=O)CCc3cc4cccc(F)c4c(=O)[nH]3)CC2)nc1]

The target compound was obtained using 1',2',3',6'-tetrahydro-[2,4'-bipyridine]-5-carbonitrile hydrochloride in place of 4-(piperazin-1-yl)benzonitrile 2HCl used in Step 3 of Example 68.

¹H NMR (300 MHz, CDCl₃) δ 10.35 (br, 1H), 8.80 (s, 1H), 7.95-7.90 (m, 1H), 7.51-7.42 (m, 2H), 7.21-7.18 (m, 1H), 7.03-6.95 (m, 1H), 6.82-6.78 (m, 1H), 6.25 (s, 1H), 4.41 (m, 1H), 4.23 (m, 1H), 3.90 (m, 1H), 3.70-3.67 (m, 1H), 2.95-2.93 (m, 2H), 2.86-2.80 (m, 2H), 2.70-2.64 (m, 2H).

<Example 89> Preparation of 8-fluoro-3-(3-(4-(3-fluorophenyl)piperazin-1-yl)-3-oxopropyl)isoquinolin-1(2H)-one

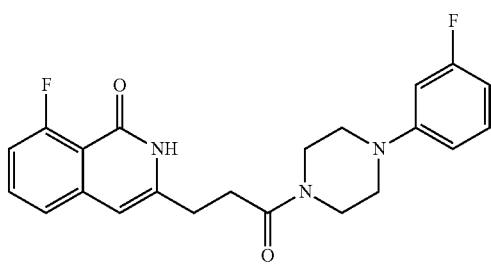 [SMILES: O=C(CCc1cc2cccc(F)c2c(=O)[nH]1)N1CCN(c2cccc(F)c2)CC1]

The target compound was obtained using 1-(3-fluorophenyl)piperazine hydrochloride in place of 4-(piperazin-1-yl)benzonitrile 2HCl used in Step 3 of Example 68.

¹H NMR (300 MHz, CDCl₃) δ 10.68 (br, 1H), 7.55-7.48 (m, 1H), 7.23-7.17 (m, 1H), 7.04-6.98 (m, 2H), 6.66-6.54 (m, 3H), 6.29 (s, 1H), 3.84 (t, 2H, J=4.8 Hz), 3.64 (t, 2H, J=4.8 Hz), 3.20-3.15 (m, 4H), 2.96 (t, 2H, J=6.0 Hz), 2.84 (t, 2H, J=6.0 Hz).

<Example 90> Preparation of 2-fluoro-5-(4-(3-(8-fluoro-1-oxo-1,2-dihydroisoquinolin-3-yl)propanoyl)piperazin-1-yl)benzonitrile

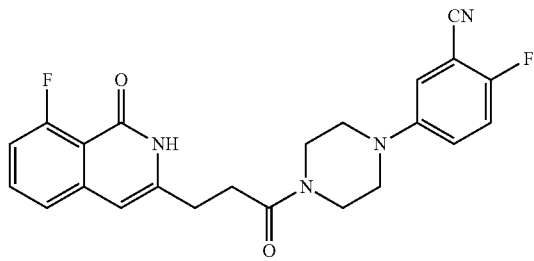 [SMILES: N#Cc1cc(N2CCN(C(=O)CCc3cc4cccc(F)c4c(=O)[nH]3)CC2)ccc1F]

The target compound was obtained using 2-fluoro-5-(piperazin-1-yl)benzonitrile hydrochloride in place of 4-(piperazin-1-yl)benzonitrile 2HCl used in Step 3 of Example 68.

¹H NMR (300 MHz, CDCl₃) δ 10.70 (br, 1H), 7.57-7.50 (m, 1H), 7.25-7.22 (m, 1H), 7.05-6.98 (m, 1H), 6.86 (s, 1H), 6.83-6.81 (m, 1H), 6.77-6.73 (m, 1H), 6.31 (s, 1H), 3.84 (t, 2H, J=4.8 Hz), 3.67 (m, 2H), 3.24-3.23 (m, 4H), 2.97 (t, 2H, J=6.6 Hz), 2.86 (t, 2H, J=6.3 Hz).

<Example 91> Preparation of 4-(4-(3-(8-fluoro-1-oxo-1,2-dihydroisoquinolin-3-yl)propanoyl)piperazin-1-yl)benzonitrile hydrochloride

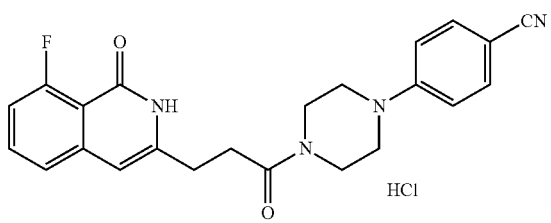 [SMILES: N#Cc1ccc(N2CCN(C(=O)CCc3cc4cccc(F)c4c(=O)[nH]3)CC2)cc1 ; Cl]

The target compound was obtained using 4-(4-(3-(8-fluoro-1-oxo-1,2-dihydroisoquinolin-3-yl)propanoyl)piperazin-1-yl)benzonitrile in place of 4-(4-(3-(8-fluoro-1-oxo-1,2-dihydroisoquinolin-3-yl)propyl)piperazin-1-yl)benzonitrile used in Example 68.

¹H NMR (300 MHz, DMSO-d₆) δ 11.24 (br, 1H), 7.62-7.59 (m, 3H), 7.33 (d, 1H, J=7.8 Hz), 7.13-7.06 (m, 1H), 7.04-7.01 (m, 2H), 6.40 (s, 1H), 3.61 (m, 4H), 3.39-3.34 (m, 4H), 2.76-2.74 (m, 4H).

<Example 92> Preparation of 8-fluoro-3-(3-(2'-fluoro-3,6-dihydro-[4,4'-bipyridine]-1(2H)-yl)-3-oxopropyl)isoquinolin-1(2H)-one

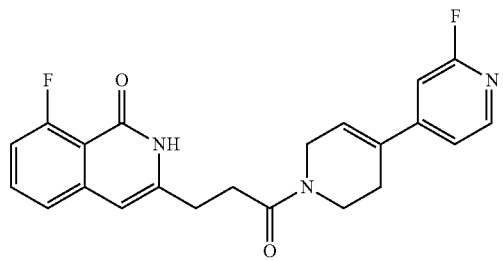 [SMILES: O=C(CCc1cc2cccc(F)c2c(=O)[nH]1)N1CC=C(c2ccnc(F)c2)CC1]

The target compound was obtained using 2'-fluoro-1,2,3,6-tetrahydro-4,4'-bipyridine hydrochloride in place of 4-(piperazin-1-yl)benzonitrile 2HCl used in Step 3 of Example 68.

¹H NMR (300 MHz, CDCl₃) δ 10.22 (br, 1H), 8.17 (d, 1H, J=4.8 Hz), 7.50 (m, 1H), 7.19-7.14 (m, 1H), 7.13 (d, 1H, J=4.8 Hz), 7.04-7.00 (m, 1H), 6.83 (d, 1H, J=6.9 Hz), 6.38-6.25 (m, 2H), 4.36 (m, 1H), 4.17 (m, 1H), 3.90 (t, 1H, J=5.1 Hz), 3.69 (t, 1H, J=5.1 Hz), 2.95-2.93 (m, 2H), 2.83-2.79 (m, 2H), 2.53 (m, 2H).

<Example 93> Preparation of 1'-(3-(8-fluoro-1-oxo-1,2-dihydroisoquinolin-3-yl)propanoyl)-1',2',3',6'-tetrahydro-[3,4'-bipyridine]-6-carbonitrile

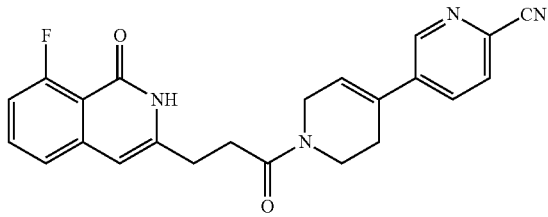 [SMILES: N#Cc1ccc(C2=CCN(C(=O)CCc3cc4cccc(F)c4c(=O)[nH]3)CC2)cn1]

The target compound was obtained using 1',2',3',6'-tetrahydro-[3,4'-bipyridine]-6-carbonitrile hydrochloride in place of 4-(piperazin-1-yl)benzonitrile 2HCl used in Step 3 of Example 68.

$^1$H NMR (300 MHz, CDCl$_3$) δ 10.44 (br, 1H), 8.71 (s, 1H), 7.75-7.65 (m, 2H), 7.51 (m, 1H), 7.21 (d, 1H, J=5.4 Hz), 7.03-6.95 (m, 1H), 6.32-6.19 (m, 2H), 4.37 (m, 1H), 4.20 (m, 1H), 3.92 (t, 1H, J=5.3 Hz), 3.73 (t, 1H, J=4.8 Hz), 2.96-2.94 (m, 2H), 2.88-2.82 (m, 2H), 2.56 (m, 2H).

<Example 94> Preparation of 4-(4-(3-(7-fluoro-1-oxo-1,2-dihydroisoquinolin-3-yl)propanoyl)piperazin-1-yl)benzonitrile

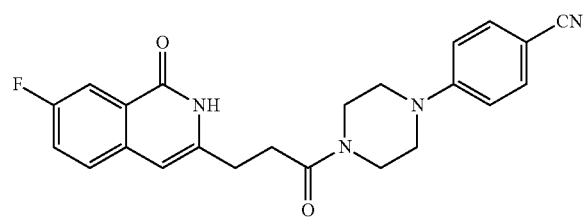 [SMILES: N#Cc1ccc(N2CCN(C(=O)CCc3cc4ccc(F)cc4c(=O)[nH]3)CC2)cc1]

The target compound was obtained using 7-fluoro-3-(3-hydroxypropyl)-1H-isochromen-1-one in place of 8-fluoro-3-(3-hydroxypropyl)-1H-isochromen-1-one used in Step 1 of Example 68.

$^1$H NMR (300 MHz, DMSO-d$_6$) δ 11.36 (br, 1H), 7.79-7.76 (m, 1H), 7.64-7.54 (m, 4H), 7.02-6.99 (m, 2H), 6.45 (s, 1H), 3.62-3.61 (m, 4H), 3.78-3.33 (m, 4H), 2.76-2.73 (m, 4H).

<Example 95> Preparation of 4-(1-(3-(7-fluoro-1-oxo-1,2-dihydroisoquinolin-3-yl)propanoyl)-1,2,3,6-tetrahydropyridin-4-yl)benzonitrile

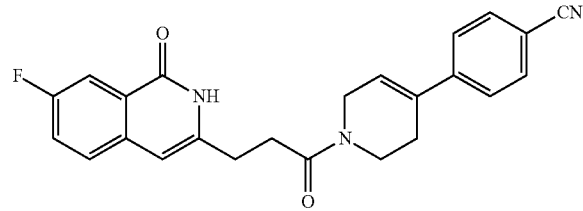 [SMILES: N#Cc1ccc(C2=CCN(C(=O)CCc3cc4ccc(F)cc4c(=O)[nH]3)CC2)cc1]

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 4-(1,2,3,6-tetrahydropyridin-4-yl)benzonitrile hydrochloride was used in place of 4-(piperazin-1-yl)benzonitrile 2HCl used in Step 3 of Example 68.

$^1$H NMR (300 MHz, CDCl$_3$) δ 10.65 (br, 1H), 7.99-7.96 (m, 1H), 7.62-7.60 (m, 2H), 7.47-7.40 (m, 3H), 7.36-7.29 (m, 1H), 6.29 (s, 1H), 6.23-6.08 (m, 1H), 4.36-4.35 (m, 1H), 4.16-4.15 (m, 1H), 3.92-3.88 (m, 1H), 3.70-3.66 (m, 1H), 2.97-2.96 (m, 2H), 2.86-2.77 (m, 2H), 2.56-2.55 (m, 2H).

<Example 96> Preparation of 1'-(3-(7-fluoro-1-oxo-1,2-dihydroisoquinolin-3-yl)propanoyl)-1',2',3',6'-tetrahydro-[2,4'-bipyridine]-5-carbonitrile

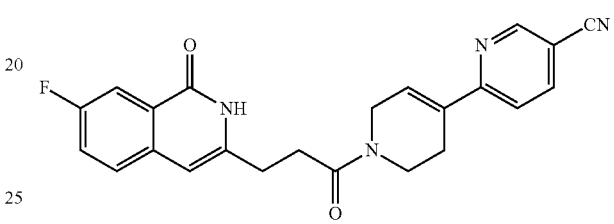

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 1',2',3',6'-tetrahydro-[2,4'-bipyridine]-5-carbonitrile hydrochloride was used in place of 4-(piperazin-1-yl)benzonitrile 2HCl used in Step 3 of Example 68.

$^1$H NMR (300 MHz, CDCl$_3$) δ 10.42 (s, 1H), 8.86 (s, 1H), 8.06-7.96 (m, 2H), 7.47-7.27 (m, 3H), 6.28 (s, 1H), 5.95 (s, 1H), 4.04-4.03 (m, 1H), 4.19-4.18 (m, 1H), 3.94-3.91 (m, 1H), 3.70-3.66 (m, 1H), 3.01-2.68 (m, 6H).

<Example 97> Preparation of 5-(4-(3-(7-fluoro-1-oxo-1,2-dihydroisoquinolin-3-yl)propanoyl)piperazin-1-yl)picolinonitrile

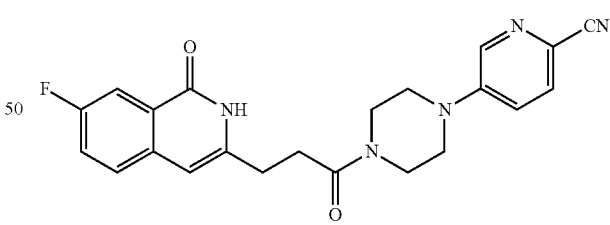

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 5-(piperazin-1-yl)picolinonitrile hydrochloride was used in place of 4-(piperazin-1-yl)benzonitrile 2HCl used in Step 3 of Example 68.

$^1$H NMR (300 MHz, DMSO-d$_6$) δ 11.37 (br, 1H), 8.41-8.40 (m, 1H), 7.78-7.75 (m, 2H), 7.67-7.62 (m, 1H), 7.57-7.54 (m, 1H), 7.37-7.33 (m, 1H), 3.63-3.62 (m, 4H), 3.45-3.41 (m, 4H), 2.76-2.73 (m, 4H).

<Example 98> Preparation of 2-(4-(3-(7-fluoro-1-oxo-1,2-dihydroisoquinolin-3-yl)propanoyl)piperazin-1-yl)benzonitrile

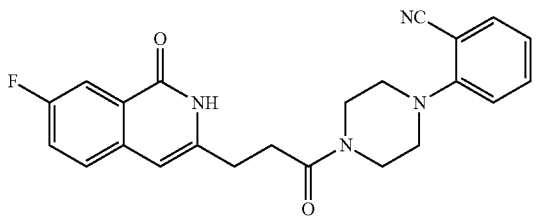 [SMILES: N#Cc1ccccc1N1CCN(C(=O)CCc2cc3ccc(F)cc3c(=O)[nH]2)CC1]

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 2-(piperazin-1-yl)benzonitrile hydrochloride was used in place of 4-(piperazin-1-yl)benzonitrile 2HCl used in Step 3 of Example 68.
$^1$H NMR (300 MHz, DMSO-$d_6$) δ 7.80-7.17 (m, 2H), 7.67-7.55 (m, 3H), 7.15-7.10 (m, 2H), 6.45 (s, 1H), 3.66-3.65 (m, 4H), 3.12-3.10 (m, 4H), 2.78-2.77 (m, 4H).

<Example 99> Preparation of 6-(4-(3-(7-fluoro-1-oxo-1,2-dihydroisoquinolin-3-yl)propanoyl)piperazin-1-yl)nicotinonitrile

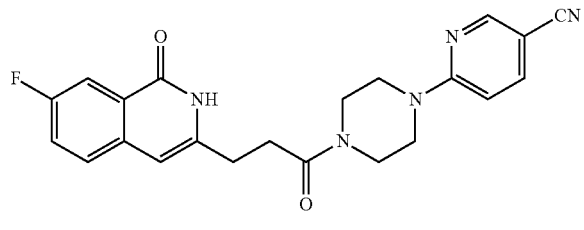 [SMILES: N#Cc1ccc(N2CCN(C(=O)CCc3cc4ccc(F)cc4c(=O)[nH]3)CC2)nc1]

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 6-(piperazin-1-yl)nicotinonitrile hydrochloride was used in place of 4-(piperazin-1-yl)benzonitrile 2HCl used in Step 3 of Example 68.
$^1$H NMR (300 MHz, DMSO-$d_6$) δ 7.80-7.17 (m, 2H), 7.67-7.55 (m, 3H), 7.15-7.10 (m, 2H), 6.45 (s, 1H), 3.66-3.65 (m, 4H), 3.12-3.10 (m, 4H), 2.78-2.77 (m, 4H).

<Example 100> Preparation of 3-fluoro-4-(4-(3-(7-fluoro-1-oxo-1,2-dihydroisoquinolin-3-yl)propanoyl)piperazin-1-yl)benzonitrile

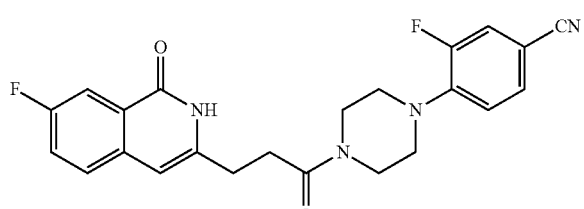

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 3-fluoro-4-(piperazin-1-yl)benzonitrile hydrochloride was used in place of 4-(piperazin-1-yl)benzonitrile 2HCl used in Step 3 of Example 68.
$^1$H NMR (300 MHz, CDCl$_3$) δ 10.45 (br, 1H), 8.02-7.98 (m, 1H), 7.37-7.34 (m, 1H), 6.90-6.79 (m, 3H), 6.27 (s, 3H), 3.87-3.84 (m, 2H), 3.60-3.59 (m, 2H), 3.02-2.93 (m, 6H), 2.79-2.75 (m, 2H).

<Example 101> Preparation of 2-fluoro-4-(4-(3-(7-fluoro-1-oxo-1,2-dihydroisoquinolin-3-yl)propanoyl)piperazin-1-yl)benzonitrile

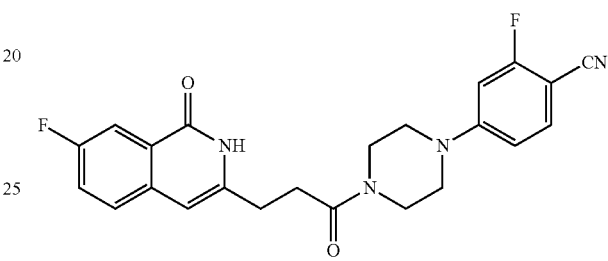

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 2-fluoro-4-(piperazin-1-yl)benzonitrile hydrochloride was used in place of 4-(piperazin-1-yl)benzonitrile 2HCl used in Step 3 of Example 68.
$^1$H NMR (300 MHz, DMSO-$d_6$) δ 11.37 (br, 1H), 7.79-7.75 (m, 1H), 7.67-7.54 (m, 3H), 6.96-6.92 (m, 1H), 6.85-6.83 (m, 1H), 6.44 (s, 1H), 3.61-3.60 (m, 4H), 3.44-3.39 (m, 4H), 2.77-2.76 (m, 4H).

<Example 102> Preparation of 7-fluoro-3-(3-(6-fluoro-3',6'-dihydro-[3,4'-bipyridine]-1'(2'H)-yl)-3-oxopropyl)isoquinolin-1(2H)-one

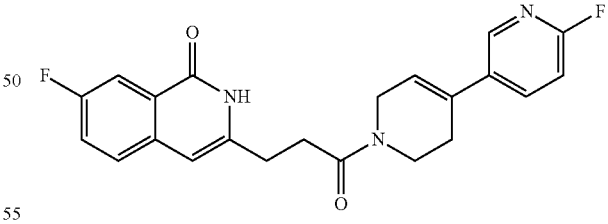

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 6-fluoro-1',2',3',6'-tetrahydro-3,4'-bipyridine hydrochloride was used in place of 4-(piperazin-1-yl)benzonitrile 2HCl used in Step 3 of Example 68.
$^1$H NMR (300 MHz, CDCl$_3$) δ 10.58 (br, 1H), 8.19-8.16 (m, 1H), 7.99-7.96 (m, 1H), 7.74-7.73 (m, 1H), 7.45-7.44 (m, 1H), 7.35-7.34 (m, 1H), 6.92-6.89 (m, 1H), 6.28 (s, 1H), 6.10-5.97 (m, 1H), 4.33-4.32 (m, 1H), 4.14-4.13 (m, 1H), 3.92-3.88 (m, 1H), 3.70-3.67 (m, 1H), 2.97-2.96 (m, 2H), 2.83-2.81 (m, 2H), 2.54-2.53 (m, 2H).

<Example 103> Preparation of 7-fluoro-3-(3-(5-fluoro-3',6'-dihydro-[2,4'-bipyridine]-1'(2'H)-yl)-3-oxopropyl)isoquinolin-1(2H)-one

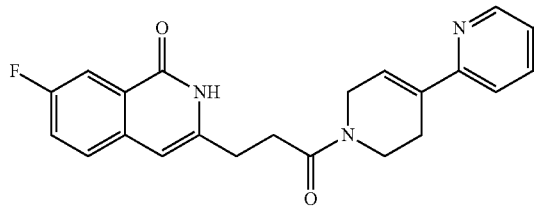

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 5-fluoro-1',2',3',6'-tetrahydro-2,4'-bipyridine hydrochloride was used in place of 4-(piperazin-1-yl)benzonitrile 2HCl used in Step 3 of Example 68.

$^1$H NMR (300 MHz, CDCl$_3$) δ 10.83 (br, 1H), 8.41-8.38 (m, 1H), 7.98-7.96 (m, 1H), 7.45-7.30 (m, 4H), 6.50 (s, 1H), 6.30 (s, 1H), 4.36-4.35 (m, 1H), 4.17-4.16 (m, 1H), 3.89-3.87 (m, 1H), 3.67-3.65 (m, 1H), 2.98-2.96 (m, 2H), 2.83-2.81 (m, 2H), 2.69-2.64 (m, 2H).

<Example 104> Preparation of 7-fluoro-3-(3-(4-(4-fluorophenyl)-3,6-dihydropyridin-1(2H)-yl)-3-oxopropyl)isoquinolin-1(2H)-one

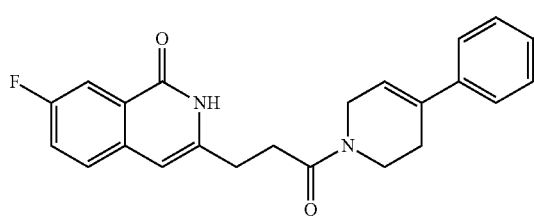

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 4-(4-fluorophenyl)-1,2,3,6-tetrahydropyridine hydrochloride was used in place of 4-(piperazin-1-yl)benzonitrile 2HCl used in Step 3 of Example 68.

$^1$H NMR (300 MHz, CDCl$_3$) δ 10.71 (br, 1H), 7.98-7.96 (m, 1H), 7.44-7.43 (m, 1H), 7.31-7.25 (m, 3H), 7.03-6.97 (m, 2H), 6.29 (s, 1H), 6.01-5.89 (m, 1H), 4.29-4.28 (m, 1H), 4.14-4.28 (m, 1H), 4.14-4.10 (m, 1H), 3.88-3.87 (m, 1H), 3.65-3.64 (m, 1H), 2.96-2.95 (m, 2H), 2.80-2.79 (m, 2H), 2.52-2.51 (m, 2H).

<Example 105> Preparation of 3-(3-(4-(4-chlorophenyl)piperazin-1-yl)-3-oxopropyl)-7-fluoroisoquinolin-1(2H)-one

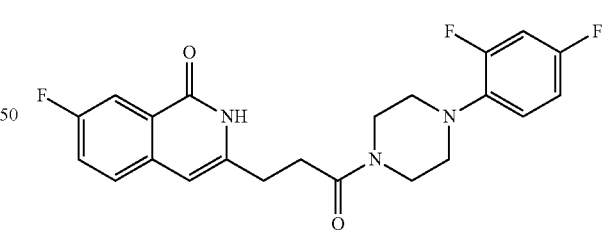

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 1-(4-chlorophenyl)piperazine hydrochloride was used in place of 4-(piperazin-1-yl)benzonitrile 2HCl used in Step 3 of Example 68.

$^1$H NMR (300 MHz, CDCl$_3$) δ 10.50 (br, 1H), 8.01-7.97 (m, 1H), 7.47-7.42 (m, 1H), 7.37-7.34 (m, 1H), 7.23-7.20 (m, 2H), 6.83-6.80 (m, 2H), 6.28 (s, 1H), 3.85-3.82 (m, 2H), 3.62-3.59 (m, 2H), 3.15-3.12 (m, 4H), 2.97-2.93 (m, 2H), 2.80-2.76 (m, 2H).

<Example 106> Preparation of 3-(3-(4-(2,4-difluorophenyl)piperazin-1-yl)-3-oxopropyl)-7-fluoroisoquinolin-1(2H)-one The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 1-(2,4-difluorophenyl)piperazine hydrochloride was used in place of 4-(piperazin-1-yl)benzonitrile 2HCl used in Step 3 of Example 68.

$^1$H NMR (300 MHz, CDCl$_3$) δ 10.45 (br, 1H), 8.02-7.98 (m, 1H), 7.37-7.34 (m, 1H), 6.90-6.79 (m, 3H), 6.27 (s, 3H), 3.87-3.84 (m, 2H), 3.60-3.59 (m, 2H), 3.02-2.93 (m, 6H), 2.79-2.75 (m, 2H).

<Example 107> Preparation of 4-fluoro-3-(4-(3-(7-fluoro-1-oxo-1,2-dihydroisoquinolin-3-yl)propanoyl)piperazin-1-yl)benzonitrile

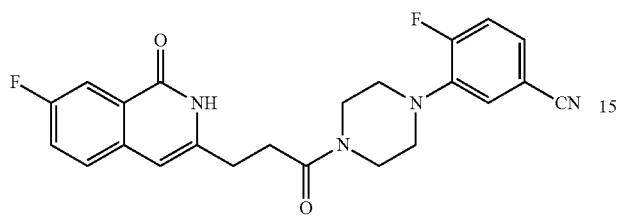

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 4-fluoro-3-(piperazin-1-yl)benzonitrile hydrochloride was used in place of 4-(piperazin-1-yl)benzonitrile 2HCl used in Step 3 of Example 68.

$^1$H NMR (300 MHz, DMSO-d$_6$) δ 11.39 (br, 1H), 7.79-7.76 (m, 1H), 7.68-7.63 (m, 1H), 7.58-7.38 (m, 4H), 6.45 (s, 1H), 3.63-3.62 (m, 4H), 3.01-3.02 (m, 4H), 3.76-3.75 (m, 4H).

<Example 108> Preparation of 4-fluoro-2-(4-(3-(7-fluoro-1-oxo-1,2-dihydroisoquinolin-3-yl)propanoyl)piperazin-1-yl)benzonitrile

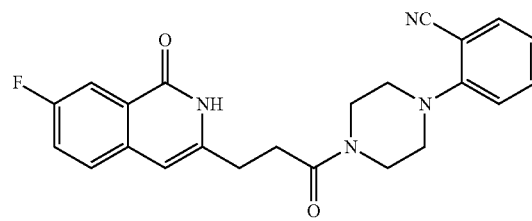

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 4-fluoro-2-(piperazin-1-yl)benzonitrile hydrochloride was used in place of 4-(piperazin-1-yl)benzonitrile 2HCl used in Step 3 of Example 68.

$^1$H NMR (300 MHz, DMSO-d$_6$) δ 11.39 (br, 1H), 7.81-7.75 (m, 2H), 7.65-7.64 (m, 1H), 7.58-7.55 (m, 1H), 6.98-6.94 (m, 2H), 6.45 (s, 1H), 3.65-3.64 (m, 4H), 3.16-3.13 (m, 4H), 2.75-2.74 (m, 4H).

<Example 109> Preparation of 2-fluoro-5-(4-(3-(7-fluoro-1-oxo-1,2-dihydroisoquinolin-3-yl)propanoyl)piperazin-1-yl)benzonitrile

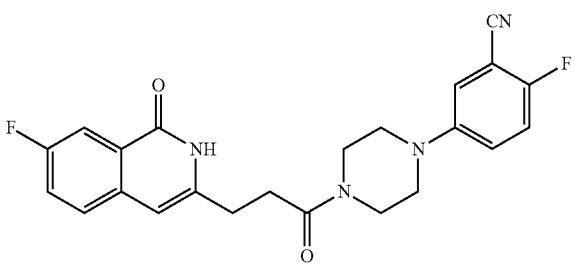

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 2-fluoro-5-(piperazin-1-yl)benzonitrile hydrochloride was used in place of 4-(piperazin-1-yl)benzonitrile 2HCl used in Step 3 of Example 68.

$^1$H NMR (300 MHz, DMSO-d$_6$) δ 11.38 (br, 1H), 7.78-7.75 (m, 1H), 7.67-7.64 (m, 1H), 7.57-7.55 (m, 1H), 7.39-7.34 (m, 3H), 6.44 (s, 1H), 3.60-3.59 (m, 4H), 3.13-3.11 (m, 4H), 2.76-2.75 (m, 4H).

<Example 110> Preparation of 5-fluoro-2-(4-(3-(7-fluoro-1-oxo-1,2-dihydroisoquinolin-3-yl)propanoyl)piperazin-1-yl)benzonitrile

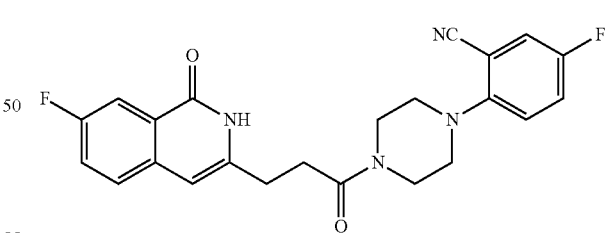

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 5-fluoro-2-(piperazin-1-yl)benzonitrile hydrochloride was used in place of 4-(piperazin-1-yl)benzonitrile 2HCl used in Step 3 of Example 68.

$^1$H NMR (300 MHz, DMSO-d$_6$) δ 11.39 (br, 1H), 7.78-7.76 (m, 2H), 7.68-7.63 (m, 1H), 7.59-7.49 (m, 2H), 7.20-7.15 (m, 1H), 6.46 (s, 1H), 3.66-3.65 (m, 4H), 3.05-3.03 (m, 4H), 2.77-2.76 (m, 4H).

\<Example 111\> Preparation of 4-fluoro-3-(1-(3-(7-fluoro-1-oxo-1,2-dihydroisoquinolin-3-yl)propanoyl)-1,2,3,6-tetrahydropyridin-4-yl)benzonitrile

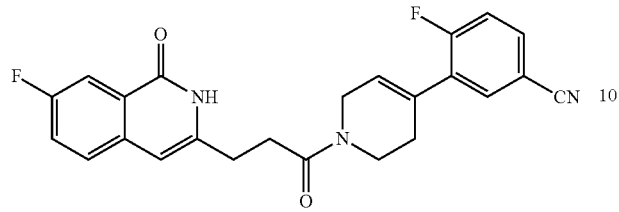

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 4-fluoro-3-(1,2,3,6-tetrahydropyridin-4-yl)benzonitrile hydrochloride was used in place of 4-(piperazin-1-yl)benzonitrile 2HCl used in Step 3 of Example 68.

$^1$H NMR (300 MHz, CDCl$_3$) δ 10.59 (br, 1H), 8.00-7.97 (m, 1H), 7.56-7.54 (m, 2H), 7.47-7.43 (m, 1H), 7.36-7.34 (m, 1H), 7.19-7.13 (m, 1H), 6.29 (s, 1H), 6.08-5.94 (m, 1H), 4.34-4.33 (m, 1H), 4.14-4.13 (m, 1H), 3.90-3.88 (m, 1H), 3.68-3.64 (m, 1H), 2.98-2.96 (m, 2H), 2.85-2.82 (m, 2H), 2.53-2.52 (m, 2H).

\<Example 112\> Preparation of 5-fluoro-2-(1-(3-(7-fluoro-1-oxo-1,2-dihydroisoquinolin-3-yl)propanoyl)-1,2,3,6-tetrahydropyridin-4-yl)benzonitrile

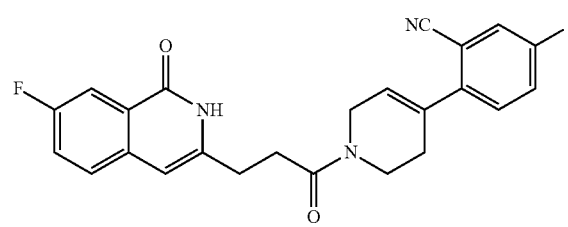

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 5-fluoro-2-(1,2,3,6-tetrahydropyridin-4-yl)benzonitrile hydrochloride was used in place of 4-(piperazin-1-yl)benzonitrile 2HCl used in Step 3 of Example 68.

$^1$H NMR (300 MHz, CDCl$_3$) δ 10.36 (br, 1H), 8.01-7.98 (m, 1H), 7.47-7.26 (m, 5H), 6.27 (s, 1H), 5.98-5.94 (m, 1H), 4.35-4.34 (m, 1H), 4.13-4.12 (m, 1H), 3.94-3.91 (m, 1H), 3.70-3.66 (m, 1H), 2.96-2.95 (m, 2H), 2.82-2.80 (m, 2H), 2.55-2.54 (m, 2H).

\<Example 113\> Preparation of 3-(3-(4-(2,4-difluorophenyl)-3,6-dihydropyridin-1(2H)-yl)-3-oxopropyl)-7-fluoroisoquinolin-1(2H)-one

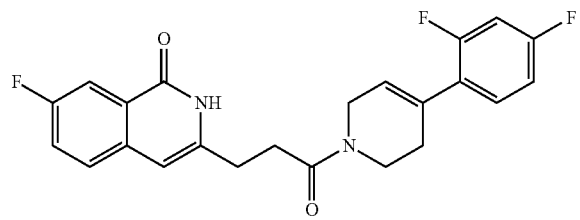

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 4-(2,4-difluorophenyl)-1,2,3,6-tetrahydropyridine hydrochloride was used in place of 4-(piperazin-1-yl)benzonitrile 2HCl used in Step 3 of Example 68.

$^1$H NMR (300 MHz, CDCl$_3$) δ 10.56 (br, 1H), 8.01-7.98 (m, 1H), 7.47-7.42 (m, 1H), 7.36-7.33 (m, 1H), 7.19-7.16 (m, 1H), 6.86-6.80 (m, 2H), 6.28 (s, 1H), 5.92-5.85 (m, 1H), 4.31-4.30 (m, 1H), 4.11-4.10 (m, 1H), 3.88-3.85 (m, 1H), 3.65-3.61 (m, 1H), 2.98-2.94 (m, 2H), 2.83-2.76 (m, 2H), 2.52-2.51 (m, 2H).

\<Example 114\> Preparation of 3-fluoro-5-(1-(3-(7-fluoro-1-oxo-1,2-dihydroisoquinolin-3-yl)propanoyl)-1,2,3,6-tetrahydropyridin-4-yl)benzonitrile

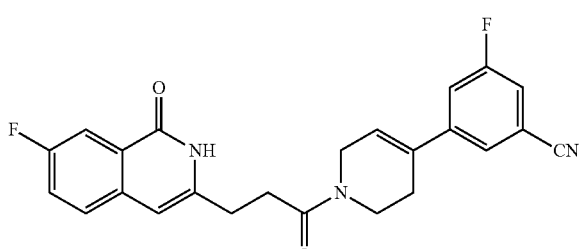

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 3-fluoro-5-(1,2,3,6-tetrahydropyridin-4-yl)benzonitrile hydrochloride was used in place of 4-(piperazin-1-yl)benzonitrile 2HCl used in Step 3 of Example 68.

$^1$H NMR (300 MHz, CDCl$_3$) δ 10.73 (br, 1H), 7.99-7.96 (m, 1H), 7.48-7.26 (m, 5H), 6.31 (s, 1H), 6.21-6.07 (m, 1H), 4.35-4.34 (m, 1H), 4.17-4.16 (m, 1H), 3.91-3.88 (m, 1H), 3.71-3.67 (m, 1H), 2.98-2.97 (m, 2H), 2.87-2.79 (m, 2H), 2.51-2.50 (m, 2H).

<Example 115> Preparation of 7-fluoro-3-(3-(4-(3-fluorophenyl)-3,6-dihydropyridin-1(2H)-yl)-3-oxopropyl)isoquinolin-1(2H)-one

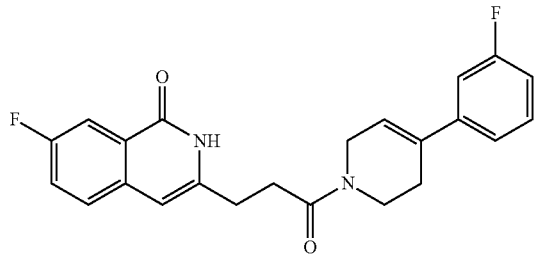 [SMILES: O=C(CCc1cc2ccc(F)cc2c(=O)[nH]1)N1CC=C(c2cccc(F)c2)CC1]

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 4-(3-fluorophenyl)-1,2,3,6-tetrahydropyridine hydrochloride was used in place of 4-(piperazin-1-yl)benzonitrile 2HCl used in Step 3 of Example 68.

$^1$H NMR (300 MHz, CDCl$_3$) δ 10.50 (br, 1H), 8.00-7.97 (m, 1H), 7.43-7.41 (m, 1H), 7.32-7.27 (m, 2H), 7.12-7.10 (m, 1H), 7.04-6.93 (m, 2H), 6.27 (s, 1H), 6.12-5.98 (m, 1H), 4.31-4.30 (m, 1H), 4.11-4.10 (m, 1H), 3.91-3.87 (m, 1H), 3.67-3.64 (m, 1H), 2.96-2.94 (m, 2H), 2.84-2.75 (m, 2H), 2.55-2.54 (m, 2H).

<Example 116> Preparation of (R)-7-fluoro-3-(3-(3-(4-fluorophenyl)pyrrolidin-1-yl)-3-oxopropyl)isoquinolin-1(2H)-one

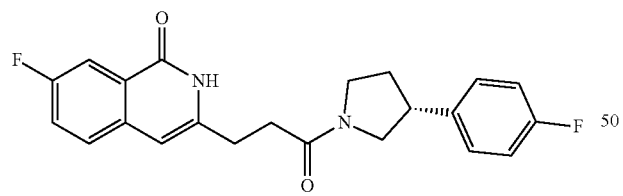

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and (R)-3-(4-fluorophenyl)pyrrolidine was used in place of 4-(piperazin-1-yl)benzonitrile 2HCl used in Step 3 of Example 68.

$^1$H NMR (300 MHz, CDCl$_3$) δ 10.55 (br, 1H), 8.01-7.98 (m, 1H), 7.43-7.42 (m, 1H), 7.35-7.29 (m, 1H), 7.17-7.16 (m, 2H), 7.03-6.98 (m, 2H), 6.25 (s, 1H), 4.13-4.07 (m, 1H), 3.89-3.77 (m, 1H), 3.61-3.34 (m, 3H), 3.31-3.30 (m, 2H), 2.69-2.68 (m, 2H), 2.34-2.33 (m, 1H), 2.09-1.97 (m, 1H).

<Example 117> Preparation of (S)-7-fluoro-3-(3-(3-(4-fluorophenyl)pyrrolidin-1-yl)-3-oxopropyl)isoquinolin-1(2H)-one

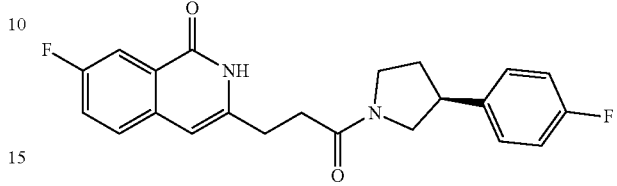

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and (S)-3-(4-fluorophenyl)pyrrolidine was used in place of 4-(piperazin-1-yl)benzonitrile 2HCl used in Step 3 of Example 68.

$^1$H NMR (300 MHz, CDCl$_3$) δ 10.55 (br, 1H), 8.01-7.98 (m, 1H), 7.43-7.42 (m, 1H), 7.35-7.29 (m, 1H), 7.17-7.16 (m, 2H), 7.03-6.98 (m, 2H), 6.25 (s, 1H), 4.13-4.07 (m, 1H), 3.89-3.77 (m, 1H), 3.61-3.34 (m, 3H), 3.31-3.30 (m, 2H), 2.69-2.68 (m, 2H), 2.34-2.33 (m, 1H), 2.09-1.97 (m, 1H).

<Example 118> Preparation of 7-fluoro-3-(3-oxo-3-(4-(4-(trifluoromethyl)phenyl)piperazin-1-yl)propyl)isoquinolin-1(2H)-one

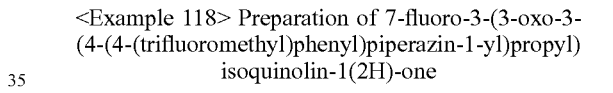

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 1-(4-(trifluoromethyl)phenyl)piperazine hydrochloride was used in place of 4-(piperazin-1-yl)benzonitrile 2HCl used in Step 3 of Example 68.

$^1$H NMR (300 MHz, CDCl$_3$) δ 10.40 (br, 1H), 8.00-7.97 (m, 1H), 7.51-7.30 (m, 4H), 6.92-6.89 (m, 2H), 6.28 (s, 1H), 3.85-3.84 (m, 2H), 3.62-3.61 (m, 2H), 3.29-3.27 (m, 4H), 2.93-2.88 (m, 2H), 2.80-2.77 (m, 2H).

93

<Example 119> Preparation of 3-fluoro-5-(4-(3-(7-fluoro-1-oxo-1,2-dihydroisoquinolin-3-yl)propanoyl)piperazin-1-yl)benzonitrile

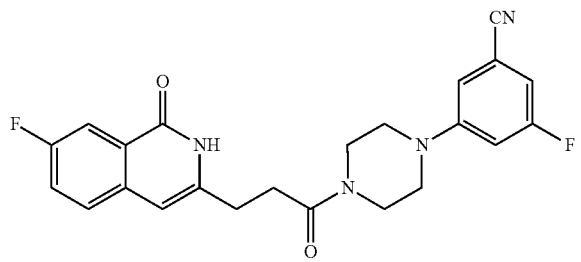

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 3-fluoro-5-(piperazin-1-yl)benzonitrile hydrochloride was used in place of 4-(piperazin-1-yl)benzonitrile 2HCl used in Step 3 of Example 68.

¹H NMR (300 MHz, CDCl₃) δ 10.68 (br, 1H), 7.99-7.96 (m, 1H), 7.48-7.44 (m, 1H), 7.38-7.35 (m, 1H), 6.87-6.73 (m, 3H), 6.31 (s, 1H), 3.85-3.84 (m, 2H), 3.64-3.63 (m, 2H), 3.24-3.23 (m, 4H), 2.97-2.96 (m, 2H), 2.84-2.80 (m, 2H).

<Example 120> Preparation of 7-fluoro-3-(3-(4-(3-fluorophenyl)piperazin-1-yl)-3-oxopropyl)isoquinolin-1(2H)-one

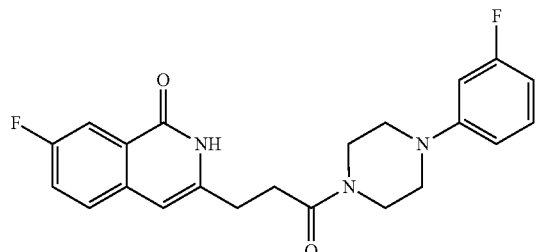

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 1-(3-fluorophenyl)piperazine hydrochloride was used in place of 4-(piperazin-1-yl)benzonitrile 2HCl used in Step 3 of Example 68.

¹H NMR (300 MHz, CDCl₃) δ 10.66 (br, 1H), 8.01-7.97 (m, 1H), 7.47-7.46 (m, 1H), 7.43-7.16 (m, 1H), 6.67-6.55 (m, 2H), 6.30 (s, 3H), 3.85-3.84 (m, 2H), 3.82-3.60 (m, 2H), 3.20-3.17 (m, 4H), 2.98-2.94 (m, 2H), 2.82-2.78 (m, 2H).

94

<Example 121> Preparation of 7-fluoro-3-(3-(2'-fluoro-3,6-dihydro-[4,4'-bipyridine]-1(2H)-yl)-3-oxopropyl)isoquinolin-1(2H)-one

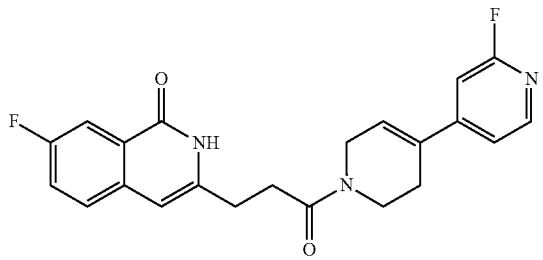 [SMILES: O=C(CCc1cc2ccc(F)cc2c(=O)[nH]1)N1CC=C(c2ccnc(F)c2)CC1]

The target compound was obtained according to Example 68, except that 7-fluoro-3-(3-hydroxypropyl)-1H-isochromen-1-one was used in place of 8-fluoro-3-(3-hydroxypropyl)-1H-isochromen-1-one used in Step 1 of Example 68, and 2'-fluoro-1,2,3,6-tetrahydro-4,4'-bipyridine hydrochloride was used in place of 4-(piperazin-1-yl)benzonitrile 2HCl used in Step 3 of Example 68.

¹H NMR (300 MHz, CDCl₃) δ 10.66 (s, 1H), 8.16-8.15 (m, 1H), 7.98-7.95 (m, 1H), 7.47-7.42 (m, 1H), 7.35-7.33 (m, 1H), 7.13-7.12 (m, 1H), 6.84-6.81 (m, 1H), 6.38-6.22 (m, 2H), 4.37-4.36 (m, 1H), 4.17-4.16 (m, 1H), 3.92-3.88 (m, 1H), 3.71-3.67 (m, 1H), 2.97-2.96 (m, 2H), 2.86-2.80 (m, 2H), 2.54-2.53 (m, 2H).

<Example 122> Preparation of 4-(4-(3-(8-fluoro-5-methyl-1-oxo-1,2-dihydroisoquinolin-3-yl)propanoyl)piperazin-1-yl)benzonitrile

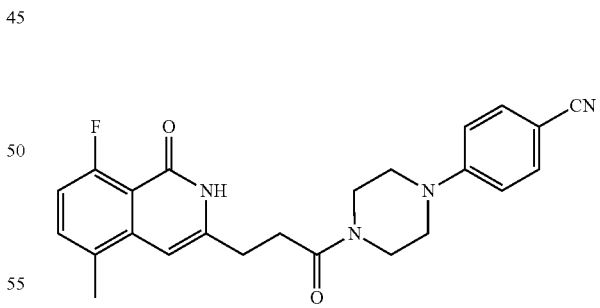

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68.

¹H NMR (300 MHz, CDCl₃) δ 10.82 (br, 1H), 7.53-7.50 (m, 2H), 7.38-7.34 (m, 1H), 6.93-6.82 (m, 3H), 6.36 (s, 1H), 3.84-3.83 (m, 2H), 3.68-3.66 (m, 2H), 3.40-3.34 (m, 4H), 3.00-2.98 (m, 2H), 2.89-2.87 (m, 2H), 2.44 (s, 3H).

<Example 123> Preparation of 6-(4-(3-(8-fluoro-5-methyl-1-oxo-1,2-dihydroisoquinolin-3-yl)propanoyl)piperazin-1-yl)nicotinonitrile

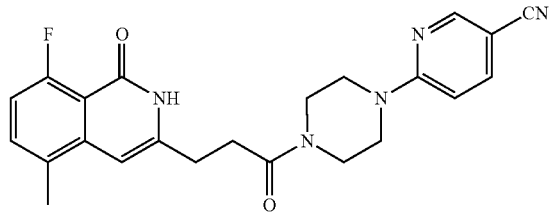 [SMILES: Cc1ccc(F)c2c(=O)[nH]c(CCC(=O)N3CCN(c4ccc(C#N)cc4)CC3)cc12]

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 6-(piperazin-1-yl)nicotinonitrile hydrochloride was used in place of 4-(piperazin-1-yl)benzonitrile 2HCl used in Step 3 of Example 68.

$^1$H NMR (300 MHz, CDCl$_3$) δ 10.73 (br, 1H), 8.41 (s, 1H), 7.67-7.64 (m, 1H), 7.35-7.34 (m, 1H), 6.93-6.87 (m, 1H), 6.61-6.58 (m, 1H), 6.39 (s, 1H), 3.81-3.80 (m, 4H), 3.67-3.64 (m, 4H), 2.99-2.97 (m, 2H), 2.88-2.86 (m, 2H), 2.43 (s, 3H).

<Example 124> Preparation of 5-(4-(3-(8-fluoro-5-methyl-1-oxo-1,2-dihydroisoquinolin-3-yl)propanoyl)piperazin-1-yl)picolinonitrile

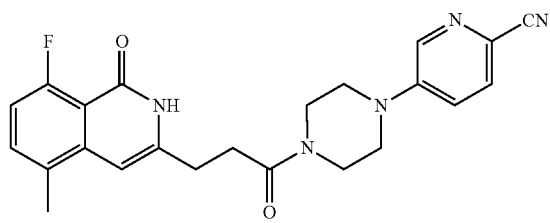 [SMILES: Cc1ccc(F)c2c(=O)[nH]c(CCC(=O)N3CCN(c4ccc(C#N)nc4)CC3)cc12]

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 5-(piperazin-1-yl)picolinonitrile hydrochloride was used in place of 4-(piperazin-1-yl)benzonitrile 2HCl used in Step 3 of Example 68.

$^1$H NMR (300 MHz, CDCl$_3$) δ 10.76 (br, 1H), 8.29 (s, 1H), 7.55-7.52 (m, 1H), 7.39-7.35 (m, 1H), 7.07-7.06 (m, 1H), 6.94-6.87 (m, 1H), 6.37 (s, 1H), 3.87-3.86 (m, 2H), 3.72-3.70 (m, 2H), 3.42-3.41 (m, 4H), 3.20-2.98 (m, 2H), 2.87-2.85 (m, 2H), 2.44 (s, 3H).

<Example 125> Preparation of 8-fluoro-3-(3-(4-(4-fluorophenyl)-3,6-dihydropyridin-1(2H)-yl)-3-oxopropyl)-5-methylisoquinolin-1(2H)-one

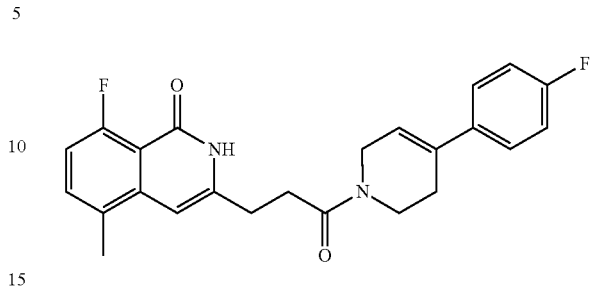

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 4-(4-fluorophenyl)-1,2,3,6-tetrahydropyridine hydrochloride was used in place of 4-(piperazin-1-yl)benzonitrile 2HCl used in Step 3 of Example 68.

$^1$H NMR (300 MHz, CDCl$_3$) δ 10.56 (br, 1H), 7.33-7.27 (m, 3H), 7.03-6.98 (m, 2H), 6.86-6.85 (m, 1H), 6.31 (s, 1H), 6.01-5.89 (m, 1H), 4.28-4.27 (m, 1H), 4.11-4.10 (m, 1H), 3.89-3.85 (m, 1H), 3.68-3.65 (m, 1H), 2.98-2.96 (m, 2H), 2.87-2.79 (m, 2H), 2.52-2.51 (m, 2H), 2.42 (s, 3H).

<Example 126> Preparation of 2-fluoro-4-(4-(3-(8-fluoro-5-methyl-1-oxo-1,2-dihydroisoquinolin-3-yl)propanoyl)piperazin-1-yl)benzonitrile

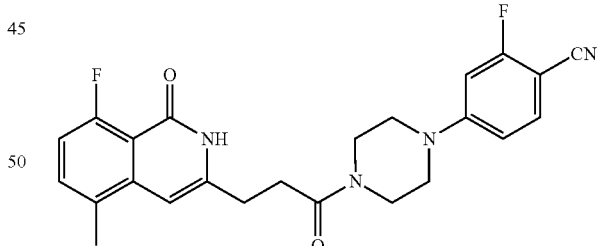

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 2-fluoro-4-(piperazin-1-yl)benzonitrile hydrochloride was used in place of 4-(piperazin-1-yl)benzonitrile 2HCl used in Step 3 of Example 68.

$^1$H NMR (300 MHz, CDCl$_3$) δ 10.59 (br, 1H), 7.45-7.34 (m, 2H), 6.94-6.87 (m, 1H), 6.62-6.59 (m, 1H), 6.54-6.50 (m, 1H), 6.35 (s, 1H), 3.86-3.85 (m, 2H), 3.67-3.66 (m, 2H), 3.38-3.37 (m, 4H), 2.99-2.98 (m, 2H), 2.86-2.84 (m, 2H), 2.43 (s, 3H).

<Example 127> Preparation of 2-(4-(3-(8-fluoro-5-methyl-1-oxo-1,2-dihydroisoquinolin-3-yl)propanoyl)piperazin-1-yl)benzonitrile

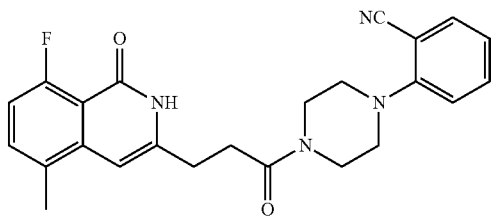 [SMILES: Cc1ccc(F)c2c(=O)[nH]c(CCC(=O)N3CCN(c4ccccc4C#N)CC3)cc12]

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 2-(piperazin-1-yl)benzonitrile hydrochloride was used in place of 4-(piperazin-1-yl)benzonitrile 2HCl used in Step 3 of Example 68.

¹H NMR (300 MHz, CDCl₃) δ 10.69 (br, 1H), 7.60-7.57 (m, 1H), 7.53-7.48 (m, 1H), 7.37-7.33 (m, 1H), 7.09-7.04 (m, 1H), 6.98-6.89 (m, 2H), 6.35 (s, 1H), 3.90-3.87 (m, 2H), 3.72-3.70 (m, 2H), 3.17-3.16 (m, 4H), 3.01-2.97 (m, 2H), 2.86-2.82 (m, 2H), 2.43 (s, 3H).

<Example 128> Preparation of 3-fluoro-4-(4-(3-(8-fluoro-5-methyl-1-oxo-1,2-dihydroisoquinolin-3-yl)propanoyl)piperazin-1-yl)benzonitrile

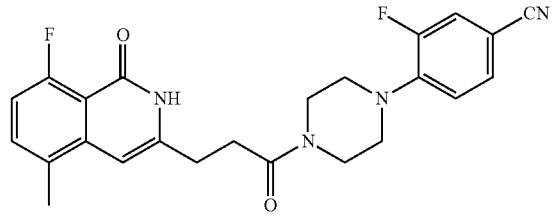 [SMILES: Cc1ccc(F)c2c(=O)[nH]c(CCC(=O)N3CCN(c4ccc(C#N)cc4F)CC3)cc12]

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 3-fluoro-4-(piperazin-1-yl)benzonitrile hydrochloride was used in place of 4-(piperazin-1-yl)benzonitrile 2HCl used in Step 3 of Example 68.

¹H NMR (300 MHz, CDCl₃) δ 10.38 (br, 1H), 7.38-7.20 (m, 3H), 6.95-6.86 (m, 2H), 6.32 (s, 1H), 3.86-3.85 (m, 2H), 3.64-3.63 (m, 2H), 3.18-3.17 (m, 4H), 2.97-2.96 (m, 2H), 2.83-2.81 (m, 2H), 2.43 (s, 3H).

<Example 129> Preparation of 8-fluoro-3-(3-(6-fluoro-3',6'-dihydro-[3,4'-bipyridine]-1'(2'H)-yl)-3-oxopropyl)-5-methylisoquinolin-1(2H)-one

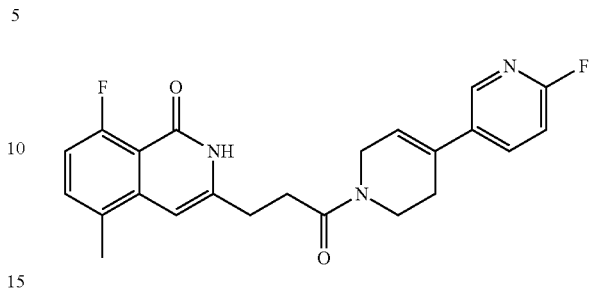

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 6-fluoro-1',2',3',6'-tetrahydro-3,4'-bipyridine hydrochloride was used in place of 4-(piperazin-1-yl)benzonitrile 2HCl used in Step 3 of Example 68.

¹H NMR (300 MHz, CDCl₃) δ 10.42 (br, 1H), 8.19-8.16 (m, 1H), 7.73-7.72 (m, 1H), 7.34-7.33 (m, 1H), 6.92-6.90 (M, 2H), 6.32 (s, 1H), 6.10-5.97 (m, 1H), 4.32-4.31 (m, 1H), 4.14-4.13 (m, 1H), 3.92-3.88 (m, 1H), 3.71-3.68 (m, 1H), 2.99-2.98 (m, 2H), 2.85-2.83 (m, 2H), 2.53-2.52 (m, 2H), 2.42 (s, 3H).

<Example 130> Preparation of 8-fluoro-3-(3-(5-fluoro-3',6'-dihydro-[2,4'-bipyridine]-1'(2'H)-yl)-3-oxopropyl)-5-methylisoquinolin-1(2H)-one

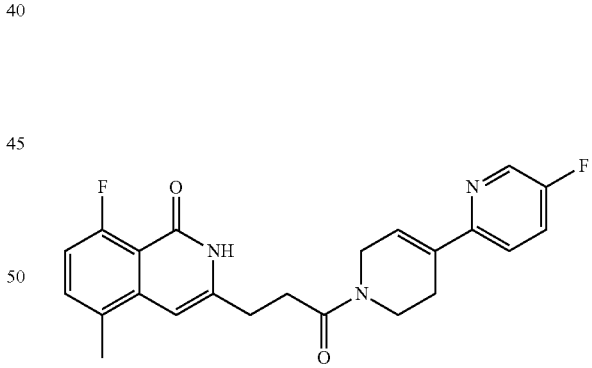

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 5-fluoro-1',2',3',6'-tetrahydro-2,4'-bipyridine hydrochloride was used in place of 4-(piperazin-1-yl)benzonitrile 2HCl used in Step 3 of Example 68.

¹H NMR (300 MHz, CDCl₃) δ 10.31 (br, 1H), 8.39 (s, 1H), 7.39-7.33 (m, 2H), 6.93-6.87 (m, 1H), 6.52-6.48 (m, 1H), 6.29 (s, 1H), 4.35-4.34 (m, 1H), 4.16-4.15 (m, 1H), 3.90-3.88 (m, 1H), 3.66-3.64 (m, 1H), 2.97-2.95 (m, 2H), 2.85-2.81 (m, 2H), 2.70-2.64 (m, 2H), 2.41 (s, 3H).

<Example 131> Preparation of 3-(3-(4-(4-chlorophenyl)piperazin-1-yl)-3-oxopropyl)-8-fluoro-5-methylisoquinolin-1(2H)-one

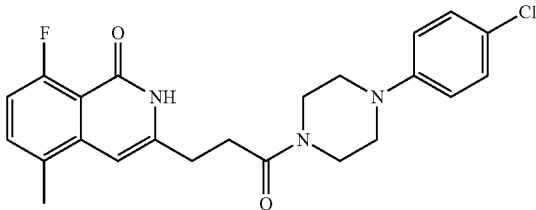 [SMILES: Cc1ccc(F)c2c(=O)[nH]c(CCC(=O)N3CCN(c4ccc(Cl)cc4)CC3)cc12]

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 1-(4-chlorophenyl)piperazine hydrochloride was used in place of 4-(piperazin-1-yl)benzonitrile 2HCl used in Step 3 of Example 68.

$^1$H NMR (300 MHz, CDCl$_3$) δ 10.52 (br, 1H), 7.37-7.33 (m, 1H), 7.23-7.20 (m, 2H), 6.94-6.87 (m, 1H), 6.82-6.80 (m, 2H), 6.32 (s, 1H), 3.83-3.82 (m, 2H), 3.62-3.61 (m, 2H), 3.12-3.11 (m, 4H), 2.99-2.95 (m, 2H), 2.84-2.80 (m, 2H), 2.42 (s, 3H).

<Example 132> Preparation of 3-(3-(4-(2,4-difluorophenyl)piperazin-1-yl)-3-oxopropyl)-8-fluoro-5-methylisoquinolin-1(2H)-one

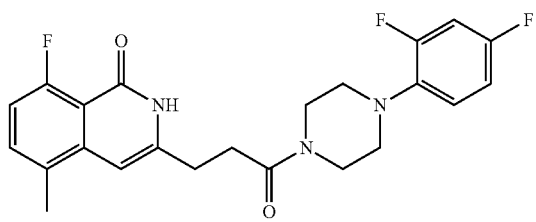

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 1-(2,4-difluorophenyl)piperazine hydrochloride was used in place of 4-(piperazin-1-yl)benzonitrile 2HCl used in Step 3 of Example 68.

$^1$H NMR (300 MHz, CDCl$_3$) δ 10.91 (br, 1H), 7.38-7.33 (m, 1H), 6.94-6.78 (m, 4H), 6.36 (s, 1H), 3.83-3.82 (m, 2H), 3.66-3.65 (m, 2H), 2.98-2.96 (m, 6H), 2.88-2.86 (m, 2H), 2.43 (s, 3H).

<Example 133> Preparation of 4-fluoro-3-(4-(3-(8-fluoro-5-methyl-1-oxo-1,2-dihydroisoquinolin-3-yl)propanoyl)piperazin-1-yl)benzonitrile

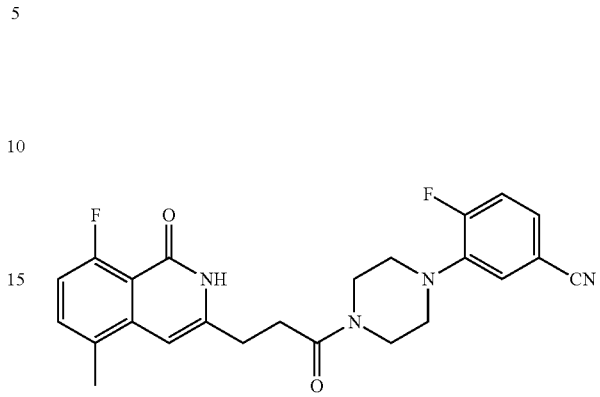

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 4-fluoro-3-(piperazin-1-yl)benzonitrile hydrochloride was used in place of 4-(piperazin-1-yl)benzonitrile 2HCl used in Step 3 of Example 68.

$^1$H NMR (300 MHz, DMSO-d$_6$) δ 11.39 (br, 1H), 7.47-7.43 (m, 4H), 7.03-6.98 (m, 1H), 6.38 (s, 1H), 3.63-3.62 (m, 4H), 3.03-3.02 (m, 4H), 2.77-2.78 (m, 4H), 2.38 (s, 3H).

<Example 134> Preparation of 4-fluoro-2-(4-(3-(8-fluoro-5-methyl-1-oxo-1,2-dihydroisoquinolin-3-yl)propanoyl)piperazin-1-yl)benzonitrile

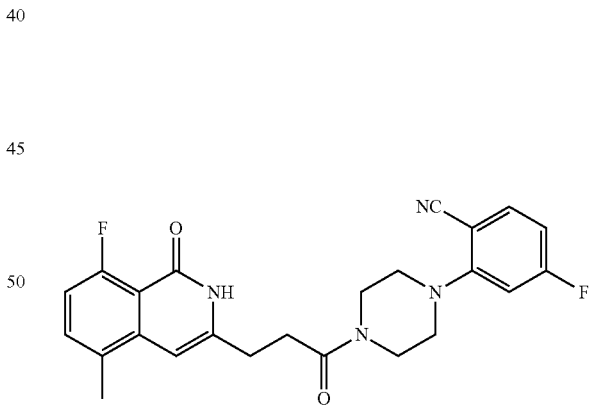

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 4-fluoro-2-(piperazin-1-yl)benzonitrile hydrochloride was used in place of 4-(piperazin-1-yl)benzonitrile 2HCl used in Step 3 of Example 68.

$^1$H NMR (300 MHz, DMSO-d$_6$) δ 11.30 (br, 1H), 7.84-7.79 (m, 1H), 7.48-7.44 (m, 1H), 7.03-6.94 (m, 3H), 6.38 (s, 1H), 3.66-3.65 (m, 4H), 3.19-3.13 (m, 4H), 2.78-2.72 (m, 4H), 2.38 (s, 3H).

<Example 135> Preparation of 2-fluoro-5-(4-(3-(8-fluoro-5-methyl-1-oxo-1,2-dihydroisoquinolin-3-yl)propanoyl)piperazin-1-yl)benzonitrile

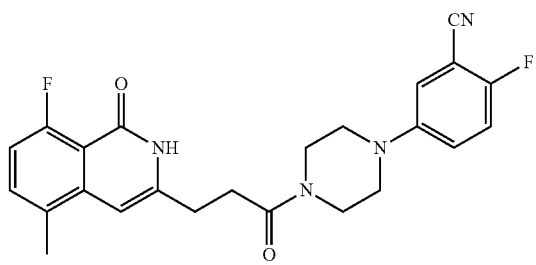

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 2-fluoro-5-(piperazin-1-yl)benzonitrile hydrochloride was used in place of 4-(piperazin-1-yl)benzonitrile 2HCl used in Step 3 of Example 68.

$^1$H NMR (300 MHz, DMSO-$d_6$) δ 11.28 (br, 1H), 7.47-7.35 (m, 4H), 7.02-6.95 (m, 1H), 6.37 (s, 1H), 3.61-3.60 (m, 4H), 3.17-3.12 (m, 4H), 2.78-2.77 (m, 4H), 2.37 (s, 3H).

<Example 136> Preparation of 5-fluoro-2-(4-(3-(8-fluoro-5-methyl-1-oxo-1,2-dihydroisoquinolin-3-yl)propanoyl)piperazin-1-yl)benzonitrile

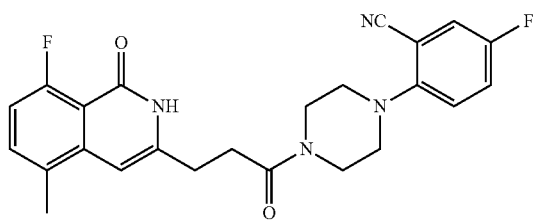

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 5-fluoro-2-(piperazin-1-yl)benzonitrile hydrochloride was used in place of 4-(piperazin-1-yl)benzonitrile 2HCl used in Step 3 of Example 68.

$^1$H NMR (300 MHz, CDCl$_3$) δ 11.30 (br, 1H), 7.78-7.75 (m, 1H), 7.53-7.47 (m, 2H), 7.20-7.18 (m, 1H), 7.03-6.97 (m, 1H), 6.38 (s, 1H), 3.66 (m, 4H), 3.15-3.06 (m, 4H), 2.78-2.77 (m, 4H), 2.38 (s, 3H).

<Example 137> Preparation of 4-fluoro-3-(1-(3-(8-fluoro-5-methyl-1-oxo-1,2-dihydroisoquinolin-3-yl)propanoyl)-1,2,3,6-tetrahydropyridin-4-yl)benzonitrile

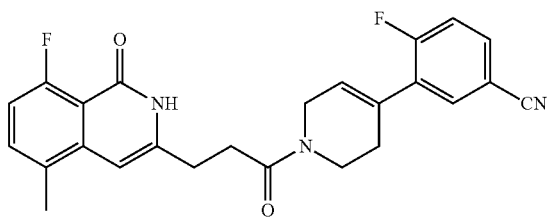 [SMILES: Cc1ccc(F)c2c(=O)[nH]c(CCC(=O)N3CC=C(c4cc(C#N)ccc4F)CC3)cc12]

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 4-fluoro-3-(1,2,3,6-tetrahydropyridin-4-yl)benzonitrile hydrochloride was used in place of 4-(piperazin-1-yl)benzonitrile 2HCl used in Step 3 of Example 68.

$^1$H NMR (300 MHz, CDCl$_3$) δ 10.49 (br, 1H), 7.55-7.53 (m, 2H), 7.37-7.33 (m, 1H), 7.19-7.12 (m, 1H), 6.95-6.88 (m, 1H), 4.33-4.32 (m, 1H), 4.15-4.14 (m, 1H), 3.89-3.86 (m, 1H), 3.69-3.65 (m, 1H), 2.99-2.96 (m, 2H), 2.88-2.85 (m, 2H), 2.52-2.51 (m, 2H), 2.43 (s, 3H).

<Example 138> Preparation of 8-fluoro-3-(3-(4-(2-fluorophenyl)-3,6-dihydropyridin-1(2H)-yl)-3-oxopropyl)-5-methylisoquinolin-1(2H)-one

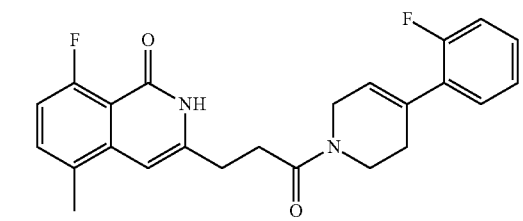

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 4-(2-fluorophenyl)-1,2,3,6-tetrahydropyridine hydrochloride was used in place of 4-(piperazin-1-yl)benzonitrile 2HCl used in Step 3 of Example 68.

$^1$H NMR (300 MHz, CDCl$_3$) δ 10.14 (br, 1H), 7.39-7.21 (m, 3H), 7.12 (d, 1H, J=7.8 Hz), 7.09-7.05 (m, 1H), 6.96-6.89 (m, 1H), 6.29 (s, 1H), 5.97-5.91 (m, 1H), 4.31 (m, 1H), 4.10 (m, 1H), 3.89 (t, 1H, J=5.6 Hz), 3.64 (t, 1H, J=5.6 Hz), 2.97 (t, 2H, J=5.3 Hz), 2.83-2.76 (m, 2H), 2.56 (m, 2H), 2.43 (s, 3H).

<Example 139> Preparation of 2-fluoro-5-(1-(3-(8-fluoro-5-methyl-1-oxo-1,2-dihydroisoquinolin-3-yl)propanoyl)-1,2,3,6-tetrahydropyridin-4-yl)benzonitrile

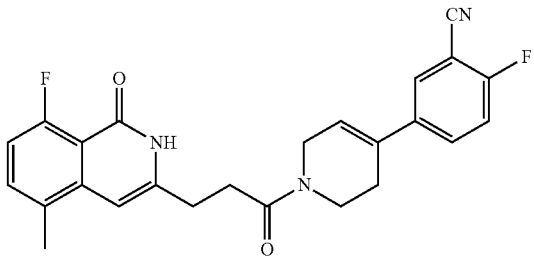 [SMILES: Cc1ccc(F)c2c(=O)[nH]c(CCC(=O)N3CC=C(c4ccc(F)c(C#N)c4)CC3)cc12]

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 2-fluoro-5-(1,2,3,6-tetrahydropyridin-4-yl)benzonitrile hydrochloride was used in place of 4-(piperazin-1-yl)benzonitrile 2HCl used in Step 3 of Example 68.

$^1$H NMR (300 MHz, CDCl$_3$) δ 10.39 (br, 1H), 7.58-7.52 (m, 2H), 7.35 (m, 1H), 7.22-7.16 (m, 1H), 6.95-6.87 (m, 1H), 6.32 (s, 1H), 6.11-5.97 (m, 1H), 4.32 (m, 1H), 4.14 (m, 1H), 3.89 (t, 1H, J=5.7 Hz), 3.69 (t, 1H, J=5.4 Hz), 2.99 (m, 2H), 2.87-2.79 (m, 2H), 2.51 (m, 2H), 2.43 (s, 3H).

<Example 140> Preparation of 1'-(3-(8-fluoro-5-methyl-1-oxo-1,2-dihydroisoquinolin-3-yl)propanoyl)-1',2',3',6'-tetrahydro-[2,4'-bipyridine]-5-carbonitrile

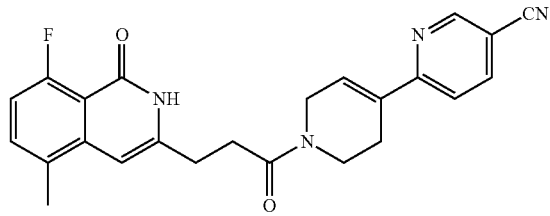 [SMILES: Cc1ccc(F)c2c(=O)[nH]c(CCC(=O)N3CC=C(c4ccc(C#N)cn4)CC3)cc12]

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 1',2',3',6'-tetrahydro-[2,4'-bipyridine]-5-carbonitrile hydrochloride was used in place of 4-(piperazin-1-yl)benzonitrile 2HCl used in Step 3 of Example 68.

$^1$H NMR (300 MHz, CDCl$_3$) δ 10.52 (br, 1H), 8.80 (s, 1H), 7.92-7.89 (m, 1H), 7.51-7.44 (m, 1H), 7.32 (m, 1H), 6.92-6.79 (m, 2H), 6.32 (s, 1H), 4.41 (m, 1H), 4.23 (m, 1H), 3.90 (m, 1H), 3.69 (m, 1H), 2.99-2.97 (m, 2H), 2.87-2.85 (m, 2H), 2.69-2.64 (m, 2H), 2.42 (s, 3H).

<Example 141> Preparation of 2-fluoro-4-(1-(3-(8-fluoro-5-methyl-1-oxo-1,2-dihydroisoquinolin-3-yl)propanoyl)-1,2,3,6-tetrahydropyridin-4-yl)benzonitrile

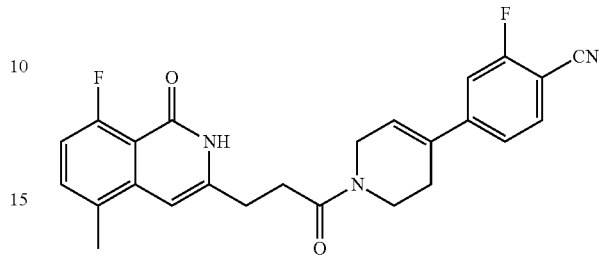

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 2-fluoro-4-(1,2,3,6-tetrahydropyridin-4-yl)benzonitrile hydrochloride was used in place of 4-(piperazin-1-yl)benzonitrile 2HCl used in Step 3 of Example 68.

$^1$H NMR (300 MHz, CDCl$_3$) δ 10.69 (br, 1H), 7.60-7.55 (m, 1H), 7.34 (m, 1H), 7.22 (d, 1H, J=8.1 Hz), 7.17-7.11 (m, 1H), 6.93-6.89 (m, 1H), 6.34 (s, 1H), 6.27-6.13 (m, 1H), 4.35 (m, 1H), 4.19 (m, 1H), 3.88 (t, 1H, J=4.5 Hz), 3.70 (t, 1H, J=4.5 Hz), 3.00 (m, 2H), 2.89-2.85 (m, 2H), 2.51 (m, 2H), 2.42 (s, 3H).

<Example 142> Preparation of 8-fluoro-3-(3-(4-(3-fluorophenyl)piperazin-1-yl)-3-oxopropyl)-5-methylisoquinolin-1(2H)-one

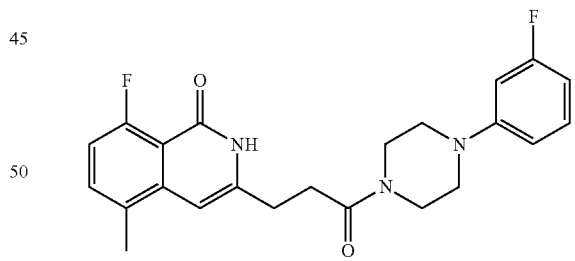

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 1-(3-fluorophenyl)piperazine hydrochloride was used in place of 4-(piperazin-1-yl)benzonitrile 2HCl used in Step 3 of Example 68.

$^1$H NMR (300 MHz, CDCl$_3$) δ 11.19 (br, 1H), 7.38-7.34 (m, 1H), 7.20 (q, 1H, J=7.6 Hz), 6.94-6.87 (m, 1H), 6.65-6.52 (m, 3H), 6.39 (s, 1H), 3.81 (t, 2H, J=4.8 Hz), 3.66 (t, 2H, J=4.7 Hz), 3.19-3.12 (m, 4H), 3.01 (t, 2H, J=6.3 Hz), 2.90 (t, 2H, J=6.3 Hz), 2.44 (s, 3H).

<Example 143> Preparation of 2-fluoro-5-(4-(3-(8-fluoro-5-methyl-1-oxo-1,2-dihydroisoquinolin-3-yl)propanoyl)piperazin-1-yl)benzonitrile

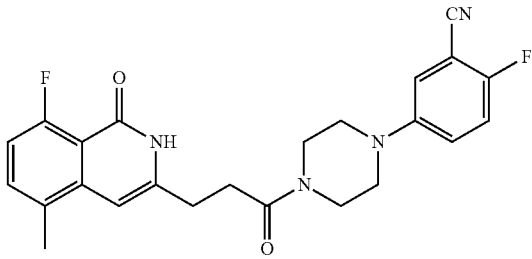 [SMILES: Cc1ccc(F)c2c(=O)[nH]c(CCC(=O)N3CCN(c4ccc(F)c(C#N)c4)CC3)cc12]

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 2-fluoro-5-(piperazin-1-yl)benzonitrile hydrochloride was used in place of 4-(piperazin-1-yl)benzonitrile 2HCl used in Step 3 of Example 68.

$^1$H NMR (300 MHz, CDCl$_3$) δ 11.36 (br, 1H), 7.40-7.36 (m, 1H), 6.94-6.87 (m, 1H), 6.84 (s, 1H), 6.81 (d, 1H, J=7.8 Hz), 6.75-6.71 (m, 1H), 6.42 (s, 1H), 3.82 (m, 2H), 3.71 (m, 2H), 3.24-3.22 (m, 4H), 3.01-3.00 (m, 2H), 2.96-2.94 (m, 2H), 2.45 (s, 3H).

<Example 144> Preparation of 8-fluoro-3-(3-(2'-fluoro-3,6-dihydro-[4,4'-bipyridine]-1(2H)-yl)-3-oxopropyl)-5-methylisoquinolin-1(2H)-one

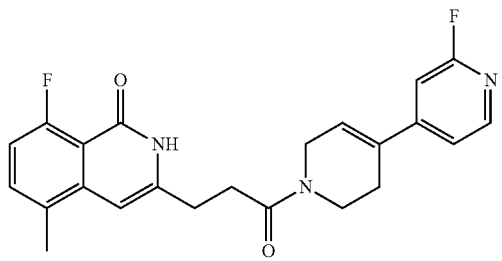 [SMILES: Cc1ccc(F)c2c(=O)[nH]c(CCC(=O)N3CC=C(c4ccnc(F)c4)CC3)cc12]

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 2'-fluoro-1,2,3,6-tetrahydro-4,4'-bipyridine hydrochloride was used in place of 4-(piperazin-1-yl)benzonitrile 2HCl used in Step 3 of Example 68.

$^1$H NMR (300 MHz, CDCl$_3$) δ 10.42 (br, 1H), 8.17 (d, 1H, J=4.5 Hz), 7.35-7.33 (m, 1H), 7.13 (d, 1H, J=3.9 Hz), 6.95-6.88 (m, 1H), 6.82 (d, 1H, J=8.4 Hz), 6.38-6.23 (m, 2H), 4.36 (m, 1H), 4.18 (m, 1H), 3.90 (t, 1H, J=5.4 Hz), 3.70 (t, 1H, J=5.6 Hz), 2.99 (m, 2H), 2.88-2.82 (m, 2H), 2.53 (m, 2H), 2.43 (s, 3H).

<Example 145> Preparation of 1'-(3-(8-fluoro-5-methyl-1-oxo-1,2-dihydroisoquinolin-3-yl)propanoyl)-1',2',3',6'-tetrahydro-[3,4'-bipyridine]-6-carbonitrile

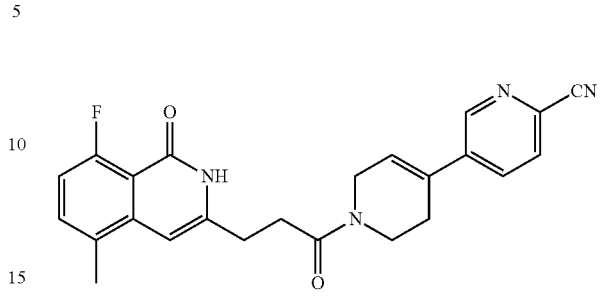

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 1',2',3',6'-tetrahydro-[3,4'-bipyridine]-6-carbonitrile hydrochloride was used in place of 4-(piperazin-1-yl)benzonitrile 2HCl used in Step 3 of Example 68.

$^1$H NMR (300 MHz, CDCl$_3$) δ 10.67 (br, 1H), 8.70 (s, 1H), 7.75-7.45 (m, 2H), 7.36-7.34 (m, 1H), 6.93-6.85 (m, 1H), 6.35-6.19 (m, 2H), 4.38 (m, 1H), 4.22 (m, 1H), 3.92 (t, 1H, J=5.6 Hz), 3.74 (t, 1H, J=5.6 Hz), 3.01-2.99 (m, 2H), 2.92-2.86 (m, 2H), 2.56 (m, 2H), 2.43 (s, 3H).

<Example 146> Preparation of methyl 4-(4-(3-(8-fluoro-5-methyl-1-oxo-1,2-dihydroisoquinolin-3-yl)propanoyl)piperazin-1-yl)benzoate

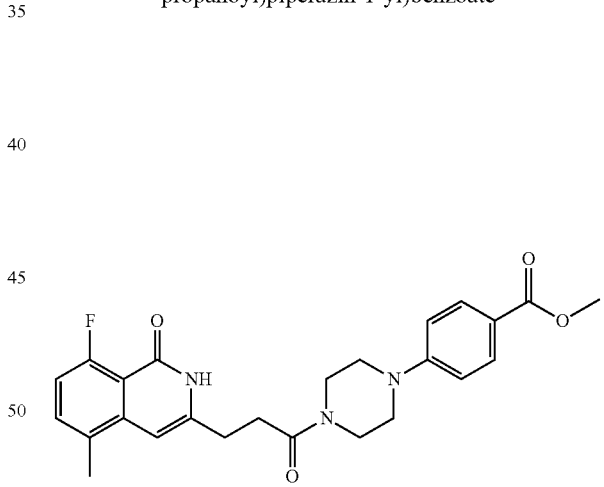

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and methyl 4-(piperazin-1-yl)benzoate hydrochloride was used in place of 4-(piperazin-1-yl)benzonitrile 2HCl used in Step 3 of Example 68.

$^1$H NMR (300 MHz, CDCl$_3$) δ 10.97 (br, 1H), 7.97-7.91 (m, 2H), 7.38-7.34 (m, 1H), 6.93-6.87 (m, 1H), 6.84-6.81 (m, 2H), 6.37 (s, 1H), 3.87 (s, 3H), 3.83 (t, 2H, J=5.1 Hz), 3.67 (t, 2H, J=4.2 Hz), 3.34-3.32 (m, 4H), 3.00 (t, 2H, J=6.3 Hz), 2.88 (t, 2H, J=6.3 Hz), 2.43 (s, 3H).

<Example 147> Preparation of 4-(4-(3-(8-fluoro-5-methyl-1-oxo-1,2-dihydroisoquinolin-3-yl)propanoyl)piperazin-1-yl)benzoic acid

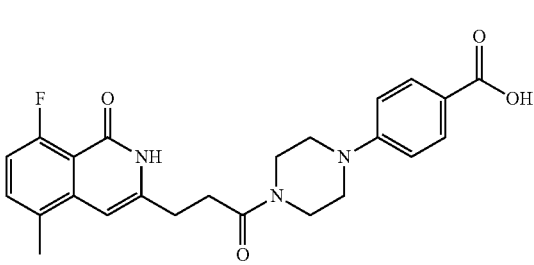 [SMILES: Cc1ccc(F)c2c(=O)[nH]c(CCC(=O)N3CCN(c4ccc(C(=O)O)cc4)CC3)cc12]

The target compound was obtained according to Example 19, except that methyl 4-(4-(3-(8-fluoro-5-methyl-1-oxo-1,2-dihydroisoquinolin-3-yl)propanoyl)piperazin-1-yl)benzoate was used in place of methyl 3-(4-(3-(7-fluoro-1-oxo-1,2-dihydroisoquinolin-3-yl)propyl)piperazin-1-yl)benzoate used in Example 19.

$^1$H NMR (300 MHz, DMSO-$d_6$) δ 11.28 (br, 1H), 7.80-7.77 (m, 2H), 7.48-7.44 (m, 1H), 7.03-6.98 (m, 3H), 6.37 (s, 1H), 3.63-3.33 (m, 8H), 2.78 (m, 4H), 2.38 (s, 3H).

<Example 148> Preparation of 4-(8-(3-(8-fluoro-5-methyl-1-oxo-1,2-dihydroisoquinolin-3-yl)propanoyl)-3,8-diazabicyclo[3.2.1]octan-3-yl)benzonitrile

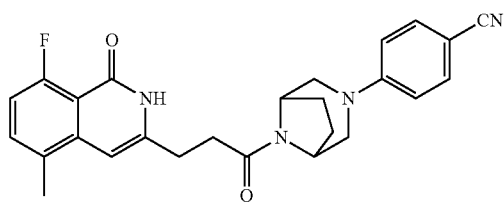 [SMILES: Cc1ccc(F)c2c(=O)[nH]c(CCC(=O)N3C4CCC3CN(c3ccc(C#N)cc3)C4)cc12]

The target compound was obtained according to Example 68, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 4-(3,8-diazabicyclo[3.2.1]octan-3-yl)benzonitrile hydrochloride was used in place of 4-(piperazin-1-yl)benzonitrile 2HCl used in Step 3 of Example 68.

$^1$H NMR (300 MHz, CDCl$_3$) δ 11.03 (br, 1H), 7.47-7.44 (m, 2H), 7.34-7.30 (m, 1H), 6.85-6.78 (m, 1H), 6.71-6.68 (m, 2H), 6.37 (s, 1H), 4.93 (m, 1H), 4.40 (m, 1H), 3.54-3.50 (m, 2H), 3.14-3.10 (m, 1H), 3.01-2.87 (m, 5H), 2.41 (s, 3H), 2.01-1.79 (m, 4H).

<Example 149> Preparation of 4-(4-(3-(7-fluoro-5-methyl-1-oxo-1,2-dihydroisoquinolin-3-yl)propanoyl)piperazin-1-yl)benzonitrile

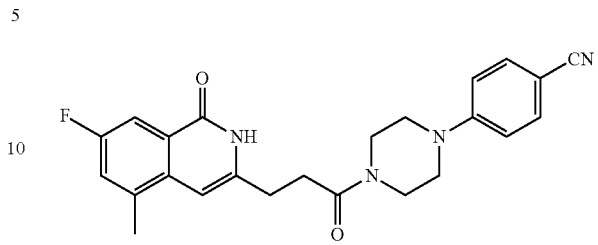

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68.

$^1$H NMR (300 MHz, DMSO-$d_6$) δ 11.40 (br, 1H), 7.65-7.59 (m, 3H), 7.44 (d, 1H, J=9.9 Hz), 7.03-7.00 (m, 2H), 6.45 (s, 1H), 3.63-3.62 (m, 4H), 3.33 (m, 4H), 2.79 (m, 4H), 2.47 (s, 3H).

<Example 150> Preparation of 7-fluoro-3-(3-(4-(4-fluorophenyl)-3,6-dihydropyridin-1(2H)-yl)-3-oxopropyl)-5-methylisoquinolin-1(2H)-one

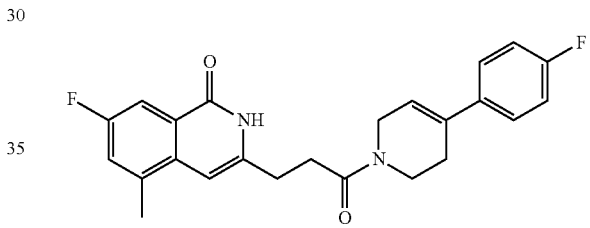

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 4-(4-fluorophenyl)-1,2,3,6-tetrahydropyridine hydrochloride was used in place of 4-(piperazin-1-yl)benzonitrile 2HCl used in Step 3 of Example 68.

$^1$H NMR (300 MHz, DMSO-$d_6$) δ 11.42 (br, 1H), 7.65-7.60 (m, 1H), 7.47-7.39 (m, 3H), 7.19-7.14 (m, 2H), 6.45-6.43 (m, 1H), 6.16-6.10 (m, 1H), 4.17-4.13 (m, 2H), 3.68 (t, 2H, J=5.4 Hz), 2.81-2.78 (m, 4H), 2.50 (m, 2H), 2.46 (s, 3H).

<Example 151> Preparation of 5-(4-(3-(7-fluoro-5-methyl-1-oxo-1,2-dihydroisoquinolin-3-yl)propanoyl)piperazin-1-yl)picolinonitrile

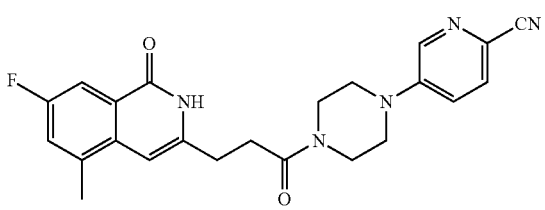

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 5-(piperazin-1-yl)picolinonitrile hydrochloride was used in place of 4-(piperazin-1-yl)benzonitrile 2HCl used in Step 3 of Example 68.

¹H NMR (300 MHz, DMSO-d₆) δ 11.41 (br, 1H), 8.42 (d, 1H, J=2.4 Hz), 7.77 (d, 1H, J=8.7 Hz), 7.64 (dd, 1H, J=9.3 Hz, 2.4 Hz), 7.44 (dd, 1H, J=9.3 Hz, 2.4 Hz), 7.36 (dd, 1H, J=8.7 Hz, 3.0 Hz), 6.45 (s, 1H), 3.64 (m, 4H), 3.46-3.41 (m, 4H), 2.79 (m, 4H), 2.48 (s, 3H).

<Example 152> Preparation of 6-(4-(3-(7-fluoro-5-methyl-1-oxo-1,2-dihydroisoquinolin-3-yl)propanoyl)piperazin-1-yl)nicotinonitrile

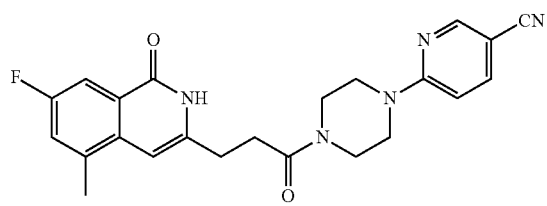 [SMILES: Cc1cc(F)cc2c(=O)[nH]c(CCC(=O)N3CCN(c4ccc(C#N)cn4)CC3)cc12]

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 6-(piperazin-1-yl)nicotinonitrile hydrochloride was used in place of 4-(piperazin-1-yl)benzonitrile 2HCl used in Step 3 of Example 68.

¹H NMR (300 MHz, DMSO-d₆) δ 11.41 (br, 1H), 8.51 (s, 1H), 7.89 (d, 1H, J=9.3 Hz), 7.64 (d, 1H, J=8.7 Hz), 7.44 (d, 1H, J=8.7 Hz), 6.94 (d, 1H, J=9.3 Hz), 6.46 (s, 1H), 3.71-3.61 (m, 8H), 2.79 (m, 4H), 2.48 (s, 3H).

<Example 153> Preparation of 2-fluoro-4-(4-(3-(7-fluoro-5-methyl-1-oxo-1,2-dihydroisoquinolin-3-yl)propanoyl)piperazin-1-yl)benzonitrile

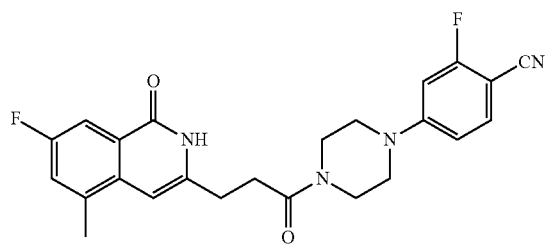 [SMILES: Cc1cc(F)cc2c(=O)[nH]c(CCC(=O)N3CCN(c4ccc(C#N)c(F)c4)CC3)cc12]

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 2-fluoro-4-(piperazin-1-yl)benzonitrile hydrochloride was used in place of 4-(piperazin-1-yl)benzonitrile 2HCl used in Step 3 of Example 68.

¹H NMR (300 MHz, DMSO-d₆) δ 11.39 (br, 1H), 7.66-7.60 (m, 2H), 7.44 (d, 1H, J=9.6 Hz), 6.95 (d, 1H, J=13.5 Hz), 6.84 (d, 1H, J=8.7 Hz), 6.45 (s, 1H), 3.62 (m, 4H), 3.45-3.42 (m, 4H), 2.79 (m, 4H), 2.48 (s, 3H).

<Example 154> Preparation of 3-fluoro-4-(4-(3-(7-fluoro-5-methyl-1-oxo-1,2-dihydroisoquinolin-3-yl)propanoyl)piperazin-1-yl)benzonitrile

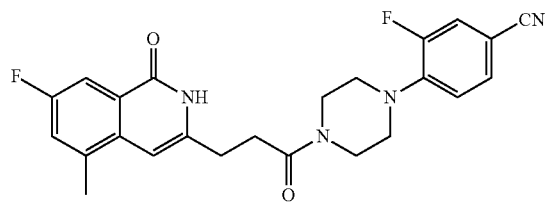 [SMILES: Cc1cc(F)cc2c(=O)[nH]c(CCC(=O)N3CCN(c4ccc(C#N)cc4F)CC3)cc12]

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 3-fluoro-4-(piperazin-1-yl)benzonitrile hydrochloride was used in place of 4-(piperazin-1-yl)benzonitrile 2HCl used in Step 3 of Example 68.

¹H NMR (300 MHz, DMSO-d₆) δ 11.43 (br, 1H), 7.74 (d, 1H, J=13.2 Hz), 7.64 (d, 1H, J=9.6 Hz), 7.59 (d, 1H, J=8.7 Hz), 7.45 (d, 1H, J=9.3 Hz), 7.14-7.08 (m, 1H), 6.46 (s, 1H), 3.64 (m, 4H), 3.15 (m, 4H), 2.78 (m, 4H), 2.48 (s, 3H).

<Example 155> Preparation of 3-(3-(4-(4-chlorophenyl)piperazin-1-yl)-3-oxopropyl)-7-fluoro-5-methylisoquinolin-1(2H)-one

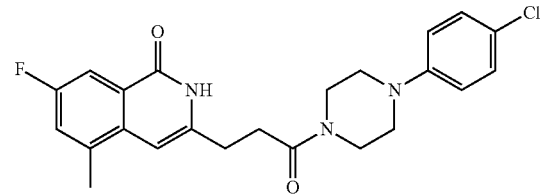 [SMILES: Cc1cc(F)cc2c(=O)[nH]c(CCC(=O)N3CCN(c4ccc(Cl)cc4)CC3)cc12]

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 1-(4-chlorophenyl)piperazine hydrochloride was used in place of 4-(piperazin-1-yl)benzonitrile 2HCl used in Step 3 of Example 68.

¹H NMR (300 MHz, DMSO-d₆) δ 11.43 (br, 1H), 7.64 (d, 1H, J=9.3 Hz), 7.44 (d, 1H, J=9.3 Hz), 7.26-7.23 (m, 2H), 6.97-6.94 (m, 2H), 6.45 (s, 1H), 3.61 (m, 4H), 3.12-3.10 (m, 4H), 2.78 (m, 4H), 2.47 (s, 3H).

<Example 156> Preparation of 4-fluoro-3-(4-(3-(7-fluoro-5-methyl-1-oxo-1,2-dihydroisoquinolin-3-yl)propanoyl)piperazin-1-yl)benzonitrile

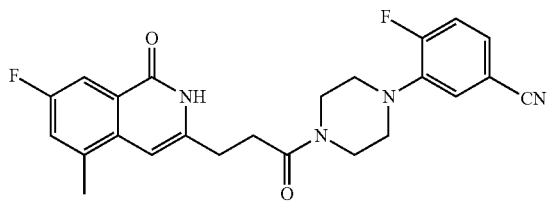 [SMILES: Cc1cc(F)cc2c(=O)[nH]c(CCC(=O)N3CCN(c4cc(C#N)ccc4F)CC3)cc12]

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 4-fluoro-3-(piperazin-1-yl)benzonitrile hydrochloride was used in place of 4-(piperazin-1-yl)benzonitrile 2HCl used in Step 3 of Example 68.

$^1$H NMR (300 MHz, DMSO-$d_6$) δ 7.65-7.62 (m, 1H), 7.50-7.39 (m, 4H), 6.46 (s, 1H), 3.63-3.62 (m, 4H), 3.02-3.01 (m, 4H), 2.78-2.77 (m, 4H), 2.50 (s, 3H).

<Example 157> Preparation of 4-fluoro-2-(4-(3-(7-fluoro-5-methyl-1-oxo-1,2-dihydroisoquinolin-3-yl)propanoyl)piperazin-1-yl)benzonitrile

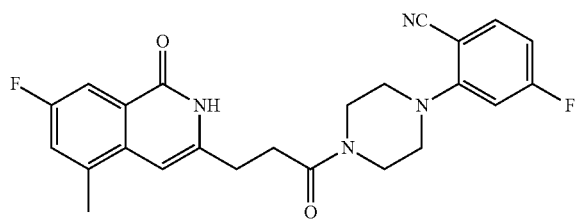

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 4-fluoro-2-(piperazin-1-yl)benzonitrile hydrochloride was used in place of 4-(piperazin-1-yl)benzonitrile 2HCl used in Step 3 of Example 68.

$^1$H NMR (300 MHz, DMSO-$d_6$) δ 11.42 (br, 1H), 7.84-7.79 (m, 1H), 7.66-7.63 (m, 1H), 7.46-7.43 (m, 1H), 6.99-6.94 (m, 2H), 6.46 (s, 1H), 3.66-3.65 (m, 4H), 3.17-3.13 (m, 4H), 2.79-2.78 (m, 4H), 2.48 (s, 3H).

<Example 158> Preparation of 2-fluoro-5-(4-(3-(7-fluoro-5-methyl-1-oxo-1,2-dihydroisoquinolin-3-yl)propanoyl)piperazin-1-yl)benzonitrile

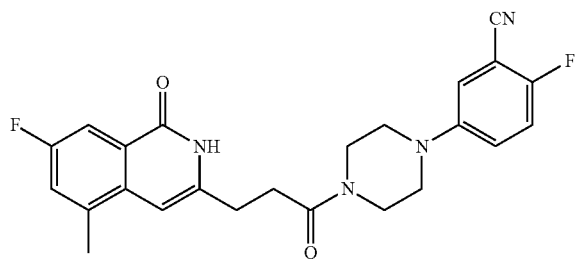 [SMILES: Cc1cc(F)cc2c(=O)[nH]c(CCC(=O)N3CCN(c4ccc(F)c(C#N)c4)CC3)cc12]

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 2-fluoro-5-(piperazin-1-yl)benzonitrile hydrochloride was used in place of 4-(piperazin-1-yl)benzonitrile 2HCl used in Step 3 of Example 68.

$^1$H NMR (300 MHz, DMSO-$d_6$) δ 11.41 (br, 1H), 7.65-7.62 (m, 1H), 7.45-7.34 (m, 4H), 6.44 (s, 1H), 3.61-3.60 (m, 4H), 3.15-3.14 (m, 4H), 2.78-2.77 (m, 4H), 2.47 (s, 3H).

<Example 159> Preparation of 5-fluoro-2-(4-(3-(7-fluoro-5-methyl-1-oxo-1,2-dihydroisoquinolin-3-yl)propanoyl)piperazin-1-yl)benzonitrile

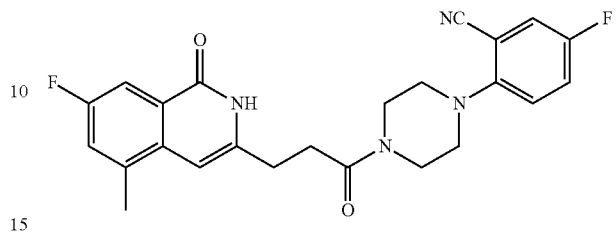

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 5-fluoro-2-(piperazin-1-yl)benzonitrile hydrochloride was used in place of 4-(piperazin-1-yl)benzonitrile 2HCl used in Step 3 of Example 68.

$^1$H NMR (300 MHz, CDCl$_3$) δ 10.71 (br, 1H), 7.88-7.85 (m, 1H), 7.31-7.19 (m, 3H), 6.98-6.93 (m, 1H), 6.37 (s, 1H), 3.89-3.88 (m, 2H), 3.67-3.66 (m, 2H), 3.09-3.08 (m, 4H), 2.99-2.97 (m, 2H), 2.83-2.81 (m, 2H), 2.51 (s, 3H).

<Example 160> Preparation of 4-fluoro-3-(1-(3-(7-fluoro-5-methyl-1-oxo-1,2-dihydroisoquinolin-3-yl)propanoyl)-1,2,3,6-tetrahydropyridin-4-yl)benzonitrile

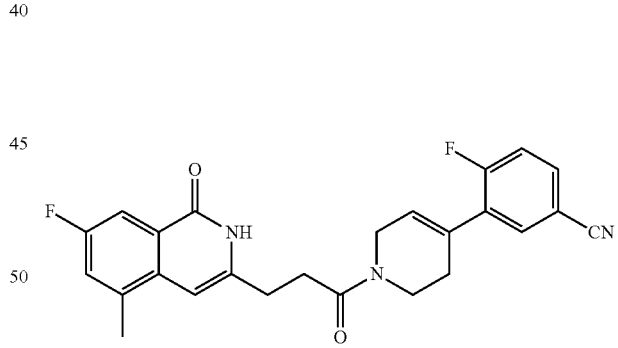

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 4-fluoro-3-(1,2,3,6-tetrahydropyridin-4-yl)benzonitrile hydrochloride was used in place of 4-(piperazin-1-yl)benzonitrile 2HCl used in Step 3 of Example 68.

$^1$H NMR (300 MHz, DMSO-$d_6$) δ 11.41 (br, 1H), 7.87-7.85 (m, 2H), 7.65-7.60 (m, 1H), 7.49-7.42 (m, 2H), 6.46-6.44 (m, 1H), 6.15-6.11 (m, 1H), 4.20-4.14 (m, 2H), 3.67-3.66 (m, 2H), 3.22-3.21 (m, 2H), 2.81-2.79 (m, 4H), 2.47 (s, 3H).

<Example 161> Preparation of 5-fluoro-2-(1-(3-(7-fluoro-5-methyl-1-oxo-1,2-dihydroisoquinolin-3-yl)propanoyl)-1,2,3,6-tetrahydropyridin-4-yl)benzonitrile

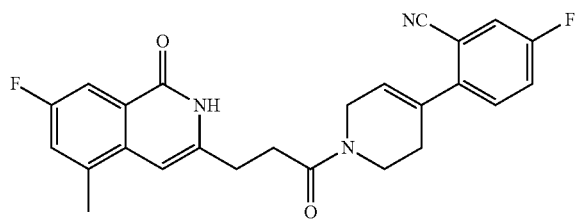 [SMILES: Cc1cc(F)cc2c(=O)[nH]c(CCC(=O)N3CC=C(c4ccc(F)cc4C#N)CC3)cc12]

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 5-fluoro-2-(1,2,3,6-tetrahydropyridin-4-yl)benzonitrile hydrochloride was used in place of 4-(piperazin-1-yl)benzonitrile 2HCl used in Step 3 of Example 68.

$^1$H NMR (300 MHz, CDCl$_3$) δ 10.54 (br, 1H), 7.88-7.85 (m, 1H), 7.38-7.18 (m, 4H), 6.37 (s, 1H), 5.98-5.94 (m, 1H), 4.35-4.34 (m, 1H), 4.15-4.14 (m, 1H), 3.94-3.91 (m, 1H), 3.91-3.67 (m, 1H), 3.01-3.00 (m, 2H), 2.85-2.82 (m, 2H), 2.51-2.50 (m, 5H).

<Example 162> Preparation of 3-(3-(4-(2,4-difluorophenyl)-3,6-dihydropyridin-1(2H)-yl)-3-oxopropyl)-7-fluoro-5-methylisoquinolin-1(2H)-one

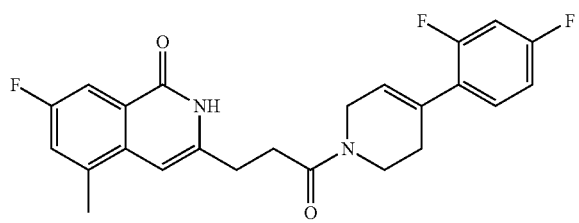 [SMILES: Cc1cc(F)cc2c(=O)[nH]c(CCC(=O)N3CC=C(c4ccc(F)cc4F)CC3)cc12]

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 4-(2,4-difluorophenyl)-1,2,3,6-tetrahydropyridine hydrochloride was used in place of 4-(piperazin-1-yl)benzonitrile 2HCl used in Step 3 of Example 68.

$^1$H NMR (300 MHz, CDCl$_3$) δ 10.77 (br, 1H), 7.88-7.85 (m, 1H), 7.20-7.18 (m, 2H), 6.83-6.80 (m, 2H), 6.37 (s, 1H), 6.93-6.85 (m, 1H), 4.31-4.30 (m, 1H), 4.11-4.10 (m, 1H), 3.87-3.86 (m, 1H), 3.65-3.64 (m, 1H), 3.01-3.00 (m, 2H), 2.83-2.82 (m, 2H), 2.51-2.50 (m, 5H).

<Example 163> Preparation of 3-fluoro-5-(1-(3-(7-fluoro-5-methyl-1-oxo-1,2-dihydroisoquinolin-3-yl)propanoyl)-1,2,3,6-tetrahydropyridin-4-yl)benzonitrile

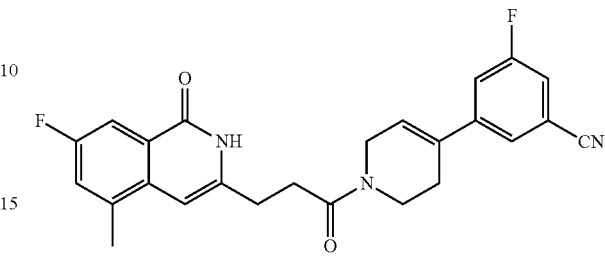

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 3-fluoro-5-(1,2,3,6-tetrahydropyridin-4-yl)benzonitrile hydrochloride was used in place of 4-(piperazin-1-yl)benzonitrile 2HCl used in Step 3 of Example 68.

$^1$H NMR (300 MHz, CDCl$_3$) δ 10.53 (br, 1H), 7.86-7.83 (m, 1H), 7.42-7.39 (m, 1H), 7.20-7.17 (m, 3H), 6.36 (s, 1H), 6.21-6.07 (m, 1H), 4.35-4.34 (m, 1H), 4.15-4.14 (m, 1H), 3.92-3.88 (m, 1H), 3.70-3.66 (m, 1H), 2.99-2.98 (m, 2H), 2.88-2.81 (m, 2H), 2.79-2.78 (m, 5H).

<Example 164> Preparation of 7-fluoro-3-(3-(4-(3-fluorophenyl)-3,6-dihydropyridin-1(2H)-yl)-3-oxopropyl)-5-methylisoquinolin-1(2H)-one

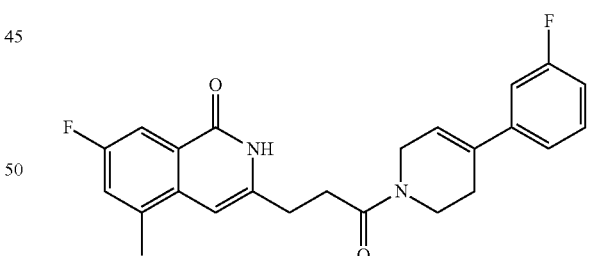

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 4-(3-fluorophenyl)-1,2,3,6-tetrahydropyridine hydrochloride was used in place of 4-(piperazin-1-yl)benzonitrile 2HCl used in Step 3 of Example 68.

$^1$H NMR (300 MHz, CDCl$_3$) δ 10.53 (br, 1H), 7.86-7.83 (m, 1H), 7.42-7.39 (m, 2H), 7.20-7.17 (m, 3H), 6.36 (s, 1H), 6.21-6.07 (m, 1H), 4.35-4.34 (m, 1H), 4.15-4.14 (m, 1H), 3.92-3.88 (m, 1H), 3.70-3.66 (m, 1H), 2.99-2.98 (m, 2H), 2.88-2.81 (m, 2H), 2.79-2.78 (m, 5H).

<Example 165> Preparation of 1'-(3-(7-fluoro-5-methyl-1-oxo-1,2-dihydroisoquinolin-3-yl)propanoyl)-1',2',3',6'-tetrahydro-[2,4'-bipyridine]-5-carbonitrile

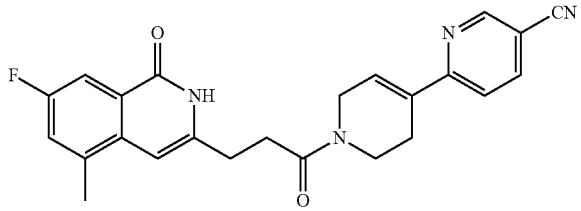 [SMILES: Cc1cc(F)cc2c(=O)[nH]c(CCC(=O)N3CC=C(c4ccc(C#N)cn4)CC3)cc12]

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 1',2',3',6'-tetrahydro-[2,4'-bipyridine]-5-carbonitrile hydrochloride was used in place of 4-(piperazin-1-yl)benzonitrile 2HCl used in Step 3 of Example 68.

$^1$H NMR (300 MHz, CDCl$_3$) δ 10.37 (br, 1H), 8.80 (s, 1H), 7.92-7.86 (m, 2H), 7.52-7.49 (m, 1H), 7.45-7.42 (m, 1H), 7.21-7.20 (m, 1H), 6.81-6.78 (m, 1H), 6.34 (s, 1H), 4.43-4.42 (m, 1H), 4.21-4.20 (m, 1H), 3.93-3.92 (m, 1H), 3.67-3.65 (m, 1H), 2.97-2.96 (m, 2H), 2.82-2.80 (m, 2H), 2.78-2.70 (m, 2H).

<Example 166> Preparation of 3-fluoro-5-(4-(3-(7-fluoro-5-methyl-1-oxo-1,2-dihydroisoquinolin-3-yl)propanoyl)piperazin-1-yl)benzonitrile

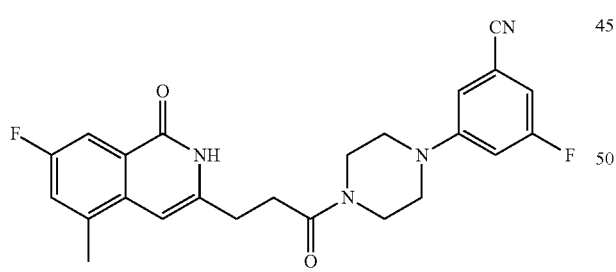

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 3-fluoro-5-(piperazin-1-yl)benzonitrile hydrochloride was used in place of 4-(piperazin-1-yl)benzonitrile 2HCl used in Step 3 of Example 68.

$^1$H NMR (300 MHz, CDCl$_3$) δ 10.32 (br, 1H), 7.88-7.85 (m, 1H), 7.26-7.19 (m, 1H), 6.88-6.74 (m, 3H), 6.35 (s, 1H), 3.86-3.79 (m, 2H), 3.76-3.63 (m, 2H), 3.28-3.26 (m, 4H), 2.98-2.96 (m, 2H), 2.79-2.76 (m, 2H), 2.50 (s, 3H).

<Example 167> Preparation of 7-fluoro-3-(3-(4-(3-fluorophenyl)piperazin-1-yl)-3-oxopropyl)-5-methylisoquinolin-1(2H)-one

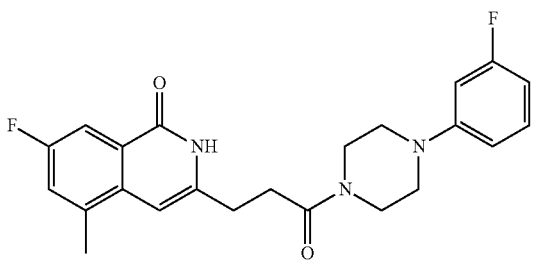 [SMILES: Cc1cc(F)cc2c(=O)[nH]c(CCC(=O)N3CCN(c4cccc(F)c4)CC3)cc12]

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 1-(3-fluorophenyl)piperazine hydrochloride was used in place of 4-(piperazin-1-yl)benzonitrile 2HCl used in Step 3 of Example 68.

$^1$H NMR (300 MHz, CDCl$_3$) δ 10.54 (br, 1H), 7.88-7.85 (m, 1H), 7.21-7.19 (m, 2H), 6.67-6.55 (m, 3H), 6.36 (s, 1H), 3.84-3.83 (m, 2H), 3.61-3.60 (m, 2H), 3.18-3.17 (m, 4H), 2.98-2.96 (m, 2H), 2.82-2.80 (m, 2H).

<Example 168> Preparation of 7-fluoro-3-(3-(2'-fluoro-3,6-dihydro-[4,4'-bipyridine]-1(2H)-yl)-3-oxopropyl)-5-methylisoquinolin-1(2H)-one

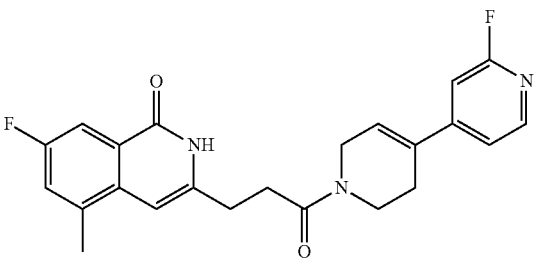

The target compound was obtained according to Example 68, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 68, and 2'-fluoro-1,2,3,6-tetrahydro-4,4'-bipyridine hydrochloride was used in place of 4-(piperazin-1-yl)benzonitrile 2HCl used in Step 3 of Example 68.

$^1$H NMR (300 MHz, CDCl$_3$) δ 10.64 (br, 1H), 8.17-8.16 (m, 1H), 7.86-7.83 (m, 1H), 7.17-7.12 (m, 2H), 6.84-6.80 (m, 1H), 6.37 (s, 1H), 6.37-6.23 (m, 1H), 4.36-4.35 (m, 1H), 4.17-4.16 (m, 1H), 3.92-3.89 (m, 1H), 3.71-3.67 (m, 1H), 3.00-2.99 (m, 2H), 2.87-2.78 (m, 2H), 2.53-2.50 (m, 5H).

<Example 169> Preparation of 5-(4-(3-(7-fluoro-5-methyl-1-oxo-1,2-dihydroisoquinolin-3-yl)propanoyl)piperazin-1-yl)picolinonitrile dihydrochloride

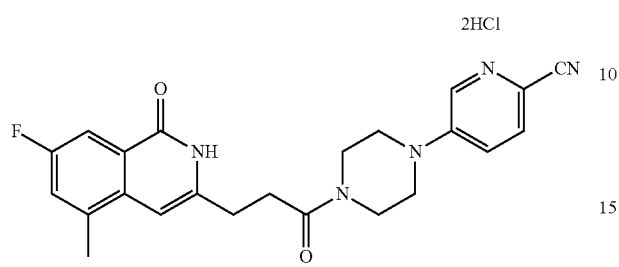

The target compound was obtained according to Example 6, except that 5-(4-(3-(7-fluoro-5-methyl-1-oxo-1,2-dihydroisoquinolin-3-yl)propanoyl)piperazin-1-yl)picolinonitrile was used in place of 4-(4-(3-(8-fluoro-1-oxo-1,2-dihydroisoquinolin-3-yl)propyl)piperazin-1-yl)benzonitrile in Example 6.

$^1$H NMR (300 MHz, DMSO-$d_6$) δ 11.41 (br, 1H), 8.49 (d, 1H, J=2.4 Hz), 7.75 (d, 1H, J=8.7 Hz), 7.63 (dd, 1H, J=9.3 Hz, 2.4 Hz), 7.44 (dd, 1H, J=9.3 Hz, 2.4 Hz), 7.36 (dd, 1H, J=8.7 Hz, 3.0 Hz), 6.45 (s, 1H), 3.64 (m, 4H), 3.46-3.41 (m, 4H), 2.79 (m, 4H), 2.48 (s, 3H).

<Example 170> Preparation of 3-(3-(4-(cyclohexanecarbonyl)piperazin-1-yl)-3-oxopropyl)-8-fluoroisoquinolin-1(2H)-one

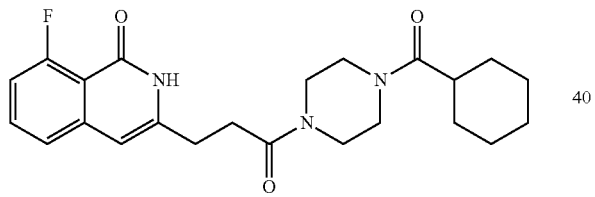

Step 1: Preparation of tert-butyl 4-(cyclohexanecarbonyl)piperazine-1-carboxylate

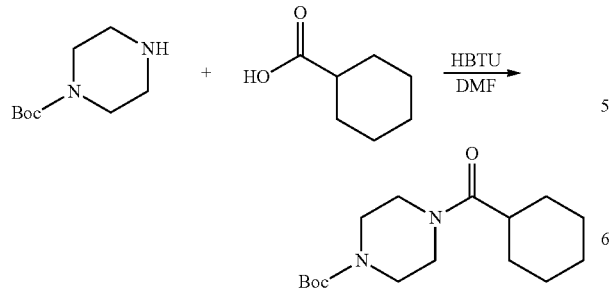

After dissolving 1-Boc-piperazine (3.5 g, 22.3 mmol) and cyclohexanecarboxylic acid (2.0 g, 15.6 mmol) in DMF (52 mL), HBTU (8.9 g, 22.3 mmol) and TEA (10.9 mL, 78.0 mmol) were slowly added dropwise and stirred at room temperature for 15 hours. The reaction solution was diluted with EtOAc and washed with water. The organic solvent was dried over MgSO$_4$, filtered, and then concentrated by evaporation under reduced pressure, and the resulting residue was purified using silica gel chromatography to obtain the target compound, tert-butyl 4-(cyclohexanecarbonyl)piperazine-1-carboxylate (3.45 g, 75%).

$^1$H NMR (300 MHz, CDCl$_3$) δ 3.57-3.31 (m, 8H), 2.44-2.41 (m, 1H), 1.79-1.08 (m, 19H).

Step 2: Preparation of cyclohexyl(piperazin-1-yl)methanone

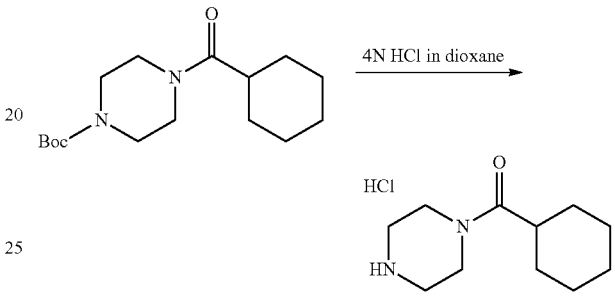

4 N HCl (30 mL) was added to tert-butyl 4-(cyclohexanecarbonyl)piperazine-1-carboxylate (3.45 g, 11.64 mmol), and the mixture was stirred for 15 hours. The solid produced during the reaction was filtered and washed with EtOAc to obtain the target compound, cyclohexyl(piperazin-1-yl)methanone HCl (2.52 g, 93%).

$^1$H NMR (300 MHz, DMSO-$d_6$) δ 9.20 (br, 1H), 3.64 (m, 4H), 3.04 (m, 4H), 2.56 (m, 1H), 1.62 (m, 5H), 1.28 (m, 5H).

Step 3: Preparation of 3-(3-(4-(cyclohexanecarbonyl)piperazin-1-yl)-3-oxopropyl)-8-fluoroisoquinolin-1(2H)-one

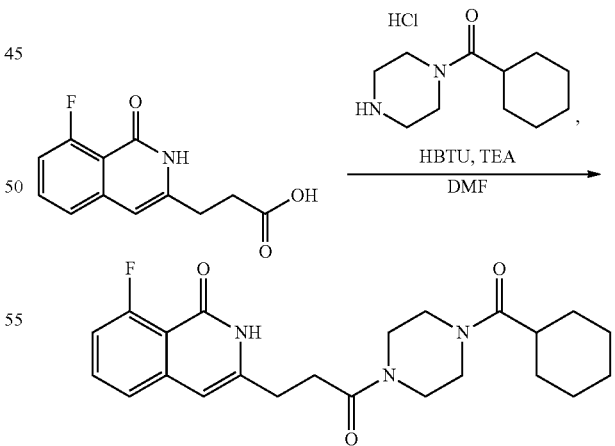

After dissolving 3-(8-fluoro-1-oxo-1,2-dihydroisoquinolin-3-yl)propanoic acid (60 mg, 0.25 mmol) and cyclohexyl (piperazin-1-yl)methanone HCl (89 mg, 0.37 mmol) in CH$_2$Cl$_2$ (2.5 mL), HBTU (231 mg, 0.61 mmol) and TEA (0.18 mL, 1.27 mmol) were slowly added dropwise and stirred at room temperature for 15 hours. The reaction solution was diluted with EtOAc and washed with water. The organic solvent was dried over MgSO₄, filtered, and then concentrated by evaporation under reduced pressure, and the resulting residue was purified using silica gel chromatography to obtain the target compound, 3-(3-(4-(cyclohexanecarbonyl)piperazin-1-yl)-3-oxopropyl)-8-fluoroisoquinolin-1(2H)-one (56 mg, 53%).

¹H NMR (300 MHz, CDCl₃) δ 10.54 (br, 1H), 7.54-7.52 (m, 1H), 7.22 (d, 1H, J=7.8 Hz), 7.06-6.99 (m, 1H), 6.28 (s, 1H), 3.69-3.62 (m, 4H), 3.52-3.45 (m, 4H), 2.94 (m, 2H), 2.82 (m, 2H), 2.47-2.43 (m, 1H), 1.80-1.69 (m, 4H), 1.54-1.50 (m, 2H), 1.28-1.19 (m, 4H).

<Example 171> Preparation of 3-(3-(4-(cyclohexanecarbonyl)piperazin-1-yl)-3-oxopropyl)-8-fluoro-5-methylisoquinolin-1(2H)-one

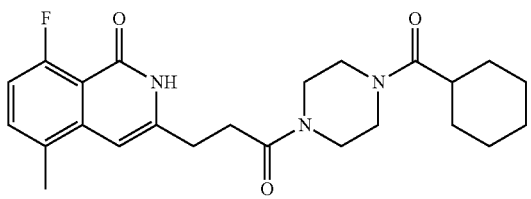 [SMILES: Cc1ccc(F)c2c(=O)[nH]c(CCC(=O)N3CCN(C(=O)C4CCCCC4)CC3)cc12]

The target compound was obtained according to Example 170, except that 3-(8-fluoro-5-methyl-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

¹H NMR (300 MHz, CDCl₃) δ 10.48 (br, 1H), 7.37 (m, 1H), 6.96-6.90 (m, 1H), 6.32 (s, 1H), 3.70-3.62 (m, 4H), 3.51-3.47 (m, 4H), 2.97 (m, 2H), 2.82 (m, 2H), 2.43 (m, 4H), 1.80 (m, 2H), 1.69 (m, 2H), 1.60 (m, 2H), 1.24-1.19 (m, 4H).

<Example 172> Preparation of 3-(3-(4-(cyclohexanecarbonyl)piperazin-1-yl)-3-oxopropyl)-7-fluoroisoquinolin-1(2H)-one

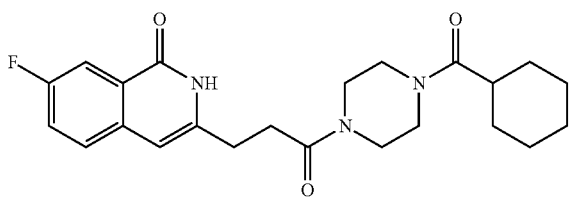

The target compound was obtained according to Example 170, except that 3-(7-fluoro-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

¹H NMR (300 MHz, CDCl₃) δ 10.30 (br, 1H), 8.00-7.97 (m, 1H), 7.47-7.42 (m, 1H), 7.36-7.34 (m, 1H), 6.27 (s, 1H), 3.70-3.63 (m, 4H), 3.52-3.42 (m, 4H), 2.93-2.91 (m, 2H), 2.77-2.75 (m, 2H), 2.50-2.41 (m, 1H), 1.81-1.80 (m, 2H), 1.69-1.68 (m, 2H), 1.58-1.54 (m, 2H), 1.27-1.25 (m, 4H).

<Example 173> Preparation of 3-(3-(4-(cyclohexanecarbonyl)piperazin-1-yl)-3-oxopropyl)-7-fluoro-5-methylisoquinolin-1(2H)-one

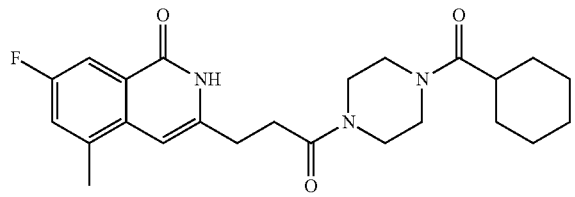 [SMILES: Cc1cc(F)cc2c(=O)[nH]c(CCC(=O)N3CCN(C(=O)C4CCCCC4)CC3)cc12]

The target compound was obtained according to Example 170, except that 3-(7-fluoro-5-methyl-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

¹H NMR (300 MHz, CDCl₃) δ 10.45 (br, 1H), 7.87-7.84 (m, 1H), 7.22-7.19 (m, 1H), 6.35 (s, 1H), 3.70-3.61 (m, 4H), 3.50-3.42 (m, 4H), 2.96-2.95 (m, 2H), 2.77-2.76 (m, 2H), 2.51-2.50 (m, 4H), 1.81-1.80 (m, 2H), 1.68-1.67 (m, 2H), 1.26-1.25 (m, 2H).

<Example 174> Preparation of 3-(3-(4-(cyclopentanecarbonyl)piperazin-1-yl)-3-oxopropyl)-8-fluoroisoquinolin-1(2H)-one

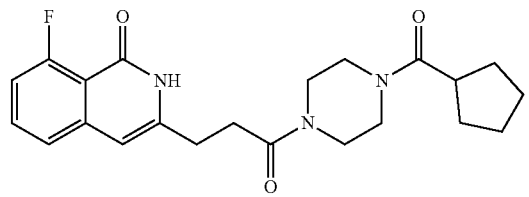

The target compound was obtained according to Example 170, except that cyclopentanecarboxylic acid was used in place of cyclohexanecarboxylic acid used in Step 1 of Example 170.

¹H NMR (300 MHz, CDCl₃) δ 10.42 (br, 1H), 7.53-7.52 (m, 1H), 7.22 (d, 1H, J=8.4 Hz), 7.06-6.99 (m, 1H), 6.26 (s, 1H), 3.69-3.64 (m, 4H), 3.52-3.45 (m, 4H), 2.92-2.80 (m, 5H), 1.81 (m, 6H), 1.23-1.19 (m, 2H).

<Example 175> Preparation of 3-(3-(4-(cyclopentanecarbonyl)piperazin-1-yl)-3-oxopropyl)-8-fluoro-5-methylisoquinolin-1(2H)-one

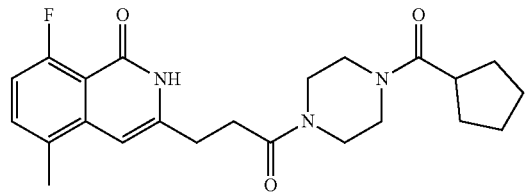

The target compound was obtained according to Example 170, except that cyclopentanecarboxylic acid was used in place of cyclohexanecarboxylic acid used in Step 1 of Example 170, and 3-(8-fluoro-5-methyl-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

$^1$H NMR (300 MHz, CDCl$_3$) δ 10.53 (br, 1H), 7.36-7.34 (m, 1H), 6.96-6.70 (m, 1H), 6.32 (s, 1H), 3.68-3.64 (m, 4H), 3.52-3.47 (m, 4H), 2.97-2.82 (m, 5H), 2.43 (s, 3H), 1.81-1.71 (m, 6H), 1.25-1.19 (m, 2H).

<Example 176> Preparation of 3-(3-(4-(cyclopentanecarbonyl)piperazin-1-yl)-3-oxopropyl)-7-fluoroisoquinolin-1(2H)-one

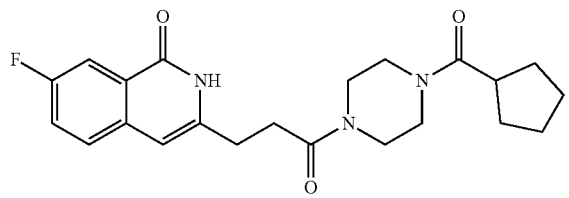 [SMILES: O=C(CCc1cc2ccc(F)cc2c(=O)[nH]1)N1CCN(C(=O)C2CCCC2)CC1]

The target compound was obtained according to Example 170, except that cyclopentanecarboxylic acid was used in place of cyclohexanecarboxylic acid used in Step 1 of Example 170, and 3-(7-fluoro-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

$^1$H NMR (300 MHz, CDCl$_3$) δ 10.44 (br, 1H), 8.00-7.97 (m, 1H), 7.45-7.43 (m, 1H), 7.37-7.34 (m, 1H), 6.28 (s, 1H), 3.69-3.64 (m, 4H), 3.54-3.43 (m, 4H), 2.94-2.89 (m, 3H), 2.79-2.77 (m, 2H), 1.81-1.65 (m, 8H).

<Example 177> Preparation of 3-(3-(4-(cyclopentanecarbonyl)piperazin-1-yl)-3-oxopropyl)-7-fluoro-5-methylisoquinolin-1(2H)-one

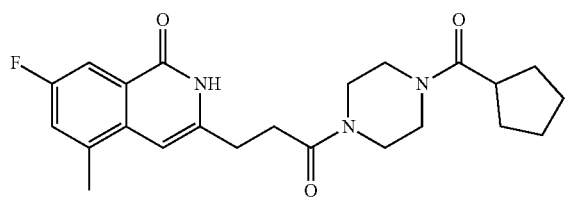 [SMILES: Cc1cc(F)cc2c(=O)[nH]c(CCC(=O)N3CCN(C(=O)C4CCCC4)CC3)cc12]

The target compound was obtained according to Example 170, except that cyclopentanecarboxylic acid was used in place of cyclohexanecarboxylic acid used in Step 1 of Example 170, and 3-(7-fluoro-5-methyl-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

$^1$H NMR (300 MHz, CDCl$_3$) δ 10.35 (br, 1H), 7.88-7.85 (m, 1H), 7.26-7.22 (m, 1H), 6.34 (s, 1H), 3.71-3.65 (m, 4H), 3.54-3.44 (m, 4H), 2.97-2.95 (m, 3H), 2.78-2.77 (m, 2H), 2.51 (s, 3H), 1.82-1.80 (m, 8H).

<Example 178> Preparation of 3-(3-(4-(cyclobutanecarbonyl)piperazin-1-yl)-3-oxopropyl)-8-fluoroisoquinolin-1(2H)-one

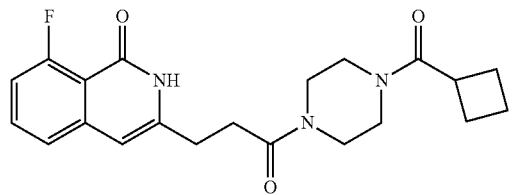 [SMILES: O=C(CCc1cc2cccc(F)c2c(=O)[nH]1)N1CCN(C(=O)C2CCC2)CC1]

The target compound was obtained according to Example 170, except that cyclobutanecarboxylic acid was used in place of cyclohexanecarboxylic acid used in Step 1 of Example 170.

$^1$H NMR (300 MHz, CDCl$_3$) δ 10.30 (br, 1H), 7.53-7.51 (m, 1H), 7.22-7.19 (m, 1H), 7.06-6.99 (m, 1H), 6.25 (s, 1H), 3.63 (m, 4H), 3.49-3.36 (m, 4H), 3.30-3.24 (m, 1H), 2.92 (m, 2H), 2.79-2.78 (m, 2H), 2.40-2.31 (m, 2H), 2.15 (m, 2H), 2.03-1.89 (m, 2H).

<Example 179> Preparation of 3-(3-(4-(cyclobutanecarbonyl)piperazin-1-yl)-3-oxopropyl)-8-fluoro-5-methylisoquinolin-1(2H)-one

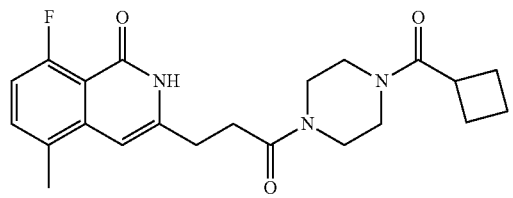 [SMILES: Cc1ccc(F)c2c(=O)[nH]c(CCC(=O)N3CCN(C(=O)C4CCC4)CC3)cc12]

The target compound was obtained according to Example 170, except that cyclobutanecarboxylic acid was used in place of cyclohexanecarboxylic acid used in Step 1 of Example 170, and 3-(8-fluoro-5-methyl-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

$^1$H NMR (300 MHz, CDCl$_3$) δ 10.51 (br, 1H), 7.37 (m, 1H), 6.96-6.90 (m, 1H), 6.32 (s, 1H), 3.63 (m, 4H), 3.49-3.45 (m, 2H), 3.36 (m, 2H), 3.30-3.22 (m, 1H), 2.97 (m, 2H), 2.81 (m, 2H), 2.43 (s, 3H), 2.37-2.28 (m, 2H), 2.18-2.15 (m, 2H), 2.03-1.89 (m, 2H).

<Example 180> Preparation of 3-(3-(4-(cyclobutanecarbonyl)piperazin-1-yl)-3-oxopropyl)-7-fluoroisoquinolin-1(2H)-one

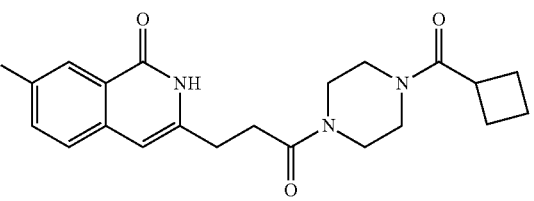

The target compound was obtained according to Example 170, except that cyclobutanecarboxylic acid was used in place of cyclohexanecarboxylic acid used in Step 1 of Example 170, and 3-(7-fluoro-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

$^1$H NMR (300 MHz, CDCl$_3$) δ 10.51 (br, 1H), 7.99-7.96 (m, 1H), 7.47-7.42 (m, 1H), 7.37-7.31 (m, 1H), 6.27 (s, 1H), 3.65-3.61 (m, 4H), 3.42-3.29 (m, 4H), 3.26-3.24 (m, 1H), 2.94-2.92 (m, 2H), 2.78-2.74 (m, 2H), 2.36-2.30 (m, 2H), 2.17-2.15 (m, 2H), 1.96-1.88 (m, 2H).

<Example 181> Preparation of 3-(3-(4-(cyclobutanecarbonyl)piperazin-1-yl)-3-oxopropyl)-7-fluoro-5-methylisoquinolin-1(2H)-one

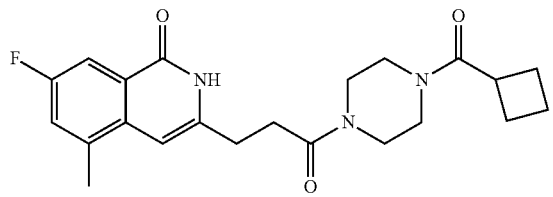 [SMILES: Cc1cc(F)cc2c(=O)[nH]c(CCC(=O)N3CCN(C(=O)C4CCC4)CC3)cc12]

The target compound was obtained according to Example 170, except that cyclobutanecarboxylic acid was used in place of cyclohexanecarboxylic acid used in Step 1 of Example 170, and 3-(7-fluoro-5-methyl-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

$^1$H NMR (300 MHz, CDCl$_3$) δ 10.41 (br, 1H), 7.87-7.84 (m, 1H), 7.22-7.19 (m, 1H), 6.35 (s, 1H), 3.66-3.61 (m, 4H), 3.42-3.37 (m, 4H), 3.30-3.27 (m, 1H), 2.96-2.95 (m, 2H), 2.76-2.75 (m, 2H), 2.51 (s, 3H), 2.37-2.31 (m, 2H), 2.16-2.15 (m, 2H), 2.03-1.88 (m, 2H).

<Example 182> Preparation of 3-(3-(4-(cyclopropanecarbonyl)piperazin-1-yl)-3-oxopropyl)-8-fluoroisoquinolin-1(2H)-one

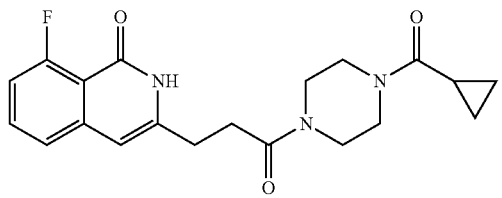 [SMILES: O=C(CCc1cc2cccc(F)c2c(=O)[nH]1)N1CCN(C(=O)C2CC2)CC1]

The target compound was obtained according to Example 170, except that cyclopropyl(piperazin-1-yl)methanone HCl was used in place of cyclohexyl(piperazin-1-yl)methanone HCl used in Step 3 of Example 170.

$^1$H NMR (300 MHz, DMSO-d$_6$) δ 11.22 (br, 1H), 7.62-7.58 (m, 1H), 7.34 (d, 1H, J=7.8 Hz), 7.16-7.07 (m, 1H), 6.39 (s, 1H), 3.65 (m, 2H), 3.48-3.44 (m, 6H), 2.73 (m, 4H), 1.98 (m, 1H), 0.73-0.71 (m, 4H).

<Example 183> Preparation of 3-(3-(4-(cyclopropanecarbonyl)piperazin-1-yl)-3-oxopropyl)-8-fluoro-5-methylisoquinolin-1(2H)-one

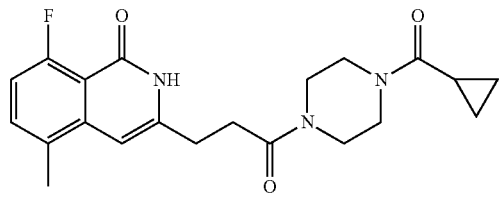 [SMILES: Cc1ccc(F)c2c(=O)[nH]c(CCC(=O)N3CCN(C(=O)C4CC4)CC3)cc12]

The target compound was obtained according to Example 170, except that cyclopropyl(piperazin-1-yl)methanone HCl was used in place of cyclohexyl(piperazin-1-yl)methanone HCl, and 3-(7-fluoro-5-methyl-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

$^1$H NMR (300 MHz, DMSO-d$_6$) δ 11.26 (br, 1H), 7.46 (m, 1H), 7.02-6.97 (m, 1H), 6.37 (s, 1H), 3.65 (m, 2H), 3.48 (m, 6H), 2.76 (m, 4H), 2.38 (s, 3H), 1.98 (m, 1H), 0.73 (m, 4H).

<Example 184> Preparation of 3-(3-(4-(cyclopropanecarbonyl)piperazin-1-yl)-3-oxopropyl)-7-fluoroisoquinolin-1(2H)-one

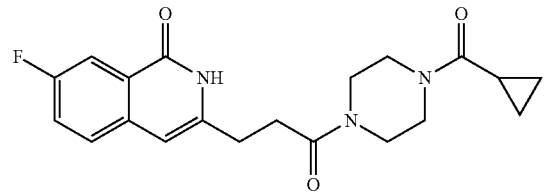 [SMILES: O=C(CCc1cc2ccc(F)cc2c(=O)[nH]1)N1CCN(C(=O)C2CC2)CC1]

The target compound was obtained according to Example 170, except that cyclopropyl(piperazin-1-yl)methanone HCl was used in place of cyclohexyl(piperazin-1-yl)methanone HCl, and 3-(7-fluoro-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

$^1$H NMR (300 MHz, CDCl$_3$) δ 10.50 (br, 1H), 8.00-7.97 (m, 1H), 7.43-7.41 (m, 1H), 7.32-7.27 (m, 2H), 7.12-7.10 (m, 1H), 7.04-6.93 (m, 2H), 6.27 (s, 1H), 6.12-5.98 (m, 1H), 4.31-4.30 (m, 1H), 4.11-4.10 (m, 1H), 3.91-3.87 (m, 1H), 3.67-3.64 (m, 1H), 2.96-2.94 (m, 2H), 2.84-2.75 (m, 2H), 2.55-2.54 (m, 2H).

<Example 185> Preparation of 3-(3-(4-(cyclopropanecarbonyl)piperazin-1-yl)-3-oxopropyl)-7-fluoro-5-methylisoquinolin-1(2H)-one

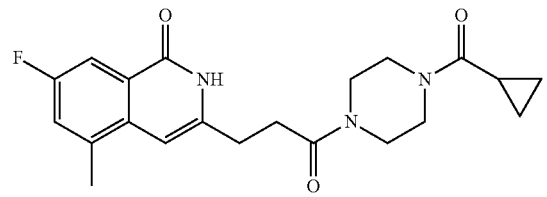 [SMILES: Cc1cc(F)cc2c(=O)[nH]c(CCC(=O)N3CCN(C(=O)C4CC4)CC3)cc12]

The target compound was obtained according to Example 170, except that cyclopropyl(piperazin-1-yl)methanone HCl was used in place of cyclohexyl(piperazin-1-yl)methanone HCl, and 3-(7-fluoro-5-methyl-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

$^1$H NMR (300 MHz, CDCl$_3$) δ 10.55 (br, 1H), 7.87-7.84 (m, 1H), 7.22-7.19 (m, 1H), 6.36 (s, 1H), 3.71-3.46 (m, 8H), 2.98-2.96 (m, 2H), 2.81-2.79 (m, 2H), 2.51 (s, 3H), 1.78-1.72 (m, 1H), 1.02-1.01 (m, 2H), 0.83-0.82 (m, 2H).

<Example 186> Preparation of 8-fluoro-3-(3-(4-isobutyrylpiperazin-1-yl)-3-oxopropyl)isoquinolin-1(2H)-one

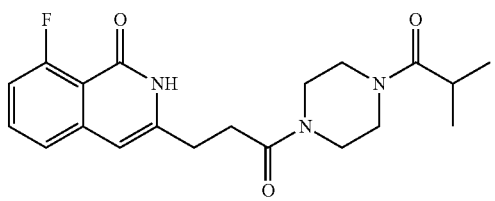 [SMILES: CC(C)C(=O)N1CCN(C(=O)CCc2cc3cccc(F)c3c(=O)[nH]2)CC1]

The target compound was obtained according to Example 170, except that isobutyric acid was used in place of cyclohexanecarboxylic acid used in Step 1 of Example 170.

$^1$H NMR (300 MHz, DMSO-d$_6$) δ 11.23 (br, 1H), 7.63-7.61 (m, 1H), 7.34 (d, 1H, J=6.0 Hz), 7.14-7.08 (m, 1H), 6.40 (s, 1H), 3.48-3.34 (m, 8H), 2.88 (m, 1H), 2.73 (m, 4H), 1.00-0.98 (m, 6H).

<Example 187> Preparation of 8-fluoro-3-(3-(4-isobutyrylpiperazin-1-yl)-3-oxopropyl)-5-methylisoquinolin-1(2H)-one

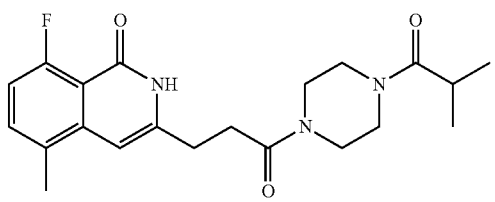 [SMILES: Cc1ccc(F)c2c(=O)[nH]c(CCC(=O)N3CCN(C(=O)C(C)C)CC3)cc12]

The target compound was obtained according to Example 170, except that isobutyric acid was used in place of cyclohexanecarboxylic acid used in Step 1 of Example 170, and 3-(8-fluoro-5-methyl-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

$^1$H NMR (300 MHz, CDCl$_3$) δ 10.57 (br, 1H), 7.39-7.35 (m, 1H), 6.96-6.90 (m, 1H), 6.33 (s, 1H), 3.70-3.64 (m, 4H), 3.53-3.47 (m, 4H), 2.98-2.96 (m, 2H), 2.83 (m, 3H), 2.43 (m, 3H), 1.15-1.13 (m, 6H).

<Example 188> Preparation of 7-fluoro-3-(3-(4-isobutyrylpiperazin-1-yl)-3-oxopropyl)isoquinolin-1(2H)-one

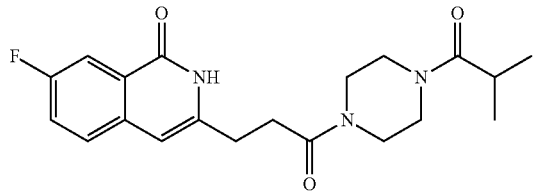 [SMILES: CC(C)C(=O)N1CCN(C(=O)CCc2cc3ccc(F)cc3c(=O)[nH]2)CC1]

The target compound was obtained according to Example 170, except that isobutyric acid was used in place of cyclohexanecarboxylic acid used in Step 1 of Example 170, and 3-(7-fluoro-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

$^1$H NMR (300 MHz, CDCl$_3$) δ 10.49 (br, 1H), 7.99-7.96 (m, 1H), 7.47-7.45 (m, 1H), 7.43-7.36 (m, 1H), 6.28 (s, 1H), 3.70-3.63 (m, 4H), 3.51-3.44 (m, 4H), 2.94-2.93 (m, 2H), 2.78-2.77 (m, 3H), 1.14-1.12 (m, 6H).

<Example 189> Preparation of 7-fluoro-3-(3-(4-isobutyrylpiperazin-1-yl)-3-oxopropyl)-5-methylisoquinolin-1(2H)-one

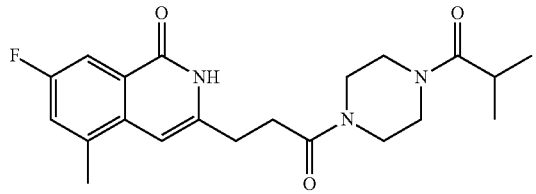 [SMILES: Cc1cc(F)cc2c(=O)[nH]c(CCC(=O)N3CCN(C(=O)C(C)C)CC3)cc12]

The target compound was obtained according to Example 170, except that isobutyric acid was used in place of cyclohexanecarboxylic acid used in Step 1 of Example 170, and 3-(7-fluoro-5-methyl-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

$^1$H NMR (300 MHz, CDCl$_3$) δ 10.49 (br, 1H), 7.87-7.83 (m, 1H), 7.21-7.18 (m, 1H), 6.25 (s, 1H), 3.70-3.63 (m, 4H), 3.51-3.43 (m, 4H), 2.97-2.95 (m, 2H), 2.77-2.76 (m, 3H), 1.59 (s, 3H), 1.14-1.12 (m, 6H).

<Example 190> Preparation of 8-fluoro-3-(3-oxo-3-(4-(tetrahydrofuran-2-carbonyl)piperazin-1-yl)propyl)isoquinolin-1(2H)-one

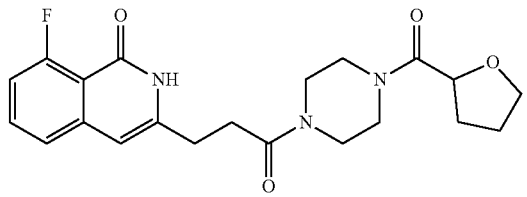

The target compound was obtained according to Example 170, except that tetrahydrofuran-2-carboxylic acid was used in place of cyclohexanecarboxylic acid used in Step 1 of Example 170.

$^1$H NMR (300 MHz, CDCl$_3$) δ 10.57 (br, 1H), 7.57-7.50 (m, 1H), 7.25-7.22 (m, 1H), 7.06-6.99 (m, 1H), 6.34-6.31 (m, 1H), 4.63-4.55 (m, 1H), 3.94-3.73 (m, 6H), 3.25-3.21 (m, 4H), 2.94-2.92 (m, 2H), 2.85-2.82 (m, 2H), 2.04-1.95 (m, 4H).

<Example 191> Preparation of 8-fluoro-5-methyl-3-(3-oxo-3-(4-(tetrahydrofuran-2-carbonyl)piperazin-1-yl)propyl)isoquinolin-1(2H)-one

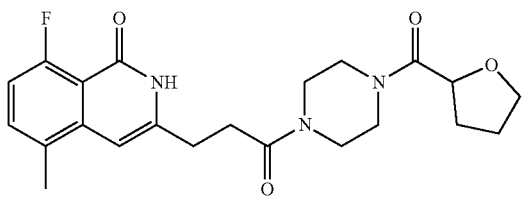 [SMILES: Cc1ccc(F)c2c(=O)[nH]c(CCC(=O)N3CCN(C(=O)C4CCCO4)CC3)cc12]

The target compound was obtained according to Example 170, except that tetrahydrofuran-2-carboxylic acid was used in place of cyclohexanecarboxylic acid used in Step 1 of Example 170, and 3-(8-fluoro-5-methyl-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

$^1$H NMR (300 MHz, CDCl$_3$) δ 10.72 (br, 1H), 7.39-7.35 (m, 1H), 6.97-6.90 (m, 1H), 6.35 (s, 1H), 4.62-4.58 (m, 1H), 3.94-3.78 (m, 6H), 3.59-3.47 (m, 4H), 2.98-2.96 (m, 2H), 2.86-2.84 (m, 2H), 2.43 (s, 3H), 2.00-1.94 (m, 4H).

<Example 192> Preparation of 7-fluoro-3-(3-oxo-3-(4-(tetrahydrofuran-2-carbonyl)piperazin-1-yl)propyl)isoquinolin-1(2H)-one

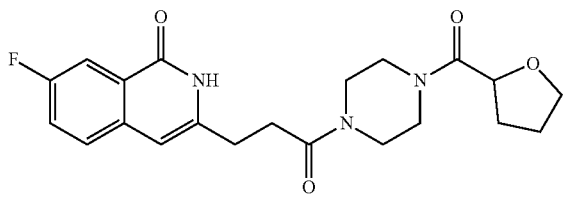 [SMILES: O=C(CCc1cc2ccc(F)cc2c(=O)[nH]1)N1CCN(C(=O)C2CCCO2)CC1]

The target compound was obtained according to Example 170, except that tetrahydrofuran-2-carboxylic acid was used in place of cyclohexanecarboxylic acid used in Step 1 of Example 170, and 3-(7-fluoro-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

$^1$H NMR (300 MHz, CDCl$_3$) δ 10.45 (s, 1H), 8.00-7.97 (m, 1H), 7.47-7.45 (m, 1H), 7.44-7.31 (m, 1H), 6.30 (s, 1H), 4.61-4.55 (m, 1H), 3.93-3.79 (m, 4H), 3.58-3.46 (m, 4H), 2.94-2.93 (m, 2H), 2.78-2.76 (m, 2H), 2.31-2.96 (m, 2H), 2.04-1.94 (m, 4H).

<Example 193> Preparation of 7-fluoro-5-methyl-3-(3-oxo-3-(4-(tetrahydrofuran-2-carbonyl)piperazin-1-yl)propyl)isoquinolin-1(2H)-one

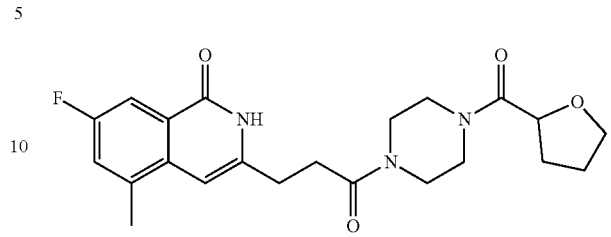

The target compound was obtained according to Example 170, except that tetrahydrofuran-2-carboxylic acid was used in place of cyclohexanecarboxylic acid used in Step 1 of Example 170, and 3-(7-fluoro-5-methyl-1-oxo-1,2-dihydroisoquinolin-3-yl)propanoic acid was used in place of 3-(8-fluoro-1-oxo-1,2-dihydroisoquinolin-3-yl)propanoic acid used in Step 3 of Example 170.

$^1$H NMR (300 MHz, CDCl$_3$) δ 10.45 (s, 1H), 8.00-7.97 (m, 1H), 7.46-7.41 (m, 1H), 6.30 (s, 1H), 4.61-4.55 (m, 1H), 3.93-3.79 (m, 4H), 3.58-3.46 (m, 4H), 2.94-2.93 (m, 2H), 2.78-2.76 (m, 2H), 2.31-2.36 (m, 5H), 2.04-1.94 (m, 4H).

<Example 194> Preparation of 3-(3-(4-(L-alanyl)piperazin-1-yl)-3-oxopropyl)-8-fluoro-5-methylisoquinolin-1(2H)-one hydrochloride

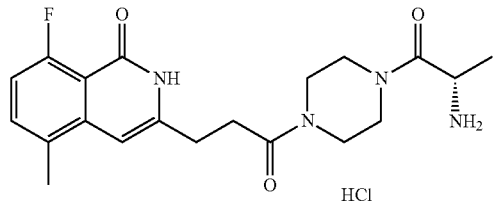 [SMILES: Cc1ccc(F)c2c(=O)[nH]c(CCC(=O)N3CCN(C(=O)[C@H](C)N)CC3)cc12 ; Cl]

Step 1: Preparation of tert-butyl 4-(3-(8-fluoro-5-methyl-1-oxo-1,2-dihydroisoquinolin-3-yl)propanoyl)piperazine-1-carboxylate

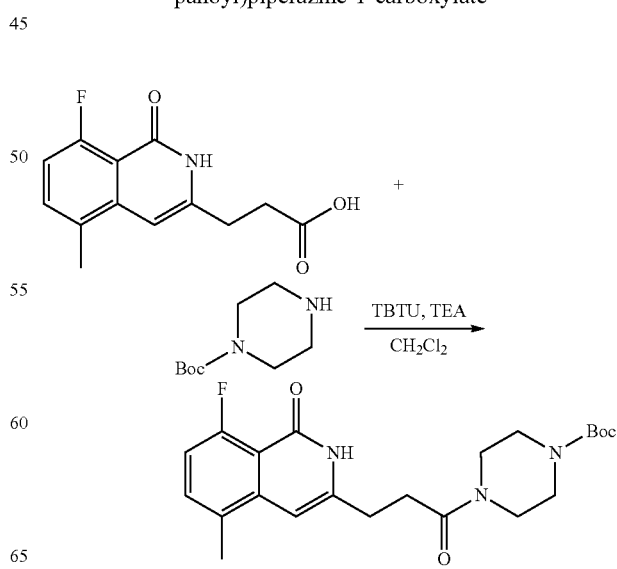

After dissolving 3-(8-fluoro-5-methyl-1-oxo-1,2-dihydroisoquinolin-3-yl)propanoic acid (300 mg, 1.20 mmol), Boc-piperazine (336 mg, 1.80 mmol), and TBTU (928 mg, 2.88 mmol) in CH$_2$Cl$_2$ (12.0 mL) at room temperature, TEA (0.84 mL, 6.0 mmol) was slowly added dropwise to the reaction solution, followed by stirring at room temperature for 19 hours. The reaction solution was diluted with EtOAc and washed with water, and the organic solvent was dried over anhydrous MgSO$_4$, filtered, and then concentrated by evaporation under reduced pressure. The resulting residue was separated and purified using silica gel chromatography to obtain the target compound (440 mg, 88%).

$^1$H NMR (300 MHz, CDCl$_3$) δ 10.44 (br, 1H), 7.38-7.33 (m, 1H), 6.96-6.89 (m, 1H), 6.31 (s, 1H), 3.65-3.57 (m, 4H), 3.50-3.44 (m, 8H), 2.43 (s, 3H), 1.47 (s, 9H).

Step 2: Preparation of 8-fluoro-5-methyl-3-(3-oxo-3-(piperazin-1-yl)propyl)isoquinolin-1(2H)-one

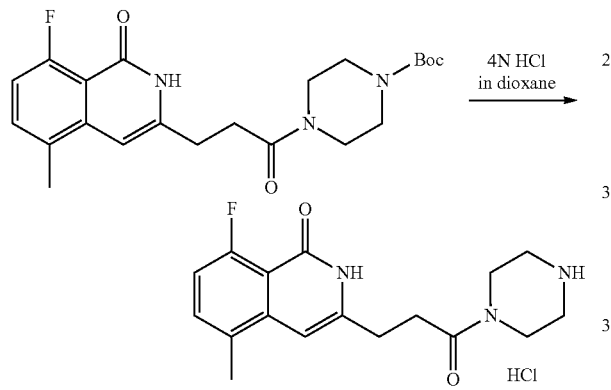

After dissolving tert-butyl 4-(3-(8-fluoro-5-methyl-1-oxo-1,2-dihydroisoquinolin-3-yl)propanoyl)piperazine-1-carboxylate (44 mg, 1.05 mmol) dissolved in 4 N HCl/dioxane (3 mL), the mixture was stirred at room temperature for 16 hours. The solid produced during the reaction was filtered to obtain the target compound, 8-fluoro-5-methyl-3-(3-oxo-3-(piperazin-1-yl)propyl)isoquinolin-1(2H)-one (304 mg, 82%).

$^1$H NMR (300 MHz, DMSO-d$_6$) δ 11.26 (br, 1H), 7.47 (s, 1H), 7.03-6.97 (m, 1H), 6.37 (s, 1H), 3.71 (m, 8H), 3.10-3.02 (m, 4H), 2.76 (s, 3H).

Step 3: Preparation of tert-butyl (S)-(1-(4-(3-(8-fluoro-5-methyl-1-oxo-1,2-dihydroisoquinolin-3-yl)propanoyl)piperazin-1-yl)-1-oxopropan-2-yl)carbamate

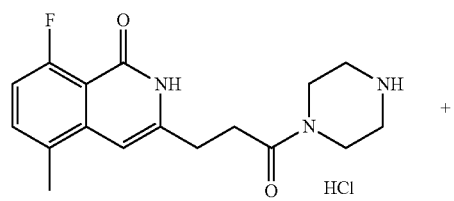

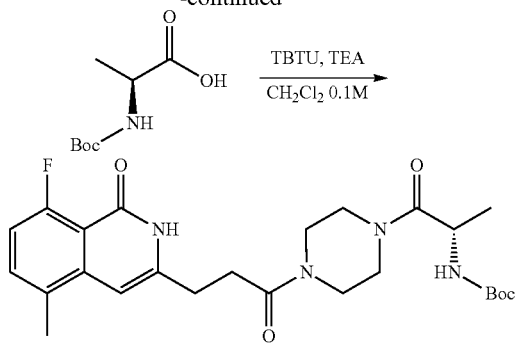

After dissolving 8-fluoro-5-methyl-3-(3-oxo-3-(piperazin-1-yl)propyl)isoquinolin-1(2H)-one (100 mg, 0.28 mmol), N-Boc-L-alanine (80 mg, 0.42 mmol) and TBTU (218 mg, 0.67 mmol) in CH$_2$Cl$_2$ (3.0 mL) at room temperature, TEA (0.2 mL, 1.4 mmol) was slowly added dropwise and stirred at room temperature for 17 hours. The reaction solution was diluted with EtOAc and washed with water, and the organic solvent was dried over anhydrous MgSO$_4$, filtered, and then concentrated by evaporation under reduced pressure. The resulting residue was separated and purified using silica gel chromatography to obtain the target compound, tert-butyl (S)-(1-(4-(3-(8-fluoro-5-methyl-1-oxo-1,2-dihydroisoquinolin-3-yl)propanoyl)piperazin-1-yl)-1-oxopropan-2-yl)carbamate (59 mg, 43%).

$^1$H NMR (300 MHz, CDCl$_3$) δ 11.51 (br, 1H), 7.42-7.38 (m, 1H), 7.00-6.93 (m, 1H), 6.43 (s, 1H), 4.62 (m, 1H), 3.79-3.51 (m, 8H), 3.03-2.94 (m, 4H), 2.46 (s, 3H), 1.45 (s, 9H), 1.33-1.23 (m, 3H).

Step 4: Preparation of 3-(3-(4-(L-alanyl)piperazin-1-yl)-3-oxopropyl)-8-fluoro-5-methylisoquinolin-1(2H)-one hydrochloride

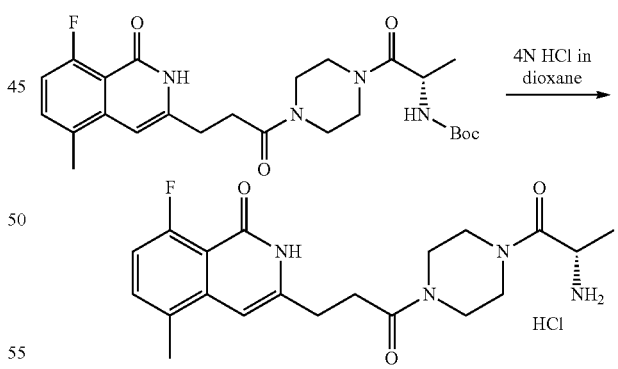

4 N HCl/dioxane (8 mL) was added to tert-butyl (S)-(1-(4-(3-(8-fluoro-5-methyl-1-oxo-1,2-dihydroisoquinolin-3-yl)propanoyl)piperazin-1-yl)-1-oxopropan-2-yl)carbamate (59 mg, 0.12 mmol), and the mixture was stirred at room temperature for 17 hours. The reaction solution was concentrated by evaporation under reduced pressure, and the resulting residue was filtered and washed with EtOAc to obtain the target compound, 3-(3-(4-(L-alanyl)piperazin-1-yl)-3-oxopropyl)-8-fluoro-5-methylisoquinolin-1(2H)-one hydrochloride (40 mg, 78%).

¹H NMR (300 MHz, DMSO-d₆) δ 11.27 (br, 1H), 8.20 (br, 2H), 7.47 (m, 1H), 7.04-6.97 (m, 1H), 6.38 (s, 1H), 4.40 (m, 1H), 3.60-3.34 (m, 8H), 2.78 (m, 4H), 2.39 (s, 3H), 1.31 (m, 3H).

<Example 195> Preparation of 3-(3-(4-(L-phenylalanyl)piperazin-1-yl)-3-oxopropyl)-8-fluoro-5-methylisoquinolin-1(2H)-one hydrochloride

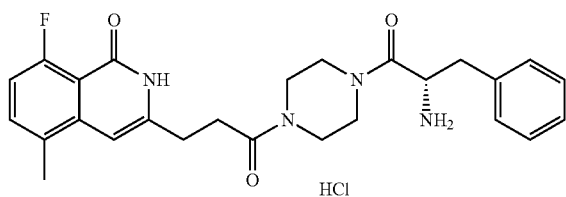 [SMILES: Cc1ccc(F)c2c(=O)[nH]c(CCC(=O)N3CCN(C(=O)[C@@H](N)Cc4ccccc4)CC3)cc12 ; Cl]

The target compound was obtained according to Example 194, except that N-Boc-L-phenylalanine was used in place of N-Boc-L-alanine used in Step 3 of Example 194.

¹H NMR (300 MHz, DMSO-d₆) δ 11.26 (br, 1H), 8.29 (br, 2H), 7.48 (m, 1H), 7.34-7.23 (m, 5H), 7.05-6.98 (m, 1H), 6.35 (s, 1H), 4.66 (m, 1H), 3.57-3.35 (m, 8H), 3.05 (m, 1H), 2.96-2.93 (m, 1H), 2.72 (m, 4H), 2.38 (s, 3H).

<Example 196> Preparation of 8-fluoro-5-methyl-3-(3-oxo-3-(4-propylpiperazin-1-yl)propyl)isoquinolin-1(2H)-one hydrochloride

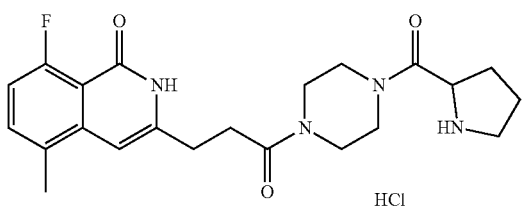 [SMILES: Cc1ccc(F)c2c(=O)[nH]c(CCC(=O)N3CCN(C(=O)C4CCCN4)CC3)cc12 ; Cl]

The target compound was obtained according to Example 194, except that N-Boc-L-proline was used in place of the N-Boc-L-alanine used in Step 3 of Example 194.

¹H NMR (300 MHz, DMSO-d₆) δ 11.29 (br, 1H), 9.85 (br, 1H), 7.50-7.46 (m, 1H), 7.04-6.98 (m, 1H), 6.38 (s, 1H), 4.60 (m, 1H), 4.04 (m, 8H), 3.23-3.18 (m, 2H), 2.78 (m, 4H), 2.39 (s, 3H), 1.93-1.76 (m, 4H).

<Example 197> Preparation of 4-(8-(3-(8-fluoro-5-methyl-1-oxo-1,2-dihydroisoquinolin-3-yl)propyl-3,8-diazabicyclo[3.2.1]octan-3-yl)benzonitrile

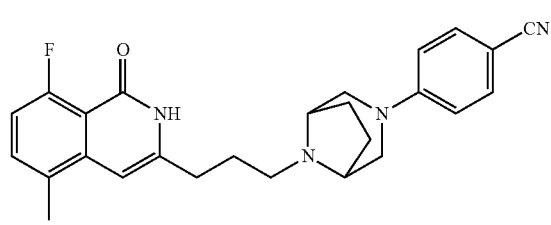 [SMILES: Cc1ccc(F)c2c(=O)[nH]c(CCCN3C4CCC3CN(c3ccc(C#N)cc3)C4)cc12]

Step 1: Preparation of tert-butyl 3-(4-cyanophenyl)-3,8-diazabicyclo[3.2.1]octan-8-carboxylate

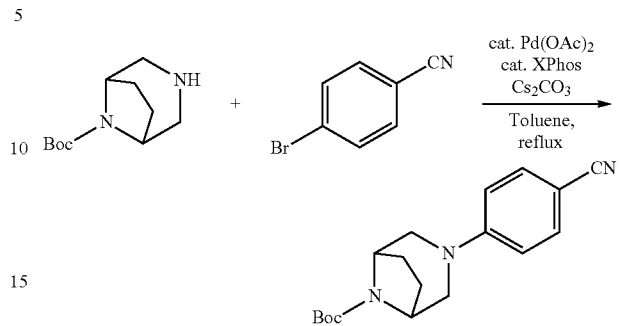

After dissolving tert-butyl 3,8-diazabicyclo[3.2.1]octan-8-carboxylate (800 mg, 3.77 mmol) and 4-bromobenzonitrile (824 mg, 4.52 mmol) in toluene (13 mL), Pd(OAc)₂ (42 mg, 0.2 mmol), XPhos (90 mg, 0.2 mmol), and Cs₂CO₃ (1.5 g, 4.52 mmol) were added. The mixture was stirred at 100° C. for 15 hours and cooled to room temperature. The reaction solution was diluted with EtOAc and washed with water. The organic solvent was dried over MgSO₄, filtered, and then concentrated by evaporation under reduced pressure, and the resulting residue was purified using silica gel chromatography to obtain the target compound, tert-butyl 3,8-diazabicyclo[3.2.1]octan-8-carboxylate (845 mg, 71%).

¹H NMR (300 MHz, CDCl₃) δ 7.49 (d, J=8.4 Hz, 2H), 6.78 (d, J=8.4 Hz, 2H), 4.39 (m, 2H), 3.48 (d, J=11.1 Hz, 2H), 3.11 (m, 2H), 2.05-1.97 (m, 2H), 1.78 (d, J=6.9 Hz, 2H), 1.48 (s, 9H).

Step 2: Preparation of 4-(3,8-diazabicyclo[3.2.1]octan-3-yl)benzonitrile 2HCl

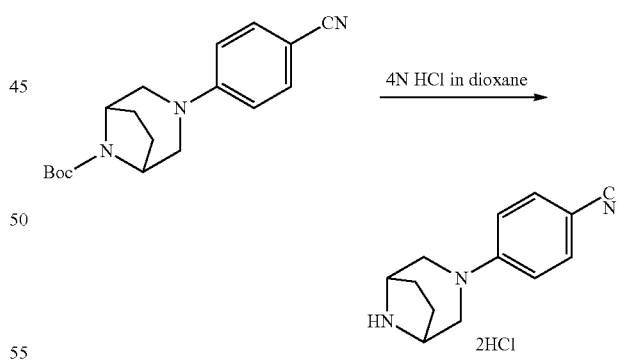

4 N HCl/dioxane (10 mL) was added to tert-butyl 3,8-diazabicyclo[3.2.1]octan-8-carboxylate (845 mg, 2.7 mmol), and the mixture was stirred for 15 hours. The solid produced during the reaction was filtered and washed with EtOAc to obtain the target compound, 4-(3,8-diazabicyclo[3.2.1]octan-3-yl)benzonitrile 2HCl (645 mg, 83%).

¹H NMR (300 MHz, DMSO-d₆) δ 9.34 (br, 2H), 7.63 (d, J=6.9 Hz, 2H), 7.01 (d, J=7.5 Hz, 2H), 4.15 (m, 2H), 3.80 (d, J=12.9 Hz, 2H), 3.20 (d, J=12.3 Hz, 2H), 1.95-1.86 (m, 4H).

Step 3: Preparation of methyl 2-bromo-6-fluoro-3-methylbenzoate

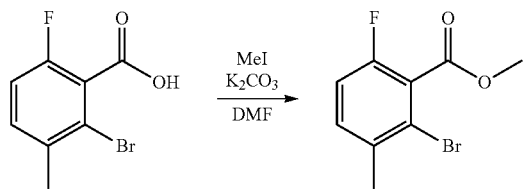

After dissolving 2-bromo-6-fluoro-3-methylbenzoic acid (99 g, 424.83 mmol) in DMF (1.2 L), K$_2$CO$_3$ (176.2 g, 1.27 mol) was added at 0° C. and stirred for 30 minutes. MeI (56 mL, 849.67 mmol) was slowly added dropwise to the reaction solution at 0° C., followed by stirring at room temperature for 15 hours. The reaction solution was diluted with EtOAc and washed with a Na$_2$S$_2$O$_3$ aqueous solution and an NH$_4$Cl aqueous solution. The organic solvent was dried over MgSO$_4$, filtered, and then concentrated by evaporation under reduced pressure, and the resulting residue was purified using silica gel chromatography to obtain the target compound, methyl 2-bromo-6-fluoro-3-methylbenzoate (93 g, 89%).

$^1$H NMR (300 MHz, CDCl$_3$) δ 7.29-7.24 (m, 1H), 7.03-6.97 (m, 1H), 3.97 (s, 3H), 2.39 (s, 3H).

Step 4: Preparation of methyl 6-fluoro-2-(5-hydroxypent-1-yn-1-yl)-3-methylbenzoate

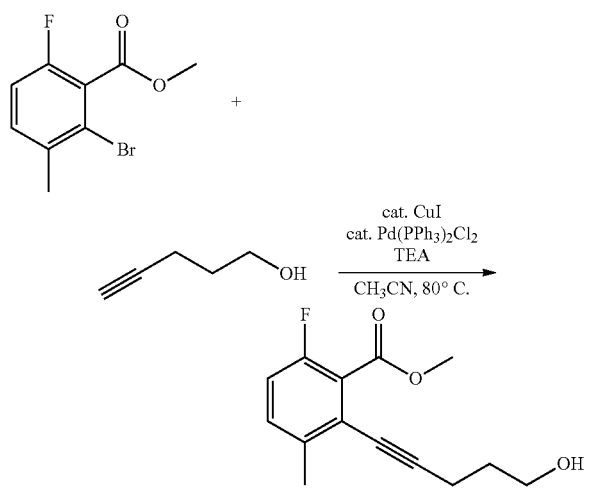

After dissolving methyl 2-bromo-6-fluoro-3-methylbenzoate (72 g, 291.43 mmol) in CH$_3$CN (970 mL), pent-4-yn-1-ol (41 mL, 437.14 mmol), Pd(PPh$_3$)$_2$Cl$_2$ (10.2 g, 14.57 mmol), and CuI (5.6 g, 29.14 mmol) were added. TEA (162 mL, 1.16 mol) was added dropwise, and the mixture was stirred at 80° C. for 15 hours and then cooled to room temperature. The reaction solution was diluted with EtOAc and washed with an NH$_4$Cl aqueous solution. The organic solvent was dried over MgSO$_4$, filtered, and then concentrated by evaporation under reduced pressure, and the resulting residue was purified using silica gel chromatography to obtain the target compound, methyl 6-fluoro-2-(5-hydroxypent-1-yn-1-yl)-3-methyl benzoate (13 g, 18%).

$^1$H NMR (300 MHz, CDCl$_3$) δ 7.27-7.19 (m, 1H), 6.97-6.91 (m, 1H), 3.95 (s, 3H), 3.83-3.81 (m, 2H), 2.60 (t, J=6.3 Hz, 2H), 2.38 (s, 3H), 1.90-1.84 (m, 2H).

Step 5: Preparation of 8-fluoro-3-(3-hydroxypropyl)-5-methyl-1H-isochromen-1-one

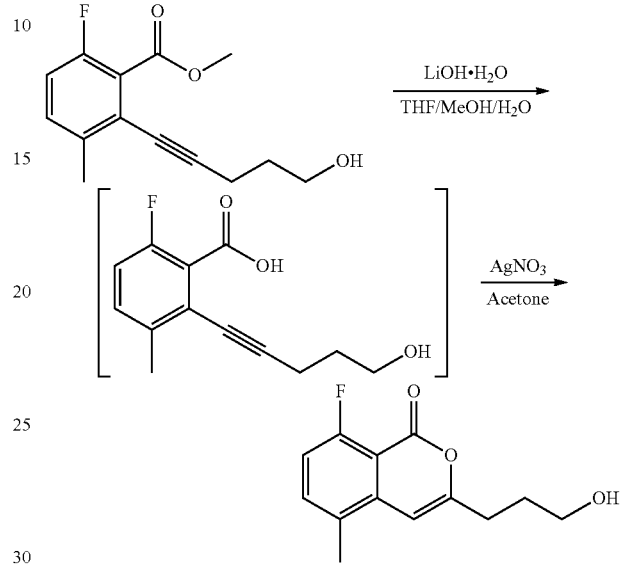

After dissolving methyl 6-fluoro-2-(5-hydroxypent-1-yn-1-yl)-3-methylbenzoate (13 g, 51.94 mmol) in THF/MeOH/H$_2$O (230 mL/60 mL/60 mL), LiOH·H$_2$O (13.1 g, 311.66 mmol) was added and stirred at room temperature for 15 hours. The reaction solution was concentrated by distillation under reduced pressure and then diluted with EtOAc, and 6 N HCl was slowly added dropwise to adjust the pH to 1 to 2. The organic solvent was dried over MgSO$_4$, filtered, and then concentrated by evaporation under reduced pressure. After dissolving the concentrated reaction solution in acetone (260 mL), AgNO$_3$ (3.24 g, 10.39 mmol) was added dropwise. The reaction solution was stirred at room temperature for 15 hours, and then distilled under reduced pressure to remove the solvent. The reaction solution was diluted with EtOAc and washed with water. The organic solvent was dried over MgSO$_4$, filtered, and then concentrated by evaporation under reduced pressure, and the resulting residue was purified using silica gel chromatography to obtain the target compound, 8-fluoro-3-(3-hydroxypropyl)-5-methyl-1H-isochromen-1-one (9.9 g, 81%).

$^1$H NMR (300 MHz, CDCl$_3$) δ 7.48-7.44 (m, 1H), 7.05-6.99 (m, 1H), 6.35 (s, 1H), 3.75 (m, 2H), 2.70-2.65 (m, 2H), 2.40 (s, 3H), 2.03-1.97 (m, 2H).

Step 6: Preparation of 8-fluoro-3-(3-hydroxypropyl)-5-methylisoquinolin-1(2H)-one

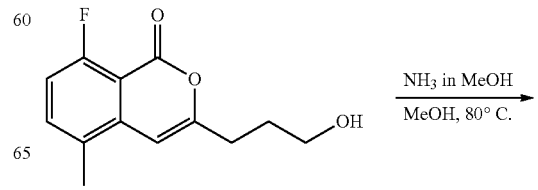

-continued

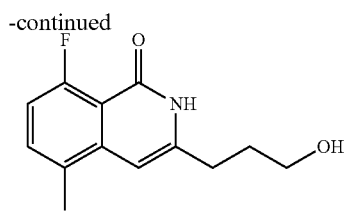

After dissolving 8-fluoro-3-(3-hydroxypropyl)-5-methyl-1H-isochromen-1-one (4.1 g, 17.55 mmol) in 7 N NH$_3$/MeOH (100 mL), the mixture was stirred at 80° C. for 15 hours. The reaction solution was cooled to room temperature, and then the thus-obtained product was concentrated by evaporation under reduced pressure. The resulting solid was recrystallized with MeOH to obtain the target compound, 8-fluoro-3-(3-hydroxypropyl)-5-methylisoquinolin-1(2H)-one (3.2 g, 78%).

$^1$H NMR (300 MHz, DMSO-d$_6$) δ 11.27 (br, 1H), 7.48-7.44 (m, 1H), 7.02-6.96 (m, 1H), 6.31 (s, 1H), 4.57 (br, 1H), 3.44 (m, 2H), 2.56-2.50 (m, 2H), 2.38 (s, 3H), 1.82-1.75 (m, 2H).

Step 7: Preparation of 3-(8-fluoro-5-methyl-1-oxo-1,2-dihydroisoquinolin-3-yl)propyl methanesulfonate

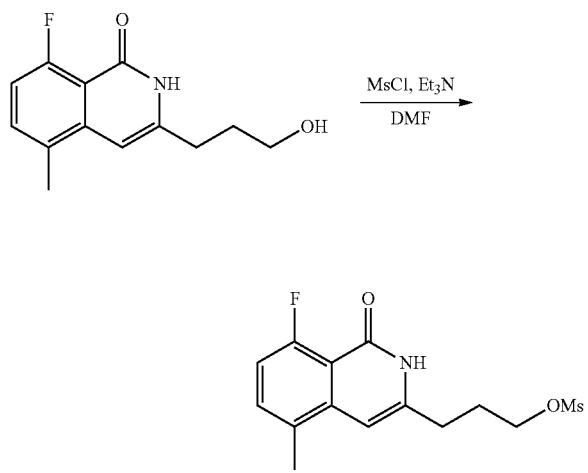

After dissolving 8-fluoro-3-(3-hydroxypropyl)-5-methyl-isoquinolin-1(2H)-one (3.2 g, 13.6 mmol) in DMF (68 mL), the mixture was cooled to 0° C. MsCl (1.37 mL, 17.68 mmol) and TEA (2.84 mL, 20.4 mmol) were slowly added dropwise at 0° C., followed by stirring at 25° C. for 15 hours. The reaction solution was diluted with EtOAc and washed with an NH$_4$Cl aqueous solution. The organic solvent was dried over MgSO$_4$, filtered, and then concentrated by evaporation under reduced pressure, and the resulting residue was recrystallized with MeOH to obtain the target compound, 3-(8-fluoro-5-methyl-1-oxo-1,2-dihydroisoquinolin-3-yl)propyl methanesulfonate (2.28 g, 54%).

$^1$H NMR (300 MHz, DMSO-d$_6$) δ 11.36 (br, 1H), 7.49-7.45 (m, 1H), 7.04-6.98 (m, 1H), 6.36 (s, 1H), 4.23 (t, J=6.6 Hz, 2H), 3.19 (s, 3H), 2.61 (t, J=7.8 Hz, 2H), 2.39 (m, 3H), 2.10-2.00 (m, 2H).

Step 8: Preparation of 4-(8-(3-(8-fluoro-5-methyl-1-oxo-1,2-dihydroisoquinolin-3-yl)propyl)-3,8-diazabicyclo[3.2.1]octan-3-yl)benzonitrile

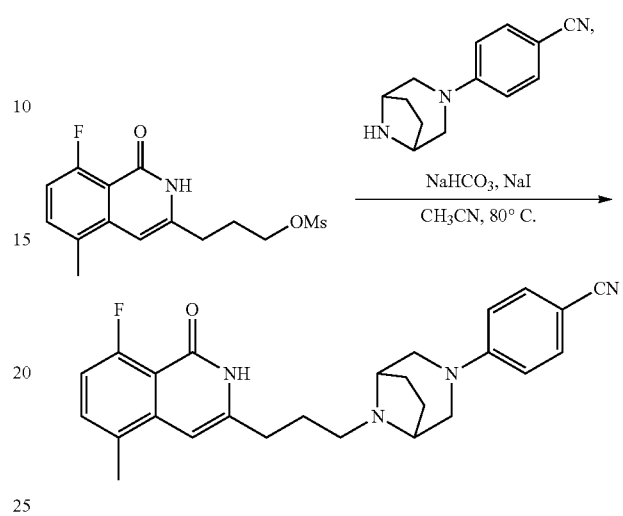

After dissolving 3-(8-fluoro-5-methyl-1-oxo-1,2-dihydroisoquinolin-3-yl)propyl methanesulfonate (0.1 g, 0.032 mmol) in CH$_3$CN (20 mL), 4-(3,8-diazabicyclo[3.2.1]octan-3-yl)benzonitrile 2HCl (0.13 g, 0.45 mmol) was added at 25° C. NaHCO$_3$(134 mg, 1.6 mmol) and NaI (96 mg, 0.64 mmol) were added, and the mixture was heated to 80° C. and stirred for 17 hours. The reaction solution was diluted with EtOAc and washed with a NaS$_2$O$_3$ aqueous solution and an NH$_4$C aqueous solution. The organic solvent was dried over MgSO$_4$, filtered, and then concentrated by evaporation under reduced pressure, and the resulting residue was recrystallized with MeOH to obtain the target compound, 4-(8-(3-(8-fluoro-5-methyl-1-oxo-1,2-dihydroisoquinolin-3-yl)propyl)-3,8-diazabicyclo[3.2.1]octan-3-yl)benzonitrile (10 mg, 7%).

$^1$H NMR (300 MHz, CDCl$_3$) δ 11.46 (br, 1H), 7.48-7.45 (m, 2H), 7.36-7.35 (m, 1H), 6.94-6.90 (m, 1H), 6.79-6.76 (m, 2H), 6.27 (s, 1H), 3.47-3.41 (m, 4H), 2.78-2.74 (m, 2H), 2.59-2.55 (m, 2H), 2.42 (s, 3H), 2.07-1.76 (m, 6H), 1.57-1.56 (m, 2H).

<Example 198> Preparation of 8-fluoro-3-(3-(3-(4-fluorophenyl)-3,8-diazabicyclo[3.2.1]octan-8-yl)propyl)-5-methylisoquinolin-1(2H)-one

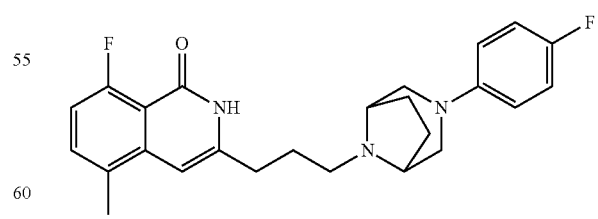

The target compound was obtained according to Example 197, except that 1-bromo-4-fluorobenzene was used in place of 4-bromobenzonitrile used in Step 1 of Example 197.

$^1$H NMR (300 MHz, CDCl$_3$) δ 11.51 (br, 1H), 7.35-7.31 (m, 1H), 6.96-6.87 (m, 3H), 6.79-6.74 (m, 2H), 6.27 (s, 1H), 3.36-3.24 (m, 4H), 2.77-2.72 (m, 2H), 2.58-2.55 (m, 2H), 2.42 (s, 3H), 2.04-2.03 (m, 2H), 1.93-1.87 (m, 4H), 1.65-1.64 (m, 2H).

<Example 199> Preparation of 6-(8-(3-(8-fluoro-5-methyl-1-oxo-1,2-dihydroisoquinolin-3-yl)propyl-3,8-diazabicyclo[3.2.1]octan-3-yl)nicotinonitrile

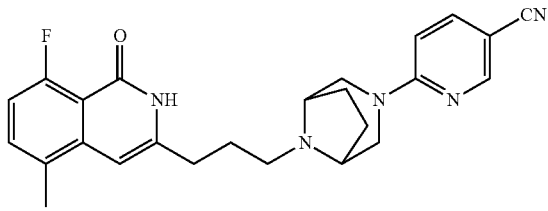

The target compound was obtained according to Example 197, except that 6-bromonicotinonitrile was used in place of 4-bromobenzonitrile used in Step 1 of Example 197.

$^1$H NMR (300 MHz, CDCl$_3$) δ 8.39-8.38 (m, 1H), 7.60-7.57 (m, 1H), 7.34-7.33 (m, 1H), 6.93-6.87 (m, 1H), 6.54-6.52 (m, 1H), 6.28 (s, 1H), 3.97-3.96 (m, 2H), 3.56-3.46 (m, 4H), 2.79-2.78 (m, 2H), 2.56-2.55 (m, 2H), 2.43 (s, 3H), 2.04-2.03 (m, 2H), 1.92-1.91 (m, 2H), 1.70-1.68 (m, 2H).

<Example 200> Preparation of 5-(8-(3-(8-fluoro-5-methyl-1-oxo-1,2-dihydroisoquinolin-3-yl)propyl)-3,8-diazabicyclo[3.2.1]octan-3-yl)picolinonitrile

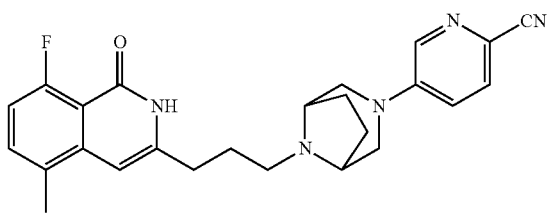 [SMILES: Cc1ccc(F)c2c(=O)[nH]c(CCCN3C4CCC3CN(c3ccc(C#N)nc3)C4)cc12]

The target compound was obtained according to Example 197, except that 5-bromopicolinonitrile was used in place of 4-bromobenzonitrile used in Step 1 of Example 197.

$^1$H NMR (300 MHz, DMSO-d$_6$) δ 11.43 (br, 1H), 8.13 (s, 1H), 7.83-7.74 (m, 2H), 7.45-7.42 (m, 1H), 7.00-6.96 (m, 1H), 6.34 (s, 1H), 3.53-3.50 (m, 2H), 3.38-3.36 (m, 2H), 3.00-2.97 (m, 2H), 2.60-2.38 (m, 5H), 1.88-1.82 (m, 4H), 1.63-1.61 (m, 2H).

<Example 201> Preparation of 3-(3-(3-(4-chlorophenyl)-3,8-diazabicyclo[3.2.1]octan-8-yl)propyl)-8-fluoro-5-methylisoquinolin-1(2H)-one

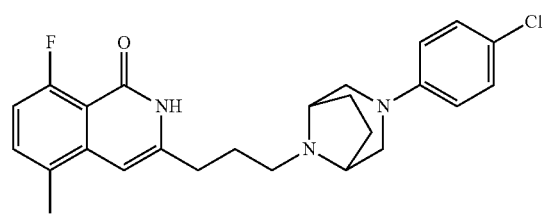 [SMILES: Cc1ccc(F)c2c(=O)[nH]c(CCCN3C4CCC3CN(c3ccc(Cl)cc3)C4)cc12]

The target compound was obtained according to Example 197, except that 1-bromo-4-chlorobenzene was used in place of 4-bromobenzonitrile used in Step 1 of Example 197.

$^1$H NMR (300 MHz, CDCl$_3$) δ 11.42 (s, 1H), 7.35-7.33 (m, 1H), 7.17-7.14 (m, 2H), 6.39-6.89 (m, 1H), 6.75-6.72 (m, 2H), 6.26 (s, 1H), 3.44-3.25 (m, 6H), 2.76-2.72 (m, 2H), 2.58-2.54 (m, 2H), 2.42 (s, 3H), 2.04-2.03 (m, 2H), 1.92-1.82 (m, 4H).

<Example 202> Preparation of 8-fluoro-3-(3-(3-(6-fluoropyridin-3-yl)-3,8-diazabicyclo[3.2.1]octan-8-yl)propyl)-5-methylisoquinolin-1(2H)-one

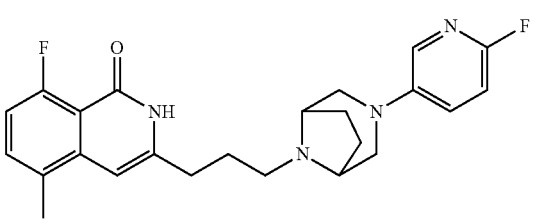 [SMILES: Cc1ccc(F)c2c(=O)[nH]c(CCCN3C4CCC3CN(c3ccc(F)nc3)C4)cc12]

The target compound was obtained according to Example 197, except that 5-bromo-2-fluoropyridine was used in place of 4-bromobenzonitrile used in Step 1 of Example 197.

$^1$H NMR (300 MHz, CDCl$_3$) δ 11.46 (br, 1H), 7.71-7.70 (m, 1H), 7.36-7.31 (m, 1H), 7.23-7.22 (m, 1H), 6.93-6.87 (m, 1H), 6.81-6.77 (m, 1H), 6.26 (s, 1H), 3.46-3.45 (m, 2H), 3.34-3.33 (m, 4H), 2.78-2.73 (m, 2H), 2.58-2.54 (m, 2H), 2.42 (s, 3H), 2.07-2.04 (m, 2H), 1.92-1.84 (m, 4H).

<Example 203> Preparation of 6-(8-(3-(8-fluoro-1-oxo-1,2-dihydroisoquinolin-3-yl)propyl)3,8-diazabicyclo[3.2.1]octan-3-yl)nicotinonitrile

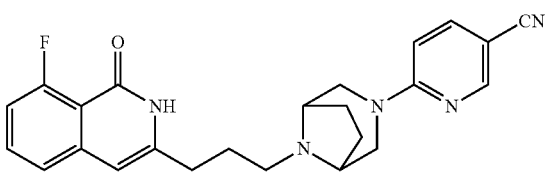 [SMILES: N#Cc1ccc(N2CC3CCC(C2)N3CCCc2cc3cccc(F)c3c(=O)[nH]2)nc1]

The target compound was obtained according to Example 197, except that 6-bromonicotinonitrile was used in place of 4-bromobenzonitrile used in Step 1 of Example 197, and 2-bromo-6-fluorobenzoic acid was used in place of 2-bromo-6-fluoro-3-methylbenzoic acid used in Step 3 of Example 197.

$^1$H NMR (300 MHz, DMSO-d$_6$) δ 11.26 (br, 1H), 8.46 (s, 1H), 7.84-7.81 (m, 1H), 7.64-7.57 (m, 1H), 7.36-7.34 (m, 1H), 7.12-7.06 (m, 1H), 6.80-6.77 (m, 1H), 6.36 (s, 1H), 3.90 (m, 2H), 3.31 (m, 2H), 3.04-3.00 (m, 2H), 2.38-2.24 (m, 2H), 1.83 (m, 2H), 1.68-1.66 (m, 2H), 1.46-1.44 (m, 4H).

Example 204: Preparation of 6-(8-(3-(7-fluoro-1-oxo-1,2-dihydroisoquinolin-3-yl)propyl)-3,8-diazabicyclo[3.2.1]octan-3-yl)nicotinonitrile

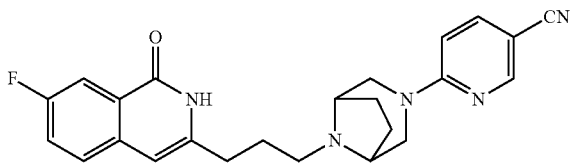 [SMILES: N#Cc1ccc(N2CC3CCC(C2)N3CCCc2cc3ccc(F)cc3c(=O)[nH]2)nc1]

The target compound was obtained according to Example 197, except that 6-bromonicotinonitrile was used in place of 4-bromobenzonitrile used in Step 1 of Example 197, and 2-bromo-5-fluorobenzoic acid was used in place of 2-bromo-6-fluoro-3-methylbenzoic acid used in Step 3 of Example 197.

$^1$H NMR (300 MHz, DMSO-d$_6$) δ 11.57 (br, 1H), 8.47 (d, 1H, J=1.8 Hz), 7.85-7.81 (m, 1H), 7.78-7.74 (m, 1H), 7.69-7.64 (m, 1H), 7.59-7.52 (m, 1H), 6.80 (d, 1H, J=9.3 Hz), 6.43 (s, 1H), 3.91 (m, 2H), 3.34 (m, 2H), 3.10-3.06 (m, 2H), 2.62-2.57 (m, 2H), 2.42-2.37 (m, 2H), 1.84-1.79 (m, 4H), 1.48-1.46 (m, 2H).

Example 205: Preparation of 6-(8-(3-(7-fluoro-5-methyl-1-oxo-1,2-dihydroisoquinolin-3-yl)propyl)-3,8-diazabicyclo[3.2.1]octan-3-yl)nicotinonitrile

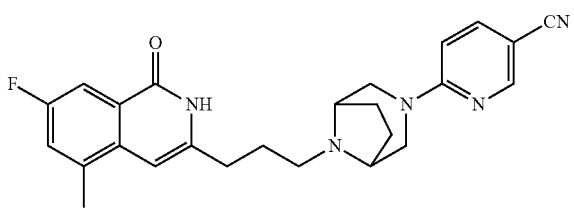 [SMILES: Cc1cc(F)cc2c(=O)[nH]c(CCCN3C4CCC3CN(c3ccc(C#N)cn3)C4)cc12]

Step 1: Preparation of methyl 5-fluoro-2-hydroxy-3-methylbenzoate

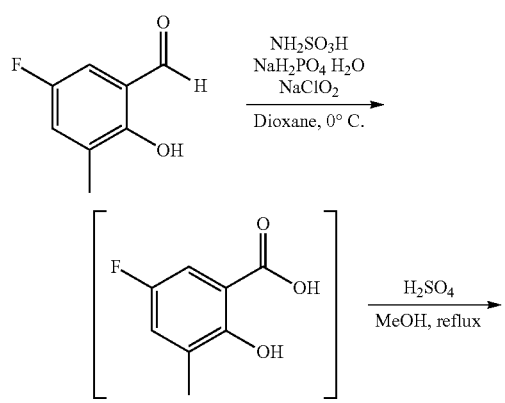

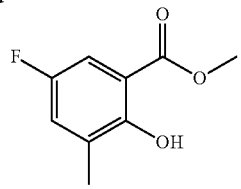

After dissolving 5-fluoro-2-hydroxy-3-methylbenzaldehyde (24 g, 155.7 mmol) and NH$_2$SO$_3$H (22.7 g, 622.8 mmol) in dioxane (1.9 L), an aqueous solution of NaH$_2$PO$_4$H$_2$O (0.25 M, 630 mL) was slowly added dropwise, and a NaClO$_2$ aqueous solution (2 M, 80 mL) was added dropwise at 0° C. The mixture was stirred at 0° C. for 30 minutes, and then Na$_2$SO$_3$ was added and stirred for 10 minutes. The reaction solution was diluted with EtOAc and washed with 1 N HCl and water, and the organic solvent was dried over anhydrous MgSO$_4$, filtered, and then concentrated by evaporation under reduced pressure to obtain a mixed solution of 5-fluoro-2-hydroxy-3-methylbenzoic acid (26 g, 100%). The mixture solution was diluted with methanol (1 L), and sulfuric acid (60 mL) was slowly added dropwise and refluxed for 15 hours. The reaction solution was cooled to room temperature, diluted with EtOAc, and then washed with water. The organic solvent was dried over anhydrous MgSO$_4$, filtered, and then concentrated by evaporation under reduced pressure to obtain the target compound, methyl 5-fluoro-2-hydroxy-3-methyl benzoate (31.28 g, 58%).

$^1$H NMR (300 MHz, CDCl$_3$) δ 10.78 (s, 1H), 7.35-7.33 (m, 1H), 7.09-7.06 (m, 1H), 3.94 (s, 3H), 2.26 (s, 3H).

Step 2: Preparation of methyl 5-fluoro-3-methyl-2-((((trifluoromethyl)sulfonyl)oxy)benzoate

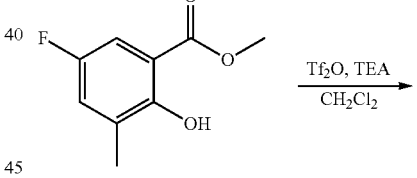

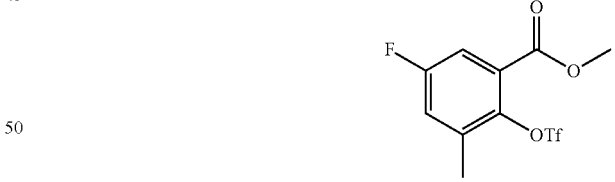

Methyl 5-fluoro-2-hydroxy-3-methylbenzoate (1.0 g, 5.43 mmol) was added to CH$_2$Cl$_2$ (1 L), and Tf$_2$O (2.3 g, 8.15 mmol) was added dropwise. The mixture was stirred for 10 minutes, and TEA (1.1 g, 10.86 mmol) was added dropwise, followed by stirring at room temperature for 15 hours. The reaction solution was diluted with EtOAc and washed with water, and the organic solvent was dried over anhydrous MgSO$_4$, filtered, and then concentrated by evaporation under reduced pressure. The resulting residue was separated and purified using silica gel chromatography to obtain the target compound, methyl 5-fluoro-3-methyl-2-((((trifluoromethyl)sulfonyl)oxy)benzoate (1.5 g, 87%).

$^1$H NMR (300 MHz, CDCl$_3$) δ 7.53-7.52 (m, 1H), 7.20-7.17 (m, 1H), 3.94 (s, 3H), 2.43 (s, 3H).

Step 3: Preparation of methyl 5-fluoro-2-(5-hydroxypent-1-yn-1-yl)-3-methylbenzoate

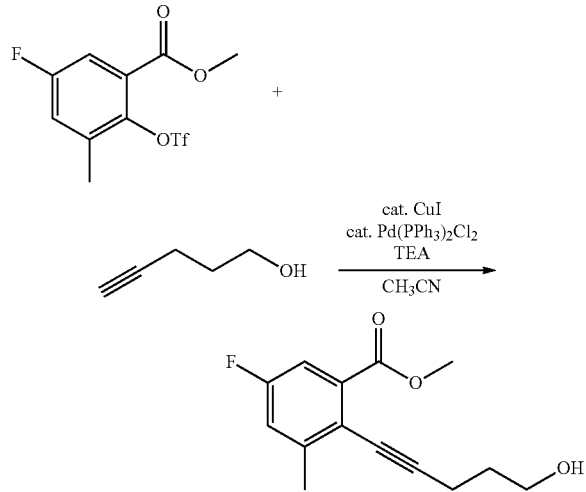

After dissolving methyl 5-fluoro-3-methyl-2-(((trifluoromethyl)sulfonyl)oxy)benzoate (52 g, 164.4 mmol) in CH$_3$CN (822 mL), pent-4-yn-1-ol (16.6 g, 197.28 mmol), Pd(PPh$_3$)$_2$Cl$_2$ (5.77 g, 8.22 mmol), and CuI (1.57 g, 8.22 mmol) were added. TEA (50.0 g, 493.2 mmol) was added dropwise, and the mixture was stirred at 80° C. for 15 hours and then cooled to room temperature. The reaction solution was diluted with EtOAc and washed with an NH$_4$Cl aqueous solution. The organic solvent was dried over MgSO$_4$, filtered, and then concentrated by evaporation under reduced pressure, and the resulting residue was purified using silica gel chromatography to obtain the target compound, methyl 5-fluoro-2-(5-hydroxypent-1-yn-1-yl)-3-methylbenzoate (24.35 g, 59%).

$^1$H NMR (300 MHz, CDCl$_3$) δ 7.41 (d, J=9.0 Hz, 1H), 7.10 (d, J=8.7 Hz, 1H), 3.91 (s, 3H), 3.88-3.86 (m, 2H), 2.66 (t, J=6.9 Hz, 2H), 2.46 (s, 3H), 2.08 (m, 1H), 1.90 (t, J=6.0 Hz, 2H).

Step 4: Preparation of 7-fluoro-3-(3-hydroxypropyl)-5-methyl-1H-isochromen-1-one

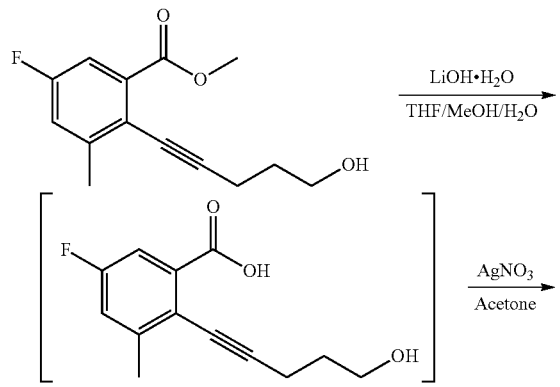

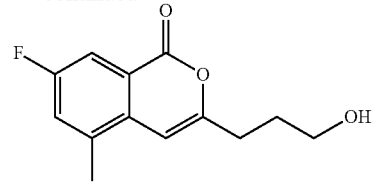

After dissolving methyl 5-fluoro-2-(5-hydroxypent-1-yn-1-yl)-3-methylbenzoate (24.35 g, 97.3 mmol) in THF/MeOH/H$_2$O (320 mL/80 mL/80 mL), LiOH·H$_2$O (20.4 g, 486.5 mmol) was added and stirred at room temperature for 15 hours. The reaction solution was concentrated by distillation under reduced pressure and then diluted with EtOAc, and 6 N HCl was slowly added dropwise to adjust the pH to 1 to 2. The organic solvent was dried over MgSO$_4$, filtered, and then concentrated by evaporation under reduced pressure. After dissolving the concentrated reaction solution in acetone (486 mL), AgNO$_3$ (6.1 g, 19.46 mmol) was added. The reaction solution was stirred at room temperature for 15 hours, and then distilled under reduced pressure to remove the solvent. The reaction solution was diluted with EtOAc and washed with water. The organic solvent was dried over MgSO$_4$, filtered, and then concentrated by evaporation under reduced pressure, and the resulting residue was purified using silica gel chromatography to obtain the target compound, 7-fluoro-3-(3-hydroxypropyl)-5-methyl-1H-isochromen-1-one (8.3 g, 36%).

$^1$H NMR (300 MHz, CDCl$_3$) δ 7.76 (d, J=8.4 Hz, 1H), 7.28-7.24 (m, 1H), 6.38 (s, 1H), 3.75 (t, J=6.0 Hz, 2H), 2.68 (t, J=7.5 Hz, 2H), 2.47 (s, 3H), 2.01-1.94 (m, 2H).

Step 5: Preparation of 7-fluoro-3-(3-hydroxypropyl)-5-methylisoquinolin-1(2H)-one

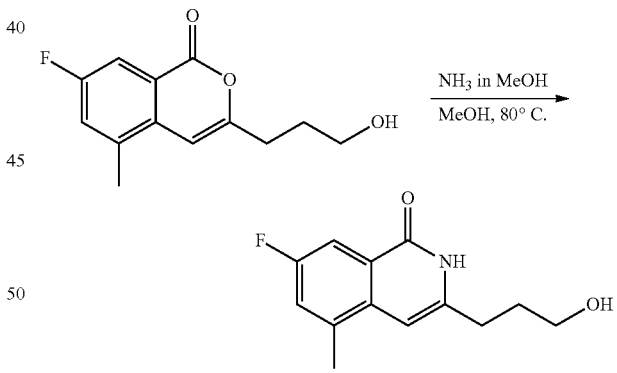

After dissolving 7-fluoro-3-(3-hydroxypropyl)-5-methyl-1H-isochromen-1-one (5.5 g, 23.28 mmol) in 7 N NH$_3$/MeOH (33 mL), the mixture was stirred at 80° C. for 15 hours. The reaction solution was cooled to room temperature, and then the thus-obtained product was concentrated by evaporation under reduced pressure. The resulting solid was recrystallized with MeOH to obtain the target compound, 7-fluoro-3-(3-hydroxypropyl)-5-methylisoquinolin-1(2H)-one (3.9 g, 71%).

$^1$H NMR (300 MHz, DMSO-d$_6$) δ 7.53 (d, J=9.3 Hz, 1H), 7.32 (d, J=9.3 Hz, 1H), 6.27 (s, 1H), 4.50 (br, 1H), 4.05-4.03 (m, 1H), 3.06-3.05 (m, 2H), 2.46-2.36 (m, 5H), 1.71-1.64 (m, 2H).

Step 6: Preparation of 3-(7-fluoro-5-methyl-1-oxo-1,2-dihydroisoquinolin-3-yl)propyl methanesulfonate

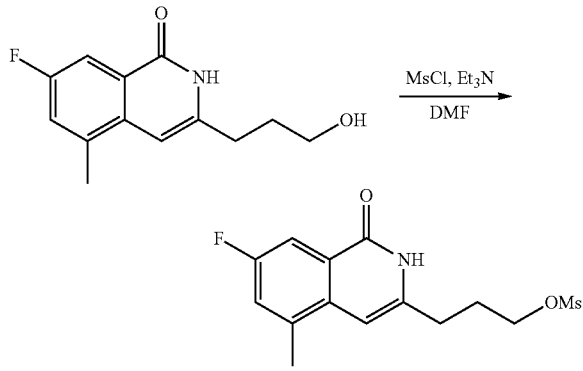

After dissolving 7-fluoro-3-(3-hydroxypropyl)-5-methyl-isoquinolin-1(2H)-one (3.9 g, 16.58 mmol) in DMF (83 mL), and the mixture was cooled to 0° C. MsCl (1.7 mL, 21.55 mmol) and TEA (3.5 mL, 24.87 mmol) were slowly added dropwise at 0° C., followed by stirring at room temperature for 15 hours. The reaction solution was diluted with EtOAc and washed with an NH₄Cl aqueous solution. The organic solvent was dried over MgSO₄, filtered, and then concentrated by evaporation under reduced pressure, and the resulting residue was recrystallized with MeOH to obtain the target compound, 3-(7-fluoro-5-methyl-1-oxo-1,2-dihydroisoquinolin-3-yl)propyl methanesulfonate (4.42 g, 85%).

$^1$H NMR (300 MHz, CDCl$_3$) δ 11.63 (br, 1H), 7.86 (d, J=9.0 Hz, 1H), 7.25 (d, J=9.0 Hz, 1H), 6.49 (s, 1H), 4.35 (t, J=5.7 Hz, 2H), 3.05 (s, 3H), 2.84 (t, J=5.7 Hz, 2H), 2.54 (s, 3H), 2.27 (m, 2H).

Step 7: Preparation of 6-(8-(3-(7-fluoro-5-methyl-1-oxo-1,2-dihydroisoquinolin-3-yl)propyl)-3,8-diazabicyclo[3.2.1]octan-3-yl)nicotinonitrile

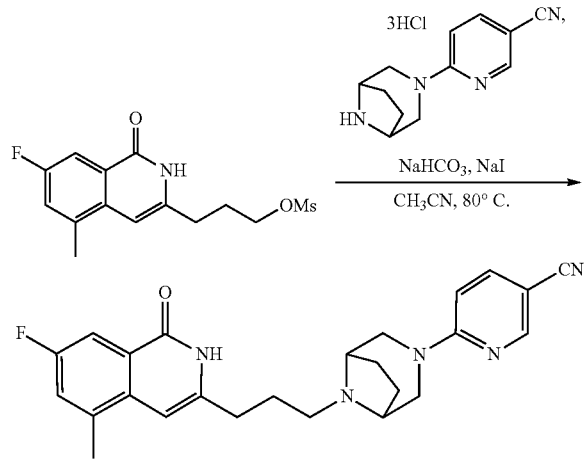

After dissolving 3-(7-fluoro-5-methyl-1-oxo-1,2-dihydroisoquinolin-3-yl)propyl methanesulfonate (100 mg, 0.32 mmol) in CH₃CN (3.2 mL), diazabicyclo[3.2.1]octan-3-yl) nicotinonitrile 3HCl (134 mg, 0.41 mmol) was added dropwise at 25° C. Na₂CO₃ (169 mg, 1.59 mmol) and NaI (143 mg, 0.96 mmol) were added, and the mixture was heated to 80° C. and stirred for 17 hours. The reaction solution was diluted with EtOAc and washed with a Na₂S₂O₃ aqueous solution and an NH₄C aqueous solution. The organic solvent was dried over MgSO₄, filtered, and then concentrated by evaporation under reduced pressure, and the resulting residue was recrystallized with MeOH to obtain the target compound, 6-(8-(3-(7-fluoro-5-methyl-1-oxo-1,2-dihydroisoquinolin-3-yl)propyl)-3,8-diazabicyclo[3.2.1]octan-3-yl)nicotinonitrile (9.4 mg, 7%).

$^1$H NMR (300 MHz, DMSO-d$_6$) δ 11.63 (br, 1H), 8.47 (d, 1H, J=1.8 Hz), 7.84-7.82 (m, 1H), 7.64-7.61 (m, 1H), 7.46-7.43 (m, 1H), 6.80 (d, 1H, J=9.3 Hz), 6.43 (s, 1H), 3.92 (m, 2H), 3.34 (m, 2H), 3.10-3.06 (m, 2H), 2.63-2.60 (m, 2H), 2.49 (s, 3H), 2.40 (m, 2H), 1.84-1.82 (m, 4H), 1.48-1.46 (m, 2H).

<Example 206> Preparation of 6-(8-(3-(8-fluoro-1-oxo-1,2-dihydroisoquinolin-3-yl) propanoyl)-3,8-diazabicyclo[3.2.1]octan-3-yl)nicotinonitrile

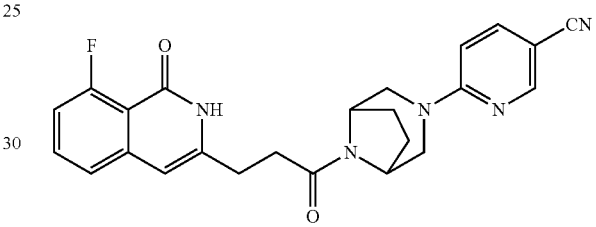

Step 1: Preparation of 3-(8-fluoro-1-oxo-1H-isochromen-3-yl)propanoic acid

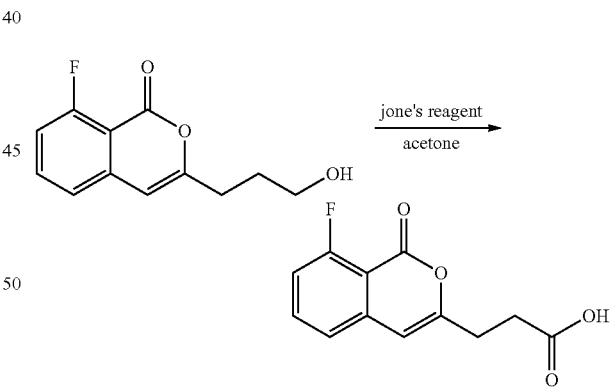

After dissolving 8-fluoro-3-(3-hydroxypropyl)-1H-isochromen-1-one (10.0 g, 42.33 mmol) in acetone (420 mL), 2.5 M Jones reagent (68 mL) was slowly added dropwise at 0° C. The reaction solution was stirred at room temperature for 15 hours. The reaction solution was concentrated by evaporation under reduced pressure, diluted with EtOAc, and washed with water. The organic solvent was dried over MgSO₄, filtered, and then concentrated by evaporation under reduced pressure, and the resulting residue was recrystallized with MeOH to obtain the target compound, 3-(8-fluoro-1-oxo-1H-isochromen-3-yl)propanoic acid (6.4 g, 61%).

¹H NMR (300 MHz, CDCl₃) δ 7.84-7.72 (m, 2H), 7.60-7.55 (m, 1H), 7.39-7.29 (m, 1H), 6.63 (s, 1H), 2.77-2.73 (m, 2H), 2.63-2.61 (m, 2H).

Step 2: Preparation of 3-(8-fluoro-1-oxo-1,2-dihydroisoquinolin-3-yl)propanoic acid

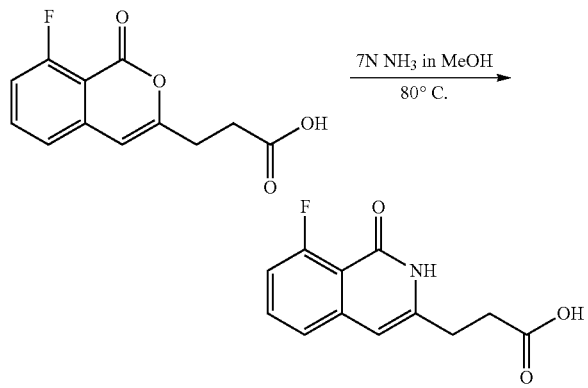

After dissolving 3-(8-fluoro-1-oxo-1H-isochromen-3-yl)propanoic acid (1.0 g, 4.23 mmol) in 7 N NH₃/MeOH (20 mL), the mixture was stirred at 80° C. for 15 hours. The reaction solution was cooled to room temperature, and then the thus-obtained product was concentrated by evaporation under reduced pressure. The resulting solid was recrystallized with MeOH to obtain the target compound, 3-(8-fluoro-1-oxo-1,2-dihydroisoquinolin-3-yl)propanoic acid (840 g, 84%).
¹H NMR (300 MHz, CDCl₃) δ 7.61-7.54 (m, 1H), 7.32-7.30 (m, 1H), 7.09-7.03 (m, 1H), 6.30 (s, 1H), 2.65-2.61 (m, 2H), 2.40-2.35 (m, 2H).

Step 3: Preparation of 6-(8-(3-(8-fluoro-1-oxo-1,2-dihydroisoquinolin-3-yl)propanoyl)-3,8-diazabicyclo[3.2.1]octan-3-yl)nicotinonitrile

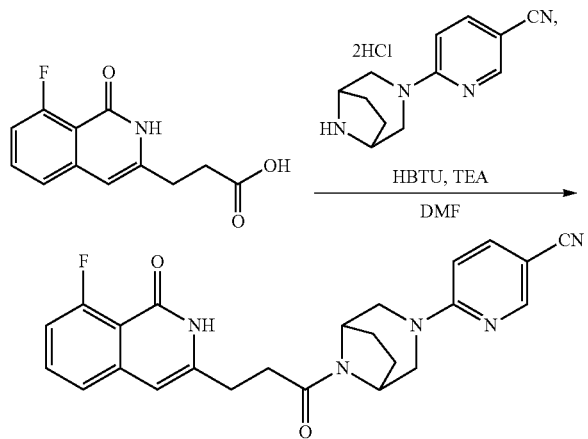

After dissolving 3-(8-fluoro-1-oxo-1,2-dihydroisoquinolin-3-yl)propanoic acid (100 mg, 0.42 mmol) and 6-(3,8-diazabicyclo[3.2.1]octan-3-yl)nicotinonitrile 2HCl (165 mg, 0.51 mmol) in DMF (2 mL), HBTU (243 mg, 0.64 mmol) was added. TEA (0.18 mL, 1.3 mmol) was added dropwise and stirred at room temperature for 15 hours. The reaction solution was diluted with EtOAc and washed with water. The organic solvent was dried over MgSO₄, filtered, and then concentrated by evaporation under reduced pressure, and the resulting residue was purified using silica gel chromatography to obtain the target compound, 6-(8-(3-(8-fluoro-1-oxo-1,2-dihydroisoquinolin-3-yl)propanoyl)-3,8-diazabicyclo[3.2.1]octan-3-yl)nicotinonitrile (30 mg, 16%).
¹H NMR (300 MHz, DMSO-d₆) δ 11.25 (br, 1H), 8.43 (d, 1H, J=1.8 Hz), 7.87-7.86 (m, 1H), 7.61-7.54 (m, 1H), 7.30 (d, 1H, J=7.8 Hz), 7.09-7.03 (m, 1H), 6.83 (d, 1H, J=9.0 Hz), 6.38 (s, 1H), 4.64 (m, 1H), 4.50 (m, 1H), 4.12-4.10 (m, 2H), 3.02-2.94 (m, 2H), 2.75 (m, 4H), 1.91-1.58 (m, 4H).

<Example 207> Preparation of 6-(8-(3-(8-fluoro-5-methyl-1-oxo-1,2-dihydroisoquinolin-3-yl)propanoyl)-3,8-diazabicyclo[3.2.1]octan-3-yl)nicotinonitrile

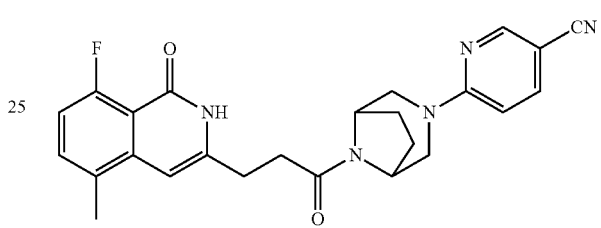

The target compound was obtained according to Example 206, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 206.
¹H NMR (300 MHz, CDCl₃) δ 10.99 (br, 1H), 8.36 (d, 1H, J=1.8 Hz), 7.63-7.59 (m, 1H), 7.35-7.31 (m, 1H), 6.87-6.80 (m, 1H), 6.49 (d, 1H, J=8.7 Hz), 6.37 (s, 1H), 4.92 (m, 1H), 4.39 (m, 1H), 4.18 (d, 1H, J=11.7 Hz), 3.93 (d, 1H, J=12.3 Hz), 3.22 (d, 1H, J=12.0 Hz), 3.01-2.99 (m, 3H), 2.89-2.87 (m, 2H), 2.42 (s, 3H), 1.99-1.94 (m, 2H), 1.85-1.73 (m, 2H).

<Example 208> Preparation of 8-fluoro-3-(3-(3-(4-fluorophenyl)-3,8-diazabicyclo[3.2.1]octan-8-yl)-3-oxopropyl)-5-methylisoquinolin-1(2H)-one

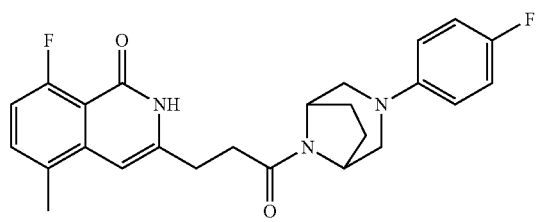 [SMILES: Cc1ccc(F)c2c(=O)[nH]c(CCC(=O)N3C4CCC3CN(c3ccc(F)cc3)C4)cc12]

The target compound was obtained according to Example 206, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 206, and 3-(4-fluorophenyl)-3,8-diazabicyclo[3.2.1]octane 2HCl was used in place of 6-(3,8-diazabicyclo[3.2.1]octan-3-yl)nicotinonitrile 3HCl used in Step 3 of Example 206.

$^1$H NMR (300 MHz, CDCl$_3$) δ 10.95 (br, 1H), 7.34-7.30 (m, 1H), 6.94-6.83 (m, 3H), 6.71-6.66 (m, 2H), 6.35 (s, 1H), 4.88 (m, 1H), 4.32 (m, 1H), 3.34-3.31 (m, 2H), 3.02-2.94 (m, 3H), 2.84-2.77 (m, 3H), 2.41 (s, 3H), 1.94-1.92 (m, 4H).

<Example 209> Preparation of 4-(8-(3-(8-fluoro-5-methyl-1-oxo-1,2-dihydroisoquinolin-3-yl)propanoyl)-3,8-diazabicyclo[3.2.1]octan-3-yl)benzonitrile

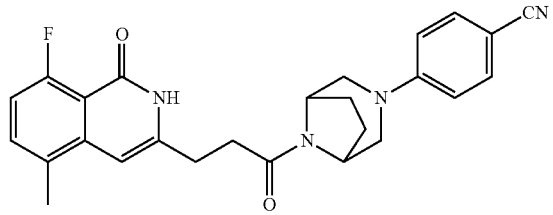 [SMILES: Cc1ccc(F)c2c(=O)[nH]c(CCC(=O)N3C4CCC3CN(c3ccc(C#N)cc3)C4)cc12]

The target compound was obtained according to Example 206, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 206, and 4-(3,8-diazabicyclo[3.2.1]octan-3-yl)benzonitrile 2HCl was used in place of 6-(3,8-diazabicyclo[3.2.1]octan-3-yl)nicotinonitrile 3HCl used in Step 3 of Example 206.

$^1$H NMR (300 MHz, CDCl$_3$) δ 10.91 (br, 1H), 7.47-7.44 (m, 2H), 7.26 (m, 1H), 6.85-6.78 (m, 1H), 6.71-6.69 (m, 2H), 6.37 (s, 1H), 4.92 (m, 1H), 4.39 (m, 1H), 3.53-3.45 (m, 2H), 3.12-2.80 (m, 6H), 2.40 (s, 3H), 2.05-1.81 (m, 4H).

<Example 210> Preparation of 3-(3-(3-(4-chlorophenyl)-3,8-diazabicyclo[3.2.1]octan-8-yl)-3-oxopropyl)-8-fluoro-5-methylisoquinolin-1(2H)-one

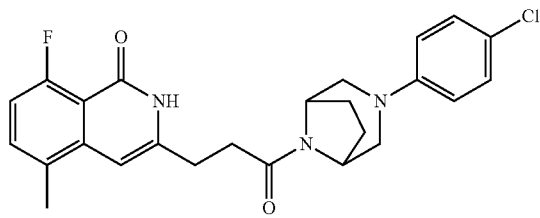 [SMILES: Cc1ccc(F)c2c(=O)[nH]c(CCC(=O)N3C4CCC3CN(c3ccc(Cl)cc3)C4)cc12]

The target compound was obtained according to Example 206, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 206, and 3-(4-chlorophenyl)-3,8-diazabicyclo[3.2.1]octane 2HCl was used in place of 6-(3,8-diazabicyclo[3.2.1]octan-3-yl)nicotinonitrile 3HCl used in Step 3 of Example 206.

$^1$H NMR (300 MHz, DMSO-d$_6$) δ 11.29 (br, 1H), 7.45-7.40 (m, 1H), 7.22-7.19 (m, 2H), 7.00-6.93 (m, 1H), 6.84-6.81 (m, 2H), 6.34 (s, 1H), 4.65 (m, 1H), 4.49 (m, 1H), 3.54-3.46 (m, 2H), 2.82-2.70 (m, 6H), 2.34 (s, 3H), 1.85-1.76 (m, 4H).

<Example 211> Preparation of 8-fluoro-3-(3-(3-(6-fluoropyridin-3-yl)-3,8-diazabicyclo[3.2.1]octan-8-yl)-3-oxopropyl)-5-methylisoquinolin-1(2H)-one

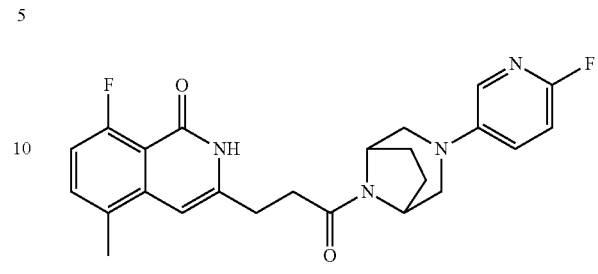

The target compound was obtained according to Example 206, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 206, and 3-(6-fluoropyridin-3-yl)-3,8-diazabicyclo[3.2.1]octane 3HCl was used in place of 6-(3,8-diazabicyclo[3.2.1]octan-3-yl)nicotinonitrile 3HCl used in Step 3 of Example 206.

$^1$H NMR (300 MHz, DMSO-d$_6$) δ 11.28 (br, 1H), 7.67 (s, 1H), 7.41 (m, 2H), 6.97-6.91 (m, 2H), 6.32 (s, 1H), 4.64 (m, 1H), 4.48 (m, 1H), 3.54-3.45 (m, 2H), 2.76-2.71 (m, 6H), 2.32 (s, 3H), 1.87-1.77 (m, 4H).

<Example 212> Preparation of 8-fluoro-3-(3-(3-(5-fluoropyridin-2-yl)-3,8-diazabicyclo[3.2.1]octan-8-yl)-3-oxopropyl)-5-methylisoquinolin-1(2H)-one

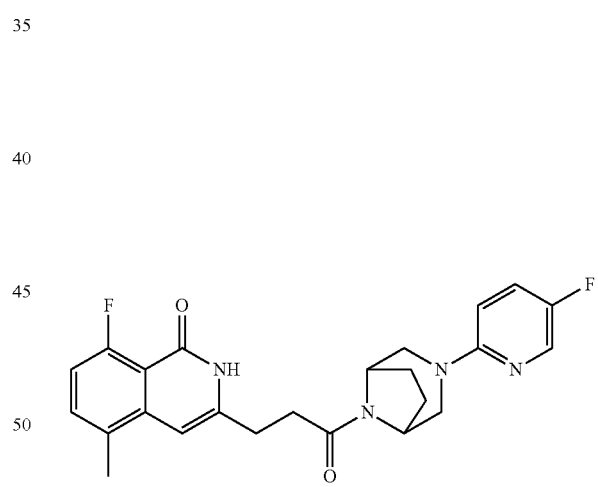

The target compound was obtained according to Example 206, except that 8-fluoro-3-(3-hydroxypropyl)-5-methyl-1H-isochromen-1-one was used in place of 8-fluoro-3-(3-hydroxypropyl)-1H-isochromen-1-one used in Step 1 of Example 206, and 3-(5-fluoropyridin-2-yl)-3,8-diazabicyclo[3.2.1]octane 3HCl was used in place of 6-(3,8-diazabicyclo[3.2.1]octan-3-yl)nicotinonitrile 3HCl used in Step 3 of Example 206.

$^1$H NMR (300 MHz, DMSO-d$_6$) δ 11.30 (br, 1H), 8.07 (d, 1H, J=3.0 Hz), 7.52-7.46 (m, 1H), 7.44-7.39 (m, 1H), 6.99-6.92 (m, 1H), 6.75-6.71 (m, 1H), 6.33 (s, 1H), 4.64 (m, 1H), 4.49 (m, 1H), 3.91-3.83 (m, 2H), 2.86-2.76 (m, 6H), 2.33 (s, 3H), 1.91-1.67 (m, 4H).

\<Example 213\> Preparation of 4-(8-(3-(7-fluoro-5-methyl-1-oxo-1,2-dihydroisoquinolin-3-yl)propanoyl)-3,8-diazabicyclo[3.2.1]octan-3-yl)benzonitrile

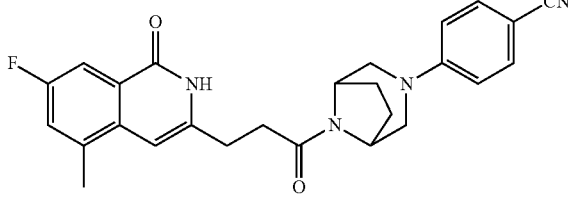

The target compound was obtained according to Example 206, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 206, and 4-(3,8-diazabicyclo[3.2.1]octan-3-yl)benzonitrile 2HCl was used in place of 6-(3,8-diazabicyclo[3.2.1]octan-3-yl)nicotinonitrile 3HCl used in Step 3 of Example 206.

$^1$H NMR (300 MHz, DMSO-$d_6$) δ 11.41 (br, 1H), 7.60-7.54 (m, 3H), 7.35 (d, 1H, J=9.9 Hz), 6.88-6.85 (m, 2H), 6.39 (s, 1H), 4.65 (m, 1H), 4.49 (m, 1H), 3.65-3.62 (m, 2H), 2.83-2.78 (m, 6H), 2.42 (s, 3H), 1.89-1.73 (m, 4H).

\<Example 214\> Preparation of 6-(8-(3-(7-fluoro-5-methyl-1-oxo-1,2-yl)nicotinonitrile

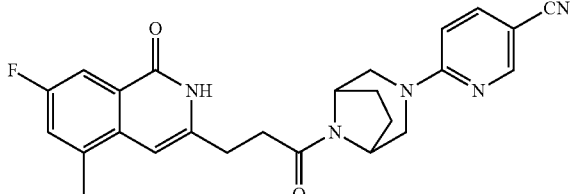

The target compound was obtained according to Example 206, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 206.

$^1$H NMR (300 MHz, CDCl$_3$) δ 10.64 (br, 1H), 8.38 (s, 1H), 7.81 (d, 1H, J=6.9 Hz), 7.63 (d, 1H, J=8.7 Hz), 7.18 (d, 1H, J=10.2 Hz), 6.52 (d, 1H, J=9.0 Hz), 6.37 (s, 1H), 4.94 (m, 1H), 4.31-4.23 (m, 2H), 3.94-3.90 (m, 1H), 3.26-3.22 (m, 1H), 3.00-2.98 (m, 3H), 2.81 (m, 2H), 2.50 (s, 3H), 1.98 (m, 2H), 1.87-1.71 (m, 2H).

\<Example 215\> Preparation of 7-fluoro-3-(3-(3-(4-fluorophenyl)-3,8-diazabicyclo[3.2.1]octan-8-yl)-3-oxopropyl)-5-methylisoquinolin-1(2H)-one

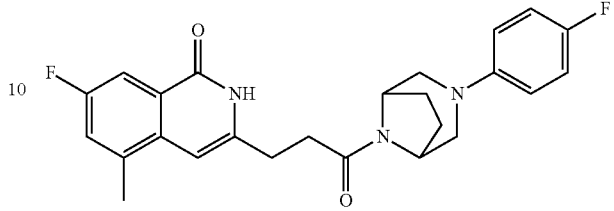

The target compound was obtained according to Example 206, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 206, and 3-(4-fluorophenyl)-3,8-diazabicyclo[3.2.1]octane 2HCl was used in place of 6-(3,8-diazabicyclo[3.2.1]octan-3-yl)nicotinonitrile 3HCl used in Step 3 of Example 206.

$^1$H NMR (300 MHz, DMSO-$d_6$) δ 11.43 (br, 1H), 7.61 (d, 1H, J=9.9 Hz), 7.39 (d, 1H, J=9.9 Hz), 7.03-6.98 (m, 2H), 6.80 (m, 2H), 6.41 (s, 1H), 4.63 (m, 1H), 4.46 (m, 1H), 3.46-3.38 (m, 2H), 2.77-2.64 (m, 6H), 2.43 (s, 3H), 1.86-1.76 (m, 4H).

\<Example 216\> Preparation of 3-(3-(3-(4-chlorophenyl)-3,8-diazabicyclo[3.2.1]octan-8-yl)-3-oxopropyl)-7-fluoro-5-methylisoquinolin-1(2H)-one

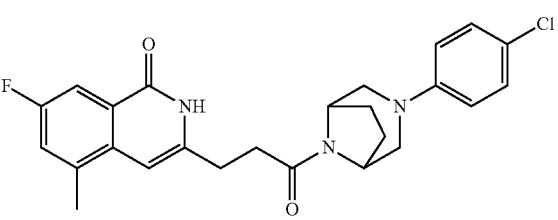

The target compound was obtained according to Example 206, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 206, and 3-(4-chlorophenyl)-3,8-diazabicyclo[3.2.1]octane 2HCl was used in place of 6-(3,8-diazabicyclo[3.2.1]octan-3-yl)nicotinonitrile 3HCl used in Step 3 of Example 206.

$^1$H NMR (300 MHz, DMSO-$d_6$) δ 11.41 (br, 1H), 7.61 (d, 1H, J=9.0 Hz), 7.37 (d, 1H, J=9.3 Hz), 7.20-7.17 (m, 2H), 6.81-6.78 (m, 2H), 6.40 (s, 1H), 4.63 (m, 1H), 4.47 (m, 1H), 3.47 (m, 2H), 2.77-2.67 (m, 6H), 2.42 (s, 3H), 1.81-1.76 (m, 4H).

<Example 217> Preparation of 7-fluoro-3-(3-(3-(6-fluoropyridin-3-yl)-3,8-diazabicyclo[3.2.1]octan-8-yl)-3-oxopropyl)-5-methylisoquinolin-1(2H)-one

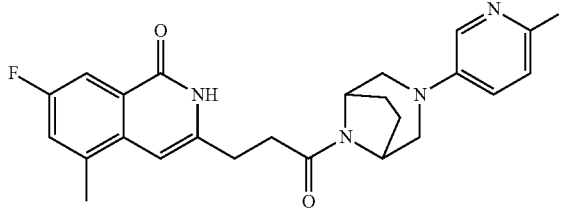

The target compound was obtained according to Example 206, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 206, and 3-(6-fluoropyridin-3-yl)-3,8-diazabicyclo[3.2.1]octane 3HCl was used in place of 6-(3,8-diazabicyclo[3.2.1]octan-3-yl)nicotinonitrile 3HCl used in Step 3 of Example 206.

$^1$H NMR (300 MHz, DMSO-$d_6$) δ 11.41 (br, 1H), 7.64 (s, 1H), 7.60-7.57 (m, 1H), 7.41-7.34 (m, 2H), 6.98-6.95 (m, 1H), 6.39 (s, 1H), 4.63 (m, 1H), 4.47 (m, 1H), 3.51-3.44 (m, 2H), 2.89-2.64 (m, 6H), 2.42 (s, 3H), 1.85-1.76 (m, 4H).

<Example 218> Preparation of 6-(8-(3-(7-fluoro-5-methyl-1-oxo-1,2-dihydroisoquinolin-3-yl)propanoyl)-3,8-diazabicyclo[3.2.1]octan-3-yl)nicotinonitrile

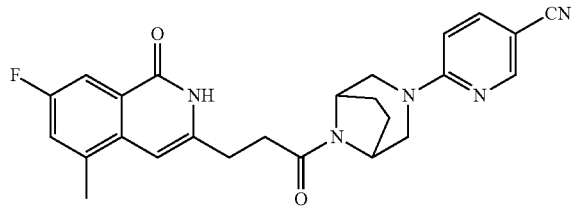

The target compound was obtained according to Example 206, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 206.

$^1$H NMR (300 MHz, DMSO-$d_6$) δ 11.44 (br, 1H), 8.47 (s, 1H), 7.88-7.84 (m, 1H), 7.62-7.59 (m, 1H), 7.39-7.37 (m, 1H), 6.80 (d, 1H, J=9.3 Hz), 6.41 (s, 1H), 4.65 (m, 1H), 4.50 (m, 1H), 4.12-4.08 (m, 2H), 2.95-2.91 (m, 2H), 2.79 (m, 4H), 2.43 (s, 3H), 1.91-1.58 (m, 4H).

<Example 219> Preparation of 7-fluoro-3-(3-(3-(5-fluoropyridin-2-yl)-3,8-diazabicyclo[3.2.1]octan-8-yl)-3-oxopropyl)-5-methylisoquinolin-1(2H)-one

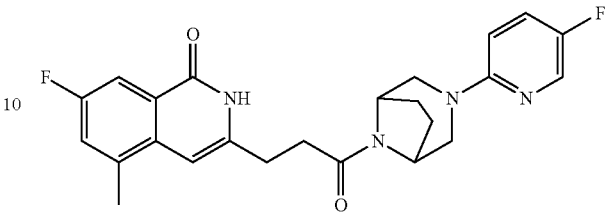

The target compound was obtained according to Example 206, except that 7-fluoro-3-(3-hydroxypropyl)-5-methyl-1H-isochromen-1-one was used in place of 8-fluoro-3-(3-hydroxypropyl)-1H-isochromen-1-one used in Step 1 of Example 206, and 3-(5-fluoropyridin-2-yl)-3,8-diazabicyclo[3.2.1]octane 3HCl was used in place of 6-(3,8-diazabicyclo[3.2.1]octan-3-yl)nicotinonitrile 3HCl used in Step 3 of Example 206.

$^1$H NMR (300 MHz, DMSO-$d_6$) δ 11.44 (br, 1H), 8.06 (d, 1H, J=3.0 Hz), 7.61 (d, 1H, J=9.3 Hz), 7.52-7.46 (m, 1H), 7.38 (d, 1H, J=9.3 Hz), 6.72-6.69 (m, 1H), 6.41 (s, 1H), 4.64 (m, 1H), 4.50-4.48 (m, 1H), 3.88-3.82 (m, 2H), 2.81-2.76 (m, 6H), 2.42 (s, 3H), 1.90-1.66 (m, 4H).

<Example 220> Preparation of 6-(8-(3-(7-fluoro-1-oxo-1,2-dihydroisoquinolin-3-yl)propanoyl)3,8-diazabicyclo[3.2.1]octan-3-yl)nicotinonitrile

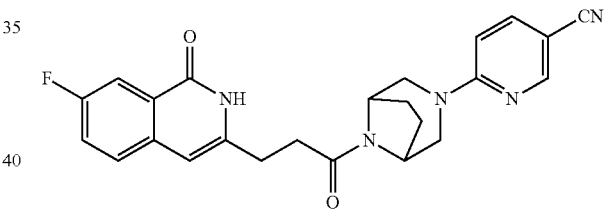

The target compound was obtained according to Example 206, except that 7-fluoro-3-(3-hydroxypropyl)-1H-isochromen-1-one was used in place of 8-fluoro-3-(3-hydroxypropyl)-1H-isochromen-1-one used in Step 1 of Example 206.

$^1$H NMR (300 MHz, DMSO-$d_6$) δ 11.40 (br, 1H), 8.47 (d, 1H, J=2.1 Hz), 7.88-7.84 (m, 1H), 7.76-7.72 (m, 1H), 7.64-7.59 (m, 1H), 7.53-7.47 (m, 1H), 6.80 (d, 1H, J=9.3), 6.42 (s, 1H), 4.65 (m, 1H), 4.51-4.49 (m, 1H), 4.11-4.08 (m, 2H), 2.96-2.92 (m, 2H), 2.76 (m, 4H), 1.88-1.58 (m, 4H).

<Example 221> Synthesis of 4-(4-(3-(5-oxo-5,6-dihydro-1,6-naphthyridin-7-yl)propyl)piperazin-1-yl)benzonitrile

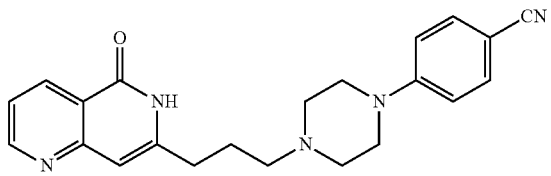 [SMILES: N#Cc1ccc(N2CCN(CCCc3cc4ncccc4c(=O)[nH]3)CC2)cc1]

Step 1: Preparation of tert-butyl 4-(4-cyanophenyl)piperazin-1-carboxylate

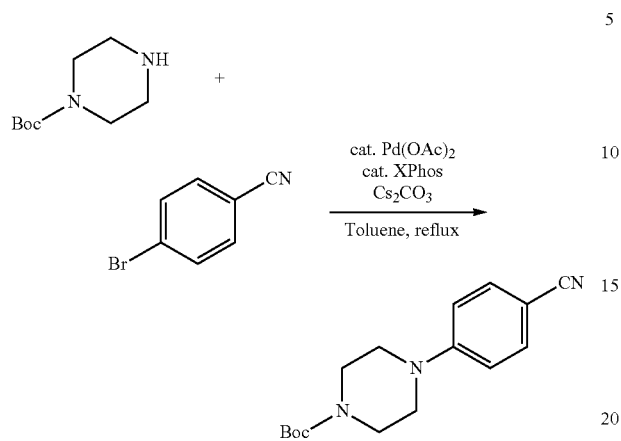

After dissolving tert-butyl piperazin-1-carboxylate (70.0 g, 0.38 mol), and 4-bromobenzonitrile (82 g, 0.45 mol) in toluene (1.5 L), Pd(OAc)$_2$ (8.4 g, 0.04 mol), XPhos (9.0 g, 0.02 mol), and Cs$_2$CO$_3$ (147 g, 0.45 mol) were added. The mixture was stirred at 100° C. for 15 hours and cooled to room temperature. The reaction solution was diluted with EtOAc and washed with water. The organic solvent was dried over MgSO$_4$, filtered, and then concentrated by evaporation under reduced pressure, and the resulting residue was purified using silica gel chromatography to obtain the target compound, tert-butyl 4-(4-cyanophenyl)piperazin-1-carboxylate (90 g, 83%).

$^1$H NMR (300 MHz, CDCl$_3$) δ 7.53-7.50 (m, 2H), 6.87-6.85 (m, 2H), 3.60-3.57 (m, 4H), 3.33-3.29 (m, 4H), 1.49 (s, 9H).

Step 2: Preparation of 4-(piperazin-1-yl)benzonitrile 2HCl

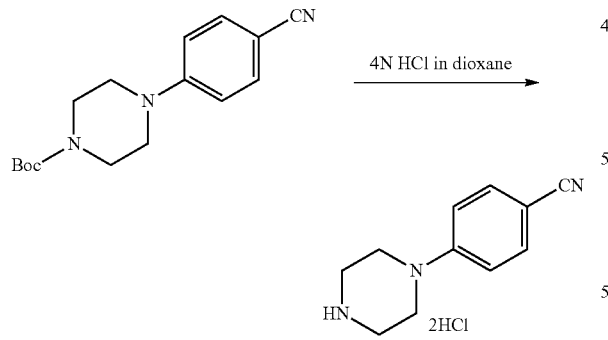

4 N HCl/dioxane (1400 mL) was added to tert-butyl 4-(4-cyanophenyl)piperazin-1-carboxylate (80 g, 0.28 mol), and the mixture was stirred for 15 hours. The solid produced during the reaction was filtered and washed with EtOAc to obtain the target compound, 4-(piperazin-1-yl)benzonitrile 2HCl (72 g, 100%).

$^1$H NMR (300 MHz, DMSO-d$_6$) δ 9.46 (br, 1H), 7.67-7.64 (m, 2H), 7.11-7.08 (m, 2H), 3.61-3.59 (m, 4H), 3.19 (m, 4H).

Step 3: Preparation of methyl 2-bromonicotinate

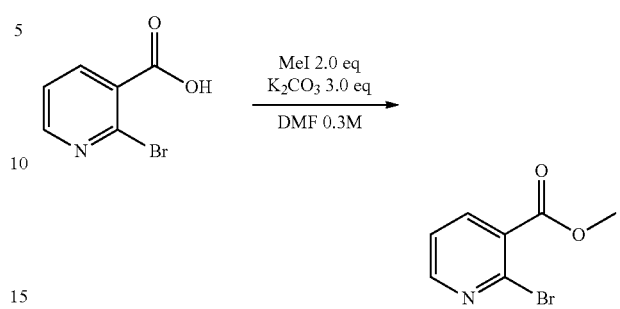

After dissolving 2-bromonicotinic acid (10 g, 49.5 mmol) in DMF (165 mL), K$_2$CO$_3$ (20.5 g, 148.5 mmol) was added at 0° C. and stirred for 30 minutes. MeI (14.1 g, 99.0 mmol) was slowly added dropwise to the reaction solution at 0° C., followed by stirring at room temperature for 15 hours. The reaction solution was diluted with EtOAc and washed with a Na$_2$S$_2$O$_3$ aqueous solution and an NH$_4$C aqueous solution. The organic solvent was dried over MgSO$_4$, filtered, and then concentrated by evaporation under reduced pressure to obtain the target compound, methyl 2-bromonicotinate (9.65 g, 90%).

$^1$H NMR (300 MHz, CDCl$_3$) δ 8.49-8.47 (m, 1H), 8.09-8.06 (m, 1H), 7.37-7.33 (m, 1H), 3.96 (s, 3H).

Step 4: Preparation of methyl 2-(5-hydroxypent-1-yn-1-yl)nicotinate

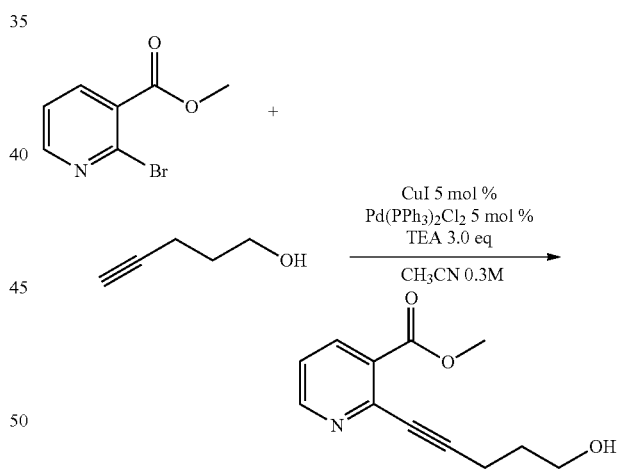

After dissolving methyl 2-bromonicotinate (9.65 g, 44.67 mmol) in CH$_3$CN (220 L), 4-pentyn-1-ol (4.51 g, 53.60 mmol), Pd(PPh$_3$)$_2$Cl$_2$ (1.57 g, 2.23 mmol), and CuI (425 mg, 2.23 mmol) were added. TEA (13.56 g, 134.01 mmol) was added dropwise and stirred at 80° C. for 15 hours. The mixture was cooled to room temperature and filtered through celite, and the filtrate was concentrated by evaporation under reduced pressure. The concentrate was diluted with EtOAc and washed with an NH$_4$Cl aqueous solution. The organic solvent was dried over MgSO$_4$, filtered, and then concentrated by evaporation under reduced pressure, and the resulting residue was purified using silica gel chromatography to obtain the target compound, methyl 2-(5-hydroxypent-1-yn-1-yl)nicotinate (8.0 g, 82%).

¹H NMR (300 MHz, CDCl₃) δ 8.68-8.66 (m, 1H), 8.22-8.19 (m, 1H), 7.30-7.27 (m, 1H), 3.94 (s, 3H), 3.88-3.86 (m, 2H), 2.69-2.65 (m, 2H), 2.17 (br, 1H), 1.96-1.90 (m, 2H).

Step 5: Preparation of 7-(3-hydroxypropyl)-5H-pyrano[4,3-b]pyridin-5-one

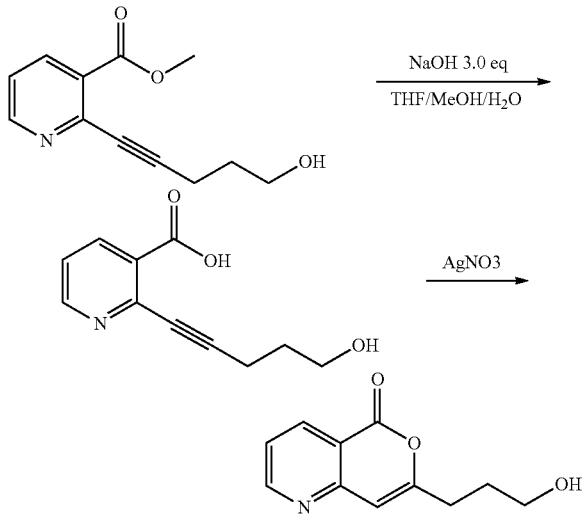

After dissolving methyl 2-(5-hydroxypent-1-yn-1-yl)nicotinate (8.0 g, 36.49 mmol) in THF/MeOH/water (100 mL/25 mL/25 mL), LiOH·H₂O (7.66 g, 182.45 mmol) was added, and the mixture was stirred at room temperature for 15 hours. The reaction solution was concentrated by distillation under reduced pressure and then diluted with EtOAc, and 6 N HCl was slowly added dropwise. The organic solvent was dried over MgSO₄, filtered, and then concentrated by evaporation under reduced pressure. After dissolving the concentrated reaction solution in acetone (25 mL), AgNO₃ (312 mg) was added. The reaction solution was stirred at room temperature for 15 hours, and then distilled under reduced pressure to remove the solvent. The reaction solution was diluted with EtOAc and washed with water. The organic solvent was dried over MgSO₄, filtered, and then concentrated by evaporation under reduced pressure, and the resulting residue was purified using silica gel chromatography to obtain the target compound, 7-(3-hydroxypropyl)-5H-pyrano[4,3-b]pyridin-5-one (300 mg, 4%).

¹H NMR (300 MHz, DMSO-d₆) δ 8.94-8.92 (m, 1H), 8.45-8.42 (m, 1H), 7.57-7.53 (m, 1H), 6.67 (s, 1H), 4.59-4.56 (m, 1H), 3.51-3.45 (m, 2H), 2.65-2.60 (m, 2H), 1.84-1.77 (m, 2H).

Step 6: Preparation of 3-(5-oxo-5H-pyrano[4,3-b]pyridin-7-yl)propyl methanesulfonate

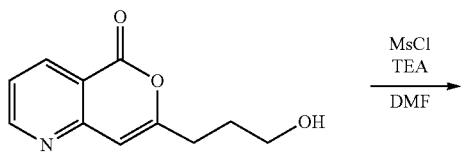

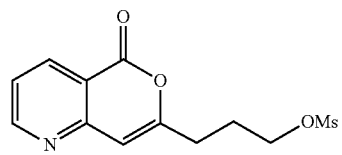

After dissolving 7-(3-hydroxypropyl)-5H-pyrano[4,3-b]pyridin-5-one (300 mg, 1.46 mmol) in DMF (7 mL), MsCl (217 mg, 1.90 mmol) was added dropwise at 0° C. and stirred for 30 minutes. TEA (2.21 g, 2.19 mmol) was added dropwise at 0° C., followed by stirring at room temperature for 15 hours. The reaction solution was diluted with EtOAc and washed with water. The organic solvent was dried over MgSO₄, filtered, and then concentrated by evaporation under reduced pressure, and the resulting residue was purified using silica gel chromatography to obtain the target compound, 3-(5-oxo-5H-pyrano[4,3-b]pyridin-7-yl)propyl methanesulfonate (150 mg, 36%).

¹H NMR (300 MHz, DMSO-d₆) δ 8.95-8.93 (m, 1H), 8.45-8.43 (m, 1H), 7.58-7.54 (m, 1H), 6.72 (s, 1H), 4.32-4.27 (m, 2H), 3.19 (s, 3H), 2.74-2.68 (m, 2H), 2.08-2.04 (m, 2H).

Step 7: Preparation of 4-(4-(3-(5-oxo-5H-pyrano[4,3-b]pyridin-7-yl)propyl)piperazin-1-yl)benzonitrile

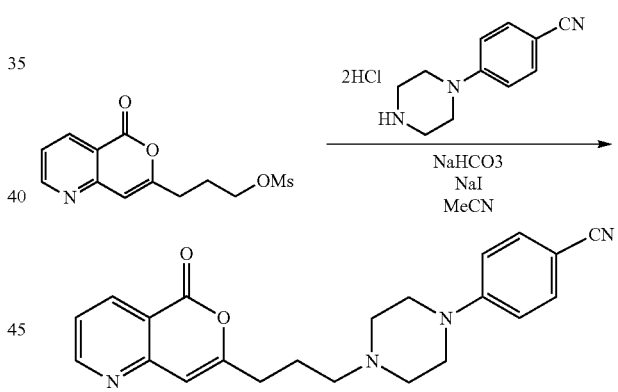

After dissolving 3-(5-oxo-5H-pyrano[4,3-b]pyridin-7-yl)propyl methanesulfonate (150 mg, 0.53 mmol) in CH₃CN (11 mL), 4-(piperazin-1-yl)benzonitrile 2HCl (223 mg, 0.8 mmol), NaHCO₃ (223 mg, 2.65 mmol), and NaI (159 mg, 1.06 mmol) were added. The mixture was stirred at 80° C. for 15 hours. The reaction solution was diluted with EtOAc and washed with water. The organic solvent was dried over MgSO₄, filtered, and then concentrated by evaporation under reduced pressure, and the resulting residue was purified using silica gel chromatography to obtain the target compound, 4-(4-(3-(5-oxo-5H-pyrano[4,3-b]pyridin-7-yl)propyl)piperazin-1-yl)benzonitrile (160 mg, 81%).

¹H NMR (300 MHz, DMSO-d₆) δ 8.94-8.92 (m, 1H), 8.44-8.41 (m, 1H), 7.57-7.53 (m, 2H), 7.01-6.98 (m, 2H), 6.69 (s, 1H), 3.32-3.19 (m, 4H), 2.66-2.38 (m, 6H), 1.87-1.82 (m, 2H).

Step 8: Preparation of 4-(4-(3-(5-oxo-5,6-dihydro-1,6-naphthyridin-7-yl)propyl)piperazin-1-yl)benzonitrile

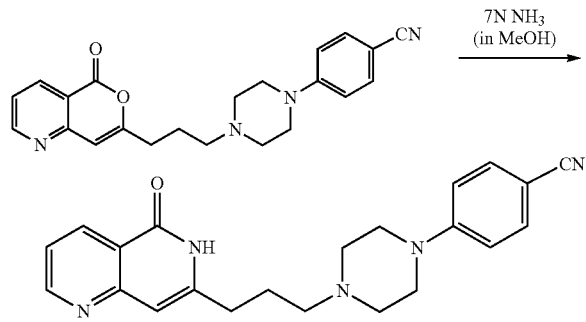

After dissolving 4-(4-(3-(5-oxo-5H-pyrano[4,3-b]pyridin-7-yl)propyl)piperazin-1-yl)benzonitrile (160 g, 0.43 mmol) in 7 N NH₃/MeOH (20 mL), the mixture was stirred at 80° C. for 15 hours. The reaction solution was cooled to room temperature, and then the thus-obtained product was concentrated by evaporation under reduced pressure. The resulting solid was recrystallized with MeOH to obtain the target compound, 4-(4-(3-(5-oxo-5,6-dihydro-1,6-naphthyridin-7-yl)propyl)piperazin-1-yl)benzonitrile (121 mg, 75%).

$^1$H NMR (300 MHz, CDCl₃) δ 8.86-8.84 (m, 1H), 8.56-8.54 (m, 1H), 7.52-7.49 (m, 2H), 7.34-7.30 (m, 1H), 6.91-6.88 (m, 2H), 6.53 (s, 1H), 3.59-3.57 (m, 4H), 2.81-2.72 (m, 6H), 2.58-2.54 (m, 2H), 1.96-1.95 (m, 2H).

<Example 222> Synthesis of 6-(4-(3-(5-oxo-5,6-dihydro-1,6-naphthyridin-7-yl)propyl)piperazin-1-yl)nicotinonitrile

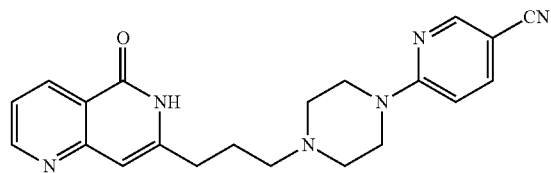 [SMILES: N#Cc1ccc(N2CCN(CCCc3cc4ncccc4c(=O)[nH]3)CC2)nc1]

Step 1: Preparation of 7-(3-hydroxypropyl)-5H-pyrano[4,3-b]pyridin-5-one

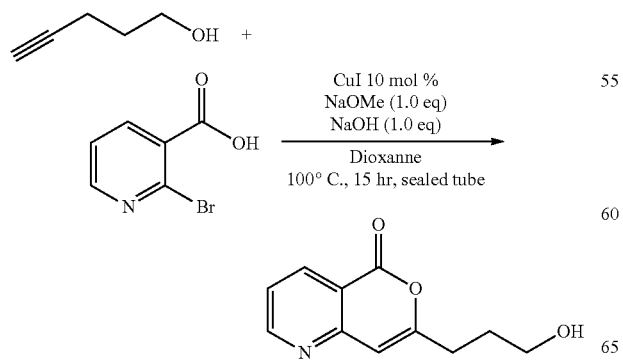

After dissolving pent-4-yn-1-ol (5.0 g, 59.44 mmol) in 1,4-dioxane (1.2 L), 2-bromonicotinic acid (16 g, 65.38 mmol), CuI (1.13 g, 5.94 mmol), MeONa (3.21 g, 59.44 mmol), and NaOH (2.38 g, 59.44 mmol) were added. The reaction solution was stirred at 100° C. for 48 hours and filtered through celite, and the filtrate was concentrated by evaporation under reduced pressure. The concentrate was diluted with EtOAc and washed with an NH₄C aqueous solution. The organic solvent was dried over MgSO₄, filtered, and then concentrated by evaporation under reduced pressure, and the resulting solid was recrystallized with EtOAc to obtain the target compound, 7-(3-hydroxypropyl)-5H-pyrano[4,3-b]pyridin-5-one (2.1 g, 17%).

$^1$H NMR (300 MHz, DMSO-d₆) δ 8.94-8.92 (m, 1H), 8.45-8.42 (m, 1H), 7.57-7.53 (m, 1H), 6.67 (s, 1H), 4.59-4.56 (m, 1H), 3.51-3.45 (m, 2H), 2.65-2.60 (m, 2H), 1.84-1.77 (m, 2H).

Step 2: Preparation of 7-(3-hydroxypropyl)-1,6-naphthyridin-5(6H)-one

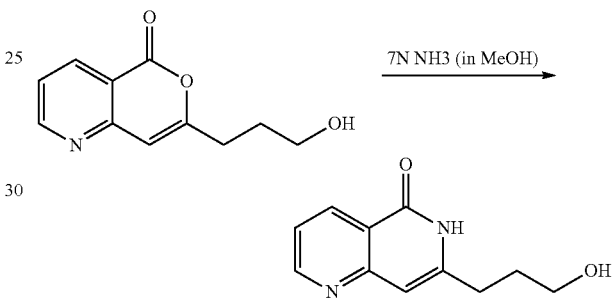

After dissolving 7-(3-hydroxypropyl)-5H-pyrano[4,3-b]pyridin-5-one (2.1 g, 10.23 mmol) in 7 N NH₃/MeOH (1000 mL), the mixture was stirred at 80° C. for 15 hours. The reaction solution was cooled to room temperature, and then the thus-obtained product was concentrated by evaporation under reduced pressure. The resulting solid was recrystallized with MeOH to obtain the target compound, 7-(3-hydroxypropyl)-1,6-naphthyridin-5(6H)-one (1.0 g, 48%).

$^1$H NMR (300 MHz, DMSO-d₆) δ 11.54 (s, 1H), 8.87-8.86 (m, 1H), 8.43-8.41 (m, 1H), 7.43-7.42 (m, 1H), 6.46 (s, 1H), 4.59-4.57 (m, 1H), 3.45-3.43 (m, 2H), 2.60-2.50 (m, 2H), 1.81-1.76 (m, 2H).

Step 3: Preparation of 3-(5-oxo-5,6-dihydro-1,6-naphthyridin-7-yl)propyl methanesulfonate

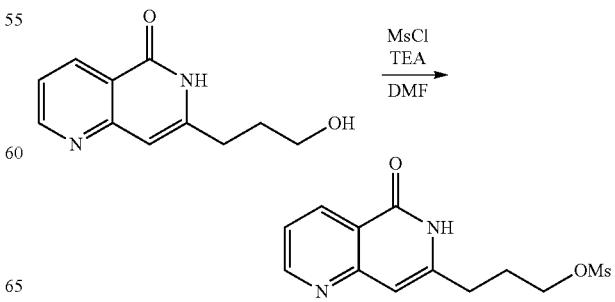

After dissolving 7-(3-hydroxypropyl)-1,6-naphthyridin-5 (6H)-one (420 mg, 2.06 mmol) in DMF (10 mL), MsCl (0.366 mL, 4.74 mmol) was added dropwise at 0° C. and stirred for 30 minutes. TEA (1.1 mL, 8.24 mmol) was added dropwise at 0° C., followed by stirring at room temperature for 15 hours. The reaction solution was diluted with EtOAc and washed with water. The organic solvent was dried over MgSO$_4$, filtered, and then concentrated by evaporation under reduced pressure, and the resulting solid was recrystallized with MeOH to obtain the target compound, 3-(5-oxo-5,6-dihydro-1,6-naphthyridin-7-yl)propyl methanesulfonate (53 mg, 9%).

$^1$H NMR (300 MHz, DMSO-d$_6$) δ 11.60 (s, 1H), 8.87-8.86 (m, 1H), 8.45-8.43 (m, 1H), 7.43-7.72 (m, 1H), 6.49 (s, 1H), 4.27-4.25 (m, 2H), 3.19 (s, 3H), 2.68-2.63 (m, 2H), 2.09-2.05 (m, 2H).

Step 4: Preparation of 6-(4-(3-(5-oxo-5,6-dihydro-1, 6-naphthyridin-7-yl)propyl)piperazin-1-yl)nicotinonitrile

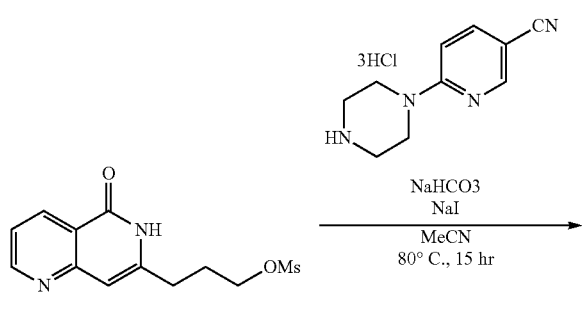

After dissolving 3-(5-oxo-5,6-dihydro-1,6-naphthyridin-7-yl)propyl methanesulfonate (50 mg, 0.177 mmol) in CH$_3$CN (5 mL), 6-(piperazin-1-yl)nicotinonitrile 3HCl (69 mg, 0.266 mmol), NaHCO$_3$ (74 mg, 0.885 mmol), and NaI (53 mg, 0.354 mmol) were added. The mixture was stirred at 80° C. for 15 hours. The reaction solution was diluted with EtOAc and washed with water. The organic solvent was dried over MgSO$_4$, filtered, and then concentrated by evaporation under reduced pressure, and the resulting residue was purified using silica gel chromatography to obtain the target compound, 6-(4-(3-(5-oxo-5,6-dihydro-1,6-naphthyridin-7-yl)propyl)piperazin-1-yl)nicotinonitrile (17 mg, 26%).

$^1$H NMR (300 MHz, CDCl$_3$) δ 8.86-8.85 (m, 1H), 8.57-8.55 (m, 1H), 8.41 (s, 1H), 7.64-7.61 (m, 1H), 7.35-7.33 (m, 1H), 6.64-6.61 (m, 1H), 6.55 (s, 1H), 3.96-3.95 (m, 4H), 2.83-2.79 (m, 2H), 2.70-2.68 (m, 4H), 2.58-2.55 (m, 2H), 1.96-1.95 (m, 2H).

<Example 223> Preparation of 7-(3-(4-(4-fluorophenyl)piperazin-1-yl)propyl)-1,6-naphthyridin-5 (6H)-one The target compound was obtained according to Example 222, except that 1-(4-fluorophenyl)piperazine 2HCl was used in place of 6-(piperazin-1-yl)nicotinonitrile 3HCl used in Step 4 of Example 222.

$^1$H NMR (300 MHz, CDCl$_3$) δ 8.85-8.84 (m, 1H), 8.58-8.56 (m, 1H), 7.34-7.31 (m, 1H), 7.00-6.95 (m, 4H), 6.54 (s, 1H), 3.35-3.34 (m, 4H), 2.79-2.76 (m, 6H), 2.57-2.53 (m, 2H), 1.95-1.94 (m, 2H).

<Example 224> Preparation of 7-(3-(4-(3-fluorophenyl)piperazin-1-yl)propyl)-1,6-naphthyridin-5 (6H)-one The target compound was obtained according to Example 222, except that 1-(3-fluorophenyl)piperazine 2HCl was used in place of 6-(piperazin-1-yl)nicotinonitrile 3HCl used in Step 4 of Example 222.

$^1$H NMR (300 MHz, CDCl$_3$) δ 8.85-8.84 (m, 1H), 8.58-8.56 (m, 1H), 7.34-7.18 (m, 2H), 6.73-6.62 (m, 2H), 6.53 (s, 1H), 3.47-3.43 (m, 4H), 2.80-2.74 (m, 6H), 2.57-2.54 (m, 2H), 1.96-1.95 (m, 2H).

<Example 225> Preparation of 4-(8-(3-(5-oxo-5,6-dihydro-1,6-naphthyridin-7-yl)propyl)-3,8-diazabicyclo[3.2.1]octan-3-yl)benzonitrile The target compound was obtained according to Example 222, except that 4-(3,8-diazabicyclo[3.2.1]octan-3-yl)benzonitrile 2HCl was used in place of 6-(piperazin-1-yl)nicotinonitrile 3HCl used in Step 4 of Example 222.

$^1$H NMR (300 MHz, CDCl$_3$) δ 12.01 (br, 1H), 8.86-8.84 (m, 1H), 8.55 (d, 1H, J=7.8 Hz), 7.51-7.48 (m, 2H), 7.34-

7.30 (m, 1H), 6.83-6.80 (m, 2H), 6.53 (s, 1H), 3.50-3.45 (m, 6H), 2.86-2.82 (m, 2H), 2.60-2.58 (m, 2H), 2.09 (m, 2H), 1.94 (m, 2H), 1.82-1.79 (m, 2H).

<Example 226> Preparation of 5-(4-(3-(5-oxo-5,6-dihydro-1,6-naphthyridin-7-yl)propyl)piperazin-1-yl)picolinonitrile

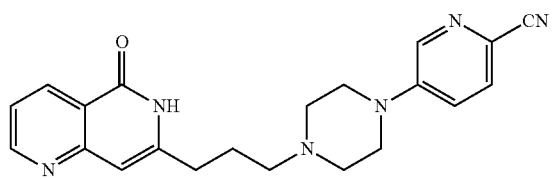 [SMILES: N#Cc1ccc(N2CCN(CCCc3cc4ncccc4c(=O)[nH]3)CC2)cn1]

The target compound was obtained according to Example 222, except that 5-(piperazin-1-yl)picolinonitrile 3HCl was used in place of 6-(piperazin-1-yl)nicotinonitrile 3HCl used in Step 4 of Example 222.

$^1$H NMR (300 MHz, CDCl$_3$) δ 8.87-8.85 (m, 1H), 8.56-8.53 (m, 1H), 8.35 (s, 1H), 7.54-7.52 (m, 1H), 7.35-7.33 (m, 1H), 7.14-7.11 (m, 1H), 6.54 (s, 1H), 3.65-3.64 (m, 4H), 2.76-2.75 (m, 6H), 2.59-2.58 (m, 2H), 1.96-1.95 (m, 2H).

<Example 227> Preparation of 7-(3-(4-(2-fluoro-pyridin-4-yl)piperazin-1-yl)propyl)-1,6-naphthyridin-5(6H)-one

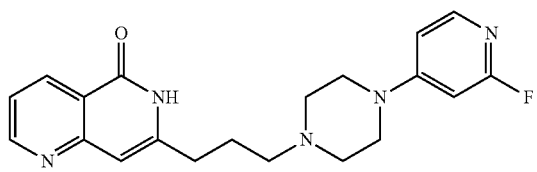 [SMILES: O=c1[nH]c(CCCN2CCN(c3ccnc(F)c3)CC2)cc2ncccc12]

The target compound was obtained according to Example 222, except that 1-(2-fluoropyridin-4-yl)piperazine 3HCl was used in place of 6-(piperazin-1-yl)nicotinonitrile 3HCl used in Step 4 of Example 222.

$^1$H NMR (300 MHz, CDCl$_3$) δ 12.12 (br, 1H), 8.87-8.53 (m, 1H), 8.57 (d, 1H, J=7.8 Hz), 8.00 (d, 1H, J=5.4 Hz), 7.35-7.31 (m, 1H), 6.83 (m, 1H), 6.78-6.77 (m, 1H), 6.54 (s, 1H), 3.81-3.79 (m, 4H), 2.82-2.78 (m, 2H), 2.69 (m, 4H), 2.58-2.54 (m, 2H), 1.96 (m, 2H).

<Example 228> Synthesis of 7-(3-(3-(4-chlorophenyl)-3,8-diazabicyclo[3.2.1]octan-8-yl)propyl)-1,6-naphthyridin-5(6H)-one

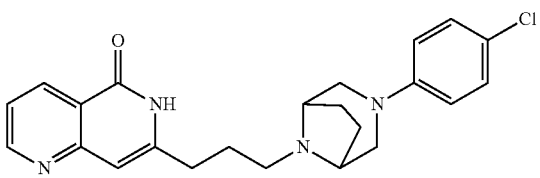 [SMILES: O=c1[nH]c(CCCN2C3CCC2CN(c2ccc(Cl)cc2)C3)cc2ncccc12]

Step 1: Preparation of 7-(3-hydroxypropyl)-5H-pyrano[4,3-b]pyridin-5-one

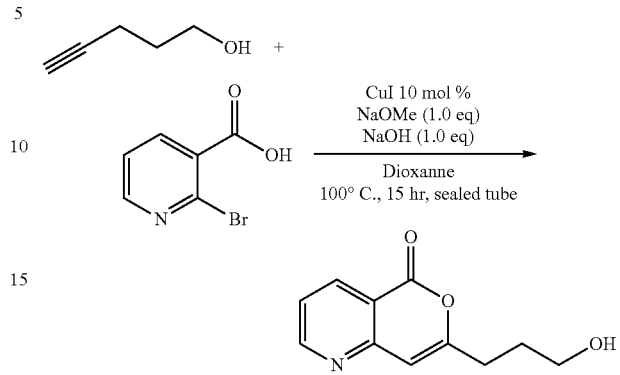

After dissolving pent-4-yn-1-ol (2.52 g, 30 mmol) in dioxane (500 mL), 2-bromonicotinic acid (8.15 g, 33 mmol), CuI (571 mg, 3.0 mmol), MeONa (1.62 mg, 30 mmol), and NaOH (1.2 mg, 30 mmol) were added. The reaction solution was stirred at 100° C. for 15 hours and filtered through celite, and the filtrate was concentrated by evaporation under reduced pressure. The concentrate was diluted with EtOAc and washed with an NH$_4$C aqueous solution. The organic solvent was dried over MgSO$_4$, filtered, and then concentrated by evaporation under reduced pressure, and the resulting solid was recrystallized with EtOAc to obtain the target compound, 7-(3-hydroxypropyl)-5H-pyrano[4,3-b]pyridin-5-one (3.1 g, 50%).

$^1$H NMR (300 MHz, DMSO-d$_6$) δ 8.94-8.92 (m, 1H), 8.45-8.42 (m, 1H), 7.57-7.53 (m, 1H), 6.67 (s, 1H), 4.59-4.56 (m, 1H), 3.51-3.45 (m, 2H), 2.65-2.60 (m, 2H), 1.84-1.77 (m, 2H).

Step 2: Preparation of 3-(5-oxo-5H-pyrano[4,3-b]pyridin-7-yl)propyl methanesulfonate

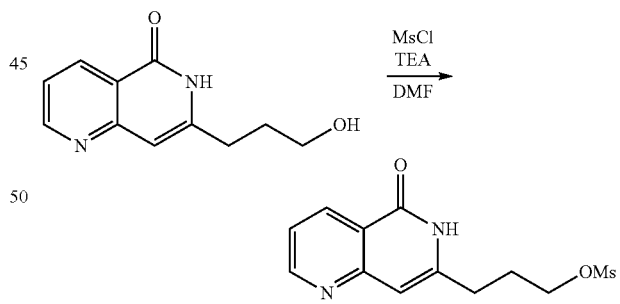

After dissolving 7-(3-hydroxypropyl)-5H-pyrano[4,3-b]pyridin-5-one (3.77 g, 18.37 mmol) in DMF (92 mL), MsCl (4.84 g, 42.25 mmol) was added dropwise at 0° C. and stirred for 30 minutes. TEA (7.44 g, 73.48 mmol) was added dropwise at 0° C., followed by stirring at room temperature for 15 hours. The reaction solution was diluted with EtOAc and washed with water. The organic solvent was dried over MgSO$_4$, filtered, and then concentrated by evaporation under reduced pressure, and the resulting solid was recrystallized with MeOH to obtain the target compound, 3-(5-oxo-5H-pyrano[4,3-b]pyridin-7-yl)propyl methanesulfonate (2.8 g, 55%).

¹H NMR (300 MHz, DMSO-d₆) δ 8.95-8.93 (m, 1H), 8.45-8.43 (m, 1H), 7.58-7.54 (m, 1H), 6.72 (s, 1H), 4.32-4.27 (m, 2H), 3.19 (s, 3H), 2.74-2.68 (m, 2H), 2.08-2.04 (m, 2H).

Step 3: Preparation of 7-(3-(3-(4-chlorophenyl)-3,8-diazabicyclo[3.2.1]octan-8-yl)propyl)-5H-pyrano[4,3-b]pyridin-5-one

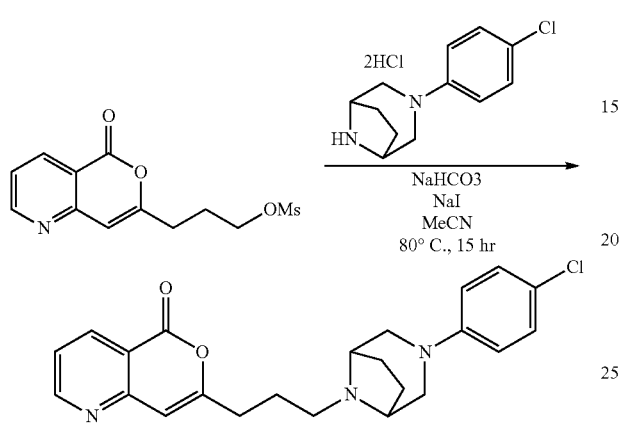

After dissolving 3-(5-oxo-5H-pyrano[4,3-b]pyridin-7-yl)propyl methanesulfonate (100 mg, 0.353 mmol) in CH₃CN (20 mL), 3-(4-chlorophenyl)-3,8-diazabicyclo[3.2.1]octane 2HCl (146 mg, 0.494 mmol), NaHCO₃(148 mg, 1.765 mmol), and NaI (106 mg, 0.706 mmol) were added. The mixture was stirred at 80° C. for 15 hours. The reaction solution was diluted with EtOAc and washed with water. The organic solvent was dried over MgSO₄, filtered, and then concentrated by evaporation under reduced pressure, and the resulting residue was purified using silica gel chromatography to obtain the target compound, 7-(3-(3-(4-chlorophenyl)-3,8-diazabicyclo[3.2.1]octan-8-yl)propyl)-5H-pyrano[4,3-b]pyridin-5-one (78 mg, 54%).

¹H NMR (300 MHz, CDCl₃) δ 8.88-8.86 (m, 1H), 8.48-8.45 (m, 1H), 7.38-7.36 (m, 1H), 7.17-7.13 (m, 2H), 6.68-6.65 (m, 2H), 6.56 (s, 1H), 3.32-3.26 (m, 4H), 2.92-2.89 (m, 2H), 2.74-2.69 (m, 2H), 2.50-2.45 (m, 2H), 1.97-1.90 (m, 4H), 1.74-1.71 (m, 2H).

Step 4: Preparation of 7-(3-(3-(4-chlorophenyl)-3,8-diazabicyclo[3.2.1]octan-8-yl)propyl)-1,6-naphthyridin-5(6H)-one

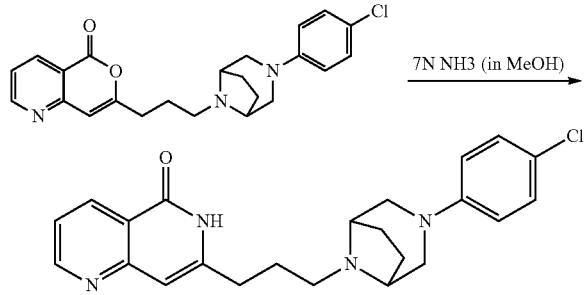

7-(3-(3-(4-Chlorophenyl)-3,8-diazabicyclo[3.2.1]octan-8-yl)propyl)-5H-pyrano[4,3-b]pyridin-5-one (78 mg, 0.198 mmol) was added to 7 N NH₃ (in MeOH, 20 mL), and the mixture was stirred at 80° C. for 15 hours. The mixture was cooled to room temperature and concentrated. The resulting solid was subjected to column chromatography, and then recrystallized with methanol to obtain the target compound, 7-(3-(3-(4-chlorophenyl)-3,8-diazabicyclo[3.2.1]octan-8-yl)propyl)-1,6-naphthyridin-5(6H)-one (34 mg, 44%).

¹H NMR (300 MHz, CDCl₃) δ 8.85-8.84 (m, 1H), 8.56-8.54 (m, 1H), 7.31-7.25 (m, 2H), 7.19-7.16 (m, 2H), 6.77-6.74 (m, 2H), 6.51 (s, 1H), 3.46-3.45 (m, 2H), 3.40-3.29 (m, 4H), 2.82-2.80 (m, 2H), 2.59-2.57 (m, 2H), 2.07-1.84 (m, 6H).

<Example 229> Preparation of 5-(8-(3-(5-oxo-5,6-dihydro-1,6-naphthyridin-7-yl)propyl)-3,8-diazabicyclo[3.2.1]octan-3-yl)picolinonitrile

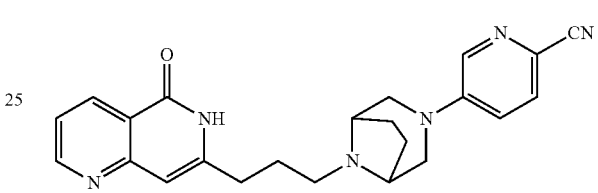

The target compound was obtained according to Example 228, except that 5-(3,8-diazabicyclo[3.2.1]octan-3-yl)picolinonitrile 3HCl was used in place of 3-(4-chlorophenyl)-3,8-diazabicyclo[3.2.1]octane 2HCl used in Step 3 of Example 228.

¹H NMR (300 MHz, CDCl₃) δ 8.85-8.84 (m, 1H), 8.55-8.53 (m, 1H), 8.13-8.12 (m, 1H), 8.04-8.01 (m, 1H), 7.64-7.63 (m, 1H), 7.33-7.28 (m, 1H), 7.11-7.10 (m, 1H), 6.54 (s, 1H), 3.55-3.43 (m, 4H), 2.87-2.83 (m, 2H), 2.60-2.58 (m, 2H), 2.09-2.08 (m, 2H), 1.95-1.94 (m, 2H), 1.84-1.82 (m, 2H), 1.63-1.62 (m, 2H).

<Example 230> Preparation of 7-(3-(3-(4-fluorophenyl)-3,8-diazabicyclo[3.2.1]octan-8-yl)propyl-1,6-naphthyridin-5(6H)-one

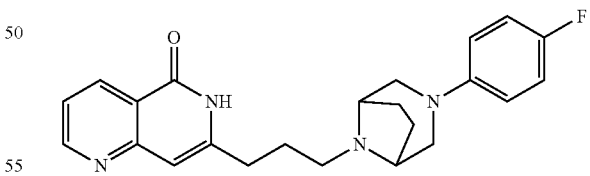

The target compound was obtained according to Example 228, except that 3-(4-fluorophenyl)-3,8-diazabicyclo[3.2.1]octane 2HCl was used in place of 3-(4-chlorophenyl)-3,8-diazabicyclo[3.2.1]octane 2HCl used in Step 3 of Example 228.

¹H NMR (300 MHz, DMSO-d₆) δ 11.68 (br, 1H), 8.85-8.84 (m, 1H), 8.40 (d, 1H, J=7.2 Hz), 7.42-7.37 (m, 1H), 7.03-6.97 (m, 2H), 6.80-6.76 (m, 2H), 6.47 (s, 1H), 3.33-3.27 (m, 4H), 2.82-2.79 (m, 2H), 2.67-2.62 (m, 2H), 2.42-2.37 (m, 2H), 1.84-1.80 (m, 4H), 1.64-1.62 (m, 2H).

<Example 231> Preparation of 7-(3-(3-(5-fluoro-pyridin-2-yl)-3,8-diazabicyclo[3.2.1]octan-8-yl)propyl)-1,6-naphthyridin-5(6H)-one

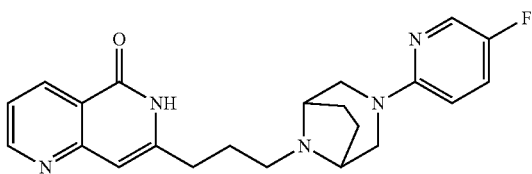 [SMILES: O=c1[nH]c(CCCN2C3CCC2CN(c2ccc(F)cn2)C3)cc2ncccc12]

The target compound was obtained according to Example 228, except that 3-(5-fluoropyridin-2-yl)-3,8-diazabicyclo[3.2.1]octane 3HCl was used in place of 3-(4-chlorophenyl)-3,8-diazabicyclo[3.2.1]octane 2HCl used in Step 3 of Example 228.

$^1$H NMR (300 MHz, DMSO-$d_6$) δ 11.72 (br, 1H), 8.85 (d, 1H, J=4.5 Hz), 8.41 (d, 1H, J=8.4 Hz), 8.06 (d, 1H, J=3.0 Hz), 7.45-7.38 (m, 2H), 6.71-6.67 (m, 1H), 6.47 (s, 1H), 3.70-3.66 (m, 2H), 3.34 (m, 2H), 2.95-2.82 (m, 2H), 2.68-2.63 (m, 2H), 2.43-2.38 (m, 2H), 1.85-1.81 (m, 4H), 1.55-1.53 (m, 2H).

<Example 232> Preparation of 6-(8-(3-(5-oxo-5,6-dihydro-1,6-naphthyridin-7-yl)propyl)-3,8-diazabicyclo[3.2.1]octan-3-yl)nicotinonitrile

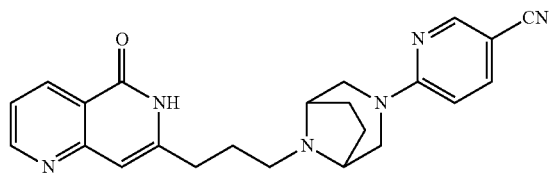 [SMILES: N#Cc1ccc(N2CC3CCC(C2)N3CCCc2cc3ncccc3c(=O)[nH]2)nc1]

The target compound was obtained according to Example 228, except that 6-(3,8-diazabicyclo[3.2.1]octan-3-yl)nicotinonitrile 3HCl was used in place of 3-(4-chlorophenyl)-3,8-diazabicyclo[3.2.1]octane 2HCl used in Step 3 of Example 228.

$^1$H NMR (300 MHz, DMSO-$d_6$) δ 11.72 (br, 1H), 8.85-8.84 (m, 1H), 8.46 (s, 1H), 8.41 (d, 1H, J=7.8 Hz), 7.82 (d, 1H, J=8.7 Hz), 7.41-7.38 (m, 1H), 6.79 (d, 1H, J=8.7 Hz), 6.48 (s, 1H), 3.94-3.91 (m, 2H), 3.36 (m, 2H), 3.09-3.05 (m, 2H), 2.68-2.63 (m, 2H), 2.41-2.39 (m, 2H), 1.84 (m, 4H), 1.48-1.45 (m, 2H).

<Example 233> Preparation of 7-(3-(3-(6-fluoro-pyridin-3-yl)-3,8-diazabicyclo[3.2.1]octan-8-yl)propyl)-1,6-naphthyridin-5(6H)-one

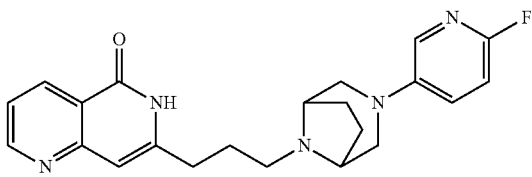 [SMILES: O=c1[nH]c(CCCN2C3CCC2CN(c2ccc(F)nc2)C3)cc2ncccc12]

The target compound was obtained according to Example 228, except that 3-(6-fluoropyridin-3-yl)-3,8-diazabicyclo[3.2.1]octane 3HCl was used in place of 3-(4-chlorophenyl)-3,8-diazabicyclo[3.2.1]octane 2HCl used in Step 3 of Example 228.

$^1$H NMR (300 MHz, CDCl$_3$) δ 8.86-8.84 (m, 1H), 8.57-8.54 (m, 1H), 7.74 (s, 1H), 7.33-7.27 (m, 2H), 6.84-6.81 (m, 1H), 6.53 (s, 1H), 3.49-3.33 (m, 6H), 2.84-2.82 (m, 2H), 2.59-2.57 (m, 2H), 2.07-1.65 (m, 6H).

<Example 234> Preparation of 1'-(3-(5-oxo-5,6-dihydro-1,6-naphthyridin-7-yl)propyl)-1',2',3',6'-tetrahydro-[3,4'-bipyridine]-6-carbonitrile

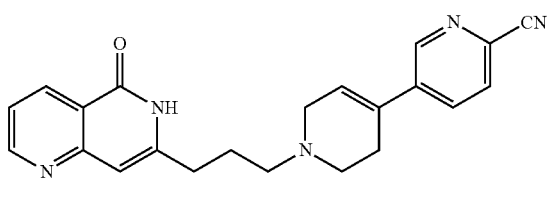 [SMILES: N#Cc1ccc(C2=CCN(CCCc3cc4ncccc4c(=O)[nH]3)CC2)cn1]

Step 1: Preparation of tert-butyl 6-cyano-3',6'-dihydro-[3,4'-bipyridine]-1'(2'H)-carboxylate

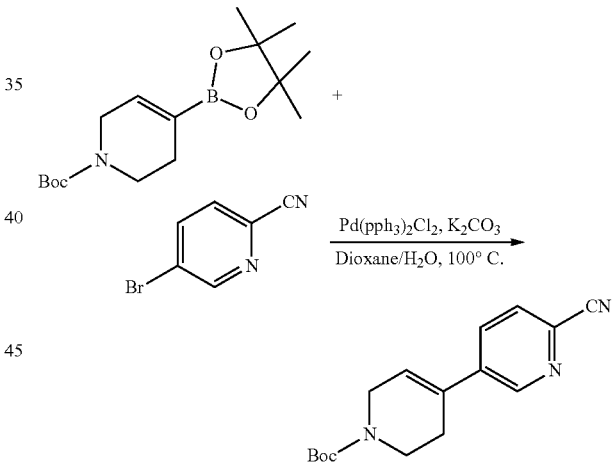

After dissolving tert-butyl 4-(4,4,5,5-tetramethyl-1,3,2-dioxaborolan-2-yl)-3,6-dihydropyridin-1(2H)-carboxylate (2 g, 6.47 mmol) and 5-bromopicolinonitrile (1.42 g, 7.76 mmol) in dioxane (65 mL) and H$_2$O (22 mL), Pd(PPh$_3$)$_4$ (227 mg, 0.32 mmol) and K$_2$CO$_3$ (2.7 g, 19.41 mmol) were added dropwise. The mixture was stirred at 100° C. for 15 hours and cooled to room temperature. The reaction solution was diluted with EtOAc and washed with water. The organic solvent was dried over MgSO$_4$, filtered, and then concentrated by evaporation under reduced pressure, and the resulting residue was purified using silica gel chromatography to obtain the target compound, tert-butyl 6-cyano-3',6'-dihydro-[3,4'-bipyridine]-1'(2'H)-carboxylate (1.25 g, 68%).

$^1$H NMR (300 MHz, CDCl$_3$) δ 8.75 (s, 1H), 7.77 (m, 1H), 7.68 (m, 1H), 6.26 (br, 1H), 4.14 (m, 2H), 3.69-3.65 (m, 2H), 2.53 (m, 2H), 1.49 (s, 9H).

Step 2: Preparation of 1',2',3',6'-tetrahydro[3,4'-bipyridine]-6-carbonitrile 2HCl

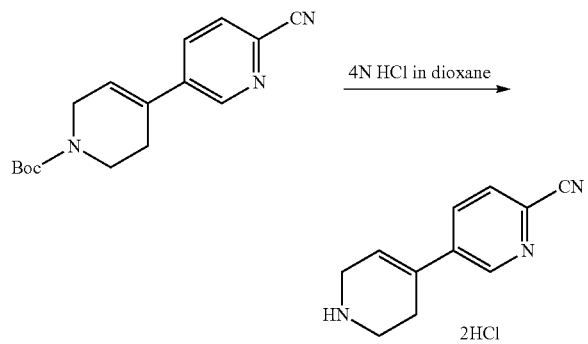

4 N HCl/dioxane (11 mL) was added to tert-butyl 6-cyano-3',6'-dihydro-[3,4'-bipyridine]-1'(2'H)-carboxylate (1.25 g, 4.38 mmol), and the mixture was stirred for 15 hours. The solid produced during the reaction was filtered and washed with EtOAc to obtain the target compound, 1',2',3',6'-tetrahydro-[3,4'-bipyridine]-6-carbonitrile 2HCl (0.76 g, 79%).

$^1$H NMR (300 MHz, DMSO-d$_6$) δ 9.46 (br, 1H), 8.92 (m, 1H), 8.12-8.06 (m, 2H), 6.56 (br, 1H), 3.79 (m, 2H), 3.30 (m, 2H), 2.73 (m, 2H).

Step 3: Preparation of 1'-(3-(5-oxo-5,6-dihydro-1,6-naphthyridin-7-yl)propyl)-1',2',3',6'-tetrahydro-[3,4'-bipyridine]-6-carbonitrile

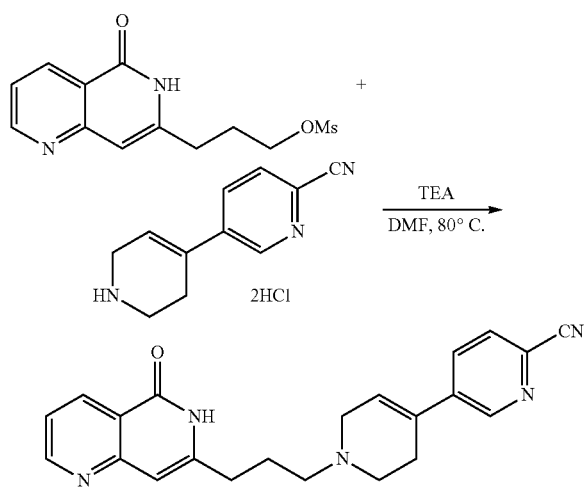

After dissolving 3-(5-oxo-5,6-dihydro-1,6-naphthyridin-7-yl)propyl methanesulfonate (50 mg, 0.177 mmol) in DMF (10 mL), 1',2',3',6'-tetrahydro-[3,4'-bipyridine]-6-carbonitrile 2HCl (69 mg, 0.266 mmol) was added at room temperature. NaHCO$_3$(74 mg, 0.885 mmol) and NaI (53 mg, 0.354 mmol) were added, and the mixture was heated to 80° C. and stirred for 17 hours. The reaction solution was diluted with EtOAc and washed with a Na$_2$S$_2$O$_3$ aqueous solution and an NH$_4$C aqueous solution. The organic solvent was dried over MgSO$_4$, filtered, and then concentrated by evaporation under reduced pressure, and the resulting residue was recrystallized with MeOH to obtain the target compound, 1'-(3-(5-oxo-5,6-dihydro-1,6-naphthyridin-7-yl)propyl)-1',2',3',6'-tetrahydro-[3,4'-bipyridine]-6-carbonitrile (7 mg, 11%).

$^1$H NMR (300 MHz, CDCl$_3$) δ 11.46 (m, 1H), 8.85-8.82 (m, 2H), 8.56-8.54 (m, 1H), 7.88-7.85 (m, 1H), 7.69-7.66 (m, 1H), 7.34-7.29 (m, 1H), 6.53 (s, 1H), 6.32 (s, 1H), 3.33-3.32 (m, 2H), 2.88-2.76 (m, 6H), 2.65-2.61 (m, 2H), 1.98-1.97 (m, 2H).

<Example 235> Preparation of 1'-(3-(5-oxo-5,6-dihydro-1,6-naphthyridin-7-yl)propyl)-1',2',3',6'-tetrahydro-[2,4'-bipyridine]-5-carbonitrile

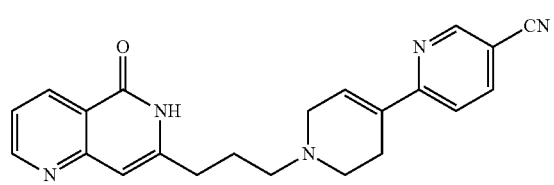 [SMILES: N#Cc1ccc(C2=CCN(CCCc3cc4ncccc4c(=O)[nH]3)CC2)nc1]

The target compound was obtained according to Example 234, except that 6-bromonicotinonitrile was used in place of 5-bromopicolinonitrile used in Step 1 of Example 234.

$^1$H NMR (300 MHz, CDCl$_3$) δ 11.46 (s, 1H), 8.86-8.24 (m, 2H), 8.56-8.54 (m, 1H), 7.93-7.91 (m, 1H), 7.56-7.53 (m, 1H), 7.33-7.32 (m, 1H), 6.93 (s, 1H), 6.53 (s, 1H), 3.38-3.37 (m, 2H), 2.89-2.88 (m, 4H), 2.79-2.75 (m, 2H), 2.65-2.61 (m, 2H), 2.01-1.99 (m, 2H).

<Example 236> Preparation of 7-(3-(4-(4-fluorophenyl)-3,6-dihydropyridin-1(2H)-yl)propyl)-1,6-naphthyridin-5(6H)-one

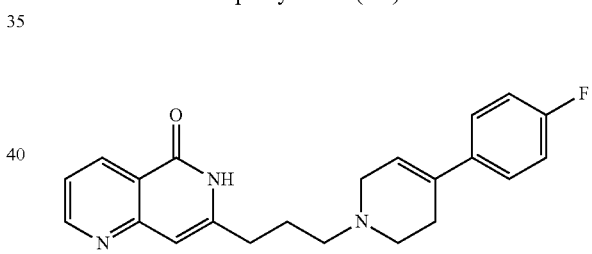

The target compound was obtained according to Example 234, except that 1-bromo-4-fluorobenzene was used in place of 5-bromopicolinonitrile used in Step 1 of Example 234.

$^1$H NMR (300 MHz, CDCl$_3$) δ 11.46 (br, 1H), 8.85-8.84 (m, 1H), 8.59-8.56 (m, 1H), 7.45-7.42 (m, 2H), 7.33-7.29 (m, 1H), 7.05-6.96 (m, 2H), 6.53 (s, 1H), 6.05 (s, 1H), 3.26-3.25 (m, 2H), 2.84-2.77 (m, 6H), 2.62-2.57 (m, 2H), 1.97-1.96 (m, 2H).

<Example 237> Preparation of 7-(3-(2'-fluoro-3,6-dihydro-[4,4'-bipyridine]-1(2H)-yl)propyl)-1,6-naphthyridin-5(6H)-one

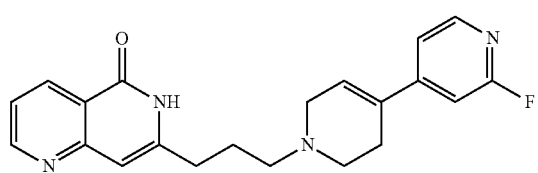 [SMILES: O=c1[nH]c(CCCN2CC=C(c3ccnc(F)c3)CC2)cc2ncccc12]

The target compound was obtained according to Example 234, except that 4-bromo-2-fluoropyridine was used in place of 5-bromopicolinonitrile used in Step 1 of Example 234.

¹H NMR (300 MHz, CDCl₃) δ 11.52 (br, 1H), 8.86-8.85 (m, 1H), 8.58 (d, 1H, J=6.6 Hz), 8.17 (d, 1H, J=5.4 Hz), 7.35-7.30 (m, 1H), 7.24 (m, 1H), 6.96 (s, 1H), 6.54 (s, 1H), 6.39 (m, 1H), 3.32-3.31 (m, 2H), 2.86-2.84 (m, 2H), 2.80-2.76 (m, 4H), 2.64-2.60 (m, 2H), 2.01-1.97 (m, 2H).

<Example 238> Preparation of 7-(3-(4-(3-fluorophenyl)-3,6-dihydropyridin-1(2H)-yl)propyl)-1,6-naphthyridin-5(6H)-one

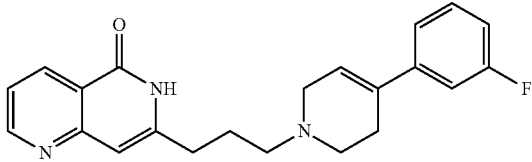 [SMILES: O=c1[nH]c(CCCN2CC=C(c3cccc(F)c3)CC2)cc2ncccc12]

The target compound was obtained according to Example 234, except 1-bromo-3-fluorobenzene was used in place of 5-bromopicolinonitrile used in Step 1 of Example 234.

¹H NMR (300 MHz, CDCl₃) δ 11.55 (br, 1H), 8.84 (m, 1H), 8.58 (d, 1H, J=8.1 Hz), 7.34-7.25 (m, 3H), 7.16-7.13 (m, 1H), 6.97-6.94 (m, 1H), 6.53 (s, 1H), 6.15 (m, 1H), 3.27 (m, 2H), 2.84-2.77 (m, 6H), 2.60-2.58 (m, 2H), 1.98 (m, 2H).

<Example 239> Preparation of 4-(1-(3-(5-oxo-5,6-dihydro-1,6-naphthyridin-7-yl)propyl)-1,2,3,6-tetrahydropyridin-4-yl)benzonitrile

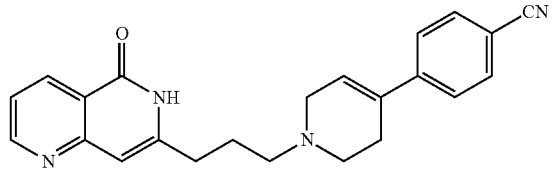 [SMILES: N#Cc1ccc(C2=CCN(CCCc3cc4ncccc4c(=O)[nH]3)CC2)cc1]

The target compound was obtained according to Example 234, except 4-bromobenzonitrile was used in place of 5-bromopicolinonitrile used in Step 1 of Example 234.

¹H NMR (300 MHz, DMSO-d₆) δ 11.61 (s, 1H), 8.85 (d, 1H, J=4.2 Hz), 8.42 (d, 1H, J=7.8 Hz), 7.81-7.78 (m, 2H), 7.64-7.61 (m, 2H), 7.43-7.39 (m, 1H), 6.47 (s, 1H), 6.40 (m, 1H), 3.14 (m, 2H), 2.64-2.58 (m, 6H), 2.46-2.44 (m, 2H), 1.90-1.85 (m, 2H).

<Example 240> Preparation of 7-(3-(3,6-dihydro-[4,4'-bipyridine]-1(2H)-yl)propyl)-1,6-naphthyridin-5(6H)-one

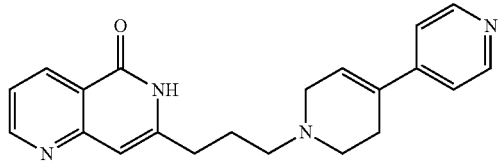 [SMILES: O=c1[nH]c(CCCN2CC=C(c3ccncc3)CC2)cc2ncccc12]

The target compound was obtained according to Example 234, except 4-bromopyridine was used in place of 5-bromopicolinonitrile used in Step 1 of Example 234.

¹H NMR (300 MHz, CDCl₃) δ 11.49-11.48 (m, 1H), 8.86-8.84 (m, 1H), 8.58-8.56 (m, 3H), 7.34-7.29 (m, 3H), 6.53 (s, 1H), 6.35 (s, 1H), 3.31-3.29 (m, 2H), 2.85-2.59 (m, 6H), 2.00-1.96 (m, 2H).

<Example 241> Synthesis of 4-(4-(3-(5-oxo-5,6-dihydro-1,6-naphthyridin-7-yl)propanoyl)piperazin-1-yl)benzonitrile

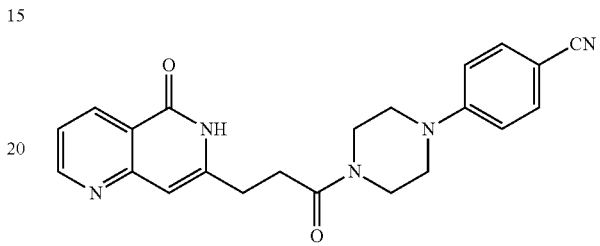

Step 1: Preparation of pent-4-ynoic acid

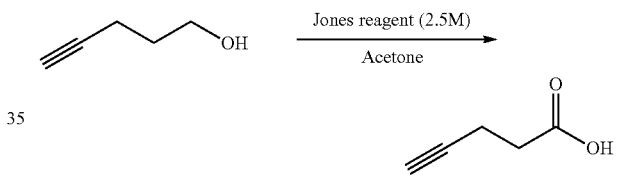

After dissolving pent-4-yn-1-ol (10.0 g, 118.9 mmol) in acetone (500 mL), 2.5 M Jones reagent (118 mL) was slowly added dropwise at 0° C. The reaction solution was stirred at room temperature for 15 hours. The reaction solution was concentrated by evaporation under reduced pressure, diluted with EtOAc, and washed with water. The organic solvent was dried over MgSO₄, filtered, and then concentrated by evaporation under reduced pressure, and the resulting residue was recrystallized with Et₂O to obtain the target compound, pent-4-ynoic acid (11.6 g, 100%).

¹H NMR (300 MHz, CDCl₃) δ 2.63-2.60 (m, 2H), 2.53-2.52 (m, 2H), 2.00 (s, 1H).

Step 2: Preparation of 4-(4-(pent-4-ynoyl)piperazin-1-yl)benzonitrile

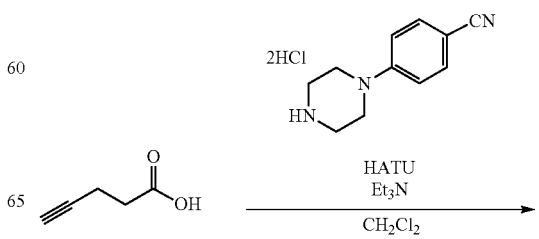

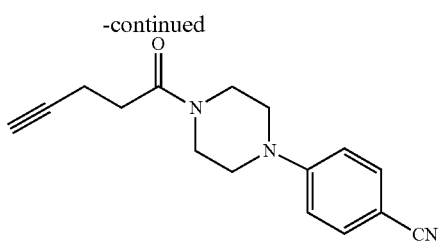

After dissolving pent-4-ynoic acid (5.0 g, 50.97 mmol), 4-(piperazin-1-yl)benzonitrile 2HCl (15.91 g, 61.16 mmol), and HBTU (29.07 g, 76.46 mmol) in CH$_2$Cl$_2$ (25 mL), TEA (25.8 g, 254.85 mmol) was added dropwise to the reaction solution and stirred at room temperature for 15 hours. The reaction solution was diluted with CH$_2$Cl$_2$ and washed with water. The organic solvent was dried over MgSO$_4$, filtered, and then concentrated by evaporation under reduced pressure, and the resulting residue was purified using silica gel chromatography to obtain the target compound, 4-(4-(pent-4-ynoyl)piperazin-1-yl)benzonitrile (11.8 g, 87%).

$^1$H NMR (300 MHz, CDCl$_3$) δ 7.53-7.50 (m, 2H), 6.87-6.84 (m, 2H), 3.80-3.77 (m, 2H), 3.67-3.63 (m, 2H), 3.85-3.31 (m, 4H), 2.63-2.59 (m, 4H).

Step 3: Preparation of 4-(4-(3-(5-oxo-5H-pyrano[4,3-b]pyridin-7-yl)propanoyl)piperazin-1-yl)benzonitrile

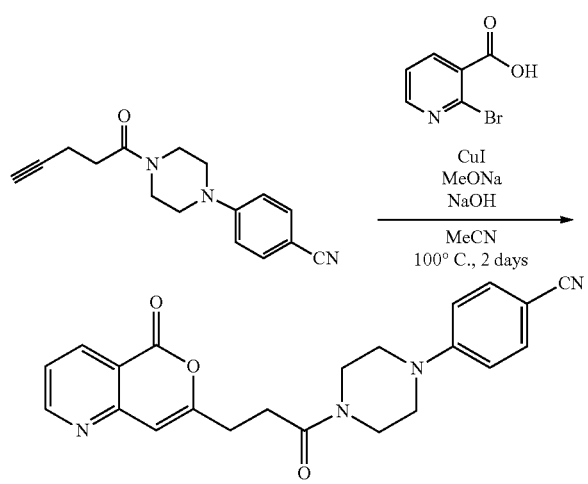

After dissolving 4-(4-(pent-4-ynoyl)piperazin-1-yl)benzonitrile (2.0 g, 7.48 mmol) in CH$_3$CN, 2-bromonicotinic acid (2.03 g, 8.23 mmol), CuI (143 mg, 0.75 mmol), MeONa (404 mg, 7.48 mmol), and NaOH (299 mg, 7.48 mmol) were added. The reaction solution was stirred at 80° C. for 2 days and filtered through celite, and the filtrate was concentrated by evaporation under reduced pressure. The concentrate was diluted with EtOAc and washed with an NH$_4$C aqueous solution. The organic solvent was dried over MgSO$_4$, filtered, and then concentrated by evaporation under reduced pressure, and the resulting residue was purified using silica gel chromatography to obtain the target compound, 4-(4-(3-(5-oxo-5H-pyrano[4,3-b]pyridin-7-yl)propanoyl)piperazin-1-yl)benzonitrile (150 mg, 10%).

$^1$H NMR (300 MHz, CDCl$_3$) δ 8.95 (br, 1H), 8.50-8.47 (m, 1H), 7.54-7.51 (m, 2H), 7.42-7.40 (m, 1H), 6.87-6.84 (m, 2H), 6.49 (s, 1H), 3.81-3.78 (m, 2H), 3.69-3.65 (m, 2H), 3.39-3.32 (m, 4H), 3.03-2.98 (m, 2H), 2.85-2.80 (m, 2H).

Step 4: Preparation of 4-(4-(3-(5-oxo-5,6-dihydro-1,6-naphthyridin-7-yl)propanoyl)piperazin-1-yl)benzonitrile

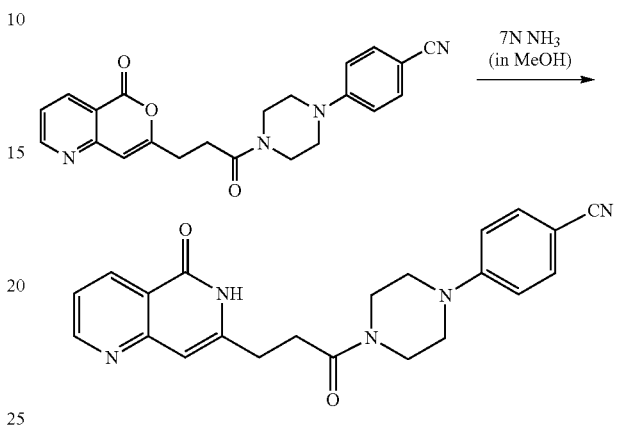

After dissolving 4-(4-(3-(5-oxo-5H-pyrano[4,3-b]pyridin-7-yl)propanoyl)piperazin-1-yl)benzonitrile (160 g, 0.43 mmol) in 7 N NH$_3$/MeOH (20 mL), the mixture was stirred at 80° C. for 15 hours. The reaction solution was cooled to room temperature, and then the thus-obtained product was concentrated by evaporation under reduced pressure. The resulting solid was recrystallized with MeOH to obtain the target compound, 4-(4-(3-(5-oxo-5,6-dihydro-1,6-naphthyridin-7-yl)propanoyl)piperazin-1-yl)benzonitrile (20 mg, 12%).

$^1$H NMR (300 MHz, CDCl$_3$) δ 11.53 (br, 1H), 8.85-8.84 (m, 1H), 8.43-8.41 (m, 1H), 7.62-7.59 (m, 2H), 7.43-7.39 (m, 1H), 7.03-7.01 (m, 2H), 6.51 (s, 1H), 3.62-3.61 (m, 4H), 3.39-3.34 (m, 4H), 2.82-2.80 (m, 4H).

<Example 242> Preparation of 6-(4-(3-(5-oxo-5,6-dihydro-1,6-naphthyridin-7-yl)propanoyl)piperazin-1-yl)nicotinonitrile

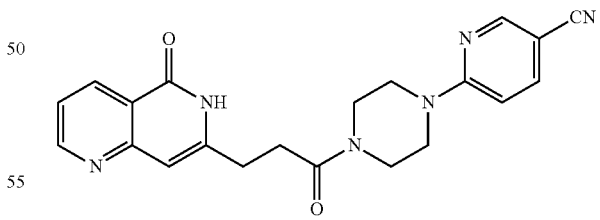

The target compound was obtained according to Example 241, except that 6-(piperazin-1-yl)nicotinonitrile 3HCl was used in place of 4-(piperazin-1-yl)benzonitrile 2HCl used in Step 2 of Example 241.

$^1$H NMR (300 MHz, CDCl$_3$) δ 10.38 (br, 1H), 8.86-8.85 (m, 1H), 8.62-8.59 (m, 1H), 8.42-8.41 (m, 1H), 7.69-7.65 (m, 1H), 7.35-7.34 (m, 1H), 6.63-6.60 (m, 1H), 6.52 (s, 1H), 3.84-3.81 (m, 4H), 3.69-3.57 (m, 4H), 3.02-2.99 (m, 2H), 2.83-2.79 (m, 2H).

<Example 243> Preparation of 5-(4-(3-(5-oxo-5,6-dihydro-1,6-naphthyridin-7-yl)propanoyl)piperazin-1-yl)picolinonitrile

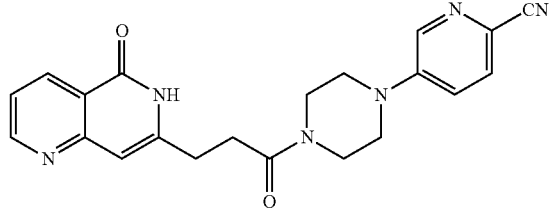 [SMILES: N#Cc1ccc(N2CCN(C(=O)CCc3cc4ncccc4c(=O)[nH]3)CC2)cn1]

The target compound was obtained according to Example 241, except that 5-(piperazin-1-yl)picolinonitrile 3HCl was used in place of 4-(piperazin-1-yl)benzonitrile 2HCl used in Step 2 of Example 241.

$^1$H NMR (300 MHz, CDCl$_3$) δ 10.32 (br, 1H), 8.86-8.85 (m, 1H), 8.61-8.59 (m, 1H), 8.32-8.30 (m, 1H), 7.57-7.54 (m, 1H), 7.36-7.35 (m, 1H), 7.12-7.08 (m, 1H), 6.53 (s, 1H), 3.90-3.88 (m, 2H), 3.67-3.66 (m, 2H), 3.44-3.33 (m, 4H), 3.01-2.99 (m, 2H), 2.83-2.81 (m, 2H).

<Example 244> Preparation of 7-(3-(4-(4-fluorophenyl)-3,6-dihydropyridin-1(2H)-yl)-3-oxopropyl)-1,6-naphthyridin-5(6H)-one

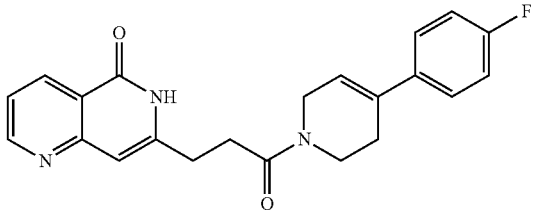 [SMILES: O=C(CCc1cc2ncccc2c(=O)[nH]1)N1CC=C(c2ccc(F)cc2)CC1]

The target compound was obtained according to Example 241, except that 4-(4-fluorophenyl)-1,2,3,6-tetrahydropyridine HCl was used in place of 4-(piperazin-1-yl)benzonitrile 2HCl used in Step 2 of Example 241.

$^1$H NMR (300 MHz, CDCl$_3$) δ 10.59 (br, 1H), 8.85-8.83 (m, 1H), 8.61-8.59 (m, 1H), 7.34-7.33 (m, 2H), 7.05-6.99 (m, 2H), 6.52 (s, 1H), 6.03-5.92 (m, 1H), 4.32-4.31 (m, 1H), 4.11-4.10 (m, 1H), 3.92-3.88 (m, 1H), 3.68-3.65 (m, 1H), 3.01-3.00 (m, 2H), 2.86-2.80 (m, 2H), 2.55-2.54 (m, 2H).

<Example 245> Preparation of 4-(1-(3-(5-oxo-5,6-dihydro-1,6-naphthyridin-7-yl)propanoyl)-1,2,3,6-tetrahydropyridin-4-yl)benzonitrile

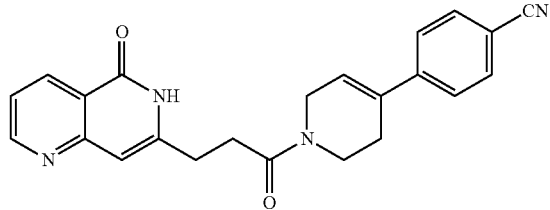 [SMILES: N#Cc1ccc(C2=CCN(C(=O)CCc3cc4ncccc4c(=O)[nH]3)CC2)cc1]

The target compound was obtained according to Example 241, except that 4-(1,2,3,6-tetrahydropyridin-4-yl)benzonitrile HCl was used in place of 4-(piperazin-1-yl)benzonitrile 2HCl used in Step 2 of Example 241.

$^1$H NMR (300 MHz, DMSO-d$_6$) δ 11.53 (br, 1H), 8.84 (m, 1H), 8.44-8.38 (m, 1H), 7.82-7.80 (m, 2H), 7.63-7.60 (m, 2H), 7.43-7.35 (m, 1H), 6.52-6.49 (m, 1H), 6.42-6.37 (m, 1H), 4.23-4.17 (m, 2H), 3.69 (m, 2H), 2.85-2.81 (m, 4H), 2.57 (m, 2H).

<Example 246> Preparation of 4-(8-(3-(5-oxo-5,6-dihydro-1,6-naphthyridin-7-yl)propanoyl)-3,8-diazabicyclo[3.2.1]octan-3-yl)benzonitrile

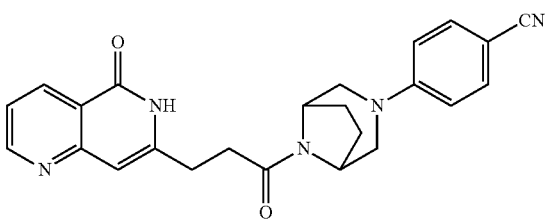 [SMILES: N#Cc1ccc(N2CC3CCC(C2)N3C(=O)CCc2cc3ncccc3c(=O)[nH]2)cc1]

The target compound was obtained according to Example 241, except 4-(3,8-diazabicyclo[3.2.1]octan-3-yl)benzonitrile 2HCl was used in place of 4-(piperazin-1-yl)benzonitrile 2HCl used in Step 2 of Example 241.

$^1$H NMR (300 MHz, DMSO-d$_6$) δ 11.54 (br, 1H), 8.81 (d, 1H, J=4.5 Hz), 8.40 (d, 1H, J=7.8 Hz), 7.59-7.56 (m, 2H), 7.39-7.35 (m, 1H), 6.92-6.89 (m, 2H), 6.50 (s, 1H), 4.66 (m, 1H), 4.54-4.53 (m, 1H), 3.70-3.63 (m, 2H), 2.92-2.76 (m, 6H), 1.94-1.92 (m, 1H), 1.78-1.74 (m, 3H).

<Example 247> Synthesis of 4-((1-(3-(8-fluoro-1-oxo-1,2-dihydroisoquinolin-3-yl)propyl)piperidin-4-yl)amino)benzonitrile

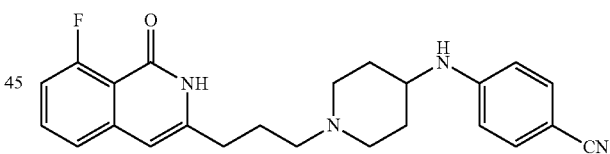

Step 1: Preparation of tert-butyl 4-((4-cyanophenyl)amino)piperidin-1-carboxylate

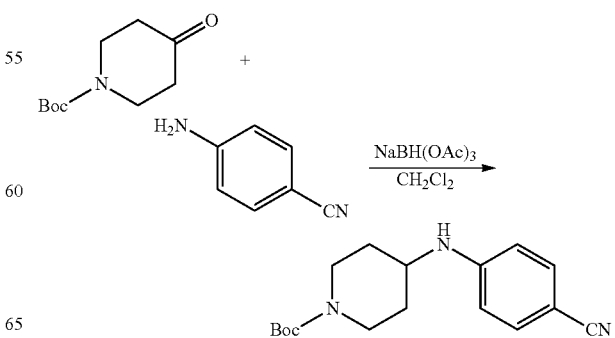

After dissolving tert-butyl 4-oxopiperidin-1-carboxylate (1.0 g, 5.02 mmol) and 4-aminobenzonitrile (770.8 mg, 6.52 mmol) in $CH_2Cl_2$ (13 mL), the mixture was stirred at 80° C. for 15 hours and then cooled to 0° C. $NaBH(OAc)_3$ (3.19 mg, 15.06 mmol) was added and stirred at room temperature for 16 hours. The reaction solution was diluted with $CH_2Cl_2$ and washed with water. The organic solvent was dried over $MgSO_4$, filtered, and then concentrated by evaporation under reduced pressure, and the resulting residue was purified using silica gel chromatography to obtain the target compound, tert-butyl 4-((4-cyanophenyl)amino)piperidin-1-carboxylate (698 mg, 46%).

$^1$H NMR (300 MHz, DMSO-$d_6$) δ 7.48-7.42 (m, 2H), 6.70-6.60 (m, 3H), 3.81-3.84 (m, 2H), 3.49 (br, 1H), 2.89 (m, 2H), 1.87 (m, 2H), 1.39 (s, 9H), 1.24 (m, 2H).

Step 2: Preparation of
4-(piperidin-4-ylamino)benzonitrile 2HCl

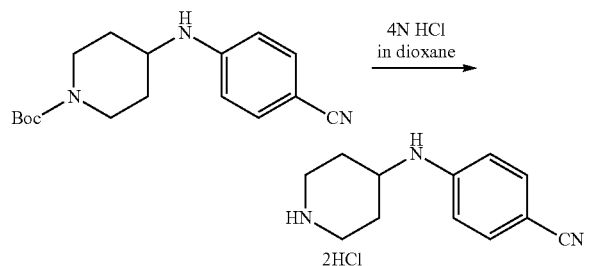

4 N HCl/dioxane (5.8 mL) was added to tert-butyl 4-((4-cyanophenyl)amino)piperidin-1-carboxylate (698 mg, 2.32 mmol), and the mixture was stirred for 15 hours. The solid produced during the reaction was filtered and washed with $Et_2O$ to obtain the target compound, 4-(piperidin-4-ylamino)benzonitrile 2HCl (585 mg, 92%).

$^1$H NMR (300 MHz, DMSO-$d_6$) δ 9.04 (br, 2H), 7.46 (d, J=8.7 Hz, 2H), 6.70 (d, J=9.0 Hz, 2H), 3.62 (m, 1H), 3.27 (m, 2H), 2.98 (m, 2H), 2.04 (m, 2H), 1.63 (m, 2H).

Step 3: Preparation of 4-((1-(3-(8-fluoro-1-oxo-1,2-dihydroisoquinolin-3-yl)propyl)piperidin-4-yl)amino)benzonitrile

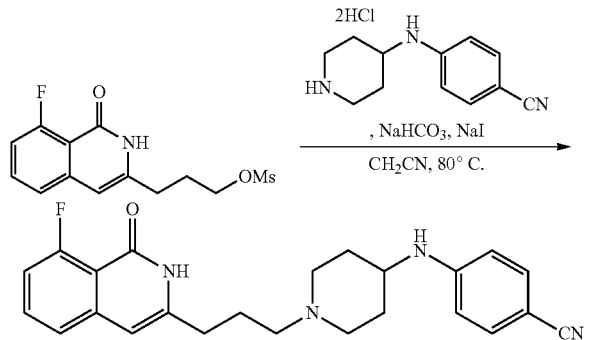

After dissolving 3-(8-fluoro-1-oxo-1,2-dihydroisoquinolin-3-yl)propyl methanesulfonate (60 mg, 0.2 mmol) in $CH_3CN$ (4 mL), 4-(piperidin-4-ylamino)benzonitrile 2HCl (65 mg, 0.24 mmol) was added at room temperature. $NaHCO_3$ (84.01 mg, 1.0 mmol) and NaI (59.96 mg, 0.4 mmol) were added, and the mixture was heated to 80° C. and stirred for 17 hours. The reaction solution was diluted with EtOAc and washed with a $NaS_2O_3$ aqueous solution and an $NH_4C$ aqueous solution. The organic solvent was dried over $MgSO_4$, filtered, and then concentrated by evaporation under reduced pressure, and the resulting residue was recrystallized with $Et_2O$ to obtain the target compound, 4-((1-(3-(8-fluoro-1-oxo-1,2-dihydroisoquinolin-3-yl)propyl)piperidin-4-yl)amino)benzonitrile (11 mg, 13%).

$^1$H NMR (300 MHz, DMSO-$d_6$) δ 11.41 (br, 1H), 7.60 (m, 1H), 7.42 (d, J=8.4 Hz, 2H), 7.34 (d, J=7.8 Hz, 1H), 7.12-7.05 (m, 1H), 6.65-6.58 (m, 3H), 6.35 (s, 1H), 3.34 (m, 3H), 2.86-2.85 (m, 2H), 2.78-2.74 (m, 2H), 2.59-2.55 (m, 2H), 2.42 (s, 3H), 2.07-1.76 (m, 6H), 1.57-1.56 (m, 2H).

<Example 248> Preparation of 5-((1-(3-(8-fluoro-1-oxo-1,2-dihydroisoquinolin-3-yl)propyl)piperidin-4-yl)amino)picolinonitrile

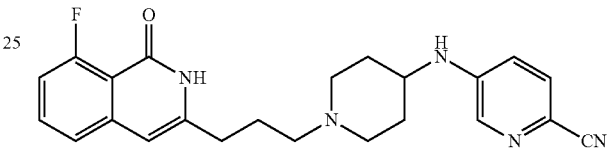

The target compound was obtained according to Example 247, except that 5-aminopicolinonitrile was used in place of 4-aminobenzonitrile used in Step 1 of Example 247.

$^1$H NMR (300 MHz, $CDCl_3$) δ 12.78 (br, 1H), 8.06 (s, 1H), 7.54-7.42 (m, 2H), 7.21-7.18 (m, 1H), 7.05-6.98 (m, 1H), 6.85-6.82 (m, 1H), 6.23 (s, 1H), 4.94 (m, 1H), 3.51-3.45 (m, 1H), 3.12-3.09 (m, 2H), 2.75-2.71 (m, 2H), 2.57-2.54 (m, 2H), 2.33-2.11 (m, 6H), 1.88 (m, 2H).

<Example 249> Preparation of 4-((1-(3-(7-fluoro-1-oxo-1,2-dihydroisoquinolin-3-yl)propyl)piperidin-4-yl)amino)benzonitrile

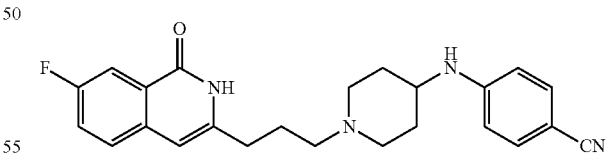

The target compound was obtained according to Example 247, except that 3-(7-fluoro-1-oxo-1,2-dihydroisoquinolin-3-yl)propyl methanesulfonate was used in place of 3-(8-fluoro-1-oxo-1,2-dihydroisoquinolin-3-yl)propyl methanesulfonate used in Step 3 of Example 247.

$^1$H NMR (300 MHz, $CDCl_3$) δ 12.36 (br, 1H), 7.96 (d, J=9.3 Hz, 1H), 7.47-7.31 (m, 4H), 6.58 (m, 2H), 6.25 (s, 1H), 4.50 (m, 1H), 3.47 (m, 1H), 3.08-3.04 (m, 2H), 2.73-2.71 (m, 2H), 2.53-2.52 (m, 2H), 2.32-2.25 (m, 2H), 2.11-2.04 (m, 4H), 1.88 (m, 2H).

<Example 250> Preparation of 4-((1-(3-(5-oxo-5,6-dihydro-1,6-naphthyridin-7-yl)propyl)piperidin-4-yl)amino)benzonitrile

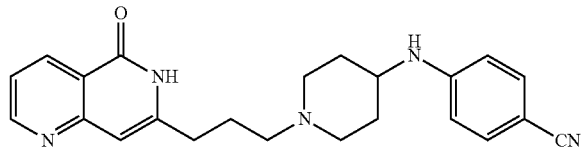 [SMILES: N#Cc1ccc(NC2CCN(CCCc3cc4ncccc4c(=O)[nH]3)CC2)cc1]

The target compound was obtained according to Example 247, except that 3-(5-oxo-5,6-dihydro-1,6-naphthyridin-7-yl)propyl methanesulfonate was used in place of 3-(8-fluoro-1-oxo-1,2-dihydroisoquinolin-3-yl)propyl methanesulfonate used in Step 3 of Example 247.

$^1$H NMR (300 MHz, CDCl$_3$) δ 13.05 (br, 1H), 8.87-8.86 (m, 1H), 8.57 (d, 1H, J=7.8 Hz), 7.43-7.41 (m, 2H), 7.36-7.32 (m, 1H), 6.60-6.54 (m, 3H), 4.57-4.55 (m, 1H), 3.11-3.07 (m, 2H), 2.80 (m, 2H), 2.57-2.55 (m, 2H), 2.34-2.28 (m, 2H), 2.11-2.04 (m, 4H), 1.92 (m, 2H).

<Example 251> Preparation of 5-((1-(3-(5-oxo-5,6-dihydro-1,6-naphthyridin-7-yl)propyl)piperidin-4-yl)amino)picolinonitrile

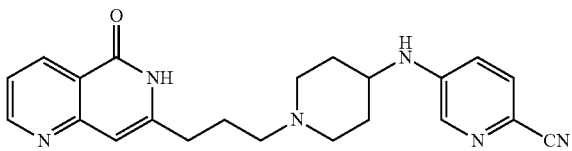 [SMILES: N#Cc1ccc(NC2CCN(CCCc3cc4ncccc4c(=O)[nH]3)CC2)cn1]

The target compound was obtained according to Example 247, except that 5-aminopicolinonitrile was used in place of 4-aminobenzonitrile used in Step 1 of Example 247, and 3-(5-oxo-5,6-dihydro-1,6-naphthyridin-7-yl)propyl methanesulfonate was used in place of 3-(8-fluoro-1-oxo-1,2-dihydroisoquinolin-3-yl)propyl methanesulfonate used in Step 3 of Example 247.

$^1$H NMR (300 MHz, DMSO-d$_6$) δ 11.26 (br, 1H), 8.85-8.84 (m, 1H), 8.43-8.41 (m, 1H), 8.06-8.05 (m, 1H), 7.59-7.58 (m, 1H), 7.42-7.41 (m, 1H), 6.96-6.95 (m, 2H), 6.47 (s, 1H), 3.36-3.35 (m, 1H), 2.91-2.90 (m, 2H), 2.61-2.21 (m, 4H), 2.11-1.86 (m, 6H), 1.59-1.45 (m, 2H).

<Example 252> Preparation of methyl 4-((1-(3-(5-oxo-5,6-dihydro-1,6-naphthyridin-7-yl)propyl)piperidin-4-yl)amino)benzoate

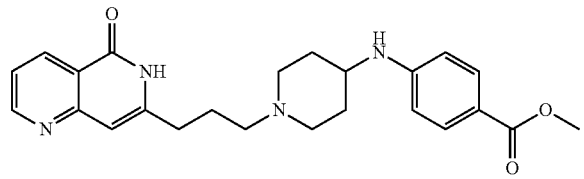 [SMILES: COC(=O)c1ccc(NC2CCN(CCCc3cc4ncccc4c(=O)[nH]3)CC2)cc1]

The target compound was obtained according to Example 247, except that methyl 4-aminobenzoate was used in place of 4-aminobenzonitrile used in Step 1 of Example 247, and 3-(5-oxo-5,6-dihydro-1,6-naphthyridin-7-yl)propyl methanesulfonate was used in place of 3-(8-fluoro-1-oxo-1,2-dihydroisoquinolin-3-yl)propyl methanesulfonate used in Step 3 of Example 247.

$^1$H NMR (300 MHz, CDCl$_3$) δ 8.85-8.84 (m, 1H), 8.59-8.56 (m, 1H), 7.86-7.83 (m, 2H), 7.34-7.33 (m, 1H), 6.59-6.56 (m, 2H), 6.53 (s, 1H), 4.42-4.39 (m, 1H), 3.84 (s, 3H), 3.08-3.04 (m, 2H), 2.80-2.79 (m, 2H), 2.57-2.53 (m, 2H), 2.35-2.28 (m, 2H), 2.17-1.91 (m, 6H).

<Example 253> Preparation of 7-(3-(4-((4-(trifluoromethyl)phenyl)amino)piperidin-1-yl)propyl)-1,6-naphthyridin-5(6H)-one

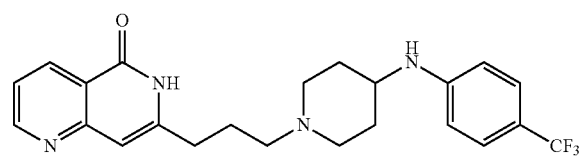 [SMILES: O=c1[nH]c(CCCN2CCC(Nc3ccc(C(F)(F)F)cc3)CC2)cc2ncccc12]

The target compound was obtained according to Example 247, except that 4-(trifluoromethyl)aniline was used in place of 4-aminobenzonitrile used in Step 1 of Example 247, and 3-(5-oxo-5,6-dihydro-1,6-naphthyridin-7-yl)propyl methanesulfonate was used in place of 3-(8-fluoro-1-oxo-1,2-dihydroisoquinolin-3-yl)propyl methanesulfonate used in Step 3 of Example 247.

$^1$H NMR (300 MHz, CDCl$_3$) δ 8.86-8.85 (m, 1H), 8.59-8.57 (m, 1H), 7.40-7.33 (m, 2H), 6.63-6.61 (m, 2H), 6.52 (s, 1H), 4.19-4.17 (m, 1H), 3.07-3.04 (m, 2H), 2.80-2.79 (m, 2H), 2.56-2.53 (m, 2H), 2.35-2.28 (m, 2H), 2.17-1.91 (m, 6H).

<Example 254> Synthesis of 4-((1-(3-(8-fluoro-1-oxo-1,2-dihydroisoquinolin-3-yl)propyl)piperidin-4-yl)oxy)benzonitrile

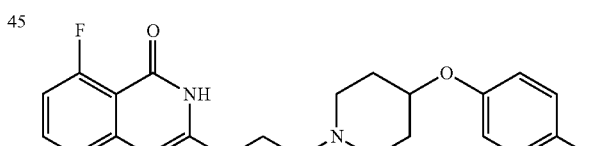

Step 1: Preparation of tert-butyl 4-(4-cyanophenoxy)piperidin-1-carboxylate

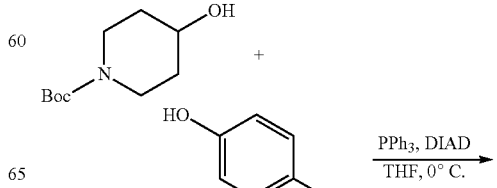

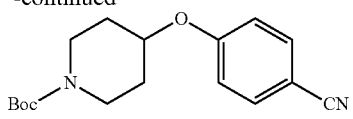

After dissolving tert-butyl 4-hydroxypiperidin-1-carboxylate (0.6 g, 2.98 mmol) and 4-hydroxybenzonitrile (0.35 g, 2.98 mmol) in THF (9.9 mL), the mixture was cooled to 0° C. PPh₃ (1.17 mg, 4.47 mmol) was added, DIAD (0.98 mL, 4.47 mmol) was slowly added dropwise at 0° C., and the mixture was stirred at room temperature for 16 hours. The reaction solution was diluted with EtOAc and washed with water. The organic solvent was dried over MgSO₄, filtered, and then concentrated by evaporation under reduced pressure, and the resulting residue was purified using silica gel chromatography to obtain the target compound, tert-butyl 4-(4-cyanophenoxy)piperidin-1-carboxylate (0.73 g, 81%).

¹H NMR (300 MHz, DMSO-d₆) δ 7.76 (d, J=7.8 Hz, 2H), 7.15 (d, J=7.8 Hz, 3H), 4.72 (m, 1H), 3.67-3.66 (m, 2H), 3.21-3.14 (m, 2H), 1.94-1.91 (m, 2H), 1.56-1.51 (m, 2H), 1.41 (s, 9H).

Step 2: Preparation of 4-(piperidin-4-yloxy)benzonitrile HCl

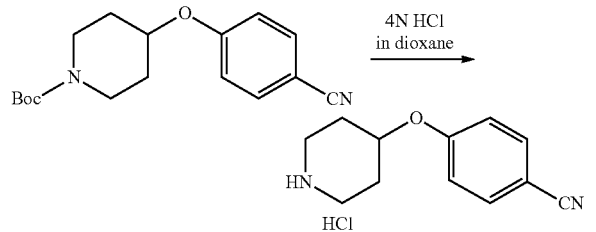

4 N HCl/dioxane (6 mL) was added to tert-butyl 4-(4-cyanophenoxy)piperidin-1-carboxylate (729 mg, 2.41 mmol), and the mixture was stirred for 15 hours. The solid produced during the reaction was filtered and washed with Et₂O to obtain the target compound, 4-(piperidin-4-yloxy)benzonitrile HCl (408 mg, 71%).

¹H NMR (300 MHz, DMSO-d₆) δ 8.96 (br, 1H), 7.79 (d, J=8.7 Hz, 2H), 7.18 (d, J=8.7 Hz, 2H), 4.81 (m, 1H), 3.21 (m, 2H), 3.07 (m, 2H), 2.10 (m, 2H), 1.86 (m, 2H).

Step 3: Preparation of 4-((1-(3-(8-fluoro-1-oxo-1,2-dihydroisoquinolin-3-yl)propyl)piperidin-4-yl)oxy)benzonitrile

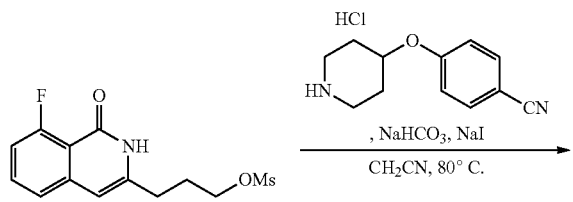

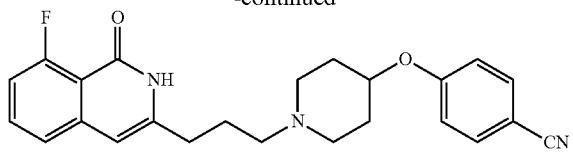

After dissolving 3-(8-fluoro-1-oxo-1,2-dihydroisoquinolin-3-yl)propyl methanesulfonate (60 mg, 0.2 mmol) in CH₃CN (4 mL), 4-(piperidin-4-yloxy)benzonitrile HCl (57 mg, 0.24 mmol) was added at room temperature. NaHCO₃ (84.01 mg, 1.0 mmol) and NaI (59.96 mg, 0.4 mmol) were added, and the mixture was heated to 80° C. and stirred for 17 hours. The reaction solution was diluted with EtOAc and washed with a NaS₂O₃ aqueous solution and an NH₄C aqueous solution. The organic solvent was dried over MgSO₄, filtered, and then concentrated by evaporation under reduced pressure, and the resulting residue was recrystallized with Et₂O to obtain the target compound, 4-((1-(3-(8-fluoro-1-oxo-1,2-dihydroisoquinolin-3-yl)propyl)piperidin-4-yl)oxy)benzonitrile (15 mg, 13%).

¹H NMR (300 MHz, CDCl₃) δ 12.48 (br, 1H), 7.60-7.46 (m, 3H), 7.20-7.17 (m, 1H), 7.04-6.94 (m, 3H), 6.20 (s, 1H), 4.66 (m, 1H), 2.68-2.43 (m, 10H), 2.06-2.03 (m, 2H), 1.86 (m, 2H).

<Example 255> Synthesis of 4-((1-(3-(8-fluoro-1-oxo-1,2-dihydroisoquinolin-3-yl)propanoyl)piperidin-4-yl)oxy)benzonitrile

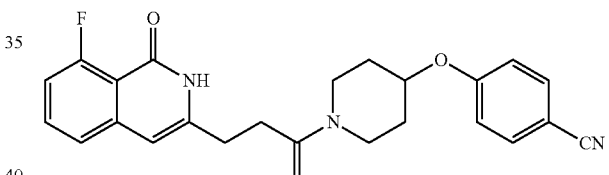

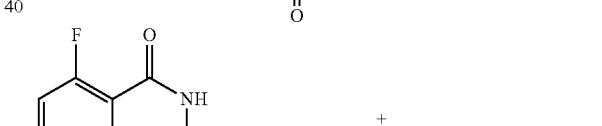

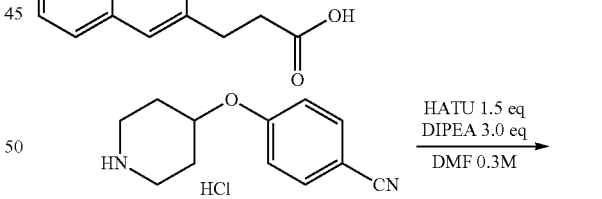

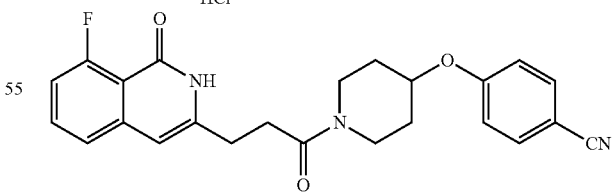

After dissolving 3-(8-fluoro-1-oxo-1,2-dihydroisoquinolin-3-yl)propanoic acid (60 mg, 0.25 mmol), 4-(piperidin-4-yloxy)benzonitrile HCl (73.07 mg, 0.31 mmol), and HATU (145.49 mg, 0.38 mmol) in DMF (0.9 mL) at room temperature, DIPEA (0.13 mL, 0.76 mmol) was slowly added dropwise to the reaction solution and stirred at room temperature for 19 hours. The reaction solution was diluted with EtOAc and washed with water. The organic solvent was dried over anhydrous MgSO₄, filtered, and then concentrated by evaporation under reduced pressure, and the resulting residue was purified using silica gel chromatography to obtain the target compound, 4-((1-(3-(8-fluoro-1-oxo-1,2-dihydroisoquinolin-3-yl)propanoyl)piperidin-4-yl)oxy)benzonitrile (32.3 mg, 30%).

¹H NMR (300 MHz, DMSO-d₆) δ 11.22 (br, 1H), 7.77 (d, J=8.1 Hz, 2H), 7.65-7.58 (m, 1H), 7.34 (d, J=7.8 Hz, 1H), 7.17-7.07 (m, 3H), 6.39 (s, 1H), 4.78 (m, 1H), 3.94-3.73 (m, 2H), 3.39-3.20 (m, 2H), 2.73 (m, 4H), 1.99-1.95 (m, 2H), 1.61-1.48 (m, 2H).

<Example 256> Preparation of 4-((1-(3-(8-fluoro-1-oxo-1,2-dihydroisoquinolin-3-yl)propanoyl)piperidin-4-yl)amino)benzonitrile

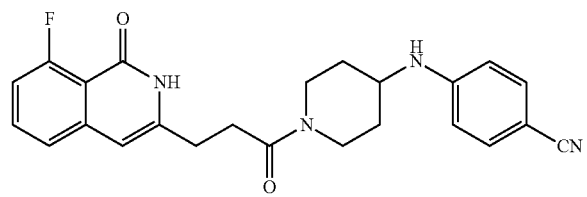 [SMILES: N#Cc1ccc(NC2CCN(C(=O)CCc3cc4cccc(F)c4c(=O)[nH]3)CC2)cc1]

The target compound was obtained according to Example 255, except that 4-(piperidin-4-ylamino)benzonitrile 2HCl was used in place of 4-(piperidin-4-yloxy)benzonitrile HCl used in Example 255.

¹H NMR (300 MHz, CDCl₃) δ 10.16 (br, 1H), 7.56-7.49 (m, 3H), 7.20-7.16 (m, 1H), 7.06-6.99 (m, 1H), 6.73 (d, J=8.7 Hz, 2H), 6.24 (s, 1H), 4.63-4.58 (m, 1H), 4.14 (m, 1H), 3.86-3.82 (m, 1H), 3.56 (m, 1H), 3.23-3.15 (m, 1H), 2.99-2.87 (m, 3H), 2.79-2.74 (m, 2H), 2.11-2.07 (m, 2H), 1.4-1.32 (m, 2H).

<Example 257> Preparation of 4-((1-(3-(8-fluoro-1-oxo-1,2-dihydroisoquinolin-3-yl)propanoyl)piperidin-4-yl)(methyl)amino)benzonitrile

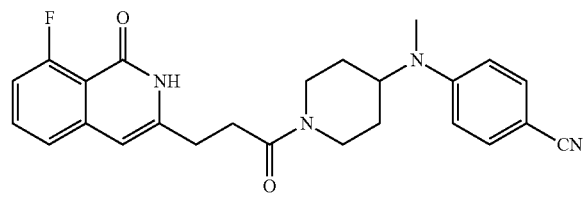 [SMILES: CN(c1ccc(C#N)cc1)C1CCN(C(=O)CCc2cc3cccc(F)c3c(=O)[nH]2)CC1]

The target compound was obtained according to Example 255, except that 4-(methyl(piperidin-4-yl)amino)benzonitrile 2HCl was used in place of 4-(piperidin-4-yloxy)benzonitrile HCl used in Example 255.

¹H NMR (300 MHz, CDCl₃) δ 10.16 (br, 1H), 7.56-7.49 (m, 3H), 7.20-7.16 (m, 1H), 7.06-6.99 (m, 1H), 6.73 (d, J=8.7 Hz, 2H), 6.24 (s, 1H), 4.93-4.88 (m, 1H), 3.99-3.84 (m, 2H), 3.18-3.10 (m, 1H), 2.96-2.63 (m, 7H), 1.79-1.44 (m, 4H).

<Example 258> Preparation of 5-((1-(3-(8-fluoro-1-oxo-1,2-dihydroisoquinolin-3-yl)propanoyl)piperidin-4-yl)amino)picolinonitrile

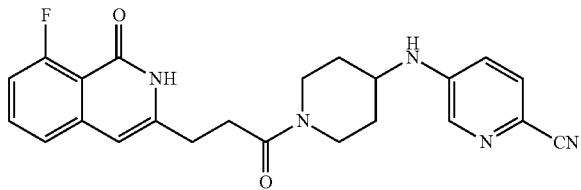 [SMILES: N#Cc1ccc(NC2CCN(C(=O)CCc3cc4cccc(F)c4c(=O)[nH]3)CC2)cn1]

The target compound was obtained according to Example 255, except that 5-(piperidin-4-ylamino)picolinonitrile 3HCl was used in place of 4-(piperidin-4-yloxy)benzonitrile HCl used in Example 255.

¹H NMR (300 MHz, DMSO-d₆) δ 11.21 (br, 1H), 8.07 (s, 1H), 7.65-7.60 (m, 2H), 7.35-7.32 (m, 1H), 7.13-6.92 (m, 3H), 6.39 (s, 1H), 4.29-4.24 (m, 1H), 3.92-3.87 (m, 1H), 3.22-3.15 (m, 2H), 2.88-2.69 (m, 4H), 1.99-1.91 (m, 2H), 1.34-1.16 (m, 2H).

<Example 259> Preparation of 4-((1-(3-(8-fluoro-5-methyl-1-oxo-1,2-dihydroisoquinolin-3-yl)propanoyl)piperidin-4-yl)amino)benzonitrile

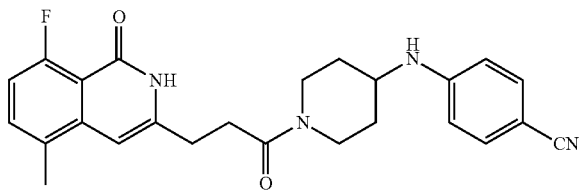 [SMILES: Cc1ccc(F)c2c(=O)[nH]c(CCC(=O)N3CCC(Nc4ccc(C#N)cc4)CC3)cc12]

The target compound was obtained according to Example 255, except that 3-(8-fluoro-5-methyl-1-oxo-1,2-dihydroisoquinolin-3-yl)propanoic acid and 4-(piperidin-4-ylamino)benzonitrile 2HCl were used in place of 3-(8-fluoro-1-oxo-1,2-dihydroisoquinolin-3-yl)propanoic acid and 4-(piperidin-4-yloxy)benzonitrile HCl used in Example 255, respectively.

¹H NMR (300 MHz, CDCl₃) δ 10.20 (br, 1H), 7.43-7.34 (m, 3H), 6.96-6.89 (m, 1H), 6.55 (d, J=8.4 Hz, 2H), 6.29 (s, 1H), 4.63-4.58 (m, 1H), 4.14 (m, 1H), 3.86-3.82 (m, 1H), 3.55 (m, 1H), 3.23-3.15 (m, 1H), 2.98-2.87 (m, 4H), 2.42 (s, 3H), 2.11-2.07 (m, 2H), 1.37-1.32 (m, 2H).

<Example 260> Preparation of 4-((1-(3-(7-fluoro-5-methyl-1-oxo-1,2-dihydroisoquinolin-3-yl)propanoyl)piperidin-4-yl)amino)benzonitrile

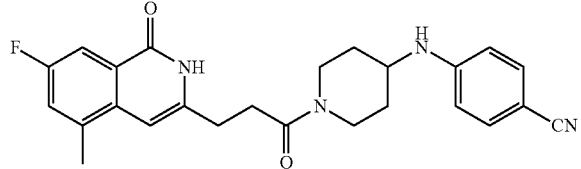 [SMILES: Cc1cc(F)cc2c(=O)[nH]c(CCC(=O)N3CCC(Nc4ccc(C#N)cc4)CC3)cc12]

The target compound was obtained according to Example 255, except that 3-(7-fluoro-5-methyl-1-oxo-1,2-dihydroisoquinolin-3-yl)propanoic acid and 4-(piperidin-4-ylamino)benzonitrile 2HCl were used in place of 3-(8-fluoro-1-oxo-1,2-dihydroisoquinolin-3-yl)propanoic acid and 4-(piperidin-4-yloxy)benzonitrile HCl used in Example 255, respectively.

$^1$H NMR (300 MHz, CDCl$_3$) δ 10.54 (br, 1H), 7.87 (d, J=6.9 Hz, 1H), 7.42 (d, J=8.7 Hz, 2H), 7.21 (d, J=9.3 Hz, 1H), 6.55 (d, J=8.7 Hz, 2H), 6.35 (s, 1H), 4.64-4.59 (m, 1H), 4.12-4.10 (m, 1H), 3.86-3.82 (m, 1H), 3.57 (m, 1H), 3.23-3.15 (m, 1H), 2.98-2.87 (m, 4H), 2.42 (s, 3H), 2.11-2.07 (m, 2H), 1.37-1.32 (m, 2H).

<Example 261> Preparation of 4-((1-(3-(8-fluoro-5-methyl-1-oxo-1,2-dihydroisoquinolin-3-yl)propanoyl)piperidin-4-yl)oxy)benzonitrile

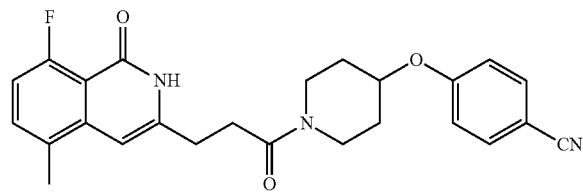 [SMILES: Cc1ccc(F)c2c(=O)[nH]c(CCC(=O)N3CCC(Oc4ccc(C#N)cc4)CC3)cc12]

The target compound was obtained according to Example 255, except that 3-(8-fluoro-5-methyl-1-oxo-1,2-dihydroisoquinolin-3-yl)propanoic acid was used in place of 3-(8-fluoro-1-oxo-1,2-dihydroisoquinolin-3-yl)propanoic acid used in Example 255.

$^1$H NMR (300 MHz, CDCl$_3$) δ 10.56 (br, 1H), 7.59 (d, J=8.7 Hz, 2H), 7.58-7.33 (m, 1H), 6.96-6.88 (m, 3H), 6.32 (s, 1H), 4.63 (m, 1H), 3.78-3.65 (m, 3H), 3.49-3.45 (m, 1H), 2.99-2.96 (m, 2H), 2.83-2.79 (m, 2H), 2.43 (s, 3H), 1.92-1.86 (m, 4H).

<Example 262> Preparation of 4-((1-(3-(7-fluoro-5-methyl-1-oxo-1,2-dihydroisoquinolin-3-yl)propanoyl)piperidin-4-yl)oxy)benzonitrile

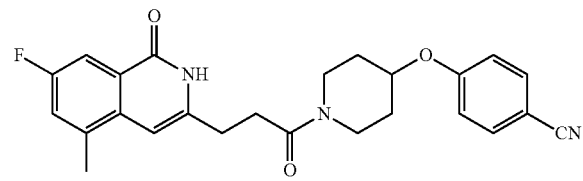 [SMILES: Cc1cc(F)cc2c(=O)[nH]c(CCC(=O)N3CCC(Oc4ccc(C#N)cc4)CC3)cc12]

The target compound was obtained according to Example 255, except that 3-(7-fluoro-5-methyl-1-oxo-1,2-dihydroisoquinolin-3-yl)propanoic acid was used in place of 3-(8-fluoro-1-oxo-1,2-dihydroisoquinolin-3-yl)propanoic acid used in Example 255.

$^1$H NMR (300 MHz, CDCl$_3$) δ 10.55 (br, 1H), 7.74 (d, J=9.3 Hz, 1H), 7.59 (d, J=8.7 Hz, 2H), 7.21 (d, J=8.7 Hz, 1H), 6.95 (d, J=9.0 Hz, 2H), 6.35 (s, 1H), 4.64 (m, 1H), 3.87-3.63 (m, 3H), 3.47-3.44 (m, 1H), 2.98-2.96 (m, 2H), 2.80-2.77 (m, 2H), 2.50 (s, 3H), 1.95-1.88 (m, 4H).

<Example 263> Preparation of 3-(3-(4-((4-chlorophenyl)amino)piperidin-1-yl)-3-oxopropyl)-7-fluoro-5-methylisoquinolin-1(2H)-one

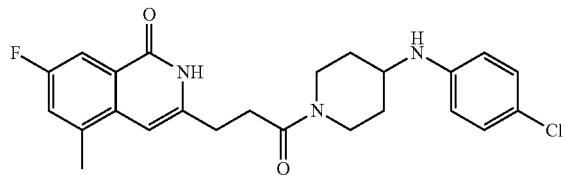 [SMILES: Cc1cc(F)cc2c(=O)[nH]c(CCC(=O)N3CCC(Nc4ccc(Cl)cc4)CC3)cc12]

The target compound was obtained according to Example 255, except that 3-(7-fluoro-5-methyl-1-oxo-1,2-dihydroisoquinolin-3-yl)propanoic acid and N-(4-chlorophenyl)piperidin-4-amine 2HCl were used in place of 3-(8-fluoro-1-oxo-1,2-dihydroisoquinolin-3-yl)propanoic acid and 4-(piperidin-4-yloxy)benzonitrile HCl used in Example 255, respectively.

$^1$H NMR (300 MHz, CDCl$_3$) δ 10.40 (br, 1H), 7.87 (d, J=8.7 Hz, 1H), 7.21-7.18 (m, 1H), 7.11 (d, J=9.0 Hz, 1H), 6.95 (d, J=9.0 Hz, 2H), 6.33 (s, 1H), 4.57 (m, 1H), 3.82-3.78 (m, 1H), 3.48 (m, 2H), 3.07-3.12 (m, 1H), 2.96-2.88 (m, 5H), 2.74 (m, 2H), 2.50 (s, 3H), 2.11-2.06 (m, 2H).

<Example 264> Preparation of 3-(3-(4-((4-chlorophenyl)amino)piperidin-1-yl)-3-oxopropyl)-8-fluoro-5-methylisoquinolin-1(2H)-one

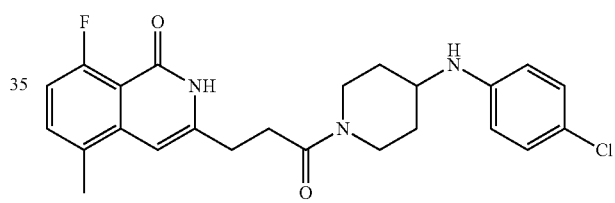

The target compound was obtained according to Example 255, except that 3-(8-fluoro-5-methyl-1-oxo-1,2-dihydroisoquinolin-3-yl)propanoic acid and N-(4-chlorophenyl)piperidin-4-amine 2HCl were used in place of 3-(8-fluoro-1-oxo-1,2-dihydroisoquinolin-3-yl)propanoic acid and 4-(piperidin-4-yloxy)benzonitrile HCl used in Example 255, respectively.

$^1$H NMR (300 MHz, CDCl$_3$) δ 10.09 (br, 1H), 7.33 (m, 1H), 7.18 (d, J=7.8 Hz, 1H), 6.92 (m, 1H), 6.51 (d, J=8.4 Hz, 2H), 6.27 (s, 1H), 4.55 (m, 1H), 3.82-3.79 (m, 1H), 3.49 (m, 2H), 3.17 (m, 1H), 2.93 (m, 5H), 2.74 (m, 2H), 2.42 (s, 3H), 2.11-2.07 (m, 2H).

<Example 265> Preparation of 7-fluoro-5-methyl-3-(3-oxo-3-(4-((4-(trifluoromethyl)phenyl)amino)piperidin-1-yl)propyl)isoquinolin-1(2H)-one

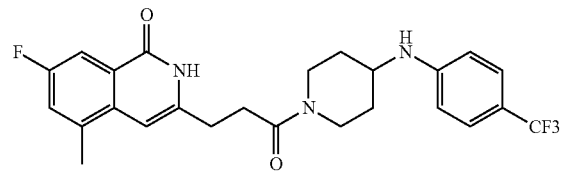 [SMILES: Cc1cc(F)cc2c(=O)[nH]c(CCC(=O)N3CCC(Nc4ccc(C(F)(F)F)cc4)CC3)cc12]

The target compound was obtained according to Example 255, except that 3-(7-fluoro-5-methyl-1-oxo-1,2-dihydroisoquinolin-3-yl)propanoic acid and N-(4-(trifluoromethyl)phenyl)piperidin-4-amine 2HCl were used in place of 3-(8-fluoro-1-oxo-1,2-dihydroisoquinolin-3-yl)propanoic acid and 4-(piperidin-4-yloxy)benzonitrile HCl used in Example 255, respectively.

$^1$H NMR (300 MHz, CDCl$_3$) δ 10.60 (br, 1H), 7.87 (d, J=7.5 Hz, 1H), 7.39 (d, J=8.7 Hz, 1H), 7.20 (d, J=6.9 Hz, 1H), 6.59 (d, J=8.7 Hz, 2H), 6.35 (s, 1H), 4.61-4.57 (m, 1H), 3.86-3.81 (m, 2H), 3.56 (m, 1H), 3.24-3.15 (m, 1H), 2.97-2.94 (m, 5H), 2.79-2.75 (m, 2H), 2.50 (s, 3H), 2.12-2.09 (m, 2H).

<Example 266> Preparation of 8-fluoro-5-methyl-3-(3-oxo-3-(4-((4-(trifluoromethyl)phenyl)amino)piperidin-1-yl)propyl)isoquinolin-1(2H)-one

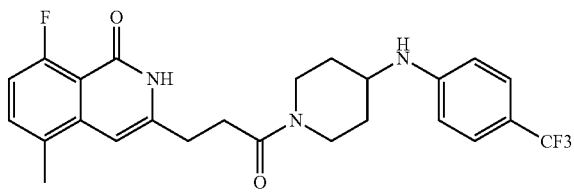 [SMILES: Cc1ccc(F)c2c(=O)[nH]c(CCC(=O)N3CCC(Nc4ccc(C(F)(F)F)cc4)CC3)cc12]

The target compound was obtained according to Example 255, except that 3-(8-fluoro-5-methyl-1-oxo-1,2-dihydroisoquinolin-3-yl)propanoic acid and N-(4-(trifluoromethyl)phenyl)piperidin-4-amine 2HCl were used in place of 3-(8-fluoro-1-oxo-1,2-dihydroisoquinolin-3-yl)propanoic acid and 4-(piperidin-4-yloxy)benzonitrile HCl used in Example 255, respectively.

$^1$H NMR (300 MHz, CDCl$_3$) δ 10.33 (br, 1H), 7.40-7.37 (m, 3H), 6.96-6.89 (m, 1H), 6.59 (d, J=9.0 Hz, 1H), 6.31 (s, 1H), 4.59-4.55 (m, 1H), 3.86-3.84 (m, 2H), 3.56 (m, 1H), 3.24-3.16 (m, 1H), 2.96-2.89 (m, 5H), 2.79-2.77 (m, 2H), 2.42 (s, 3H), 2.12-2.05 (m, 2H).

<Example 267> Preparation of methyl 4-((1-(3-(7-fluoro-5-methyl-1-oxo-1,2-dihydroisoquinolin-3-yl)propanoyl)piperidin-4-yl)amino)benzoate

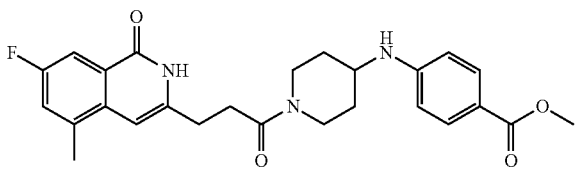 [SMILES: COC(=O)c1ccc(NC2CCN(C(=O)CCc3cc4c(C)cc(F)cc4c(=O)[nH]3)CC2)cc1]

The target compound was obtained according to Example 255, except that 3-(7-fluoro-5-methyl-1-oxo-1,2-dihydroisoquinolin-3-yl)propanoic acid and methyl 4-(piperidin-4-ylamino)benzoate 2HCl were used in place of 3-(8-fluoro-1-oxo-1,2-dihydroisoquinolin-3-yl)propanoic acid and 4-(piperidin-4-yloxy)benzonitrile HCl used in Example 255, respectively.

$^1$H NMR (300 MHz, CDCl$_3$) δ 10.66 (br, 1H), 7.87-7.84 (m, 3H), 7.22-7.19 (m, 1H), 6.54 (d, J=8.4 Hz, 2H), 6.36 (s, 1H), 4.62-4.57 (m, 1H), 4.02-4.00 (m, 1H), 3.85 (m, 5H), 3.60 (m, 1H), 3.24-3.16 (m, 1H), 2.97-2.89 (m, 5H), 2.80-2.76 (m, 2H), 2.50 (s, 3H), 2.12-2.09 (m, 2H).

<Example 268> Preparation of methyl 4-((1-(3-(8-fluoro-5-methyl-1-oxo-1,2-dihydroisoquinolin-3-yl)propanoyl)piperidin-4-yl)amino)benzoate

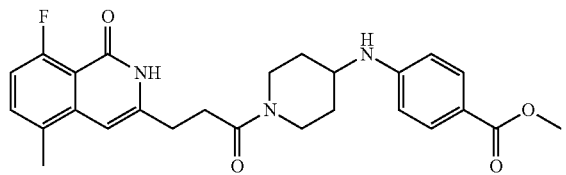 [SMILES: COC(=O)c1ccc(NC2CCN(C(=O)CCc3cc4c(C)ccc(F)c4c(=O)[nH]3)CC2)cc1]

The target compound was obtained according to Example 255, except that 3-(8-fluoro-5-methyl-1-oxo-1,2-dihydroisoquinolin-3-yl)propanoic acid and methyl 4-(piperidin-4-ylamino)benzoate 2HCl were used in place of 3-(8-fluoro-1-oxo-1,2-dihydroisoquinolin-3-yl)propanoic acid and 4-(piperidin-4-yloxy)benzonitrile HCl used in Example 255, respectively.

$^1$H NMR (300 MHz, CDCl$_3$) δ 10.38 (br, 1H), 7.85 (d, J=8.7 Hz, 2H), 7.37-7.33 (m, 1H), 6.95-6.89 (m, 1H), 6.54 (d, J=8.4 Hz, 2H), 6.30 (s, 1H), 4.60-4.56 (m, 1H), 4.04-4.01 (m, 1H), 3.85 (m, 5H), 3.60 (m, 1H), 3.24-3.16 (m, 1H), 2.96-2.88 (m, 5H), 2.80-2.76 (m, 2H), 2.42 (s, 3H), 2.12-2.09 (m, 2H).

<Example 269> Preparation of 8-fluoro-3-(3-(3-hydroxy-8-azabicyclo[3.2.1]octan-8-yl)-3-oxopropyl)-5-methylisoquinolin-1(2H)-one

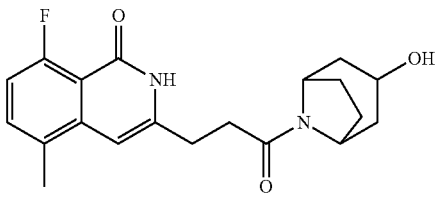 [SMILES: Cc1ccc(F)c2c(=O)[nH]c(CCC(=O)N3C4CCC3CC(O)C4)cc12]

The target compound was obtained according to Example 255, except that 3-(8-fluoro-5-methyl-1-oxo-1,2-dihydroisoquinolin-3-yl)propanoic acid and 8-azabicyclo[3.2.1]octan-3-ol HCl were used in place of 3-(8-fluoro-1-oxo-1,2-dihydroisoquinolin-3-yl)propanoic acid and 4-(piperidin-4-yloxy)benzonitrile HCl used in Example 255, respectively.

$^1$H NMR (300 MHz, CDCl$_3$) δ 10.48 (br, 1H), 7.38-7.33 (m, 1H), 6.95-6.89 (m, 1H), 6.32 (s, 1H), 4.75 (m, 1H), 4.18-4.13 (m, 2H), 3.00-2.94 (m, 2H), 2.78-2.71 (m, 2H), 2.43 (s, 3H), 2.01-1.95 (m, 4H), 1.40-1.19 (m, 4H).

<Example 270> Preparation of 8-fluoro-3-(3-(4-hydroxypiperidin-1-yl)-3-oxopropyl)-5-methylisoquinolin-1(2H)-one

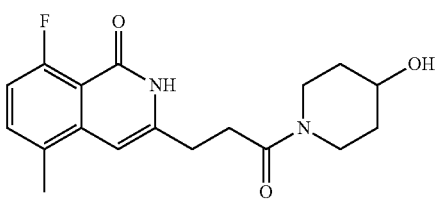 [SMILES: Cc1ccc(F)c2c(=O)[nH]c(CCC(=O)N3CCC(O)CC3)cc12]

The target compound was obtained according to Example 255, except that 3-(8-fluoro-5-methyl-1-oxo-1,2-dihydroisoquinolin-3-yl)propanoic acid and piperidin-4-ol were used in place of 3-(8-fluoro-1-oxo-1,2-dihydroisoquinolin-3-yl)propanoic acid and 4-(piperidin-4-yloxy)benzonitrile HCl used in Example 255, respectively.

$^1$H NMR (300 MHz, DMSO-d$_6$) δ 11.26 (br, 1H), 7.48-7.44 (m, 1H), 7.03-6.96 (m, 1H), 6.35 (s, 1H), 4.76-4.74 (m, 1H), 3.94-3.90 (m, 1H), 3.69-3.68 (m, 2H), 3.19-3.13 (m, 1H), 3.04-2.97 (m, 1H), 2.72 (m, 4H), 2.38 (s, 3H), 1.70 (m, 2H), 1.33-1.20 (m, 2H).

<Example 271> Preparation of 7-(3-(3-hydroxy-8-azabicyclo[3.2.1]octan-8-yl)propyl)-1,6-naphthyridin-5(6H)-one

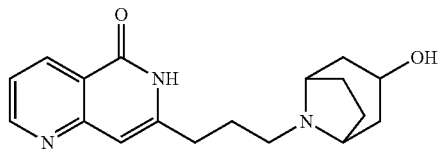 [SMILES: O=c1[nH]c(CCCN2C3CCC2CC(O)C3)cc2ncccc12]

The target compound was obtained according to Example 228, except that 8-azabicyclo[3.2.1]octan-3-ol HCl was used in place of 3-(4-chlorophenyl)-3,8-diazabicyclo[3.2.1]octane 2HCl used in Step 3 of Example 228.

$^1$H NMR (300 MHz, CDCl$_3$) δ 10.48 (br, 1H), 7.38-7.33 (m, 1H), 6.95-6.89 (m, 1H), 6.32 (s, 1H), 4.75 (m, 1H), 4.18-4.13 (m, 2H), 3.00-2.94 (m, 2H), 2.78-2.71 (m, 2H), 2.43 (s, 3H), 2.01-1.95 (m, 4H), 1.40-1.19 (m, 4H).

<Example 272> Preparation of 8-fluoro-3-(3-(3-hydroxy-8-azabicyclo[3.2.1]octan-8-yl)propyl)isoquinolin-1(2H)-one

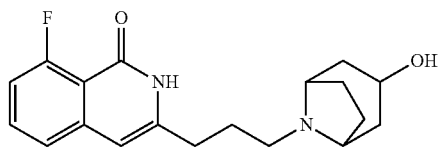 [SMILES: O=c1[nH]c(CCCN2C3CCC2CC(O)C3)cc2cccc(F)c12]

Step 1: Preparation of 8-fluoro-3-(3-(3-hydroxy-8-azabicyclo[3.2.1]octan-8-yl)propyl)-1H-isochromen-1-one

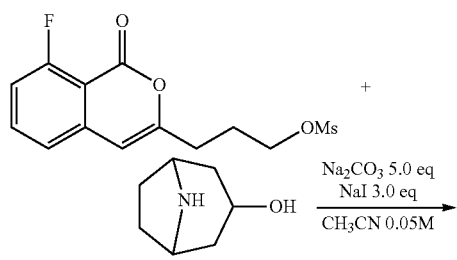

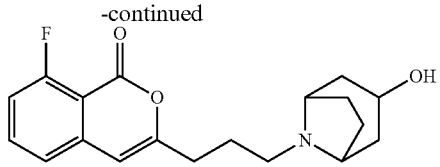

After dissolving 8-azabicyclo[3.2.1]octan-3-ol HCl (222 mg, 1.35 mmol) in CH$_3$CN (21.0 mL), Na$_2$CO$_3$ (552 mg, 5.2 mmol) was added at room temperature. 3-(8-Fluoro-1-oxo-1H-isochromen-3-yl)propyl methanesulfonate (313 mg, 1.04 mmol) and NaI (469 mg, 3.12 mmol) were added to the reaction solution and stirred at 80° C. for 18 hours. The reaction solution was diluted with EtOAc and washed with water. The organic solvent was dried over anhydrous MgSO$_4$, filtered, and then concentrated by evaporation under reduced pressure, and the resulting residue was recrystallized with MeOH to obtain the target compound, 8-fluoro-3-(3-(3-hydroxy-8-azabicyclo[3.2.1]octan-8-yl)propyl)-1H-isochromen-1-one (97.0 mg, 28%).

$^1$H NMR (300 MHz, DMSO-d$_6$) δ 7.87-7.80 (m, 1H), 7.41-7.32 (m, 2H), 6.65 (s, 1H), 4.96 (m, 1H), 3.98 (m, 3H), 2.97 (m, 2H), 2.61-2.57 (m, 2H), 2.10-1.87 (m, 8H), 1.75-1.72 (m, 2H).

Step 2: Preparation of 8-fluoro-3-(3-(3-hydroxy-8-azabicyclo[3.2.1]octan-8-yl)propyl)isoquinolin-1(2H)-one

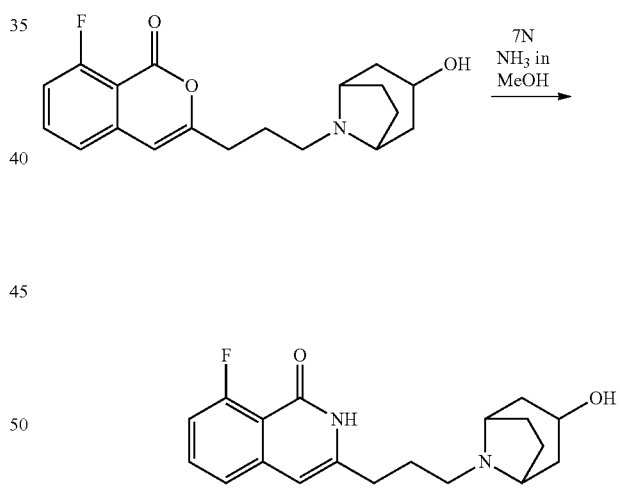

After dissolving 8-fluoro-3-(3-(3-hydroxy-8-azabicyclo[3.2.1]octan-8-yl)propyl)-1H-isochromen-1-one (97.0 mg, 0.29 mmol) in 7 N NH$_3$/MeOH (10.0 mL), the mixture was stirred at 80° C. for 16 hours. The reaction solution was cooled to room temperature, and then concentrated by distillation under reduced pressure, and the resulting solid was recrystallized with MeOH to obtain the target compound, 8-fluoro-3-(3-(3-hydroxy-8-azabicyclo[3.2.1]octan-8-yl)propyl)isoquinolin-1(2H)-one (73.0 mg, 75%).

$^1$H NMR (300 MHz, DMSO-d$_6$) δ 11.27 (br, 1H), 7.67-7.60 (m, 1H), 7.37 (d, 1H, J=7.8 Hz), 7.16-7.10 (m, 1H), 6.40 (s, 1H), 4.35 (m, 1H), 3.99 (m, 3H), 2.93 (m, 2H), 2.50 (m, 2H), 2.10-1.87 (m, 8H), 1.76-1.68 (m, 2H).

<Example 273> Preparation of 4-((8-(3-(8-fluoro-1-oxo-1,2-dihydroisoquinolin-3-yl)propyl)-8-azabicyclo[3.2.1]octan-3-yl)oxy)benzonitrile

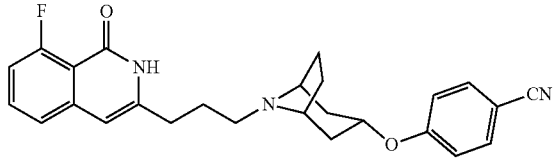 [SMILES: N#Cc1ccc(OC2CC3CCC(C2)N3CCCc2cc3cccc(F)c3c(=O)[nH]2)cc1]

The target compound was obtained according to Example 254, except that tert-butyl 3-hydroxy-8-azabicyclo[3.2.1]octan-8-carboxylate was used in place of tert-butyl 4-hydroxypiperidin-1-carboxylate used in Step 1 of Example 254.

$^1$H NMR (300 MHz, CDCl$_3$) δ 11.48 (br, 1H), 7.57-7.46 (m, 3H), 7.20-7.18 (m, 1H), 7.04-7.00 (m, 1H), 6.97-6.91 (m, 2H), 6.21 (s, 1H), 4.70-4.64 (m, 1H), 3.48-3.47 (m, 2H), 2.72-1.57 (m, 14H).

<Example 274> Preparation of 4-((8-(3-(8-fluoro-1-oxo-1,2-dihydroisoquinolin-3-yl)propanoyl)-8-azabicyclo[3.2.1]octan-3-yl)oxy)benzonitrile

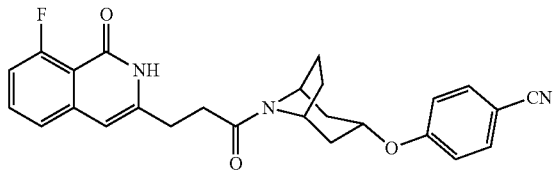 [SMILES: N#Cc1ccc(OC2CC3CCC(C2)N3C(=O)CCc2cc3cccc(F)c3c(=O)[nH]2)cc1]

The target compound was obtained according to Example 255, except that 4-((8-azabicyclo[3.2.1]octan-3-yl)oxy)benzonitrile HCl was used in place of 4-(piperidin-4-yloxy)benzonitrile HCl used in Example 255.

$^1$H NMR (300 MHz, CDCl$_3$) δ 10.17 (s, 1H), 7.57-7.49 (m, 3H), 7.21-7.18 (m, 1H), 7.05-7.01 (m, 1H), 6.90-6.88 (m, 2H), 6.24 (sm, 1H), 4.87-4.77 (m, 2H), 4.26-4.25 (m, 1H), 2.94-2.68 (m, 4H), 2.19-2.06 (m, 4H), 1.88-1.79 (m, 4H).

<Example 275> Preparation of N-(1-(3-(8-fluoro-5-methyl-1-oxo-1,2-dihydroisoquinolin-3-yl)propanoyl)azetidin-3-yl)cyclopropanecarboxamide

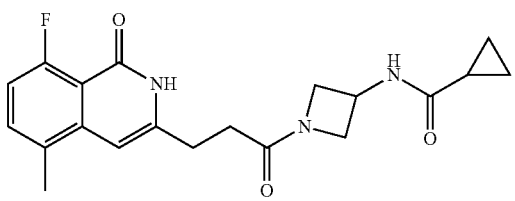 [SMILES: Cc1ccc(F)c2c(=O)[nH]c(CCC(=O)N3CC(NC(=O)C4CC4)C3)cc12]

Step 1: Preparation of tert-butyl 3-(cyclopropanecarboxamido)azetidin-1-carboxylate

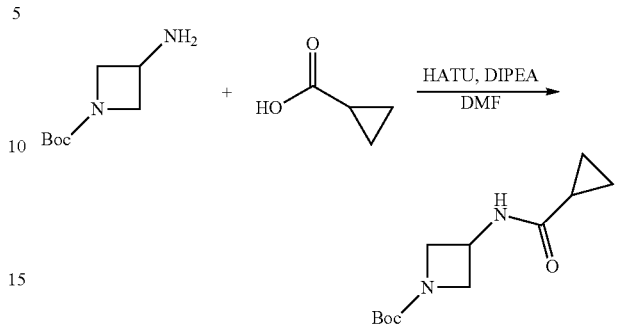

After dissolving 1-Boc-3-aminoazetidine (600 mg, 3.48 mmol), cyclopropanecarboxylic acid (0.33 mL, 4.18 mmol), and HATU (1.98 g, 5.22 mmol) in DMF (12 mL), DIPEA (1.8 mL, 10.4 mmol) was slowly added dropwise to the reaction solution, and the mixture was stirred at room temperature for 18 hours. The reaction solution was diluted with EtOAc and washed with water. The organic solvent was dried over anhydrous MgSO$_4$, filtered, and then concentrated by evaporation under reduced pressure, and the resulting residue was purified using silica gel chromatography to obtain the target compound, tert-butyl 3-(cyclopropanecarboxamido)azetidin-1-carboxylate (612 mg, 73%).

$^1$H NMR (300 MHz, CDCl$_3$) δ 6.15 (m, 1H), 4.70-4.63 (m, 1H), 4.27-4.22 (m, 2H), 3.77-3.72 (m, 2H), 1.44 (s, 9H), 1.40-1.33 (m, 1H), 0.97-0.96 (m, 2H), 0.79-0.76 (m, 2H).

Step 2: Preparation of N-(azetidin-3-yl)cyclopropanecarboxamide HCl

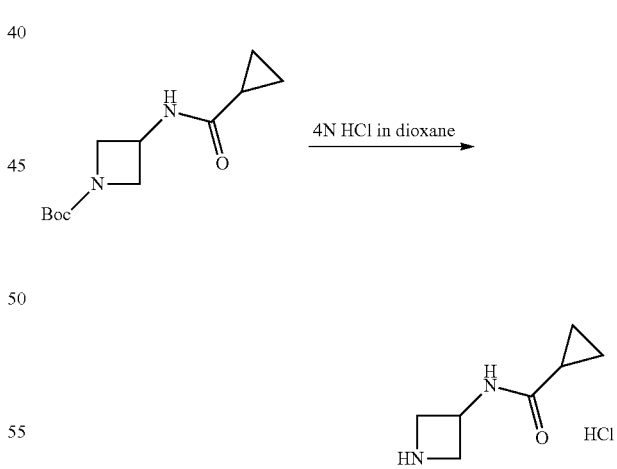

After dissolving tert-butyl 3-(cyclopropanecarboxamido)azetidin-1-carboxylate (610 mg, 2.54 mmol) in 4 N HCl/dioxane (13 mL), the mixture was stirred for 17 hours. The solid produced during the reaction was filtered and washed with EtOAc to obtain the target compound, N-(azetidin-3-yl)cyclopropanecarboxamide HCl (300 mg, 67%).

$^1$H NMR (300 MHz, DMSO-d$_6$) δ 6.45 (m, 1H), 4.68-4.60 (m, 1H), 4.27-4.22 (m, 2H), 3.77-3.72 (m, 2H), 1.40-1.33 (m, 1H), 0.97-0.96 (m, 2H), 0.79-0.76 (m, 2H).

Step 3: Preparation of N-(1-(3-(8-fluoro-5-methyl-1-oxo-1,2-dihydroisoquinolin-3-yl)propanoyl)azetidin-3-yl)cyclopropanecarboxamide

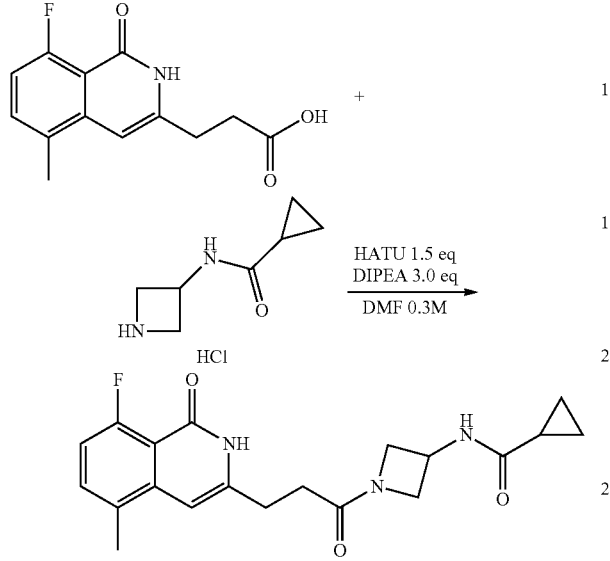

After dissolving 3-(8-fluoro-5-methyl-1-oxo-1,2-dihydroisoquinolin-3-yl)propanoic acid (60 mg, 0.24 mmol), N-(azetidin-3-yl)cyclopropanecarboxamide (85 mg, 0.24 mmol), and HATU (137 mg, 0.36 mmol) in DMF (0.8 mL) at room temperature, DIPEA (0.12 mL, 0.72 mmol) was slowly added dropwise to the reaction solution, and the mixture was stirred at room temperature for 19 hours. The reaction solution was diluted with EtOAc and washed with water. The organic solvent was dried over anhydrous MgSO$_4$, filtered, and then concentrated by evaporation under reduced pressure, and the resulting residue was purified using silica gel chromatography to obtain the target compound, N-(1-(3-(8-fluoro-5-methyl-1-oxo-1,2-dihydroisoquinolin-3-yl)propanoyl)azetidin-3-yl)cyclopropanecarboxamide (21 mg, 23%).

$^1$H NMR (300 MHz, CDCl$_3$) δ 11.30 (br, 1H), 8.73 (d, 1H, J=6.3 Hz), 7.49-7.45 (m, 1H), 7.03-6.97 (m, 1H), 6.34 (s, 1H), 4.46-4.35 (m, 2H), 4.12-4.06 (m, 1H), 3.95-3.90 (m, 1H), 3.73-3.68 (m, 1H), 2.73-2.68 (m, 2H), 2.46-2.44 (m, 2H), 2.38 (s, 3H), 1.53-1.49 (m, 1H), 0.68-0.66 (m, 4H).

<Example 276> Preparation of N-(1-(3-(8-fluoro-5-methyl-1-oxo-1,2-dihydroisoquinolin-3-yl)propanoyl)piperidin-4-yl)cyclopropanecarboxamide

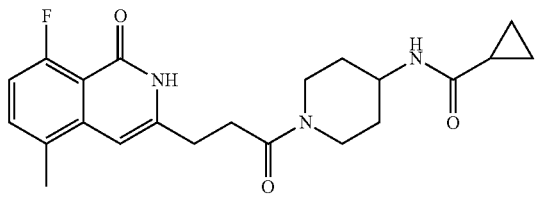 [SMILES: Cc1ccc(F)c2c(=O)[nH]c(CCC(=O)N3CCC(NC(=O)C4CC4)CC3)cc12]

Step 1: Preparation of tert-butyl (1-(3-(8-fluoro-5-methyl-1-oxo-1,2-dihydroisoquinolin-3-yl)propanoyl)piperidin-4-yl)carbamate

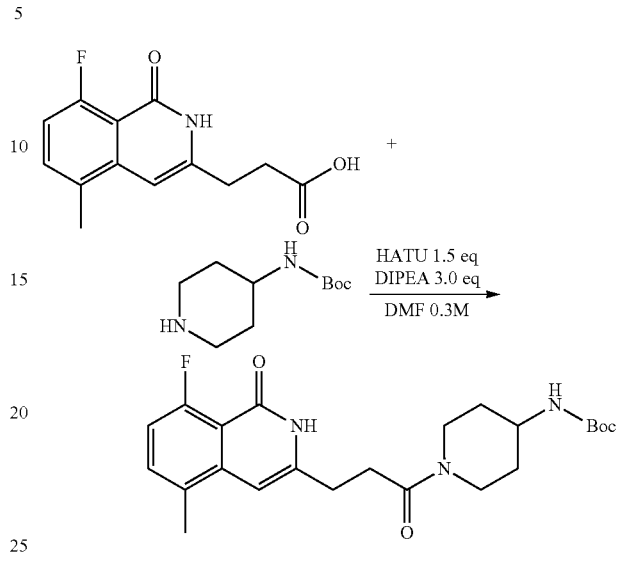

After dissolving 3-(8-fluoro-5-methyl-1-oxo-1,2-dihydroisoquinolin-3-yl)propanoic acid (350 mg, 1.40 mmol), tert-butyl piperidin-4-ylcarbamate (337 mg, 1.68 mmol), and HATU (801 mg, 2.1 mmol) in DMF (5.0 mL) at room temperature, DIPEA (0.72 mL, 4.2 mmol) was slowly added dropwise to the reaction solution, and the mixture was stirred at room temperature for 16 hours. The reaction solution was diluted with EtOAc and washed with water. The organic solvent was dried over anhydrous MgSO$_4$, filtered, and then concentrated by evaporation under reduced pressure, and the resulting solid was recrystallized with MeOH to obtain the target compound, tert-butyl (1-(3-(8-fluoro-5-methyl-1-oxo-1,2-dihydroisoquinolin-3-yl)propanoyl)piperidin-4-yl)carbamate (350 mg, 58%).

$^1$H NMR (300 MHz, CDCl$_3$) δ 10.49 (m, 1H), 7.37-7.33 (m, 1H), 6.96-6.89 (m, 1H), 6.30 (s, 1H), 4.59-4.54 (m, 1H), 4.43 (m, 1H), 3.81-3.77 (m, 1H), 3.66 (m, 1H), 3.14-3.07 (m, 1H), 2.95-2.93 (m, 2H), 2.83-2.76 (m, 2H), 2.42 (s, 3H), 2.02-1.94 (m, 2H), 1.44 (s, 9H), 1.38-1.24 (m, 2H).

Step 2: Preparation of 3-(3-(4-aminopiperidin-1-yl)-3-oxopropyl)-8-fluoro-5-methylisoquinolin-1(2H)-one HCl

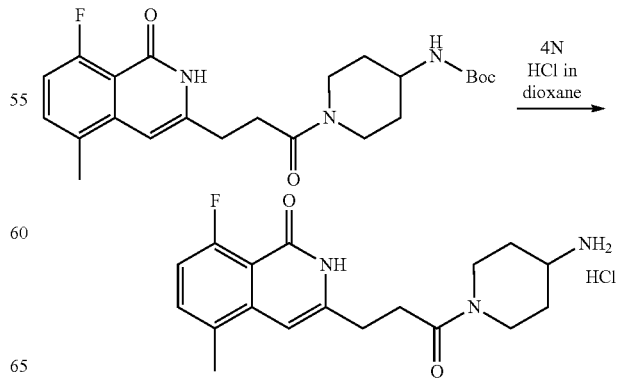

After dissolving tert-butyl (1-(3-(8-fluoro-5-methyl-1-oxo-1,2-dihydroisoquinolin-3-yl)propanoyl)piperidin-4-yl)carbamate (350 mg, 0.81 mmol) in 4 N HCl/dioxane (12 mL), the mixture was stirred at room temperature for 19 hours. The solid produced during the reaction was filtered and washed with EtOAc to obtain the target compound 3-(3-(4-aminopiperidin-1-yl)-3-oxopropyl)-8-fluoro-5-methylisoquinolin-1(2H)-one HCl (296 mg, 99%).

$^1$H NMR (300 MHz, DMSO-$d_6$) δ 11.26 (s, 1H), 8.35 (s, 2H), 7.46-7.45 (m, 1H), 7.03-6.97 (m, 1H), 6.37 (s, 1H), 4.38 (d, 1H, J=12.3 Hz), 3.97 (d, 1H, J=13.2 Hz), 3.24 (m, 1H), 3.10-3.02 (m, 1H), 2.74 (m, 4H), 2.65-2.62 (m, 1H), 2.38 (S, 3H), 1.95 (m, 2H), 1.49-1.34 (m, 2H).

Step 3: Preparation of N-(1-(3-(8-fluoro-5-methyl-1-oxo-1,2-dihydroisoquinolin-3-yl)propanoyl)piperidin-4-yl)cyclopropanecarboxamide

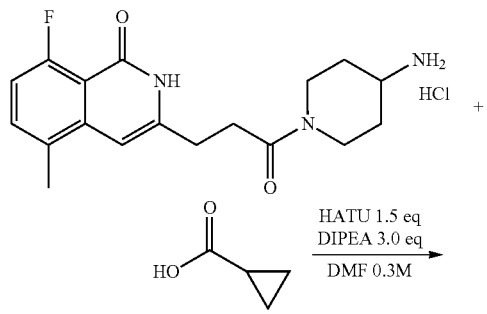

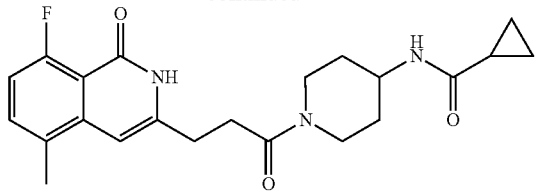

After dissolving 3-(3-(4-aminopiperidin-1-yl)-3-oxopropyl)-8-fluoro-5-methylisoquinolin-1(2H)-one (100 mg, 0.27 mmol), cyclopropanecarboxylic acid (0.03 mg, 0.41 mmol), and HATU (155 mg, 0.41 mmol) in DMF (0.9 mL) at room temperature, DIPEA (0.14 mL, 0.81 mmol) was slowly added dropwise to the reaction solution, and the mixture was stirred at room temperature for 19 hours. The reaction solution was diluted with EtOAc and washed with water. The organic solvent was dried over anhydrous $MgSO_4$, filtered, and then concentrated by evaporation under reduced pressure, and the resulting solid was recrystallized with MeOH to obtain the target compound, N-(1-(3-(8-fluoro-5-methyl-1-oxo-1,2-dihydroisoquinolin-3-yl)propanoyl)piperidin-4-yl)cyclopropanecarboxamide (44 mg, 40%).

$^1$H NMR (300 MHz, DMSO-$d_6$) δ 11.26 (br, 1H), 8.03 (d, 1H, J=6.6 Hz), 7.48-7.44 (m, 1H), 7.03-6.96 (m, 1H), 6.36 (s, 1H), 4.24-4.20 (m, 1H), 3.88-3.83 (m, 2H), 3.14-3.06 (m, 1H), 2.80-2.73 (m, 5H), 2.38 (s, 3H), 1.80-1.72 (m, 2H), 1.52 (m, 1H), 1.31-1.18 (m, 2H), 0.64-0.62 (m, 4H).

The chemical structures of the compounds prepared in Examples 1 to 276 are shown in Table 1 below.

TABLE 1

| Example | | |
|---|---|---|
| 1 | 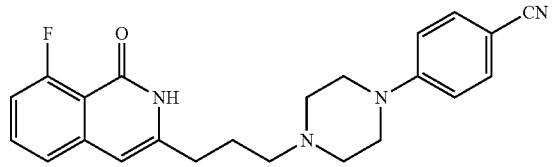 | 4-(4-(3-(8-fluoro-1-oxo-1,2-dihydroisoquinolin-3-yl)propyl)piperazin-1-yl)benzonitrile |
| 2 | 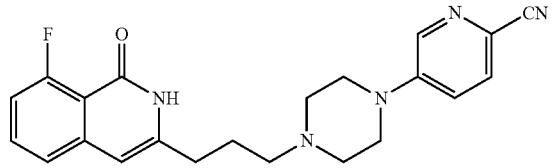 [SMILES: N#Cc1ccc(N2CCN(CCCc3cc4cccc(F)c4c(=O)[nH]3)CC2)cn1] | 5-(4-(3-(8-fluoro-1-oxo-1,2-dihydroisoquinolin-3-yl)propyl)piperazin-1-yl)picolinonitrile |
| 3 | 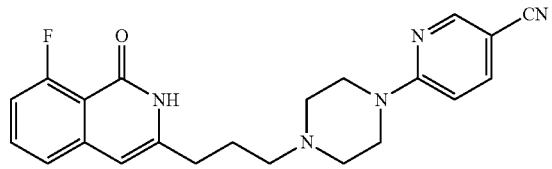 [SMILES: N#Cc1ccc(N2CCN(CCCc3cc4cccc(F)c4c(=O)[nH]3)CC2)nc1] | 6-(4-(3-(8-fluoro-1-oxo-1,2-dihydroisoquinolin-3-yl)propyl)piperazin-1-yl)nicotinonitrile |
| 4 | 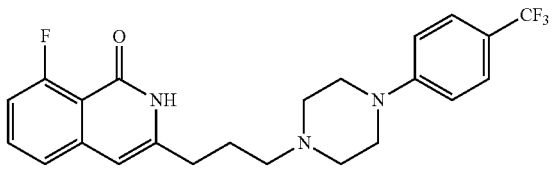 [SMILES: O=c1[nH]c(CCCN2CCN(c3ccc(C(F)(F)F)cc3)CC2)cc2cccc(F)c12] | 8-fluoro-3-(3-(4-(4-(trifluoromethyl)phenyl)piperazin-1-yl)propyl)isoquinolin-1(2H)-one |

TABLE 1-continued

| Example | | |
|---|---|---|
| 5 | 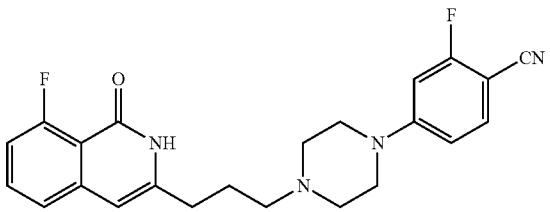 [SMILES: N#Cc1ccc(N2CCN(CCCc3cc4cccc(F)c4c(=O)[nH]3)CC2)cc1F] | 2-fluoro-4-(4-(3-(8-fluoro-1-oxo-1,2-dihydroisoquinolin-3-yl)propyl)piperazin-1-yl)benzonitrile |
| 6 | 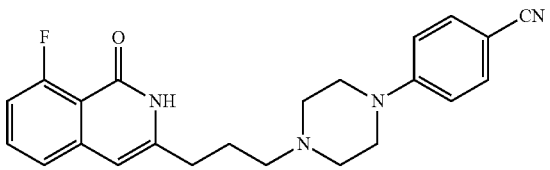 [SMILES: N#Cc1ccc(N2CCN(CCCc3cc4cccc(F)c4c(=O)[nH]3)CC2)cc1] | 4-(4-(3-(8-fluoro-1-oxo-1,2-dihydroisoquinolin-3-yl)propyl)piperazin-1-yl)benzonitrile hydrochloride |
| 7 | 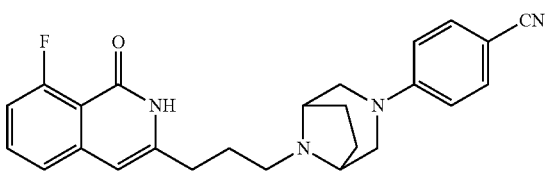 [SMILES: N#Cc1ccc(N2CC3CCC(C2)N3CCCc2cc3cccc(F)c3c(=O)[nH]2)cc1] | 4-(8-(3-(8-fluoro-1-oxo-1,2-dihydroisoquinolin-3-yl)propyl)-3,8-diazabicyclo[3.2.1]octan-3-yl)benzonitrile |
| 8 | 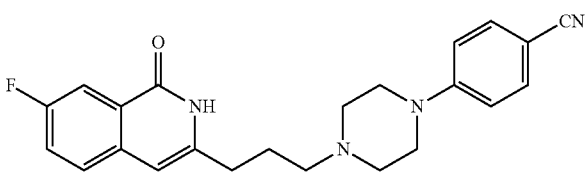 [SMILES: N#Cc1ccc(N2CCN(CCCc3cc4ccc(F)cc4c(=O)[nH]3)CC2)cc1] | 4-(4-(3-(7-fluoro-1-oxo-1,2-dihydroisoquinolin-3-yl)propyl)piperazin-1-yl)benzonitrile |
| 9 | 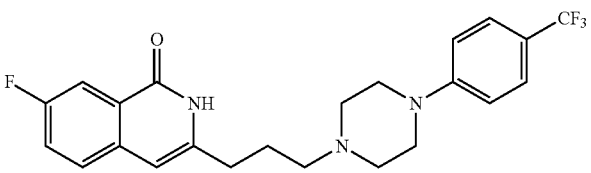 [SMILES: O=c1[nH]c(CCCN2CCN(c3ccc(C(F)(F)F)cc3)CC2)cc2ccc(F)cc12] | 7-fluoro-3-(3-(4-(4-(trifluoromethyl)phenyl)piperazin-1-yl)propyl)isoquinolin-1(2H)-one |
| 10 | 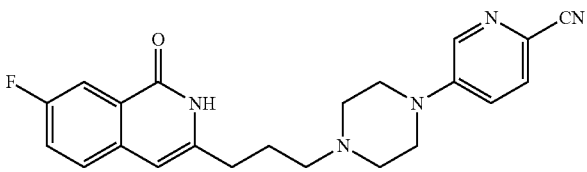 [SMILES: N#Cc1ccc(N2CCN(CCCc3cc4ccc(F)cc4c(=O)[nH]3)CC2)cn1] | 5-(4-(3-(7-fluoro-1-oxo-1,2-dihydroisoquinolin-3-yl)propyl)piperazin-1-yl)picolinonitrile |
| 11 | 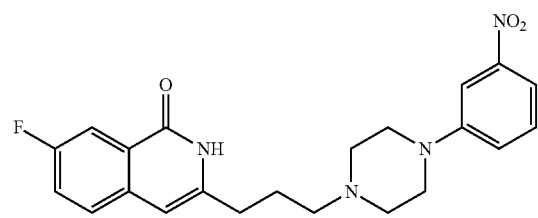 | 7-fluoro-3-(3-(4-(3-nitrophenyl)piperazin-1-yl)propyl)isoquinolin-1(2H)-one |
| 12 | 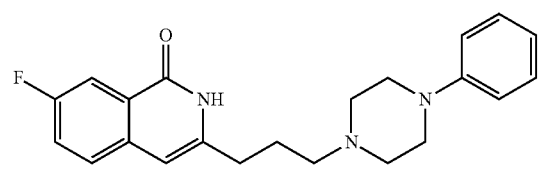 [SMILES: O=c1[nH]c(CCCN2CCN(c3ccccc3)CC2)cc2ccc(F)cc12] | 7-fluoro-3-(3-(4-phenylpiperazin-1-yl)propyl)isoquinolin-1(2H)-one |

TABLE 1-continued

| Example | | |
|---|---|---|
| 13 | 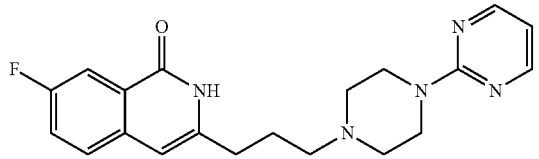 [SMILES: O=c1[nH]c(CCCN2CCN(c3ncccn3)CC2)cc2ccc(F)cc12] | 7-fluoro-3-(3-(4-(pyrimidin-2-yl)piperazin-1-yl)propyl)isoquinolin-1(2H)-one |
| 14 | 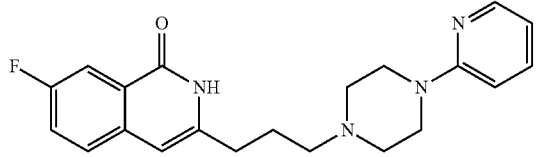 [SMILES: O=c1[nH]c(CCCN2CCN(c3ccccn3)CC2)cc2ccc(F)cc12] | 7-fluoro-3-(3-(4-(pyridin-2-yl)piperazin-1-yl)propyl)isoquinolin-1(2H)-one |
| 15 | 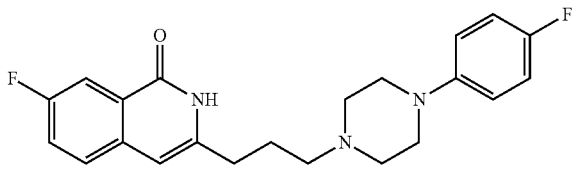 [SMILES: O=c1[nH]c(CCCN2CCN(c3ccc(F)cc3)CC2)cc2ccc(F)cc12] | 7-fluoro-3-(3-(4-(4-fluorophenyl)piperazin-1-yl)propyl)isoquinolin-1(2H)-one |
| 16 | 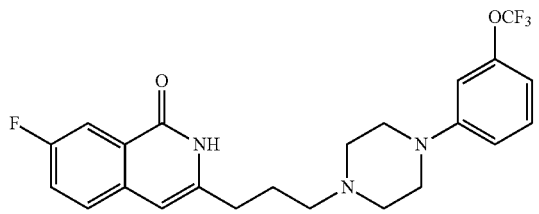 [SMILES: O=c1[nH]c(CCCN2CCN(c3cccc(OC(F)(F)F)c3)CC2)cc2ccc(F)cc12] | 7-fluoro-3-(3-(4-(3-(trifluoromethoxy)phenyl)piperazin-1-yl)propyl)isoquinolin-1(2H)-one |
| 17 | 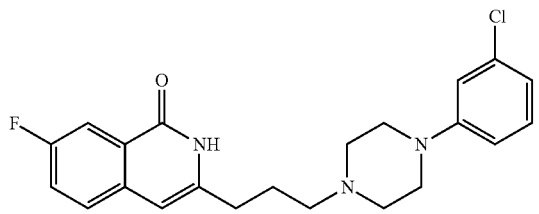 [SMILES: O=c1[nH]c(CCCN2CCN(c3cccc(Cl)c3)CC2)cc2ccc(F)cc12] | 3-(3-(4-(3-chlorophenyl)piperazin-1-yl)propyl)-7-fluoroisoquinolin-1(2H)-one |
| 18 | 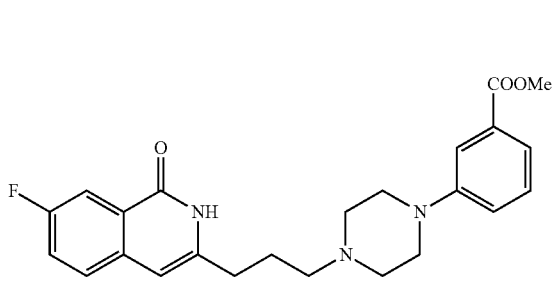 [SMILES: COC(=O)c1cccc(N2CCN(CCCc3cc4ccc(F)cc4c(=O)[nH]3)CC2)c1] | methyl 3-(4-(3-(7-fluoro-1-oxo-1,2-dihydroisoquinolin-3-yl)propyl)piperazin-1-yl)benzoate |
| 19 | 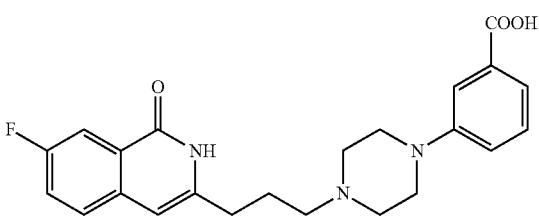 [SMILES: O=C(O)c1cccc(N2CCN(CCCc3cc4ccc(F)cc4c(=O)[nH]3)CC2)c1] | 3-(4-(3-(7-fluoro-1-oxo-1,2-dihydroisoquinolin-3-yl)propyl)piperazin-1-yl)benzoic acid |

TABLE 1-continued

| Example | | |
|---|---|---|
| 20 | 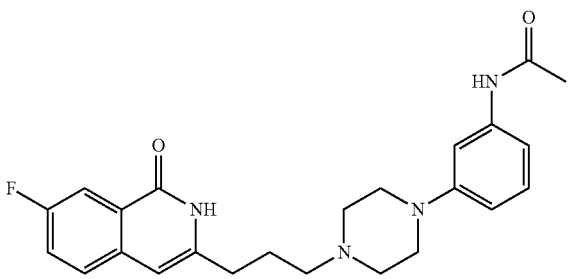 [SMILES: CC(=O)Nc1cccc(N2CCN(CCCc3cc4ccc(F)cc4c(=O)[nH]3)CC2)c1] | N-(3-(4-(3-(7-fluoro-1-oxo-1,2-dihydroisoquinolin-3-yl)propyl)piperazin-1-yl)phenyl)acetamide |
| 21 | 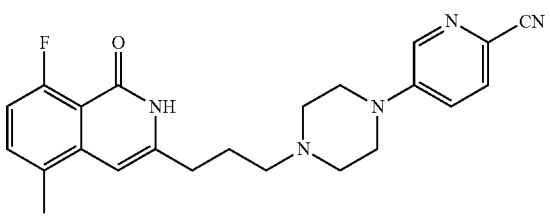 [SMILES: Cc1ccc(F)c2c(=O)[nH]c(CCCN3CCN(c4ccc(C#N)nc4)CC3)cc12] | 5-(4-(3-(8-fluoro-5-methyl-1-oxo-1,2-dihydroisoquinolin-3-yl)propyl)piperazin-1-yl)picolinonitrile |
| 22 | 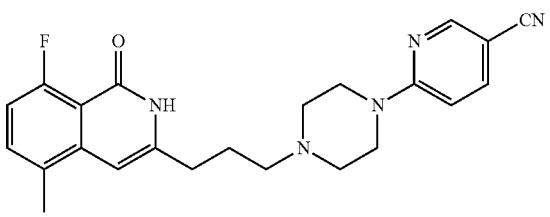 [SMILES: Cc1ccc(F)c2c(=O)[nH]c(CCCN3CCN(c4ccc(C#N)cn4)CC3)cc12] | 6-(4-(3-(8-fluoro-5-methyl-1-oxo-1,2-dihydroisoquinolin-3-yl)propyl)piperazin-1-yl)nicotinonitrile |
| 23 | 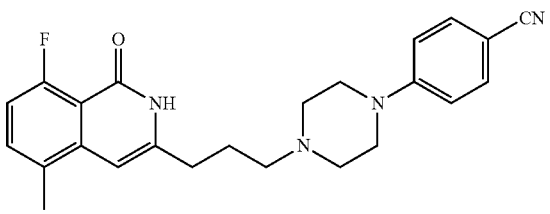 [SMILES: Cc1ccc(F)c2c(=O)[nH]c(CCCN3CCN(c4ccc(C#N)cc4)CC3)cc12] | 4-(4-(3-(8-fluoro-5-methyl-1-oxo-1,2-dihydroisoquinolin-3-yl)propyl)piperazin-1-yl)benzonitrile |
| 24 | 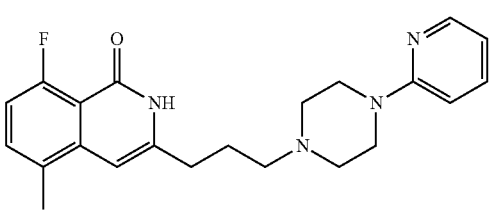 [SMILES: Cc1ccc(F)c2c(=O)[nH]c(CCCN3CCN(c4ccccn4)CC3)cc12] | 8-fluoro-5-methyl-3-(3-(4-(pyridin-2-yl)piperazin-1-yl)propyl)isoquinolin-1(2H)-one |
| 25 | 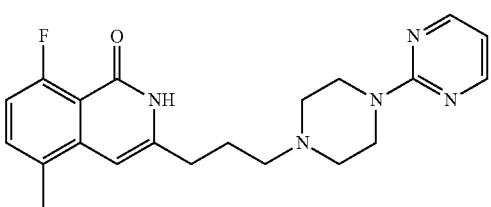 [SMILES: Cc1ccc(F)c2c(=O)[nH]c(CCCN3CCN(c4ncccn4)CC3)cc12] | 8-fluoro-5-methyl-3-(3-(4-(pyrimidin-2-yl)piperazin-1-yl)propyl)isoquinolin-1(2H)-one |
| 26 | 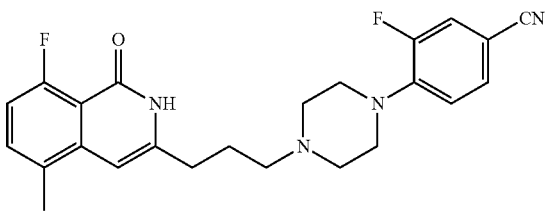 [SMILES: Cc1ccc(F)c2c(=O)[nH]c(CCCN3CCN(c4ccc(C#N)cc4F)CC3)cc12] | 3-fluoro-4-(4-(3-(8-fluoro-5-methyl-1-oxo-1,2-dihydroisoquinolin-3-yl)propyl)piperazin-1-yl)benzonitrile |

TABLE 1-continued

| Example | | |
|---|---|---|
| 27 | 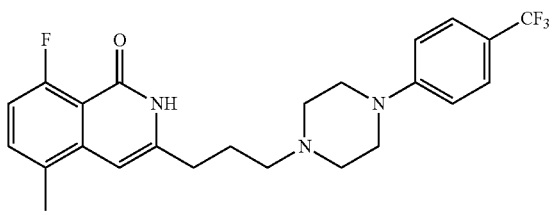 [SMILES: Cc1ccc(F)c2c(=O)[nH]c(CCCN3CCN(c4ccc(C(F)(F)F)cc4)CC3)cc12] | 8-fluoro-5-methyl-3-(3-(4-(4-(trifluoromethyl)phenyl)piperazin-1-yl)propyl)iso-quinolin-1(2H)-one |
| 28 | 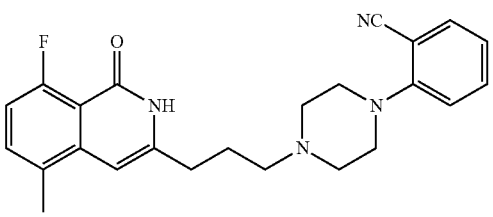 [SMILES: Cc1ccc(F)c2c(=O)[nH]c(CCCN3CCN(c4ccccc4C#N)CC3)cc12] | 2-(4-(3-(8-fluoro-5-methyl-1-oxo-1,2-dihydroisoquinolin-3-yl)propyl)piperazin-1-yl)benzonitrile |
| 29 | 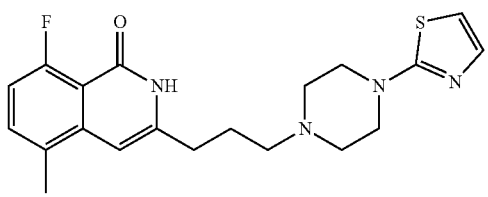 [SMILES: Cc1ccc(F)c2c(=O)[nH]c(CCCN3CCN(c4nccs4)CC3)cc12] | 8-fluoro-5-methyl-3-(3-(4-(thiazole-2-yl)piperazin-1-yl)propyl)isoquinolin-1(2H)-one |
| 30 | 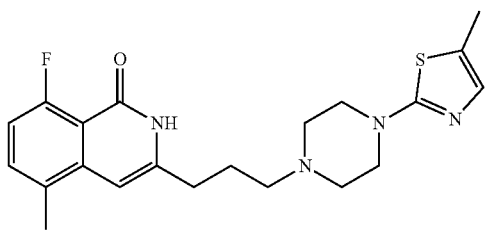 [SMILES: Cc1cnc(N2CCN(CCCc3cc4c(C)ccc(F)c4c(=O)[nH]3)CC2)s1] | 8-fluoro-5-methyl-3-(3-(4-(5-methylthiazole-2-yl)piperazin-1-yl)propyl)isoquinolin-1(2H)-one |
| 31 | 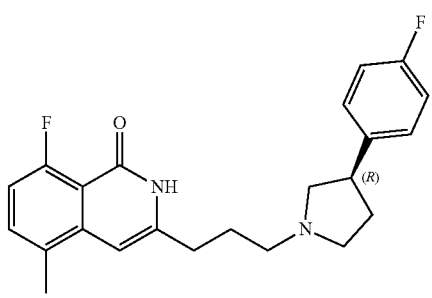 | (R)-8-fluoro-3-(3-(3-(4-fluorophenyl)pyrrolidin-1-yl)propyl)-5-methylisoquinolin-1(2H)-one |
| 32 | 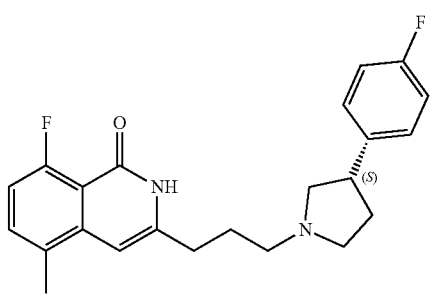 | (S)-8-fluoro-3-(3-(3-(4-fluorophenyl)pyrrolidin-1-yl)propyl)-5-methylisoquinolin-1(2H)-one |

TABLE 1-continued

| Example | | |
|---|---|---|
| 33 | 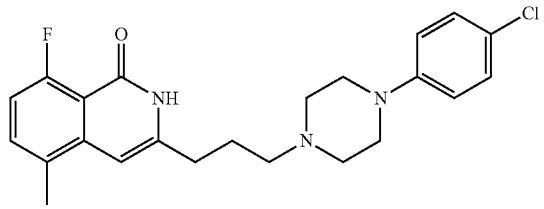 [SMILES: Cc1ccc(F)c2c(=O)[nH]c(CCCN3CCN(c4ccc(Cl)cc4)CC3)cc12] | 3-(3-(4-(4-chlorophenyl)piperazin-1-yl)propyl)-8-fluoro-5-methylisoquinolin-1(2H)-one |
| 34 | 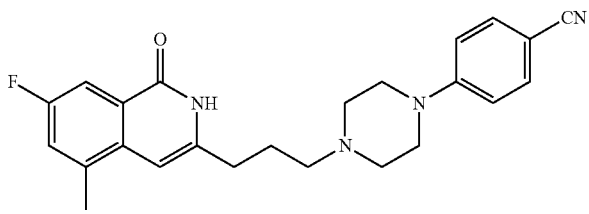 [SMILES: Cc1cc(F)cc2c(=O)[nH]c(CCCN3CCN(c4ccc(C#N)cc4)CC3)cc12] | 4-(4-(3-(7-fluoro-5-methyl-1-oxo-1,2-dihydroisoquinolin-3-yl)propyl)piperazin-1-yl)benzonitrile |
| 35 | 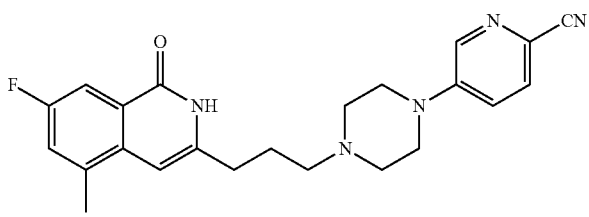 [SMILES: Cc1cc(F)cc2c(=O)[nH]c(CCCN3CCN(c4ccc(C#N)nc4)CC3)cc12] | 5-(4-(3-(7-fluoro-5-methyl-1-oxo-1,2-dihydroisoquinolin-3-yl)propyl)piperazin-1-yl)picolinonitrile |
| 36 | 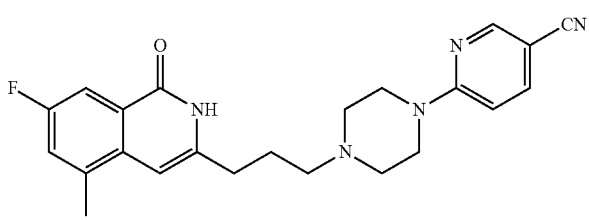 [SMILES: Cc1cc(F)cc2c(=O)[nH]c(CCCN3CCN(c4ccc(C#N)cn4)CC3)cc12] | 6-(4-(3-(7-fluoro-5-methyl-1-oxo-1,2-dihydroisoquinolin-3-yl)propyl)piperazin-1-yl)nicotinonitrile |
| 37 | 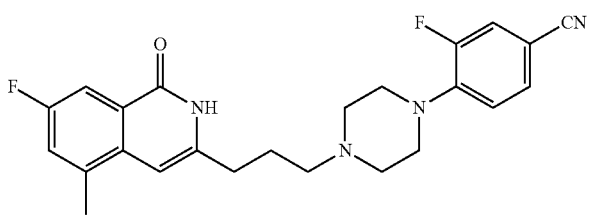 [SMILES: Cc1cc(F)cc2c(=O)[nH]c(CCCN3CCN(c4ccc(C#N)cc4F)CC3)cc12] | 3-fluoro-4-(4-(3-(7-fluoro-5-methyl-1-oxo-1,2-dihydroisoquinolin-3-yl)propyl)piperazin-1-yl)benzonitrile |
| 38 | 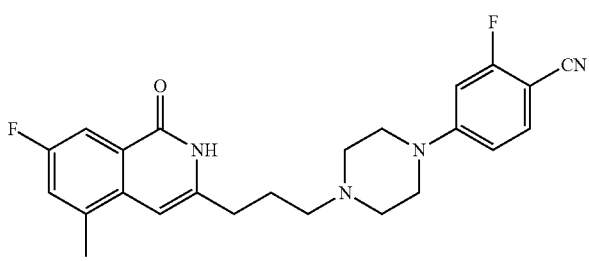 [SMILES: Cc1cc(F)cc2c(=O)[nH]c(CCCN3CCN(c4ccc(C#N)c(F)c4)CC3)cc12] | 2-fluoro-4-(4-(3-(7-fluoro-5-methyl-1-oxo-1,2-dihydroisoquinolin-3-yl)propyl)piperazin-1-yl)benzonitrile |
| 39 | 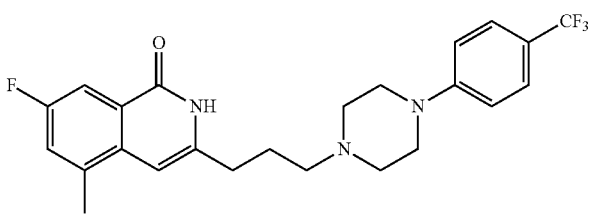 [SMILES: Cc1cc(F)cc2c(=O)[nH]c(CCCN3CCN(c4ccc(C(F)(F)F)cc4)CC3)cc12] | 7-fluoro-5-methyl-3-(3-(4-(4-(trifluoromethyl)phenyl)piperazin-1-yl)propyl)isoquinolin-1(2H)-one |

TABLE 1-continued

| Example | | |
|---|---|---|
| 40 | 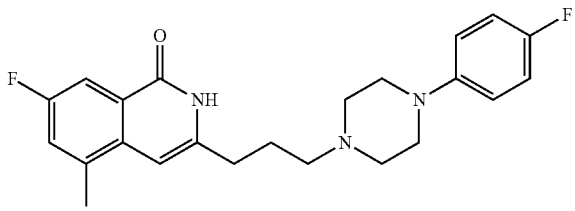 [SMILES: Cc1cc(F)cc2c(=O)[nH]c(CCCN3CCN(c4ccc(F)cc4)CC3)cc12] | 7-fluoro-3-(3-(4-(4-fluorophenyl)piperazin-1-yl)propyl)-5-methyl-isoquinolin-1(2H)-one |
| 41 | 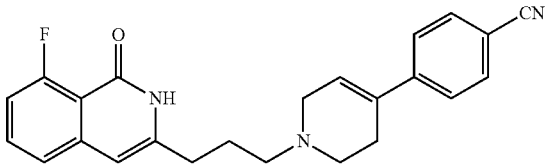 [SMILES: N#Cc1ccc(C2=CCN(CCCc3cc4cccc(F)c4c(=O)[nH]3)CC2)cc1] | 4-(1-(3-(8-fluoro-1-oxo-1,2-dihydroisoquinolin-3-yl)propyl)-1,2,3,6-tetrahydropyridin-4-yl)benzonitrile |
| 42 | 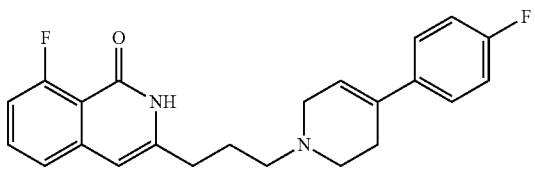 [SMILES: O=c1[nH]c(CCCN2CC=C(c3ccc(F)cc3)CC2)cc2cccc(F)c12] | 8-fluoro-3-(3-(4-(4-fluorophenyl)-3,6-dihydropyridin-1(2H)-yl)propyl)isoquinolin-1(2H)-one |
| 43 | 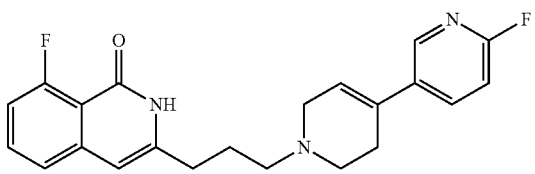 | 8-fluoro-3-(3-(6-fluoro-3',6'-dihydro-[3,4'-bipyridine]-1'(2'H)-yl)propyl)isoquinolin-1(2H)-one |
| 44 | 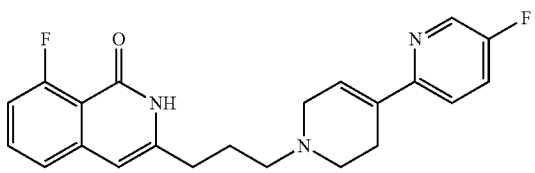 [SMILES: O=c1[nH]c(CCCN2CC=C(c3ccc(F)cn3)CC2)cc2cccc(F)c12] | 8-fluoro-3-(3-(5-fluoro-3',6'-dihydro-[2,4'-bipyridine]-1'(2'H)-yl)propyl)isoquinolin-1(2H)-one |
| 45 | 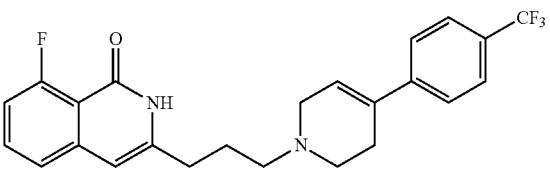 [SMILES: O=c1[nH]c(CCCN2CC=C(c3ccc(C(F)(F)F)cc3)CC2)cc2cccc(F)c12] | 8-fluoro-3-(3-(4-(4-(trifluoromethyl)phenyl)-3,6-dihydropyridin-1(2H)-yl)propyl)isoquinolin-1(2H)-one |
| 46 | 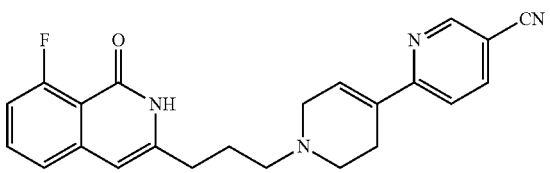 [SMILES: N#Cc1ccc(C2=CCN(CCCc3cc4cccc(F)c4c(=O)[nH]3)CC2)nc1] | 1'-(3-(8-fluoro-1-oxo-1,2-dihydroisoquinolin-3-yl)propyl)-1',2',3',6'-tetrahydro-[2,4'-bipyridine]-5-carbonitrile |
| 47 | 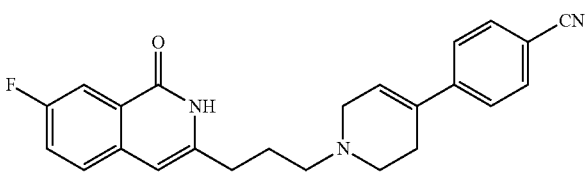 [SMILES: N#Cc1ccc(C2=CCN(CCCc3cc4ccc(F)cc4c(=O)[nH]3)CC2)cc1] | 4-(1-(3-(7-fluoro-1-oxo-1,2-dihydroisoquinolin-3-yl)propyl)-1,2,3,6-tetrahydropyridin-4-yl)benzonitrile |

TABLE 1-continued

| Example | | |
|---|---|---|
| 48 | 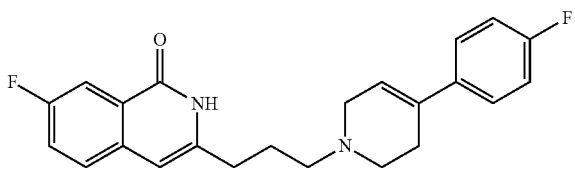 [SMILES: O=c1[nH]c(CCCN2CC=C(c3ccc(F)cc3)CC2)cc2ccc(F)cc12] | 7-fluoro-3-(3-(4-(4-fluorophenyl)-3,6-dihydropyridin-1(2H)-yl)propyl)isoquinolin-1(2H)-one |
| 49 | 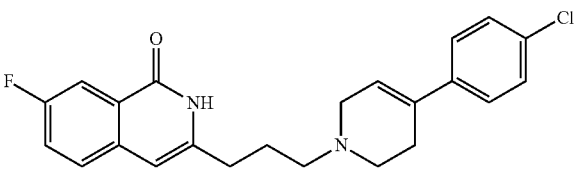 [SMILES: O=c1[nH]c(CCCN2CC=C(c3ccc(Cl)cc3)CC2)cc2ccc(F)cc12] | 3-(3-(4-(4-chlorophenyl)-3,6-dihydropyridin-1(2H)-yl)propyl)-7-fluoroisoquinolin-1(2H)-one |
| 50 | 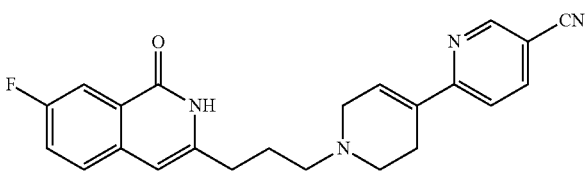 [SMILES: N#Cc1ccc(C2=CCN(CCCc3cc4ccc(F)cc4c(=O)[nH]3)CC2)nc1] | 1'-(3-(7-fluoro-1-oxo-1,2-dihydroisoquinolin-3-yl)propyl)-1',2',3',6'-tetrahydro-[2,4'-bipyridine]-5-carbonitrile |
| 51 | 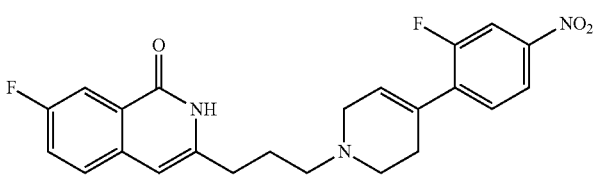 [SMILES: O=c1[nH]c(CCCN2CC=C(c3ccc([N+](=O)[O-])cc3F)CC2)cc2ccc(F)cc12] | 7-fluoro-3-(3-(4-(2-fluoro-4-nitrophenyl)-3,6-dihydropyridin-1(2H)-yl)propyl)isoquinolin-1(2H)-one |
| 52 | 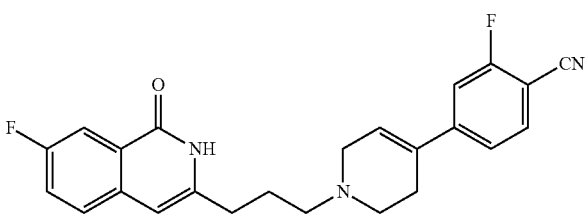 [SMILES: N#Cc1ccc(C2=CCN(CCCc3cc4ccc(F)cc4c(=O)[nH]3)CC2)cc1F] | 2-fluoro-4-(1-(3-(7-fluoro-1-oxo-1,2-dihydroisoquinolin-3-yl)propyl)-1,2,3,6-tetrahydropyridin-4-yl)benzonitrile |
| 53 | 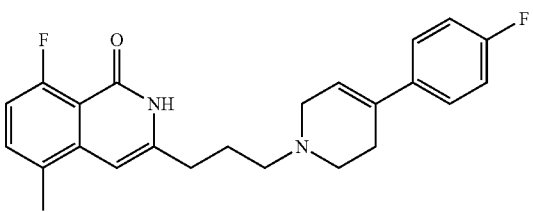 [SMILES: Cc1ccc(F)c2c(=O)[nH]c(CCCN3CC=C(c4ccc(F)cc4)CC3)cc12] | 8-fluoro-3-(3-(4-(4-fluorophenyl)-3,6-dihydropyridin-1(2H)-yl)propyl)-5-methylisoquinolin-1(2H)-one |
| 54 | 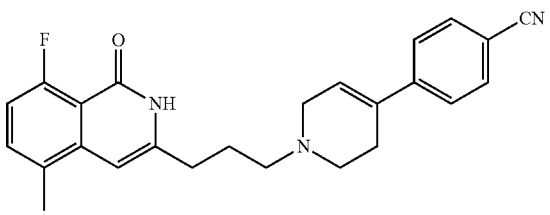 [SMILES: Cc1ccc(F)c2c(=O)[nH]c(CCCN3CC=C(c4ccc(C#N)cc4)CC3)cc12] | 4-(1-(3-(8-fluoro-5-methyl-1-oxo-1,2-dihydroisoquinolin-3-yl)propyl)-1,2,3,6-tetrahydropyridin-4-yl)benzonitrile |

TABLE 1-continued

| Example | | |
|---|---|---|
| 55 | 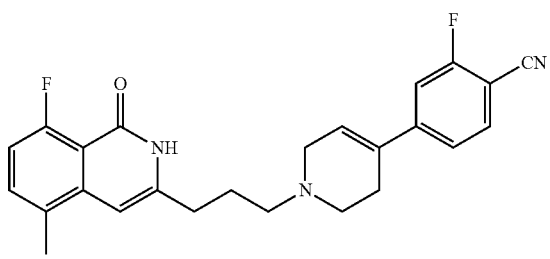 [SMILES: Cc1ccc(F)c2c(=O)[nH]c(CCCN3CC=C(c4ccc(C#N)c(F)c4)CC3)cc12] | 2-fluoro-4-(1-(3-(8-fluoro-5-methyl-1-oxo-1,2-dihydroisoquinolin-3-yl)propyl)-1,2,3,6-tetrahydropyridin-4-yl)benzonitrile |
| 56 | 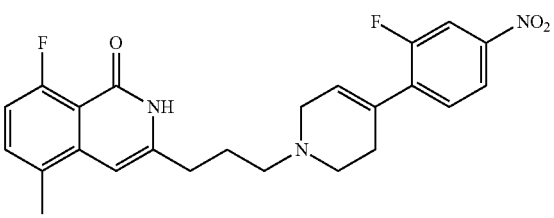 [SMILES: Cc1ccc(F)c2c(=O)[nH]c(CCCN3CC=C(c4ccc([N+](=O)[O-])cc4F)CC3)cc12] | 8-fluoro-3-(3-(4-(2-fluoro-4-nitrophenyl)-3,6-dihydropyridin-1(2H)-yl)propyl)-5-methylisoquinolin-1(2H)-one |
| 57 | 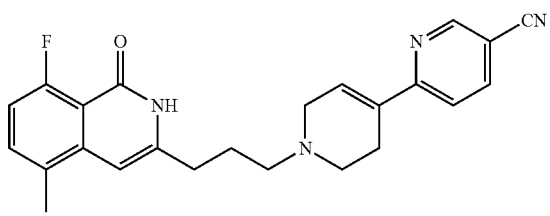 [SMILES: Cc1ccc(F)c2c(=O)[nH]c(CCCN3CC=C(c4ccc(C#N)cn4)CC3)cc12] | 1'-(3-(8-fluoro-5-methyl-1-oxo-1,2-dihydroisoquinolin-3-yl)propyl)-1',2',3',6'-tetrahydro-[2,4'-bipyridine]-5-carbonitrile |
| 58 | 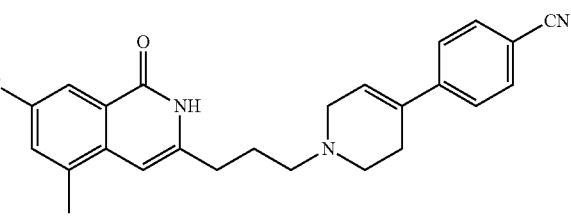 | 4-(1-(3-(7-fluoro-5-methyl-1-oxo-1,2-dihydroisoquinolin-3-yl)propyl)-1,2,3,6-tetrahydropyridin-4-yl)benzonitrile |
| 59 | 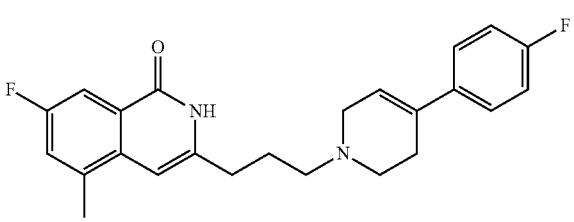 [SMILES: Cc1cc(F)cc2c(=O)[nH]c(CCCN3CC=C(c4ccc(F)cc4)CC3)cc12] | 7-fluoro-3-(3-(4-(4-fluorophenyl)-3,6-dihydropyridin-1(2H)-yl)propyl)-5-methylisoquinolin-1(2H)-one |
| 60 | 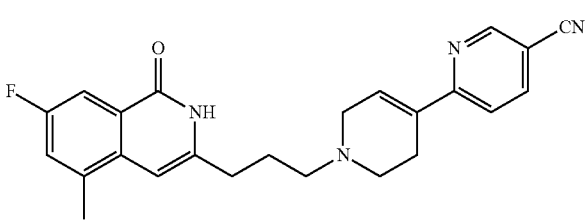 [SMILES: Cc1cc(F)cc2c(=O)[nH]c(CCCN3CC=C(c4ccc(C#N)cn4)CC3)cc12] | 1'-(3-(7-fluoro-5-methyl-1-oxo-1,2-dihydroisoquinolin-3-yl)propyl)-1',2',3',6'-tetrahydro-[2,4'-bipyridine]-5-carbonitrile |
| 61 | 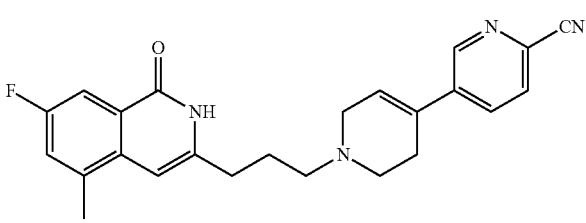 [SMILES: Cc1cc(F)cc2c(=O)[nH]c(CCCN3CC=C(c4ccc(C#N)nc4)CC3)cc12] | 1'-(3-(7-fluoro-5-methyl-1-oxo-1,2-dihydroisoquinolin-3-yl)propyl)-1',2',3',6'-tetrahydro-[3,4'-bipyridine]-6-carbonitrile |

TABLE 1-continued

| Example | | |
|---|---|---|
| 62 | 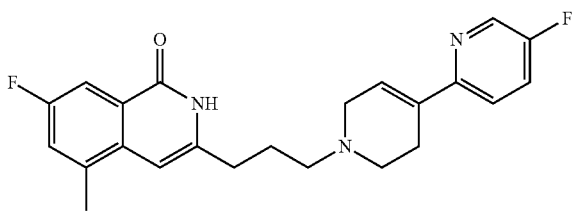 [SMILES: Cc1cc(F)cc2c(=O)[nH]c(CCCN3CC=C(c4ccc(F)cn4)CC3)cc12] | 7-fluoro-3-(3-(5-fluoro-3',6'-dihydro-[2,4'-bipyridine]-1'(2'H)-yl)propyl)-5-methylisoquinolin-1(2H)-one |
| 63 | 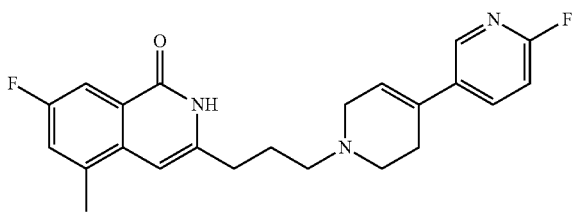 [SMILES: Cc1cc(F)cc2c(=O)[nH]c(CCCN3CC=C(c4ccc(F)nc4)CC3)cc12] | 7-fluoro-3-(3-(6-fluoro-3',6'-dihydro-[3,4'-bipyridine]-1'(2'H)-yl)propyl)-5-methylisoquinolin-1(2H)-one |
| 64 | 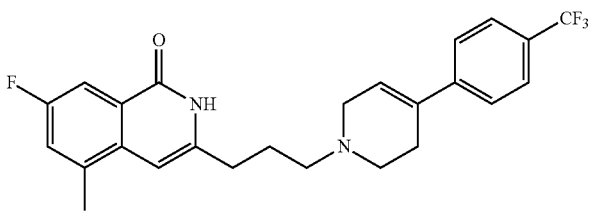 [SMILES: Cc1cc(F)cc2c(=O)[nH]c(CCCN3CC=C(c4ccc(C(F)(F)F)cc4)CC3)cc12] | 7-fluoro-5-methyl-3-(3-(4-(4-(trifluoromethyl)phenyl)-3,6-dihydropyridin-1(2H)-yl)propyl)isoquinolin-1(2H)-one |
| 65 | 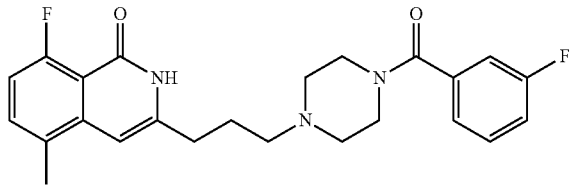 [SMILES: Cc1ccc(F)c2c(=O)[nH]c(CCCN3CCN(C(=O)c4cccc(F)c4)CC3)cc12] | 8-fluoro-3-(3-(4-(3-fluorobenzoyl)piperazin-1-yl)propyl)-5-methylisoquinolin-1(2H)-one |
| 66 | 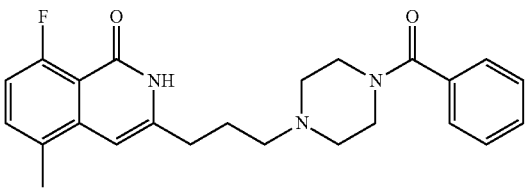 [SMILES: Cc1ccc(F)c2c(=O)[nH]c(CCCN3CCN(C(=O)c4ccccc4)CC3)cc12] | 3-(3-(4-benzoylpiperazin-1-yl)propyl)-8-fluoro-5-methylisoquinolin-1(2H)-one |
| 67 | 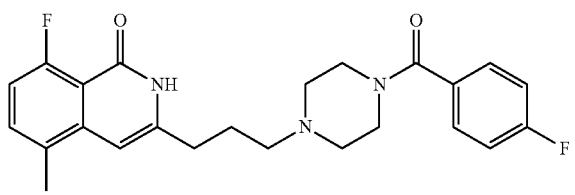 [SMILES: Cc1ccc(F)c2c(=O)[nH]c(CCCN3CCN(C(=O)c4ccc(F)cc4)CC3)cc12] | 8-fluoro-3-(3-(4-(4-fluorobenzoyl)piperazin-1-yl)propyl)-5-methylisoquinolin-1(2H)-one |
| 68 | 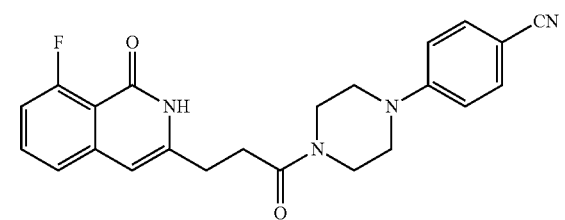 | 4-(4-(3-(8-fluoro-1-oxo-1,2-dihydroisoquinolin-3-yl)propanoyl)piperazin-1-yl)benzonitrile |

TABLE 1-continued

| Example | | |
|---|---|---|
| 69 | 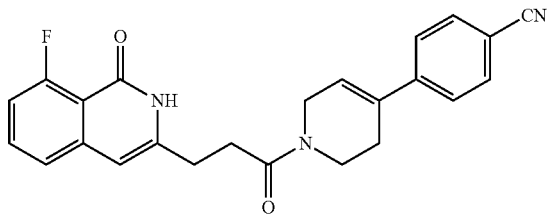 | 4-(1-(3-(8-fluoro-1-oxo-1,2-dihydroisoquinolin-3-yl)propanoyl)-1,2,3,6-tetrahydropyridin-4-yl)benzonitrile |
| 70 | 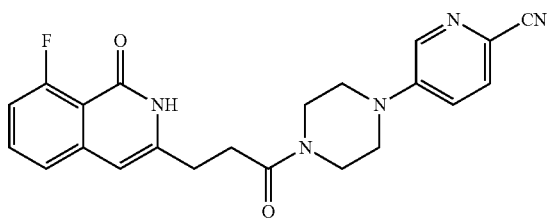 [SMILES: N#Cc1ccc(N2CCN(C(=O)CCc3cc4cccc(F)c4c(=O)[nH]3)CC2)cn1] | 5-(4-(3-(8-fluoro-1-oxo-1,2-dihydroisoquinolin-3-yl)propanoyl)piperazin-1-yl)picolinonitrile |
| 71 | 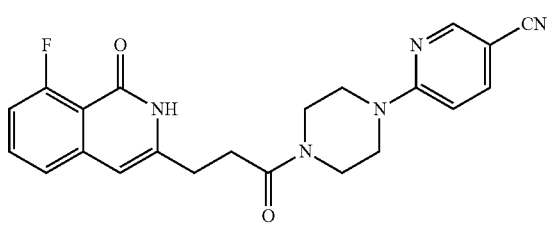 [SMILES: N#Cc1ccc(N2CCN(C(=O)CCc3cc4cccc(F)c4c(=O)[nH]3)CC2)nc1] | 6-(4-(3-(8-fluoro-1-oxo-1,2-dihydroisoquinolin-3-yl)propanoyl)piperazin-1-yl)nicotinonitrile |
| 72 | 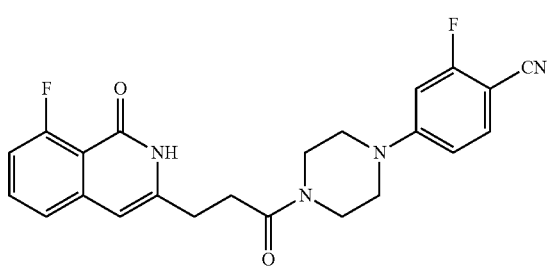 | 2-fluoro-4-(4-(3-(8-fluoro-1-oxo-1,2-dihydroisoquinolin-3-yl)propanoyl)piperazin-1-yl)benzonitrile |
| 73 | 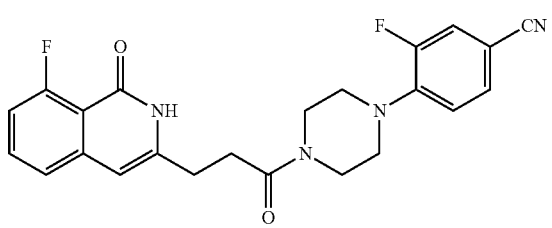 [SMILES: N#Cc1ccc(N2CCN(C(=O)CCc3cc4cccc(F)c4c(=O)[nH]3)CC2)c(F)c1] | 3-fluoro-4-(4-(3-(8-fluoro-1-oxo-1,2-dihydroisoquinolin-3-yl)propanoyl)piperazin-1-yl)benzonitrile |
| 74 | 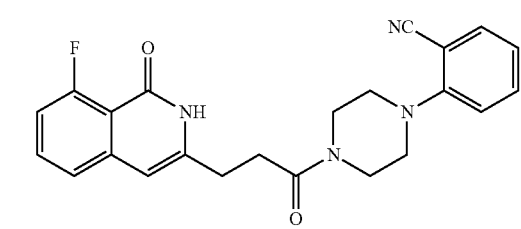 [SMILES: N#Cc1ccccc1N1CCN(C(=O)CCc2cc3cccc(F)c3c(=O)[nH]2)CC1] | 2-(4-(3-(8-fluoro-1-oxo-1,2-dihydroisoquinolin-3-yl)propanoyl)piperazin-1-yl)benzonitrile |
| 75 | 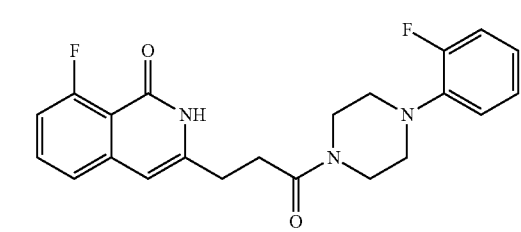 [SMILES: O=C(CCc1cc2cccc(F)c2c(=O)[nH]1)N1CCN(c2ccccc2F)CC1] | 8-fluoro-3-(3-(4-(2-fluorophenyl)piperazin-1-yl)-3-oxopropyl)isoquinolin-1(2H)-one |

TABLE 1-continued

| Example | | |
|---|---|---|
| 76 | 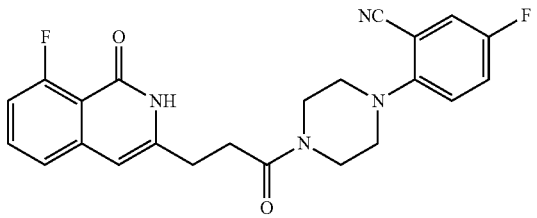 [SMILES: N#Cc1cc(F)ccc1N1CCN(C(=O)CCc2cc3cccc(F)c3c(=O)[nH]2)CC1] | 5-fluoro-2-(4-(3-(8-fluoro-1-oxo-1,2-dihydroisoquinolin-3-yl)propanoyl)piperazin-1-yl)benzonitrile |
| 77 | 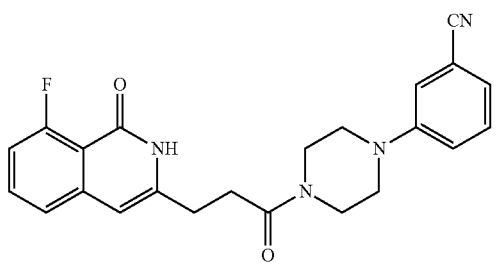 [SMILES: N#Cc1cccc(N2CCN(C(=O)CCc3cc4cccc(F)c4c(=O)[nH]3)CC2)c1] | 3-(4-(3-(8-fluoro-1-oxo-1,2-dihydroisoquinolin-3-yl)propanoyl)piperazin-1-yl)benzonitrile |
| 78 | 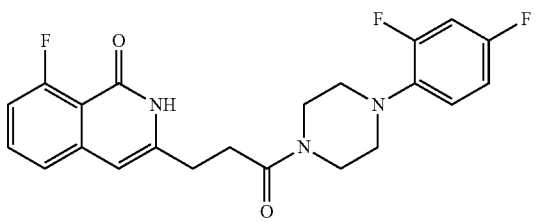 [SMILES: O=C(CCc1cc2cccc(F)c2c(=O)[nH]1)N1CCN(c2ccc(F)cc2F)CC1] | 3-(3-(4-(2,4-difluorophenyl)piperazin-1-yl)-3-oxopropyl)-8-fluoroisoquinolin-1(2H)-one |
| 79 | 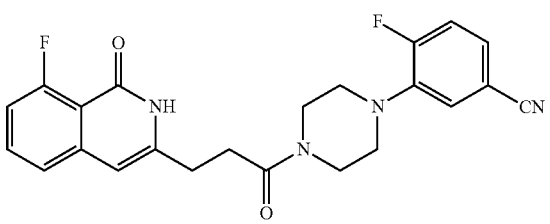 [SMILES: N#Cc1ccc(F)c(N2CCN(C(=O)CCc3cc4cccc(F)c4c(=O)[nH]3)CC2)c1] | 4-fluoro-3-(4-(3-(8-fluoro-1-oxo-1,2-dihydroisoquinolin-3-yl)propanoyl)piperazin-1-yl)benzonitrile |
| 80 | 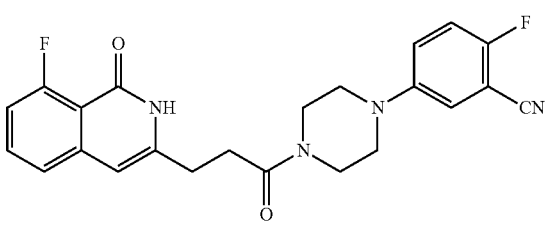 [SMILES: N#Cc1cc(N2CCN(C(=O)CCc3cc4cccc(F)c4c(=O)[nH]3)CC2)ccc1F] | 2-fluoro-5-(4-(3-(8-fluoro-1-oxo-1,2-dihydroisoquinolin-3-yl)propanoyl)piperazin-1-yl)benzonitrile |
| 81 | 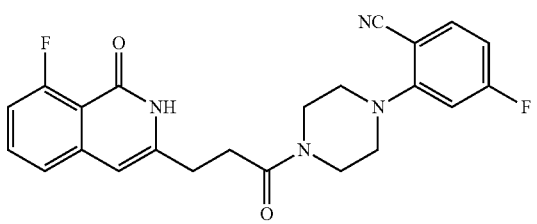 [SMILES: N#Cc1ccc(F)cc1N1CCN(C(=O)CCc2cc3cccc(F)c3c(=O)[nH]2)CC1] | 4-fluoro-2-(4-(3-(8-fluoro-1-oxo-1,2-dihydroisoquinolin-3-yl)propanoyl)piperazin-1-yl)benzonitrile |

TABLE 1-continued

| Example | | |
|---|---|---|
| 82 | 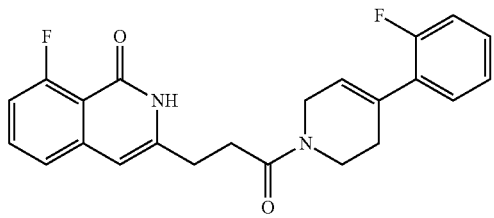 | 8-fluoro-3-(3-(4-(2-fluorophenyl)-3,6-dihydropyridin-1(2H)-yl)-3-oxopropyl)isoquinolin-1(2H)-one |
| 83 | 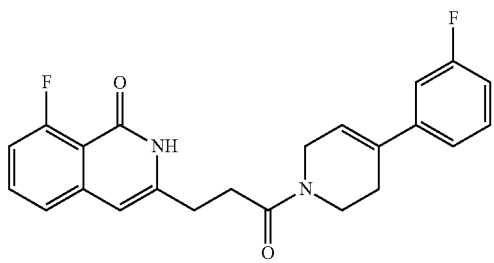 [SMILES: O=C(CCc1cc2cccc(F)c2c(=O)[nH]1)N1CC=C(c2cccc(F)c2)CC1] | 8-fluoro-3-(3-(4-(3-fluorophenyl)-3,6-dihydropyridin-1(2H)-yl)-3-oxopropyl)isoquinolin-1(2H)-one |
| 84 | 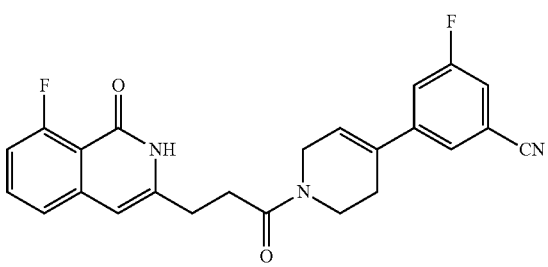 | 3-fluoro-5-(1-(3-(8-fluoro-1-oxo-1,2-dihydroisoquinolin-3-yl)propanoyl)-1,2,3,6-tetrahydropyridin-4-yl)benzonitrile |
| 85 | 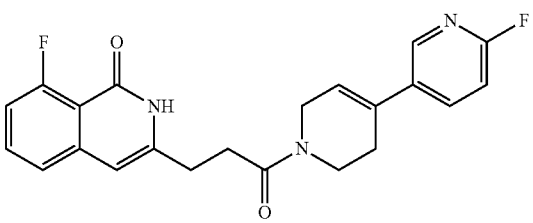 [SMILES: O=C(CCc1cc2cccc(F)c2c(=O)[nH]1)N1CC=C(c2ccc(F)nc2)CC1] | 8-fluoro-3-(3-(6-fluoro-3',6'-dihydro-[3,4'-bipyridine]-1'(2'H)-yl)-3-oxopropyl)isoquinolin-1(2H)-one |
| 86 | 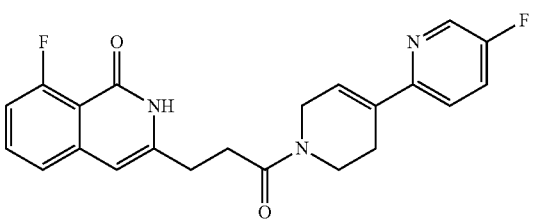 [SMILES: O=C(CCc1cc2cccc(F)c2c(=O)[nH]1)N1CC=C(c2ccc(F)cn2)CC1] | 8-fluoro-3-(3-(5-fluoro-3',6'-dihydro-[2,4'-bipyridine]-1'(2'H)-yl)-3-oxopropyl)isoquinolin-1(2H)-one |
| 87 | 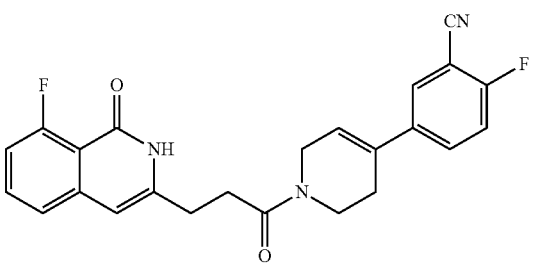 [SMILES: N#Cc1cc(C2=CCN(C(=O)CCc3cc4cccc(F)c4c(=O)[nH]3)CC2)ccc1F] | 2-fluoro-5-(1-(3-(8-fluoro-1-oxo-1,2-dihydroisoquinolin-3-yl)propanoyl)-1,2,3,6-tetrahydropyridin-4-yl)benzonitrile |

TABLE 1-continued

| Example | | |
|---|---|---|
| 88 | 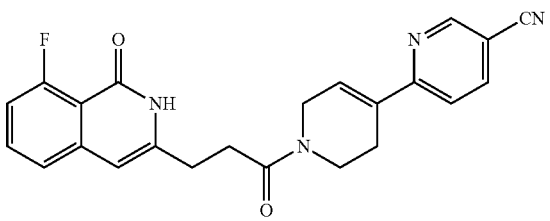 | 1'-(3-(8-fluoro-1-oxo-1,2-dihydroisoquinolin-3-yl)propanoyl)-1',2',3',6'-tetrahydro-[2,4'-bipyridine]-5-carbonitrile |
| 89 | 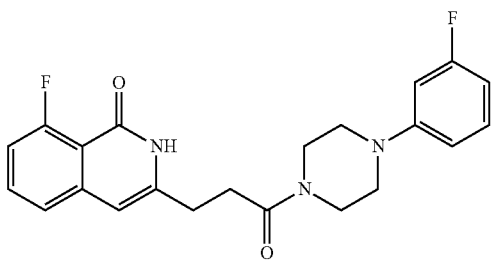 [SMILES: O=C(CCc1cc2cccc(F)c2c(=O)[nH]1)N1CCN(c2cccc(F)c2)CC1] | 8-fluoro-3-(3-(4-(3-fluorophenyl)piperazin-1-yl)-3-oxopropyl)isoquinolin-1(2H)-one |
| 90 | 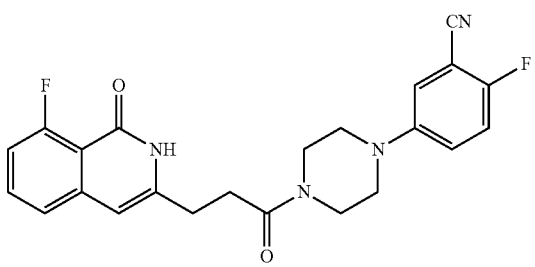 | 2-fluoro-5-(4-(3-(8-fluoro-1-oxo-1,2-dihydroisoquinolin-3-yl)propanoyl)piperazin-1-yl)benzonitrile |
| 91 | 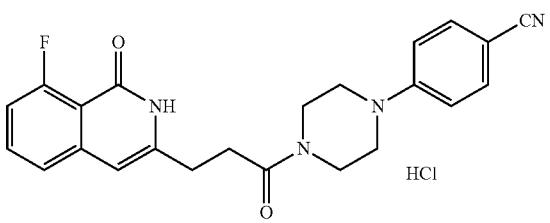 [SMILES: N#Cc1ccc(N2CCN(C(=O)CCc3cc4cccc(F)c4c(=O)[nH]3)CC2)cc1 ; Cl] | 4-(4-(3-(8-fluoro-1-oxo-1,2-dihydroisoquinolin-3-yl)propanoyl)piperazin-1-yl)benzonitrile hydrochloride |
| 92 | 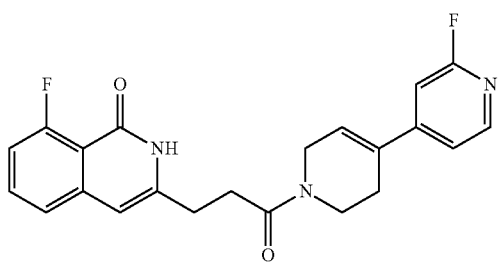 [SMILES: O=C(CCc1cc2cccc(F)c2c(=O)[nH]1)N1CC=C(c2ccnc(F)c2)CC1] | 8-fluoro-3-(3-(2'-fluoro-3,6-dihydro-[4,4'-bipyridine]-1(2H)-yl)-3-oxopropyl)isoquinolin-1(2H)-one |
| 93 | 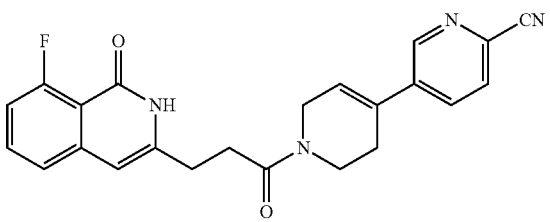 [SMILES: N#Cc1ccc(C2=CCN(C(=O)CCc3cc4cccc(F)c4c(=O)[nH]3)CC2)cn1] | 1'-(3-(8-fluoro-1-oxo-1,2-dihydroisoquinolin-3-yl)propanoyl)-1',2',3',6'-tetrahydro-[3,4'-bipyridine]-6-carbonitrile |

TABLE 1-continued

| Example | | |
|---|---|---|
| 94 | 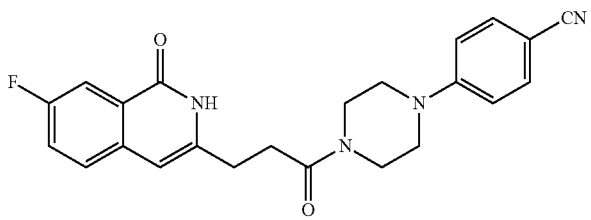 | 4-(4-(3-(7-fluoro-1-oxo-1,2-dihydroisoquinolin-3-yl)propanoyl)piperazin-1-yl)benzonitrile |
| 95 | 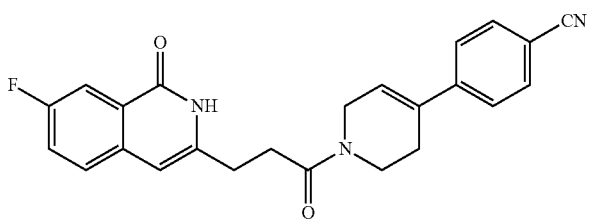 [SMILES: N#Cc1ccc(C2=CCN(C(=O)CCc3cc4ccc(F)cc4c(=O)[nH]3)CC2)cc1] | 4-(1-(3-(7-fluoro-1-oxo-1,2-dihydroisoquinolin-3-yl)propanoyl)-1,2,3,6-tetrahydropyridin-4-yl)benzonitrile |
| 96 | 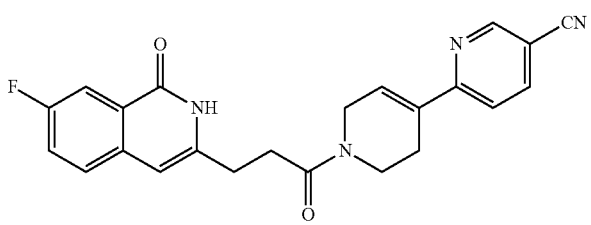 [SMILES: N#Cc1ccc(C2=CCN(C(=O)CCc3cc4ccc(F)cc4c(=O)[nH]3)CC2)nc1] | 1'-(3-(7-fluoro-1-oxo-1,2-dihydroisoquinolin-3-yl)propanoyl)-1',2',3',6'-tetrahydro-[2,4'-bipyridine]-5-carbonitrile |
| 97 | 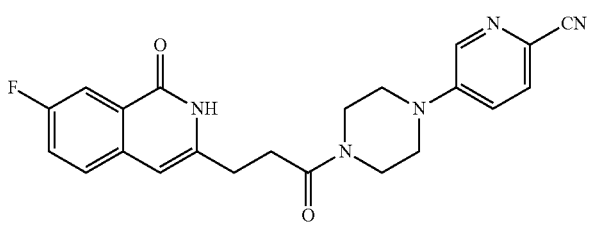 [SMILES: N#Cc1ccc(N2CCN(C(=O)CCc3cc4ccc(F)cc4c(=O)[nH]3)CC2)cn1] | 5-(4-(3-(7-fluoro-1-oxo-1,2-dihydroisoquinolin-3-yl)propanoyl)piperazin-1-yl)picolinonitrile |
| 98 | 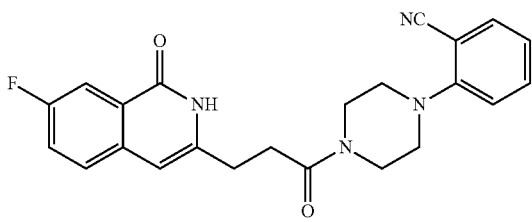 [SMILES: N#Cc1ccccc1N1CCN(C(=O)CCc2cc3ccc(F)cc3c(=O)[nH]2)CC1] | 2-(4-(3-(7-fluoro-1-oxo-1,2-dihydroisoquinolin-3-yl)propanoyl)piperazin-1-yl)benzonitrile |
| 99 | 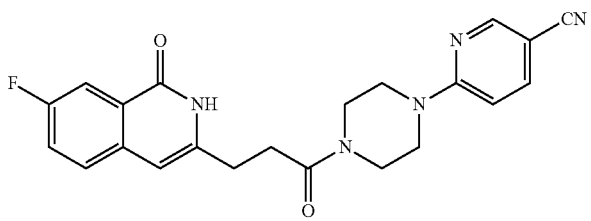 | 6-(4-(3-(7-fluoro-1-oxo-1,2-dihydroisoquinolin-3-yl)propanoyl)piperazin-1-yl)nicotinonitrile |
| 100 | 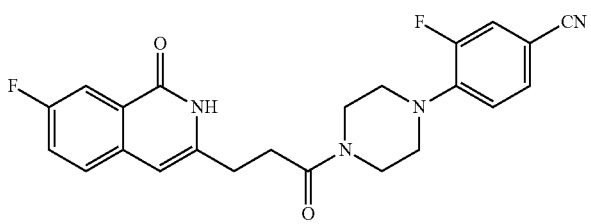 [SMILES: N#Cc1ccc(N2CCN(C(=O)CCc3cc4ccc(F)cc4c(=O)[nH]3)CC2)c(F)c1] | 3-fluoro-4-(4-(3-(7-fluoro-1-oxo-1,2-dihydroisoquinolin-3-yl)propanoyl)piperazin-1-yl)benzonitrile |

TABLE 1-continued

| Example | | |
|---|---|---|
| 101 | 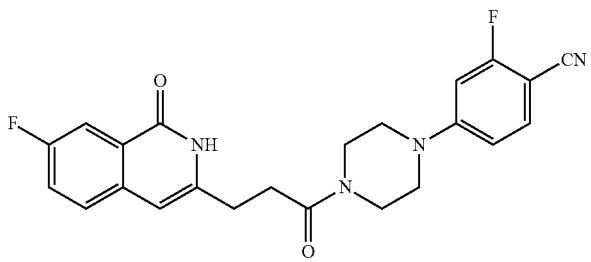 [SMILES: N#Cc1ccc(N2CCN(C(=O)CCc3cc4ccc(F)cc4c(=O)[nH]3)CC2)cc1F] | 2-fluoro-4-(4-(3-(7-fluoro-1-oxo-1,2-dihydroisoquinolin-3-yl)propanoyl)piperazin-1-yl)benzonitrile |
| 102 | 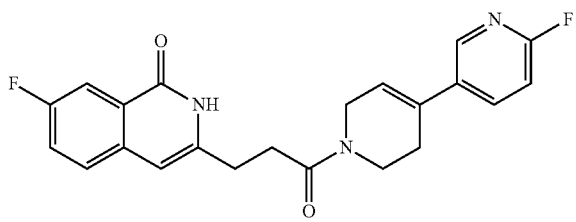 [SMILES: O=C(CCc1cc2ccc(F)cc2c(=O)[nH]1)N1CC=C(c2ccc(F)nc2)CC1] | 7-fluoro-3-(3-(6-fluoro-3',6'-dihydro-[3,4'-bipyridine]-1'(2'H)-yl)-3-oxopropyl)isoquinolin-1(2H)-one |
| 103 | 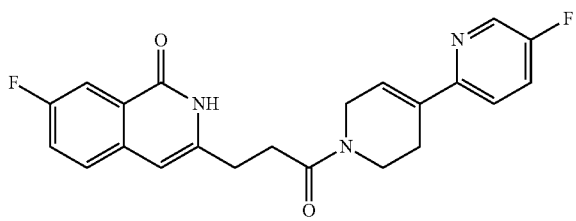 [SMILES: O=C(CCc1cc2ccc(F)cc2c(=O)[nH]1)N1CC=C(c2ccc(F)cn2)CC1] | 7-fluoro-3-(3-(5-fluoro-3',6'-dihydro-[2,4'-bipyridine]-1'(2'H)-yl)-3-oxopropyl)isoquinolin-1(2H)-one |
| 104 | 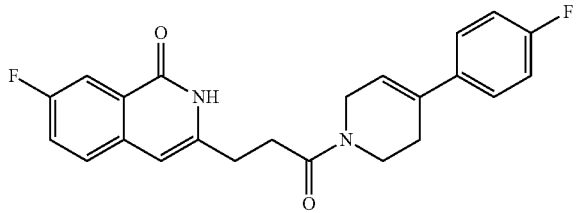 [SMILES: O=C(CCc1cc2ccc(F)cc2c(=O)[nH]1)N1CC=C(c2ccc(F)cc2)CC1] | 7-fluoro-3-(3-(4-(4-fluorophenyl)-3,6-dihydropyridin-1(2H)-yl)-3-oxopropyl)isoquinolin-1(2H)-one |
| 105 | 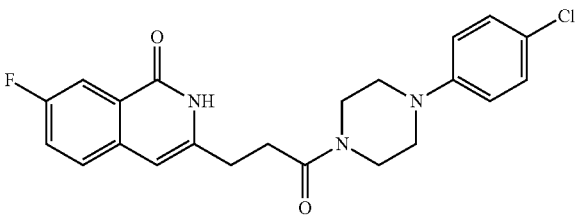 [SMILES: O=C(CCc1cc2ccc(F)cc2c(=O)[nH]1)N1CCN(c2ccc(Cl)cc2)CC1] | 3-(3-(4-(4-chlorophenyl)piperazin-1-yl)-3-oxopropyl)-7-fluoroisoquinolin-1(2H)-one |
| 106 | 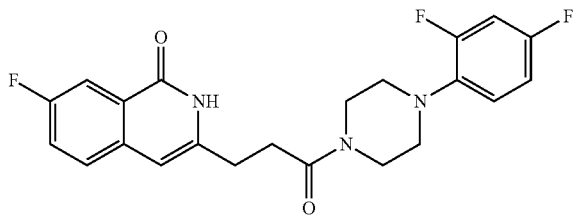 [SMILES: O=C(CCc1cc2ccc(F)cc2c(=O)[nH]1)N1CCN(c2ccc(F)cc2F)CC1] | 3-(3-(4-(2,4-difluorophenyl)piperazin-1-yl)-3-oxopropyl)-7-fluoroisoquinolin-1(2H)-one |
| 107 | 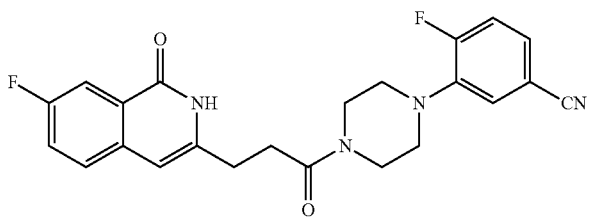 [SMILES: N#Cc1ccc(F)c(N2CCN(C(=O)CCc3cc4ccc(F)cc4c(=O)[nH]3)CC2)c1] | 4-fluoro-3-(4-(3-(7-fluoro-1-oxo-1,2-dihydroisoquinolin-3-yl)propanoyl)piperazin-1-yl)benzonitrile |

TABLE 1-continued

| Example | | |
|---|---|---|
| 108 | 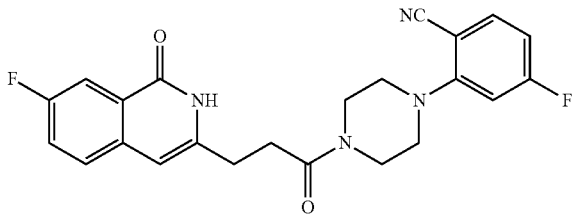 [SMILES: N#Cc1ccc(F)cc1N1CCN(C(=O)CCc2cc3ccc(F)cc3c(=O)[nH]2)CC1] | 4-fluoro-2-(4-(3-(7-fluoro-1-oxo-1,2-dihydroisoquinolin-3-yl)propanoyl)piperazin-1-yl)benzonitrile |
| 109 | 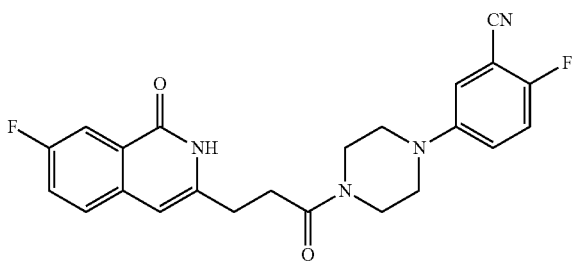 [SMILES: N#Cc1cc(N2CCN(C(=O)CCc3cc4ccc(F)cc4c(=O)[nH]3)CC2)ccc1F] | 2-fluoro-5-(4-(3-(7-fluoro-1-oxo-1,2-dihydroisoquinolin-3-yl)propanoyl)piperazin-1-yl)benzonitrile |
| 110 | 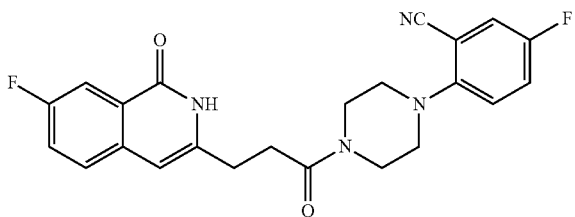 [SMILES: N#Cc1cc(F)ccc1N1CCN(C(=O)CCc2cc3ccc(F)cc3c(=O)[nH]2)CC1] | 5-fluoro-2-(4-(3-(7-fluoro-1-oxo-1,2-dihydroisoquinolin-3-yl)propanoyl)piperazin-1-yl)benzonitrile |
| 111 | 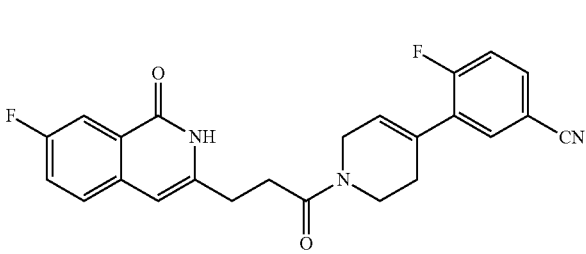 [SMILES: N#Cc1ccc(F)c(C2=CCN(C(=O)CCc3cc4ccc(F)cc4c(=O)[nH]3)CC2)c1] | 4-fluoro-3-(1-(3-(7-fluoro-1-oxo-1,2-dihydroisoquinolin-3-yl)propanoyl)-1,2,3,6-tetrahydropyridin-4-yl)benzonitrile |
| 112 | 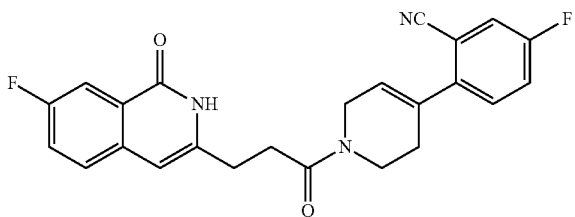 [SMILES: N#Cc1cc(F)ccc1C1=CCN(C(=O)CCc2cc3ccc(F)cc3c(=O)[nH]2)CC1] | 5-fluoro-2-(1-(3-(7-fluoro-1-oxo-1,2-dihydroisoquinolin-3-yl)propanoyl)-1,2,3,6-tetrahydropyridin-4-yl)benzonitrile |
| 113 | 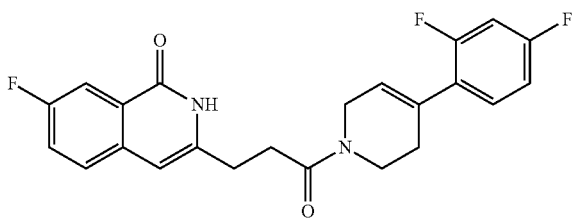 [SMILES: O=C(CCc1cc2ccc(F)cc2c(=O)[nH]1)N1CC=C(c2ccc(F)cc2F)CC1] | 3-(3-(4-(2,4-difluorophenyl)-3,6-dihydropyridin-1(2H)-yl)-3-oxopropyl)-7-fluoroisoquinolin-1(2H)-one |

TABLE 1-continued

| Example | | |
|---|---|---|
| 114 | 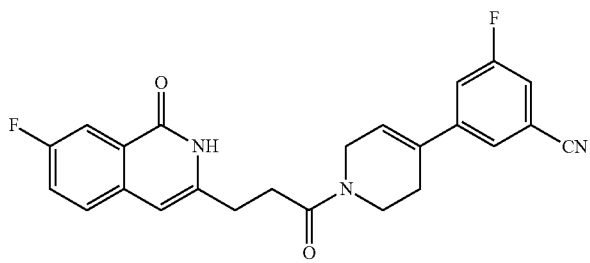 | 3-fluoro-5-(1-(3-(7-fluoro-1-oxo-1,2-dihydroisoquinolin-3-yl)propanoyl)-1,2,3,6-tetrahydropyridin-4-yl)benzonitrile |
| 115 | 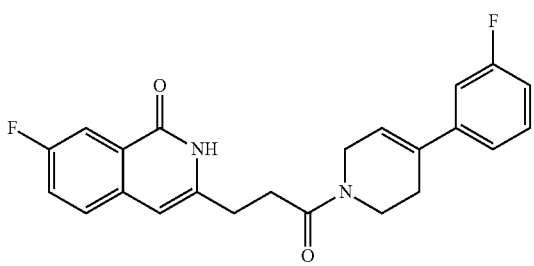 | 7-fluoro-3-(3-(4-(3-fluorophenyl)-3,6-dihydropyridin-1(2H)-yl)-3-oxopropyl)isoquinolin-1(2H)-one |
| 116 | 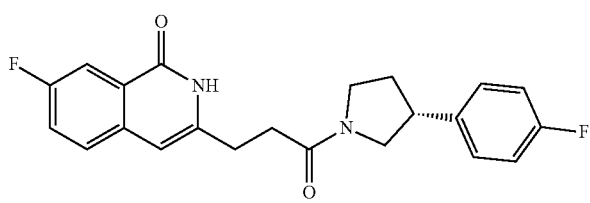 [SMILES: O=C(CCc1cc2ccc(F)cc2c(=O)[nH]1)N1CC[C@H](c2ccc(F)cc2)C1] | (R)-7-fluoro-3-(3-(3-(4-fluorophenyl)pyrrolidin-1-yl)-3-oxopropyl)isoquinolin-1(2H)-one |
| 117 | 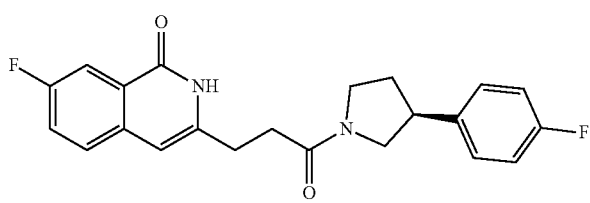 [SMILES: O=C(CCc1cc2ccc(F)cc2c(=O)[nH]1)N1CC[C@@H](c2ccc(F)cc2)C1] | (S)-7-fluoro-3-(3-(3-(4-fluorophenyl)pyrrolidin-1-yl)-3-oxopropyl)isoquinolin-1(2H)-one |
| 118 | 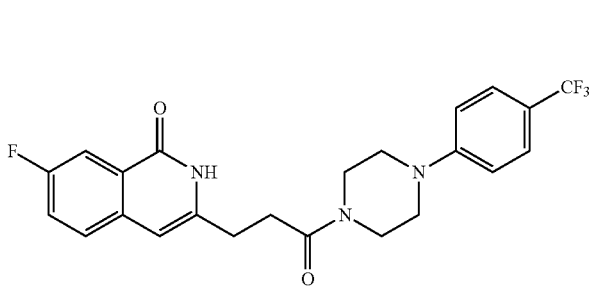 [SMILES: O=C(CCc1cc2ccc(F)cc2c(=O)[nH]1)N1CCN(c2ccc(C(F)(F)F)cc2)CC1] | 7-fluoro-3-(3-oxo-3-(4-(4-(trifluoromethyl)phenyl)piperazin-1-yl)propyl)isoquinolin-1(2H)-one |
| 119 | 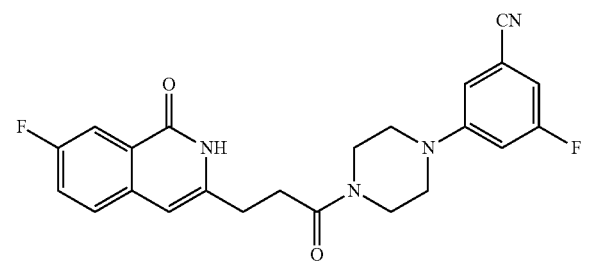 [SMILES: N#Cc1cc(F)cc(N2CCN(C(=O)CCc3cc4ccc(F)cc4c(=O)[nH]3)CC2)c1] | 3-fluoro-5-(4-(3-(7-fluoro-1-oxo-1,2-dihydroisoquinolin-3-yl)propanoyl)piperazin-1-yl)benzonitrile |

TABLE 1-continued

| Example | | |
|---|---|---|
| 120 | 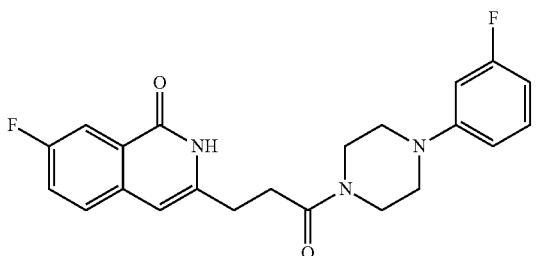 | 7-fluoro-3-(3-(4-(3-fluorophenyl)piperazin-1-yl)-3-oxopropyl)isoquinolin-1(2H)-one |
| 121 | 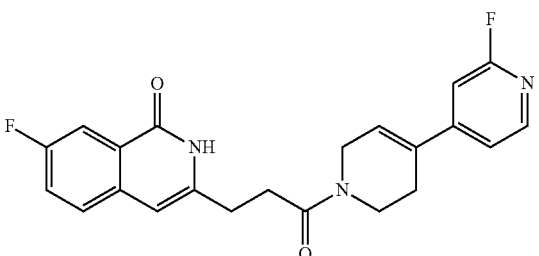 | 7-fluoro-3-(3-(2'-fluoro-3,6-dihydro-[4,4'-bipyridine]-1(2H)-yl)-3-oxopropyl)isoquinolin-1(2H)-one |
| 122 | 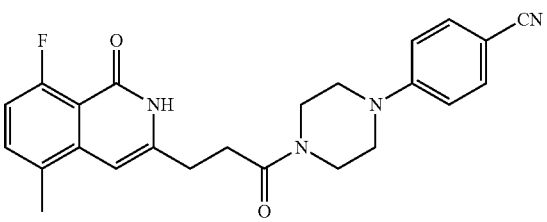 | 4-(4-(3-(8-fluoro-5-methyl-1-oxo-1,2-dihydroisoquinolin-3-yl)propanoyl)piperazin-1-yl)benzonitrile |
| 123 | 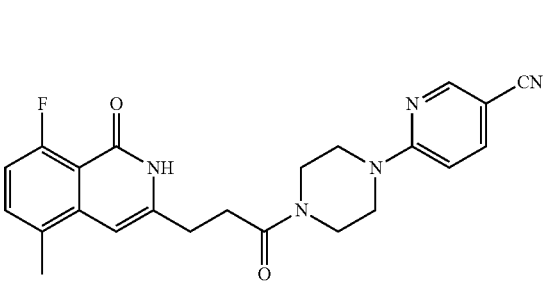 | 6-(4-(3-(8-fluoro-5-methyl-1-oxo-1,2-dihydroisoquinolin-3-yl)propanoyl)piperazin-1-yl)nicotinonitrile |
| 124 | 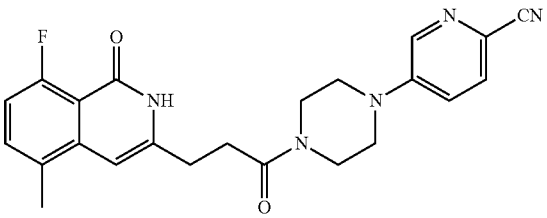 [SMILES: Cc1ccc(F)c2c(=O)[nH]c(CCC(=O)N3CCN(c4ccc(C#N)nc4)CC3)cc12] | 5-(4-(3-(8-fluoro-5-methyl-1-oxo-1,2-dihydroisoquinolin-3-yl)propanoyl)piperazin-1-yl)picolinonitrile |
| 125 | 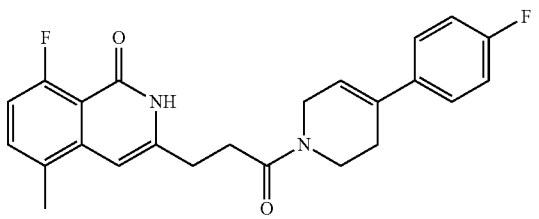 [SMILES: Cc1ccc(F)c2c(=O)[nH]c(CCC(=O)N3CC=C(c4ccc(F)cc4)CC3)cc12] | 8-fluoro-3-(3-(4-(4-fluorophenyl)-3,6-dihydropyridin-1(2H)-yl)-3-oxopropyl)-5-methylisoquinolin-1(2H)-one |

TABLE 1-continued

| Example | | |
|---|---|---|
| 126 | 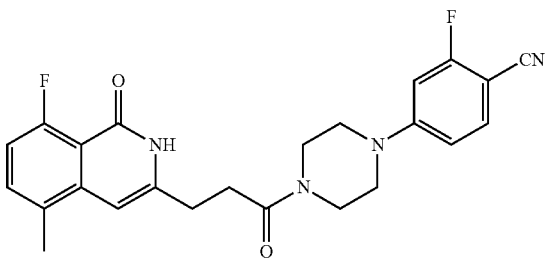 [SMILES: Cc1ccc(F)c2c(=O)[nH]c(CCC(=O)N3CCN(c4ccc(C#N)c(F)c4)CC3)cc12] | 2-fluoro-4-(4-(3-(8-fluoro-5-methyl-1-oxo-1,2-dihydroisoquinolin-3-yl)propanoyl)piperazin-1-yl)benzonitrile |
| 127 | 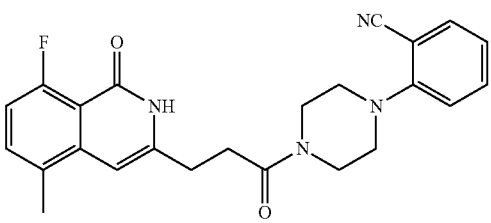 [SMILES: Cc1ccc(F)c2c(=O)[nH]c(CCC(=O)N3CCN(c4ccccc4C#N)CC3)cc12] | 2-(4-(3-(8-fluoro-5-methyl-1-oxo-1,2-dihydroisoquinolin-3-yl)propanoyl)piperazin-1-yl)benzonitrile |
| 128 | 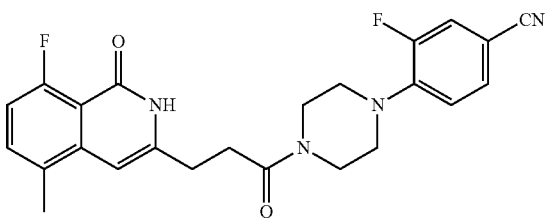 [SMILES: Cc1ccc(F)c2c(=O)[nH]c(CCC(=O)N3CCN(c4ccc(C#N)cc4F)CC3)cc12] | 3-fluoro-4-(4-(3-(8-fluoro-5-methyl-1-oxo-1,2-dihydroisoquinolin-3-yl)propanoyl)piperazin-1-yl)benzonitrile |
| 129 | 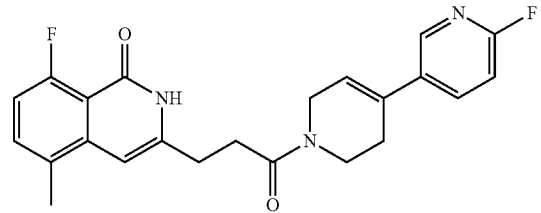 | 8-fluoro-3-(3-(6-fluoro-3',6'-dihydro-[3,4'-bipyridine]-1'(2'H)-yl)-3-oxopropyl)-5-methylisoquinolin-1(2H)-one |
| 130 | 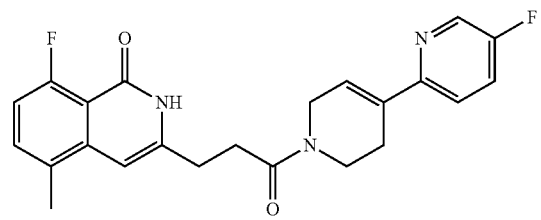 [SMILES: Cc1ccc(F)c2c(=O)[nH]c(CCC(=O)N3CC=C(c4ccc(F)cn4)CC3)cc12] | 8-fluoro-3-(3-(5-fluoro-3',6'-dihydro-[2,4'-bipyridine]-1'(2'H)-yl)-3-oxopropyl)-5-methylisoquinolin-1(2H)-one |
| 131 | 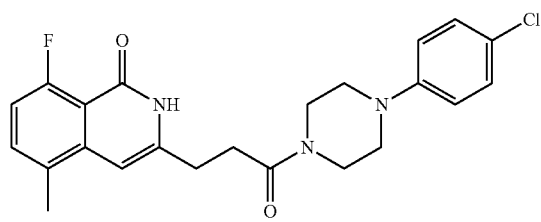 [SMILES: Cc1ccc(F)c2c(=O)[nH]c(CCC(=O)N3CCN(c4ccc(Cl)cc4)CC3)cc12] | 3-(3-(4-(4-chlorophenyl)piperazin-1-yl)-3-oxopropyl)-8-fluoro-5-methylisoquinolin-1(2H)-one |
| 132 | 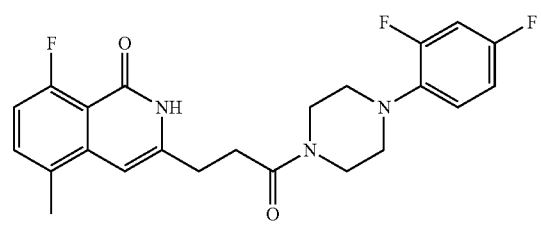 [SMILES: Cc1ccc(F)c2c(=O)[nH]c(CCC(=O)N3CCN(c4ccc(F)cc4F)CC3)cc12] | 3-(3-(4-(2,4-difluorophenyl)piperazin-1-yl)-3-oxopropyl)-8-fluoro-5-methylisoquinolin-1(2H)-one |

TABLE 1-continued

| Example | | |
|---|---|---|
| 133 | 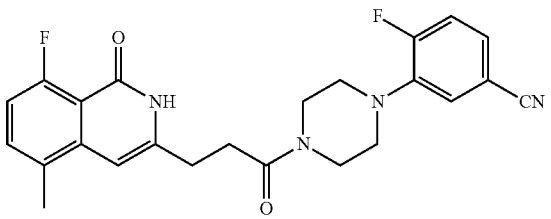 [SMILES: Cc1ccc(F)c2c(=O)[nH]c(CCC(=O)N3CCN(c4cc(C#N)ccc4F)CC3)cc12] | 4-fluoro-3-(4-(3-(8-fluoro-5-methyl-1-oxo-1,2-dihydroisoquinolin-3-yl)propanoyl)piperazin-1-yl)benzonitrile |
| 134 | 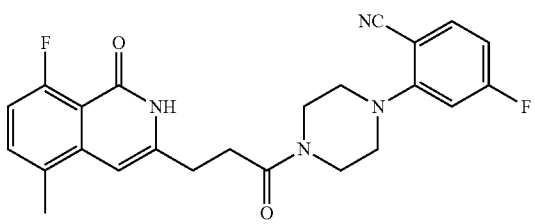 | 4-fluoro-2-(4-(3-(8-fluoro-5-methyl-1-oxo-1,2-dihydroisoquinolin-3-yl)propanoyl)piperazin-1-yl)benzonitrile |
| 135 | 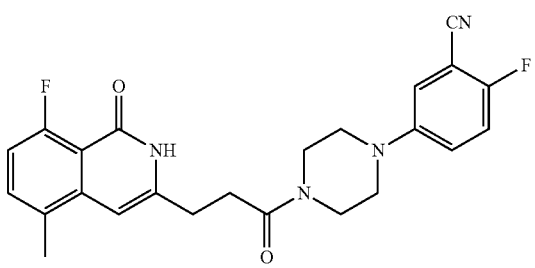 [SMILES: Cc1ccc(F)c2c(=O)[nH]c(CCC(=O)N3CCN(c4ccc(F)c(C#N)c4)CC3)cc12] | 2-fluoro-5-(4-(3-(8-fluoro-5-methyl-1-oxo-1,2-dihydroisoquinolin-3-yl)propanoyl)piperazin-1-yl)benzonitrile |
| 136 | 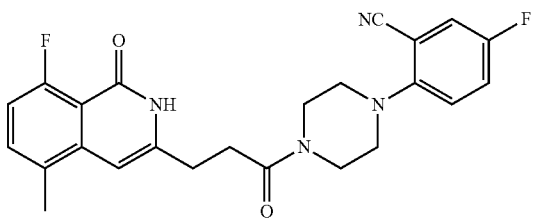 [SMILES: Cc1ccc(F)c2c(=O)[nH]c(CCC(=O)N3CCN(c4ccc(F)cc4C#N)CC3)cc12] | 5-fluoro-2-(4-(3-(8-fluoro-5-methyl-1-oxo-1,2-dihydroisoquinolin-3-yl)propanoyl)piperazin-1-yl)benzonitrile |
| 137 | 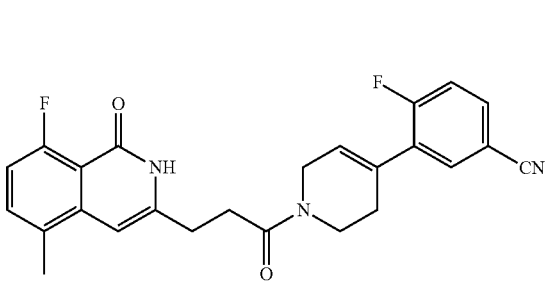 [SMILES: Cc1ccc(F)c2c(=O)[nH]c(CCC(=O)N3CC=C(c4cc(C#N)ccc4F)CC3)cc12] | 4-fluoro-3-(1-(3-(8-fluoro-5-methyl-1-oxo-1,2-dihydroisoquinolin-3-yl)propanoyl)-1,2,3,6-tetrahydropyridin-4-yl)benzonitrile |
| 138 | 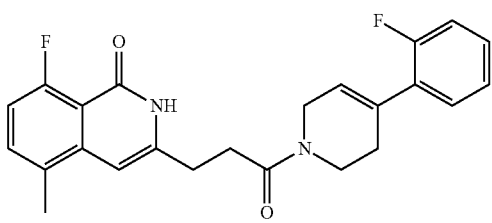 [SMILES: Cc1ccc(F)c2c(=O)[nH]c(CCC(=O)N3CC=C(c4ccccc4F)CC3)cc12] | 8-fluoro-3-(3-(4-(2-fluorophenyl)-3,6-dihydropyridin-1(2H)-yl)-3-oxopropyl)-5-methylisoquinolin-1(2H)-one |

TABLE 1-continued

| Example | | |
|---|---|---|
| 139 | 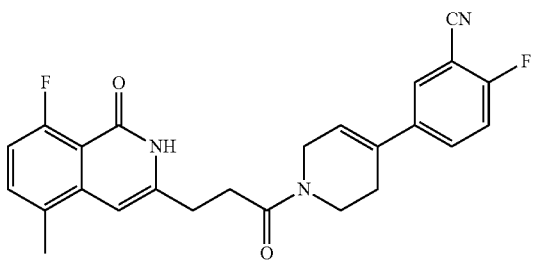 [SMILES: Cc1ccc(F)c2c(=O)[nH]c(CCC(=O)N3CC=C(c4ccc(F)c(C#N)c4)CC3)cc12] | 2-fluoro-5-(1-(3-(8-fluoro-5-methyl-1-oxo-1,2-dihydroisoquinolin-3-yl)propanoyl)-1,2,3,6-tetrahydropyridin-4-yl)benzonitrile |
| 140 | 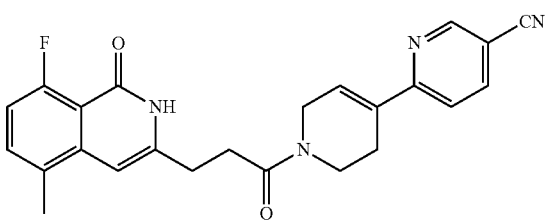 [SMILES: Cc1ccc(F)c2c(=O)[nH]c(CCC(=O)N3CC=C(c4ccc(C#N)cn4)CC3)cc12] | 1'-(3-(8-fluoro-5-methyl-1-oxo-1,2-dihydroisoquinolin-3-yl)propanoyl)-1',2',3',6'-tetrahydro-[2,4'-bipyridine]-5-carbonitrile |
| 141 | 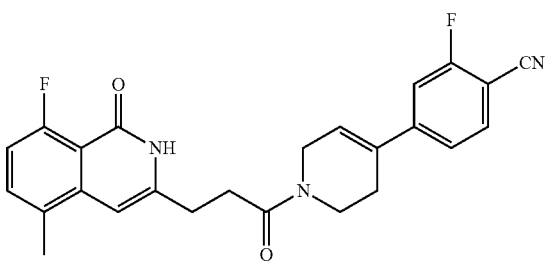 [SMILES: Cc1ccc(F)c2c(=O)[nH]c(CCC(=O)N3CC=C(c4ccc(C#N)c(F)c4)CC3)cc12] | 2-fluoro-4-(1-(3-(8-fluoro-5-methyl-1-oxo-1,2-dihydroisoquinolin-3-yl)propanoyl)-1,2,3,6-tetrahydropyridin-4-yl)benzonitrile |
| 142 | 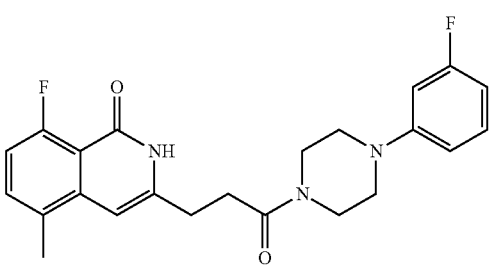 [SMILES: Cc1ccc(F)c2c(=O)[nH]c(CCC(=O)N3CCN(c4cccc(F)c4)CC3)cc12] | 8-fluoro-3-(3-(4-(3-fluorophenyl)piperazin-1-yl)-3-oxopropyl)-5-methylisoquinolin-1(2H)-one |
| 143 | 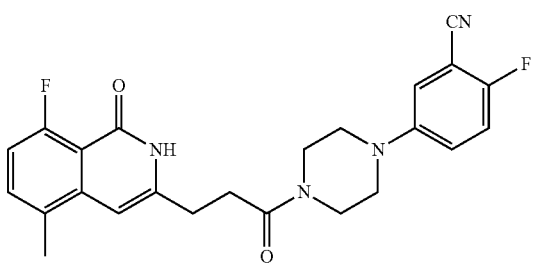 [SMILES: Cc1ccc(F)c2c(=O)[nH]c(CCC(=O)N3CCN(c4ccc(F)c(C#N)c4)CC3)cc12] | 2-fluoro-5-(4-(3-(8-fluoro-5-methyl-1-oxo-1,2-dihydroisoquinolin-3-yl)propanoyl)piperazin-1-yl)benzonitrile |
| 144 | 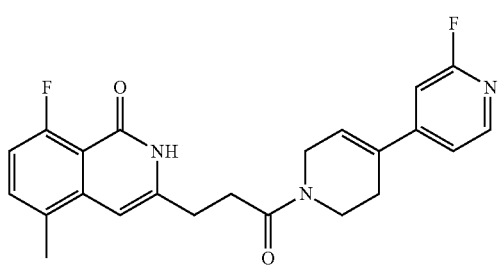 [SMILES: Cc1ccc(F)c2c(=O)[nH]c(CCC(=O)N3CC=C(c4ccnc(F)c4)CC3)cc12] | 8-fluoro-3-(3-(2'-fluoro-3,6-dihydro-[4,4'-bipyridine]-1(2H)-yl)-3-oxopropyl)-5-methylisoquinolin-1(2H)-one |

TABLE 1-continued

| Example | | |
|---|---|---|
| 145 | 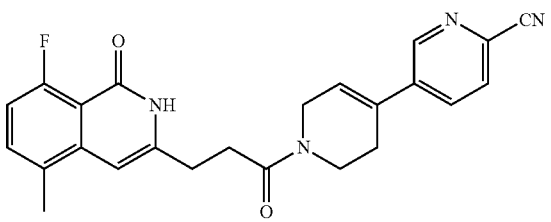 [SMILES: Cc1ccc(F)c2c(=O)[nH]c(CCC(=O)N3CC=C(c4ccc(C#N)nc4)CC3)cc12] | 1'-(3-(8-fluoro-5-methyl-1-oxo-1,2-dihydroisoquinolin-3-yl)propanoyl)-1',2',3',6'-tetrahydro-[3,4'-bipyridine]-6-carbonitrile |
| 146 | 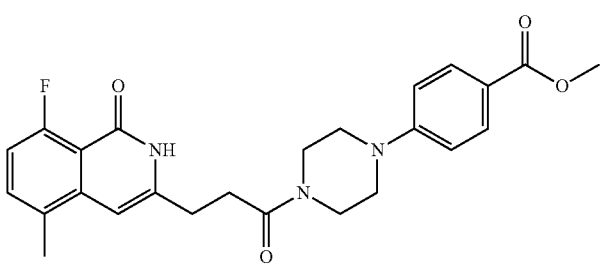 [SMILES: COC(=O)c1ccc(N2CCN(C(=O)CCc3cc4c(C)ccc(F)c4c(=O)[nH]3)CC2)cc1] | methyl 4-(4-(3-(8-fluoro-5-methyl-1-oxo-1,2-dihydroisoquinolin-3-yl)propanoyl)piperazin-1-yl)benzoate |
| 147 | 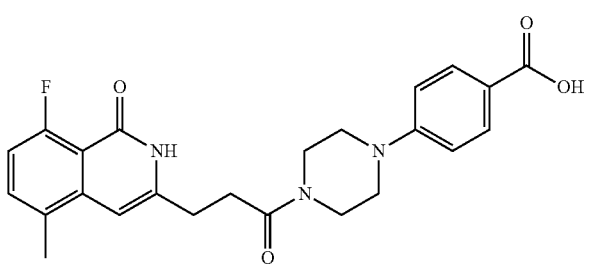 [SMILES: Cc1ccc(F)c2c(=O)[nH]c(CCC(=O)N3CCN(c4ccc(C(=O)O)cc4)CC3)cc12] | 4-(4-(3-(8-fluoro-5-methyl-1-oxo-1,2-dihydroisoquinolin-3-yl)propanoyl)piperazin-1-yl)benzoic acid |
| 148 | 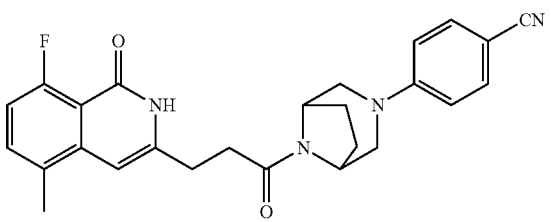 [SMILES: Cc1ccc(F)c2c(=O)[nH]c(CCC(=O)N3C4CCC3CN(c3ccc(C#N)cc3)C4)cc12] | 4-(8-(3-(8-fluoro-5-methyl-1-oxo-1,2-dihydroisoquinolin-3-yl)propanoyl)-3,8-diazabicyclo[3.2.1]octan-3-yl)benzonitrile |
| 149 | 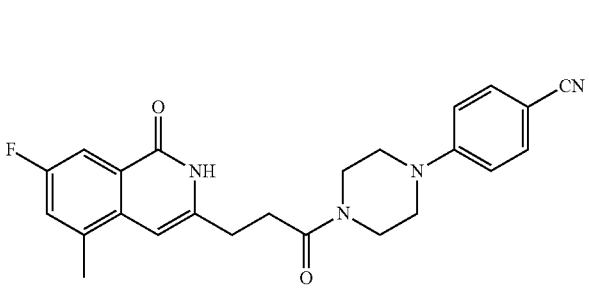 | 4-(4-(3-(7-fluoro-5-methyl-1-oxo-1,2-dihydroisoquinolin-3-yl)propanoyl)piperazin-1-yl)benzonitrile |
| 150 | 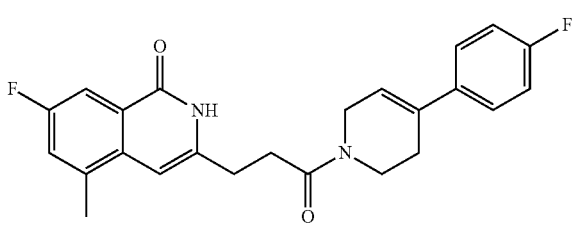 [SMILES: Cc1cc(F)cc2c(=O)[nH]c(CCC(=O)N3CC=C(c4ccc(F)cc4)CC3)cc12] | 7-fluoro-3-(3-(4-(4-fluorophenyl)-3,6-dihydropyridin-1(2H)-yl)-3-oxopropyl)-5-methylisoquinolin-1(2H)-one |

TABLE 1-continued

| Example | | |
|---|---|---|
| 151 | 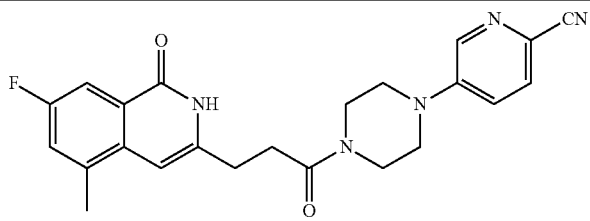 | 5-(4-(3-(7-fluoro-5-methyl-1-oxo-1,2-dihydroisoquinolin-3-yl)propanoyl)piperazin-1-yl)picolinonitrile |
| 152 | 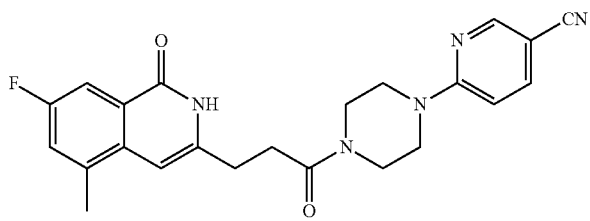 | 6-(4-(3-(7-fluoro-5-methyl-1-oxo-1,2-dihydroisoquinolin-3-yl)propanoyl)piperazin-1-yl)nicotinonitrile |
| 153 | 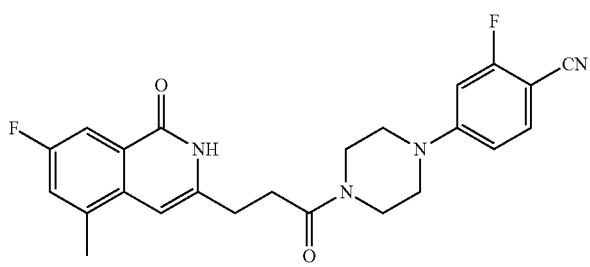 | 2-fluoro-4-(4-(3-(7-fluoro-5-methyl-1-oxo-1,2-dihydroisoquinolin-3-yl)propanoyl)piperazin-1-yl)benzonitrile |
| 154 | 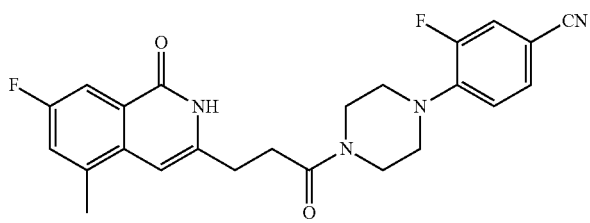 | 3-fluoro-4-(4-(3-(7-fluoro-5-methyl-1-oxo-1,2-dihydroisoquinolin-3-yl)propanoyl)piperazin-1-yl)benzonitrile |
| 155 | 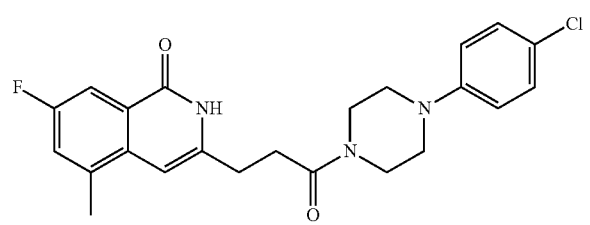 [SMILES: Cc1cc(F)cc2c(=O)[nH]c(CCC(=O)N3CCN(c4ccc(Cl)cc4)CC3)cc12] | 3-(3-(4-(4-chlorophenyl)piperazin-1-yl)-3-oxopropyl)-7-fluoro-5-methylisoquinolin-1(2H)-one |
| 156 | 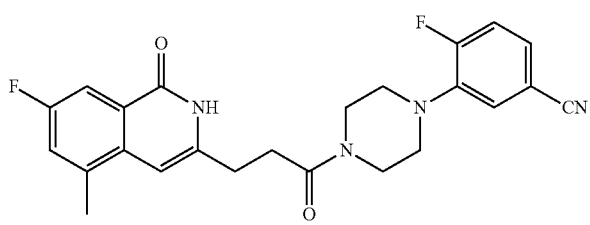 | 4-fluoro-3-(4-(3-(7-fluoro-5-methyl-1-oxo-1,2-dihydroisoquinolin-3-yl)propanoyl)piperazin-1-yl)benzonitrile |
| 157 | 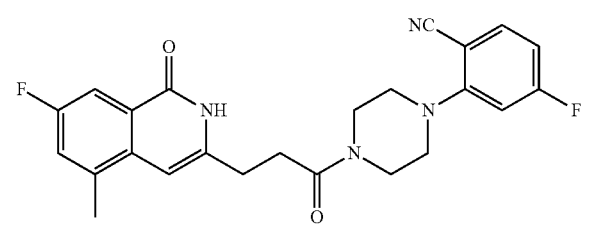 [SMILES: Cc1cc(F)cc2c(=O)[nH]c(CCC(=O)N3CCN(c4cc(F)ccc4C#N)CC3)cc12] | 4-fluoro-2-(4-(3-(7-fluoro-5-methyl-1-oxo-1,2-dihydroisoquinolin-3-yl)propanoyl)piperazin-1-yl)benzonitrile |

TABLE 1-continued

| Example | | |
|---|---|---|
| 158 | 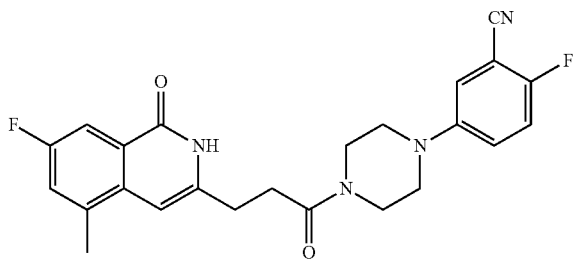 [SMILES: Cc1cc(F)cc2c(=O)[nH]c(CCC(=O)N3CCN(c4ccc(F)c(C#N)c4)CC3)cc12] | 2-fluoro-5-(4-(3-(7-fluoro-5-methyl-1-oxo-1,2-dihydroisoquinolin-3-yl)propanoyl)piperazin-1-yl)benzonitrile |
| 159 | 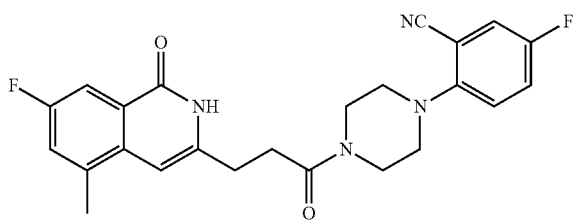 [SMILES: Cc1cc(F)cc2c(=O)[nH]c(CCC(=O)N3CCN(c4ccc(F)cc4C#N)CC3)cc12] | 5-fluoro-2-(4-(3-(7-fluoro-5-methyl-1-oxo-1,2-dihydroisoquinolin-3-yl)propanoyl)piperazin-1-yl)benzonitrile |
| 160 | 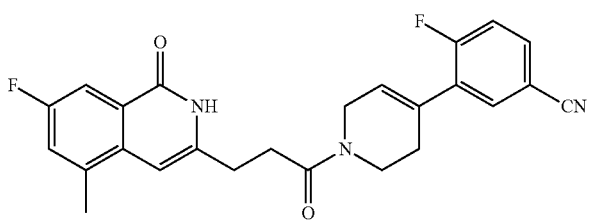 | 4-fluoro-3-(1-(3-(7-fluoro-5-methyl-1-oxo-1,2-dihydroisoquinolin-3-yl)propanoyl)-1,2,3,6-tetrahydropyridin-4-yl)benzonitrile |
| 161 | 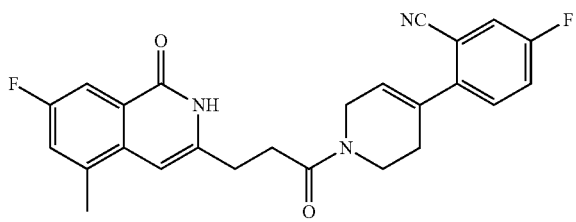 [SMILES: Cc1cc(F)cc2c(=O)[nH]c(CCC(=O)N3CC=C(c4ccc(F)cc4C#N)CC3)cc12] | 5-fluoro-2-(1-(3-(7-fluoro-5-methyl-1-oxo-1,2-dihydroisoquinolin-3-yl)propanoyl)-1,2,3,6-tetrahydropyridin-4-yl)benzonitrile |
| 162 | 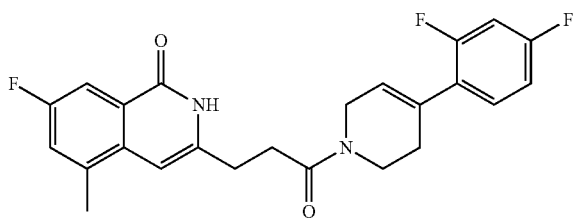 [SMILES: Cc1cc(F)cc2c(=O)[nH]c(CCC(=O)N3CC=C(c4ccc(F)cc4F)CC3)cc12] | 3-(3-(4-(2,4-difluorophenyl)-3,6-dihydropyridin-1(2H)-yl)-3-oxopropyl)-7-fluoro-5-methylisoquinolin-1(2H)-one |
| 163 | 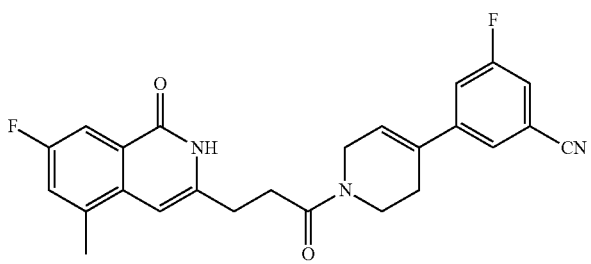 | 3-fluoro-5-(1-(3-(7-fluoro-5-methyl-1-oxo-1,2-dihydroisoquinolin-3-yl)propanoyl)-1,2,3,6-tetrahydropyridin-4-yl)benzonitrile |

TABLE 1-continued

| Example | | |
|---|---|---|
| 164 | 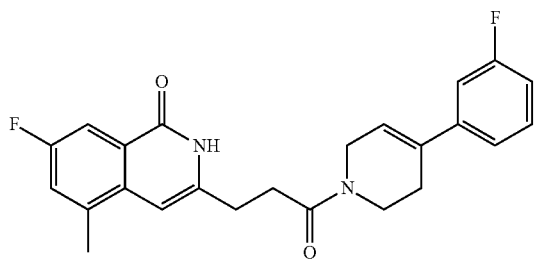 [SMILES: Cc1cc(F)cc2c(=O)[nH]c(CCC(=O)N3CC=C(c4cccc(F)c4)CC3)cc12] | 7-fluoro-3-(3-(4-(3-fluorophenyl)-3,6-dihydropyridin-1(2H)-yl)-3-oxopropyl)-5-methylisoquinolin-1(2H)-one |
| 165 | 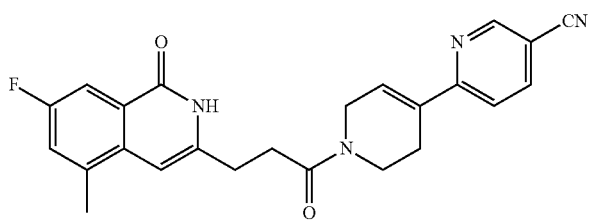 [SMILES: Cc1cc(F)cc2c(=O)[nH]c(CCC(=O)N3CC=C(c4ccc(C#N)cn4)CC3)cc12] | 1'-(3-(7-fluoro-5-methyl-1-oxo-1,2-dihydroisoquinolin-3-yl)propanoyl)-1',2',3',6'-tetrahydro-[2,4'-bipyridine]-5-carbonitrile |
| 166 | 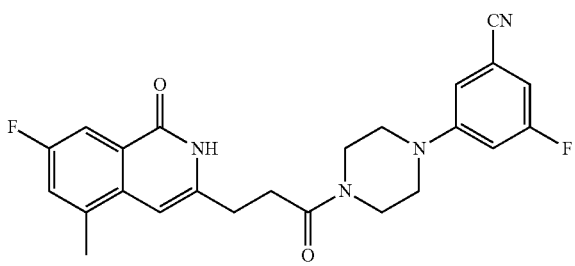 [SMILES: Cc1cc(F)cc2c(=O)[nH]c(CCC(=O)N3CCN(c4cc(F)cc(C#N)c4)CC3)cc12] | 3-fluoro-5-(4-(3-(7-fluoro-5-methyl-1-oxo-1,2-dihydroisoquinolin-3-yl)propanoyl)piperazin-1-yl)benzonitrile |
| 167 | 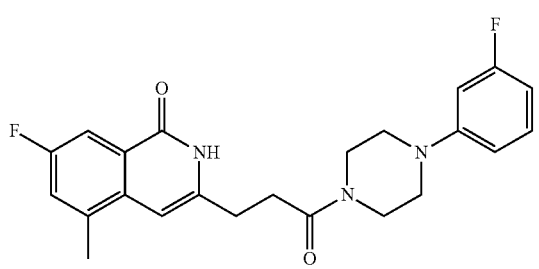 [SMILES: Cc1cc(F)cc2c(=O)[nH]c(CCC(=O)N3CCN(c4cccc(F)c4)CC3)cc12] | 7-fluoro-3-(3-(4-(3-fluorophenyl)piperazin-1-yl)-3-oxopropyl)-5-methylisoquinolin-1(2H)-one |
| 168 | 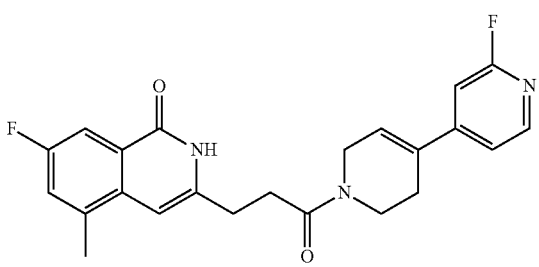 | 7-fluoro-3-(3-(2'-fluoro-3,6-dihydro-[4,4'-bipyridine]-1(2H)-yl)-3-oxopropyl)-5-methylisoquinolin-1(2H)-one |
| 169 | 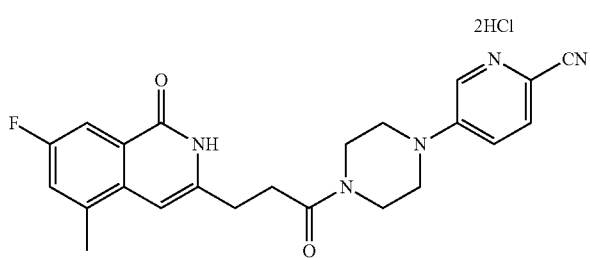 [SMILES: Cc1cc(F)cc2c(=O)[nH]c(CCC(=O)N3CCN(c4ccc(C#N)nc4)CC3)cc12] | 5-(4-(3-(7-fluoro-5-methyl-1-oxo-1,2-dihydroisoquinolin-3-yl)propanoyl)piperazin-1-yl)picolinonitrile dihydrochloride |

TABLE 1-continued

| Example | | |
|---|---|---|
| 170 | 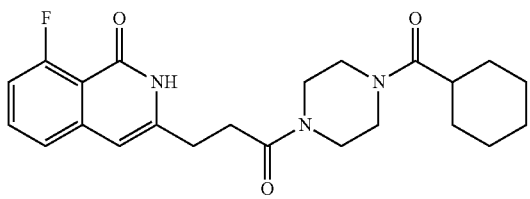 [SMILES: O=C(CCc1cc2cccc(F)c2c(=O)[nH]1)N1CCN(C(=O)C2CCCCC2)CC1] | 3-(3-(4-(cyclo-hexanecarbonyl)piperazin-1-yl)-3-oxopropyl)-8-fluoroisoquinolin-1(2H)-one |
| 171 | 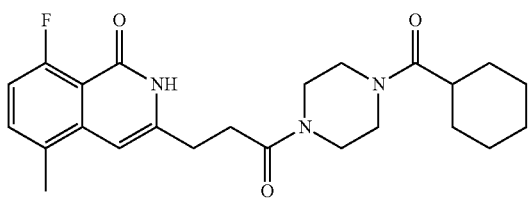 [SMILES: Cc1ccc(F)c2c(=O)[nH]c(CCC(=O)N3CCN(C(=O)C4CCCCC4)CC3)cc12] | 3-(3-(4-(cyclo-hexanecarbonyl)piperazin-1-yl)-3-oxopropyl)-8-fluoro-5-methylisoquinolin-1(2H)-one |
| 172 | 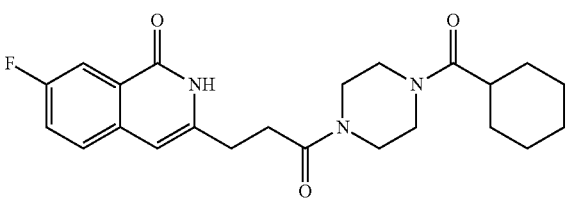 [SMILES: O=C(CCc1cc2ccc(F)cc2c(=O)[nH]1)N1CCN(C(=O)C2CCCCC2)CC1] | 3-(3-(4-(cyclo-hexanecarbonyl)piperazin-1-yl)-3-oxopropyl)-7-fluoroisoquinolin-1(2H)-one |
| 173 | 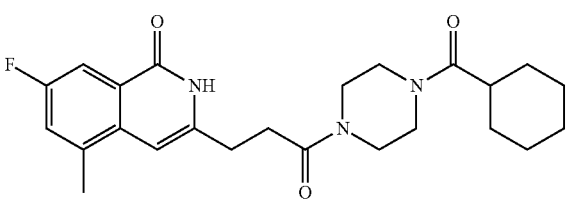 [SMILES: Cc1cc(F)cc2c(=O)[nH]c(CCC(=O)N3CCN(C(=O)C4CCCCC4)CC3)cc12] | 3-(3-(4-(cyclo-hexanecarbonyl)piperazin-1-yl)-3-oxopropyl)-7-fluoro-5-methylisoquinolin-1(2H)-one |
| 174 | 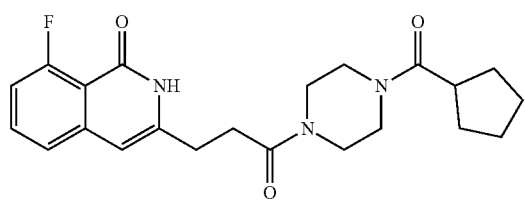 [SMILES: O=C(CCc1cc2cccc(F)c2c(=O)[nH]1)N1CCN(C(=O)C2CCCC2)CC1] | 3-(3-(4-(cyclo-pentanecarbonyl)piperazin-1-yl)-3-oxopropyl)-8-fluoroisoquinolin-1(2H)-one |
| 175 | 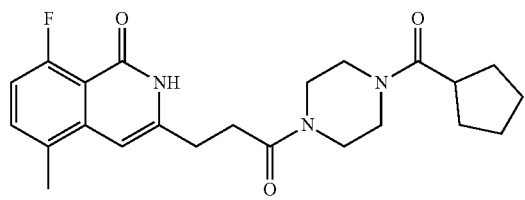 | 3-(3-(4-(cyclo-pentanecarbonyl)piperazin-1-yl)-3-oxopropyl)-8-fluoro-5-methylisoquinolin-1(2H)-one |
| 176 | 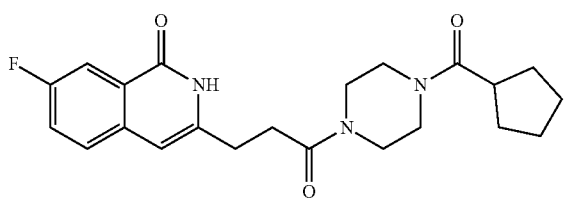 [SMILES: O=C(CCc1cc2ccc(F)cc2c(=O)[nH]1)N1CCN(C(=O)C2CCCC2)CC1] | 3-(3-(4-(cyclo-pentanecarbonyl)piperazin-1-yl)-3-oxopropyl)-7-fluoroisoquinolin-1(2H)-one |

US 12,459,899 B2

247 248

TABLE 1-continued

| Example | | |
|---|---|---|
| 177 | 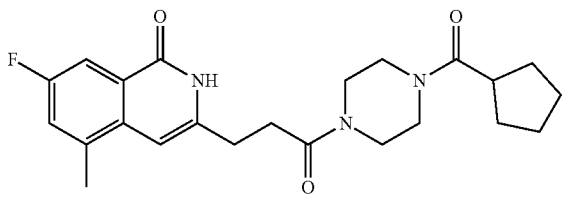 [SMILES: Cc1cc(F)cc2c(=O)[nH]c(CCC(=O)N3CCN(C(=O)C4CCCC4)CC3)cc12] | 3-(3-(4-(cyclo-pentanecarbonyl)piperazin-1-yl)-3-oxopropyl)-7-fluoro-5-methylisoquinolin-1(2H)-one |
| 178 | 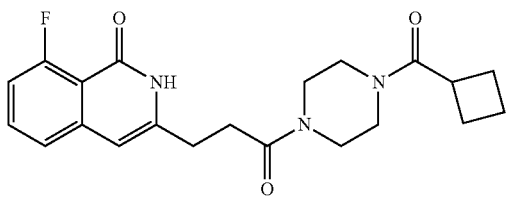 [SMILES: O=C(CCc1cc2cccc(F)c2c(=O)[nH]1)N1CCN(C(=O)C2CCC2)CC1] | 3-(3-(4-(cyclo-butanecarbonyl)piperazin-1-yl)-3-oxopropyl)-8-fluoroisoquinolin-1(2H)-one |
| 179 | 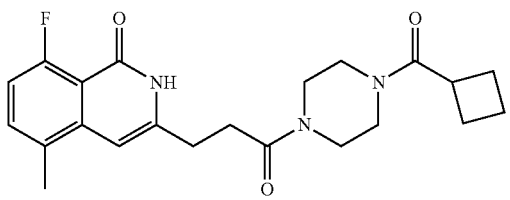 [SMILES: Cc1ccc(F)c2c(=O)[nH]c(CCC(=O)N3CCN(C(=O)C4CCC4)CC3)cc12] | 3-(3-(4-(cyclo-butanecarbonyl)piperazin-1-yl)-3-oxopropyl)-8-fluoro-5-methylisoquinolin-1(2H)-one |
| 180 | 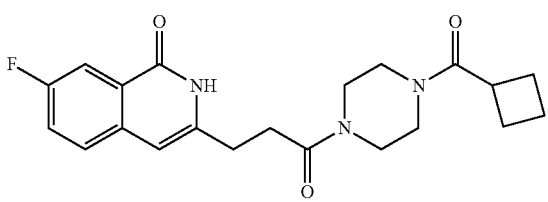 | 3-(3-(4-(cyclo-butanecarbonyl)piperazin-1-yl)-3-oxopropyl)-7-fluoroisoquinolin-1(2H)-one |
| 181 | 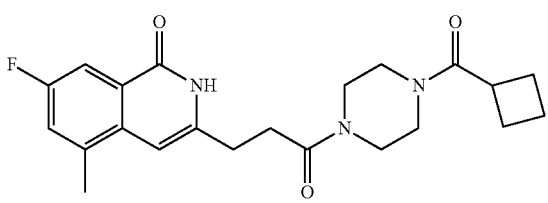 | 3-(3-(4-(cyclo-butanecarbonyl)piperazin-1-yl)-3-oxopropyl)-7-fluoro-5-methylisoquinolin-1(2H)-one |
| 182 | 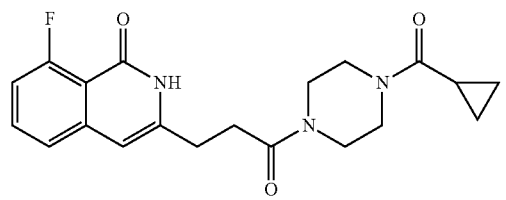 | 3-(3-(4-(cyclo-propanecarbonyl)piperazin-1-yl)-3-oxopropyl)-8-fluoroisoquinolin-1(2H)-one |
| 183 | 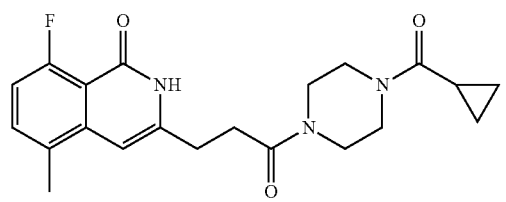 [SMILES: Cc1ccc(F)c2c(=O)[nH]c(CCC(=O)N3CCN(C(=O)C4CC4)CC3)cc12] | 3-(3-(4-(cyclo-propanecarbonyl)piperazin-1-yl)-3-oxopropyl)-8-fluoro-5-methylisoquinolin-1(2H)-one |

TABLE 1-continued

| Example | | |
|---|---|---|
| 184 | 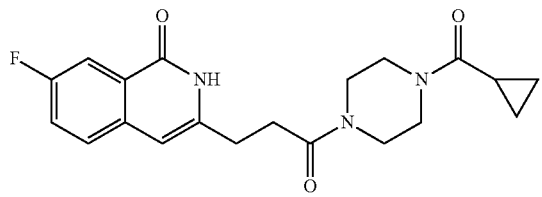 [SMILES: O=C(CCc1cc2ccc(F)cc2c(=O)[nH]1)N1CCN(C(=O)C2CC2)CC1] | 3-(3-(4-(cyclo-propanecarbonyl)piperazin-1-yl)-3-oxopropyl)-7-fluoroisoquinolin-1(2H)-one |
| 185 | 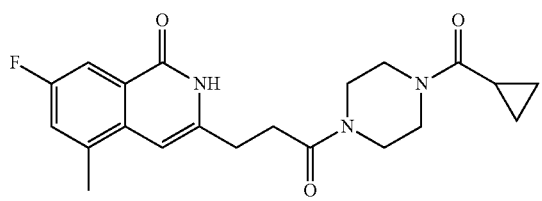 | 3-(3-(4-(cyclo-propanecarbonyl)piperazin-1-yl)-3-oxopropyl)-7-fluoro-5-methylisoquinolin-1(2H)-one |
| 186 | 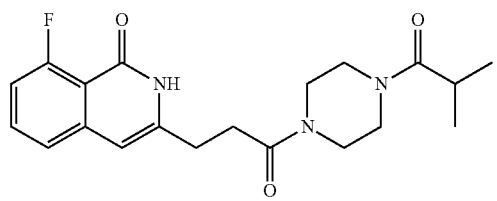 [SMILES: CC(C)C(=O)N1CCN(C(=O)CCc2cc3cccc(F)c3c(=O)[nH]2)CC1] | 8-fluoro-3-(3-(4-isobutyrylpiperazin-1-yl)-3-oxopropyl)isoquinolin-1(2H)-one |
| 187 | 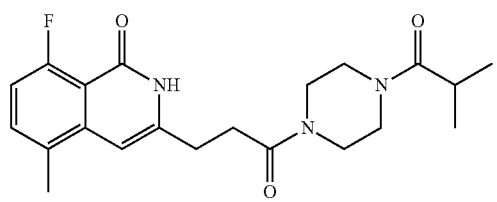 [SMILES: Cc1ccc(F)c2c(=O)[nH]c(CCC(=O)N3CCN(C(=O)C(C)C)CC3)cc12] | 8-fluoro-3-(3-(4-isobutyrylpiperazin-1-yl)-3-oxopropyl)-5-methylisoquinolin-1(2H)-one |
| 188 | 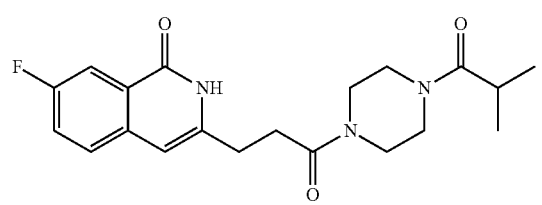 [SMILES: CC(C)C(=O)N1CCN(C(=O)CCc2cc3ccc(F)cc3c(=O)[nH]2)CC1] | 7-fluoro-3-(3-(4-isobutyrylpiperazin-1-yl)-3-oxopropyl)isoquinolin-1(2H)-one |
| 189 | 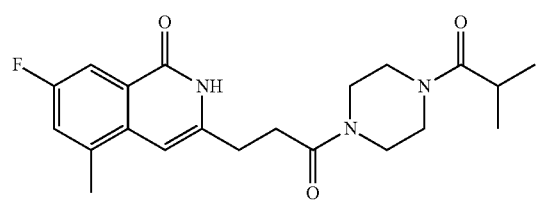 | 7-fluoro-3-(3-(4-isobutyrylpiperazin-1-yl)-3-oxopropyl)-5-methylisoquinolin-1(2H)-one |
| 190 | 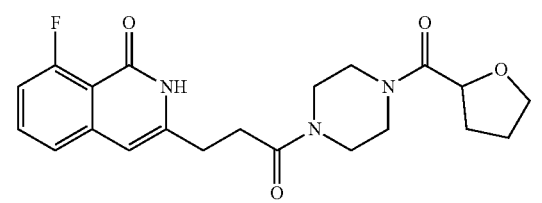 | 8-fluoro-3-(3-oxo-3-(4-(tetrahydrofuran-2-carbonyl)piperazin-1-yl)propyl)isoquinolin-1(2H)-one |

| Example | | |
|---|---|---|
| 191 | 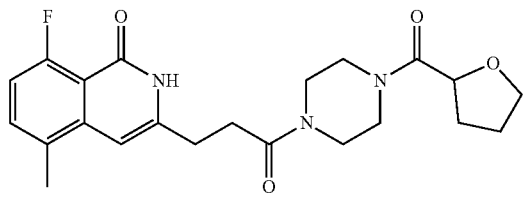 [SMILES: Cc1ccc(F)c2c(=O)[nH]c(CCC(=O)N3CCN(C(=O)C4CCCO4)CC3)cc12] | 8-fluoro-5-methyl-3-(3-oxo-3-(4-(tetrahydrofuran-2-carbonyl)piperazin-1-yl)propyl)isoquinolin-1(2H)-one |
| 192 | 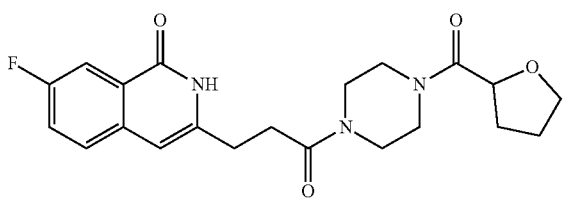 [SMILES: O=C(CCc1cc2ccc(F)cc2c(=O)[nH]1)N1CCN(C(=O)C2CCCO2)CC1] | 7-fluoro-3-(3-oxo-3-(4-(tetrahydrofuran-2-carbonyl)piperazin-1-yl)propyl)isoquinolin-1(2H)-one |
| 193 | 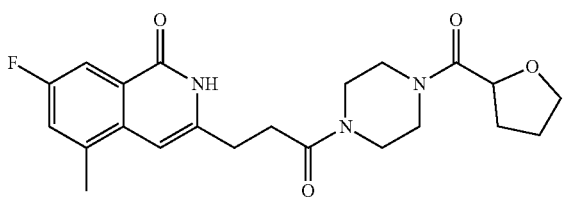 [SMILES: Cc1cc(F)cc2c(=O)[nH]c(CCC(=O)N3CCN(C(=O)C4CCCO4)CC3)cc12] | 7-fluoro-5-methyl-3-(3-oxo-3-(4-(tetrahydrofuran-2-carbonyl)piperazin-1-yl)propyl)isoquinolin-1(2H)-one |
| 194 | 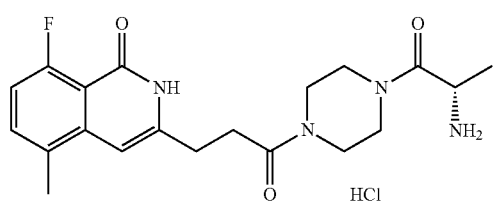 [SMILES: Cc1ccc(F)c2c(=O)[nH]c(CCC(=O)N3CCN(C(=O)[C@H](C)N)CC3)cc12 ; Cl] | 3-(3-(4-(L-alanyl)piperazin-1-yl)-3-oxopropyl)-8-fluoro-5-methylisoquinolin-1(2H)-one hydrochloride |
| 195 | 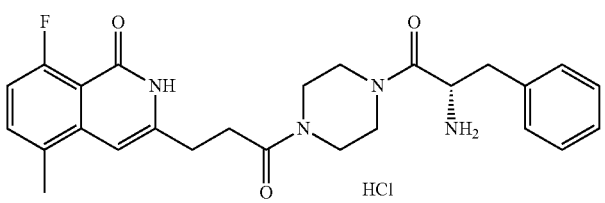 [SMILES: Cc1ccc(F)c2c(=O)[nH]c(CCC(=O)N3CCN(C(=O)[C@@H](N)Cc4ccccc4)CC3)cc12 ; Cl] | 3-(3-(4-(L-phenylalanyl)piperazin-1-yl)-3-oxopropyl)-8-fluoro-5-methylisoquinolin-1(2H)-one hydrochloride |
| 196 | 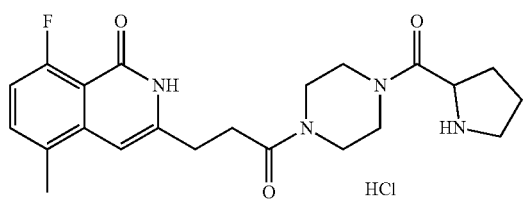 [SMILES: Cc1ccc(F)c2c(=O)[nH]c(CCC(=O)N3CCN(C(=O)C4CCCN4)CC3)cc12 ; Cl] | 8-fluoro-5-methyl-3-(3-oxo-3-(4-propylpiperazin-1-yl)propyl)isoquinolin-1(2H)-one hydrochloride |
| 197 | 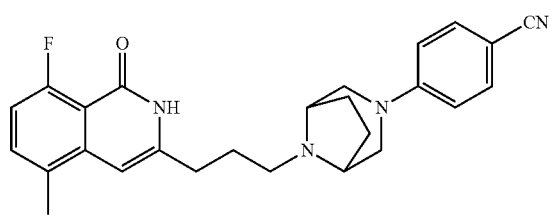 [SMILES: Cc1ccc(F)c2c(=O)[nH]c(CCCN3C4CCC3CN(c3ccc(C#N)cc3)C4)cc12] | 4-(8-(3-(8-fluoro-5-methyl-1-oxo-1,2-dihydroisoquinolin-3-yl)propyl-3,8-diazabicyclo[3.2.1]octan-3-yl)benzonitrile |

TABLE 1-continued

| Example | | |
|---|---|---|
| 198 | 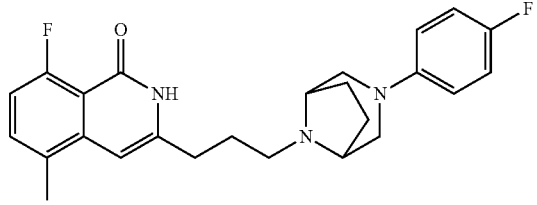 [SMILES: Cc1ccc(F)c2c(=O)[nH]c(CCCN3C4CCC3CN(c3ccc(F)cc3)C4)cc12] | 8-fluoro-3-(3-(3-(4-fluorophenyl)-3,8-diazabicyclo[3.2.1]octan-8-yl)propyl)-5-methylisoquinolin-1(2H)-one |
| 199 | 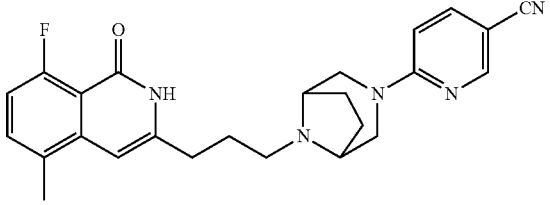 [SMILES: Cc1ccc(F)c2c(=O)[nH]c(CCCN3C4CCC3CN(c3ccc(C#N)cn3)C4)cc12] | 6-(8-(3-(8-fluoro-5-methyl-1-oxo-1,2-dihydroisoquinolin-3-yl)propyl-3,8-diazabicyclo[3.2.1]octan-3-yl)nicotinonitrile |
| 200 | 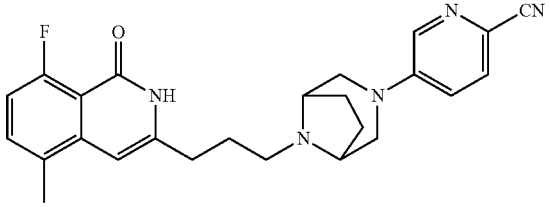 [SMILES: Cc1ccc(F)c2c(=O)[nH]c(CCCN3C4CCC3CN(c3ccc(C#N)nc3)C4)cc12] | 5-(8-(3-(8-fluoro-5-methyl-1-oxo-1,2-dihydroisoquinolin-3-yl)propyl)-3,8-diazabicyclo[3.2.1]octan-3-yl)picolinonitrile |
| 201 | 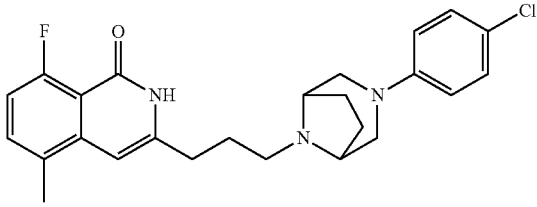 [SMILES: Cc1ccc(F)c2c(=O)[nH]c(CCCN3C4CCC3CN(c3ccc(Cl)cc3)C4)cc12] | 3-(3-(3-(4-chlorophenyl)-3,8-diazabicyclo[3.2.1]octan-8-yl)propyl)-8-fluoro-5-methylisoquinolin-1(2H)-one |
| 202 | 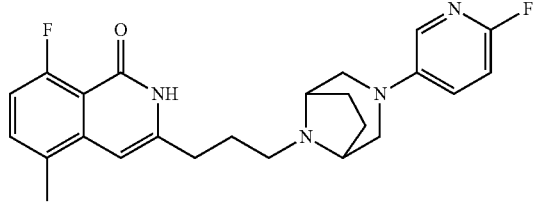 [SMILES: Cc1ccc(F)c2c(=O)[nH]c(CCCN3C4CCC3CN(c3ccc(F)nc3)C4)cc12] | 8-fluoro-3-(3-(3-(6-fluoropyridin-3-yl)-3,8-diazabicyclo[3.2.1]octan-8-yl)propyl)-5-methylisoquinolin-1(2H)-one |
| 203 | 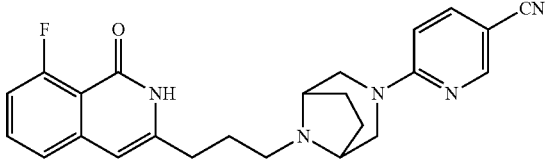 [SMILES: N#Cc1ccc(N2CC3CCC(C2)N3CCCc2cc3cccc(F)c3c(=O)[nH]2)nc1] | 6-(8-(3-(8-fluoro-1-oxo-1,2-dihydroisoquinolin-3-yl)propyl)3,8-diazabicyclo[3.2.1]octan-3-yl)nicotinonitrile |
| 204 | 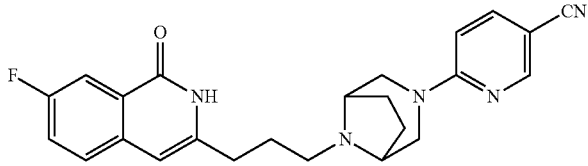 [SMILES: N#Cc1ccc(N2CC3CCC(C2)N3CCCc2cc3ccc(F)cc3c(=O)[nH]2)nc1] | 6-(8-(3-(7-fluoro-1-oxo-1,2-dihydroisoquinolin-3-yl)propyl)-3,8-diazabicyclo[3.2.1]octan-3-yl)nicotinonitrile |

TABLE 1-continued

| Example | | |
|---|---|---|
| 205 | 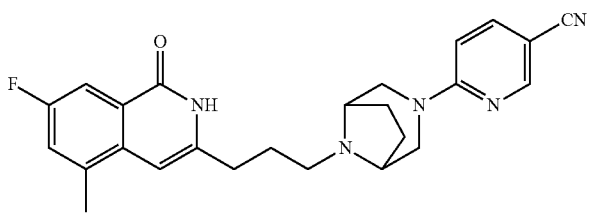 [SMILES: Cc1cc(F)cc2c(=O)[nH]c(CCCN3C4CCC3CN(c3ccc(C#N)cn3)C4)cc12] | 6-(8-(3-(7-fluoro-5-methyl-1-oxo-1,2-dihydroisoquinolin-3-yl)propyl)-3,8-diazabicyclo[3.2.1]octan-3-yl)nicotinonitrile |
| 206 | 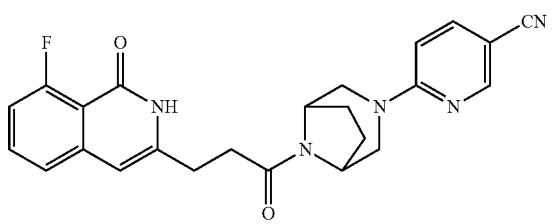 [SMILES: N#Cc1ccc(N2CC3CCC(C2)N3C(=O)CCc2cc3cccc(F)c3c(=O)[nH]2)nc1] | 6-(8-(3-(8-fluoro-1-oxo-1,2-dihydroisoquinolin-3-yl)propanoyl)-3,8-diazabicyclo[3.2.1]octan-3-yl)nicotinonitrile |
| 207 | 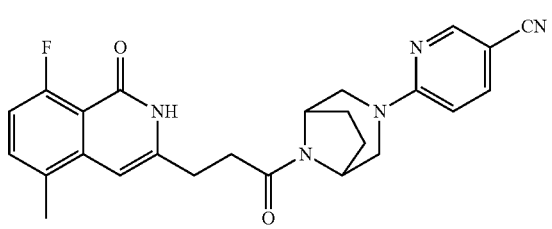 [SMILES: Cc1ccc(F)c2c(=O)[nH]c(CCC(=O)N3C4CCC3CN(c3ccc(C#N)cn3)C4)cc12] | 6-(8-(3-(8-fluoro-5-methyl-1-oxo-1,2-dihydroisoquinolin-3-yl)propanoyl)-3,8-diazabicyclo[3.2.1]octan-3-yl)nicotinonitrile |
| 208 | 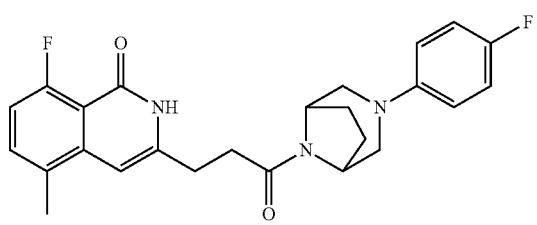 [SMILES: Cc1ccc(F)c2c(=O)[nH]c(CCC(=O)N3C4CCC3CN(c3ccc(F)cc3)C4)cc12] | 8-fluoro-3-(3-(3-(4-fluorophenyl)-3,8-diazabicyclo[3.2.1]octan-8-yl)-3-oxopropyl)-5-methylisoquinolin-1(2H)-one |
| 209 | 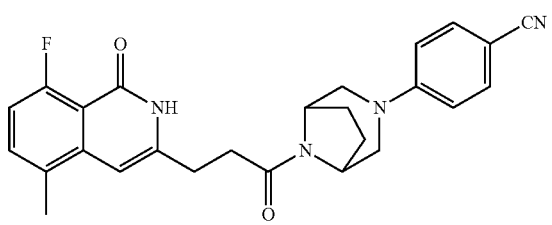 [SMILES: Cc1ccc(F)c2c(=O)[nH]c(CCC(=O)N3C4CCC3CN(c3ccc(C#N)cc3)C4)cc12] | 4-(8-(3-(8-fluoro-5-methyl-1-oxo-1,2-dihydroisoquinolin-3-yl)propanoyl)-3,8-diazabicyclo[3.2.1]octan-3-yl)benzonitrile |
| 210 | 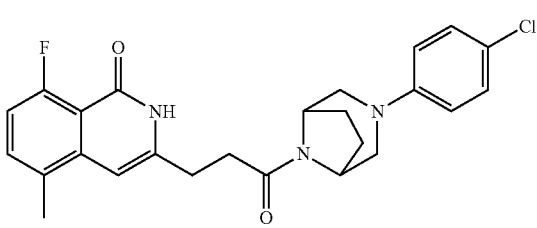 [SMILES: Cc1ccc(F)c2c(=O)[nH]c(CCC(=O)N3C4CCC3CN(c3ccc(Cl)cc3)C4)cc12] | 3-(3-(3-(4-chlorophenyl)-3,8-diazabicyclo[3.2.1]octan-8-yl)-3-oxopropyl)-8-fluoro-5-methylisoquinolin-1(2H)-one |
| 211 | 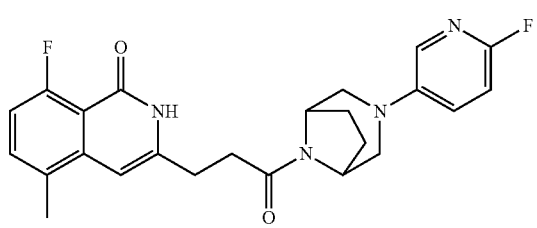 [SMILES: Cc1ccc(F)c2c(=O)[nH]c(CCC(=O)N3C4CCC3CN(c3ccc(F)nc3)C4)cc12] | 8-fluoro-3-(3-(3-(6-fluoropyridin-3-yl)-3,8-diazabicyclo[3.2.1]octan-8-yl)-3-oxopropyl)-5-methylisoquinolin-1(2H)-one |

TABLE 1-continued

| Example | | |
|---|---|---|
| 212 | 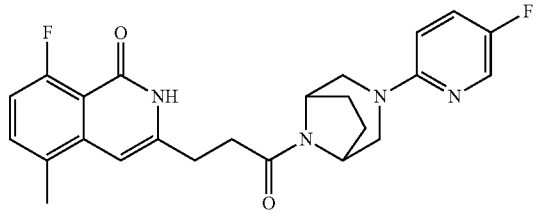 | 8-fluoro-3-(3-(3-(5-fluoropyridin-2-yl)-3,8-diazabicyclo[3.2.1]octan-8-yl)-3-oxopropyl)-5-methylisoquinolin-1(2H)-one |
| 213 | 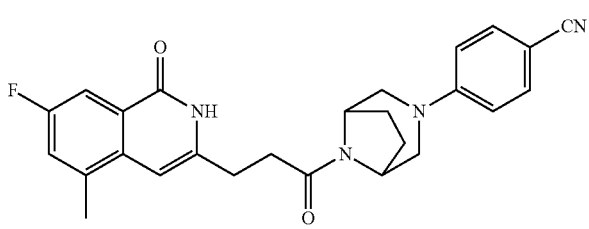 [SMILES: Cc1cc(F)cc2c(=O)[nH]c(CCC(=O)N3C4CCC3CN(c3ccc(C#N)cc3)C4)cc12] | 4-(8-(3-(7-fluoro-5-methyl-1-oxo-1,2-dihydroisoquinolin-3-yl)propanoyl)-3,8-diazabicyclo[3.2.1]octan-3-yl)benzonitrile |
| 214 | 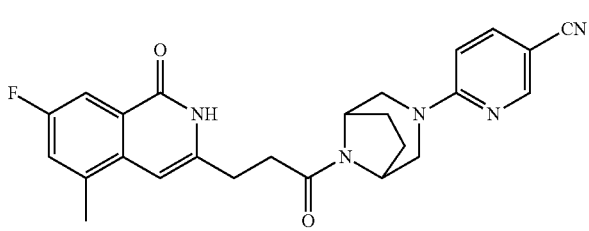 [SMILES: Cc1cc(F)cc2c(=O)[nH]c(CCC(=O)N3C4CCC3CN(c3ccc(C#N)cn3)C4)cc12] | 6-(8-(3-(7-fluoro-5-methyl-1-oxo-1,2-dihydroisoquinolin-3-yl)propanoyl)-3,8-diazabicyclo[3.2.1]octan-3-yl)nicotinonitrile |
| 215 | 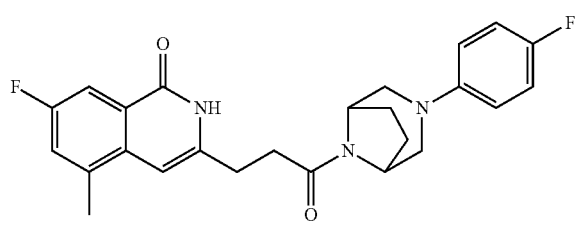 [SMILES: Cc1cc(F)cc2c(=O)[nH]c(CCC(=O)N3C4CCC3CN(c3ccc(F)cc3)C4)cc12] | 7-fluoro-3-(3-(3-(4-fluorophenyl)-3,8-diazabicyclo[3.2.1]octan-8-yl)-3-oxopropyl)-5-methylisoquinolin-1(2H)-one |
| 216 | 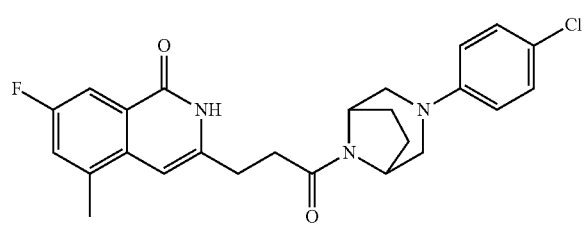 [SMILES: Cc1cc(F)cc2c(=O)[nH]c(CCC(=O)N3C4CCC3CN(c3ccc(Cl)cc3)C4)cc12] | 3-(3-(3-(4-chlorophenyl)-3,8-diazabicyclo[3.2.1]octan-8-yl)-3-oxopropyl)-7-fluoro-5-methylisoquinolin-1(2H)-one |
| 217 | 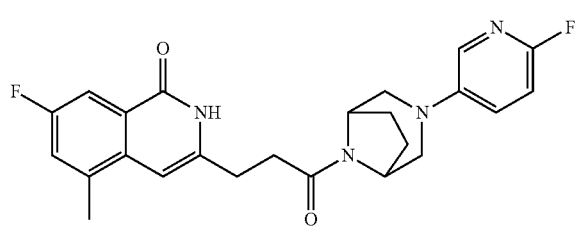 [SMILES: Cc1cc(F)cc2c(=O)[nH]c(CCC(=O)N3C4CCC3CN(c3ccc(F)nc3)C4)cc12] | 7-fluoro-3-(3-(3-(6-fluoropyridin-3-yl)-3,8-diazabicyclo[3.2.1]octan-8-yl)-3-oxopropyl)-5-methylisoquinolin-1(2H)-one |
| 218 | 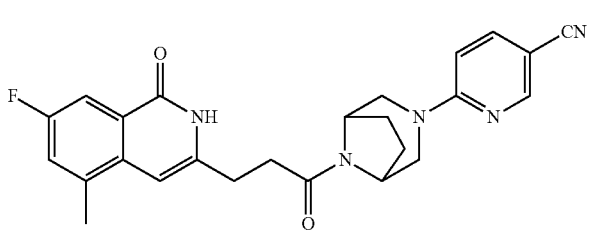 [SMILES: Cc1cc(F)cc2c(=O)[nH]c(CCC(=O)N3C4CCC3CN(c3ccc(C#N)cn3)C4)cc12] | 6-(8-(3-(7-fluoro-5-methyl-1-oxo-1,2-dihydroisoquinolin-3-yl)propanoyl)-3,8-diazabicyclo[3.2.1]octan-3-yl)nicotinonitrile |

TABLE 1-continued

| Example | | |
|---|---|---|
| 219 | 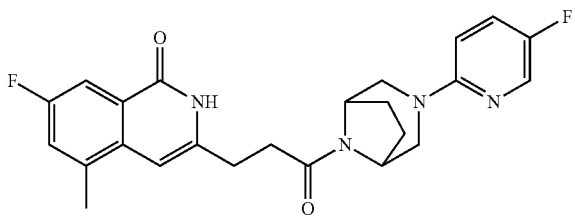 [SMILES: Cc1cc(F)cc2c(=O)[nH]c(CCC(=O)N3C4CCC3CN(c3ccc(F)cn3)C4)cc12] | 7-fluoro-3-(3-(3-(5-fluoropyridin-2-yl)-3,8-diazabicyclo[3.2.1]octan-8-yl)-3-oxopropyl)-5-methylisoquinolin-1(2H)-one |
| 220 | 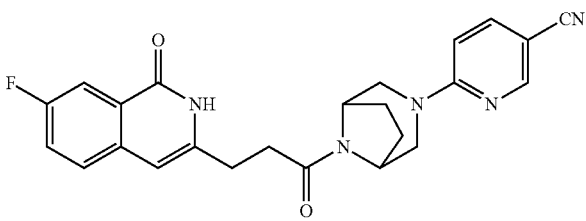 [SMILES: N#Cc1ccc(N2CC3CCC(C2)N3C(=O)CCc2cc3ccc(F)cc3c(=O)[nH]2)nc1] | 6-(8-(3-(7-fluoro-1-oxo-1,2-dihydroisoquinolin-3-yl)propanoyl)3,8-diazabicyclo[3.2.1]octan-3-yl)nicotinonitrile |
| 221 | 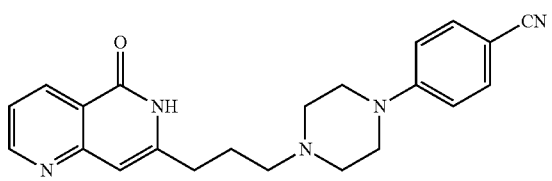 | 4-(4-(3-(5-oxo-5,6-dihydro-1,6-naphthyridin-7-yl)propyl)piperazin-1-yl)benzonitrile |
| 222 | 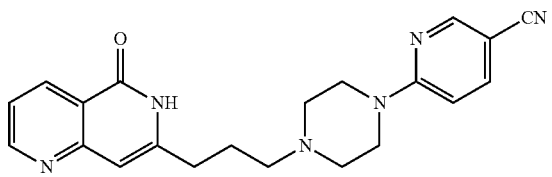 [SMILES: N#Cc1ccc(N2CCN(CCCc3cc4ncccc4c(=O)[nH]3)CC2)nc1] | 6-(4-(3-(5-oxo-5,6-dihydro-1,6-naphthyridin-7-yl)propyl)piperazin-1-yl)nicotinonitrile |
| 223 | 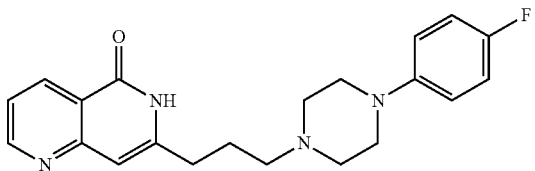 [SMILES: O=c1[nH]c(CCCN2CCN(c3ccc(F)cc3)CC2)cc2ncccc12] | 7-(3-(4-(4-fluorophenyl)piperazin-1-yl)propyl)-1,6-naphthyridin-5(6H)-one |
| 224 | 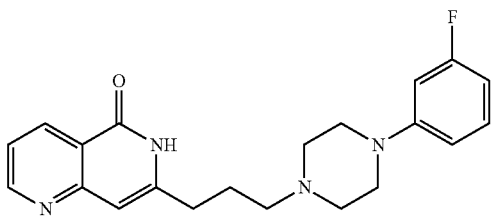 [SMILES: O=c1[nH]c(CCCN2CCN(c3cccc(F)c3)CC2)cc2ncccc12] | 7-(3-(4-(3-fluorophenyl)piperazin-1-yl)propyl)-1,6-naphthyridin-5(6H)-one |
| 225 | 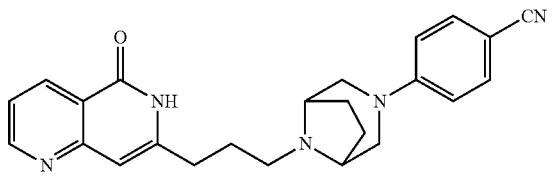 | 4-(8-(3-(5-oxo-5,6-dihydro-1,6-naphthyridin-7-yl)propyl)-3,8-diazabicyclo[3.2.1]octan-3-yl)benzonitrile |
| 226 | 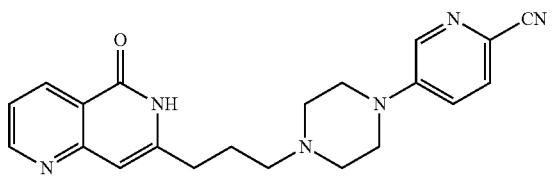 [SMILES: N#Cc1ccc(N2CCN(CCCc3cc4ncccc4c(=O)[nH]3)CC2)cn1] | 5-(4-(3-(5-oxo-5,6-dihydro-1,6-naphthyridin-7-yl)propyl)piperazin-1-yl)picolinonitrile |

TABLE 1-continued

| Example | | |
|---|---|---|
| 227 | 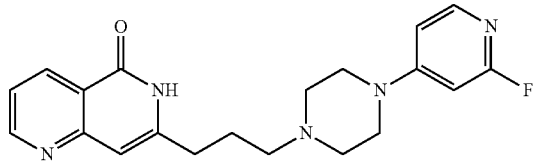 [SMILES: O=c1[nH]c(CCCN2CCN(c3ccnc(F)c3)CC2)cc2ncccc12] | 7-(3-(4-(2-fluoropyridin-4-yl)piperazin-1-yl)propyl)-1,6-naphthyridin-5(6H)-one |
| 228 | 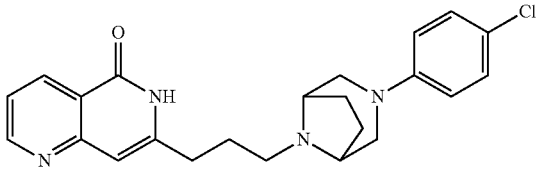 [SMILES: O=c1[nH]c(CCCN2C3CCC2CN(c2ccc(Cl)cc2)C3)cc2ncccc12] | 7-(3-(3-(4-chlorophenyl)-3,8-diazabicyclo[3.2.1]octan-8-yl)propyl)-1,6-naphthyridin-5(6H)-one |
| 229 | 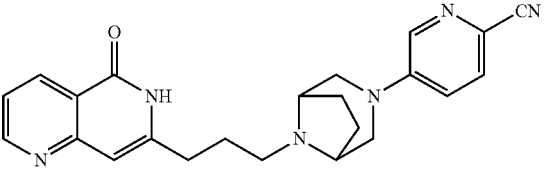 [SMILES: N#Cc1ccc(N2CC3CCC(C2)N3CCCc2cc3ncccc3c(=O)[nH]2)cn1] | 5-(8-(3-(5-oxo-5,6-dihydro-1,6-naphthyridin-7-yl)propyl)-3,8-diazabicyclo[3.2.1]octan-3-yl)picolinonitrile |
| 230 | 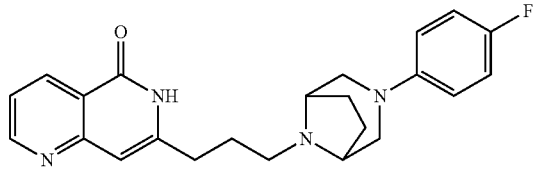 [SMILES: O=c1[nH]c(CCCN2C3CCC2CN(c2ccc(F)cc2)C3)cc2ncccc12] | 7-(3-(3-(4-fluorophenyl)-3,8-diazabicyclo[3.2.1]octan-8-yl)propyl-1,6-naphthyridin-5(6H)-one |
| 231 | 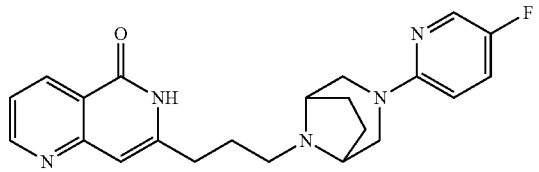 [SMILES: O=c1[nH]c(CCCN2C3CCC2CN(c2ccc(F)cn2)C3)cc2ncccc12] | 7-(3-(3-(5-fluoropyridin-2-yl)-3,8-diazabicyclo[3.2.1]octan-8-yl)propyl)-1,6-naphthyridin-5(6H)-one |
| 232 | 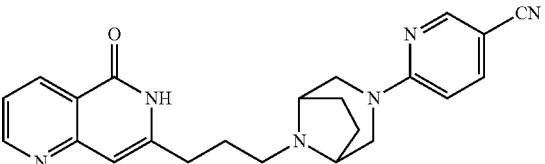 | 6-(8-(3-(5-oxo-5,6-dihydro-1,6-naphthyridin-7-yl)propyl)-3,8-diazabicyclo[3.2.1]octan-3-yl)nicotinonitrile |
| 233 | 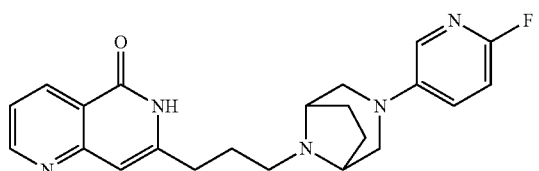 | 7-(3-(3-(6-fluoropyridin-3-yl)-3,8-diazabicyclo[3.2.1]octan-8-yl)propyl)-1,6-naphthyridin-5(6H)-one |
| 234 | 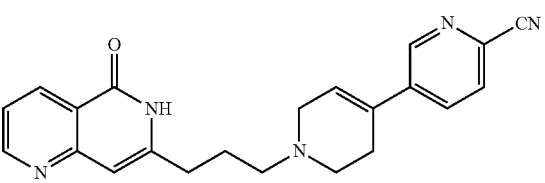 | 1'-(3-(5-oxo-5,6-dihydro-1,6-naphthyridin-7-yl)propyl)-1',2',3',6'-tetrahydro-[3,4'-bipyridine]-6-carbonitrile |

TABLE 1-continued

| Example | | |
|---|---|---|
| 235 | 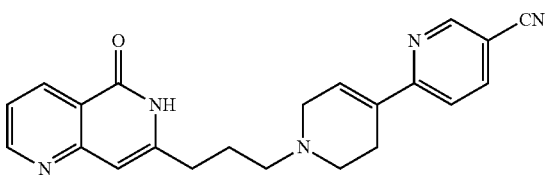 | 1'-(3-(5-oxo-5,6-dihydro-1,6-naphthyridin-7-yl)propyl)-1',2',3',6'-tetrahydro-[2,4'-bipyridine]-5-carbonitrile |
| 236 | 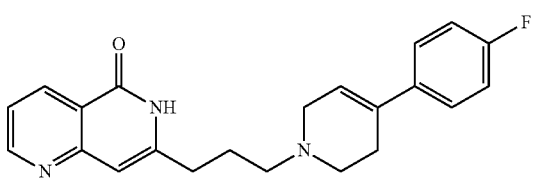 [SMILES: O=c1[nH]c(CCCN2CC=C(c3ccc(F)cc3)CC2)cc2ncccc12] | 7-(3-(4-(4-fluorophenyl)-3,6-dihydropyridin-1(2H)-yl)propyl)-1,6-naphthyridin-5(6H)-one |
| 237 | 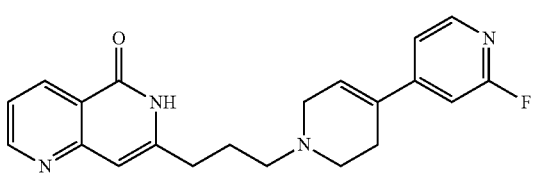 | 7-(3-(2'-fluoro-3,6-dihydro-[4,4'-bipyridine]-1(2H)-yl)propyl)-1,6-naphthyridin-5(6H)-one |
| 238 | 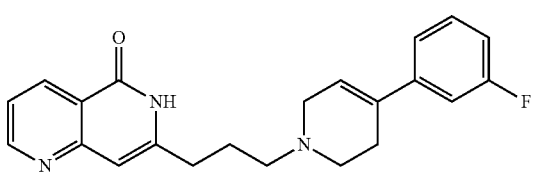 [SMILES: O=c1[nH]c(CCCN2CC=C(c3cccc(F)c3)CC2)cc2ncccc12] | 7-(3-(4-(3-fluorophenyl)-3,6-dihydropyridin-1(2H)-yl)propyl)-1,6-naphthyridin-5(6H)-one |
| 239 | 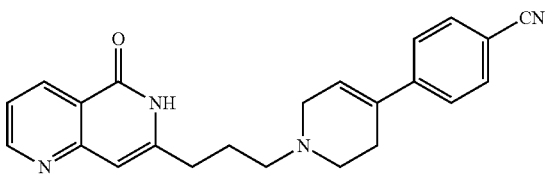 [SMILES: N#Cc1ccc(C2=CCN(CCCc3cc4ncccc4c(=O)[nH]3)CC2)cc1] | 4-(1-(3-(5-oxo-5,6-dihydro-1,6-naphthyridin-7-yl)propyl)-1,2,3,6-tetrahydropyridin-4-yl)benzonitrile |
| 240 | 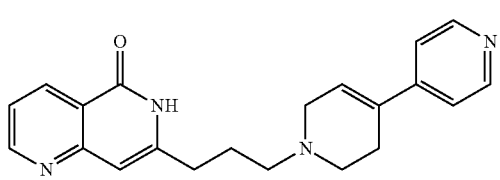 [SMILES: O=c1[nH]c(CCCN2CC=C(c3ccncc3)CC2)cc2ncccc12] | 7-(3-(3,6-dihydro-[4,4'-bipyridine]-1(2H)-yl)propyl)-1,6-naphthyridin-5(6H)-one |
| 241 | 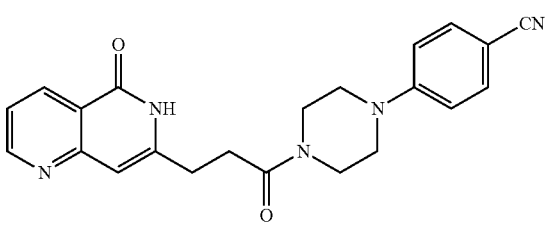 | 4-(4-(3-(5-oxo-5,6-dihydro-1,6-naphthyridin-7-yl)propanoyl)piperazin-1-yl)benzonitrile |
| 242 | 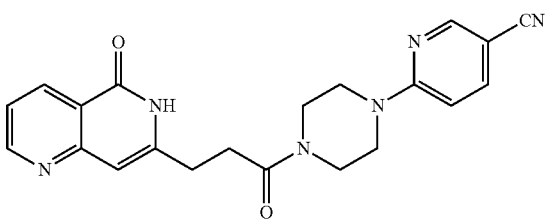 | 6-(4-(3-(5-oxo-5,6-dihydro-1,6-naphthyridin-7-yl)propanoyl)piperazin-1-yl)nicotinonitrile |

TABLE 1-continued

| Example | | |
|---|---|---|
| 243 | 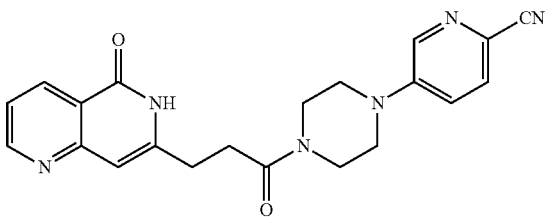 [SMILES: N#Cc1ccc(N2CCN(C(=O)CCc3cc4ncccc4c(=O)[nH]3)CC2)cn1] | 5-(4-(3-(5-oxo-5,6-dihydro-1,6-naphthyridin-7-yl)propanoyl)piperazin-1-yl)picolinonitrile |
| 244 | 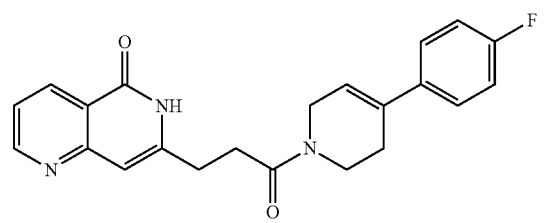 [SMILES: O=C(CCc1cc2ncccc2c(=O)[nH]1)N1CC=C(c2ccc(F)cc2)CC1] | 7-(3-(4-(4-fluorophenyl)-3,6-dihydropyridin-1(2H)-yl)-3-oxopropyl)-1,6-naphthyridin-5(6H)-one |
| 245 | 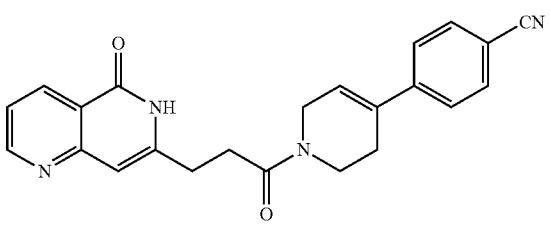 | 4-(1-(3-(5-oxo-5,6-dihydro-1,6-naphthyridin-7-yl)propanoyl)-1,2,3,6-tetrahydropyridin-4-yl)benzonitrile |
| 246 | 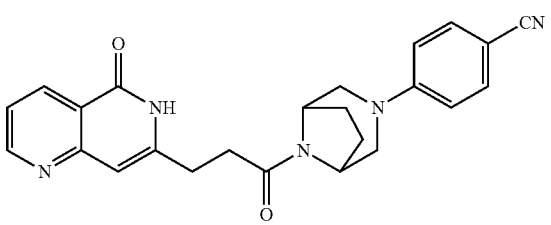 [SMILES: N#Cc1ccc(N2CC3CCC(C2)N3C(=O)CCc2cc3ncccc3c(=O)[nH]2)cc1] | 4-(8-(3-(5-oxo-5,6-dihydro-1,6-naphthyridin-7-yl)propanoyl)-3,8-diazabicyclo[3.2.1]octan-3-yl)benzonitrile |
| 247 | 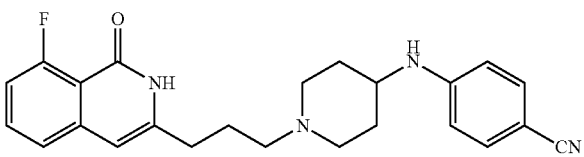 [SMILES: N#Cc1ccc(NC2CCN(CCCc3cc4cccc(F)c4c(=O)[nH]3)CC2)cc1] | 4-((1-(3-(8-fluoro-1-oxo-1,2-dihydroisoquinolin-3-yl)propyl)piperidin-4-yl)amino)benzonitrile |
| 248 | 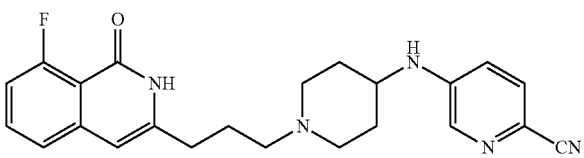 [SMILES: N#Cc1ccc(NC2CCN(CCCc3cc4cccc(F)c4c(=O)[nH]3)CC2)cn1] | 5-((1-(3-(8-fluoro-1-oxo-1,2-dihydroisoquinolin-3-yl)propyl)piperidin-4-yl)amino)picolinonitrile |
| 249 | 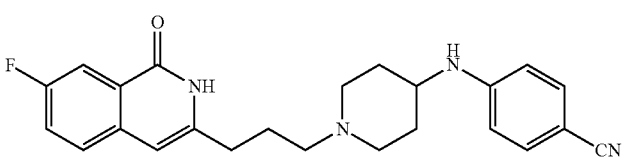 [SMILES: N#Cc1ccc(NC2CCN(CCCc3cc4ccc(F)cc4c(=O)[nH]3)CC2)cc1] | 4-((1-(3-(7-fluoro-1-oxo-1,2-dihydroisoquinolin-3-yl)propyl)piperidin-4-yl)amino)benzonitrile |
| 250 | 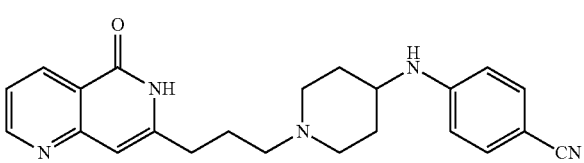 [SMILES: N#Cc1ccc(NC2CCN(CCCc3cc4ncccc4c(=O)[nH]3)CC2)cc1] | 4-((1-(3-(5-oxo-5,6-dihydro-1,6-naphthyridin-7-yl)propyl)piperidin-4-yl)amino)benzonitrile |

TABLE 1-continued

| Example | | |
|---|---|---|
| 251 | 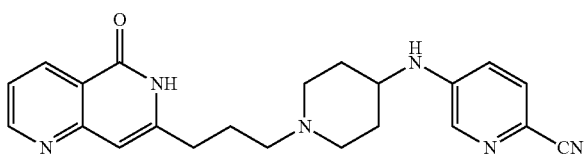 [SMILES: N#Cc1ccc(NC2CCN(CCCc3cc4ncccc4c(=O)[nH]3)CC2)cn1] | 5-((1-(3-(5-oxo-5,6-dihydro-1,6-naphthyridin-7-yl)propyl)piperidin-4-yl)amino)picolinonitrile |
| 252 | 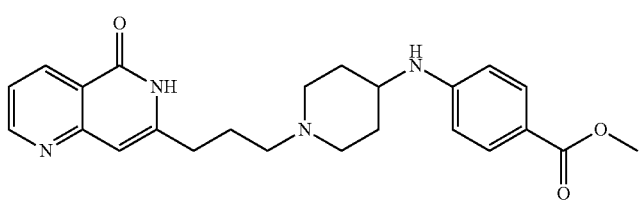 [SMILES: COC(=O)c1ccc(NC2CCN(CCCc3cc4ncccc4c(=O)[nH]3)CC2)cc1] | methyl 4-((1-(3-(5-oxo-5,6-dihydro-1,6-naphthyridin-7-yl)propyl)piperidin-4-yl)amino)benzoate |
| 253 | 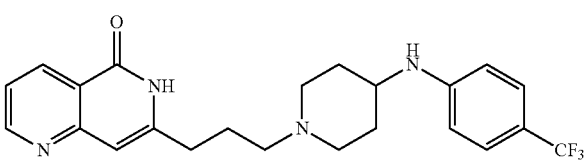 [SMILES: O=c1[nH]c(CCCN2CCC(Nc3ccc(C(F)(F)F)cc3)CC2)cc2ncccc12] | 7-(3-(4-((4-(trifluoromethyl)phenyl)amino)piperidin-1-yl)propyl)-1,6-naphthyridin-5(6H)-one |
| 254 | 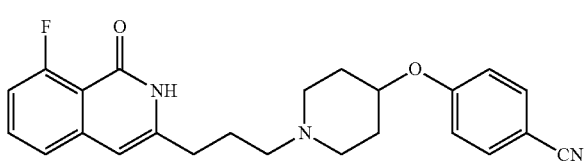 [SMILES: N#Cc1ccc(OC2CCN(CCCc3cc4cccc(F)c4c(=O)[nH]3)CC2)cc1] | 4-((1-(3-(8-fluoro-1-oxo-1,2-dihydroisoquinolin-3-yl)propyl)piperidin-4-yl)oxy)benzonitrile |
| 255 | 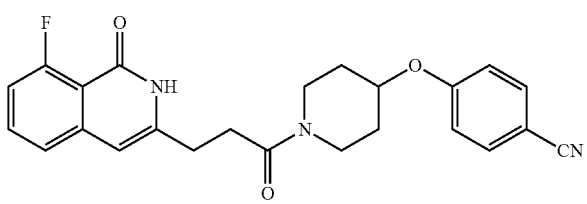 [SMILES: N#Cc1ccc(OC2CCN(C(=O)CCc3cc4cccc(F)c4c(=O)[nH]3)CC2)cc1] | 4-((1-(3-(8-fluoro-1-oxo-1,2-dihydroisoquinolin-3-yl)propanoyl)piperidin-4-yl)oxy)benzonitrile |
| 256 | 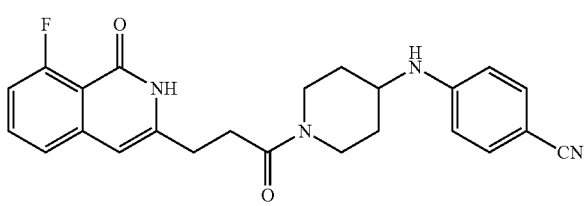 [SMILES: N#Cc1ccc(NC2CCN(C(=O)CCc3cc4cccc(F)c4c(=O)[nH]3)CC2)cc1] | 4-((1-(3-(8-fluoro-1-oxo-1,2-dihydroisoquinolin-3-yl)propanoyl)piperidin-4-yl)amino)benzonitrile |
| 257 | 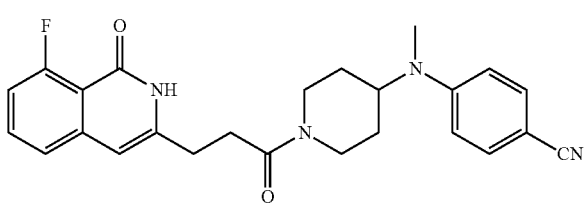 [SMILES: CN(c1ccc(C#N)cc1)C1CCN(C(=O)CCc2cc3cccc(F)c3c(=O)[nH]2)CC1] | 4-((1-(3-(8-fluoro-1-oxo-1,2-dihydroisoquinolin-3-yl)propanoyl)piperidin-4-yl)(methyl)amino)benzonitrile |
| 258 | 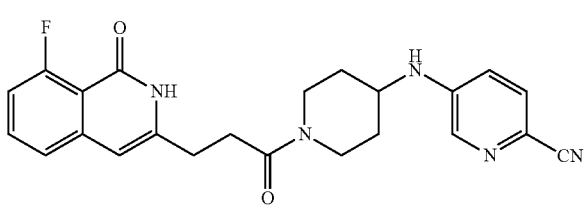 | 5-((1-(3-(8-fluoro-1-oxo-1,2-dihydroisoquinolin-3-yl)propanoyl)piperidin-4-yl)amino)picolinonitrile |

TABLE 1-continued

| Example | | |
|---|---|---|
| 259 | 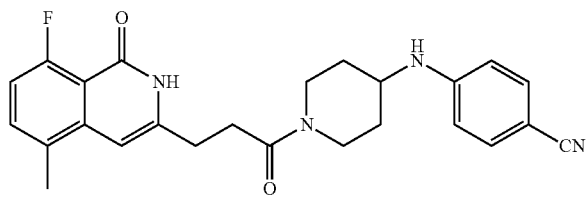 [SMILES: Cc1ccc(F)c2c(=O)[nH]c(CCC(=O)N3CCC(Nc4ccc(C#N)cc4)CC3)cc12] | 4-((1-(3-(8-fluoro-5-methyl-1-oxo-1,2-dihydroisoquinolin-3-yl)propanoyl)piperidin-4-yl)amino)benzonitrile |
| 260 | 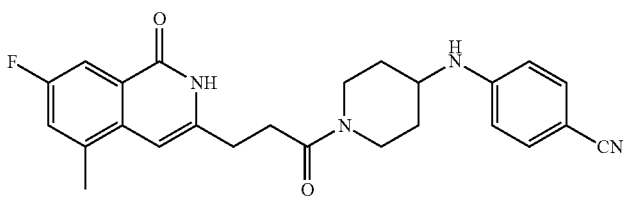 [SMILES: Cc1cc(F)cc2c(=O)[nH]c(CCC(=O)N3CCC(Nc4ccc(C#N)cc4)CC3)cc12] | 4-((1-(3-(7-fluoro-5-methyl-1-oxo-1,2-dihydroisoquinolin-3-yl)propanoyl)piperidin-4-yl)amino)benzonitrile |
| 261 | 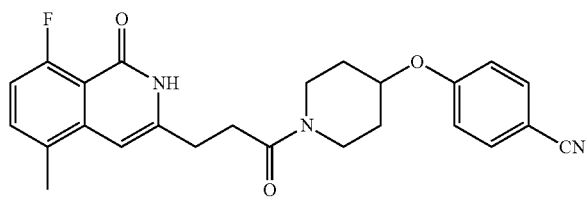 [SMILES: Cc1ccc(F)c2c(=O)[nH]c(CCC(=O)N3CCC(Oc4ccc(C#N)cc4)CC3)cc12] | 4-((1-(3-(8-fluoro-5-methyl-1-oxo-1,2-dihydroisoquinolin-3-yl)propanoyl)piperidin-4-yl)oxy)benzonitrile |
| 262 | 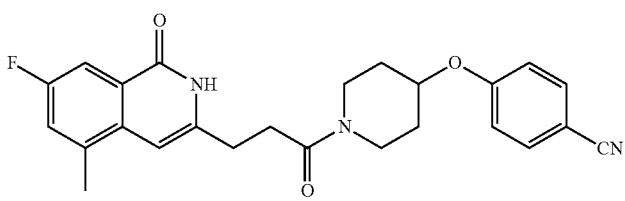 [SMILES: Cc1cc(F)cc2c(=O)[nH]c(CCC(=O)N3CCC(Oc4ccc(C#N)cc4)CC3)cc12] | 4-((1-(3-(7-fluoro-5-methyl-1-oxo-1,2-dihydroisoquinolin-3-yl)propanoyl)piperidin-4-yl)oxy)benzonitrile |
| 263 | 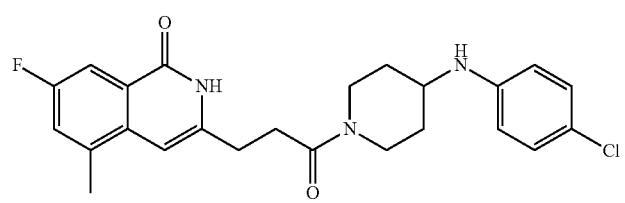 [SMILES: Cc1cc(F)cc2c(=O)[nH]c(CCC(=O)N3CCC(Nc4ccc(Cl)cc4)CC3)cc12] | 3-(3-(4-((4-chlorophenyl)amino)piperidin-1-yl)-3-oxopropyl)-7-fluoro-5-methylisoquinolin-1(2H)-one |
| 264 | 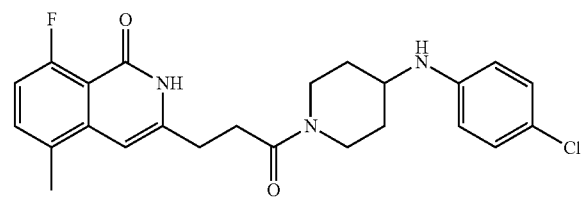 [SMILES: Cc1ccc(F)c2c(=O)[nH]c(CCC(=O)N3CCC(Nc4ccc(Cl)cc4)CC3)cc12] | 3-(3-(4-((4-chlorophenyl)amino)piperidin-1-yl)-3-oxopropyl)-8-fluoro-5-methylisoquinolin-1(2H)-one |
| 265 | 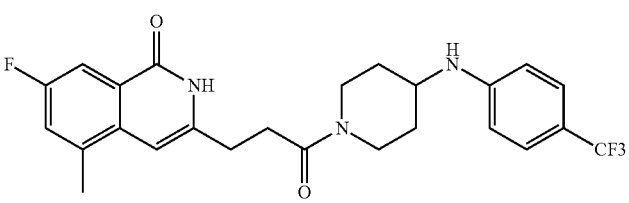 [SMILES: Cc1cc(F)cc2c(=O)[nH]c(CCC(=O)N3CCC(Nc4ccc(C(F)(F)F)cc4)CC3)cc12] | 7-fluoro-5-methyl-3-(3-oxo-3-(4-((4-(trifluoromethyl)phenyl)amino)piperidin-1-yl)propyl)isoquinolin-1(2H)-one |

TABLE 1-continued

| Example | | |
|---|---|---|
| 266 | 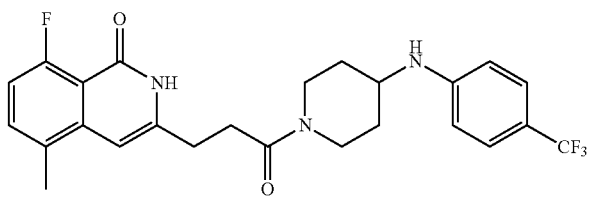 [SMILES: Cc1ccc(F)c2c(=O)[nH]c(CCC(=O)N3CCC(Nc4ccc(C(F)(F)F)cc4)CC3)cc12] | 8-fluoro-5-methyl-3-(3-oxo-3-(4-((4-(trifluoromethyl)phenyl)amino)piperidin-1-yl)propyl)isoquinolin-1(2H)-one |
| 267 | 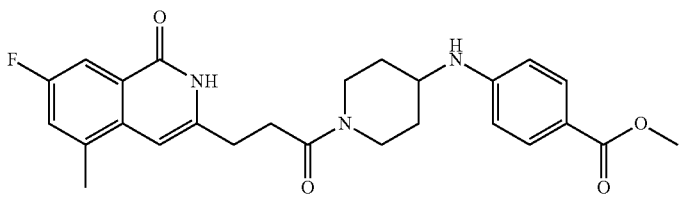 [SMILES: COC(=O)c1ccc(NC2CCN(C(=O)CCc3cc4c(C)cc(F)cc4c(=O)[nH]3)CC2)cc1] | methyl 4-((1-(3-(7-fluoro-5-methyl-1-oxo-1,2-dihydroisoquinolin-3-yl)propanoyl)piperidin-4-yl)amino)benzoate |
| 268 | 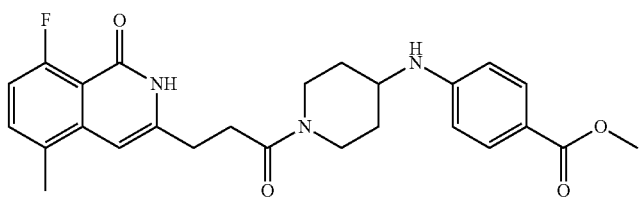 [SMILES: COC(=O)c1ccc(NC2CCN(C(=O)CCc3cc4c(C)ccc(F)c4c(=O)[nH]3)CC2)cc1] | methyl 4-((1-(3-(8-fluoro-5-methyl-1-oxo-1,2-dihydroisoquinolin-3-yl)propanoyl)piperidin-4-yl)amino)benzoate |
| 269 | 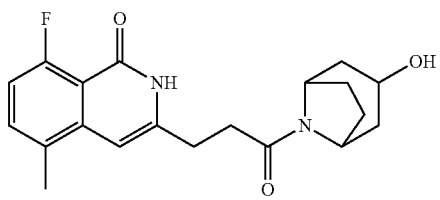 [SMILES: Cc1ccc(F)c2c(=O)[nH]c(CCC(=O)N3C4CCC3CC(O)C4)cc12] | 8-fluoro-3-(3-(3-hydroxy-8-azabicyclo[3.2.1]octan-8-yl)-3-oxopropyl)-5-methylisoquinolin-1(2H)-one |
| 270 | 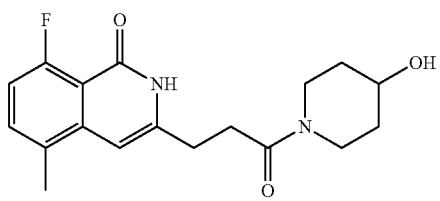 [SMILES: Cc1ccc(F)c2c(=O)[nH]c(CCC(=O)N3CCC(O)CC3)cc12] | 8-fluoro-3-(3-(4-hydroxypiperidin-1-yl)-3-oxopropyl)-5-methylisoquinolin-1(2H)-one |
| 271 | 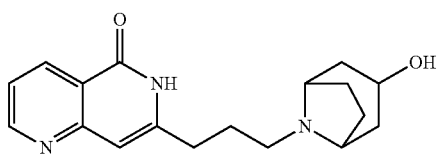 [SMILES: O=c1[nH]c(CCCN2C3CCC2CC(O)C3)cc2ncccc12] | 7-(3-(3-hydroxy-8-azabicyclo[3.2.1]octan-8-yl)propyl)-1,6-naphthyridin-5(6H)-one |
| 272 | 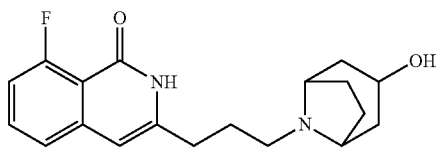 [SMILES: O=c1[nH]c(CCCN2C3CCC2CC(O)C3)cc2cccc(F)c12] | 8-fluoro-3-(3-(3-hydroxy-8-azabicyclo[3.2.1]octan-8-yl)propyl)isoquinolin-1(2H)-one |
| 273 | 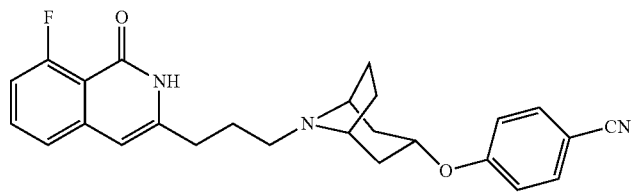 [SMILES: N#Cc1ccc(OC2CC3CCC(C2)N3CCCc2cc3cccc(F)c3c(=O)[nH]2)cc1] | 4-((8-(3-(8-fluoro-1-oxo-1,2-dihydroisoquinolin-3-yl)propyl)-8-azabicyclo[3.2.1]octan-3-yl)oxy)benzonitrile |

TABLE 1-continued

| Example | | |
|---|---|---|
| 274 | 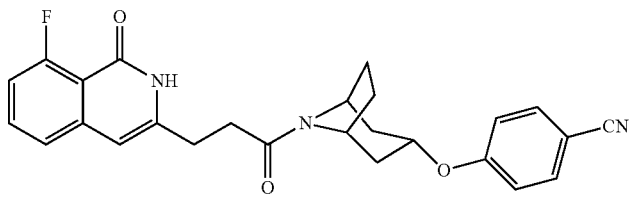 [SMILES: N#Cc1ccc(OC2CC3CCC(C2)N3C(=O)CCc2cc3cccc(F)c3c(=O)[nH]2)cc1] | 4-((8-(3-(8-fluoro-1-oxo-1,2-dihydroisoquinolin-3-yl)propanoyl)-8-azabicyclo[3.2.1]octan-3-yl)oxy)benzonitrile |
| 275 | 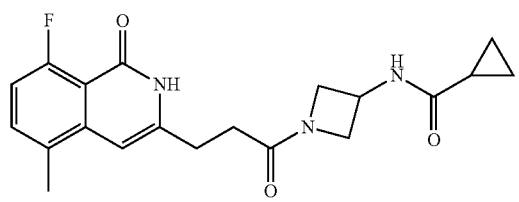 | N-(1-(3-(8-fluoro-5-methyl-1-oxo-1,2-dihydroisoquinolin-3-yl)propanoyl)azetidin-3-yl)cyclopropanecarboxamide |
| 276 | 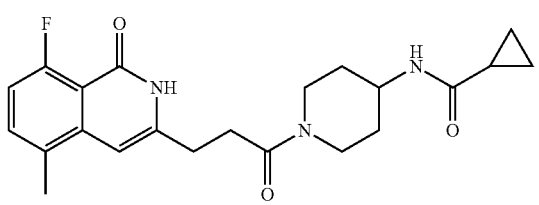 [SMILES: Cc1ccc(F)c2c(=O)[nH]c(CCC(=O)N3CCC(NC(=O)C4CC4)CC3)cc12] | N-(1-(3-(8-fluoro-5-methyl-1-oxo-1,2-dihydroisoquinolin-3-yl)propanoyl)piperidin-4-yl)cyclopropanecarboxamide |

<Experimental Example 1> PARP-1 (poly[ADP-ribose] polymerase 1) Inhibitory Ability In order to evaluate the PARP-1 (poly[ADP-ribose] polymerase 1) enzyme inhibitory ability of the compounds according to the present invention, an experiment was conducted as follows.

Specifically, in order to evaluate the PARP-1 (poly[ADP-ribose] polymerase 1) enzyme inhibitory ability of the compounds of Examples 1 to 276 according to the present invention, the PARP-1 (poly[ADP-ribose] polymerase 1) activity was investigated in the following manner using an assay kit purchased from Trevigen, Inc. (Catalog number: 4677-096-K). 50 µL of 1×PARP buffer (provided by Trevigen's kit) was dispensed into a 96-well plate coated with histones per each well, and then rehydrated for 30 minutes. After removing the 1×PARP buffer present in the well, PARP-1 (poly[ADP-ribose] polymerase 1) enzyme (0.5 unit/well) and 1 µM concentration or various concentrations of the compounds of Example 1 to 276 were added at room temperature and reacted for 10 minutes. Thereafter, each well was treated with 25 µL of 1×PARP cocktail (biotinylated NAD, activated DNA, provided by Trevigen's kit), and then reacted at room temperature for 1 hour. After the reaction was completed, each well was washed twice with PBS (7.5 mM $Na_2HPO_4$, 2.5 mM $NaH_2PO_4$, 145 mM NaCl) containing 0.1% triton X-100, and washed twice with PBS. Then, 50 µL of strep-HRP (streptavidin-linked peroxidase) was added and reacted at room temperature for 1 hour, and then washed twice with PBS containing 0.1% triton X-100, and washed twice with PBS. After removing all PBS, 50 µL of TACS-sapphire, a substrate, was added, and reacted at room temperature for 15 minutes while blocking the light. After the reaction was terminated by treatment with 50 µL of 5% phosphoric acid to each well, the absorbance was measured at 450 nM using a microplate reader Victor3 from PerkinElmer, Inc. to quantify the value. The results are shown in Table 2 below.

TABLE 2

| Example | PAR P-1 Inhibitory ability at 1 nM |
|---|---|
| 1 | ** |
| 2 | * |
| 3 | * |
| 4 | * |
| 5 | * |
| 6 | ** |
| 7 | * |
| 8 | ** |
| 9 | * |
| 10 | ** |
| 11 | * |
| 12 | — |
| 13 | * |
| 14 | — |
| 15 | — |
| 16 | * |
| 17 | * |
| 18 | * |
| 19 | * |
| 20 | * |
| 21 | * |
| 22 | * |
| 23 | * |
| 24 | * |
| 25 | * |
| 26 | ** |
| 27 | * |
| 28 | * |
| 29 | * |
| 30 | * |
| 31 | * |
| 32 | * |
| 33 | * |
| 34 | * |
| 35 | * |
| 36 | ** |
| 37 | * |
| 38 | * |
| 39 | * |

TABLE 2-continued

| Example | PAR P-1 Inhibitory ability at 1 nM |
|---|---|
| 40 | ** |
| 41 | ** |
| 42 | ** |
| 43 | * |
| 44 | * |
| 45 | ** |
| 46 | ** |
| 47 | *** |
| 48 | * |
| 49 | * |
| 50 | * |
| 51 | — |
| 52 | * |
| 53 | * |
| 54 | * |
| 55 | ** |
| 56 | * |
| 57 | ** |
| 58 | ** |
| 59 | * |
| 60 | * |
| 61 | — |
| 62 | * |
| 63 | * |
| 64 | * |
| 65 | * |
| 66 | * |
| 67 | * |
| 68 | * |
| 69 | * |
| 70 | * |
| 71 | * |
| 72 | * |
| 73 | * |
| 74 | * |
| 75 | * |
| 76 | * |
| 77 | * |
| 78 | * |
| 79 | * |
| 80 | * |
| 81 | * |
| 82 | * |
| 83 | * |
| 84 | * |
| 85 | * |
| 86 | * |
| 87 | * |
| 88 | * |
| 89 | * |
| 90 | * |
| 91 | — |
| 92 | * |
| 93 | * |
| 94 | * |
| 95 | * |
| 96 | * |
| 97 | * |
| 98 | * |
| 99 | * |
| 100 | * |
| 101 | * |
| 102 | * |
| 103 | * |
| 104 | * |
| 105 | * |
| 106 | * |
| 107 | * |
| 108 | * |
| 109 | * |
| 110 | * |
| 111 | * |
| 112 | * |
| 113 | * |
| 114 | * |
| 115 | * |
| 116 | * |
| 117 | * |
| 118 | * |
| 119 | * |
| 120 | * |
| 121 | * |
| 122 | * |
| 123 | * |
| 124 | * |
| 125 | * |
| 126 | * |
| 127 | * |
| 128 | * |
| 129 | * |
| 130 | * |
| 131 | * |
| 132 | * |
| 133 | * |
| 134 | * |
| 135 | * |
| 136 | * |
| 137 | * |
| 138 | * |
| 139 | * |
| 140 | * |
| 141 | * |
| 142 | * |
| 143 | * |
| 144 | * |
| 145 | * |
| 146 | * |
| 147 | * |
| 148 | * |
| 149 | * |
| 150 | * |
| 151 | * |
| 152 | * |
| 153 | * |
| 154 | * |
| 155 | * |
| 156 | * |
| 157 | * |
| 158 | * |
| 159 | * |
| 160 | * |
| 161 | * |
| 162 | * |
| 163 | * |
| 164 | * |
| 165 | * |
| 166 | * |
| 167 | * |
| 168 | * |
| 169 | — |
| 170 | * |
| 171 | * |
| 172 | * |
| 173 | * |
| 174 | * |
| 175 | * |
| 176 | * |
| 177 | * |
| 178 | * |
| 179 | * |
| 180 | * |
| 181 | * |
| 182 | * |
| 183 | * |
| 184 | * |
| 185 | * |
| 186 | * |
| 187 | * |
| 188 | * |
| 189 | * |
| 190 | * |
| 191 | * |

TABLE 2-continued

| Example | PARP-1 Inhibitory ability at 1 nM |
|---|---|
| 192 | * |
| 193 | * |
| 194 | * |
| 195 | * |
| 196 | * |
| 197 | * |
| 198 | * |
| 199 | * |
| 200 | ** |
| 201 | * |
| 202 | * |
| 203 | * |
| 204 | ** |
| 205 | ** |
| 206 | * |
| 207 | * |
| 208 | * |
| 209 | * |
| 210 | * |
| 211 | * |
| 212 | * |
| 213 | * |
| 214 | * |
| 215 | * |
| 216 | * |
| 217 | * |
| 218 | * |
| 219 | * |
| 220 | * |
| 221 | ** |
| 222 | * |
| 223 | * |
| 224 | * |
| 225 | *** |
| 226 | * |
| 227 | * |
| 228 | ** |
| 229 | * |
| 230 | * |
| 231 | * |
| 232 | * |
| 233 | ** |
| 234 | * |
| 235 | * |
| 236 | * |
| 237 | * |
| 238 | * |
| 239 | ** |
| 240 | * |
| 241 | ** |
| 242 | * |
| 243 | * |
| 244 | * |
| 245 | * |
| 246 | * |
| 247 | ** |
| 248 | * |
| 249 | * |
| 250 | * |
| 251 | * |
| 252 | * |
| 253 | * |
| 254 | * |
| 255 | * |
| 256 | * |
| 257 | * |
| 258 | * |
| 259 | * |
| 260 | * |
| 261 | * |
| 262 | * |
| 263 | * |
| 264 | * |
| 265 | * |
| 266 | * |
| 267 | * |
| 268 | * |
| 269 | * |
| 270 | * |
| 271 | * |
| 272 | ** |
| 273 | * |
| 274 | * |
| 275 | * |
| 276 | * |

<PARP-1 inhibitory ability at 1 nM was indicated as * for values less than 50%;  for values between 50% to 80%; and * for values>80%. There is no measured value if the value is not indicated in the table above.>

With reference to Table 2, it was confirmed that the compounds of Examples according to the present invention exhibited PARP-1 (poly[ADP-ribose] polymerase 1) enzyme inhibitory activity. In particular, Example compound 47 inhibited PARP-1 (poly[ADP-ribose] polymerase 1) enzyme activity by 80% or more.

Among the Examples in Table 2, $IC_{50}$ values were measured for some compounds, and the results are shown in Table 3 below.

TABLE 3

| Example | $IC_{50}$ (nM) |
|---|---|
| 1 | 2.30 |
| 6 | 0.41 |
| 8 | 0.72 |
| 15 | 4.01 |
| 21 | 1.09 |
| 22 | 1.20 |
| 23 | 0.76 |
| 46 | 1.66 |
| 48 | 1.32 |
| 49 | 3.58 |
| 50 | 1.88 |
| 54 | 1.42 |
| 55 | 1.77 |
| 57 | 0.91 |
| 58 | 1.76 |
| 68 | 1.90 |
| 99 | 1.05 |
| 103 | 0.91 |
| 128 | 1.38 |
| 151 | 4.05 |
| 152 | 0.85 |
| 183 | 14.73 |
| 200 | 1.24 |
| 241 | 4.92 |
| 242 | 3.18 |
| 268 | 8.59 |
| 272 | 3.27 |

With reference to Table 3, the compounds of Examples 1, 6, 8, 15, 21, 22, 23, 46, 48, 49, 50, 54, 55, 57, 58, 68, 99, 103, 128, 151, 152, 183, 200, 241, 242, 268, and 272 exhibited the PARP-1 (poly[ADP-ribose] polymerase 1) enzyme activity inhibitory concentration by 50% ($IC_{50}$) of 20 nM or less, confirming that PARP-1 (poly[ADP-ribose] polymerase 1) activity was effectively inhibited at low concentrations.

Accordingly, the isoquinolinone derivatives according to the present invention can be effectively used as a novel PARP-1 (poly[ADP-ribose] polymerase 1) inhibitor, and can be effectively used as a pharmaceutical composition, which comprises the isoquinolinone derivatives as an active ingredient, for preventing or treating PARP-1 (poly[ADP-ribose] polymerase 1)-related diseases, for example, one or more diseases selected from the group consisting of neurogenic disorder, neurodegenerative disease, vascular stroke, cardiovascular disorder, macular degeneration, AIDS, arthritis, atherosclerosis, cancer, diabetes mellitus, brain tumor, inflammatory bowel disorder, muscular dystrophy, osteoarthritis, osteoporosis, chronic pain, acute pain, neuropathic pain, nerve attack, peripheral nerve damage, kidney disease, retinal ischemia, septic shock, and skin aging.

<Experimental Example 2> Evaluation of Retinal Pigment Epithelial Cell Line Protection In order to evaluate the protective effect of the compounds according to the present invention on the retinal pigment epithelial cell line under the condition of inducing dry macular degeneration-like apoptosis, the following experiment was performed.

Specifically, ARPE-19 cells, which is a human retinal pigment epithelial cell line, were cultured in DMEM:F12 (Dulbecco's Modified Eagle's Medium: Ham's nutrient mixture F-12) containing 10% fetal bovine serum (FBS) and 1% penicillin/streptomycin. The cells were aliquoted in a well plate so that the number of cells per well was 1×10$^4$, and incubated in a 37° C. $CO_2$ incubator for 12 hours. DMSO (0.1%) (control group) alone or various concentrations of the compounds of Examples 1 to 276 according to the present invention (experimental groups) were treated in a medium mixed with 0.5 mM $H_2O_2$ (control group), and then, the cells were further cultured in a 37° C. $CO_2$ incubator for 6 hours to induce apoptosis.

The degree of apoptosis was measured by an MTS (3-(4,5-dimethylthiazol-2-yl)-5-(3-carboxymethoxyphenyl)-2-(4-sulfophenyl)-2H-tetrazolium) activity assay method manufactured by Promega, the cell MTS activity level in the normal medium condition was set to 100%, and the relative degree of cell protection was converted and determined based on the MTS activity level of the control group in the 0.5 mM $H_2O_2$ treatment condition.

The MTS activity assay evaluation method is a method of measuring the activity of NADH dehydrogenase in mitochondria in cells, and MTS is reduced by NADH dehydrogenase to form colored formazan. Through this method, live cells can be quantified, and cell proliferation and apoptosis can be quantified. After the above-mentioned damage stimulus was treated to the retinal pigment epithelial cell line, 15 µL of MTS activity assay kit manufactured by Promega was added to each well, and then reacted in a 37° C. $CO_2$ incubator for 2 hours. The reacted wells were quantified by measuring the absorbance at 450 nM using a microplate reader Victor 3 manufactured by PerkinElmer, Inc., and the results are shown in Table 4 below.

TABLE 4

| Example | $EC_{50}$ (nM) |
| --- | --- |
| 1 | 4.7 |
| 6 | 0.02 |
| 8 | 6.9 |
| 21 | 9.8 |
| 22 | 8.9 |
| 23 | 1.0 |
| 46 | 19.6 |
| 50 | 45.8 |
| 54 | 9.8 |

TABLE 4-continued

| Example | $EC_{50}$ (nM) |
| --- | --- |
| 55 | 4.0 |
| 57 | 4.4 |
| 58 | 1.1 |
| 68 | 14.3 |
| 88 | 628.8 |
| 99 | 1.9 |
| 103 | 4.4 |
| 128 | 16.3 |
| 151 | 1.0 |
| 152 | 3.0 |
| 165 | 107.9 |
| 200 | 0.9 |
| 204 | 48.04 |
| 228 | 144.1 |
| 237 | 69.7 |
| 241 | 2.6 |
| 242 | 3.8 |
| 247 | 69.4 |
| 268 | 8.6 |
| 272 | 16.98 |

With reference to Table 4, the compounds of Examples 1, 6, 8, 21, 22, 23, 46, 50, 54, 55, 57, 58, 68, 99, 103, 128, 151, 152, 165, 200, 204, 228, 237, 241, 242, 247, 268, and 272 had the $EC_{50}$ of the $H_2O_2$-induced human retinal pigment epithelial cell line of less than 150 nM, thereby showing an excellent retinal cell protective effect.

Accordingly, the isoquinolinone derivatives according to the present invention effectively inhibited dry macular degeneration-like apoptosis in nanomolar concentration units, and thus can be effectively used as a pharmaceutical composition, which comprises the isoquinolinone derivatives as an active ingredient, for preventing or treating ophthalmic diseases or disorders, for example, one or more diseases selected from the group consisting of age-related macular degeneration, Stargardt's macular dystrophy, retinal detachment, hemorrhagic retinopathy, retinitis pigmentosa, cone-rod dystrophy, Sorsby's fundus dystrophy, optic neuropathy, inflammatory retinal disease, diabetic retinopathy, diabetic maculopathy, retinal vascular occlusion, retinopathy of prematurity, or retinal damage associated with ischemia reperfusion, proliferative vitreoretinopathy, retinal dystrophy, congenital optic neuropathy, uveitis, retinal damage, retinal disorder associated with Alzheimer's disease, retinal disorder associated with multiple sclerosis, retinal disorder associated with Parkinson's disease, retinal disorder associated with viral infections, retinal disorder associated with light overexposure, myopia, or AIDS-related retinal disorder.

<Experimental Example 3> Evaluation of Retinal Layer Protection of Rats in Dry Macular Degeneration-Like Cells In order to evaluate the inhibitory effect (protective effect) of the compounds according to the present invention on reducing the thickness of the retinal layer of rats in dry macular degeneration-like cells, the following experiment was performed.

Specifically, 8-week-old rats were intraperitoneally injected with 50 mg/kg of sodium iodate (SI) to degenerate the retinal pigment epithelium and the photoreceptor cell layer to create a simulated animal model for dry macular degeneration. Retinal degeneration was observed 1 week after SI administration.

After a single intraperitoneal injection of Example 46 or Example 1 at a concentration of 15 mg/kg to the rat model for dry macular degeneration, the inhibitory effect (protective effect) on reducing the thickness of the retinal layer of the rats was evaluated.

In order to quantify the reduction of retinal thickness, the eyes extracted from the rats were fixed in a 4% glutaraldehyde solution for 3 hours and then embedded with paraffin. After preparing 5 μm-thick tissue fragments, the fragments were stained with a hematoxylin-eosin (H&E) solution and photographed with an optical microscope to measure the thickness of the retinal outer nuclear layer (ONL) of the retina. As a result, the thickness (μm) of the retinal ONL of the control group was calculated and expressed as 100% (n=3 times). The microscopes used for observation were "Olympus CX31" and "Motic BA 600", the camera used for photography was "Moticam 1500", and the measurement program used was "image J". The results are shown in FIG. 1.

FIG. 1 is an image showing the change in the thickness of the retinal layer of rats taken by using "1500", after treatment of Example 46 or Example 1 (each with single intraperitoneal injection of 15 mg/kg) in 8-week-old rats.

With reference to FIG. 1, as a result of comparing the outer nuclear layer (ONL) of retina, it was confirmed that the retina was degenerated in the vehicle-treated group compared to the control group, but the retina was protected when Example 46 or Example 1 was treated. Therefore, it can be determined that the compound of Example has an excellent protective ability against retinal degeneration.

Accordingly, the isoquinolinone derivatives can be effectively used as a pharmaceutical composition, which contains the isoquinolinone derivatives as an active ingredient, for preventing or treating ophthalmic diseases or disorders, for example, one or more diseases selected from the group consisting of age-related macular degeneration, Stargardt's macular dystrophy, retinal detachment, hemorrhagic retinopathy, retinitis pigmentosa, cone-rod dystrophy, Sorsby's fundus dystrophy, optic neuropathy, inflammatory retinal disease, diabetic retinopathy, diabetic maculopathy, retinal vascular occlusion, retinopathy of prematurity, or retinal damage associated with ischemia reperfusion, proliferative vitreoretinopathy, retinal dystrophy, congenital optic neuropathy, uveitis, retinal damage, retinal disorder associated with Alzheimer's disease, retinal disorder associated with multiple sclerosis, retinal disorder associated with Parkinson's disease, retinal disorder associated with viral infections, retinal disorder associated with light overexposure, myopia, or AIDS-related retinal disorder.

The invention claimed is:

1. A compound represented by Chemical Formula 1 below, a stereoisomer, a tautomer, or a pharmaceutically acceptable salt thereof:

[Chemical Formula 1]

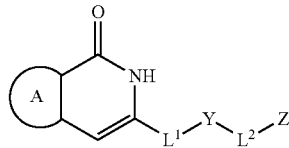

In Chemical Formula 1 above, is

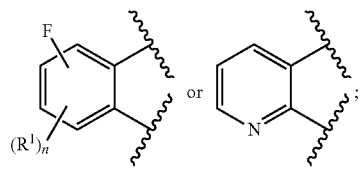

$R^1$ is methyl, and n is 0 or 1, $L^1$ is $C_{1-3}$ alkylene unsubstituted or substituted with oxo;

Y is a 4- to 8-membered monocyclic or polycyclic heterocycloalkylene or heterocycloalkenylene containing one or more heteroatom selected from the group consisting of N, O, and S;

$L^2$ is a single bond, —NHCO—, —$NR^2$—, —O—, or straight or branched $C_{1-10}$ alkylene substituted with one or more substituents selected from the group consisting of oxo and amino, $R^2$ is hydrogen or $C_{1-6}$ alkyl; and Z is $C_{3-8}$ cycloalkyl, 5- to 8-membered heterocycloalkyl containing one or more heteroatom selected from the group consisting of N, O, and S, phenyl, or 5- to 8-membered heteroaryl containing one or more heteroatom selected from the group consisting of N, O, and S, wherein the cycloalkyl, heterocycloalkyl, phenyl, and heteroaryl may be each independently unsubstituted or substituted with one or more substituents selected from the group consisting of halogen, cyano, nitro, straight or branched $C_{1-6}$ alkyl unsubstituted or substituted with one or more halogen, straight or branched $C_{1-6}$ alkoxy unsubstituted or substituted with one or more halogen, —$CO_2H$, $C_{1-6}$ alkoxycarbonyl, and $C_{1-6}$ alkylcarbonylamino.

2. The compound, a stereoisomer, or a pharmaceutically acceptable salt thereof of claim 1, wherein

Ⓐ is

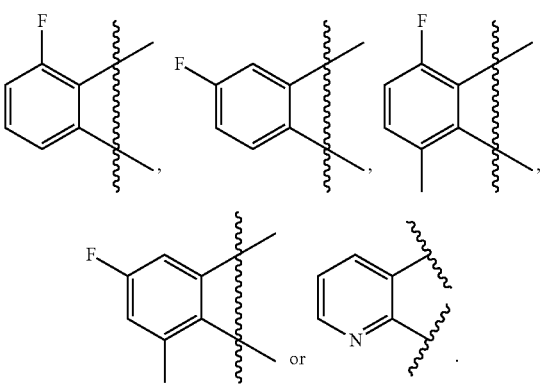

3. The compound, a stereoisomer, or a pharmaceutically acceptable salt thereof of claim 1, wherein

Ⓐ is

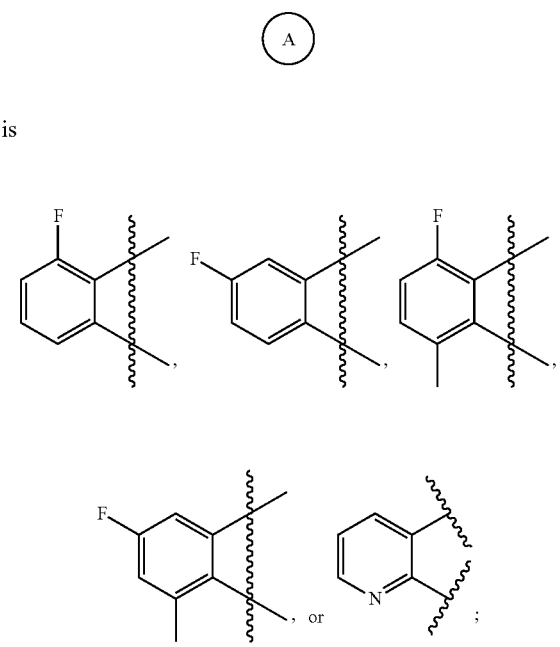

L¹ is C₃ alkylene unsubstituted or substituted with one or more oxo;

Y is a 4- to 8-membered monocyclic or bicyclic heterocycloalkylene containing one or two nitrogen atoms, or 6-membered monocyclic heterocycloalkenylene containing one nitrogen;

L² is a single bond, —NHCO—, —NR²—, —O—, or straight or branched C$_{1-6}$ alkylene substituted with one or more substituents selected from the group consisting of oxo and amino, R² is hydrogen or methyl; and Z is C$_{3-6}$ cycloalkyl, 5- to 8-membered heterocycloalkyl containing one or more heteroatom selected from the group consisting of N and O, phenyl, or 5- to 8-membered heteroaryl containing one or more heteroatom selected from the group consisting of N and S, wherein the cycloalkyl, heterocycloalkyl, phenyl, and heteroaryl are each independently unsubstituted or substituted with one or more substituents selected from the group consisting of —F, —Cl, cyano, nitro, straight or branched C$_{1-3}$ alkyl unsubstituted or substituted with one or more fluorine, straight or branched C$_{1-3}$ alkoxy unsubstituted or substituted with one or more fluorine, —CO₂H, C$_{1-3}$ alkoxycarbonyl, and C$_{1-3}$ alkylcarbonylamino.

4. The compound, a stereoisomer, or a pharmaceutically acceptable salt thereof of claim 1, wherein

Ⓐ is

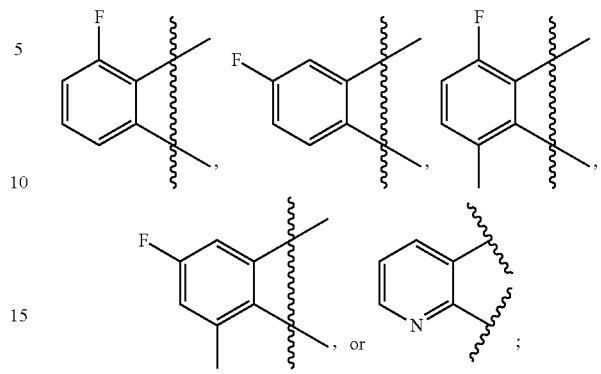

L¹ is C₃ alkylene unsubstituted or substituted with one or more oxo;

Y is a 4- to 6-membered monocyclic or 8-membered bicyclic heterocycloalkylene containing one or two nitrogen atoms, or 6-membered monocyclic heterocycloalkenylene containing one nitrogen;

L² is a single bond, —NHCO—, —NR²—, —O—, or straight or branched C$_{1-4}$ alkylene substituted with one or more substituents selected from the group consisting of oxo and amino, R² is hydrogen or methyl; and Z is C$_{3-6}$ cycloalkyl, heterocycloalkyl, which is tetrahydrofuranyl or pyrrolidinyl, phenyl, or heteroaryl selected from pyridyl, pyrimidyl, and thiazole;

wherein the cycloalkyl, heterocycloalkyl, phenyl, and heteroaryl are each independently unsubstituted or substituted with one or more substituents selected from the group consisting of —F, —Cl, cyano, nitro, methyl unsubstituted or substituted with one or more fluorine, methoxy substituted with one or more fluorine, carboxy (—CO₂H), methoxycarbonyl, and methylcarbonylamino.

5. The compound, a stereoisomer, or a pharmaceutically acceptable salt thereof of claim 1, wherein

Ⓐ is

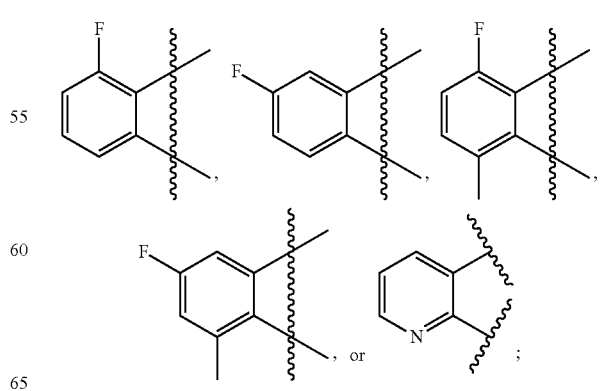

L¹ is
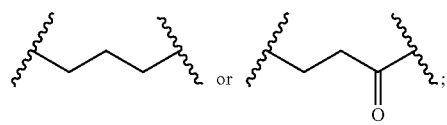 [SMILES: *CCC* ; *CCC(*)=O]
Y is
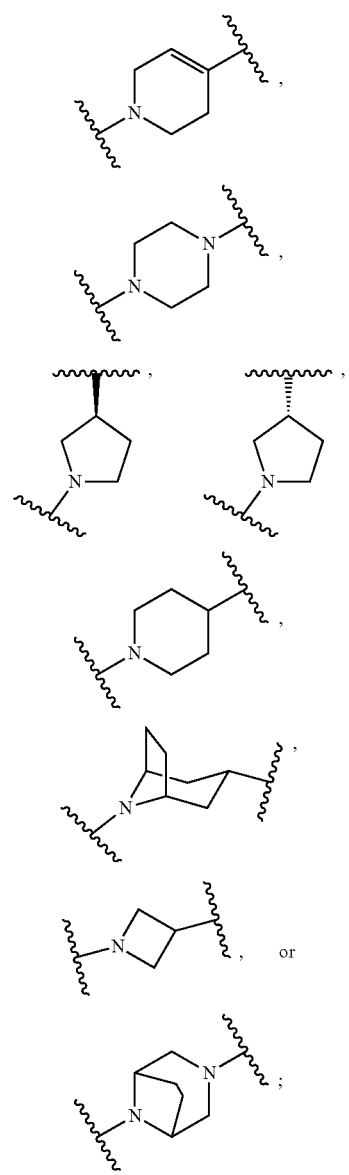
L² is a single bond,
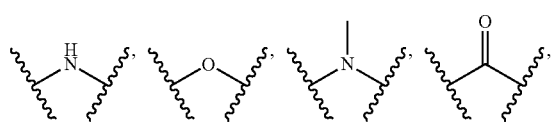
-continued
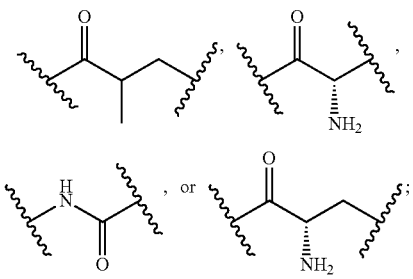
and
Z is,
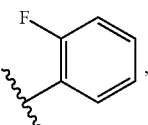
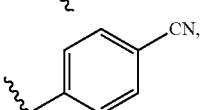
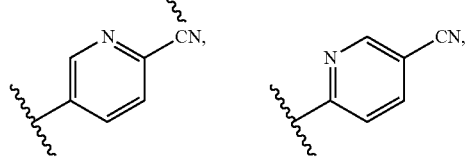
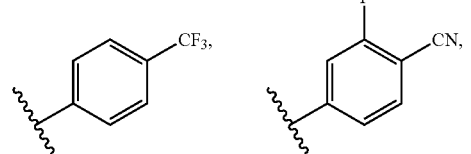
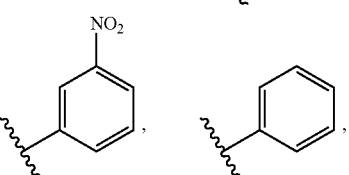
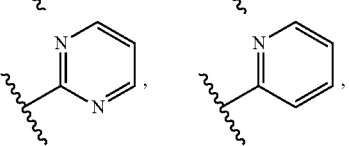
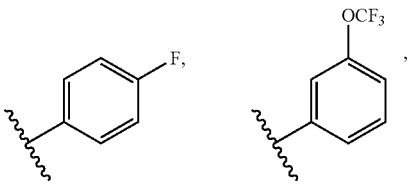
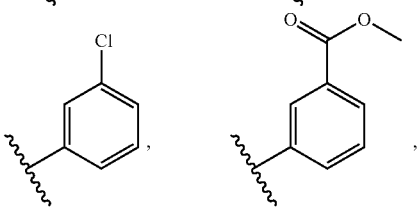

287
-continued

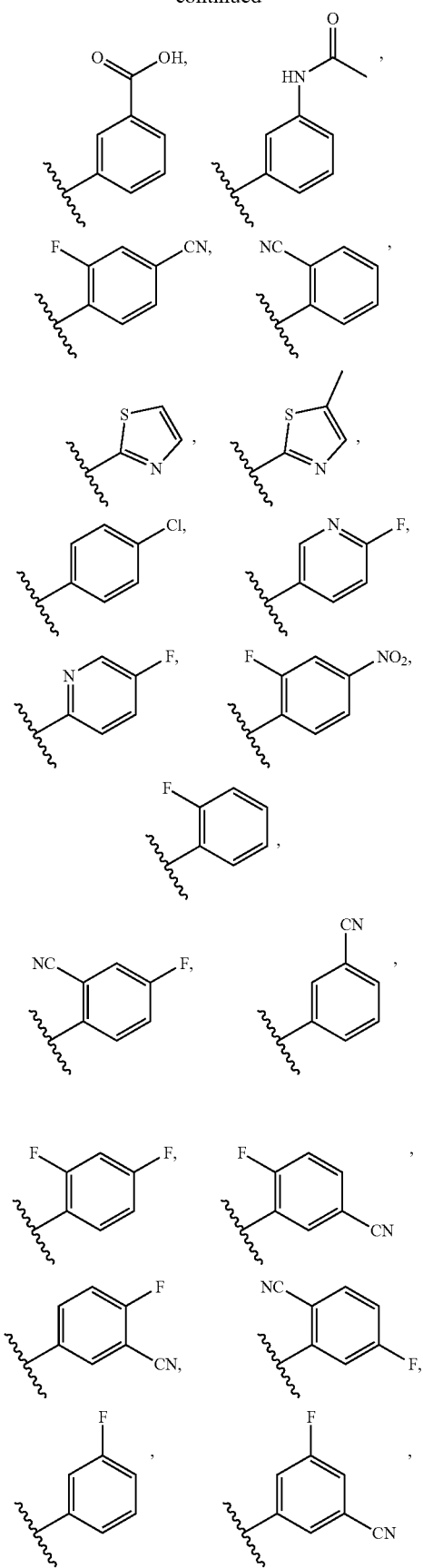

288
-continued

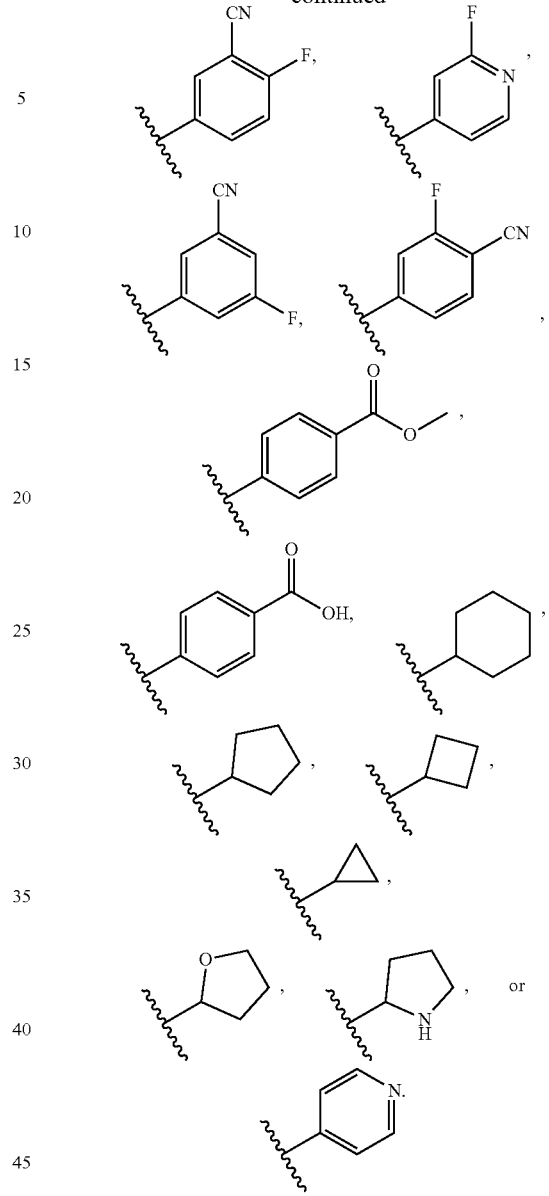

6. The compound, a stereoisomer, or a pharmaceutically acceptable salt thereof of claim 1, wherein the compound represented by Chemical Formula 1 above is any one selected from the following compound groups:
<1> 4-(4-(3-(8-fluoro-1-oxo-1,2-dihydroisoquinolin-3-yl)propyl)piperazin-1-yl)benzonitrile;
<2> 5-(4-(3-(8-fluoro-1-oxo-1,2-dihydroisoquinolin-3-yl)propyl)piperazin-1-yl)picolinonitrile;
<3> 6-(4-(3-(8-fluoro-1-oxo-1,2-dihydroisoquinolin-3-yl)propyl)piperazin-1-yl)nicotinonitrile;
<4> 8-fluoro-3-(3-(4-(4-(trifluoromethyl)phenyl)piperazin-1-yl)propyl)isoquinolin-1(2H)-one;
<5> 2-fluoro-4-(4-(3-(8-fluoro-1-oxo-1,2-dihydroisoquinolin-3-yl)propyl)piperazin-1-yl)benzonitrile;
<6> 4-(4-(3-(8-fluoro-1-oxo-1,2-dihydroisoquinolin-3-yl)propyl)piperazin-1-yl)benzonitrile hydrochloride;
<7> 4-(8-(3-(8-fluoro-1-oxo-1,2-dihydroisoquinolin-3-yl)propyl)-3,8-diazabicyclo[3.2.1]octan-3-yl)benzonitrile;

<8> 4-(4-(3-(7-fluoro-1-oxo-1,2-dihydroisoquinolin-3-yl)propyl)piperazin-1-yl)benzonitrile;
<9> 7-fluoro-3-(3-(4-(4-(trifluoromethyl)phenyl)piperazin-1-yl)propyl)isoquinolin-1(2H)-one;
<10> 5-(4-(3-(7-fluoro-1-oxo-1,2-dihydroisoquinolin-3-yl)propyl)piperazin-1-yl)picolinonitrile;
<11> 7-fluoro-3-(3-(4-(3-nitrophenyl)piperazin-1-yl)propyl)isoquinolin-1(2H)-one;
<12> 7-fluoro-3-(3-(4-phenylpiperazin-1-yl)propyl)isoquinolin-1(2H)-one;
<13> 7-fluoro-3-(3-(4-(pyrimidin-2-yl)piperazin-1-yl)propyl)isoquinolin-1(2H)-one;
<14> 7-fluoro-3-(3-(4-(pyridin-2-yl)piperazin-1-yl)propyl)isoquinolin-1(2H)-one;
<15> 7-fluoro-3-(3-(4-(4-fluorophenyl)piperazin-1-yl)propyl)isoquinolin-1(2H)-one;
<16> 7-fluoro-3-(3-(4-(3-(trifluoromethoxy)phenyl)piperazin-1-yl)propyl)isoquinolin-1(2H)-one;
<17> 3-(3-(4-(3-chlorophenyl)piperazin-1-yl)propyl)-7-fluoroisoquinolin-1(2H)-one;
<18> methyl 3-(4-(3-(7-fluoro-1-oxo-1,2-dihydroisoquinolin-3-yl)propyl)piperazin-1-yl)benzoate;
<19> 3-(4-(3-(7-fluoro-1-oxo-1,2-dihydroisoquinolin-3-yl)propyl)piperazin-1-yl)benzoic acid;
<20> N-(3-(4-(3-(7-fluoro-1-oxo-1,2-dihydroisoquinolin-3-yl)propyl)piperazin-1-yl)phenyl)acetamide;
<21> 5-(4-(3-(8-fluoro-5-methyl-1-oxo-1,2-dihydroisoquinolin-3-yl)propyl)piperazin-1-yl)picolinonitrile;
<22> 6-(4-(3-(8-fluoro-5-methyl-1-oxo-1,2-dihydroisoquinolin-3-yl)propyl)piperazin-1-yl)nicotinonitrile;
<23> 4-(4-(3-(8-fluoro-5-methyl-1-oxo-1,2-dihydroisoquinolin-3-yl)propyl)piperazin-1-yl)benzonitrile;
<24> 8-fluoro-5-methyl-3-(3-(4-(pyridin-2-yl)piperazin-1-yl)propyl)isoquinolin-1(2H)-one;
<25> 8-fluoro-5-methyl-3-(3-(4-(pyrimidin-2-yl)piperazin-1-yl)propyl)isoquinolin-1(2H)-one;
<26> 3-fluoro-4-(4-(3-(8-fluoro-5-methyl-1-oxo-1,2-dihydroisoquinolin-3-yl)propyl)piperazin-1-yl)benzonitrile;
<27> 8-fluoro-5-methyl-3-(3-(4-(4-(trifluoromethyl)phenyl)piperazin-1-yl)propyl)isoquinolin-1(2H)-one;
<28> 2-(4-(3-(8-fluoro-5-methyl-1-oxo-1,2-dihydroisoquinolin-3-yl)propyl)piperazin-1-yl)benzonitrile;
<29> 8-fluoro-5-methyl-3-(3-(4-(thiazole-2-yl)piperazin-1-yl)propyl)isoquinolin-1(2H)-one;
<30> 8-fluoro-5-methyl-3-(3-(4-(5-methylthiazole-2-yl)piperazin-1-yl)propyl)isoquinolin-1(2H)-one;
<31> (R)-8-fluoro-3-(3-(3-(4-fluorophenyl)pyrrolidin-1-yl)propyl)-5-methylisoquinolin-1(2H)-one;
<32> (S)-8-fluoro-3-(3-(3-(4-fluorophenyl)pyrrolidin-1-yl)propyl)-5-methylisoquinolin-1(2H)-one;
<33> 3-(3-(4-(4-chlorophenyl)piperazin-1-yl)propyl)-8-fluoro-5-methylisoquinolin-1(2H)-one;
<34> 4-(4-(3-(7-fluoro-5-methyl-1-oxo-1,2-dihydroisoquinolin-3-yl)propyl)piperazin-1-yl)benzonitrile;
<35> 5-(4-(3-(7-fluoro-5-methyl-1-oxo-1,2-dihydroisoquinolin-3-yl)propyl)piperazin-1-yl)picolinonitrile;
<36> 6-(4-(3-(7-fluoro-5-methyl-1-oxo-1,2-dihydroisoquinolin-3-yl)propyl)piperazin-1-yl)nicotinonitrile;
<37> 3-fluoro-4-(4-(3-(7-fluoro-5-methyl-1-oxo-1,2-dihydroisoquinolin-3-yl)propyl)piperazin-1-yl)benzonitrile;
<38> 2-fluoro-4-(4-(3-(7-fluoro-5-methyl-1-oxo-1,2-dihydroisoquinolin-3-yl)propyl)piperazin-1-yl)benzonitrile;
<39> 7-fluoro-5-methyl-3-(3-(4-(4-(trifluoromethyl)phenyl)piperazin-1-yl)propyl)isoquinolin-1(2H)-one;
<40> 7-fluoro-3-(3-(4-(4-fluorophenyl)piperazin-1-yl)propyl)-5-methylisoquinolin-1(2H)-one;
<41> 4-(1-(3-(8-fluoro-1-oxo-1,2-dihydroisoquinolin-3-yl)propyl)-1,2,3,6-tetrahydropyridin-4-yl)benzonitrile;
<42> 8-fluoro-3-(3-(4-(4-fluorophenyl)-3,6-dihydropyridin-1(2H)-yl)propyl)isoquinolin-1(2H)-one;
<43> 8-fluoro-3-(3-(6-fluoro-3',6'-dihydro-[3,4'-bipyridine]-1'(2'H)-yl)propyl)isoquinolin-1(2H)-one;
<44> 8-fluoro-3-(3-(5-fluoro-3',6'-dihydro-[2,4'-bipyridine]-1'(2'H)-yl)propyl)isoquinolin-1(2H)-one;
<45> 8-fluoro-3-(3-(4-(4-(trifluoromethyl)phenyl)-3,6-dihydropyridin-1(2H)-yl)propyl)isoquinolin-1(2H)-one;
<46> 1'-(3-(8-fluoro-1-oxo-1,2-dihydroisoquinolin-3-yl)propyl)-1',2',3',6'-tetrahydro-[2,4'-bipyridine]-5-carbonitrile;
<47> 4-(1-(3-(7-fluoro-1-oxo-1,2-dihydroisoquinolin-3-yl)propyl)-1,2,3,6-tetrahydropyridin-4-yl)benzonitrile;
<48> 7-fluoro-3-(3-(4-(4-fluorophenyl)-3,6-dihydropyridin-1(2H)-yl)propyl)isoquinolin-1(2H)-one;
<49> 3-(3-(4-(4-chlorophenyl)-3,6-dihydropyridin-1(2H)-yl)propyl)-7-fluoroisoquinolin-1(2H)-one;
<50> 1'-(3-(7-fluoro-1-oxo-1,2-dihydroisoquinolin-3-yl)propyl)-1',2',3',6'-tetrahydro-[2,4'-bipyridine]-5-carbonitrile;
<51> 7-fluoro-3-(3-(4-(2-fluoro-4-nitrophenyl)-3,6-dihydropyridin-1(2H)-yl)propyl)isoquinolin-1(2H)-one;
<52> 2-fluoro-4-(1-(3-(7-fluoro-1-oxo-1,2-dihydroisoquinolin-3-yl)propyl)-1,2,3,6-tetrahydropyridin-4-yl)benzonitrile;
<53> 8-fluoro-3-(3-(4-(4-fluorophenyl)-3,6-dihydropyridin-1(2H)-yl)propyl)-5-methylisoquinolin-1(2H)-one;
<54> 4-(1-(3-(8-fluoro-5-methyl-1-oxo-1,2-dihydroisoquinolin-3-yl)propyl)-1,2,3,6-tetrahydropyridin-4-yl)benzonitrile;
<55> 2-fluoro-4-(1-(3-(8-fluoro-5-methyl-1-oxo-1,2-dihydroisoquinolin-3-yl)propyl)-1,2,3,6-tetrahydropyridin-4-yl)benzonitrile;
<56> 8-fluoro-3-(3-(4-(2-fluoro-4-nitrophenyl)-3,6-dihydropyridin-1(2H)-yl)propyl)-5-methylisoquinolin-1(2H)-one;
<57> 1'-(3-(8-fluoro-5-methyl-1-oxo-1,2-dihydroisoquinolin-3-yl)propyl)-1',2',3',6'-tetrahydro-[2,4'-bipyridine]-5-carbonitrile;
<58> 4-(1-(3-(7-fluoro-5-methyl-1-oxo-1,2-dihydroisoquinolin-3-yl)propyl)-1,2,3,6-tetrahydropyridin-4-yl)benzonitrile;
<59> 7-fluoro-3-(3-(4-(4-fluorophenyl)-3,6-dihydropyridin-1(2H)-yl)propyl)-5-methylisoquinolin-1(2H)-one;
<60> 1'-(3-(7-fluoro-5-methyl-1-oxo-1,2-dihydroisoquinolin-3-yl)propyl)-1',2',3',6'-tetrahydro-[2,4'-bipyridine]-5-carbonitrile;
<61> 1'-(3-(7-fluoro-5-methyl-1-oxo-1,2-dihydroisoquinolin-3-yl)propyl)-1',2',3',6'-tetrahydro-[3,4'-bipyridine]-6-carbonitrile;
<62> 7-fluoro-3-(3-(5-fluoro-3',6'-dihydro-[2,4'-bipyridine]-1'(2'H)-yl)propyl)-5-methylisoquinolin-1(2H)-one;
<63> 7-fluoro-3-(3-(6-fluoro-3',6'-dihydro-[3,4'-bipyridine]-1'(2'H)-yl)propyl)-5-methylisoquinolin-1(2H)-one;
<64> 7-fluoro-5-methyl-3-(3-(4-(4-(trifluoromethyl)phenyl)-3,6-dihydropyridin-1(2H)-yl)propyl)isoquinolin-1(2H)-one;
<65> 8-fluoro-3-(3-(4-(3-fluorobenzoyl)piperazin-1-yl)propyl)-5-methylisoquinolin-1(2H)-one;

<66> 3-(3-(4-benzoylpiperazin-1-yl)propyl)-8-fluoro-5-methylisoquinolin-1(2H)-one;
<67> 8-fluoro-3-(3-(4-(4-fluorobenzoyl)piperazin-1-yl)propyl)-5-methylisoquinolin-1(2H)-one;
<68> 4-(4-(3-(8-fluoro-1-oxo-1,2-dihydroisoquinolin-3-yl)propanoyl)piperazin-1-yl)benzonitrile;
<69> 4-(1-(3-(8-fluoro-1-oxo-1,2-dihydroisoquinolin-3-yl)propanoyl)-1,2,3,6-tetrahydropyridin-4-yl)benzonitrile;
<70> 5-(4-(3-(8-fluoro-1-oxo-1,2-dihydroisoquinolin-3-yl)propanoyl)piperazin-1-yl)picolinonitrile;
<71> 6-(4-(3-(8-fluoro-1-oxo-1,2-dihydroisoquinolin-3-yl)propanoyl)piperazin-1-yl)nicotinonitrile;
<72> 2-fluoro-4-(4-(3-(8-fluoro-1-oxo-1,2-dihydroisoquinolin-3-yl)propanoyl)piperazin-1-yl)benzonitrile;
<73> 3-fluoro-4-(4-(3-(8-fluoro-1-oxo-1,2-dihydroisoquinolin-3-yl)propanoyl)piperazin-1-yl)benzonitrile;
<74> 2-(4-(3-(8-fluoro-1-oxo-1,2-dihydroisoquinolin-3-yl)propanoyl)piperazin-1-yl)benzonitrile;
<75> 8-fluoro-3-(3-(4-(2-fluorophenyl)piperazin-1-yl)-3-oxopropyl)isoquinolin-1(2H)-one;
<76> 5-fluoro-2-(4-(3-(8-fluoro-1-oxo-1,2-dihydroisoquinolin-3-yl)propanoyl)piperazin-1-yl)benzonitrile;
<77> 3-(4-(3-(8-fluoro-1-oxo-1,2-dihydroisoquinolin-3-yl)propanoyl)piperazin-1-yl)benzonitrile;
<78> 3-(3-(4-(2,4-difluorophenyl)piperazin-1-yl)-3-oxopropyl)-8-fluoroisoquinolin-1(2H)-one;
<79> 4-fluoro-3-(4-(3-(8-fluoro-1-oxo-1,2-dihydroisoquinolin-3-yl)propanoyl)piperazin-1-yl)benzonitrile;
<80> 2-fluoro-5-(4-(3-(8-fluoro-1-oxo-1,2-dihydroisoquinolin-3-yl)propanoyl)piperazin-1-yl)benzonitrile;
<81> 4-fluoro-2-(4-(3-(8-fluoro-1-oxo-1,2-dihydroisoquinolin-3-yl)propanoyl)piperazin-1-yl)benzonitrile;
<82> 8-fluoro-3-(3-(4-(2-fluorophenyl)-3,6-dihydropyridin-1(2H)-yl)-3-oxopropyl)isoquinolin-1(2H)-one;
<83> 8-fluoro-3-(3-(4-(3-fluorophenyl)-3,6-dihydropyridin-1(2H)-yl)-3-oxopropyl)isoquinolin-1(2H)-one;
<84> 3-fluoro-5-(1-(3-(8-fluoro-1-oxo-1,2-dihydroisoquinolin-3-yl)propanoyl)-1,2,3,6-tetrahydropyridin-4-yl)benzonitrile;
<85> 8-fluoro-3-(3-(6-fluoro-3',6'-dihydro-[3,4'-bipyridine]-1'(2'H)-yl)-3-oxopropyl)isoquinolin-1(2H)-one;
<86> 8-fluoro-3-(3-(5-fluoro-3',6'-dihydro-[2,4'-bipyridine]-1'(2'H)-yl)-3-oxopropyl)isoquinolin-1(2H)-one;
<87> 2-fluoro-5-(1-(3-(8-fluoro-1-oxo-1,2-dihydroisoquinolin-3-yl)propanoyl)-1,2,3,6-tetrahydropyridin-4-yl)benzonitrile;
<88> 1'-(3-(8-fluoro-1-oxo-1,2-dihydroisoquinolin-3-yl)propanoyl)-1',2',3',6'-tetrahydro-[2,4'-bipyridine]-5-carbonitrile;
<89> 8-fluoro-3-(3-(4-(3-fluorophenyl)piperazin-1-yl)-3-oxopropyl)isoquinolin-1(2H)-one;
<90> 2-fluoro-5-(4-(3-(8-fluoro-1-oxo-1,2-dihydroisoquinolin-3-yl)propanoyl)piperazin-1-yl)benzonitrile;
<91> 4-(4-(3-(8-fluoro-1-oxo-1,2-dihydroisoquinolin-3-yl)propanoyl)piperazin-1-yl)benzonitrile hydrochloride;
<92> 8-fluoro-3-(3-(2'-fluoro-3,6-dihydro-[4,4'-bipyridine]-1(2H)-yl)-3-oxopropyl)isoquinolin-1(2H)-one;
<93> 1'-(3-(8-fluoro-1-oxo-1,2-dihydroisoquinolin-3-yl)propanoyl)-1',2',3',6'-tetrahydro-[3,4'-bipyridine]-6-carbonitrile;
<94> 4-(4-(3-(7-fluoro-1-oxo-1,2-dihydroisoquinolin-3-yl)propanoyl)piperazin-1-yl)benzonitrile;
<95> 4-(1-(3-(7-fluoro-1-oxo-1,2-dihydroisoquinolin-3-yl)propanoyl)-1,2,3,6-tetrahydropyridin-4-yl)benzonitrile;
<96> 1'-(3-(7-fluoro-1-oxo-1,2-dihydroisoquinolin-3-yl)propanoyl)-1',2',3',6'-tetrahydro-[2,4'-bipyridine]-5-carbonitrile;
<97> 5-(4-(3-(7-fluoro-1-oxo-1,2-dihydroisoquinolin-3-yl)propanoyl)piperazin-1-yl)picolinonitrile;
<98> 2-(4-(3-(7-fluoro-1-oxo-1,2-dihydroisoquinolin-3-yl)propanoyl)piperazin-1-yl)benzonitrile;
<99> 6-(4-(3-(7-fluoro-1-oxo-1,2-dihydroisoquinolin-3-yl)propanoyl)piperazin-1-yl)nicotinonitrile;
<100> 3-fluoro-4-(4-(3-(7-fluoro-1-oxo-1,2-dihydroisoquinolin-3-yl)propanoyl)piperazin-1-yl)benzonitrile;
<101> 2-fluoro-4-(4-(3-(7-fluoro-1-oxo-1,2-dihydroisoquinolin-3-yl)propanoyl)piperazin-1-yl)benzonitrile;
<102> 7-fluoro-3-(3-(6-fluoro-3',6'-dihydro-[3,4'-bipyridine]-1'(2'H)-yl)-3-oxopropyl)isoquinolin-1(2H)-one;
<103> 7-fluoro-3-(3-(5-fluoro-3',6'-dihydro-[2,4'-bipyridine]-1'(2'H)-yl)-3-oxopropyl)isoquinolin-1(2H)-one;
<104> 7-fluoro-3-(3-(4-(4-fluorophenyl)-3,6-dihydropyridin-1(2H)-yl)-3-oxopropyl)isoquinolin-1(2H)-one;
<105> 3-(3-(4-(4-chlorophenyl)piperazin-1-yl)-3-oxopropyl)-7-fluoroisoquinolin-1(2H)-one;
<106> 3-(3-(4-(2,4-difluorophenyl)piperazin-1-yl)-3-oxopropyl)-7-fluoroisoquinolin-1(2H)-one;
<107> 4-fluoro-3-(4-(3-(7-fluoro-1-oxo-1,2-dihydroisoquinolin-3-yl)propanoyl)piperazin-1-yl)benzonitrile;
<108> 4-fluoro-2-(4-(3-(7-fluoro-1-oxo-1,2-dihydroisoquinolin-3-yl)propanoyl)piperazin-1-yl)benzonitrile;
<109> 2-fluoro-5-(4-(3-(7-fluoro-1-oxo-1,2-dihydroisoquinolin-3-yl)propanoyl)piperazin-1-yl)benzonitrile;
<110> 5-fluoro-2-(4-(3-(7-fluoro-1-oxo-1,2-dihydroisoquinolin-3-yl)propanoyl)piperazin-1-yl)benzonitrile;
<111> 4-fluoro-3-(1-(3-(7-fluoro-1-oxo-1,2-dihydroisoquinolin-3-yl)propanoyl)-1,2,3,6-tetrahydropyridin-4-yl)benzonitrile;
<112> 5-fluoro-2-(1-(3-(7-fluoro-1-oxo-1,2-dihydroisoquinolin-3-yl)propanoyl)-1,2,3,6-tetrahydropyridin-4-yl)benzonitrile;
<113> 3-(3-(4-(2,4-difluorophenyl)-3,6-dihydropyridin-1(2H)-yl)-3-oxopropyl)-7-fluoroisoquinolin-1(2H)-one;
<114> 3-fluoro-5-(1-(3-(7-fluoro-1-oxo-1,2-dihydroisoquinolin-3-yl)propanoyl)-1,2,3,6-tetrahydropyridin-4-yl)benzonitrile;
<115> 7-fluoro-3-(3-(4-(3-fluorophenyl)-3,6-dihydropyridin-1(2H)-yl)-3-oxopropyl)isoquinolin-1(2H)-one;
<116> (R)-7-fluoro-3-(3-(3-(4-fluorophenyl)pyrrolidin-1-yl)-3-oxopropyl)isoquinolin-1(2H)-one;
<117> (S)-7-fluoro-3-(3-(3-(4-fluorophenyl)pyrrolidin-1-yl)-3-oxopropyl)isoquinolin-1(2H)-one;
<118> 7-fluoro-3-(3-oxo-3-(4-(4-(trifluoromethyl)phenyl)piperazin-1-yl)propyl)isoquinolin-1(2H)-one;
<119> 3-fluoro-5-(4-(3-(7-fluoro-1-oxo-1,2-dihydroisoquinolin-3-yl)propanoyl)piperazin-1-yl)benzonitrile;
<120> 7-fluoro-3-(3-(4-(3-fluorophenyl)piperazin-1-yl)-3-oxopropyl)isoquinolin-1(2H)-one;
<121> 7-fluoro-3-(3-(2'-fluoro-3,6-dihydro-[4,4'-bipyridine]-1(2H)-yl)-3-oxopropyl)isoquinolin-1(2H)-one;
<122> 4-(4-(3-(8-fluoro-5-methyl-1-oxo-1,2-dihydroisoquinolin-3-yl)propanoyl)piperazin-1-yl)benzonitrile;
<123> 6-(4-(3-(8-fluoro-5-methyl-1-oxo-1,2-dihydroisoquinolin-3-yl)propanoyl)piperazin-1-yl)nicotinonitrile;
<124> 5-(4-(3-(8-fluoro-5-methyl-1-oxo-1,2-dihydroisoquinolin-3-yl)propanoyl)piperazin-1-yl)picolinonitrile;
<125> 8-fluoro-3-(3-(4-(4-fluorophenyl)-3,6-dihydropyridin-1(2H)-yl)-3-oxopropyl)-5-methylisoquinolin-1(2H)-one;

<126> 2-fluoro-4-(4-(3-(8-fluoro-5-methyl-1-oxo-1,2-dihydroisoquinolin-3-yl)propanoyl)piperazin-1-yl)benzonitrile;

<127> 2-(4-(3-(8-fluoro-5-methyl-1-oxo-1,2-dihydroisoquinolin-3-yl)propanoyl)piperazin-1-yl)benzonitrile;

<128> 3-fluoro-4-(4-(3-(8-fluoro-5-methyl-1-oxo-1,2-dihydroisoquinolin-3-yl)propanoyl)piperazin-1-yl)benzonitrile;

<129> 8-fluoro-3-(3-(6-fluoro-3',6'-dihydro-[3,4'-bipyridine]-1'(2'H)-yl)-3-oxopropyl)-5-methylisoquinolin-1(2H)-one;

<130> 8-fluoro-3-(3-(5-fluoro-3',6'-dihydro-[2,4'-bipyridine]-1'(2'H)-yl)-3-oxopropyl)-5-methylisoquinolin-1(2H)-one;

<131> 3-(3-(4-(4-chlorophenyl)piperazin-1-yl)-3-oxopropyl)-8-fluoro-5-methylisoquinolin-1(2H)-one;

<132> 3-(3-(4-(2,4-difluorophenyl)piperazin-1-yl)-3-oxopropyl)-8-fluoro-5-methylisoquinolin-1(2H)-one;

<133> 4-fluoro-3-(4-(3-(8-fluoro-5-methyl-1-oxo-1,2-dihydroisoquinolin-3-yl)propanoyl)piperazin-1-yl)benzonitrile;

<134> 4-fluoro-2-(4-(3-(8-fluoro-5-methyl-1-oxo-1,2-dihydroisoquinolin-3-yl)propanoyl)piperazin-1-yl)benzonitrile;

<135> 2-fluoro-5-(4-(3-(8-fluoro-5-methyl-1-oxo-1,2-dihydroisoquinolin-3-yl)propanoyl)piperazin-1-yl)benzonitrile;

<136> 5-fluoro-2-(4-(3-(8-fluoro-5-methyl-1-oxo-1,2-dihydroisoquinolin-3-yl)propanoyl)piperazin-1-yl)benzonitrile;

<137> 4-fluoro-3-(1-(3-(8-fluoro-5-methyl-1-oxo-1,2-dihydroisoquinolin-3-yl)propanoyl)-1,2,3,6-tetrahydropyridin-4-yl)benzonitrile;

<138> 8-fluoro-3-(3-(4-(2-fluorophenyl)-3,6-dihydropyridin-1(2H)-yl)-3-oxopropyl)-5-methylisoquinolin-1(2H)-one;

<139> 2-fluoro-5-(1-(3-(8-fluoro-5-methyl-1-oxo-1,2-dihydroisoquinolin-3-yl)propanoyl)-1,2,3,6-tetrahydropyridin-4-yl)benzonitrile;

<140> 1'-(3-(8-fluoro-5-methyl-1-oxo-1,2-dihydroisoquinolin-3-yl)propanoyl)-1',2',3',6'-tetrahydro-[2,4'-bipyridine]-5-carbonitrile;

<141> 2-fluoro-4-(1-(3-(8-fluoro-5-methyl-1-oxo-1,2-dihydroisoquinolin-3-yl)propanoyl)-1,2,3,6-tetrahydropyridin-4-yl)benzonitrile;

<142> 8-fluoro-3-(3-(4-(3-fluorophenyl)piperazin-1-yl)-3-oxopropyl)-5-methylisoquinolin-1(2H)-one;

<143> 2-fluoro-5-(4-(3-(8-fluoro-5-methyl-1-oxo-1,2-dihydroisoquinolin-3-yl)propanoyl)piperazin-1-yl)benzonitrile;

<144> 8-fluoro-3-(3-(2'-fluoro-3,6-dihydro-[4,4'-bipyridine]-1(2H)-yl)-3-oxopropyl)-5-methylisoquinolin-1(2H)-one;

<145> 1'-(3-(8-fluoro-5-methyl-1-oxo-1,2-dihydroisoquinolin-3-yl)propanoyl)-1',2',3',6'-tetrahydro-[3,4'-bipyridine]-6-carbonitrile;

<146> methyl 4-(4-(3-(8-fluoro-5-methyl-1-oxo-1,2-dihydroisoquinolin-3-yl)propanoyl)piperazin-1-yl)benzoate;

<147> 4-(4-(3-(8-fluoro-5-methyl-1-oxo-1,2-dihydroisoquinolin-3-yl)propanoyl)piperazin-1-yl)benzoic acid;

<148> 4-(8-(3-(8-fluoro-5-methyl-1-oxo-1,2-dihydroisoquinolin-3-yl)propanoyl)-3,8-diazabicyclo[3.2.1]octan-3-yl)benzonitrile;

<149> 4-(4-(3-(7-fluoro-5-methyl-1-oxo-1,2-dihydroisoquinolin-3-yl)propanoyl)piperazin-1-yl)benzonitrile;

<150> 7-fluoro-3-(3-(4-(4-fluorophenyl)-3,6-dihydropyridin-1(2H)-yl)-3-oxopropyl)-5-methylisoquinolin-1(2H)-one;

<151> 5-(4-(3-(7-fluoro-5-methyl-1-oxo-1,2-dihydroisoquinolin-3-yl)propanoyl)piperazin-1-yl)picolinonitrile;

<152> 6-(4-(3-(7-fluoro-5-methyl-1-oxo-1,2-dihydroisoquinolin-3-yl)propanoyl)piperazin-1-yl)nicotinonitrile;

<153> 2-fluoro-4-(4-(3-(7-fluoro-5-methyl-1-oxo-1,2-dihydroisoquinolin-3-yl)propanoyl)piperazin-1-yl)benzonitrile;

<154> 3-fluoro-4-(4-(3-(7-fluoro-5-methyl-1-oxo-1,2-dihydroisoquinolin-3-yl)propanoyl)piperazin-1-yl)benzonitrile;

<155> 3-(3-(4-(4-chlorophenyl)piperazin-1-yl)-3-oxopropyl)-7-fluoro-5-methylisoquinolin-1(2H)-one;

<156> 4-fluoro-3-(4-(3-(7-fluoro-5-methyl-1-oxo-1,2-dihydroisoquinolin-3-yl)propanoyl)piperazin-1-yl)benzonitrile;

<157> 4-fluoro-2-(4-(3-(7-fluoro-5-methyl-1-oxo-1,2-dihydroisoquinolin-3-yl)propanoyl)piperazin-1-yl)benzonitrile;

<158> 2-fluoro-5-(4-(3-(7-fluoro-5-methyl-1-oxo-1,2-dihydroisoquinolin-3-yl)propanoyl)piperazin-1-yl)benzonitrile;

<159> 5-fluoro-2-(4-(3-(7-fluoro-5-methyl-1-oxo-1,2-dihydroisoquinolin-3-yl)propanoyl)piperazin-1-yl)benzonitrile;

<160> 4-fluoro-3-(1-(3-(7-fluoro-5-methyl-1-oxo-1,2-dihydroisoquinolin-3-yl)propanoyl)-1,2,3,6-tetrahydropyridin-4-yl)benzonitrile;

<161> 5-fluoro-2-(1-(3-(7-fluoro-5-methyl-1-oxo-1,2-dihydroisoquinolin-3-yl)propanoyl)-1,2,3,6-tetrahydropyridin-4-yl)benzonitrile;

<162> 3-(3-(4-(2,4-difluorophenyl)-3,6-dihydropyridin-1(2H)-yl)-3-oxopropyl)-7-fluoro-5-methylisoquinolin-1(2H)-one;

<163> 3-fluoro-5-(1-(3-(7-fluoro-5-methyl-1-oxo-1,2-dihydroisoquinolin-3-yl)propanoyl)-1,2,3,6-tetrahydropyridin-4-yl)benzonitrile;

<164> 7-fluoro-3-(3-(4-(3-fluorophenyl)-3,6-dihydropyridin-1(2H)-yl)-3-oxopropyl)-5-methylisoquinolin-1(2H)-one;

<165> 1'-(3-(7-fluoro-5-methyl-1-oxo-1,2-dihydroisoquinolin-3-yl)propanoyl)-1',2',3',6'-tetrahydro-[2,4'-bipyridine]-5-carbonitrile;

<166> 3-fluoro-5-(4-(3-(7-fluoro-5-methyl-1-oxo-1,2-dihydroisoquinolin-3-yl)propanoyl)piperazin-1-yl)benzonitrile;

<167> 7-fluoro-3-(3-(4-(3-fluorophenyl)piperazin-1-yl)-3-oxopropyl)-5-methylisoquinolin-1(2H)-one;

<168> 7-fluoro-3-(3-(2'-fluoro-3,6-dihydro-[4,4'-bipyridine]-1(2H)-yl)-3-oxopropyl)-5-methylisoquinolin-1(2H)-one;

<169> 5-(4-(3-(7-fluoro-5-methyl-1-oxo-1,2-dihydroisoquinolin-3-yl)propanoyl)piperazin-1-yl)picolinonitrile dihydrochloride;

<170> 3-(3-(4-(cyclohexanecarbonyl)piperazin-1-yl)-3-oxopropyl)-8-fluoroisoquinolin-1(2H)-one;

<171> 3-(3-(4-(cyclohexanecarbonyl)piperazin-1-yl)-3-oxopropyl)-8-fluoro-5-methylisoquinolin-1(2H)-one;

<172> 3-(3-(4-(cyclohexanecarbonyl)piperazin-1-yl)-3-oxopropyl)-7-fluoroisoquinolin-1(2H)-one;

<173> 3-(3-(4-(cyclohexanecarbonyl)piperazin-1-yl)-3-oxopropyl)-7-fluoro-5-methylisoquinolin-1(2H)-one;

<174> 3-(3-(4-(cyclopentanecarbonyl)piperazin-1-yl)-3-oxopropyl)-8-fluoroisoquinolin-1(2H)-one;

<175> 3-(3-(4-(cyclopentanecarbonyl)piperazin-1-yl)-3-oxopropyl)-8-fluoro-5-methylisoquinolin-1(2H)-one;
<176> 3-(3-(4-(cyclopentanecarbonyl)piperazin-1-yl)-3-oxopropyl)-7-fluoroisoquinolin-1(2H)-one;
<177> 3-(3-(4-(cyclopentanecarbonyl)piperazin-1-yl)-3-oxopropyl)-7-fluoro-5-methylisoquinolin-1(2H)-one;
<178> 3-(3-(4-(cyclobutanecarbonyl)piperazin-1-yl)-3-oxopropyl)-8-fluoroisoquinolin-1(2H)-one;
<179> 3-(3-(4-(cyclobutanecarbonyl)piperazin-1-yl)-3-oxopropyl)-8-fluoro-5-methylisoquinolin-1(2H)-one;
<180> 3-(3-(4-(cyclobutanecarbonyl)piperazin-1-yl)-3-oxopropyl)-7-fluoroisoquinolin-1(2H)-one;
<181> 3-(3-(4-(cyclobutanecarbonyl)piperazin-1-yl)-3-oxopropyl)-7-fluoro-5-methylisoquinolin-1(2H)-one;
<182> 3-(3-(4-(cyclopropanecarbonyl)piperazin-1-yl)-3-oxopropyl)-8-fluoroisoquinolin-1(2H)-one;
<183> 3-(3-(4-(cyclopropanecarbonyl)piperazin-1-yl)-3-oxopropyl)-8-fluoro-5-methylisoquinolin-1(2H)-one;
<184> 3-(3-(4-(cyclopropanecarbonyl)piperazin-1-yl)-3-oxopropyl)-7-fluoroisoquinolin-1(2H)-one;
<185> 3-(3-(4-(cyclopropanecarbonyl)piperazin-1-yl)-3-oxopropyl)-7-fluoro-5-methylisoquinolin-1(2H)-one;
<186> 8-fluoro-3-(3-(4-isobutyrylpiperazin-1-yl)-3-oxopropyl)isoquinolin-1(2H)-one;
<187> 8-fluoro-3-(3-(4-isobutyrylpiperazin-1-yl)-3-oxopropyl)-5-methylisoquinolin-1(2H)-one;
<188> 7-fluoro-3-(3-(4-isobutyrylpiperazin-1-yl)-3-oxopropyl)isoquinolin-1(2H)-one;
<189> 7-fluoro-3-(3-(4-isobutyrylpiperazin-1-yl)-3-oxopropyl)-5-methylisoquinolin-1(2H)-one;
<190> 8-fluoro-3-(3-oxo-3-(4-(tetrahydrofuran-2-carbonyl)piperazin-1-yl)propyl)isoquinolin-1(2H)-one;
<191> 8-fluoro-5-methyl-3-(3-oxo-3-(4-(tetrahydrofuran-2-carbonyl)piperazin-1-yl)propyl)isoquinolin-1(2H)-one;
<192> 7-fluoro-3-(3-oxo-3-(4-(tetrahydrofuran-2-carbonyl)piperazin-1-yl)propyl)isoquinolin-1(2H)-one;
<193> 7-fluoro-5-methyl-3-(3-oxo-3-(4-(tetrahydrofuran-2-carbonyl)piperazin-1-yl)propyl)isoquinolin-1(2H)-one;
<194> 3-(3-(4-(L-alanyl)piperazin-1-yl)-3-oxopropyl)-8-fluoro-5-methylisoquinolin-1(2H)-one hydrochloride;
<195> 3-(3-(4-(L-phenylalanyl)piperazin-1-yl)-3-oxopropyl)-8-fluoro-5-methylisoquinolin-1(2H)-one hydrochloride;
<196> 8-fluoro-5-methyl-3-(3-oxo-3-(4-propylpiperazin-1-yl)propyl)isoquinolin-1(2H)-one hydrochloride;
<197> 4-(8-(3-(8-fluoro-5-methyl-1-oxo-1,2-dihydroisoquinolin-3-yl)propyl-3,8-diazabicyclo[3.2.1]octan-3-yl)benzonitrile;
<198> 8-fluoro-3-(3-(3-(4-fluorophenyl)-3,8-diazabicyclo[3.2.1]octan-8-yl)propyl)-5-methylisoquinolin-1(2H)-one;
<199> 6-(8-(3-(8-fluoro-5-methyl-1-oxo-1,2-dihydroisoquinolin-3-yl)propyl-3,8-diazabicyclo[3.2.1]octan-3-yl)nicotinonitrile;
<200> 5-(8-(3-(8-fluoro-5-methyl-1-oxo-1,2-dihydroisoquinolin-3-yl)propyl)-3,8-diazabicyclo[3.2.1]octan-3-yl)picolinonitrile;
<201> 3-(3-(3-(4-chlorophenyl)-3,8-diazabicyclo[3.2.1]octan-8-yl)propyl)-8-fluoro-5-methylisoquinolin-1(2H)-one;
<202> 8-fluoro-3-(3-(3-(6-fluoropyridin-3-yl)-3,8-diazabicyclo[3.2.1]octan-8-yl)propyl)-5-methylisoquinolin-1(2H)-one;
<203> 6-(8-(3-(8-fluoro-1-oxo-1,2-dihydroisoquinolin-3-yl)propyl)3,8-diazabicyclo[3.2.1]octan-3-yl)nicotinonitrile;
<204> 6-(8-(3-(7-fluoro-1-oxo-1,2-dihydroisoquinolin-3-yl)propyl)-3,8-diazabicyclo[3.2.1]octan-3-yl)nicotinonitrile;
<205> 6-(8-(3-(7-fluoro-5-methyl-1-oxo-1,2-dihydroisoquinolin-3-yl)propyl)-3,8-diazabicyclo[3.2.1]octan-3-yl)nicotinonitrile;
<206> 6-(8-(3-(8-fluoro-1-oxo-1,2-dihydroisoquinolin-3-yl)propanoyl)-3,8-diazabicyclo[3.2.1]octan-3-yl)nicotinonitrile;
<207> 6-(8-(3-(8-fluoro-5-methyl-1-oxo-1,2-dihydroisoquinolin-3-yl)propanoyl)-3,8-diazabicyclo[3.2.1]octan-3-yl)nicotinonitrile;
<208> 8-fluoro-3-(3-(3-(4-fluorophenyl)-3,8-diazabicyclo[3.2.1]octan-8-yl)-3-oxopropyl)-5-methylisoquinolin-1(2H)-one;
<209> 4-(8-(3-(8-fluoro-5-methyl-1-oxo-1,2-dihydroisoquinolin-3-yl)propanoyl)-3,8-diazabicyclo[3.2.1]octan-3-yl)benzonitrile;
<210> 3-(3-(3-(4-chlorophenyl)-3,8-diazabicyclo[3.2.1]octan-8-yl)-3-oxopropyl)-8-fluoro-5-methylisoquinolin-1(2H)-one;
<211> 8-fluoro-3-(3-(3-(6-fluoropyridin-3-yl)-3,8-diazabicyclo[3.2.1]octan-8-yl)-3-oxopropyl)-5-methylisoquinolin-1(2H)-one;
<212> 8-fluoro-3-(3-(3-(5-fluoropyridin-2-yl)-3,8-diazabicyclo[3.2.1]octan-8-yl)-3-oxopropyl)-5-methylisoquinolin-1(2H)-one;
<213> 4-(8-(3-(7-fluoro-5-methyl-1-oxo-1,2-dihydroisoquinolin-3-yl)propanoyl)-3,8-diazabicyclo[3.2.1]octan-3-yl)benzonitrile;
<214> 6-(8-(3-(7-fluoro-5-methyl-1-oxo-1,2-dihydroisoquinolin-3-yl)propanoyl)-3,8-diazabicyclo[3.2.1]octan-3-yl)nicotinonitrile;
<215> 7-fluoro-3-(3-(3-(4-fluorophenyl)-3,8-diazabicyclo[3.2.1]octan-8-yl)-3-oxopropyl)-5-methylisoquinolin-1(2H)-one;
<216> 3-(3-(3-(4-chlorophenyl)-3,8-diazabicyclo[3.2.1]octan-8-yl)-3-oxopropyl)-7-fluoro-5-methylisoquinolin-1(2H)-one;
<217> 7-fluoro-3-(3-(3-(6-fluoropyridin-3-yl)-3,8-diazabicyclo[3.2.1]octan-8-yl)-3-oxopropyl)-5-methylisoquinolin-1(2H)-one;
<218> 6-(8-(3-(7-fluoro-5-methyl-1-oxo-1,2-dihydroisoquinolin-3-yl)propanoyl)-3,8-diazabicyclo[3.2.1]octan-3-yl)nicotinonitrile;
<219> 7-fluoro-3-(3-(3-(5-fluoropyridin-2-yl)-3,8-diazabicyclo[3.2.1]octan-8-yl)-3-oxopropyl)-5-methylisoquinolin-1(2H)-one;
<220> 6-(8-(3-(7-fluoro-1-oxo-1,2-dihydroisoquinolin-3-yl)propanoyl)3,8-diazabicyclo[3.2.1]octan-3-yl)nicotinonitrile;
<221> 4-(4-(3-(5-oxo-5,6-dihydro-1,6-naphthyridin-7-yl)propyl)piperazin-1-yl)benzonitrile;
<222> 6-(4-(3-(5-oxo-5,6-dihydro-1,6-naphthyridin-7-yl)propyl)piperazin-1-yl)nicotinonitrile;
<223> 7-(3-(4-(4-fluorophenyl)piperazin-1-yl)propyl)-1,6-naphthyridin-5(6H)-one;
<224> 7-(3-(4-(3-fluorophenyl)piperazin-1-yl)propyl)-1,6-naphthyridin-5(6H)-one;
<225> 4-(8-(3-(5-oxo-5,6-dihydro-1,6-naphthyridin-7-yl)propyl)-3,8-diazabicyclo[3.2.1]octan-3-yl)benzonitrile;
<226> 5-(4-(3-(5-oxo-5,6-dihydro-1,6-naphthyridin-7-yl)propyl)piperazin-1-yl)picolinonitrile;

<227> 7-(3-(4-(2-fluoropyridin-4-yl)piperazin-1-yl)propyl)-1,6-naphthyridin-5(6H)-one;
<228> 7-(3-(3-(4-chlorophenyl)-3,8-diazabicyclo[3.2.1]octan-8-yl)propyl)-1,6-naphthyridin-5(6H)-one;
<229> 5-(8-(3-(5-oxo-5,6-dihydro-1,6-naphthyridin-7-yl)propyl)-3,8-diazabicyclo[3.2.1]octan-3-yl)picolinonitrile;
<230> 7-(3-(3-(4-fluorophenyl)-3,8-diazabicyclo[3.2.1]octan-8-yl)propyl-1,6-naphthyridin-5(6H)-one;
<231> 7-(3-(3-(5-fluoropyridin-2-yl)-3,8-diazabicyclo[3.2.1]octan-8-yl)propyl)-1,6-naphthyridin-5(6H)-one;
<232> 6-(8-(3-(5-oxo-5,6-dihydro-1,6-naphthyridin-7-yl)propyl)-3,8-diazabicyclo[3.2.1]octan-3-yl)nicotinonitrile;
<233> 7-(3-(3-(6-fluoropyridin-3-yl)-3,8-diazabicyclo[3.2.1]octan-8-yl)propyl)-1,6-naphthyridin-5(6H)-one;
<234> 1'-(3-(5-oxo-5,6-dihydro-1,6-naphthyridin-7-yl)propyl)-1',2',3',6'-tetrahydro-[3,4'-bipyridine]-6-carbonitrile;
<235> 1'-(3-(5-oxo-5,6-dihydro-1,6-naphthyridin-7-yl)propyl)-1',2',3',6'-tetrahydro-[2,4'-bipyridine]-5-carbonitrile;
<236> 7-(3-(4-(4-fluorophenyl)-3,6-dihydropyridin-1(2H)-yl)propyl)-1,6-naphthyridin-5(6H)-one;
<237> 7-(3-(2'-fluoro-3,6-dihydro-[4,4'-bipyridine]-1(2H)-yl)propyl)-1,6-naphthyridin-5(6H)-one;
<238> 7-(3-(4-(3-fluorophenyl)-3,6-dihydropyridin-1(2H)-yl)propyl)-1,6-naphthyridin-5(6H)-one;
<239> 4-(1-(3-(5-oxo-5,6-dihydro-1,6-naphthyridin-7-yl)propyl)-1,2,3,6-tetrahydropyridin-4-yl)benzonitrile;
<240> 7-(3-(3,6-dihydro-[4,4'-bipyridine]-1(2H)-yl)propyl)-1,6-naphthyridin-5(6H)-one;
<241> 4-(4-(3-(5-oxo-5,6-dihydro-1,6-naphthyridin-7-yl)propanoyl)piperazin-1-yl)benzonitrile;
<242> 6-(4-(3-(5-oxo-5,6-dihydro-1,6-naphthyridin-7-yl)propanoyl)piperazin-1-yl)nicotinonitrile;
<243> 5-(4-(3-(5-oxo-5,6-dihydro-1,6-naphthyridin-7-yl)propanoyl)piperazin-1-yl)picolinonitrile;
<244> 7-(3-(4-(4-fluorophenyl)-3,6-dihydropyridin-1(2H)-yl)-3-oxopropyl)-1,6-naphthyridin-5(6H)-one;
<245> 4-(1-(3-(5-oxo-5,6-dihydro-1,6-naphthyridin-7-yl)propanoyl)-1,2,3,6-tetrahydropyridin-4-yl)benzonitrile;
<246> 4-(8-(3-(5-oxo-5,6-dihydro-1,6-naphthyridin-7-yl)propanoyl)-3,8-diazabicyclo[3.2.1]octan-3-yl)benzonitrile;
<247> 4-((1-(3-(8-fluoro-1-oxo-1,2-dihydroisoquinolin-3-yl)propyl)piperidin-4-yl)amino)benzonitrile;
<248> 5-((1-(3-(8-fluoro-1-oxo-1,2-dihydroisoquinolin-3-yl)propyl)piperidin-4-yl)amino)picolinonitrile;
<249> 4-((1-(3-(7-fluoro-1-oxo-1,2-dihydroisoquinolin-3-yl)propyl)piperidin-4-yl)amino)benzonitrile;
<250> 4-((1-(3-(5-oxo-5,6-dihydro-1,6-naphthyridin-7-yl)propyl)piperidin-4-yl)amino)benzonitrile;
<251> 5-((1-(3-(5-oxo-5,6-dihydro-1,6-naphthyridin-7-yl)propyl)piperidin-4-yl)amino)picolinonitrile;
<252> methyl 4-((1-(3-(5-oxo-5,6-dihydro-1,6-naphthyridin-7-yl)propyl)piperidin-4-yl)amino)benzoate;
<253> 7-(3-(4-((4-(trifluoromethyl)phenyl)amino)piperidin-1-yl)propyl)-1,6-naphthyridin-5(6H)-one;
<254> 4-((1-(3-(8-fluoro-1-oxo-1,2-dihydroisoquinolin-3-yl)propyl)piperidin-4-yl)oxy)benzonitrile;
<255> 4-((1-(3-(8-fluoro-1-oxo-1,2-dihydroisoquinolin-3-yl)propanoyl)piperidin-4-yl)oxy)benzonitrile;
<256> 4-((1-(3-(8-fluoro-1-oxo-1,2-dihydroisoquinolin-3-yl)propanoyl)piperidin-4-yl)amino)benzonitrile;
<257> 4-((1-(3-(8-fluoro-1-oxo-1,2-dihydroisoquinolin-3-yl)propanoyl)piperidin-4-yl)(methyl)amino)benzonitrile;
<258> 5-((1-(3-(8-fluoro-1-oxo-1,2-dihydroisoquinolin-3-yl)propanoyl)piperidin-4-yl)amino)picolinonitrile;
<259> 4-((1-(3-(8-fluoro-5-methyl-1-oxo-1,2-dihydroisoquinolin-3-yl)propanoyl)piperidin-4-yl)amino)benzonitrile;
<260> 4-((1-(3-(7-fluoro-5-methyl-1-oxo-1,2-dihydroisoquinolin-3-yl)propanoyl)piperidin-4-yl)amino)benzonitrile;
<261> 4-((1-(3-(8-fluoro-5-methyl-1-oxo-1,2-dihydroisoquinolin-3-yl)propanoyl)piperidin-4-yl)oxy)benzonitrile;
<262> 4-((1-(3-(7-fluoro-5-methyl-1-oxo-1,2-dihydroisoquinolin-3-yl)propanoyl)piperidin-4-yl)oxy)benzonitrile;
<263> 3-(3-(4-((4-chlorophenyl)amino)piperidin-1-yl)-3-oxopropyl)-7-fluoro-5-methylisoquinolin-1(2H)-one;
<264> 3-(3-(4-((4-chlorophenyl)amino)piperidin-1-yl)-3-oxopropyl)-8-fluoro-5-methylisoquinolin-1(2H)-one;
<265> 7-fluoro-5-methyl-3-(3-oxo-3-(4-((4-(trifluoromethyl)phenyl)amino)piperidin-1-yl)propyl)isoquinolin-1(2H)-one;
<266> 8-fluoro-5-methyl-3-(3-oxo-3-(4-((4-(trifluoromethyl)phenyl)amino)piperidin-1-yl)propyl)isoquinolin-1(2H)-one;
<267> methyl 4-((1-(3-(7-fluoro-5-methyl-1-oxo-1,2-dihydroisoquinolin-3-yl)propanoyl)piperidin-4-yl)amino)benzoate;
<268> methyl 4-((1-(3-(8-fluoro-5-methyl-1-oxo-1,2-dihydroisoquinolin-3-yl)propanoyl)piperidin-4-yl)amino)benzoate;
<273> 4-((8-(3-(8-fluoro-1-oxo-1,2-dihydroisoquinolin-3-yl)propyl)-8-azabicyclo[3.2.1]octan-3-yl)oxy)benzonitrile;
<274> 4-((8-(3-(8-fluoro-1-oxo-1,2-dihydroisoquinolin-3-yl)propanoyl)-8-azabicyclo[3.2.1]octan-3-yl)oxy)benzonitrile;
<275> N-(1-(3-(8-fluoro-5-methyl-1-oxo-1,2-dihydroisoquinolin-3-yl)propanoyl)azetidin-3-yl)cyclopropanecarboxamide; and
<276> N-(1-(3-(8-fluoro-5-methyl-1-oxo-1,2-dihydroisoquinolin-3-yl)propanoyl)piperidin-4-yl)cyclopropanecarboxamide.

7. A method for preparing a compound represented by Chemical Formula 1 of claim 1, comprising: reacting a compound represented by Chemical Formula 2 with a compound represented by Chemical Formula 3 to prepare a compound represented by Chemical Formula 1, as shown in Reaction Scheme 1 below:

[Reaction Scheme 1]

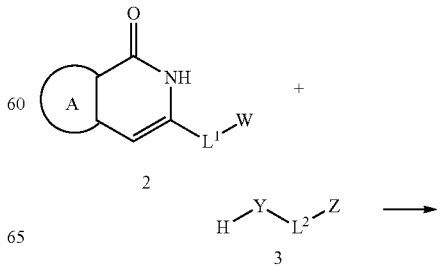

-continued

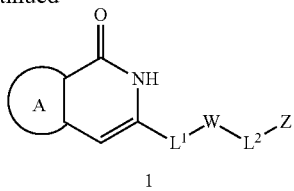

in the Reaction Scheme 1 above,

$L^1$, Y, $L^2$, and Z are as defined in claim 1, and W is a leaving group.

8. A pharmaceutical composition for preventing or treating a poly(ADP-ribose) polymerase-1 (PARP-1)-related disease, comprising a compound represented by Chemical Formula 1 of claim 1, a stereoisomer, a tautomer, or a pharmaceutically acceptable salt thereof as an active ingredient.

9. The pharmaceutical composition of claim 8, wherein the compound represented by Chemical Formula 1 above, a stereoisomer, a tautomer, or a pharmaceutically acceptable salt thereof is characterized in preventing or treating a poly(ADP-ribose) polymerase-1 (PARP-1)-related disease from cytoprotective effects.

10. The pharmaceutical composition of claim 8, wherein the poly(ADP-ribose) polymerase-1 (PARP-1)-related disease is a disease caused by cell damage or apoptosis induced by hyperactivity of poly(ADP-ribose) polymerase-1 (PARP-1).

11. The pharmaceutical composition of claim 8, wherein the poly(ADP-ribose) polymerase-1 (PARP-1)-related disease is one or more selected from the group consisting of neurogenic disorder, neurodegenerative disease, vascular stroke, cardiovascular disorder, macular degeneration, AIDS, arthritis, atherosclerosis, cancer, diabetes mellitus, brain tumor, inflammatory bowel disorder, muscular dystrophy, osteoarthritis, osteoporosis, chronic pain, acute pain, neuropathic pain, nerve attack, peripheral nerve damage, kidney disease, retinal ischemia, septic shock, and skin aging.

12. A pharmaceutical composition for preventing or treating an ophthalmic disease or disorder, comprising a compound represented by Chemical Formula 1 of claim 1, a stereoisomer, a tautomer, or a pharmaceutically acceptable salt thereof as an active ingredient.

13. The pharmaceutical composition of claim 12, wherein the ophthalmic disease or disorder is one or more selected from the group consisting of age-related macular degeneration, Stargardt's macular dystrophy, retinal detachment, hemorrhagic retinopathy, retinitis pigmentosa, cone-rod dystrophy, Sorsby's fundus dystrophy, optic neuropathy, inflammatory retinal disease, diabetic retinopathy, diabetic maculopathy, retinal vascular occlusion, retinopathy of prematurity, or retinal damage associated with ischemia reperfusion, proliferative vitreoretinopathy, retinal dystrophy, congenital optic neuropathy, uveitis, retinal damage, retinal disorder associated with Alzheimer's disease, retinal disorder associated with multiple sclerosis, retinal disorder associated with Parkinson's disease, retinal disorder associated with viral infections, retinal disorder associated with light overexposure, myopia, or AIDS-related retinal disorder.

14. A health functional food for preventing or improving an ophthalmic disease or disorder, comprising a compound represented by Chemical Formula 1 of claim 1, a stereoisomer, a tautomer, or a pharmaceutically acceptable salt thereof as an active ingredient.

15. The health functional food of claim 14, wherein the ophthalmic disease or disorder is one or more selected from the group consisting of age-related macular degeneration, Stargardt's macular dystrophy, retinal detachment, hemorrhagic retinopathy, retinitis pigmentosa, cone-rod dystrophy, Sorsby's fundus dystrophy, optic neuropathy, inflammatory retinal disease, diabetic retinopathy, diabetic maculopathy, retinal vascular occlusion, retinopathy of prematurity, or retinal damage associated with ischemia reperfusion, proliferative vitreoretinopathy, retinal dystrophy, congenital optic neuropathy, uveitis, retinal damage, retinal disorder associated with Alzheimer's disease, retinal disorder associated with multiple sclerosis, retinal disorder associated with Parkinson's disease, retinal disorder associated with viral infections, retinal disorder associated with light overexposure, myopia, or AIDS-related retinal disorder.

* * * * *